US011907446B2

(12) United States Patent
Bernstein et al.

(10) Patent No.: US 11,907,446 B2
(45) Date of Patent: Feb. 20, 2024

(54) DEVICES AND METHODS FOR CREATING CALENDAR EVENTS BASED ON HAND-DRAWN INPUTS AT AN ELECTRONIC DEVICE WITH A TOUCH-SENSITIVE DISPLAY

(71) Applicant: Apple Inc., Cupertino, CA (US)

(72) Inventors: Jeffrey Traer Bernstein, San Francisco, CA (US); Linda L. Dong, Altadena, CA (US); Mark K. Hauenstein, San Francsico, CA (US); Julian Missig, Burlingame, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/886,643

(22) Filed: May 28, 2020

(65) Prior Publication Data

US 2020/0293125 A1 Sep. 17, 2020

Related U.S. Application Data

(63) Continuation of application No. 16/359,906, filed on Mar. 20, 2019, now Pat. No. 10,678,351, which is a (Continued)

(51) Int. Cl.

*G06F 3/0482* (2013.01)
*G06F 3/0354* (2013.01)

(Continued)

(52) U.S. Cl.

CPC .......... *G06F 3/03545* (2013.01); *G06F 3/017* (2013.01); *G06F 3/0416* (2013.01);

(Continued)

(58) Field of Classification Search

CPC .... G06F 3/017; G06F 3/03545; G06F 3/0416; G06F 3/0482; G06F 3/0488;

(Continued)

(56) References Cited

U.S. PATENT DOCUMENTS

| | | |
|---|---|---|
| 5,155,813 A | 10/1992 | Donoghue et al. |
| 6,611,258 B1 | 8/2003 | Tanaka et al. |

(Continued)

FOREIGN PATENT DOCUMENTS

| | | |
|---|---|---|
| CN | 101667100 A | 3/2010 |
| CN | 103135915 A | 6/2013 |

(Continued)

OTHER PUBLICATIONS

Android and Me, "Samsung Galaxy Note 3 Review," http://androidandme.com/2013/10-reviews/samsung-galaxy-note-3 review/, 2013, 14 pages.

(Continued)

*Primary Examiner* — Gene W Lee

(74) *Attorney, Agent, or Firm* — Morgan, Lewis & Bockius LLP

(57) ABSTRACT

An electronic device with a touch-sensitive display displays an electronic calendar and detects a hand-drawn input on the touch-sensitive display. The hand-drawn input extends over a vertical portion, less than all, of an area corresponding to a first day in the calendar. In response to detecting the hand-drawn input, the device displays, over the vertical portion of the first day, one or more graphics that correspond to the hand-drawn input. While displaying the graphics, the device detects an input that corresponds to a request to create an event in the electronic calendar. In response, the device creates, in the first day in the electronic calendar, an event with a start time and an end time, wherein the start time and the end time of the event are in accordance with the first day that the hand drawn input extends over.

36 Claims, 155 Drawing Sheets

Related U.S. Application Data continuation of application No. 14/862,085, filed on Sep. 22, 2015, now Pat. No. 10,365,732, which is a continuation of application No. 14/860,320, filed on Sep. 21, 2015, now Pat. No. 9,658,704.

(60) Provisional application No. 62/173,916, filed on Jun. 10, 2015.

(51) Int. Cl.
*G06F 3/01* (2006.01)
*G06F 3/0488* (2022.01)
*G06F 3/041* (2006.01)
*G06F 3/04883* (2022.01)

(52) U.S. Cl.
CPC .......... *G06F 3/0482* (2013.01); *G06F 3/0488* (2013.01); *G06F 3/04883* (2013.01)

(58) Field of Classification Search
CPC .... G06F 3/04883; G06F 1/1652; G06F 16/43; G06F 16/9562; G06F 3/0233; G06F 3/0237; G06F 3/0487; G06F 40/103; G06F 40/166; G06F 40/177; G06F 3/0321; G06F 3/048–04897; H04N 5/3765; H04M 1/72436; G06T 11/203; G06T 11/206
See application file for complete search history.

(56) References Cited

U.S. PATENT DOCUMENTS 7,489,306 B2 2/2009 Kolmykov-Zotov et al.
8,159,501 B2 4/2012 Rao
8,493,340 B2 7/2013 Tremblay
8,587,526 B2 11/2013 Engelhardt et al.
8,638,320 B2 1/2014 Harley et al.
8,638,385 B2 1/2014 Bhogal
8,736,575 B2 5/2014 Kasahara et al.
8,928,635 B2 1/2015 Harley et al.
8,994,698 B2 3/2015 DiVerdi et al.
9,075,464 B2 7/2015 Mankowski et al.
9,223,464 B2 12/2015 Mandre
9,268,997 B2* 2/2016 Sheth ................ G06K 9/00442
10,079,786 B2 9/2018 Yamakawa et al.
10,338,793 B2 7/2019 Fisher
10,445,703 B1* 10/2019 Atkins .................... H04L 51/14
2002/0048404 A1 4/2002 Fahraeus et al.
2004/0070573 A1* 4/2004 Graham .............. G06F 3/04883 345/179
2005/0156915 A1 7/2005 Fisher
2005/0262164 A1* 11/2005 Guiheneuf ....... G06Q 10/06311
2008/0201438 A1 8/2008 Mandre
2008/0225007 A1 9/2008 Nakadaira et al.
2009/0167728 A1 7/2009 Geaghan et al.
2010/0181121 A1 7/2010 Tremblay
2010/0306705 A1 12/2010 Nilsson
2011/0012856 A1 1/2011 Maxwell et al.
2011/0050601 A1 3/2011 Son et al.
2011/0239146 A1* 9/2011 Dutta .................. G06Q 10/109 715/768
2012/0036927 A1 2/2012 Sanders et al.
2012/0068941 A1 3/2012 Arrasvuori et al.
2012/0169646 A1 7/2012 Berkes et al.
2012/0206330 A1 8/2012 Cao et al.
2012/0233270 A1 9/2012 Lee et al.
2012/0242603 A1 9/2012 Engelhardt et al.
2012/0262407 A1 10/2012 Hinckley et al.
2012/0306927 A1 12/2012 Lee et al.
2012/0311499 A1 12/2012 Dellinger et al.
2013/0088465 A1 4/2013 Geller et al.
2013/0106731 A1 5/2013 Yilmaz et al.
2013/0106766 A1 5/2013 Yilmaz et al.
2013/0127757 A1 5/2013 Mann et al.
2013/0136377 A1 5/2013 Luo et al.
2013/0229390 A1 9/2013 DiVerdi
2013/0229391 A1 9/2013 DiVerdi
2013/0242708 A1* 9/2013 Siu ...................... G06Q 10/109 368/10
2013/0257777 A1 10/2013 Benko et al.
2013/0263027 A1 10/2013 Petschnigg et al.
2013/0300719 A1 11/2013 Wang
2013/0326582 A1 12/2013 Kruzeniski et al.
2013/0328810 A1 12/2013 Li et al.
2014/0028634 A1 1/2014 Krah et al.
2014/0059487 A1* 2/2014 Baumann ............ G06Q 10/109 715/811
2014/0067965 A1 3/2014 Yamakawa et al.
2014/0068493 A1* 3/2014 Moon ................ G06F 3/04883 715/776
2014/0081610 A1 3/2014 DeVerdi et al.
2014/0210730 A1 7/2014 Mankowski et al.
2014/0210979 A1 7/2014 Richter et al.
2014/0253521 A1 9/2014 Hicks
2014/0280603 A1 9/2014 Rideout et al.
2014/0334732 A1* 11/2014 Jung .................... G06F 40/171 382/188
2014/0340318 A1 11/2014 Stringer
2014/0354555 A1 12/2014 Shahparnia et al.
2015/0007061 A1 1/2015 Mandre
2015/0009155 A1 1/2015 Tsao et al.
2015/0029162 A1 1/2015 Harris et al.
2015/0058789 A1* 2/2015 Namgung ............ G06F 3/0488 715/781
2015/0069204 A1 3/2015 Daniels et al.
2015/0106714 A1 4/2015 Jeong et al.
2015/0109257 A1 4/2015 Jalali
2015/0127403 A1* 5/2015 Petty .................... G06F 3/0481 705/7.18
2015/0138127 A1 5/2015 Kurita
2015/0338949 A1 11/2015 Westerman
2015/0347987 A1* 12/2015 Ali .................... G06Q 10/1097 705/7.21
2015/0365306 A1 12/2015 Chaudhri et al.
2015/0370350 A1 12/2015 Hunt et al.
2019/0220109 A1 7/2019 Bernstein et al.

FOREIGN PATENT DOCUMENTS

CN 103164158 A 6/2013
CN 103870028 A 6/2014
CN 104298551 A 1/2015
CN 104423820 A 3/2015
CN 104487928 A 4/2015
CN 104487929 A 4/2015
CN 104679379 A 6/2015
EP 2 530 561 A2 12/2012
EP 2 778 864 A1 3/2013
EP 2 843 917 A1 3/2015
JP H11110119 A 4/1999
JP 2007-520005 A 7/2007
JP 2008-070994 A 3/2008
JP 2010-183447 A 8/2010
JP 2012018644 A 1/2012
JP 2013-232033 A 11/2013
JP 2014-153865 A 8/2014
JP 2015-064882 A 4/2015
JP 2015-088006 A 5/2015
KR 2010-0059343 A 6/2010
KR 2012-0092036 A 8/2012
KR 2014-0053554 A 5/2014
KR 2014-0124788 A 10/2014
KR 2015-0022527 A 3/2015
KR 2015-0026615 A 3/2015
WO WO 2013/169300 A1 11/2013
WO WO 2014/147724 A1 9/2014

OTHER PUBLICATIONS

Basu, “Samsung Launches Cross-Platform Instant Messaging Service ‘ChatON’,” http://www.androidpolice.com/2011/08-29/samsung-

(56) References Cited

OTHER PUBLICATIONS launches-cross-platform-instant-messaging-service-chaton/, Aug. 29, 2011, 5 pages.
Christopher W., "ScribMaster Draw and Paint—with Instant Messenger," http://www.androidpit.com/scribmaster-draw-and-paint, Oct. 8, 2013, 9 pages.
Color Hunter, Create and Find Color Palettes Made From Images, http://www.colorhunter.com, 2016, 3 pages.
CSS Drive, "Colors Pallete Generator,", http:www.cssdrive.com/imgaepalette/, 2011, 2 pages.
Eichner, "IOS Sensors & Core Motion," http://wwwbruegge.in.turn.de/lehrstuhl_1/home/98-teaching/tutorials/505-sgd-ws13-tutorial-core-motion, 2016, 12 pages.
Farley, "Make Swatches From Photos in Photoshop," http://www.sitepoint.com/make-swatches-from-photos-in-photoshop/, Nov. 30, 2009, 5 pages.
Google, "Loklok," http://loklok.co, 2015, 2 pages.
Hayakawa, Galaxy Note 3 Perfect Manual, vol. 1, Sotechsha Co. Ltd, Junichi Yanagisawa, May 12, 2015, 9 pages.
Lee et al., "PhantomPen: Virtualization of Pen Head for Digitial Drawing Free from Pen Occlusion & Visual Parallax," I Dea Lab, Department of Industrial Design, KAIST, Republic of Korea, Oct. 7-10, 2012, 10 pages.
Lee et al., "PhantomPen: Virtualization of Pen Head for Digitial Drawing Free from Pen Occlusion & Visual Parallax," YouTube video, Oct. 22, 2012, 2 pages.
ITunes Preview, "Draw Calendar-Fun Scheduling and Events," Fishington Studios, https://itunes.apple.com/us/app/calendoodle-pen-ink-whiteboard/id815370160?mt=8, 2014, 3 pages.
MailChimp Email Marketing, "Pictaculous, A Color Palette Generator," http://www.pictaculous.com, 2016, 1 page.
Millward, "LiiHo IM App: A New Way to Chat as You Draw Something and Doodle with Friends," http://www.techinasia.com/liiho-im-doodling-app/, Apr. 5, 2012, 6 pages.
Jain, "Samsung Galaxy Note 3 Neo Review: Hidden Goodness," https://www.mobigyaan.com/samsung-galaxy-not-3-neo-review-2, Apr. 17, 2014, 48 pages.
Kazmucha, "How to Send Someone a Sketch with Apple Works", https:/web.archive.org/web/20150525204929/http:ww.www.imore.com/how-send-some-sketch-apple-watch, May 7, 2015, 8 pages.
Notes Plus, "5th Anniversary," http://notesplusapp.com, Apr. 4, 2013, 7 pages.
Perez, "Five Amazing Color Palette Generators," http://readwrite.com/2008/08/01/five_amazing_color_palette_generators, Aug. 1, 2008, 3 pages.
Rudling, "Erik Rudling—Intreprenurand Consulltannt in Speling.," http://erikrudling.com/taking-digital-notes-notes-plus-ipad-app-review/, Jan. 6, 2015, 14 pages.
Seiji, et al., "Galaxy Note 3 Perfect Manual", vol. 1, Sotechsha Co. Ltd., Junichi, Yanagisawa, May 12, 2015, 9 pages.
Wikipedia, Calendar (application), https://en.wikipedia.org/wiki/Calendar_(application), Sep. 10, 2002, 5 pages.
Wikipedia, "Comparison of Instant Messaging Clients," http://en.wikipedia.org/wiki/Comparison_of_instant_messaging_clients, Mar. 1, 2016, 16 pages.
Windows, "Use A Pen to Draw, Write, or Highlight, Text on A Windows Tablet," https://support.office.com/en-us/article/Use-a-pen-to-draw-write-or-highlight-text-on-a-Windows-tablet-6d76c674-7f4b-414d-b67f-b3ffef6ccf53, 2016, 8 pages.
Notice of Allowance, dated Mar. 7, 2016, received in U.S. Appl. No. 14/860,320, 10 pages.
Office Action, dated Jul. 19, 2016, received in U.S. Appl. No. 14/860,320, 10 pages.
Notice of Allowance, dated Dec. 16, 2016, received in U.S. Appl. No. 14/860,320, 8 pages.
Office Action, dated Mar. 21, 2016, received in Danish Patent Application No. 2015 00580, which corresponds with U.S. Appl. No. 14/860,320, 11 pages.
Office Action, dated Oct. 6, 2016, received in Danish Patent Application No. 2015 00580, which corresponds with U.S. Appl. No. 14/860,320, 3 pages.
Office Action, dated Mar. 15, 2017, received in Danish Patent Application No. 2015 00580, which corresponds with U.S. Appl. No. 14/860,320, 2 pages.
Notice of Allowance, dated May 23, 2017, received in Danish Patent Application No. 201500580, which corresponds with U.S. Appl. No. 14/860,320, 2 pages.
Patent, dated Sep. 18, 2017, received in Danish Patent Application No. 201500580, which corresponds with U.S. Appl. No. 14/860,320, 4 pages.
Office Action, dated Oct. 19, 2016, received in U.S. Appl. No. 14/862,073, 13 pages.
Notice of Allowance, dated Mar. 6, 2017, received in U.S. Appl. No. 14/862,073, 10 pages.
Office Action, dated Aug. 31, 2018, received in Australian Patent Application No. 2016276031, which corresponds with U.S. Appl. No. 14/862,073, 3 pages.
Office Action, dated Sep. 19, 2018, received in Australian Patent Application NO. 2016276031, which corresponds with U.S. Appl. No. 14/862,073, 3 pages.
Certificate of Grant, dated Jan. 17, 2019, received in Australian Patent Application NO. 2016276031, which corresponds with U.S. Appl. No. 14/862,073, 4 pages.
Office Action, dated Aug. 22, 2019, received in Australian Patent Application No. 2019200030, which corresponds with U.S. Appl. No. 14/862,073, 7 pages.
Office Action, dated Dec. 12, 2019, received in Chinese Patent Application No. 201680029960.8, which corresponds with U.S. Appl. No. 14/862,073, 6 pages.
Notice of Allowance, dated Feb. 26, 2020, received in Chinese Patent Application No. 201680029960.8, which corresponds with U.S. Appl. No. 14/862,073, 3 pages.
Office Action, dated May 8, 2019, received in European Patent Application No. 16727905.8, which corresponds with U.S. Appl. No. 14/862,073, 8 pages.
Office Action, dated Feb. 26, 2020, received in European Patent Application No. 16727905.8, which corresponds with U.S. Appl. No. 14/862,073, 5 pages.
Office Action, dated Nov. 6, 2018, received in Japanese Patent Application No. 2017-561374, which corresponds with U.S. Appl. No. 14/862,073, 8 pages.
Office Action, dated Apr. 9, 2019, received in Japanese Patent Application No. 2017-561374, which corresponds with U.S. Appl. No. 14/862,073, 6 pages.
Notice of Allowance, dated Sep. 20, 2019, received in Japanese Patent Application No. 2017-561374, which corresponds with U.S. Appl. No. 14/862,073, 5 pages.
Patent, dated Oct. 18, 2019, received in Japanese Patent Application No. 2017-561374, which corresponds with U.S. Appl. No. 14/862,073, 3 pages.
Office Action, dated Jan. 2, 2019, received in Korean Patent Application No. 2017-7033826, which corresponds with U.S. Appl. No. 14/862,073, 8 pages.
Notice of Allowance, dated Jul. 9, 2019, received in Korean Patent Application No. 2017-7033826, which corresponds with U.S. Appl. No. 14/862,073, 4 pages.
Patent, dated Sep. 3, 2019, received in Korean Patent Application No. 2017-7033826, which corresponds with U.S. Appl. No. 14/862,073, 4 pages.
Office Action, dated Sep. 16, 2019, received in Korean Patent Application No. 2019-7025716, which corresponds with U.S. Appl. No. 14/862,073, 4 pages.
Patent, dated Dec. 10, 2019, received in Korean Patent Application No. 2019-7025716, which corresponds with U.S. Appl. No. 14/862,073, 4 pages.
Office Action, dated Jan. 15, 2020, received in Korean Patent Application No. 2019-7036353, which corresponds with U.S. Appl. No. 14/862,073, 3 pages.
Office Action, dated Jun. 22, 2016, received in U.S. Appl. No. 14/862,080, 13 pages.

(56) References Cited

OTHER PUBLICATIONS

Notice of Allowance, dated Dec. 27, 2016, received in U.S. Appl. No. 14/862,080, 9 pages.
Office Action, dated Mar. 19, 2018, received in U.S. Appl. No. 14/862,085, 12 pages.
Final Office Action, dated Sep. 10, 2018, received in U.S. Appl. No. 14/862,085, 14 pages.
Notice of Allowance, dated Jan. 9, 2019, received in U.S. Appl. No. 14/862,085, 8 pages.
Notice of Allowance, dated Apr. 23, 2019, received in U.S. Appl. No. 14/862,085, 5 pages.
Office Action, dated Aug. 21, 2019, received in U.S. Appl. No. 16/359,906, 11 pages.
Notice of Allowance, dated Jan. 6, 2020, received in U.S. Appl. No. 16/359,906, 8 pages.
Notice of Allowance, dated Feb. 20, 2020, received in U.S. Appl. No. 16/359,906, 8 pages.
Notice of Allowance, dated Mar. 26, 2020, received in U.S. Appl. No. 16/359,906, 9 pages.
International Search Report and Written Opinion, dated Oct. 4, 2016, received in International Patent Application No. PCT/US2016/033588, which corresponds with U.S. Appl. No. 14/860,320, 21 pages.
Notice of Acceptance, dated Apr. 20, 2020, received in Australian Patent Application No. 2019200030, which corresponds with U.S. Appl. No. 14/862,073, 3 pages.
Patent, dated May 5, 2020, received in Chinese Patent Application No. 201680029960.8, which corresponds with U.S. Appl. No. 14/862,073, 6 pages.
Certificate of Grant, dated Aug. 20, 2020, received in Australian Patent Application No. 2019200030, which corresponds with U.S. Appl. No. 14/862,073, 4 pages.
Office Action, dated Dec. 2, 2020, received in Australia Patent Application No. 2020203817, which corresponds with U.S. Appl. No. 14/862,073, 4 pages.
Office Action, dated Jul. 6, 2020, received in Japanese Patent Application No. 2019-138036, which corresponds with U.S. Appl. No. 14/862,073, 6 pages.
Notice of Allowance, dated Jan. 12, 2021, received in Japanese Patent Application No. 2019-138036, which corresponds with U.S. Appl. No. 14/862,073, 5 pages.
Patent, dated Feb. 25, 2021, received in Japanese Patent Application No. 2019-138036, which corresponds with U.S. Appl. No. 14/862,073, 3 pages.
Notice of Allowance, dated September 4, received in Korean Patent Application No. 2019-7036353, which corresponds with U.S. Appl. No. 14/862,073, 3 pages.
Patent, dated Dec. 1, 2020, received in Korean Patent Application No. 2019-7036353, which corresponds with U.S. Appl. No. 14/862,073, 6 pages.
Office Action, dated Jan. 11, 2021, received in Korean Patent Application No. 2020-7034598, which corresponds with U.S. Appl. No. 14/862,073, 4 pages.
Patent, dated Mar. 10, 2022, received in Australia Patent Application No. 2020203817, which corresponds with U.S. Appl. No. 14/862,073, 3 pages.
Office Action, dated Mar. 18, 2022, received in Japanese Patent Application No. 2021-015997, which corresponds with U.S. Appl. No. 14/862,073, 2 pages.
Patent, dated Jan. 19, 2022, received in Korean Patent Application No. 2020-7034598, which corresponds with U.S. Appl. No. 14/862,073, 5 pages.
Notice of Allowance, dated Mar. 18, 2022, received in 2022-7001983, which corresponds with U.S. Appl. No. 14/862,073, 2 pages.
Patent, dated May 24, 2022, received in 2022-7001983, which corresponds with U.S. Appl. No. 14/862,073, 5 pages.
Office Action, dated Nov. 8, 2021, received in Australia Patent Application No. 2020203817, which corresponds with U.S. Appl. No. 14/862,073, 3 pages.
Notice of Allowance, dated Sep. 23, 2021, received in Chinese Patent Application No. 202010187432.3, which corresponds with U.S. Appl. No. 14/862,073, 1 page.
Patent, dated Oct. 29, 2021, received in Chinese Patent Application No. 202010187432.3, which corresponds with U.S. Appl. No. 14/862,073, 6 pages.
Notice of Allowance, dated Oct. 21, 2021, received in Korean Patent Application No. 2020-7034598, which corresponds with U.S. Appl. No. 14/862,073, 2 pages.
Office Action, dated Nov. 25, 2022, received in Australian Patent Application No. 2022200268, which corresponds with U.S. Appl. No. 14/862,073, 3 pages.
Office Action, dated Dec. 13, 2022, received in Chinese Patent Application No. 202010193374.5, which corresponds with U.S. Appl. No. 14/862,073, 5 pages.
Office Action, dated Jan. 5, 2023, received in Chinese Patent Application NO. 202010175812.5, which corresponds with U.S. Appl. No. 14/862,073, 8 pages.
Notice of Allowance, dated Sep. 30, 2022, received in Japanese Patent Application No. 2021-015997, which corresponds with U.S. Appl. No. 14/862,073, 1 page.
Patent, dated Oct. 25, 2022, received in Japanese Patent Application No. 2021-015997, which corresponds with U.S. Appl. No. 14/862,073, 3 pages.
Office Action, dated Jan. 11, 2023, received in Chinese Patent Application No. 202010192663.3, which corresponds with U.S. Appl. No. 14/862,080, 5 pages.
Notice of Allowance, dated Dec. 23, 2022, received in Korean Patent Application No. 2022-7017403, which corresponds with U.S. Appl. No. 14/862,080.
Office Action, dated May 18, 2023, received in Korean Patent Application No. 2023-7010049, which corresponds with U.S. Appl. No. 14/862,073, 5 pages.
Notice of Allowance, dated May 22, 2023, received in Chinese Patent Application NO. 202010192663.3, which corresponds with U.S. Appl. No. 14/862,080, 1 page.
Patent, dated Mar. 23, 2023, received in Korean Patent Application No. 2022-7017403, which corresponds with U.S. Appl. No. 14/862,080, 5 pages.
Patent, dated Apr. 18, 2023, received in Chinese Patent Application No. 202010192575.3, which corresponds with U.S. Appl. No. 16/359,906, 6 pages.
Notice of Allowance, dated Aug. 22, 2023, received in Australian Patent Application No. 2022200268, which corresponds with U.S. Appl. No. 14/862,073, 3 pages.
Notice of Allowance, dated Jul. 24, 2023, received in Chinese Patent Application No. 202010193374.5, which corresponds with U.S. Appl. No. 14/862,073, 2 pages.
Patent, dated Sep. 5, 2023, received in Chinese Patent Application No. 202010193374.5, which corresponds with U.S. Appl. No. 14/862,073, 7 pages.
Office Action, dated Aug. 17, 2023, received in Chinese Patent Application No. 202010175812.5, which corresponds with U.S. Appl. No. 14/862,073, 4 pages.

* cited by examiner

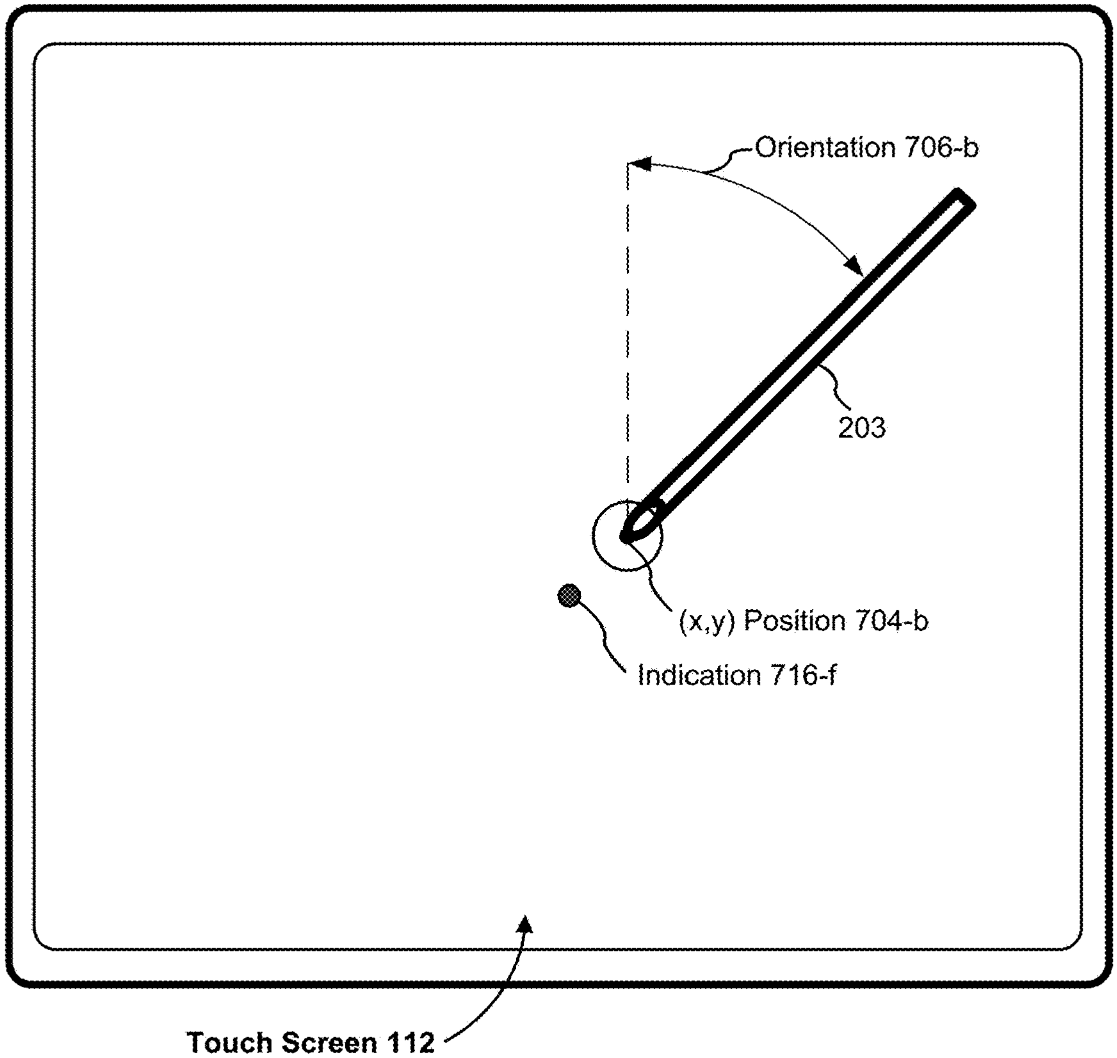
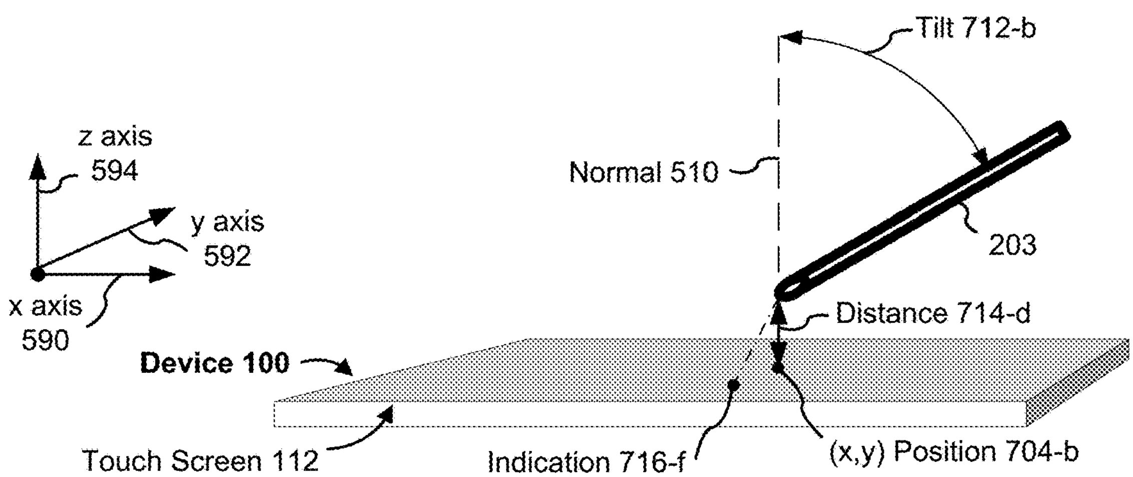
Figure 7F

Figure 8A:
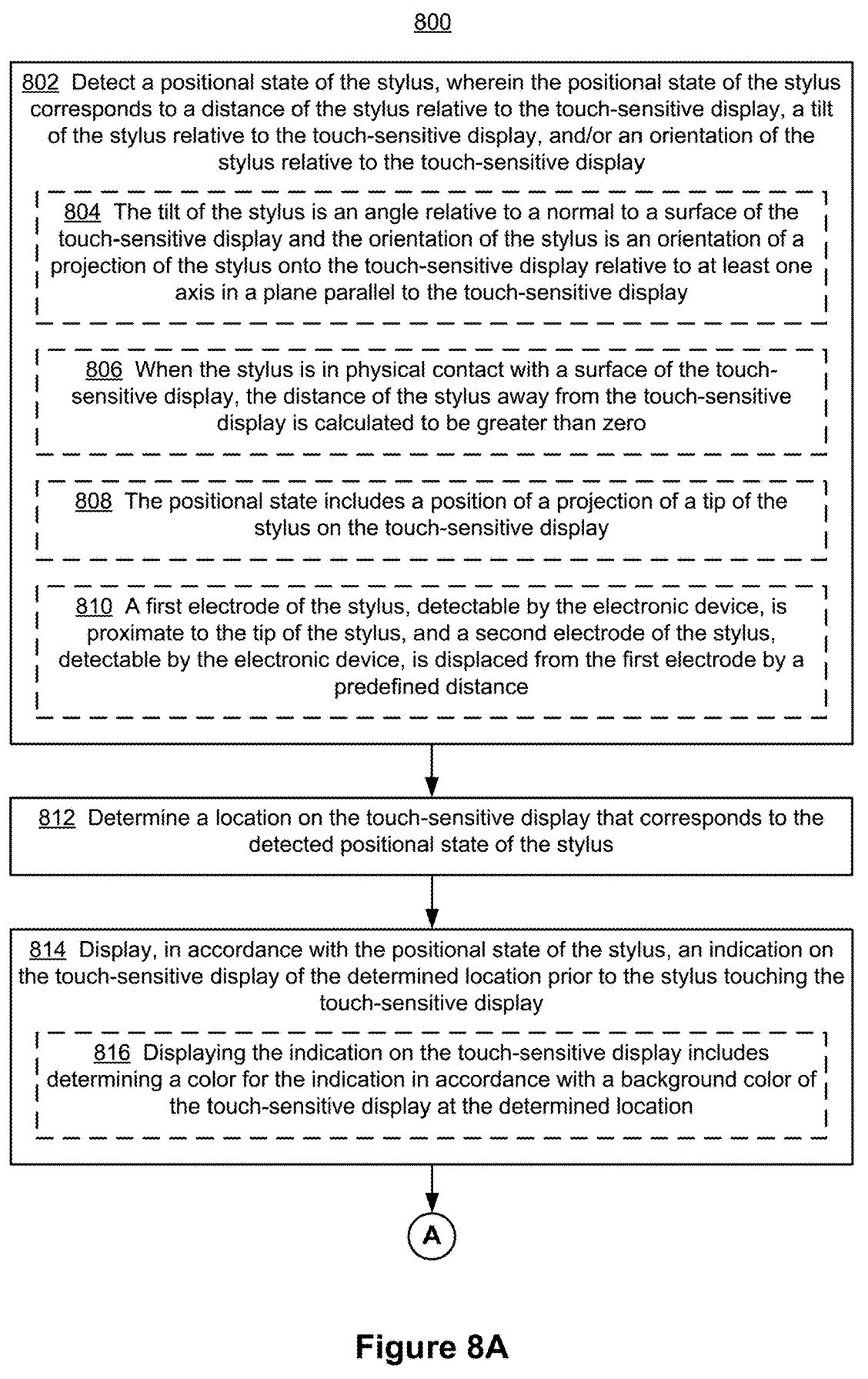

800

802 Detect a positional state of the stylus, wherein the positional state of the stylus corresponds to a distance of the stylus relative to the touch-sensitive display, a tilt of the stylus relative to the touch-sensitive display, and/or an orientation of the stylus relative to the touch-sensitive display 804 The tilt of the stylus is an angle relative to a normal to a surface of the touch-sensitive display and the orientation of the stylus is an orientation of a projection of the stylus onto the touch-sensitive display relative to at least one axis in a plane parallel to the touch-sensitive display 806 When the stylus is in physical contact with a surface of the touch-sensitive display, the distance of the stylus away from the touch-sensitive display is calculated to be greater than zero 808 The positional state includes a position of a projection of a tip of the stylus on the touch-sensitive display 810 A first electrode of the stylus, detectable by the electronic device, is proximate to the tip of the stylus, and a second electrode of the stylus, detectable by the electronic device, is displaced from the first electrode by a predefined distance 812 Determine a location on the touch-sensitive display that corresponds to the detected positional state of the stylus 814 Display, in accordance with the positional state of the stylus, an indication on the touch-sensitive display of the determined location prior to the stylus touching the touch-sensitive display 816 Displaying the indication on the touch-sensitive display includes determining a color for the indication in accordance with a background color of the touch-sensitive display at the determined location

Figure 8B:
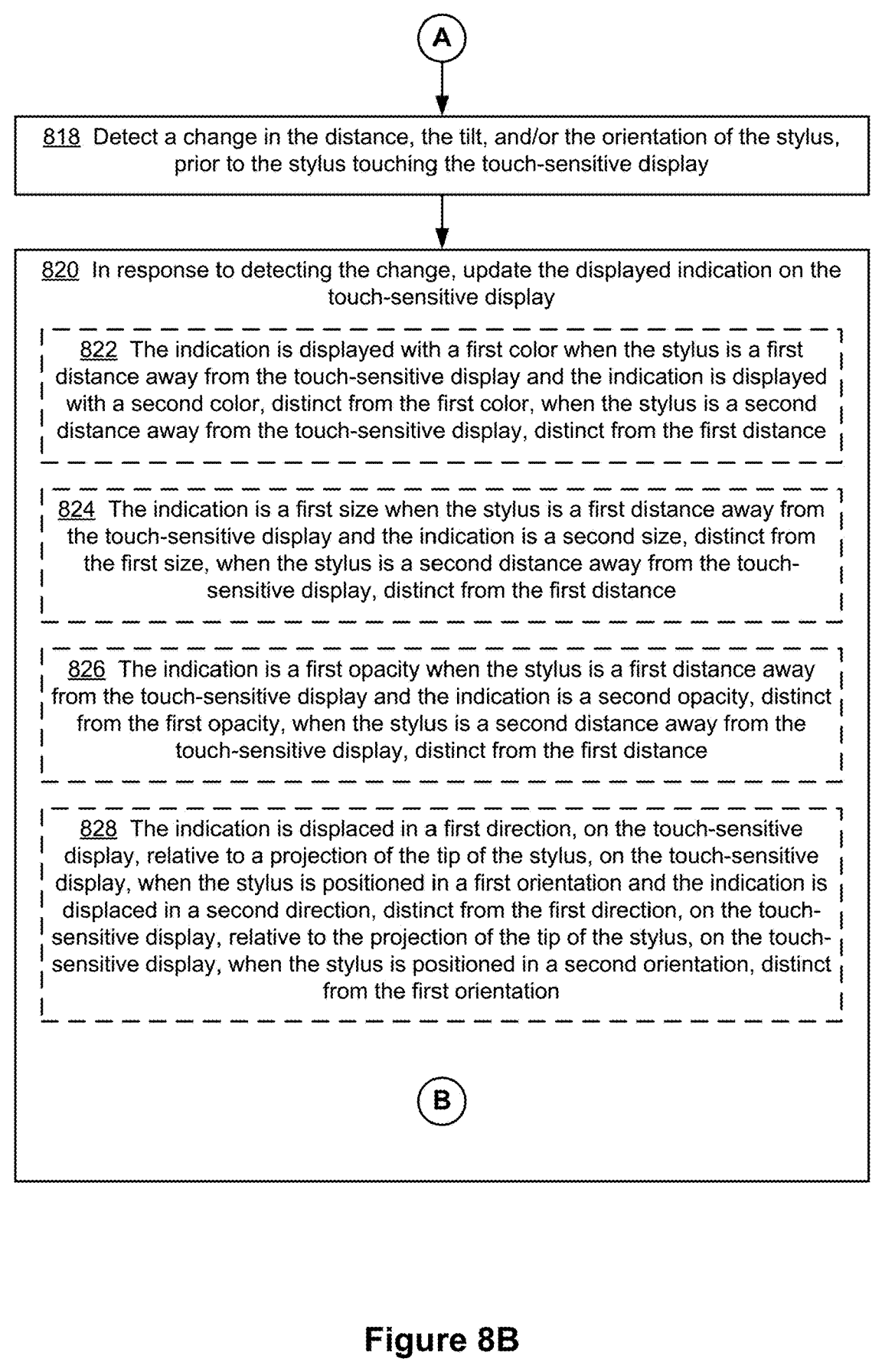

818 Detect a change in the distance, the tilt, and/or the orientation of the stylus, prior to the stylus touching the touch-sensitive display 820 In response to detecting the change, update the displayed indication on the touch-sensitive display 822 The indication is displayed with a first color when the stylus is a first distance away from the touch-sensitive display and the indication is displayed with a second color, distinct from the first color, when the stylus is a second distance away from the touch-sensitive display, distinct from the first distance 824 The indication is a first size when the stylus is a first distance away from the touch-sensitive display and the indication is a second size, distinct from the first size, when the stylus is a second distance away from the touch-sensitive display, distinct from the first distance 826 The indication is a first opacity when the stylus is a first distance away from the touch-sensitive display and the indication is a second opacity, distinct from the first opacity, when the stylus is a second distance away from the touch-sensitive display, distinct from the first distance 828 The indication is displaced in a first direction, on the touch-sensitive display, relative to a projection of the tip of the stylus, on the touch-sensitive display, when the stylus is positioned in a first orientation and the indication is displaced in a second direction, distinct from the first direction, on the touch-sensitive display, relative to the projection of the tip of the stylus, on the touch-sensitive display, when the stylus is positioned in a second orientation, distinct from the first orientation

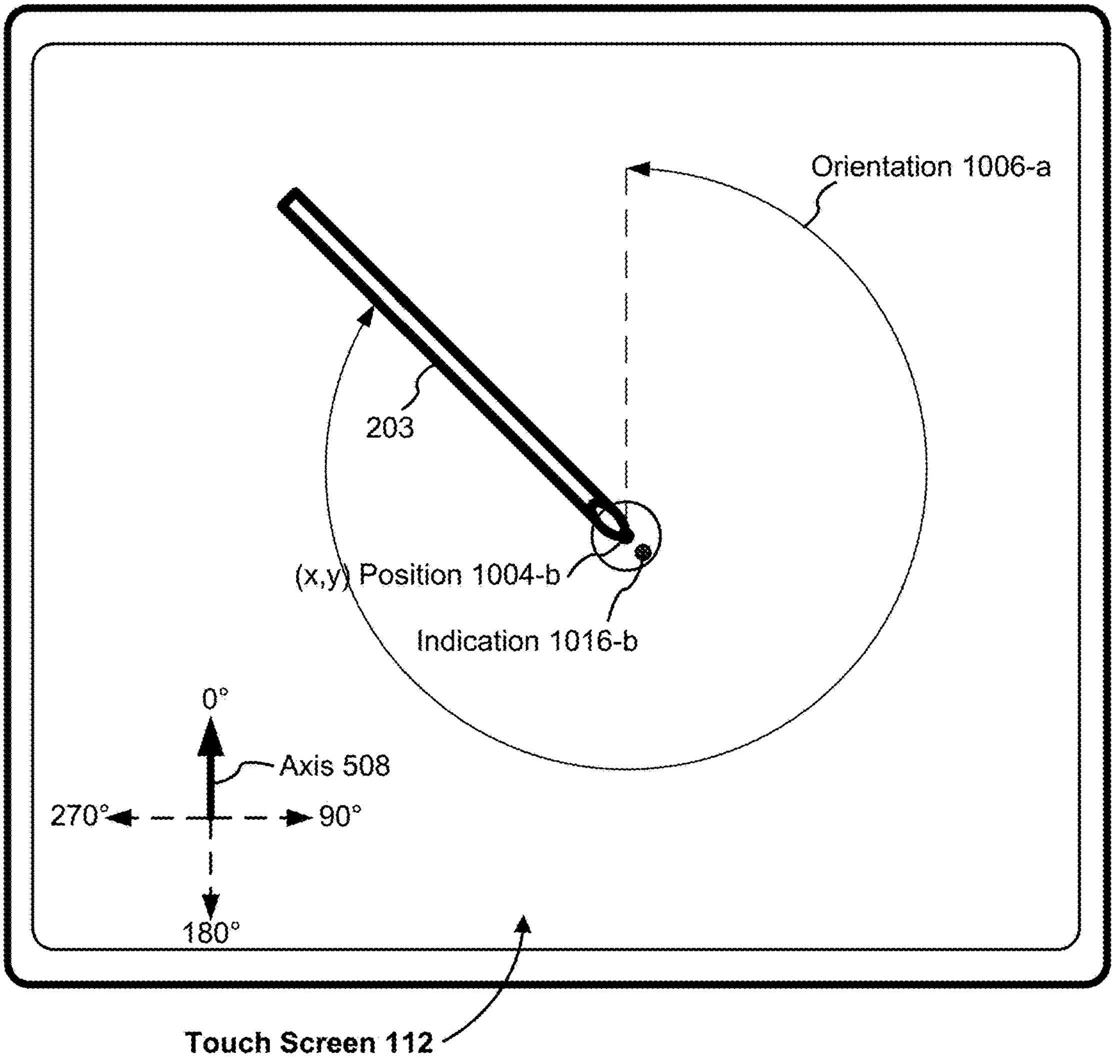
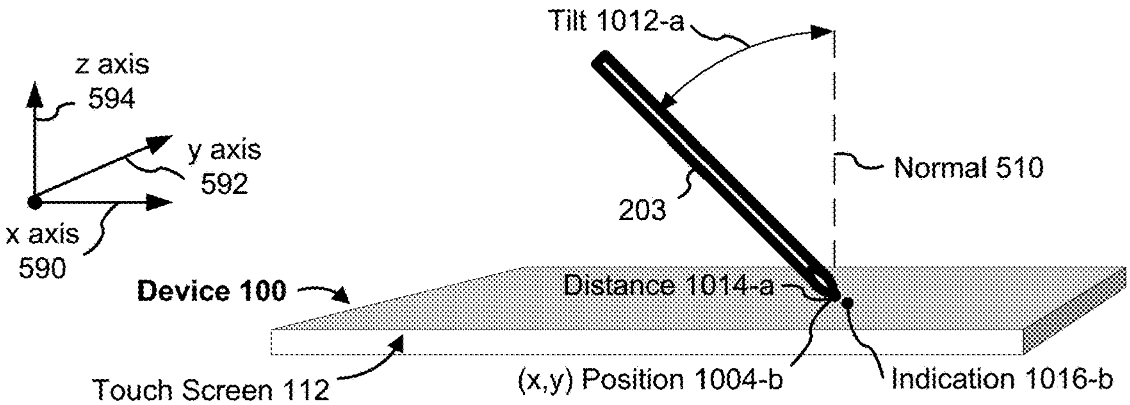
Figure 10B

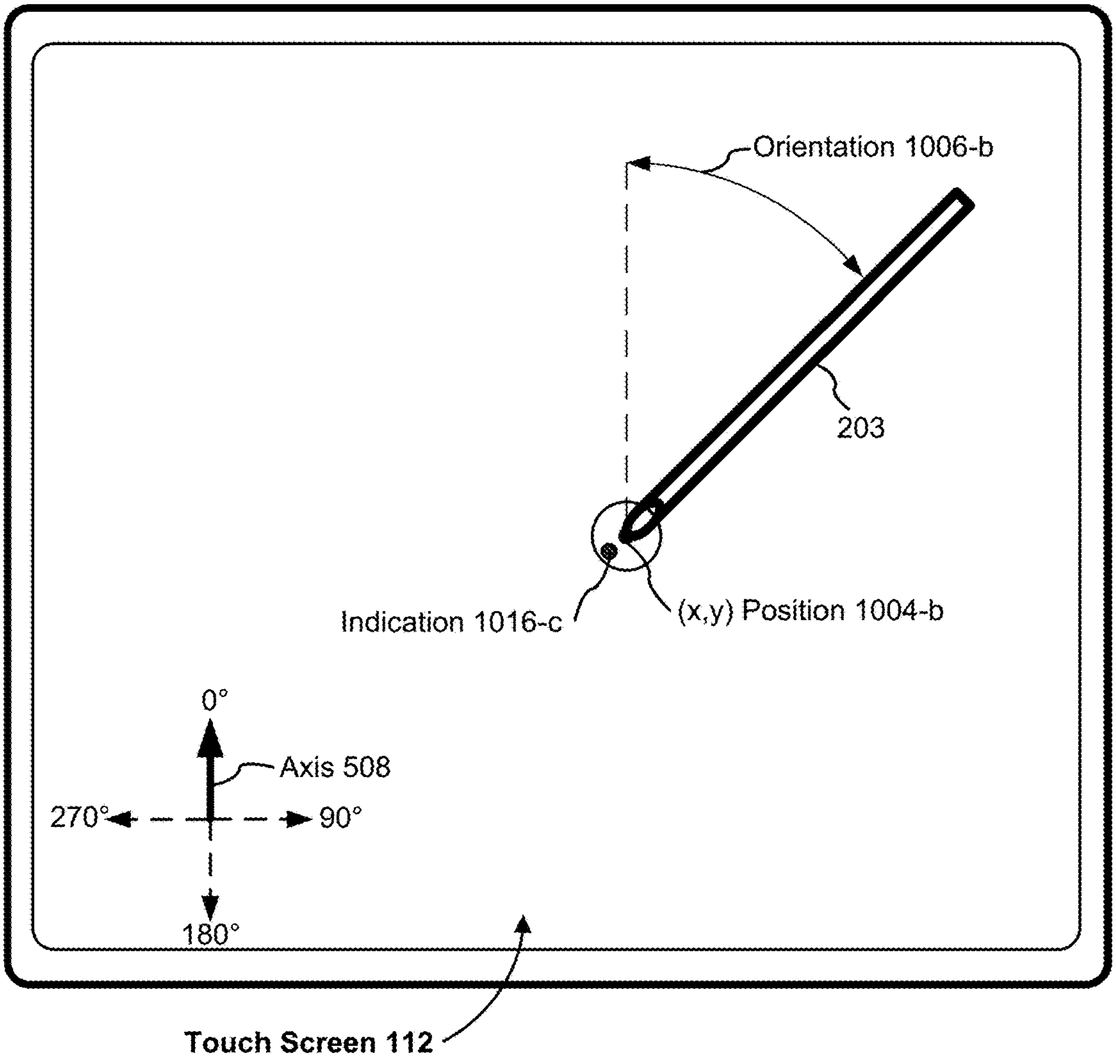
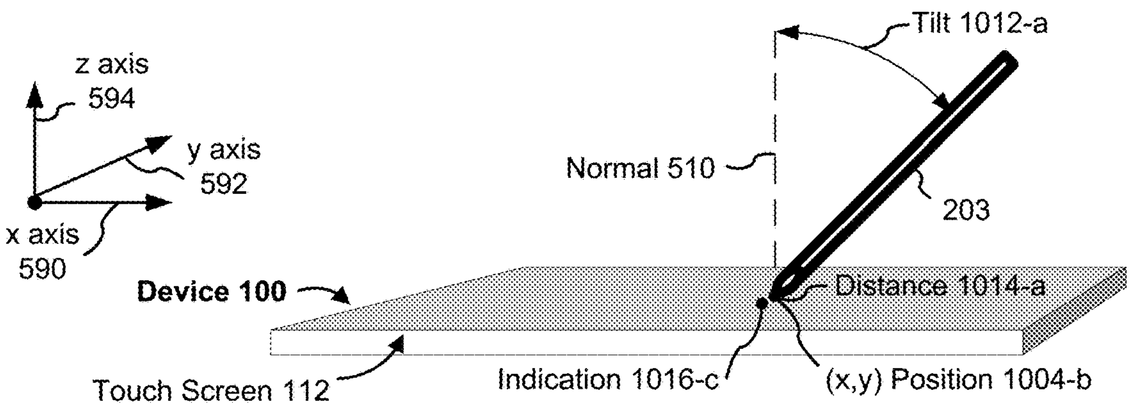
Figure 10C

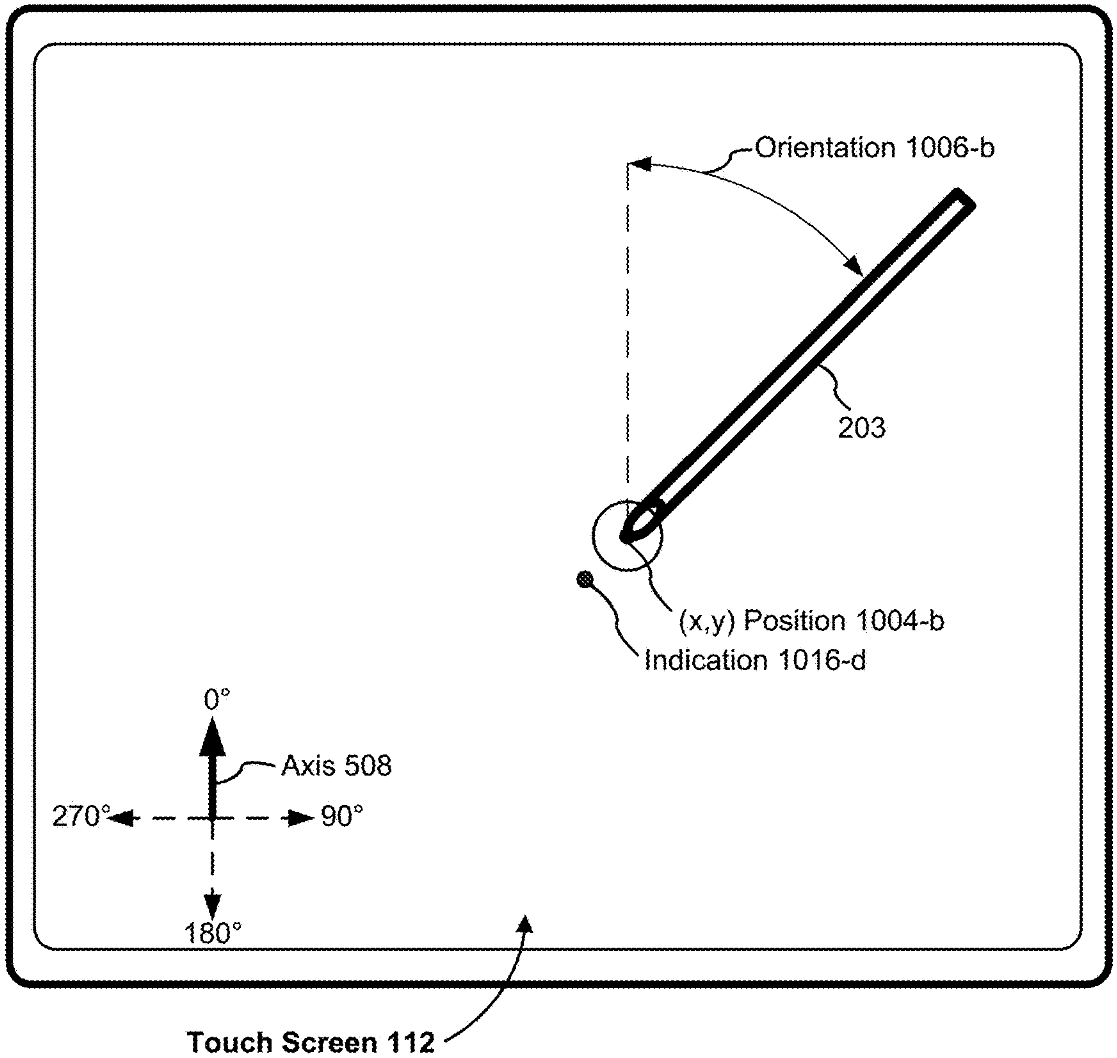
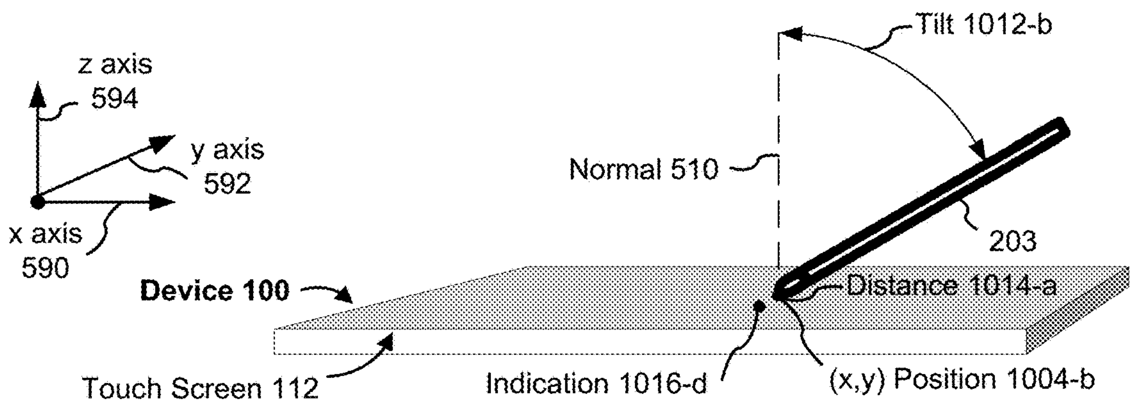
Figure 10D

Figure 11C:
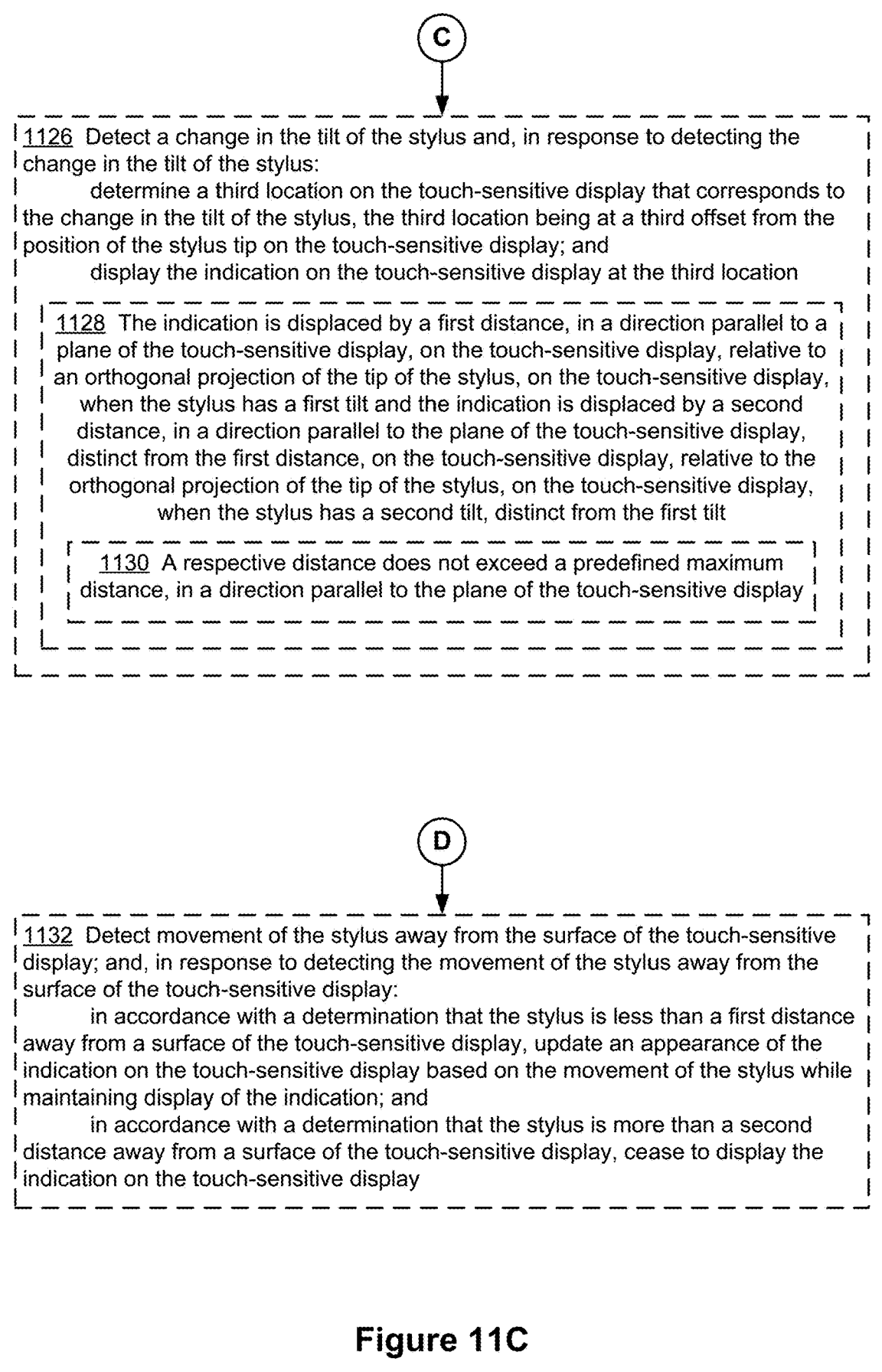

(C)

1126 Detect a change in the tilt of the stylus and, in response to detecting the change in the tilt of the stylus:

determine a third location on the touch-sensitive display that corresponds to the change in the tilt of the stylus, the third location being at a third offset from the position of the stylus tip on the touch-sensitive display; and display the indication on the touch-sensitive display at the third location 1128 The indication is displaced by a first distance, in a direction parallel to a plane of the touch-sensitive display, on the touch-sensitive display, relative to an orthogonal projection of the tip of the stylus, on the touch-sensitive display, when the stylus has a first tilt and the indication is displaced by a second distance, in a direction parallel to the plane of the touch-sensitive display, distinct from the first distance, on the touch-sensitive display, relative to the orthogonal projection of the tip of the stylus, on the touch-sensitive display, when the stylus has a second tilt, distinct from the first tilt 1130 A respective distance does not exceed a predefined maximum distance, in a direction parallel to the plane of the touch-sensitive display (D)

1132 Detect movement of the stylus away from the surface of the touch-sensitive display; and, in response to detecting the movement of the stylus away from the surface of the touch-sensitive display:

in accordance with a determination that the stylus is less than a first distance away from a surface of the touch-sensitive display, update an appearance of the indication on the touch-sensitive display based on the movement of the stylus while maintaining display of the indication; and in accordance with a determination that the stylus is more than a second distance away from a surface of the touch-sensitive display, cease to display the indication on the touch-sensitive display

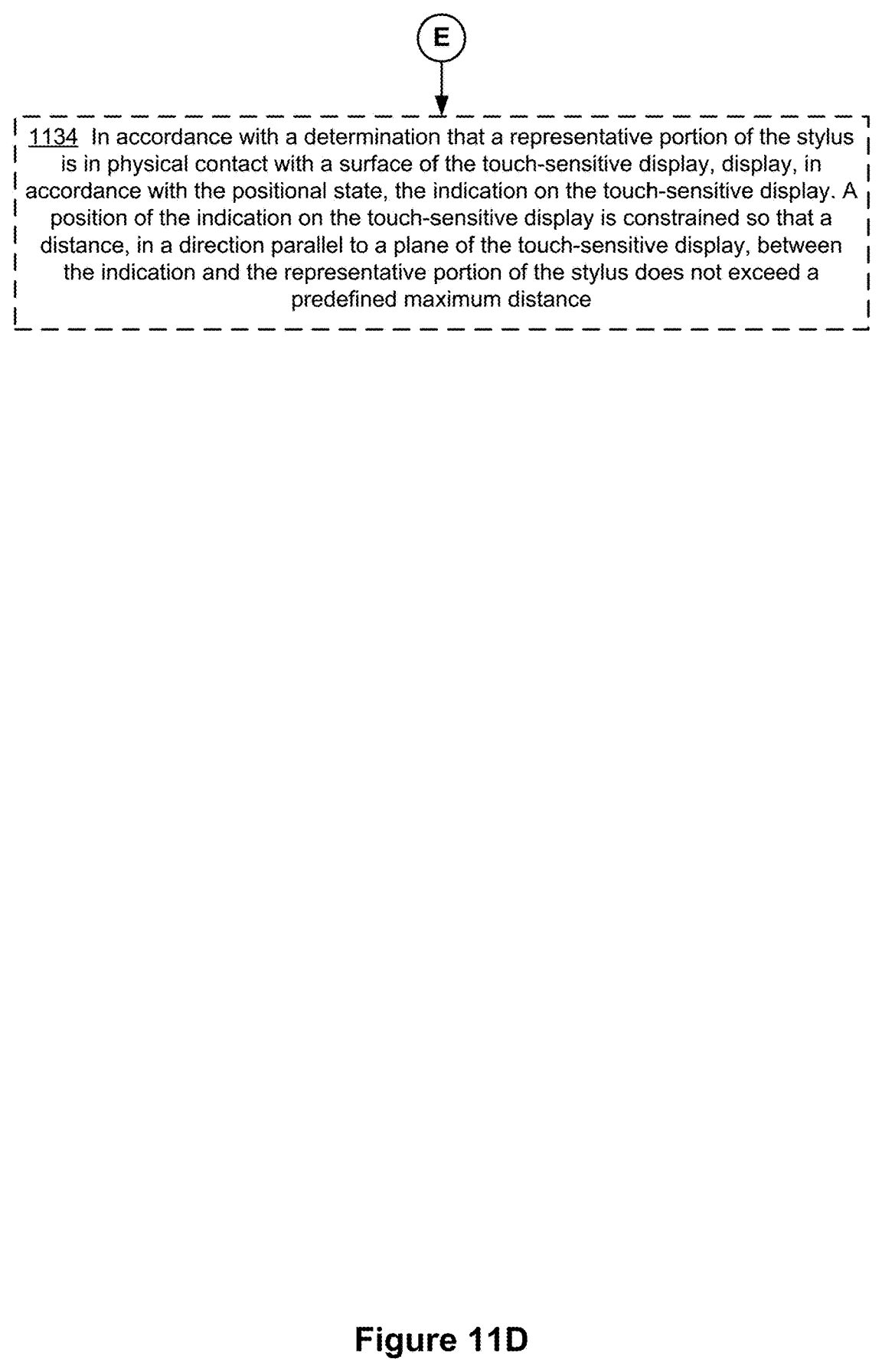

1134 In accordance with a determination that a representative portion of the stylus is in physical contact with a surface of the touch-sensitive display, display, in accordance with the positional state, the indication on the touch-sensitive display. A position of the indication on the touch-sensitive display is constrained so that a distance, in a direction parallel to a plane of the touch-sensitive display, between the indication and the representative portion of the stylus does not exceed a predefined maximum distance

Figure 11D

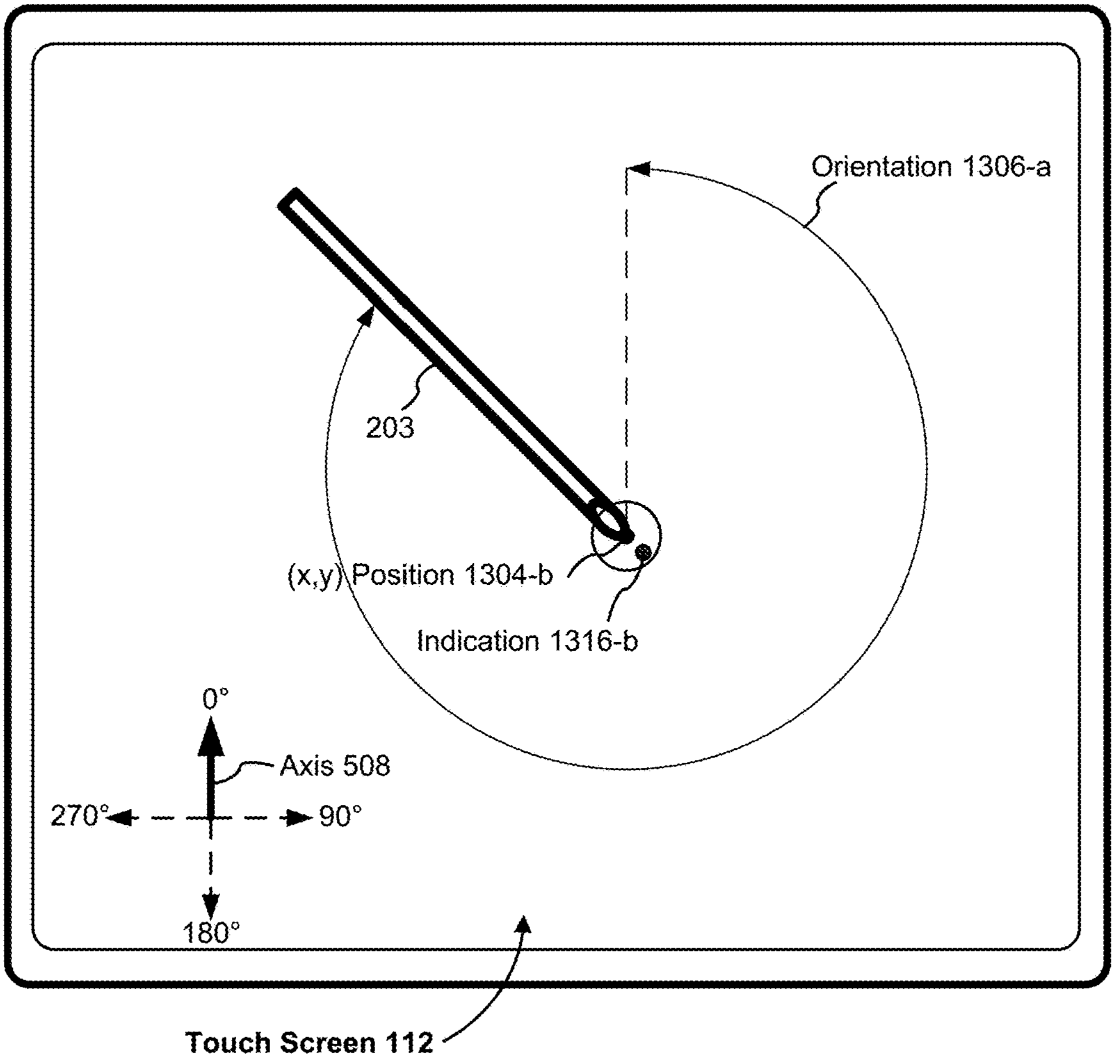
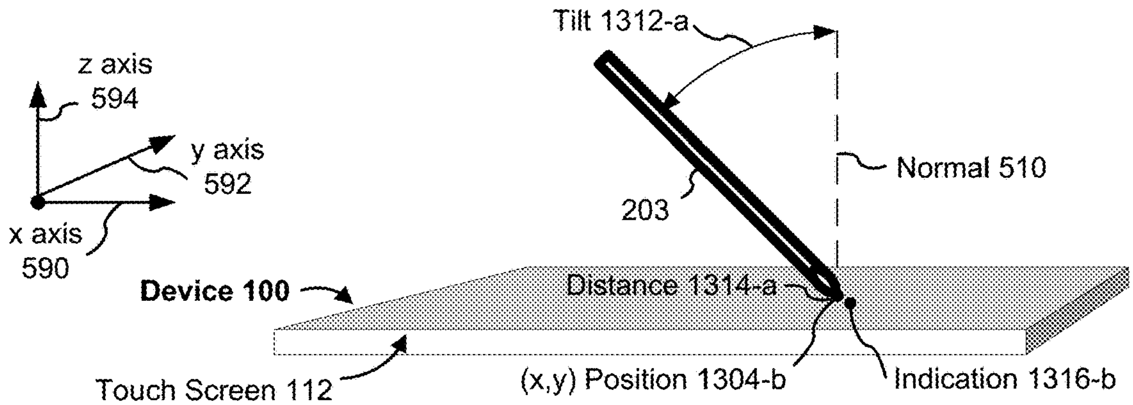
Figure 13B

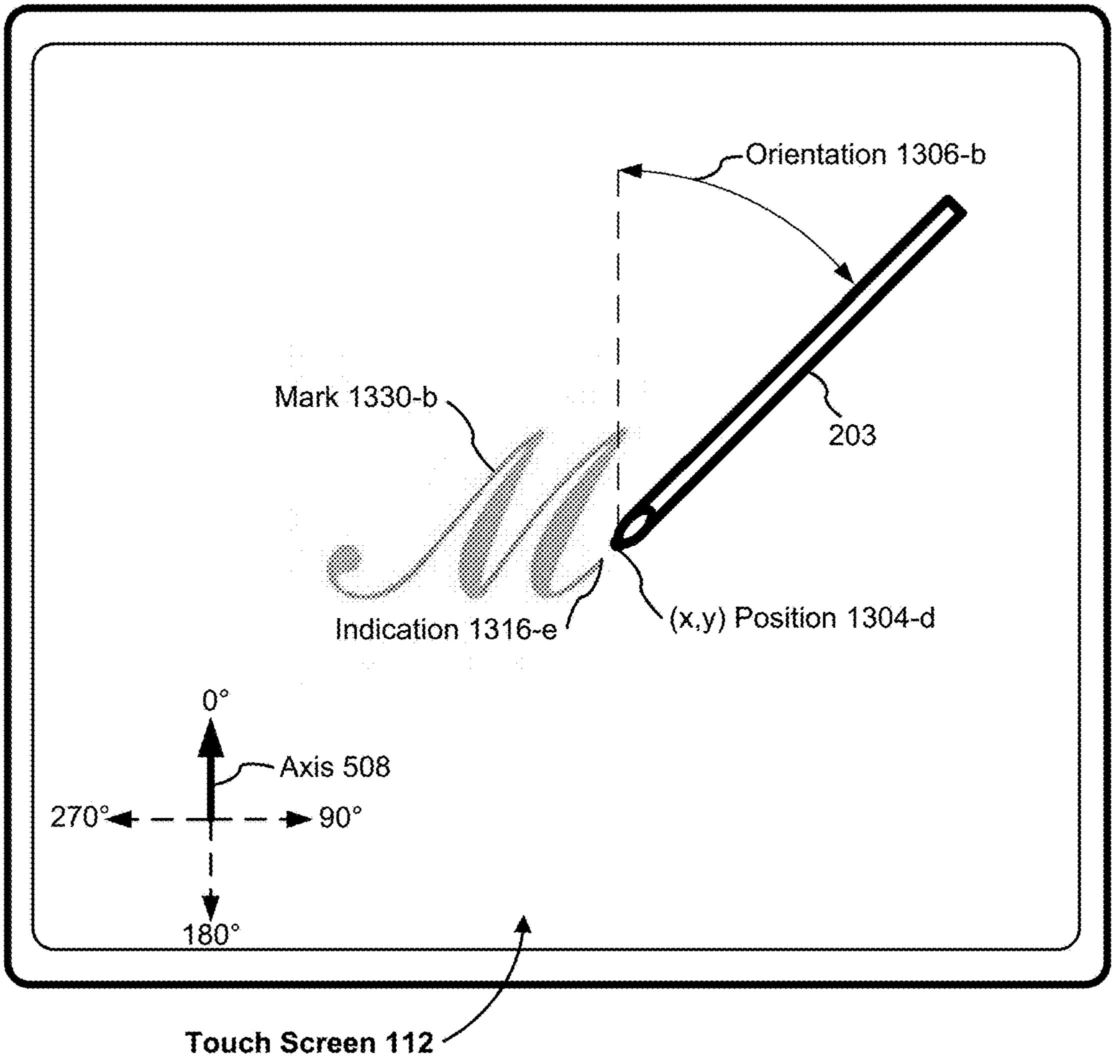
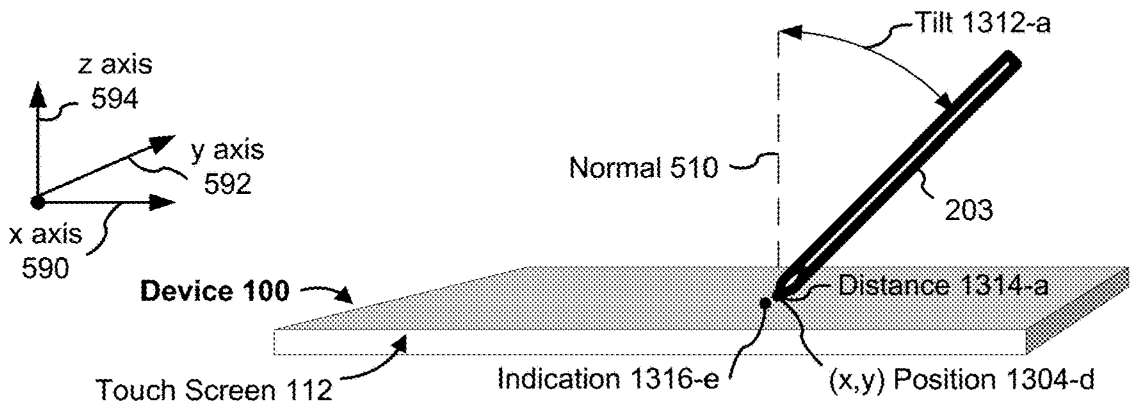
Figure 13E

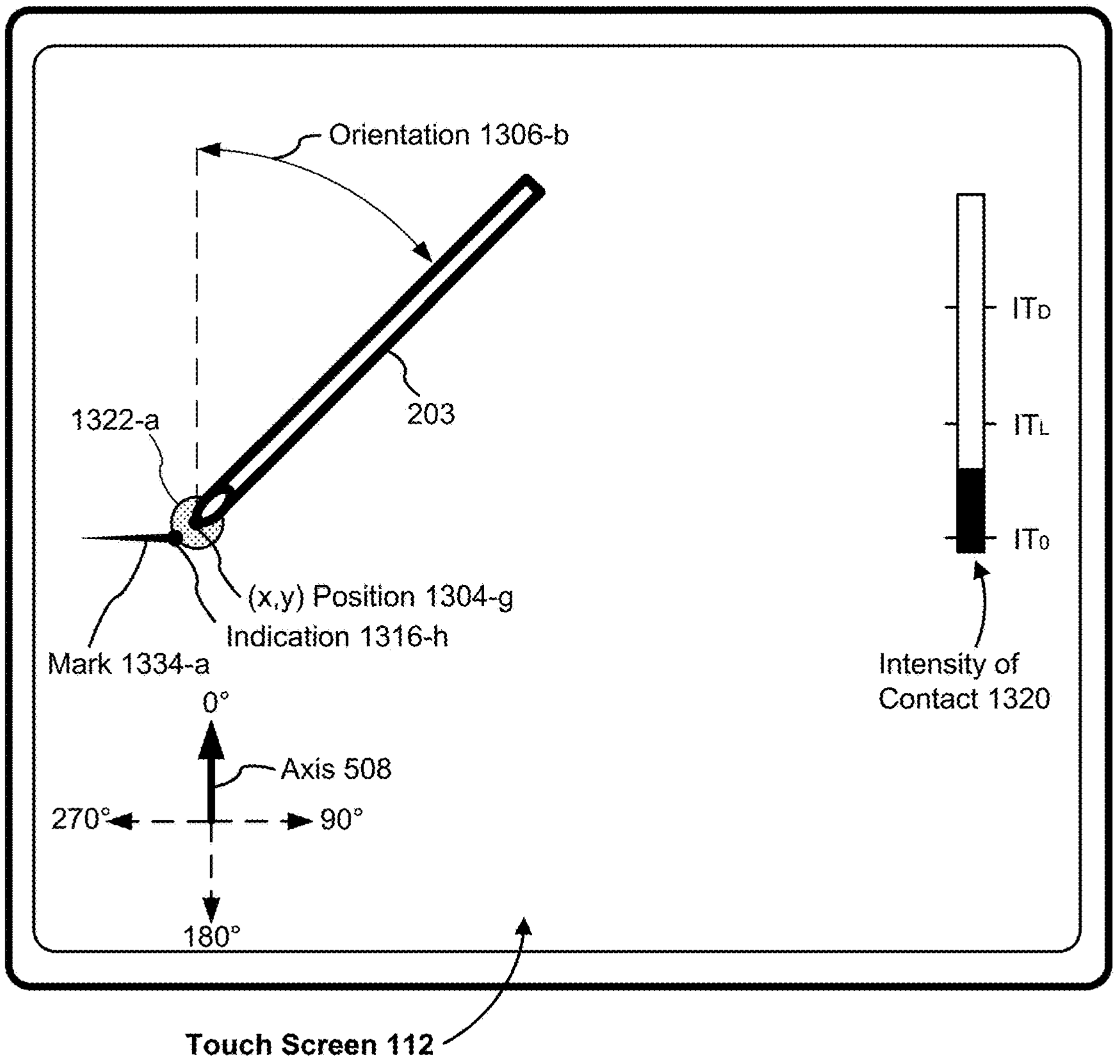
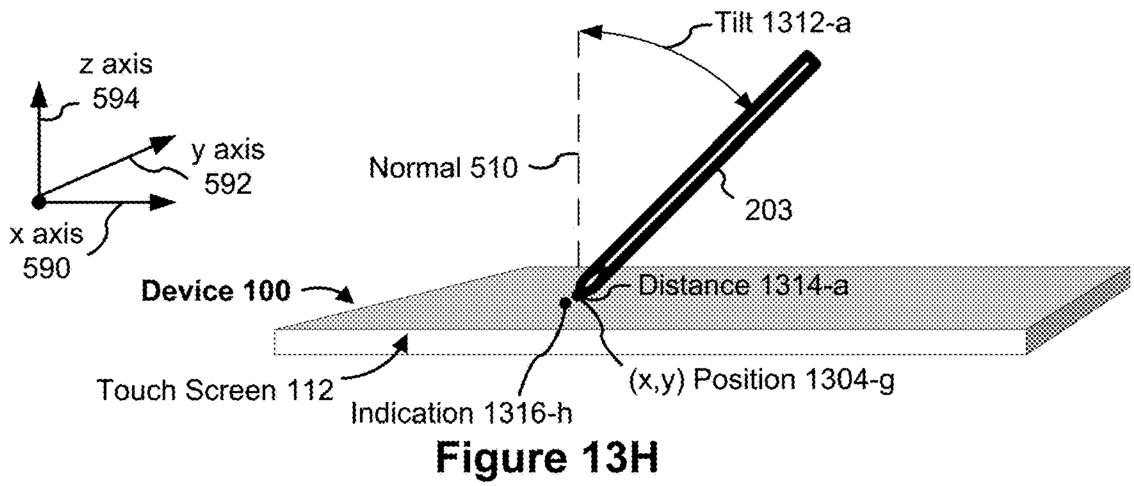
Figure 13H

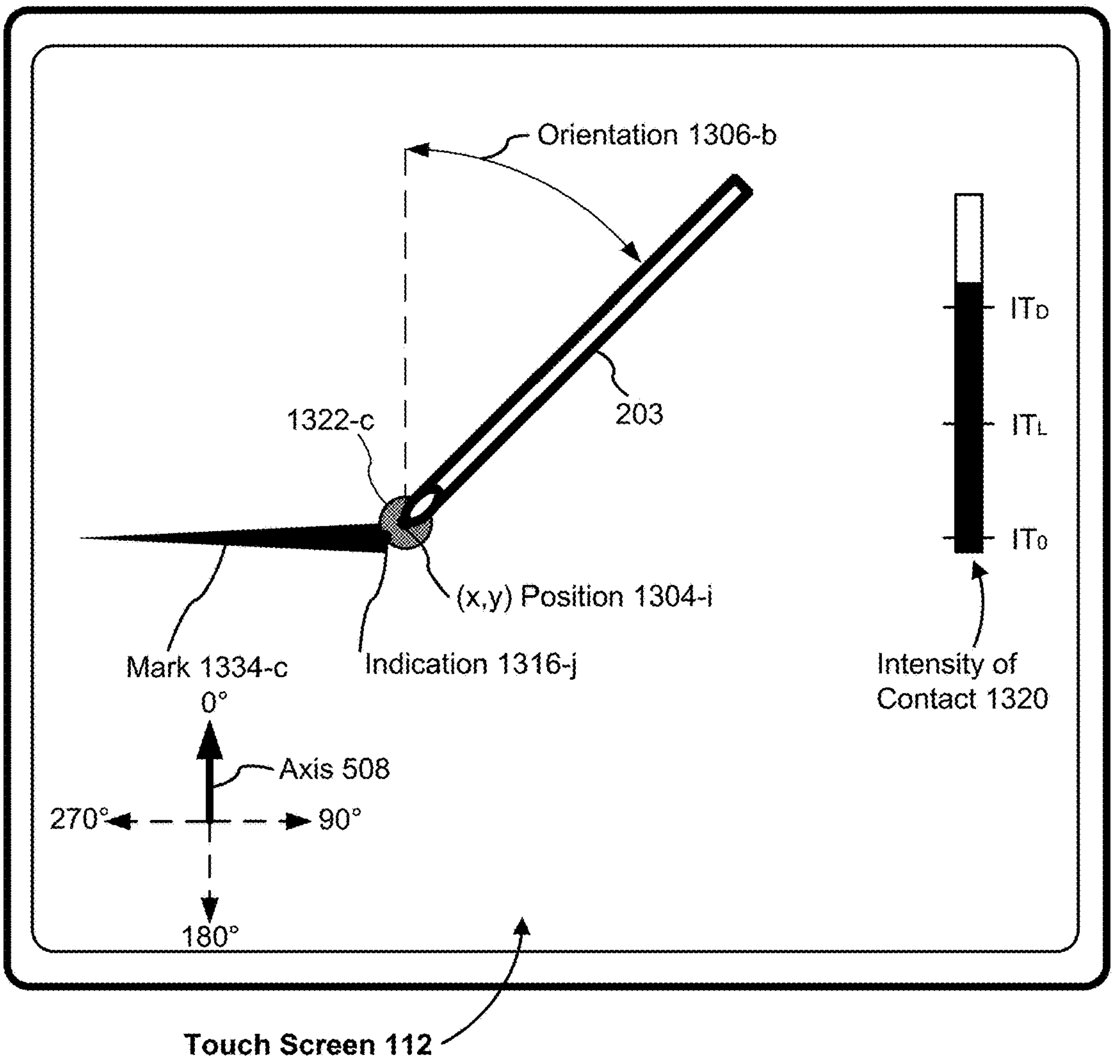
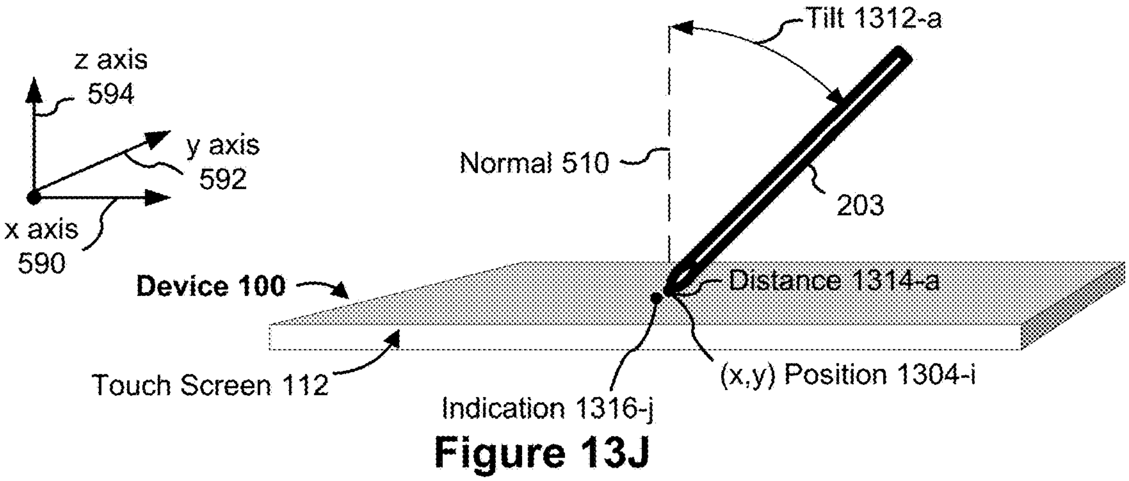
Figure 13J

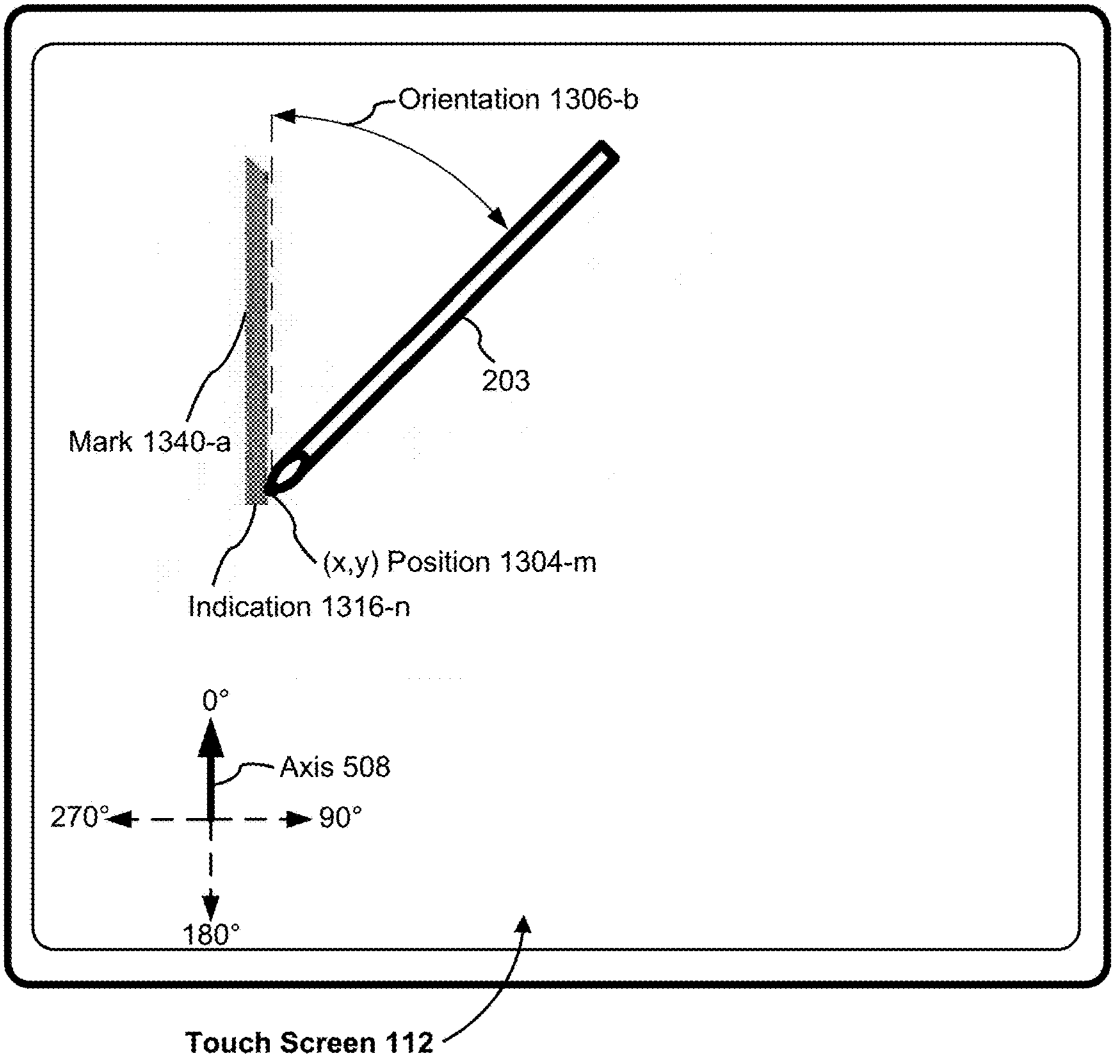
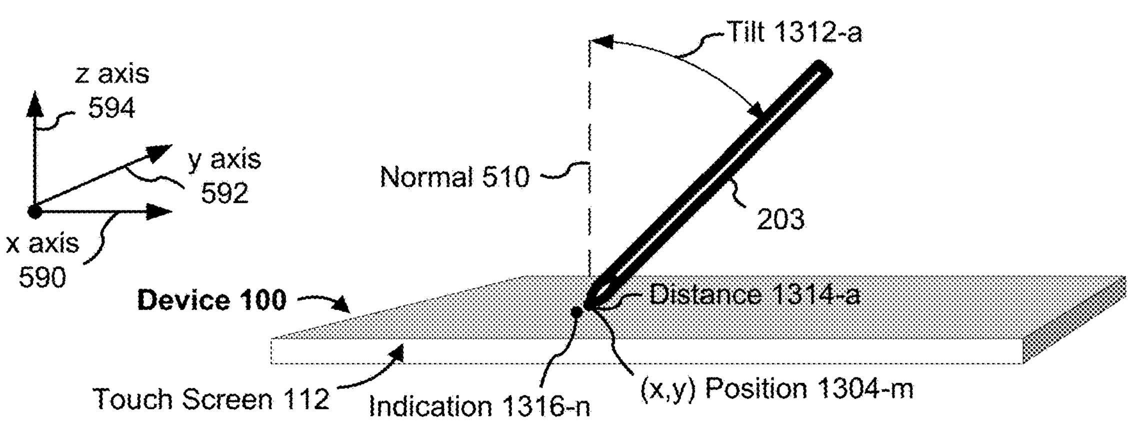
Figure 13N

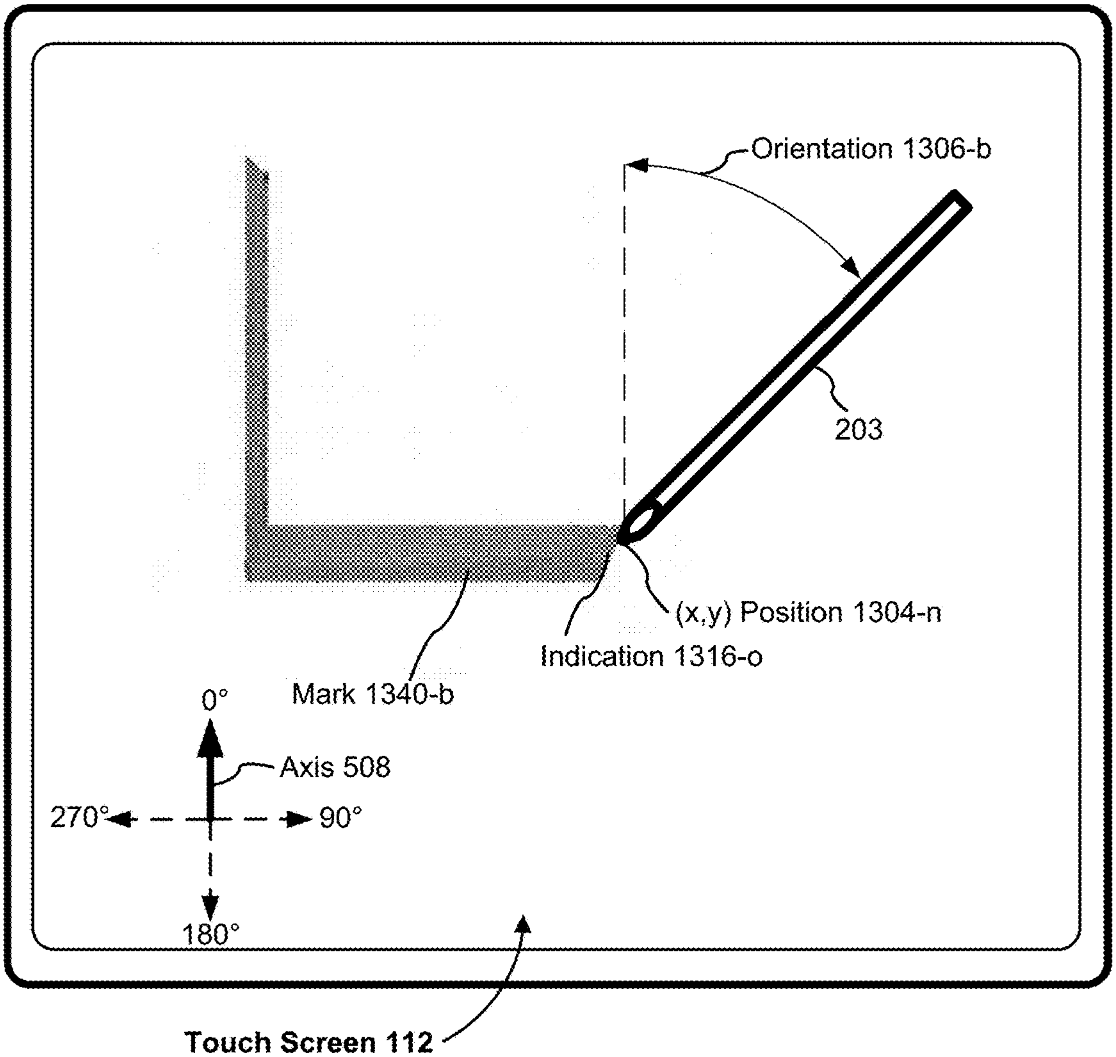
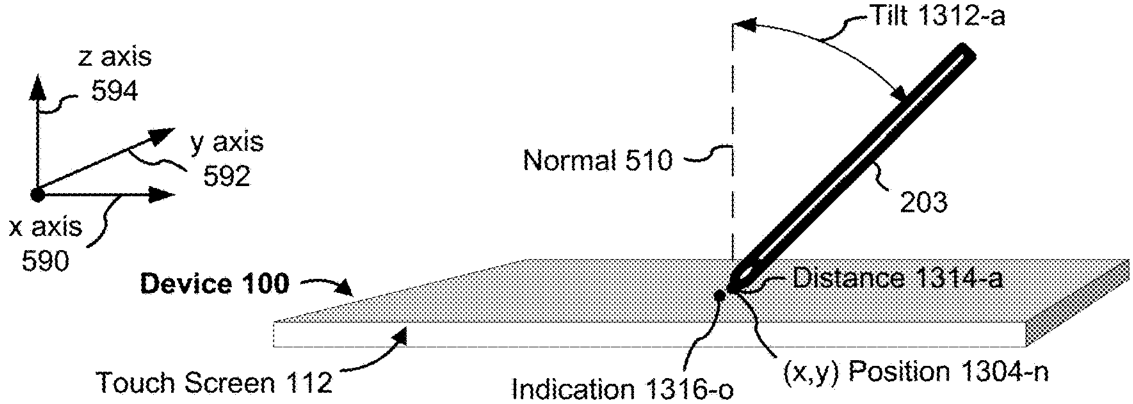
Figure 13O

Figure 14C:
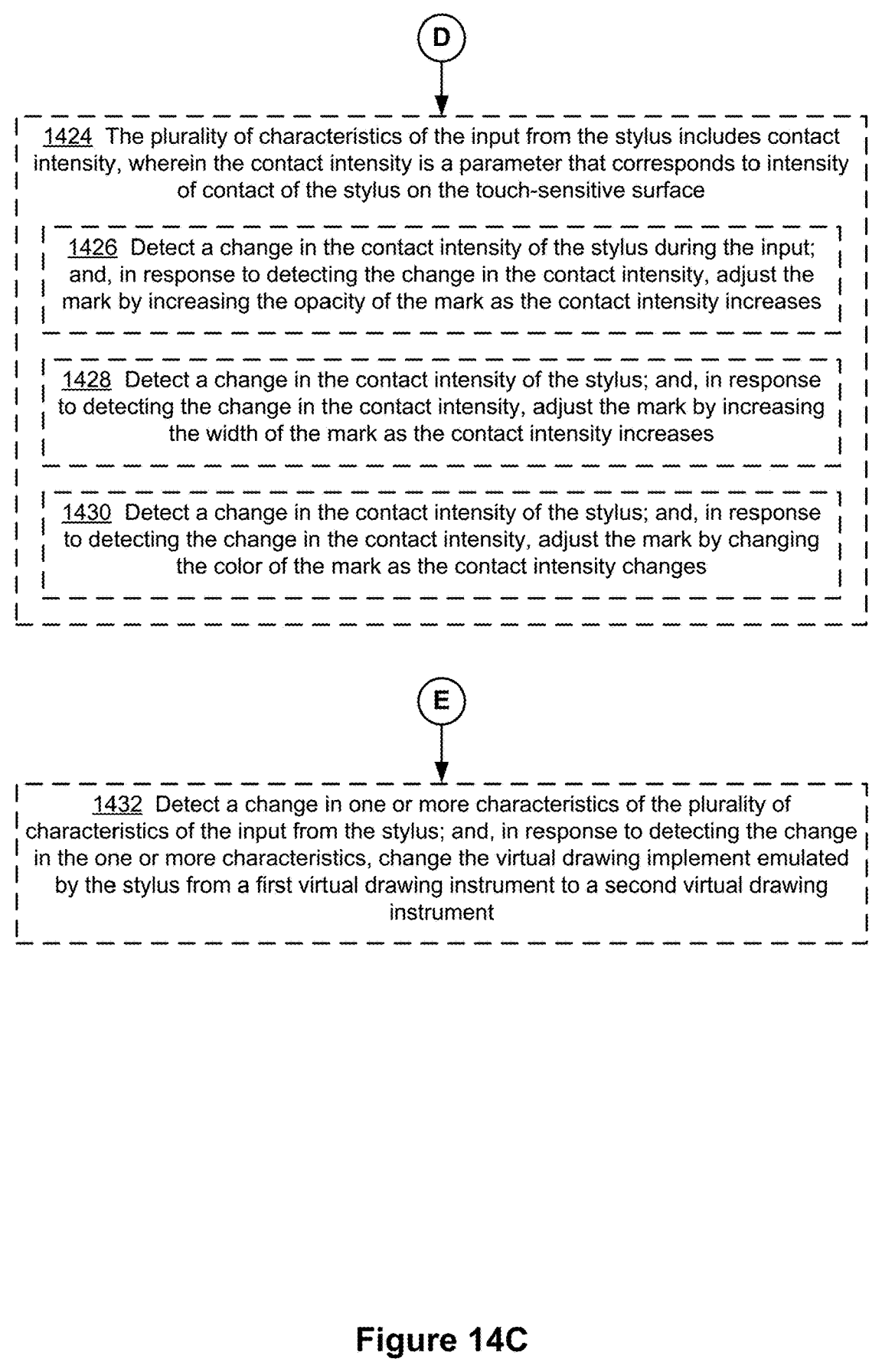

D

1424 The plurality of characteristics of the input from the stylus includes contact intensity, wherein the contact intensity is a parameter that corresponds to intensity of contact of the stylus on the touch-sensitive surface 1426 Detect a change in the contact intensity of the stylus during the input; and, in response to detecting the change in the contact intensity, adjust the mark by increasing the opacity of the mark as the contact intensity increases 1428 Detect a change in the contact intensity of the stylus; and, in response to detecting the change in the contact intensity, adjust the mark by increasing the width of the mark as the contact intensity increases 1430 Detect a change in the contact intensity of the stylus; and, in response to detecting the change in the contact intensity, adjust the mark by changing the color of the mark as the contact intensity changes

E

1432 Detect a change in one or more characteristics of the plurality of characteristics of the input from the stylus; and, in response to detecting the change in the one or more characteristics, change the virtual drawing implement emulated by the stylus from a first virtual drawing instrument to a second virtual drawing instrument

Figure 14D:
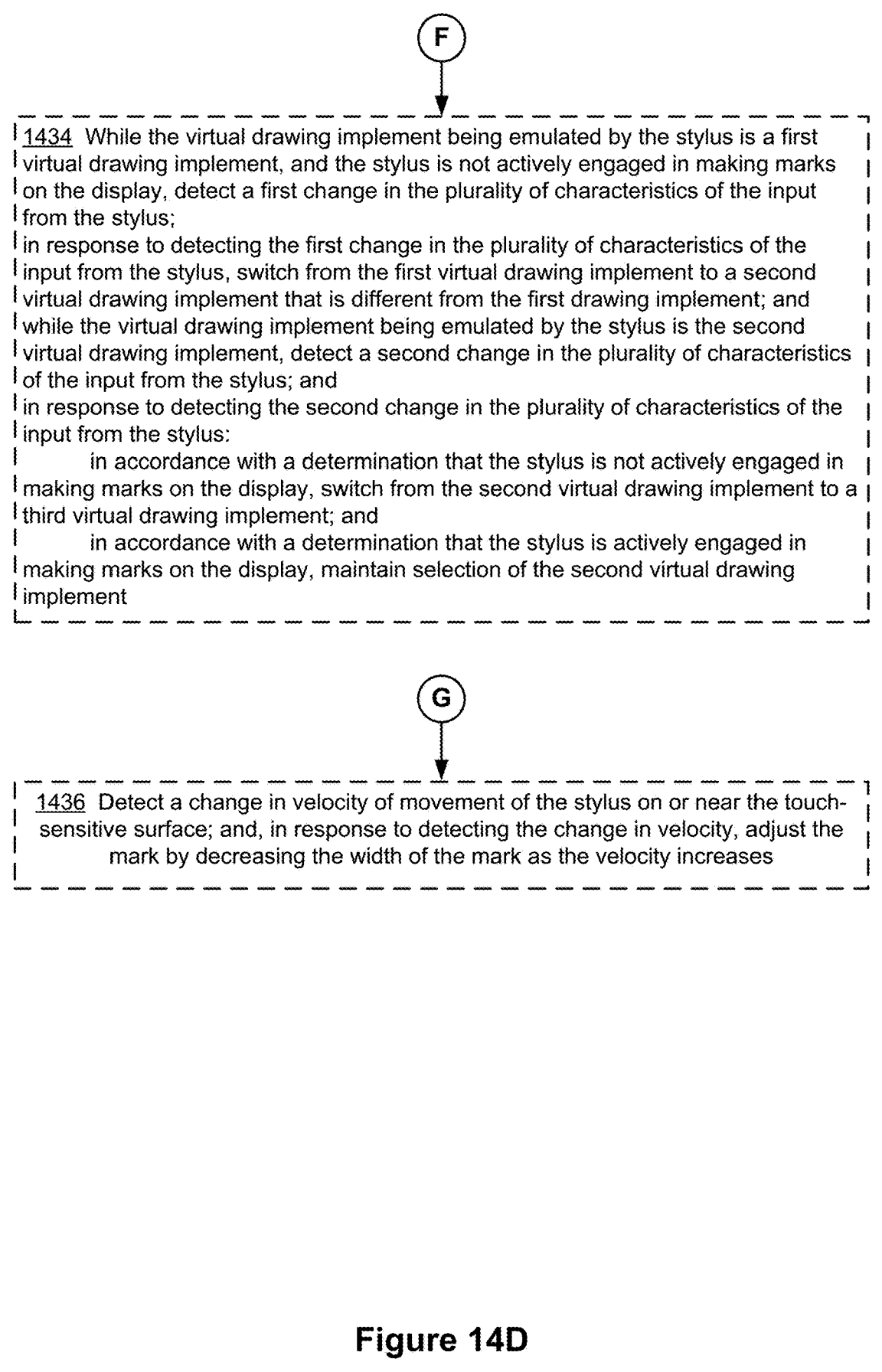

1434 While the virtual drawing implement being emulated by the stylus is a first virtual drawing implement, and the stylus is not actively engaged in making marks on the display, detect a first change in the plurality of characteristics of the input from the stylus;
in response to detecting the first change in the plurality of characteristics of the input from the stylus, switch from the first virtual drawing implement to a second virtual drawing implement that is different from the first drawing implement; and
while the virtual drawing implement being emulated by the stylus is the second virtual drawing implement, detect a second change in the plurality of characteristics of the input from the stylus; and
in response to detecting the second change in the plurality of characteristics of the input from the stylus:
in accordance with a determination that the stylus is not actively engaged in making marks on the display, switch from the second virtual drawing implement to a third virtual drawing implement; and
in accordance with a determination that the stylus is actively engaged in making marks on the display, maintain selection of the second virtual drawing implement

G

1436 Detect a change in velocity of movement of the stylus on or near the touch-sensitive surface; and, in response to detecting the change in velocity, adjust the mark by decreasing the width of the mark as the velocity increases

Figure 14E:
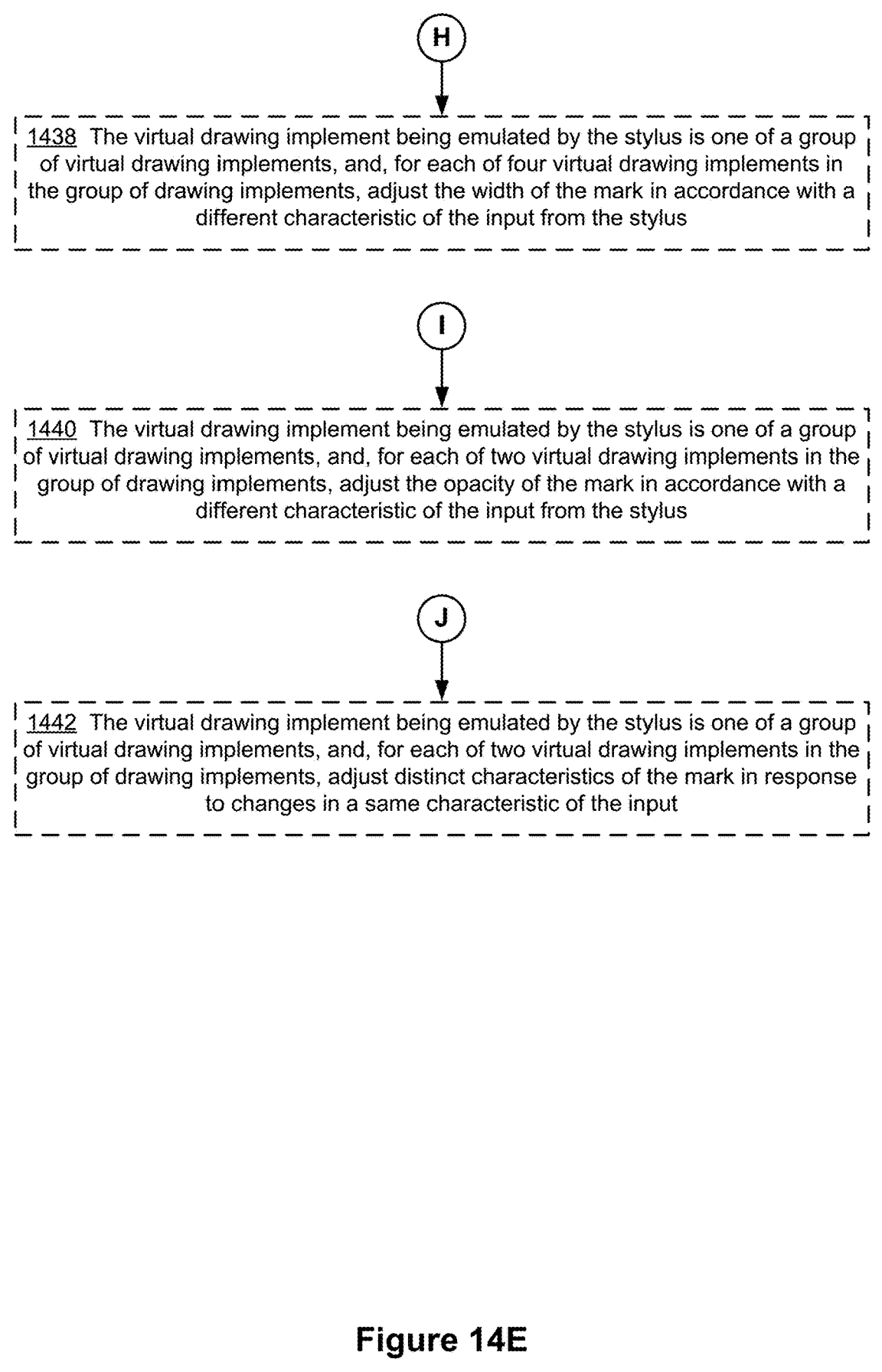

1438 The virtual drawing implement being emulated by the stylus is one of a group of virtual drawing implements, and, for each of four virtual drawing implements in the group of drawing implements, adjust the width of the mark in accordance with a different characteristic of the input from the stylus

I

1440 The virtual drawing implement being emulated by the stylus is one of a group of virtual drawing implements, and, for each of two virtual drawing implements in the group of drawing implements, adjust the opacity of the mark in accordance with a different characteristic of the input from the stylus

J

1442 The virtual drawing implement being emulated by the stylus is one of a group of virtual drawing implements, and, for each of two virtual drawing implements in the group of drawing implements, adjust distinct characteristics of the mark in response to changes in a same characteristic of the input

Figure 17C:
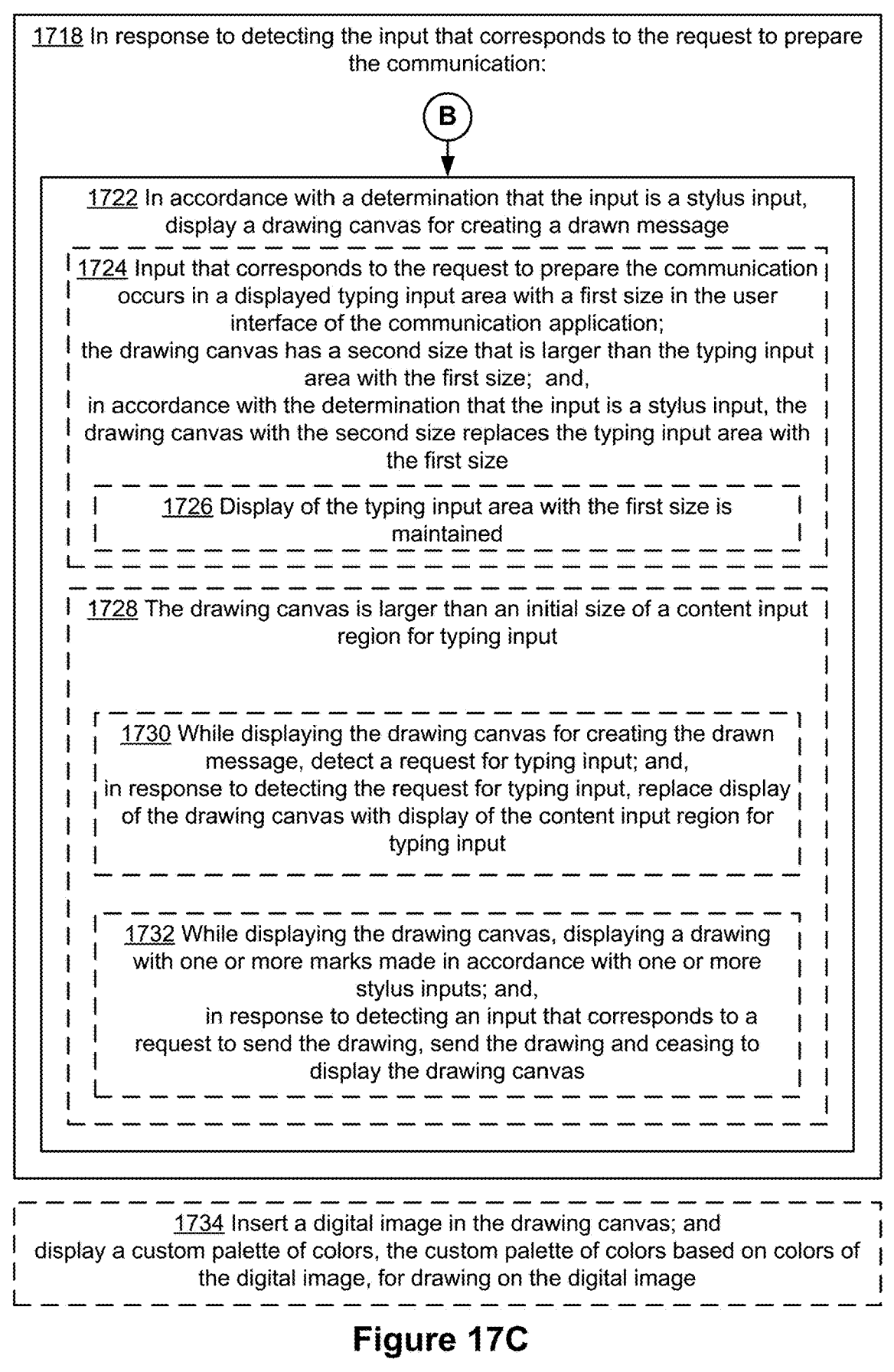

1718 In response to detecting the input that corresponds to the request to prepare the communication:

B

1722 In accordance with a determination that the input is a stylus input, display a drawing canvas for creating a drawn message 1724 Input that corresponds to the request to prepare the communication occurs in a displayed typing input area with a first size in the user interface of the communication application;
the drawing canvas has a second size that is larger than the typing input area with the first size; and,
in accordance with the determination that the input is a stylus input, the drawing canvas with the second size replaces the typing input area with the first size 1726 Display of the typing input area with the first size is maintained 1728 The drawing canvas is larger than an initial size of a content input region for typing input 1730 While displaying the drawing canvas for creating the drawn message, detect a request for typing input; and,
in response to detecting the request for typing input, replace display of the drawing canvas with display of the content input region for typing input 1732 While displaying the drawing canvas, displaying a drawing with one or more marks made in accordance with one or more stylus inputs; and,
in response to detecting an input that corresponds to a request to send the drawing, send the drawing and ceasing to display the drawing canvas 1734 Insert a digital image in the drawing canvas; and
display a custom palette of colors, the custom palette of colors based on colors of the digital image, for drawing on the digital image

Figure 18B:
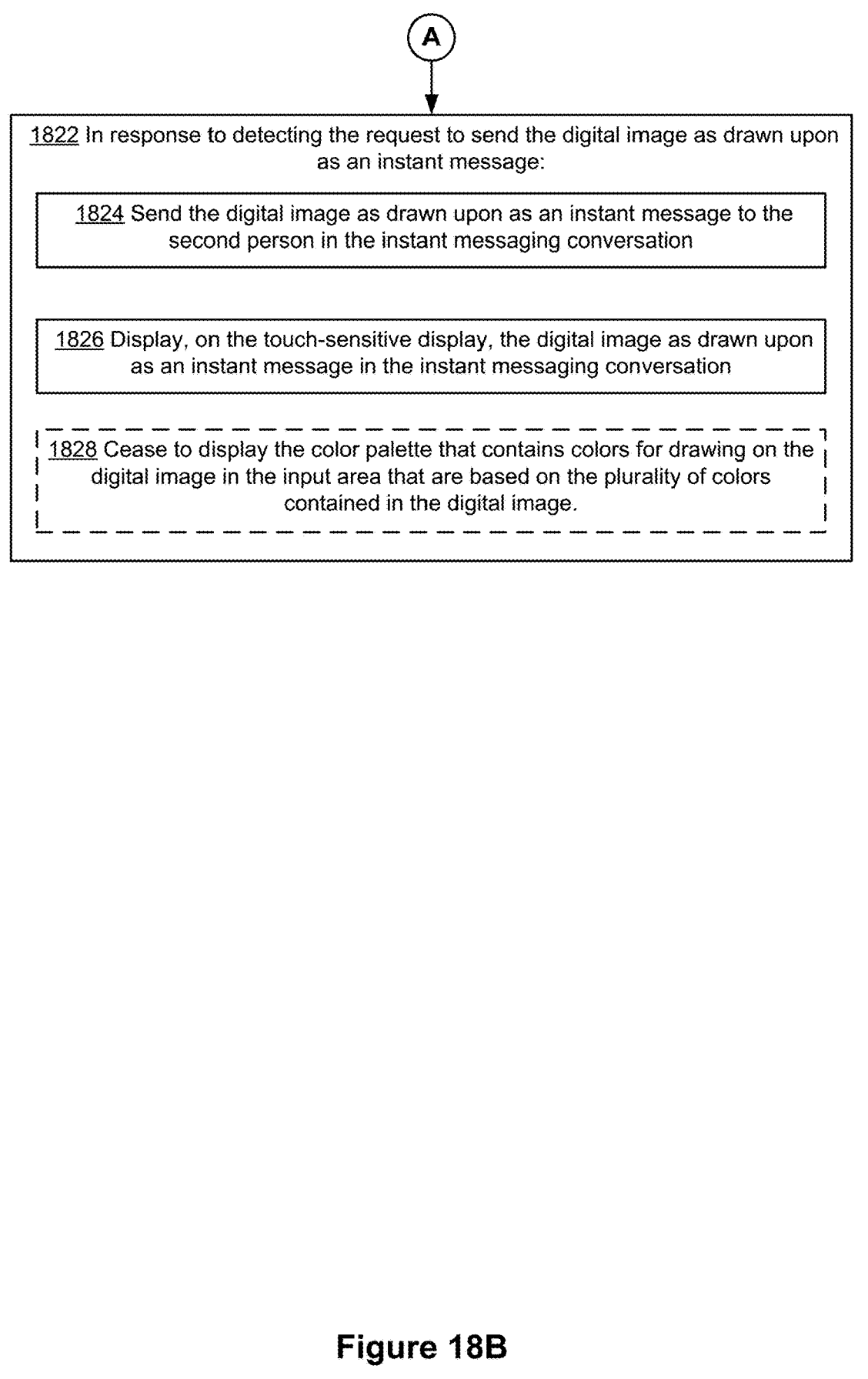

1822 In response to detecting the request to send the digital image as drawn upon as an instant message:

1824 Send the digital image as drawn upon as an instant message to the second person in the instant messaging conversation 1826 Display, on the touch-sensitive display, the digital image as drawn upon as an instant message in the instant messaging conversation 1828 Cease to display the color palette that contains colors for drawing on the digital image in the input area that are based on the plurality of colors contained in the digital image.

Figure 23B:
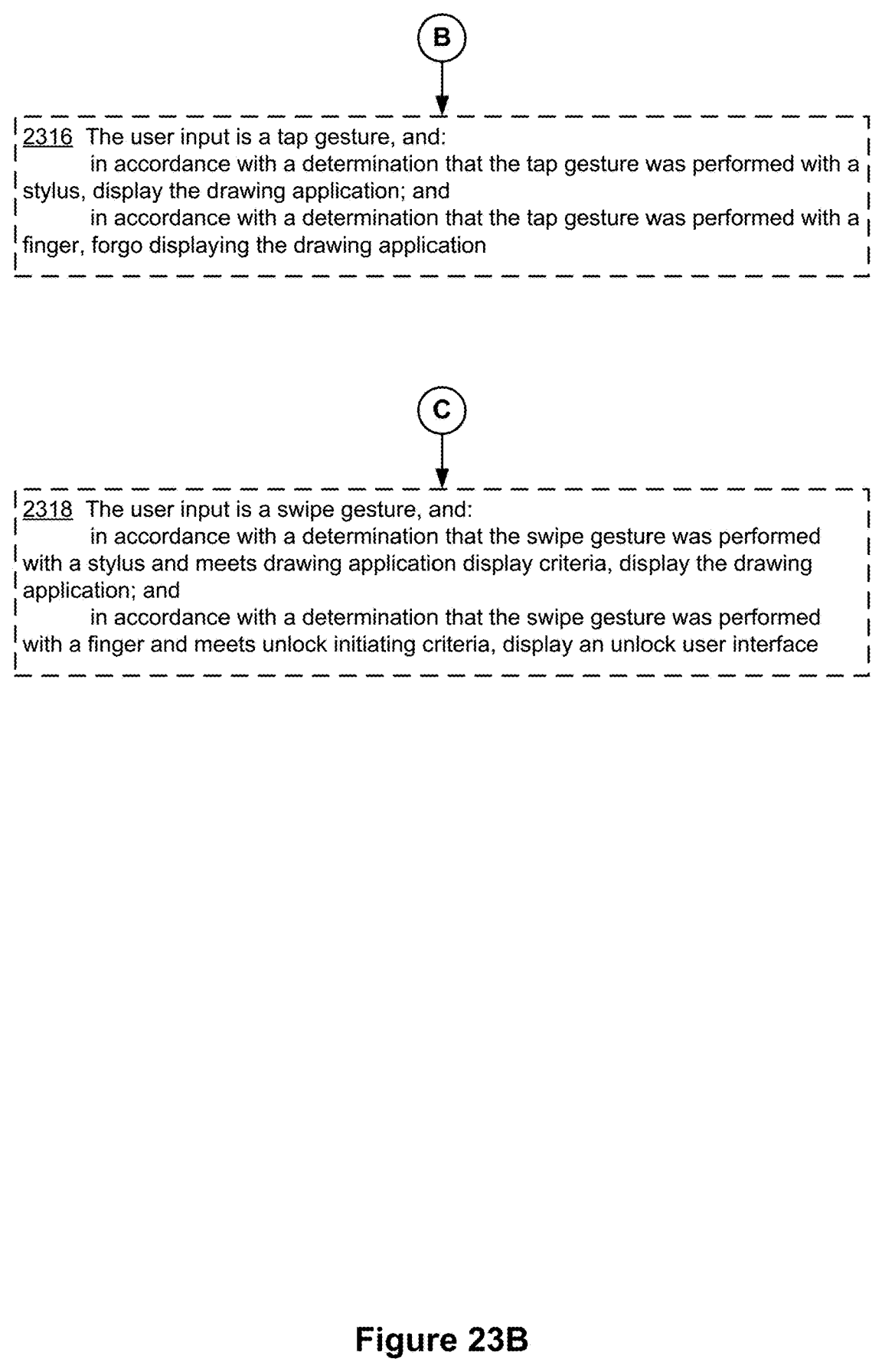

2316 The user input is a tap gesture, and:
in accordance with a determination that the tap gesture was performed with a stylus, display the drawing application; and
in accordance with a determination that the tap gesture was performed with a finger, forgo displaying the drawing application

C

2318 The user input is a swipe gesture, and:
in accordance with a determination that the swipe gesture was performed with a stylus and meets drawing application display criteria, display the drawing application; and
in accordance with a determination that the swipe gesture was performed with a finger and meets unlock initiating criteria, display an unlock user interface

Figure 24A:
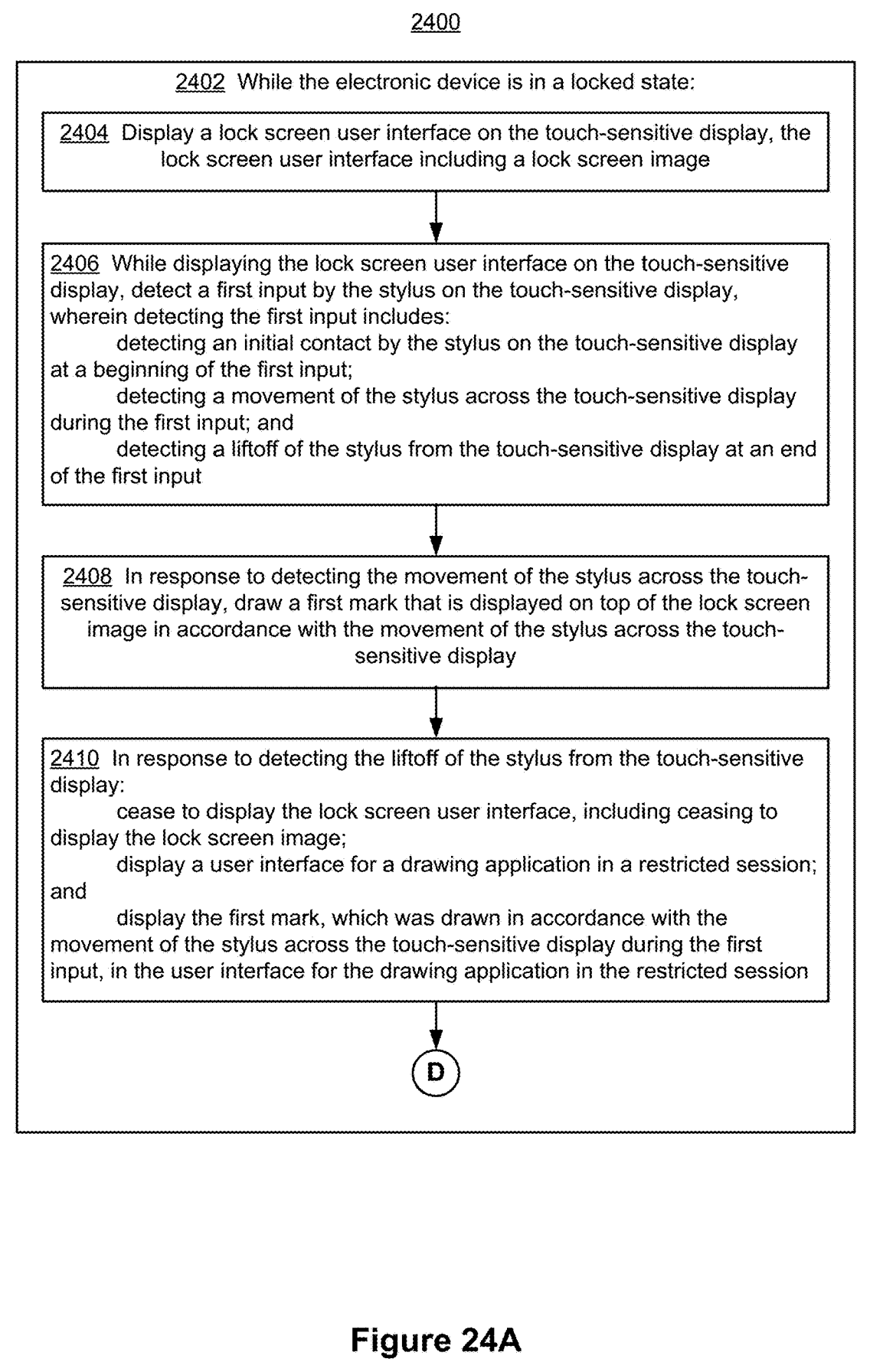

2402 While the electronic device is in a locked state:

2404 Display a lock screen user interface on the touch-sensitive display, the lock screen user interface including a lock screen image 2406 While displaying the lock screen user interface on the touch-sensitive display, detect a first input by the stylus on the touch-sensitive display, wherein detecting the first input includes:
detecting an initial contact by the stylus on the touch-sensitive display at a beginning of the first input;
detecting a movement of the stylus across the touch-sensitive display during the first input; and
detecting a liftoff of the stylus from the touch-sensitive display at an end of the first input 2408 In response to detecting the movement of the stylus across the touch-sensitive display, draw a first mark that is displayed on top of the lock screen image in accordance with the movement of the stylus across the touch-sensitive display 2410 In response to detecting the liftoff of the stylus from the touch-sensitive display:
cease to display the lock screen user interface, including ceasing to display the lock screen image;
display a user interface for a drawing application in a restricted session; and
display the first mark, which was drawn in accordance with the movement of the stylus across the touch-sensitive display during the first input, in the user interface for the drawing application in the restricted session

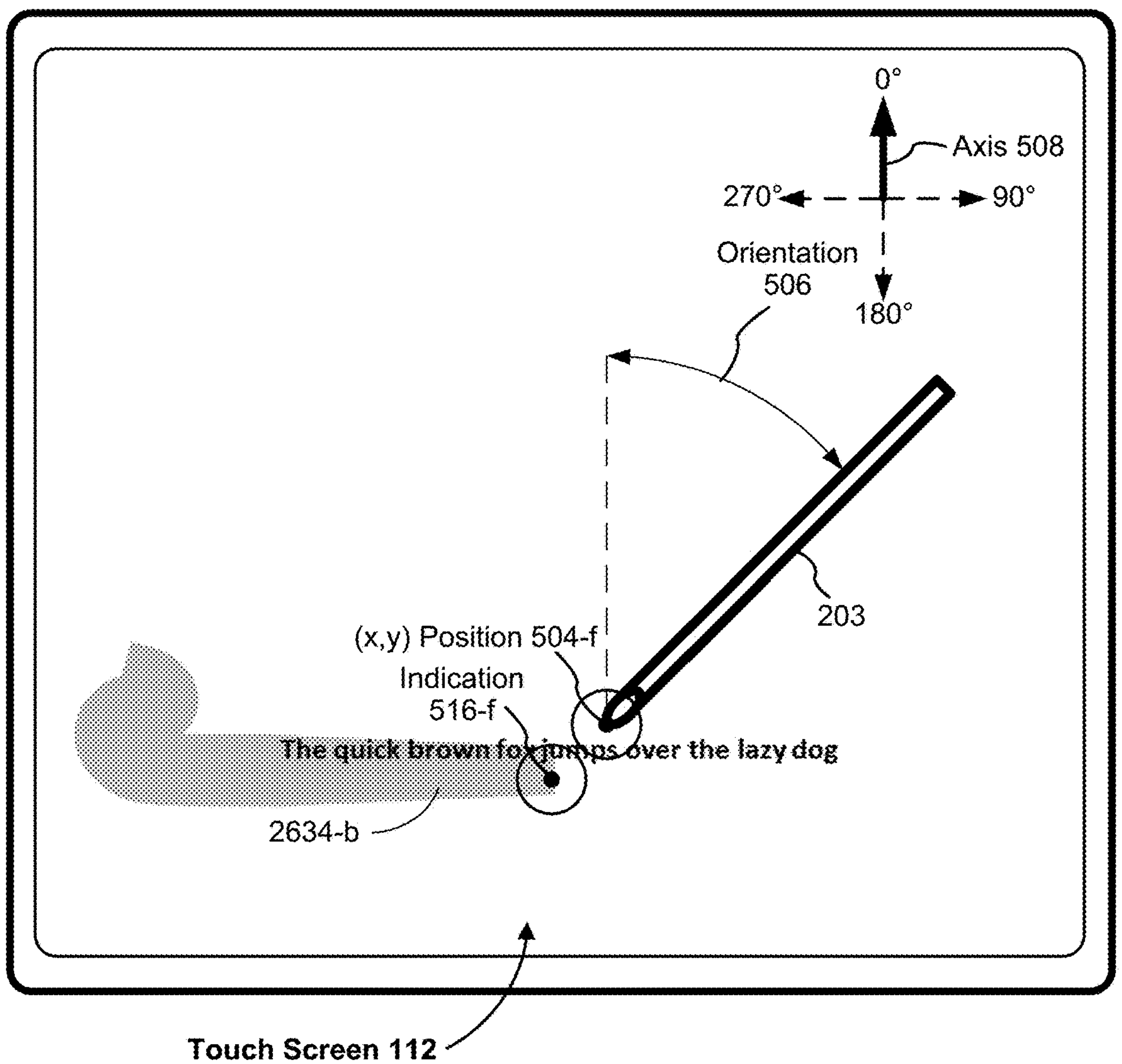
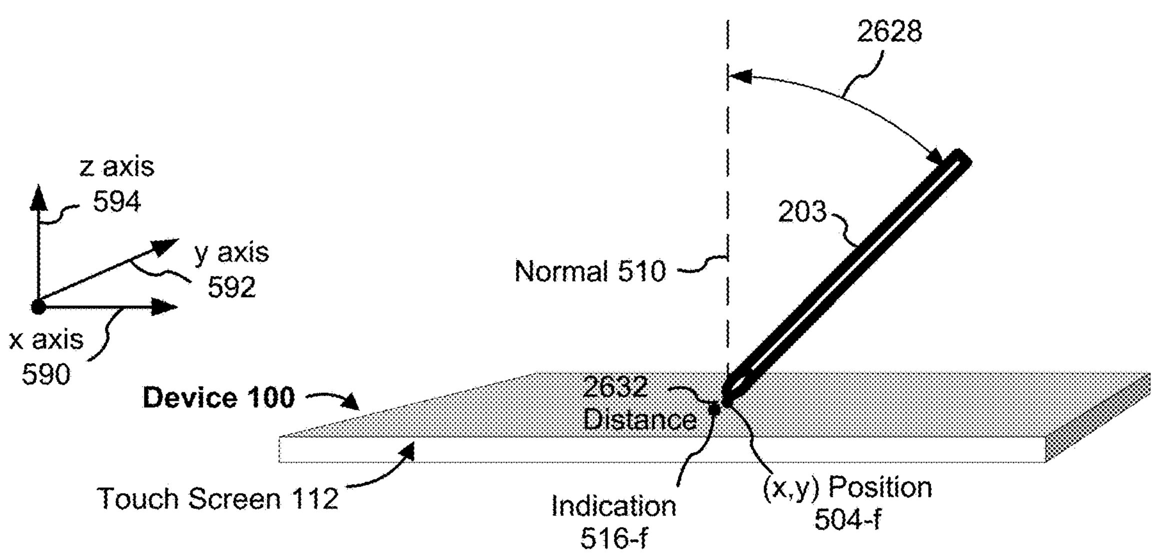
Figure 26G

2700

Figure 27C:
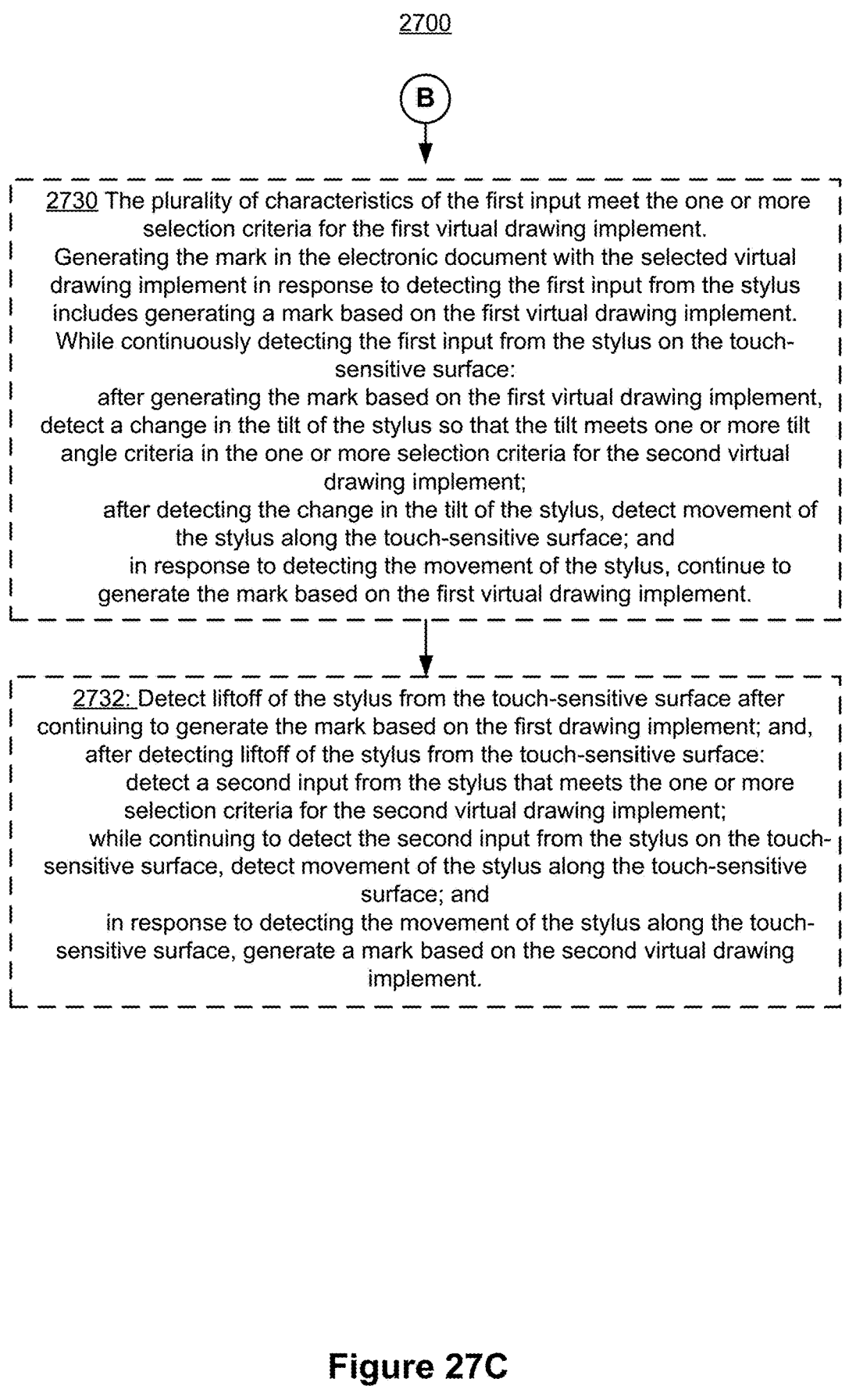

2700

B

2730 The plurality of characteristics of the first input meet the one or more selection criteria for the first virtual drawing implement.
Generating the mark in the electronic document with the selected virtual drawing implement in response to detecting the first input from the stylus includes generating a mark based on the first virtual drawing implement.
While continuously detecting the first input from the stylus on the touch-sensitive surface:
after generating the mark based on the first virtual drawing implement, detect a change in the tilt of the stylus so that the tilt meets one or more tilt angle criteria in the one or more selection criteria for the second virtual drawing implement;
after detecting the change in the tilt of the stylus, detect movement of the stylus along the touch-sensitive surface; and
in response to detecting the movement of the stylus, continue to generate the mark based on the first virtual drawing implement.

2732: Detect liftoff of the stylus from the touch-sensitive surface after continuing to generate the mark based on the first drawing implement; and, after detecting liftoff of the stylus from the touch-sensitive surface:
detect a second input from the stylus that meets the one or more selection criteria for the second virtual drawing implement;
while continuing to detect the second input from the stylus on the touch-sensitive surface, detect movement of the stylus along the touch-sensitive surface; and
in response to detecting the movement of the stylus along the touch-sensitive surface, generate a mark based on the second virtual drawing implement.

Figure 30B:
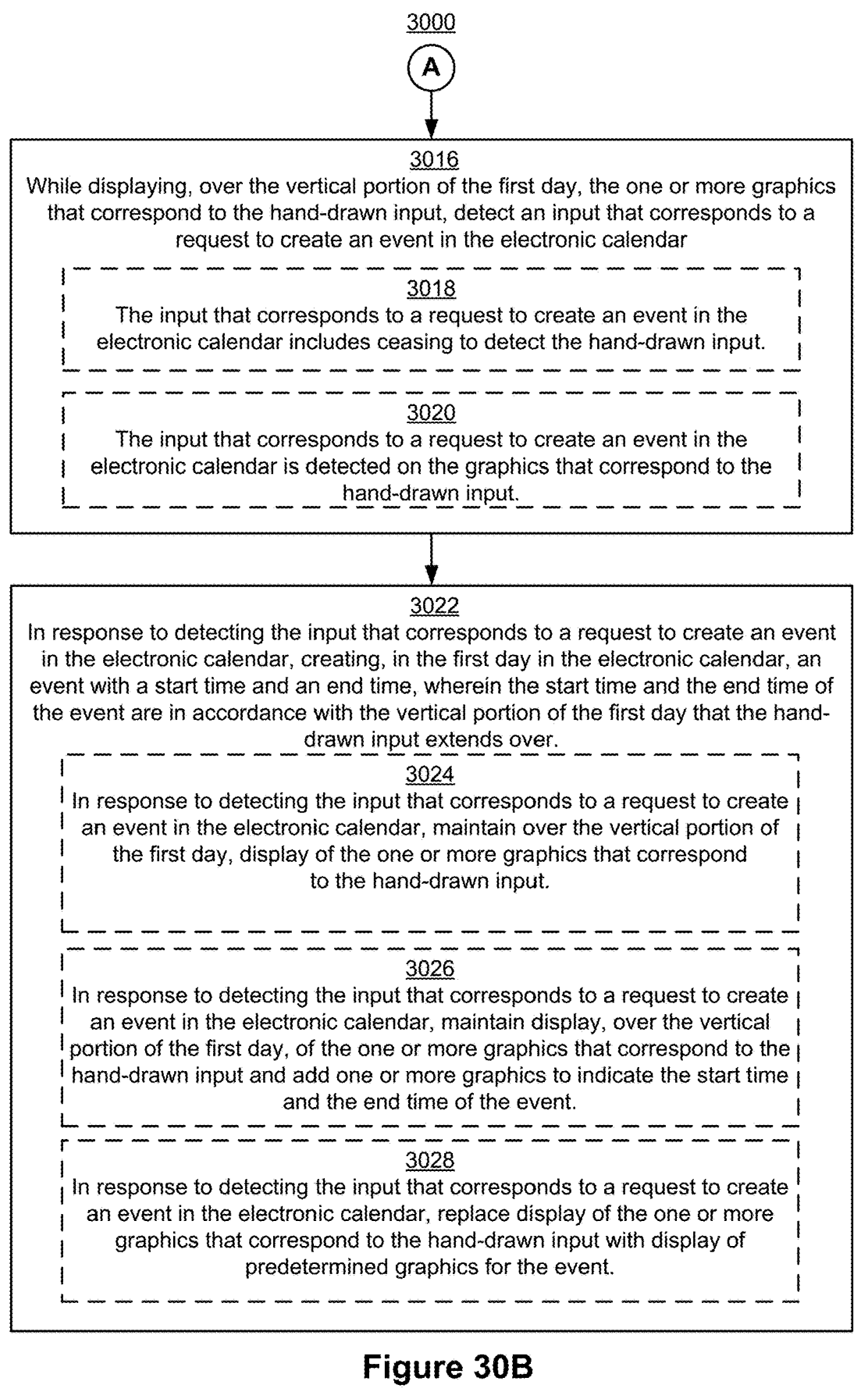

3016
While displaying, over the vertical portion of the first day, the one or more graphics that correspond to the hand-drawn input, detect an input that corresponds to a request to create an event in the electronic calendar 3018
The input that corresponds to a request to create an event in the electronic calendar includes ceasing to detect the hand-drawn input.

3020
The input that corresponds to a request to create an event in the electronic calendar is detected on the graphics that correspond to the hand-drawn input.

3022
In response to detecting the input that corresponds to a request to create an event in the electronic calendar, creating, in the first day in the electronic calendar, an event with a start time and an end time, wherein the start time and the end time of the event are in accordance with the vertical portion of the first day that the hand-drawn input extends over.

3024
In response to detecting the input that corresponds to a request to create an event in the electronic calendar, maintain over the vertical portion of the first day, display of the one or more graphics that correspond to the hand-drawn input.

3026
In response to detecting the input that corresponds to a request to create an event in the electronic calendar, maintain display, over the vertical portion of the first day, of the one or more graphics that correspond to the hand-drawn input and add one or more graphics to indicate the start time and the end time of the event.

3028
In response to detecting the input that corresponds to a request to create an event in the electronic calendar, replace display of the one or more graphics that correspond to the hand-drawn input with display of predetermined graphics for the event.

Figure 30C:
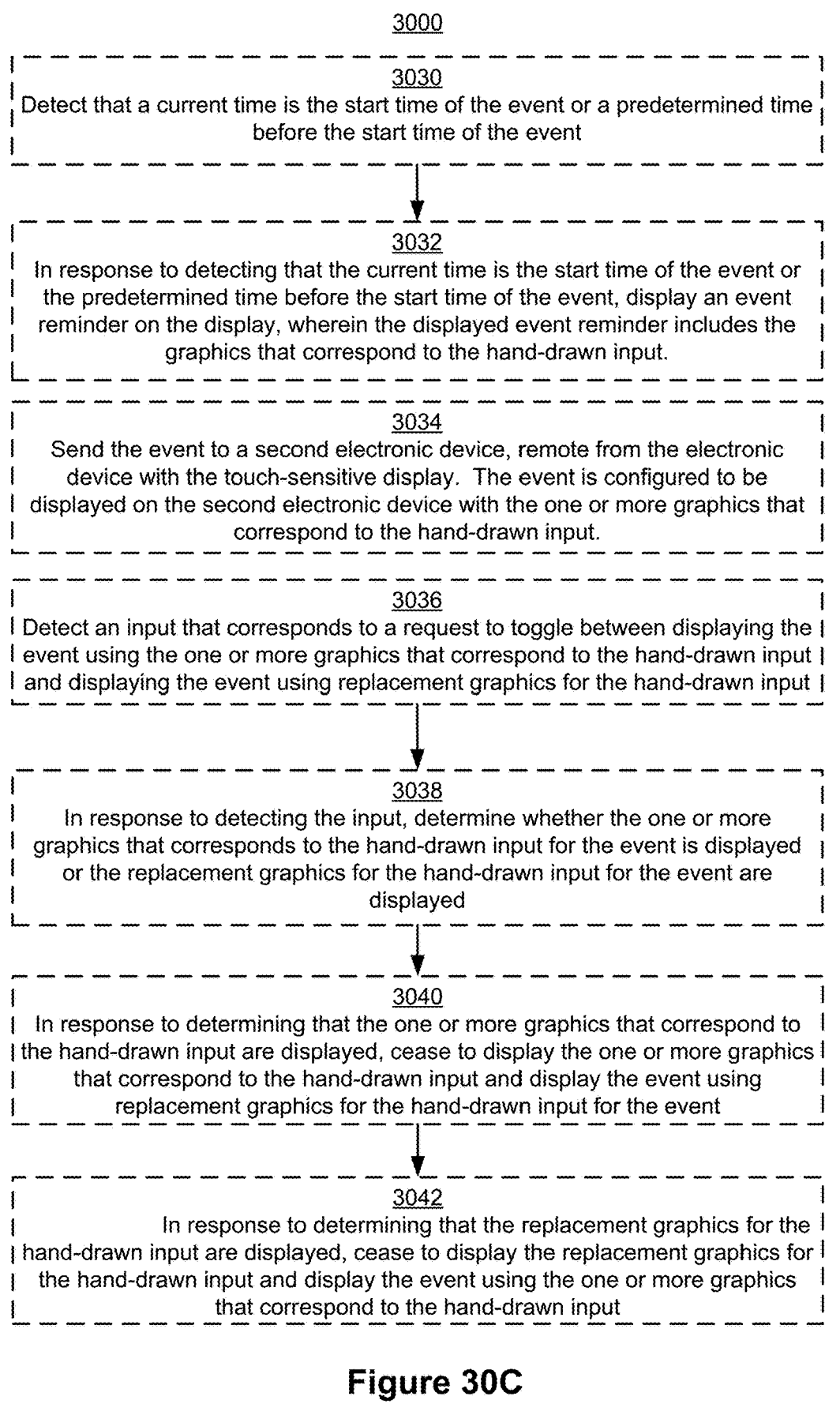

3030
Detect that a current time is the start time of the event or a predetermined time before the start time of the event 3032
In response to detecting that the current time is the start time of the event or the predetermined time before the start time of the event, display an event reminder on the display, wherein the displayed event reminder includes the graphics that correspond to the hand-drawn input.

3034
Send the event to a second electronic device, remote from the electronic device with the touch-sensitive display. The event is configured to be displayed on the second electronic device with the one or more graphics that correspond to the hand-drawn input.

3036
Detect an input that corresponds to a request to toggle between displaying the event using the one or more graphics that correspond to the hand-drawn input and displaying the event using replacement graphics for the hand-drawn input 3038
In response to detecting the input, determine whether the one or more graphics that corresponds to the hand-drawn input for the event is displayed or the replacement graphics for the hand-drawn input for the event are displayed 3040
In response to determining that the one or more graphics that correspond to the hand-drawn input are displayed, cease to display the one or more graphics that correspond to the hand-drawn input and display the event using replacement graphics for the hand-drawn input for the event 3042
In response to determining that the replacement graphics for the hand-drawn input are displayed, cease to display the replacement graphics for the hand-drawn input and display the event using the one or more graphics that correspond to the hand-drawn input

Figure 33A:
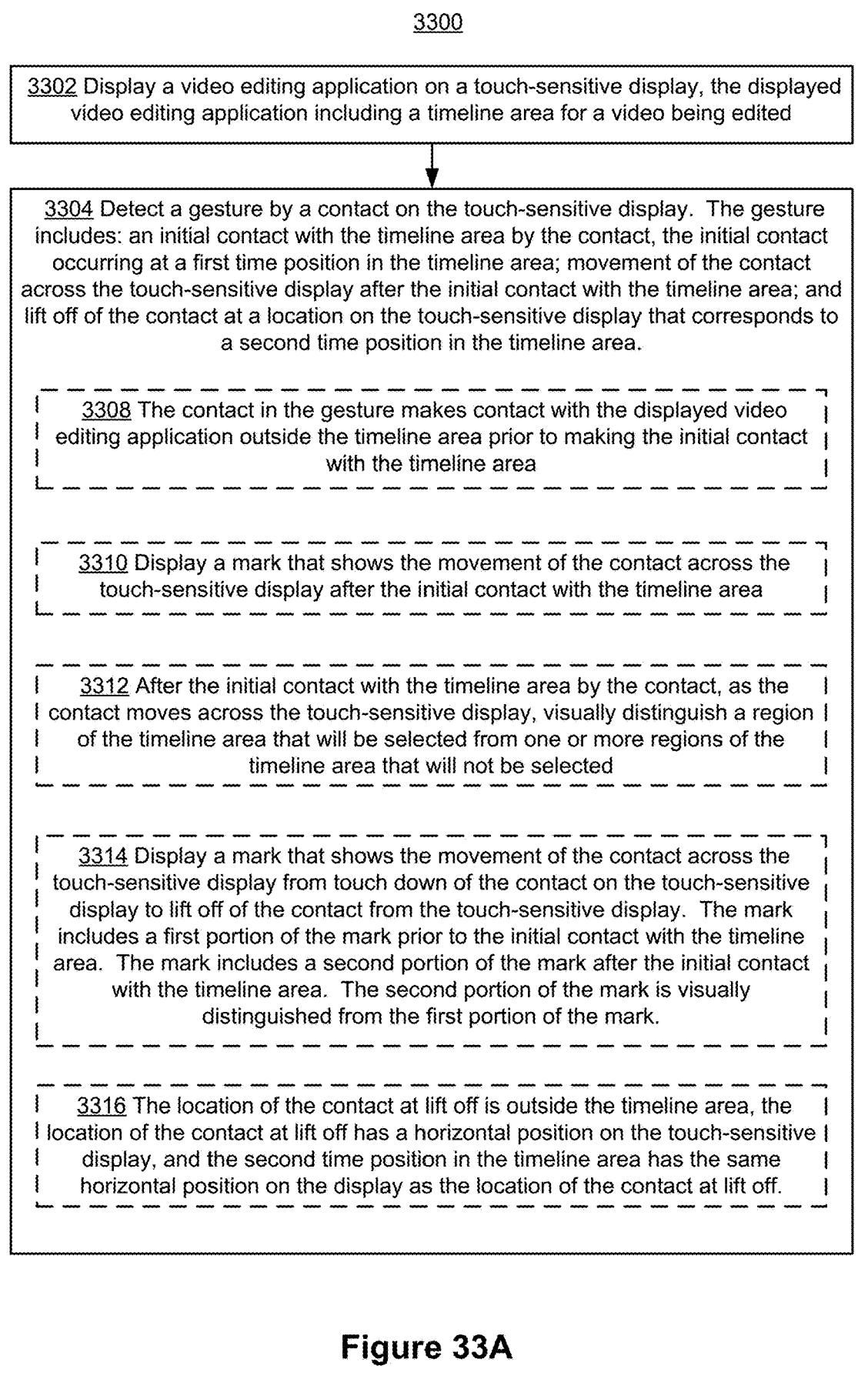

3302 Display a video editing application on a touch-sensitive display, the displayed video editing application including a timeline area for a video being edited 3304 Detect a gesture by a contact on the touch-sensitive display. The gesture includes: an initial contact with the timeline area by the contact, the initial contact occurring at a first time position in the timeline area; movement of the contact across the touch-sensitive display after the initial contact with the timeline area; and lift off of the contact at a location on the touch-sensitive display that corresponds to a second time position in the timeline area.

3308 The contact in the gesture makes contact with the displayed video editing application outside the timeline area prior to making the initial contact with the timeline area 3310 Display a mark that shows the movement of the contact across the touch-sensitive display after the initial contact with the timeline area 3312 After the initial contact with the timeline area by the contact, as the contact moves across the touch-sensitive display, visually distinguish a region of the timeline area that will be selected from one or more regions of the timeline area that will not be selected 3314 Display a mark that shows the movement of the contact across the touch-sensitive display from touch down of the contact on the touch-sensitive display to lift off of the contact from the touch-sensitive display. The mark includes a first portion of the mark prior to the initial contact with the timeline area. The mark includes a second portion of the mark after the initial contact with the timeline area. The second portion of the mark is visually distinguished from the first portion of the mark.

3316 The location of the contact at lift off is outside the timeline area, the location of the contact at lift off has a horizontal position on the touch-sensitive display, and the second time position in the timeline area has the same horizontal position on the display as the location of the contact at lift off.

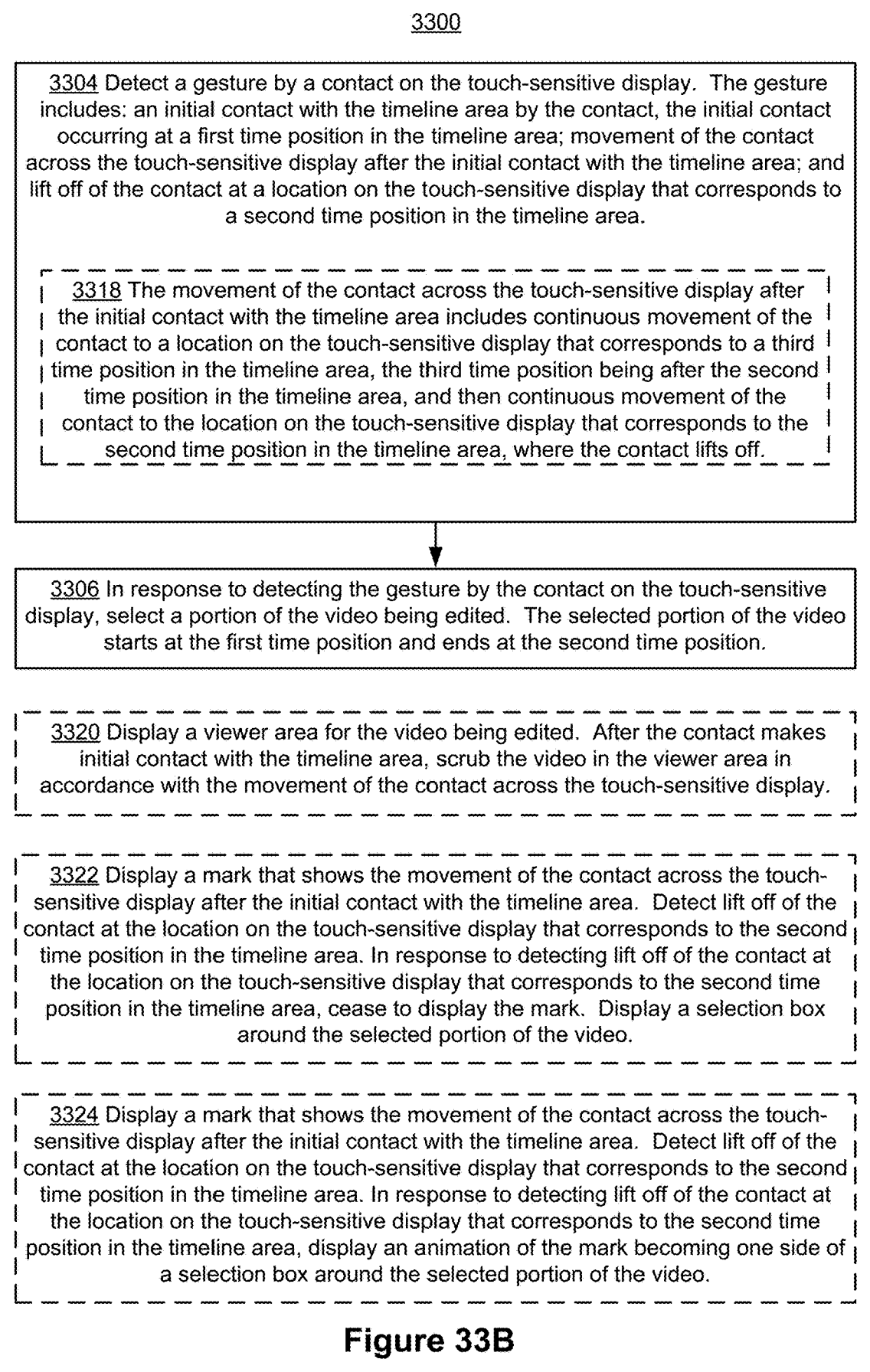

3304 Detect a gesture by a contact on the touch-sensitive display. The gesture includes: an initial contact with the timeline area by the contact, the initial contact occurring at a first time position in the timeline area; movement of the contact across the touch-sensitive display after the initial contact with the timeline area; and lift off of the contact at a location on the touch-sensitive display that corresponds to a second time position in the timeline area.

3318 The movement of the contact across the touch-sensitive display after the initial contact with the timeline area includes continuous movement of the contact to a location on the touch-sensitive display that corresponds to a third time position in the timeline area, the third time position being after the second time position in the timeline area, and then continuous movement of the contact to the location on the touch-sensitive display that corresponds to the second time position in the timeline area, where the contact lifts off.

3306 In response to detecting the gesture by the contact on the touch-sensitive display, select a portion of the video being edited. The selected portion of the video starts at the first time position and ends at the second time position.

3320 Display a viewer area for the video being edited. After the contact makes initial contact with the timeline area, scrub the video in the viewer area in accordance with the movement of the contact across the touch-sensitive display.

3322 Display a mark that shows the movement of the contact across the touch-sensitive display after the initial contact with the timeline area. Detect lift off of the contact at the location on the touch-sensitive display that corresponds to the second time position in the timeline area. In response to detecting lift off of the contact at the location on the touch-sensitive display that corresponds to the second time position in the timeline area, cease to display the mark. Display a selection box around the selected portion of the video.

3324 Display a mark that shows the movement of the contact across the touch-sensitive display after the initial contact with the timeline area. Detect lift off of the contact at the location on the touch-sensitive display that corresponds to the second time position in the timeline area. In response to detecting lift off of the contact at the location on the touch-sensitive display that corresponds to the second time position in the timeline area, display an animation of the mark becoming one side of a selection box around the selected portion of the video.

Figure 33B

Figure 36B:
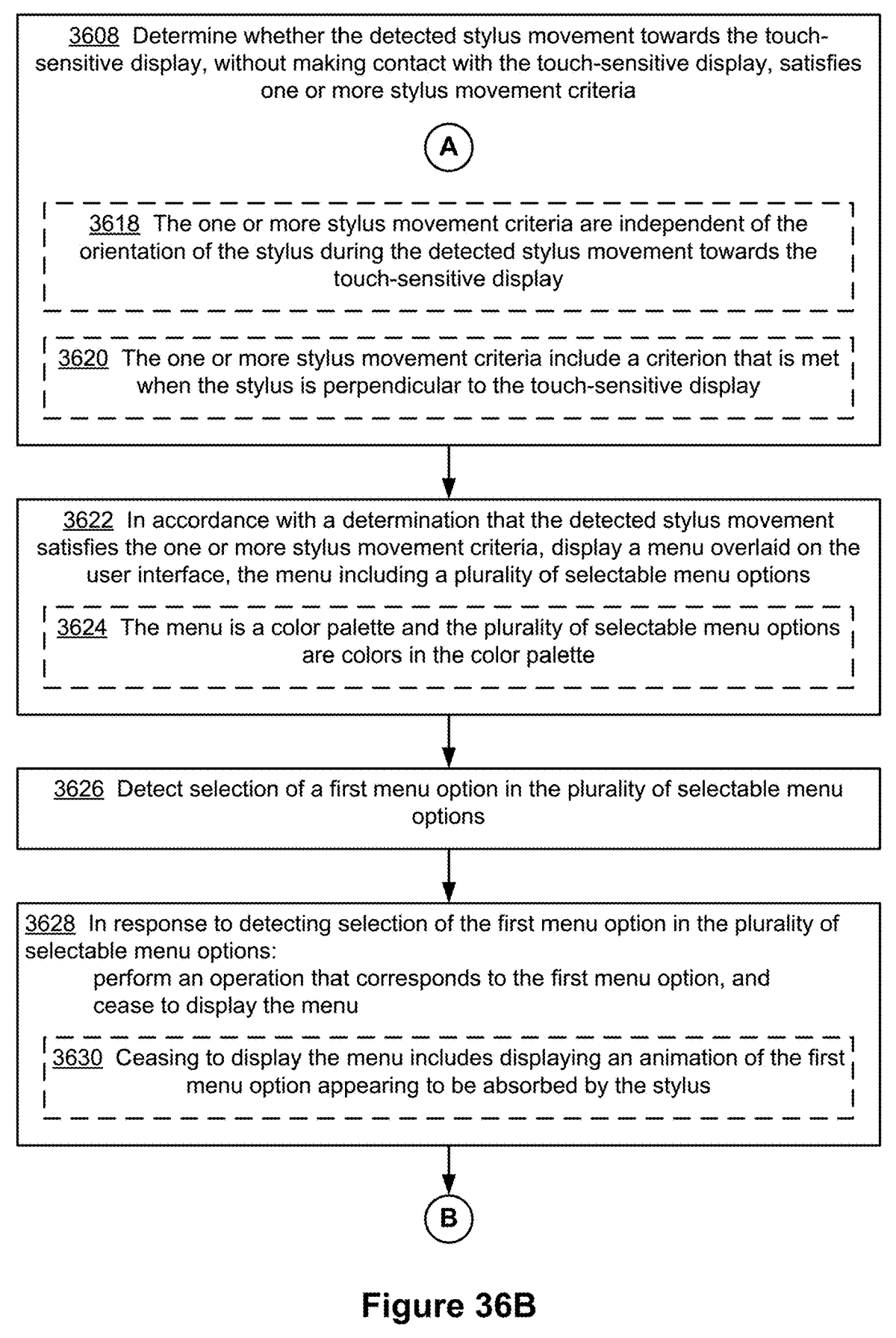

3608 Determine whether the detected stylus movement towards the touch-sensitive display, without making contact with the touch-sensitive display, satisfies one or more stylus movement criteria (A)

3618 The one or more stylus movement criteria are independent of the orientation of the stylus during the detected stylus movement towards the touch-sensitive display 3620 The one or more stylus movement criteria include a criterion that is met when the stylus is perpendicular to the touch-sensitive display

↓

3622 In accordance with a determination that the detected stylus movement satisfies the one or more stylus movement criteria, display a menu overlaid on the user interface, the menu including a plurality of selectable menu options 3624 The menu is a color palette and the plurality of selectable menu options are colors in the color palette

↓

3626 Detect selection of a first menu option in the plurality of selectable menu options

↓

3628 In response to detecting selection of the first menu option in the plurality of selectable menu options:
perform an operation that corresponds to the first menu option, and
cease to display the menu 3630 Ceasing to display the menu includes displaying an animation of the first menu option appearing to be absorbed by the stylus

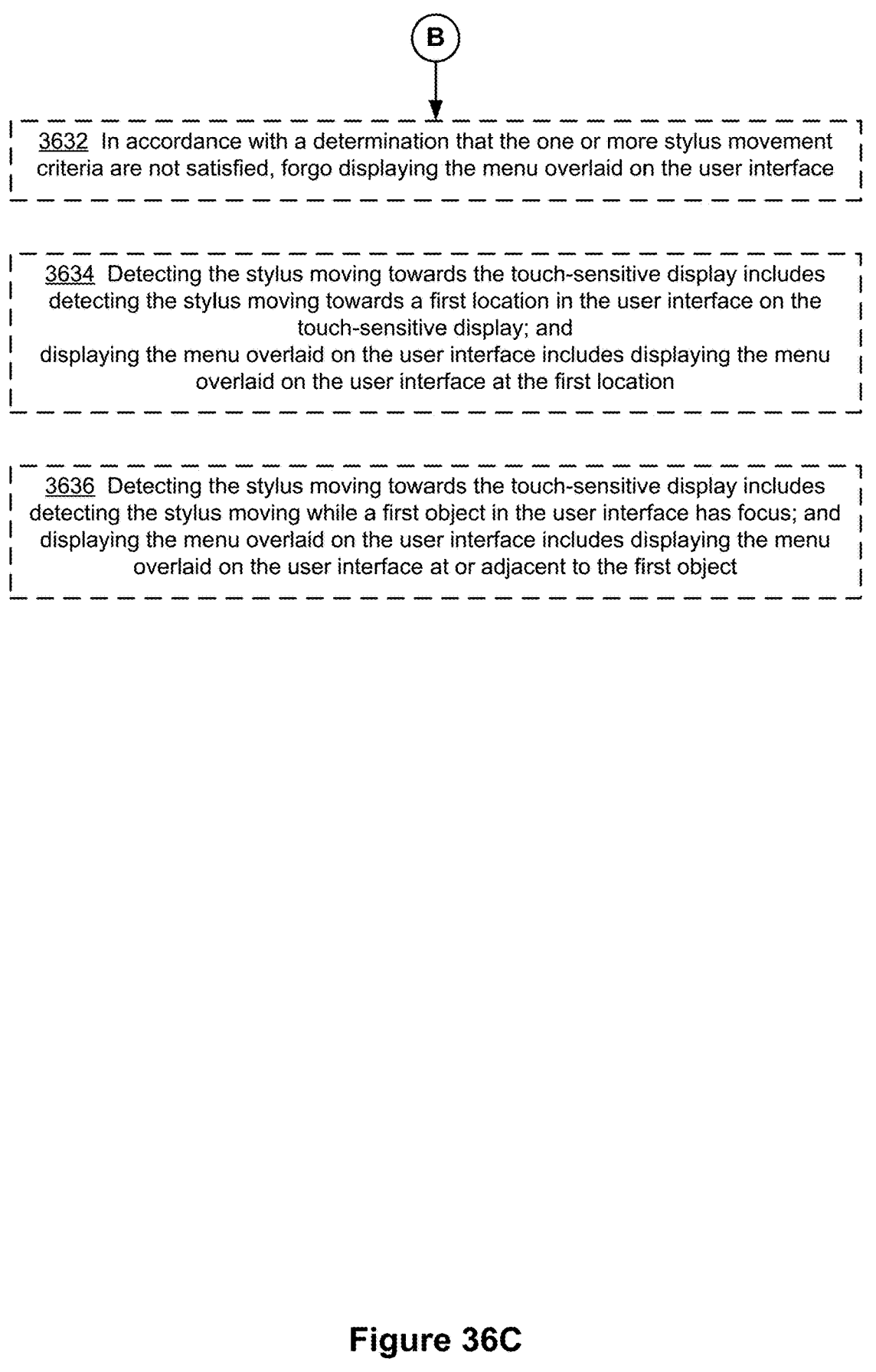

3632 In accordance with a determination that the one or more stylus movement criteria are not satisfied, forgo displaying the menu overlaid on the user interface 3634 Detecting the stylus moving towards the touch-sensitive display includes detecting the stylus moving towards a first location in the user interface on the touch-sensitive display; and
displaying the menu overlaid on the user interface includes displaying the menu overlaid on the user interface at the first location 3636 Detecting the stylus moving towards the touch-sensitive display includes detecting the stylus moving while a first object in the user interface has focus; and displaying the menu overlaid on the user interface includes displaying the menu overlaid on the user interface at or adjacent to the first object

Figure 36C

DEVICES AND METHODS FOR CREATING CALENDAR EVENTS BASED ON HAND-DRAWN INPUTS AT AN ELECTRONIC DEVICE WITH A TOUCH-SENSITIVE DISPLAY

RELATED APPLICATIONS

This application is a continuation of U.S. patent application Ser. No. 16/359,906, filed Mar. 20, 2019, which is a continuation of U.S. patent application Ser. No. 14/862,085, filed Sep. 22, 2015, now U.S. Pat. No. 10,365,732, which is a continuation of U.S. patent application Ser. No. 14/860,320, filed Sep. 21, 2015, now U.S. Pat. No. 9,658,704, which claims priority to U.S. Provisional Application Ser. No. 62/173,916, filed Jun. 10, 2015. Each of these applications is hereby incorporated by reference in its respective entirety.

TECHNICAL FIELD

This application relates generally to electronic devices with touch-sensitive surfaces, including but not limited to electronic devices with touch-sensitive surfaces that manipulate user interfaces with styluses.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to manipulate user interface objects on a display.

User interfaces can be manipulated with either finger or stylus inputs. Finger inputs are more common than stylus inputs, in part because existing methods that use styluses are cumbersome and inefficient.

SUMMARY

Accordingly, disclosed herein are electronic devices with faster, more efficient methods for manipulating user interfaces with a stylus. Such methods optionally complement or replace conventional methods for manipulating user interfaces with a stylus. Such methods reduce the number, extent, and/or nature of the inputs from a user and produce a more efficient human-machine interface. For battery-operated devices, such methods conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors. Executable instructions for performing these functions are, optionally, included in a transitory computer readable medium or other computer program product configured for execution by one or more processors.

Disclosed herein are electronic devices with improved methods for displaying and updating an indication corresponding to a positional state of a stylus. Such methods optionally complement or replace conventional methods for displaying an indication. Such methods reduce the number, extent, and/or nature of the inputs from a user and produce a more efficient human-machine interface. For battery-operated devices, such methods conserve power and increase the time between battery charges.

In accordance with some embodiments, a method is performed at an electronic device with a touch-sensitive display, the device including one or more sensors to detect signals from a stylus associated with the device, the stylus including a representative portion (e.g., a tip of the stylus). The method includes detecting a positional state of the stylus, wherein the positional state of the stylus corresponds to a distance of the stylus relative to the touch-sensitive display, a tilt of the stylus relative to the touch-sensitive display, and/or an orientation of the stylus relative to the touch-sensitive display; determining a location on the touch-sensitive display that corresponds to the detected positional state of the stylus; displaying, in accordance with the positional state of the stylus, an indication on the touch-sensitive display of the determined location prior to the stylus touching the touch-sensitive display; detecting a change in the distance, the tilt, and/or the orientation of the stylus, prior to the stylus touching the touch-sensitive display; and in response to detecting the change, updating the displayed indication on the touch-sensitive display.

In accordance with some embodiments, an electronic device includes a touch-sensitive display unit configured to display a user interface and receive user contacts (including stylus contacts), one or more sensor units configured to detect signals from a stylus associated with the device; and a processing unit coupled with the touch-sensitive display unit and the one or more sensor units. The processing unit is configured to: detect a positional state of the stylus, wherein the positional state of the stylus corresponds to a distance of the stylus relative to the touch-sensitive display unit, a tilt of the stylus relative to the touch-sensitive display unit, and/or an orientation of the stylus relative to the touch-sensitive display unit; determine a location on the touch-sensitive display unit that corresponds to the detected positional state of the stylus; enable display of, in accordance with the positional state of the stylus, an indication on the touch-sensitive display unit of the determined location prior to the stylus touching the touch-sensitive display unit; detect a change in the distance, the tilt, and/or the orientation of the stylus, prior to the stylus touching the touch-sensitive display unit; and, in response to detecting the change, update the displayed indication on the touch-sensitive display unit.

Thus, electronic devices with displays, touch-sensitive surfaces and optionally one or more sensors to detect signals from a stylus associated with the device are provided with faster, more efficient methods for displaying and updating an indication corresponding to a positional state of a stylus, thereby increasing the effectiveness, efficiency, and user satisfaction with such devices. Such methods may complement or replace conventional methods for displaying an indication.

Disclosed herein are electronic devices with improved methods for displaying and updating an indication that corresponds to a positional state of a stylus while the stylus is in contact with a device (e.g., with a touch-sensitive display of the device). Such methods optionally complement or replace conventional methods for displaying an indication. Such methods reduce the number, extent, and/or nature of the inputs from a user and produce a more efficient human-machine interface. For battery-operated devices, such methods conserve power and increase the time between battery charges.

In accordance with some embodiments, a method is performed at an electronic device with a touch-sensitive display, the device including one or more sensors to detect signals from a stylus associated with the device, the stylus including a tip (or other representative portion). The method includes detecting, while the stylus tip is in contact with the touch-sensitive display, a positional state of the stylus, wherein the positional state of the stylus corresponds to a position of the stylus tip on the touch-sensitive display, a tilt of the stylus relative to the touch-sensitive display, and an orientation of the stylus relative to the touch-sensitive display; determining a first location on the touch-sensitive display that corresponds to the detected positional state of the stylus; displaying an indication on the touch-sensitive display at the first location that corresponds to the detected positional state of the stylus, the first location being at a first offset from the position of the stylus tip on the touch-sensitive display; detecting a change in the orientation of the stylus; and, in response to detecting the change in the orientation of the stylus: determining a second location on the touch-sensitive display that corresponds to the change in the orientation of the stylus, the second location being at a second offset from the position of the stylus tip on the touch-sensitive display; and displaying the indication on the touch-sensitive display at the second location.

In accordance with some embodiments, an electronic device includes a touch-sensitive display unit configured to display a user interface and receive user contacts (including stylus contacts), one or more sensor units configured to detect signals from a stylus associated with the device, the stylus including a tip, and a processing unit coupled with the touch-sensitive display unit and the one or more sensor units. The processing unit is configured to: detect, while the stylus tip is in contact with the touch-sensitive display unit, a positional state of the stylus, wherein the positional state of the stylus corresponds to a position of the stylus tip on the touch-sensitive display unit, a tilt of the stylus relative to the touch-sensitive display unit, and an orientation of the stylus relative to the touch-sensitive display unit; determine a first location on the touch-sensitive display unit that corresponds to the detected positional state of the stylus; enable display of an indication on the touch-sensitive display unit at the first location that corresponds to the detected positional state of the stylus, the first location being at a first offset from the position of the stylus tip on the touch-sensitive display unit; detect a change in the orientation of the stylus; and, in response to detecting the change in the orientation of the stylus: determine a second location on the touch-sensitive display unit that corresponds to the change in the orientation of the stylus, the second location being at a second offset from the position of the stylus tip on the touch-sensitive display unit; and enable display of the indication on the touch-sensitive display unit at the second location.

Thus, electronic devices with touch-sensitive displays and one or more sensors to detect signals from a stylus associated with the device are provided with faster, more efficient methods for displaying and updating an indication that corresponds to a positional state of a stylus while the stylus is in contact with a device (e.g., with a touch-sensitive display of the device), thereby increasing the effectiveness, efficiency, and user satisfaction with such devices. Such methods may complement or replace conventional methods for displaying an indication.

Disclosed herein are electronic devices with improved methods for adjusting one or more characteristics of a mark in accordance with characteristics of an input from a stylus. Such methods optionally complement or replace conventional methods for displaying a mark. Such methods reduce the number, extent, and/or nature of the inputs from a user and produce a more efficient human-machine interface. For battery-operated devices, such methods conserve power and increase the time between battery charges.

In accordance with some embodiments, a method is performed at an electronic device with a touch-sensitive surface and a display, the device including one or more sensors to detect signals from a stylus associated with the device. The method includes detecting an input from the stylus; determining a plurality of characteristics of the input from the stylus, the characteristics of the input including an orientation of the stylus relative to the touch-sensitive surface during the input, and a direction of movement of the stylus across the touch-sensitive surface during the input ("directionality"); and, in response to detecting the input from the stylus: generating a mark that is displayed on the display, the mark having characteristics that include opacity, width, and/or color; and adjusting one or more characteristics of the mark in accordance with a virtual drawing implement being emulated by the stylus, and changes, during the input, in the plurality of characteristics of the input from the stylus.

In accordance with some embodiments, an electronic device includes a display unit configured to display a user interface, a touch-sensitive surface unit configured to receive user contacts (including stylus contacts), one or more sensor units configured to detect signals from a stylus associated with the device, and a processing unit coupled with the display unit, the touch-sensitive surface unit and the one or more sensor units. The processing unit is configured to: detect an input from the stylus; determine a plurality of characteristics of the input from the stylus, the characteristics of the input including an orientation of the stylus relative to the touch-sensitive surface unit during the input, and a direction of movement of the stylus across the touch-sensitive surface unit during the input ("directionality"); and, in response to detecting the input from the stylus: generate a mark that is displayed on the display unit, the mark having characteristics that include opacity, width, and/or color; and adjust one or more characteristics of the mark in accordance with a virtual drawing implement being emulated by the stylus, and changes, during the input, in the plurality of characteristics of the input from the stylus.

Thus, electronic devices with displays, touch-sensitive surfaces and one or more sensors to detect signals from a stylus associated with the device are provided with faster, more efficient methods for adjusting one or more characteristics of a mark in accordance with characteristics of an input from a stylus, thereby increasing the effectiveness, efficiency, and user satisfaction with such devices. Such methods may complement or replace conventional methods for displaying a mark.

Disclosed herein are electronic devices with improved methods for preparing messages with stylus and finger inputs. Such methods optionally complement or replace conventional methods for preparing messages with stylus and finger inputs. Such methods reduce the number, extent, and/or nature of the inputs from a user and produce a more efficient human-machine interface. For battery-operated devices, such methods conserve power and increase the time between battery charges.

In accordance with some embodiments, a method is performed at an electronic device with a touch-sensitive display, the device including one or more sensors to detect signals from a stylus associated with the device. The method includes displaying, on the touch-sensitive display, a user interface of a communication application; detecting an input that corresponds to a request to prepare a communication; in response to detecting the input that corresponds to the request to prepare the communication: in accordance with a determination that the input is a finger input, displaying a keyboard for typing a text message; and in accordance with a determination that the input is a stylus input, displaying a drawing canvas for creating a drawn message.

In accordance with some embodiments, an electronic device includes a touch-sensitive display unit configured to display a user interface and receive user contacts (including stylus contacts), one or more sensor units configured to detect signals from a stylus associated with the device, and a processing unit coupled with the touch-sensitive display unit and the one or more sensor units. The processing unit is configured to: enable display of, on the touch-sensitive display unit, a user interface of a communication application; detect an input that corresponds to a request to prepare a communication; and in response to detecting the input that corresponds to the request to prepare the communication: in accordance with a determination that the input is a finger input, enable display of a keyboard for typing a text message; and in accordance with a determination that the input is a stylus input, enable display of a drawing canvas for creating a drawn message.

In accordance with some embodiments, a method is performed at an electronic device with a touch-sensitive display, the device associated with a first person. The method includes displaying on the touch-sensitive display a user interface of a communication application, the user interface including an instant messaging conversation between the first person and a second person, the instant messaging conversation displaying content balloons with instant messages exchanged between the first person and a second person, and an input area; detecting selection of a digital image, the digital image containing a plurality of colors; in response to detecting selection of the digital image: displaying the digital image in the input area; and displaying a color palette that contains colors for drawing on the digital image in the input area, wherein the colors displayed in the color palette are based on the plurality of colors contained in the digital image; detecting an input that selects a first color in the color palette; while the first color in the color palette is selected: detecting one or more drawing inputs on the digital image in the input area; and drawing with the first color on the digital image in accordance with the one or more drawing inputs; detecting a request to send the digital image as drawn upon as an instant message to the second person in the instant messaging conversation; in response to detecting the request to send the digital image as drawn upon as an instant message: sending the digital image as drawn upon as an instant message to the second person in the instant messaging conversation; and displaying, on the touch-sensitive display, the digital image as drawn upon as an instant message in the instant messaging conversation.

In accordance with some embodiments, an electronic device associated with a first person includes a touch-sensitive display unit configured to display a user interface and receive user contacts (including stylus contacts) and a processing unit coupled with the touch-sensitive display unit. The processing unit is configured to: enable display of, on the touch-sensitive display unit, a user interface of a communication application, the user interface including an instant messaging conversation between the first person and a second person, the instant messaging conversation displaying content balloons with instant messages exchanged between the first person and a second person, and an input area; detect selection of a digital image, the digital image containing a plurality of colors; in response to detecting selection of the digital image: enable display of the digital image in the input area; and enable display of a color palette that contains colors for drawing on the digital image in the input area, wherein the colors displayed in the color palette are based on the plurality of colors contained in the digital image; detect an input that selects a first color in the color palette; while the first color in the color palette is selected: detect one or more drawing inputs on the digital image in the input area; and draw with the first color on the digital image in accordance with the one or more drawing inputs; detect a request to send the digital image as drawn upon as an instant message to the second person in the instant messaging conversation; and in response to detecting the request to send the digital image as drawn upon as an instant message: send the digital image as drawn upon as an instant message to the second person in the instant messaging conversation; and enable display of, on the touch-sensitive display unit, the digital image as drawn upon as an instant message in the instant messaging conversation.

In accordance with some embodiments, a method is performed at an electronic device with a touch-sensitive display, the device associated with a first person. The method includes displaying on the touch-sensitive display a user interface of a communication application, the user interface including: an instant messaging conversation between the first person and a second person, the instant messaging conversation displaying content balloons with instant messages exchanged between the first person and a second person, and an input area; receiving a signal that indicates the second person is preparing an instant message; in response to receiving the signal that indicates the second person is preparing an instant message: in accordance with a determination that the second person is typing the instant message, displaying a typed-message-preparation indicator in the user interface of the communication application; and in accordance with a determination that the second person is drawing the instant message, displaying a drawn-message-preparation indicator, distinct from the typed-message-preparation indicator, in the user interface of the communication application; receiving the instant message prepared by the second person; and, in response to receiving the instant message prepared by the second person that corresponds to the displayed message preparation indicator: ceasing to display the typed-message-preparation indicator or the drawn-message-preparation indicator; and displaying a content balloon that contains the instant message prepared by the second person in the instant messaging conversation In accordance with some embodiments, an electronic device associated with a first person includes a touch-sensitive display unit configured to display a user interface and receive user contacts (including stylus contacts) and a processing unit coupled with the touch-sensitive display unit. The processing unit is configured to: enable display of, on the touch-sensitive display unit, a user interface of a communication application, the user interface including an instant messaging conversation between the first person and a second person, the instant messaging conversation displaying content balloons with instant messages exchanged between the first person and a second person, and an input area; receive a signal that indicates the second person is preparing an instant message; in response to receiving the signal that indicates the second person is preparing an instant message: in accordance with a determination that the second person is typing the instant message, enable display of a typed-message-preparation indicator in the user interface of the communication application; and in accordance with a determination that the second person is drawing the instant message, enable display of a drawn-message-preparation indicator, distinct from the typed-message-preparation indicator, in the user interface of the communication application; receive the instant message prepared by the second person; and, in response to receiving the instant message prepared by the second person that corresponds to the displayed message preparation indicator: cease to enable display of the typed-message-preparation indicator or the drawn-message-preparation indicator; and enable display of a content balloon that contains the instant message prepared by the second person in the instant messaging conversation.

Thus, electronic devices with touch-sensitive displays and optionally one or more sensors to detect signals from a stylus associated with the device are provided with faster, more efficient methods for preparing messages with stylus and finger inputs, thereby increasing the effectiveness, efficiency, and user satisfaction with such devices. Such methods may complement or replace conventional methods for preparing messages with stylus and finger inputs.

Disclosed herein are electronic devices with improved methods for accessing a drawing application in a locked device. Such methods optionally complement or replace conventional methods for accessing a drawing application in a locked device. Such methods reduce the number, extent, and/or nature of the inputs from a user and produce a more efficient human-machine interface. For battery-operated devices, such methods conserve power and increase the time between battery charges.

In accordance with some embodiments, a method is performed at an electronic device with a touch-sensitive display, the device including one or more sensors to detect signals from a stylus associated with the device. The method includes, while the electronic device is in a locked state: displaying a lock screen user interface on the touch-sensitive display; while displaying the lock screen user interface on the touch-sensitive display, detecting a first input from the stylus to draw on the touch-sensitive display; in response to detecting the first input from the stylus to draw, displaying, over the lock screen user interface, one or more marks of a drawing that correspond to the first input from the stylus; while displaying, on the lock screen user interface, the one or more marks of the drawing that correspond to the first input from the stylus: detecting a second input from the stylus to display a drawing application in a restricted mode; and, in response to detecting the second input from the stylus to display the drawing application, executing the drawing application in the restricted mode and displaying the one or more marks of the drawing in the drawing application.

In accordance with some embodiments, an electronic device includes a touch-sensitive display unit configured to display a user interface and receive user contacts (including stylus contacts), one or more sensor units configured to detect signals from a stylus associated with the device, and a processing unit coupled with the touch-sensitive display unit and the one or more sensor units. The processing unit is configured to: while the electronic device is in a locked state: enable display of a lock screen user interface on the touch-sensitive display unit; while enabling display of the lock screen user interface on the touch-sensitive display unit, detect a first input from the stylus to draw on the touch-sensitive display unit; in response to detecting the first input from the stylus to draw, enable display of, over the lock screen user interface, one or more marks of a drawing that correspond to the first input from the stylus; while enabling display of, on the lock screen user interface, the one or more marks of the drawing that correspond to the first input from the stylus: detect a second input from the stylus to display a drawing application in a restricted mode; and, in response to detecting the second input from the stylus to display the drawing application, execute the drawing application in the restricted mode and enable display of the one or more marks of the drawing in the drawing application.

In accordance with some embodiments, a method is performed at an electronic device with a touch-sensitive display, the device including one or more sensors to detect signals from a stylus associated with the device. The method includes, while the electronic device is in a locked state: displaying a lock screen user interface on the touch-sensitive display; while displaying the lock screen user interface on the touch-sensitive display, detecting a user input; in accordance with a determination that the user input is a predefined input with the stylus, replacing display of the lock screen user interface with display of a drawing application in a restricted session; and in accordance with a determination that the user input is a finger touch input, maintaining display of the lock screen user interface and forgoing display of the drawing application.

In accordance with some embodiments, an electronic device includes a touch-sensitive display unit configured to display a user interface and receive user contacts (including stylus contacts), one or more sensor units configured to detect signals from a stylus associated with the device, and a processing unit coupled with the touch-sensitive display unit and the one or more sensor units. The processing unit is configured to: while the electronic device is in a locked state: enable display of a lock screen user interface on the touch-sensitive display unit; while enabling display of the lock screen user interface on the touch-sensitive display unit, detect a user input; in accordance with a determination that the user input is a predefined input with the stylus, replace display of the lock screen user interface with display of a drawing application in a restricted session; and in accordance with a determination that the user input is a finger touch input, maintain display of the lock screen user interface and forgo display of the drawing application.

In accordance with some embodiments, a method is performed at an electronic device with a touch-sensitive display, the device including one or more sensors to detect signals from a stylus associated with the device. The method includes, while the electronic device is in a locked state: displaying a lock screen user interface on the touch-sensitive display, the lock screen user interface including a lock screen image; while displaying the lock screen user interface on the touch-sensitive display, detecting a first input by the stylus on the touch-sensitive display, wherein detecting the first input includes: detecting an initial contact by the stylus on the touch-sensitive display at a beginning of the first input; detecting a movement of the stylus across the touch-sensitive display during the first input; and detecting a liftoff of the stylus from the touch-sensitive display at an end of the first input; in response to detecting the movement of the stylus across the touch-sensitive display, drawing a first mark that is displayed on top of the lock screen image in accordance with the movement of the stylus across the touch-sensitive display; in response to detecting the liftoff of the stylus from the touch-sensitive display: ceasing to display the lock screen user interface, including ceasing to display the lock screen image; displaying a user interface for a drawing application in a restricted session; and displaying the first mark, which was drawn in accordance with the movement of the stylus across the touch-sensitive display during the first input, in the user interface for the drawing application in the restricted session; while displaying the user interface for the drawing application in the restricted session, detecting a second input by the stylus on the touch-sensitive display; and, in response to detecting the second input by the stylus on the touch-sensitive display, drawing a second mark that is displayed along with the first mark in the user interface for the drawing application in the restricted session.

In accordance with some embodiments, an electronic device includes a touch-sensitive display unit configured to display a user interface and receive user contacts (including stylus contacts), one or more sensor units configured to detect signals from a stylus associated with the device, and a processing unit coupled with the touch-sensitive display unit and the one or more sensor units. The processing unit is configured to: while the electronic device is in a locked state: enable display of a lock screen user interface on the touch-sensitive display unit, the lock screen user interface including a lock screen image; while enabling display of the lock screen user interface on the touch-sensitive display unit, detect a first input by the stylus on the touch-sensitive display unit, wherein detecting the first input includes: detecting an initial contact by the stylus on the touch-sensitive display unit at a beginning of the first input; detecting a movement of the stylus across the touch-sensitive display unit during the first input; and detecting a liftoff of the stylus from the touch-sensitive display unit at an end of the first input; in response to detecting the movement of the stylus across the touch-sensitive display unit, draw a first mark that is displayed on top of the lock screen image in accordance with the movement of the stylus across the touch-sensitive display unit; in response to detecting the liftoff of the stylus from the touch-sensitive display unit: cease to enable display of the lock screen user interface, including ceasing to display the lock screen image; enable display of a user interface for a drawing application in a restricted session; and enable display of the first mark, which was drawn in accordance with the movement of the stylus across the touch-sensitive display unit during the first input, in the user interface for the drawing application in the restricted session; while enabling display of the user interface for the drawing application in the restricted session, detect a second input by the stylus on the touch-sensitive display unit; and, in response to detecting the second input by the stylus on the touch-sensitive display unit, draw a second mark that is displayed along with the first mark in the user interface for the drawing application in the restricted session.

Thus, electronic devices with touch-sensitive displays and one or more sensors to detect signals from a stylus associated with the device are provided with faster, more efficient methods for accessing a drawing application in a locked device, thereby increasing the effectiveness, efficiency, and user satisfaction with such devices. Such methods may complement or replace conventional methods for accessing a drawing application in a locked device.

Disclosed herein are electronic devices with faster, more efficient methods for selecting and using virtual drawing implements using a stylus. Such methods optionally complement or replace conventional methods for emulating virtual drawing implements using a stylus. Such methods reduce the number, extent, and/or nature of the inputs from a user and produce a more efficient human-machine interface. For battery-operated devices, such methods conserve power and increase the time between battery charges.

In accordance with some embodiments, a method is performed at an electronic device with a display, a touch-sensitive surface, and one or more sensors to detect signals from a stylus associated with the device. The method includes: displaying an electronic document on the display; while displaying the electronic document on the display, detecting a first input from the stylus, wherein detecting the first input includes detecting an initial contact by the stylus on the touch-sensitive surface; determining a plurality of characteristics of the first input from the stylus, including a tilt of the stylus, wherein the tilt of the stylus is an angle relative to a normal to a surface of the touch-sensitive surface; in accordance with a determination that the tilt meets one or more selection criteria for a first virtual drawing implement, selecting the first virtual drawing implement for the stylus to emulate; in accordance with a determination that the tilt meets one or more selection criteria for a second virtual drawing implement, selecting the second virtual drawing implement for the stylus to emulate, wherein the second virtual drawing implement is distinct from the first virtual drawing implement; and, after selecting one of the first virtual drawing implement and the second virtual drawing implement for the stylus to emulate, generating a mark in the electronic document with the selected virtual drawing implement in response to detecting the first input from the stylus.

In accordance with some embodiments, an electronic device includes a display unit configured to display a user interface, a touch-sensitive surface unit configured to receive user contacts (including stylus contacts), one or more sensor units configured to detect signals from a stylus associated with the device, and a processing unit coupled with the display unit, the touch-sensitive surface unit and the one or more sensor units. The processing unit is configured to: enable display of an electronic document on the display unit; while enabling display of the electronic document on the display unit, detect a first input from the stylus, wherein detecting the first input includes detecting an initial contact by the stylus on the touch-sensitive surface unit; determine a plurality of characteristics of the first input from the stylus, including a tilt of the stylus, wherein the tilt of the stylus is an angle relative to a normal to a surface of the touch-sensitive surface unit; in accordance with a determination that the tilt meets one or more selection criteria for a first virtual drawing implement, select the first virtual drawing implement for the stylus to emulate; in accordance with a determination that the tilt meets one or more selection criteria for a second virtual drawing implement, select the second virtual drawing implement for the stylus to emulate, wherein the second virtual drawing implement is distinct from the first virtual drawing implement; and, after selecting one of the first virtual drawing implement and the second virtual drawing implement for the stylus to emulate, generate a mark in the electronic document with the selected virtual drawing implement in response to detecting the first input from the stylus.

Thus, electronic devices with displays, touch-sensitive surfaces, one or more sensors to detect signals from a stylus associated with the device, and optionally one or more sensors to detect intensity of contacts with the touch-sensitive surface are provided with faster, more efficient methods for emulating virtual drawing implements using a stylus, thereby increasing the effectiveness, efficiency, and user satisfaction with such devices. Such methods may complement or replace conventional methods for emulating virtual drawing implements using a stylus.

Disclosed herein are electronic devices with improved methods for creating an event in a calendar using hand-drawn input. Such methods optionally complement or replace conventional methods for creating calendar events. Such methods reduce the number, extent, and/or nature of the inputs from a user and produce a more efficient human-machine interface. For battery-operated devices, such methods conserve power and increase the time between battery charges.

In accordance with some embodiments, a method is performed at an electronic device with a touch-sensitive display. The method includes displaying an electronic calendar on the touch-sensitive display, the displayed calendar including an area that corresponds to a first day. The method further includes detecting a hand-drawn input on the touch-sensitive display, wherein the hand-drawn input extends over a vertical portion, less than all, of the first day in the displayed calendar. The method further includes, in response to detecting the hand-drawn input, displaying, over the vertical portion of the first day, graphics that correspond to the hand-drawn input. The method further includes, while displaying, over the vertical portion of the first day, the graphics that correspond to the hand-drawn input, detecting an input that corresponds to a request to create an event in the electronic calendar; and, in response to detecting the input that corresponds to a request to create an event in the electronic calendar, creating, in the first day in the electronic calendar, an event with a start time and an end time, wherein the start time and the end time of the event are in accordance with the vertical portion of the first day.

In accordance with some embodiments, an electronic device includes a touch-sensitive display unit and a processing unit coupled with the touch-sensitive display unit. The touch-sensitive display unit is configured to display an electronic calendar on the touch-sensitive display unit, the displayed calendar including an area that corresponds to a first day. The touch-sensitive display unit is further configured to detect a hand-drawn input on the touch-sensitive display unit, wherein the hand-drawn input extends over a vertical portion, less than all, of the first day in the displayed calendar. The touch-sensitive display unit is further configured to, in response to detecting the hand-drawn input, display, over the vertical portion of the first day, graphics that correspond to the hand-drawn input; and, while displaying, over the vertical portion of the first day, the graphics that correspond to the hand-drawn input, detect an input that corresponds to a request to create an event in the electronic calendar. The processing unit is configured to, in response to detecting the input that corresponds to a request to create an event in the electronic calendar, create, in the first day in the electronic calendar, an event with a start time and an end time, wherein the start time and the end time of the event are in accordance with the vertical portion of the first day.

Thus, electronic devices with touch-sensitive displays, and optionally one or more sensors to detect intensity of contacts with the touch-sensitive surface, are provided with faster, more efficient methods for creating a calendar event, thereby increasing the effectiveness, efficiency, and user satisfaction with such devices. Such methods may complement or replace conventional methods for creating a calendar event.

Disclosed herein are electronic devices with improved methods for selecting a portion of video. Such methods optionally complement or replace conventional methods for selecting a portion of video. Such methods reduce the number, extent, and/or nature of the inputs from a user and produce a more efficient human-machine interface. For battery-operated devices, such methods conserve power and increase the time between battery charges.

In accordance with some embodiments, a method is performed at an electronic device with a touch-sensitive display. The method includes displaying a video editing application including a timeline area for a video being edited. The method further includes detecting a gesture by a contact on the touch-sensitive display. The gesture includes an initial contact with the timeline area by the contact, the initial contact occurring at a first time position in the timeline area; movement of the contact across the touch-sensitive display after the initial contact with the timeline area; and lift off of the contact at a location on the touch-sensitive display that corresponds to a second time position in the timeline area. The method additionally includes, in response to detecting the gesture by the contact on the touch-sensitive display, selecting a portion of the video being edited. The selected portion of the video starts at the first time position and ends at the second time position.

In accordance with some embodiments, an electronic device includes a touch-sensitive display unit and a processing unit coupled to the touch-sensitive display unit. The touch-sensitive display unit is configured to display a video application, the displayed video application including a timeline area for video being edited. The processing unit is configured to detect a gesture by a contact on the touch-sensitive display unit. The gesture includes an initial contact with the timeline area by the contact, the initial contact occurring at a first time position in the timeline area; movement of the contact across the touch-sensitive display unit after the initial contact with the timeline area; and lift off of the contact at a location on the touch-sensitive display unit that corresponds to a second time position in the timeline area. The processing unit is also configured to, in response to detecting the gesture by the contact on the touch-sensitive display unit, select a portion of the video being edited, wherein the selected portion of the video starts at the first time position and ends at the second time position.

Thus, electronic devices with displays, touch-sensitive surfaces and optionally one or more sensors to detect intensity of contacts with the touch-sensitive surface are provided with faster, more efficient methods for selecting a portion of video, thereby increasing the effectiveness, efficiency, and user satisfaction with such devices. Such methods may complement or replace conventional methods for selecting a portion of video.

Disclosed herein are electronic devices with improved methods for displaying and using a menu with a stylus. Such methods optionally complement or replace conventional methods for displaying and using a menu. Such methods reduce the number, extent, and/or nature of the inputs from a user and produce a more efficient human-machine interface. For battery-operated devices, such methods conserve power and increase the time between battery charges.

In accordance with some embodiments, a method is performed at an electronic device with a touch-sensitive display, wherein the device includes one or more sensors to detect signals from a stylus associated with the device. The method includes displaying a user interface on the touch-sensitive display; while displaying the user interface on the touch-sensitive display, detecting the stylus moving towards the touch-sensitive display, without the stylus making contact with the touch-sensitive display; determining whether the detected stylus movement towards the touch-sensitive display, without making contact with the touch-sensitive display, satisfies one or more stylus movement criteria; in accordance with a determination that the detected stylus movement satisfies the one or more stylus movement criteria, displaying a menu overlaid on the user interface, the menu including a plurality of selectable menu options; detecting selection of a first menu option in the plurality of selectable menu options; and, in response to detecting selection of the first menu option in the plurality of selectable menu options: performing an operation that corresponds to the first menu option, and ceasing to display the menu.

In accordance with some embodiments, an electronic device includes a touch-sensitive display unit configured to display a user interface and receive user contacts (including stylus contacts), one or more sensor units configured to detect signals from a stylus associated with the device, and a processing unit coupled with the touch-sensitive display unit and the one or more sensor units. The processing unit is configured to: enable display of a user interface on the touch-sensitive display unit; while enabling display of the user interface on the touch-sensitive display unit, detect the stylus moving towards the touch-sensitive display unit, without the stylus making contact with the touch-sensitive display unit; determine whether the detected stylus movement towards the touch-sensitive display unit, without making contact with the touch-sensitive display unit, satisfies one or more stylus movement criteria; in accordance with a determination that the detected stylus movement satisfies the one or more stylus movement criteria, enable display of a menu overlaid on the user interface, the menu including a plurality of selectable menu options; detect selection of a first menu option in the plurality of selectable menu options; and, in response to detecting selection of the first menu option in the plurality of selectable menu options: perform an operation that corresponds to the first menu option, and cease to display the menu.

Thus, electronic devices with touch-sensitive displays and one or more sensors to detect signals from a stylus associated with the device are provided with faster, more efficient methods for displaying and using a menu with a stylus, thereby increasing the effectiveness, efficiency, and user satisfaction with such devices. Such methods may complement or replace conventional methods for displaying a menu.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described above, which are updated in response to inputs, as described in any of the methods described herein. In accordance with some embodiments, an electronic device includes: a display, a touch-sensitive surface, and optionally one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods for manipulating user interfaces with a stylus, thereby increasing the effectiveness, efficiency, and user satisfaction with such devices. Such methods may complement or replace conventional methods for manipulating user interfaces with a stylus.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7J illustrate exemplary user interfaces for displaying and updating an indication corresponding to a positional state of a stylus in accordance with some embodiments.

FIGS. 8A-8D are flow diagrams illustrating a method of displaying and updating an indication corresponding to a positional state of a stylus in accordance with some embodiments.

FIGS. 10A-10K illustrate exemplary user interfaces for displaying and updating an indication that corresponds to a positional state of a stylus in accordance with some embodiments.

FIGS. 11A-11D are flow diagrams illustrating a method of displaying and updating an indication that corresponds to a positional state of a stylus in accordance with some embodiments.

FIGS. 14A-14E are flow diagrams illustrating a method of adjusting one or more characteristics of a mark in accordance with characteristics of an input from a stylus in accordance with some embodiments.

FIGS. 17A-17C, 18A-18B, and 19 are flow diagrams illustrating methods of preparing messages with stylus and finger inputs in accordance with some embodiments.

FIGS. 23A-23B are flow diagrams illustrating a method of accessing a drawing application in a locked device in accordance with some embodiments.

FIGS. 24A-24B are flow diagrams illustrating a method of accessing a drawing application in a locked device in accordance with some embodiments.

FIGS. 26A-26H illustrate exemplary user interfaces for selecting and using virtual drawing implements using a stylus in accordance with some embodiments.

FIGS. 27A-27C are flow diagrams illustrating a method of selecting and using virtual drawing implements using a stylus in accordance with some embodiments.

FIGS. 30A-30D are flow diagrams illustrating a method of calendar event creation in accordance with some embodiments.

FIGS. 33A-33B are flow diagrams illustrating a method of selecting a portion of video in accordance with some embodiments.

FIGS. 36A-36C are flow diagrams illustrating a method of displaying and using a menu with a stylus in accordance with some embodiments.

DESCRIPTION OF EMBODIMENTS

Figure 13A:
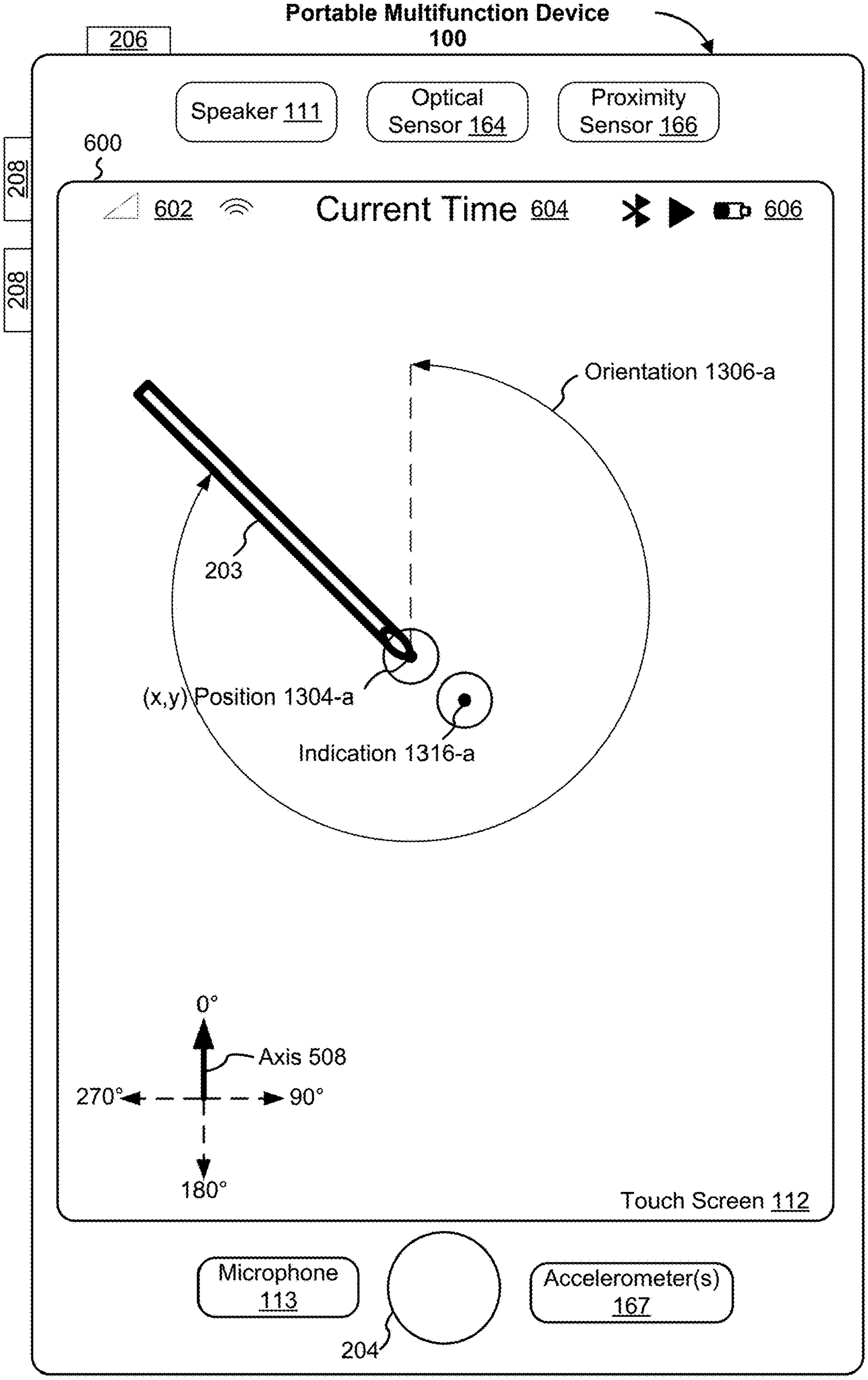
FIGS. 13A-13O illustrate exemplary user interfaces for adjusting one or more characteristics of a mark in accordance with characteristics of an input from a stylus in accordance with some embodiments.
Figure 16A:
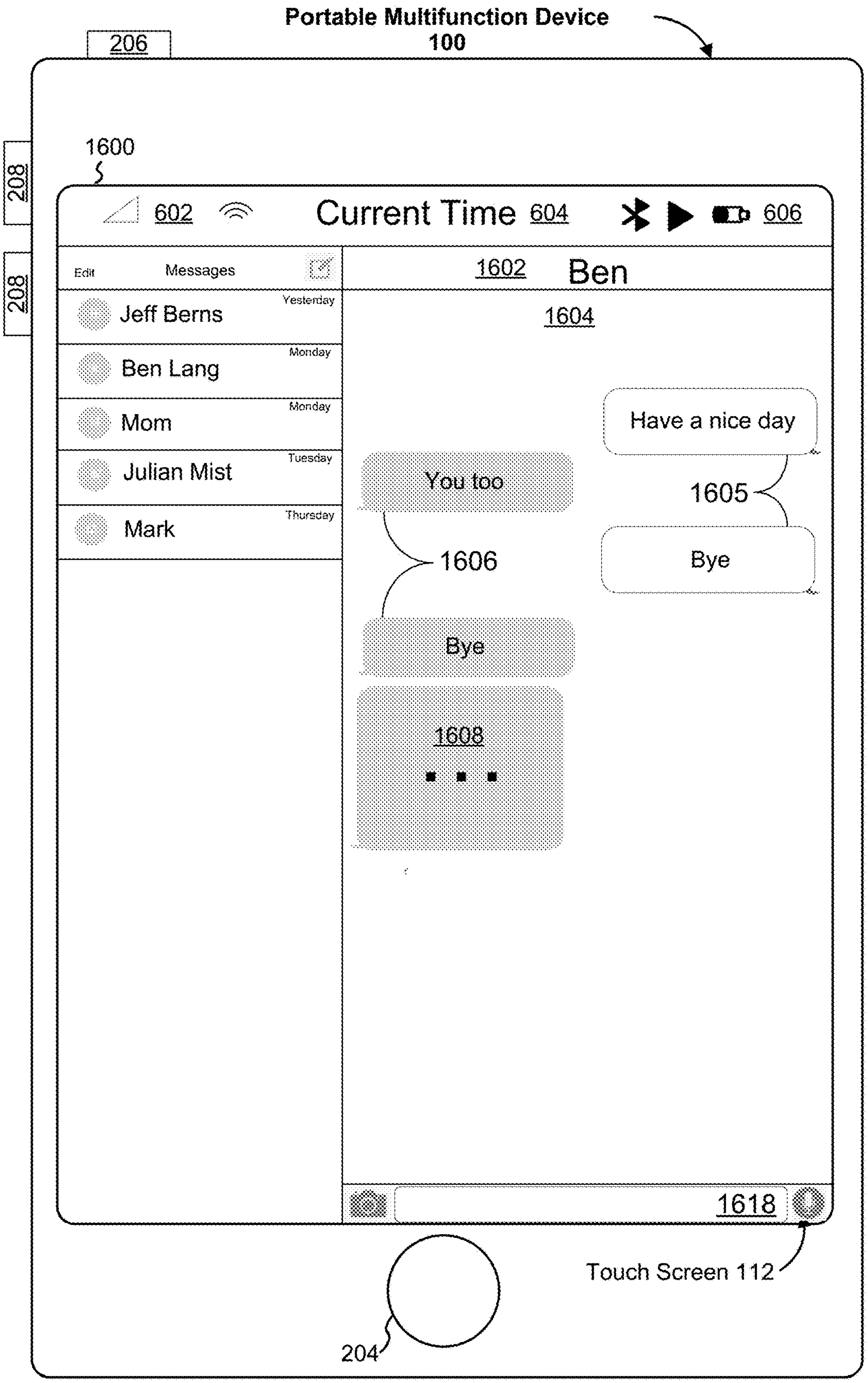
FIGS. 16A-16N illustrate exemplary user interfaces for preparing messages with stylus and finger inputs in accordance with some embodiments.

A number of different approaches for manipulating user interfaces with a stylus are described herein. Using one or more of these approaches (optionally in conjunction with each other) reduces the number, extent, and/or nature of the inputs from a user and provides a more efficient human-machine interface. This enables users to use styluses with devices that have touch-sensitive surfaces faster and more efficiently. For battery-operated devices, these improvements conserve power and increase the time between battery charges. For ease of explanation, devices and methods including illustrative examples of some of these approaches are described below, as follows:

- FIGS. 7A-7J illustrate exemplary user interfaces for displaying and updating an indication corresponding to a positional state of a stylus before the stylus touches a touch-sensitive surface. FIGS. 8A-8D are flow diagrams illustrating a method of displaying and updating an indication corresponding to a positional state of a stylus before the stylus touches a touch-sensitive surface. The user interfaces in FIGS. 7A-7J are used to illustrate the processes in FIGS. 8A-8D.
- FIGS. 10A-10K illustrate exemplary user interfaces for displaying and updating an indication that corresponds to a positional state of a stylus while the stylus touches a touch-sensitive surface. FIGS. 11A-11D are flow diagrams illustrating a method of displaying and updating an indication that corresponds to a positional state of a stylus while the stylus touches a touch-sensitive surface. The user interfaces in FIGS. 10A-10K are used to illustrate the processes in FIGS. 11A-11D.
- FIGS. 13A-13O illustrate exemplary user interfaces for adjusting one or more characteristics of a mark in accordance with characteristics of an input from a stylus. FIGS. 14A-14E are flow diagrams illustrating a method of adjusting one or more characteristics of a mark in accordance with characteristics of an input from a stylus. The user interfaces in FIGS. 13A-13O are used to illustrate the processes in FIGS. 14A-14E.
- FIGS. 16A-16N illustrate exemplary user interfaces for preparing messages with stylus and finger inputs. FIGS. 17A-17C, 18A-18B, and 19 are flow diagrams illustrating methods of preparing messages with stylus and finger inputs. The user interfaces in FIGS. 16A-

16N are used to illustrate the processes in FIGS. 17A-17C, 18A-18B, and 19.

Figure 21A:
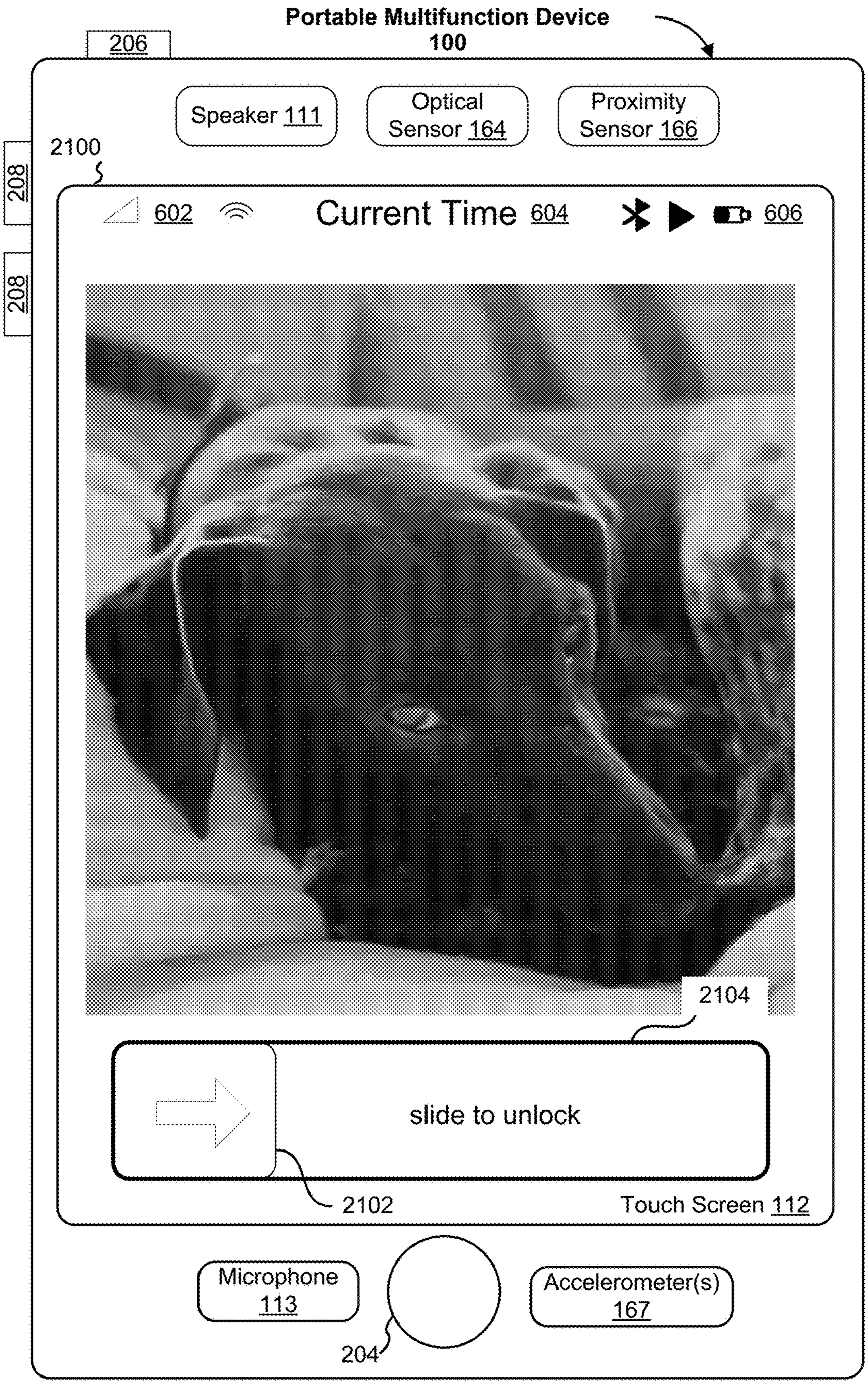
FIGS. 21A-21Q illustrate exemplary user interfaces for accessing a drawing application in a locked device in accordance with some embodiments.
Figure 21B:
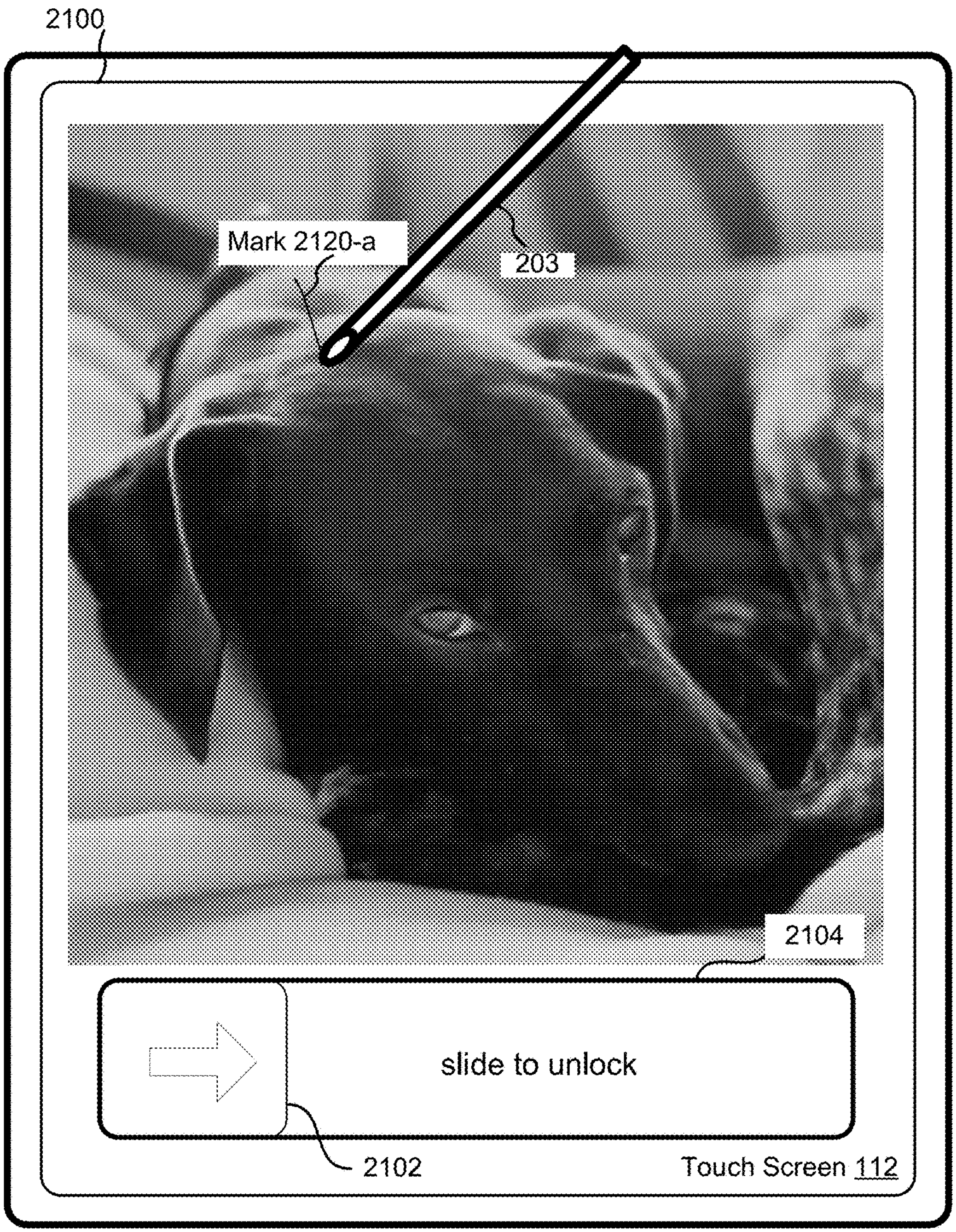
Figure 21C:
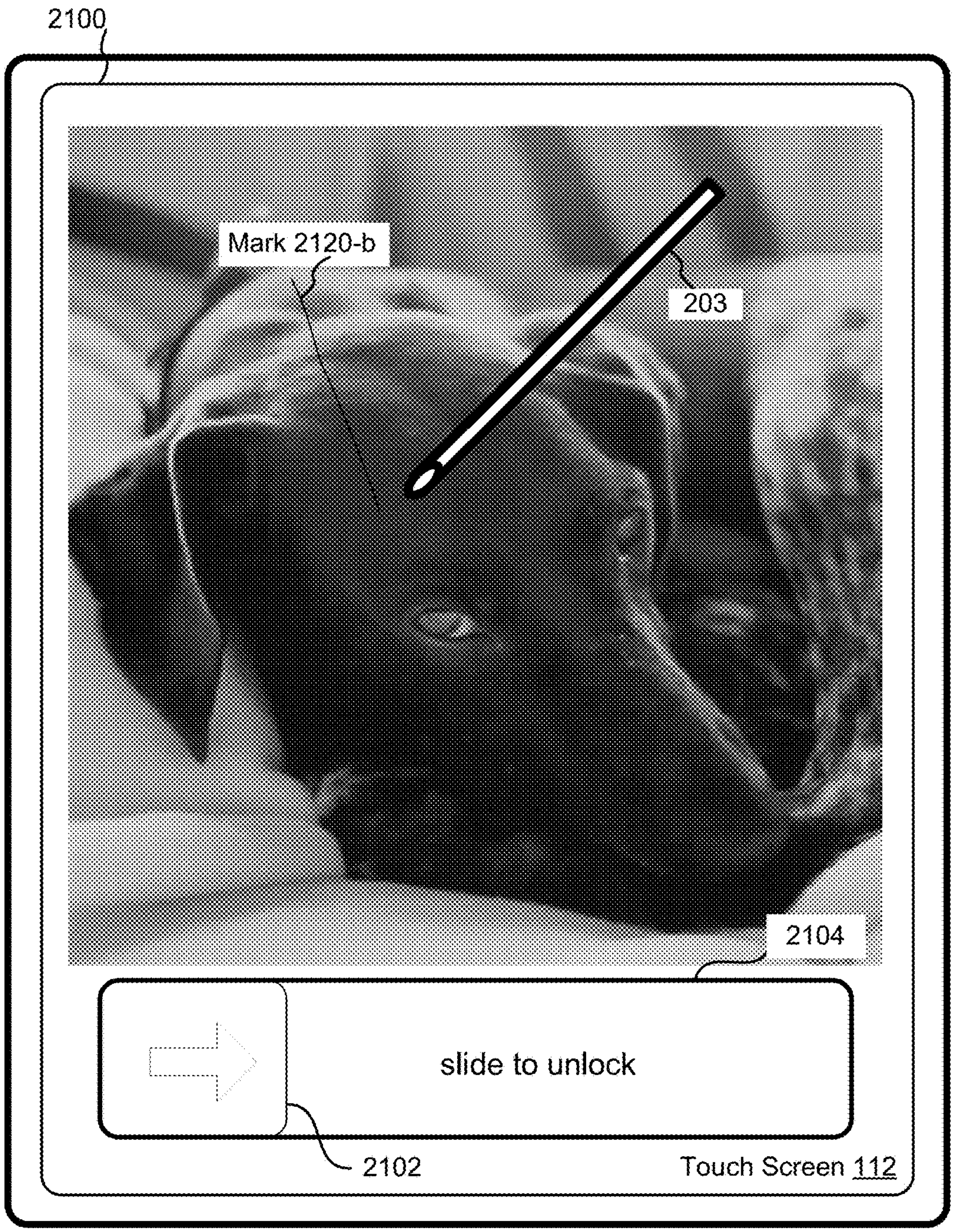
Figure 21D:
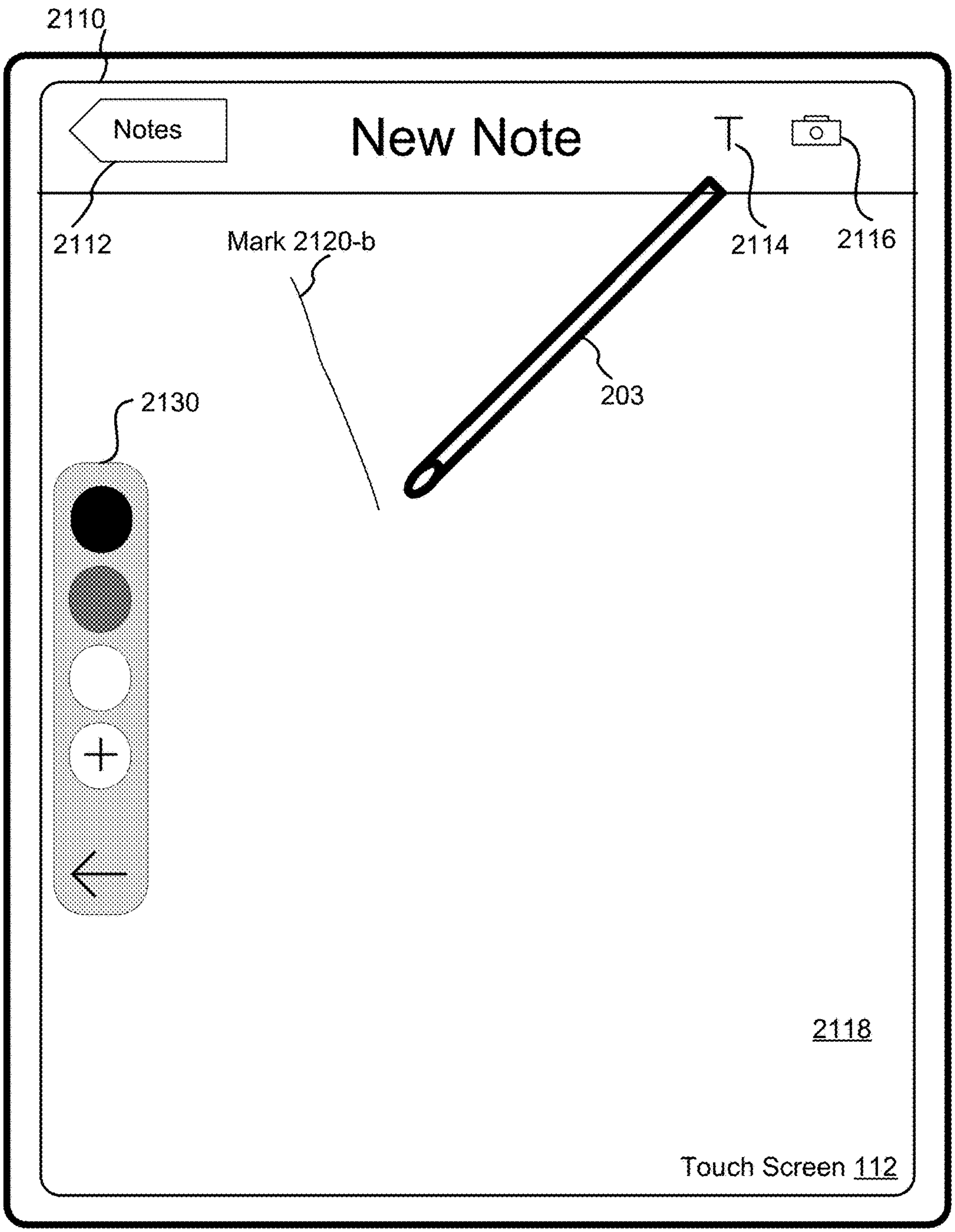
Figure 21E:
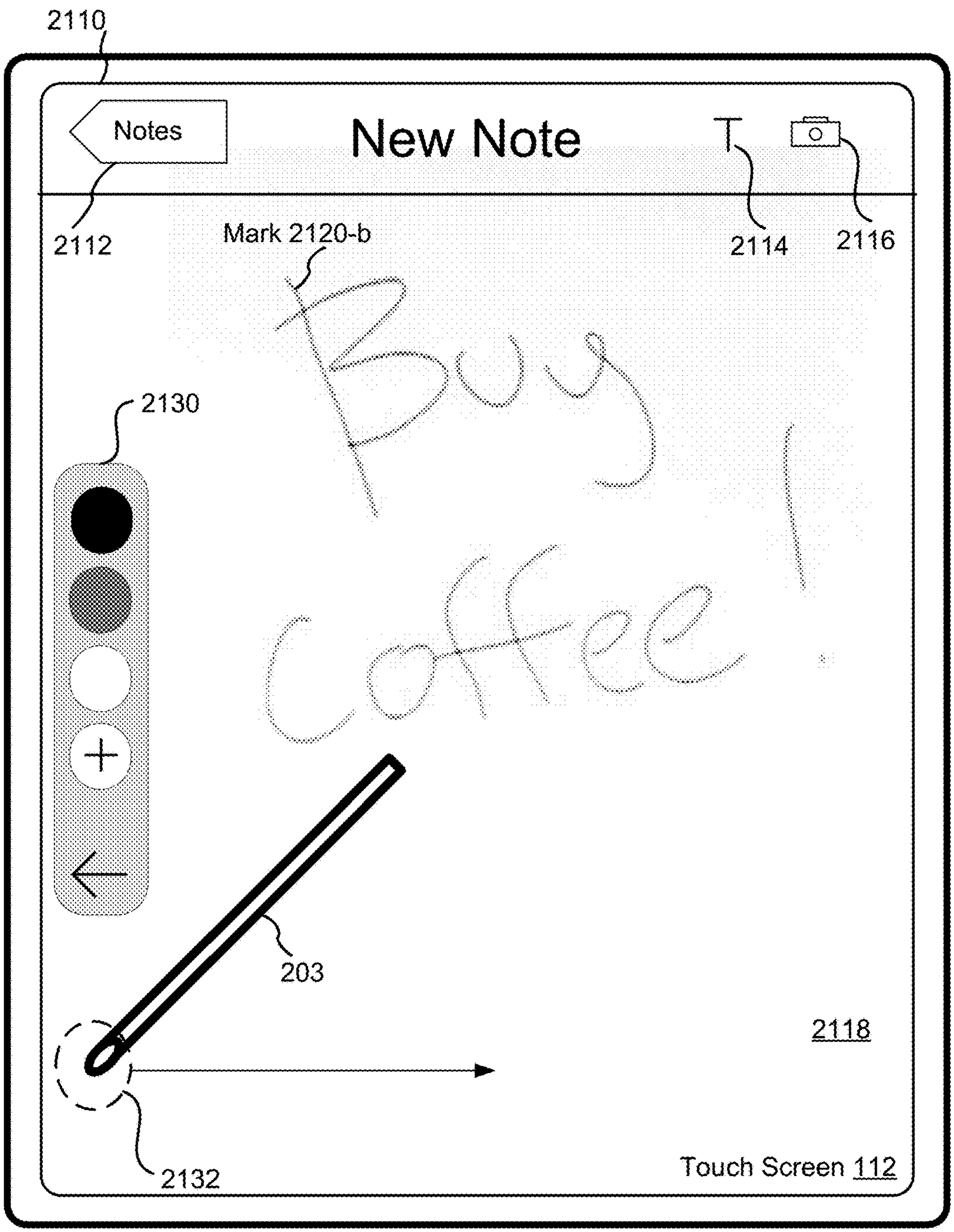
Figure 21F:
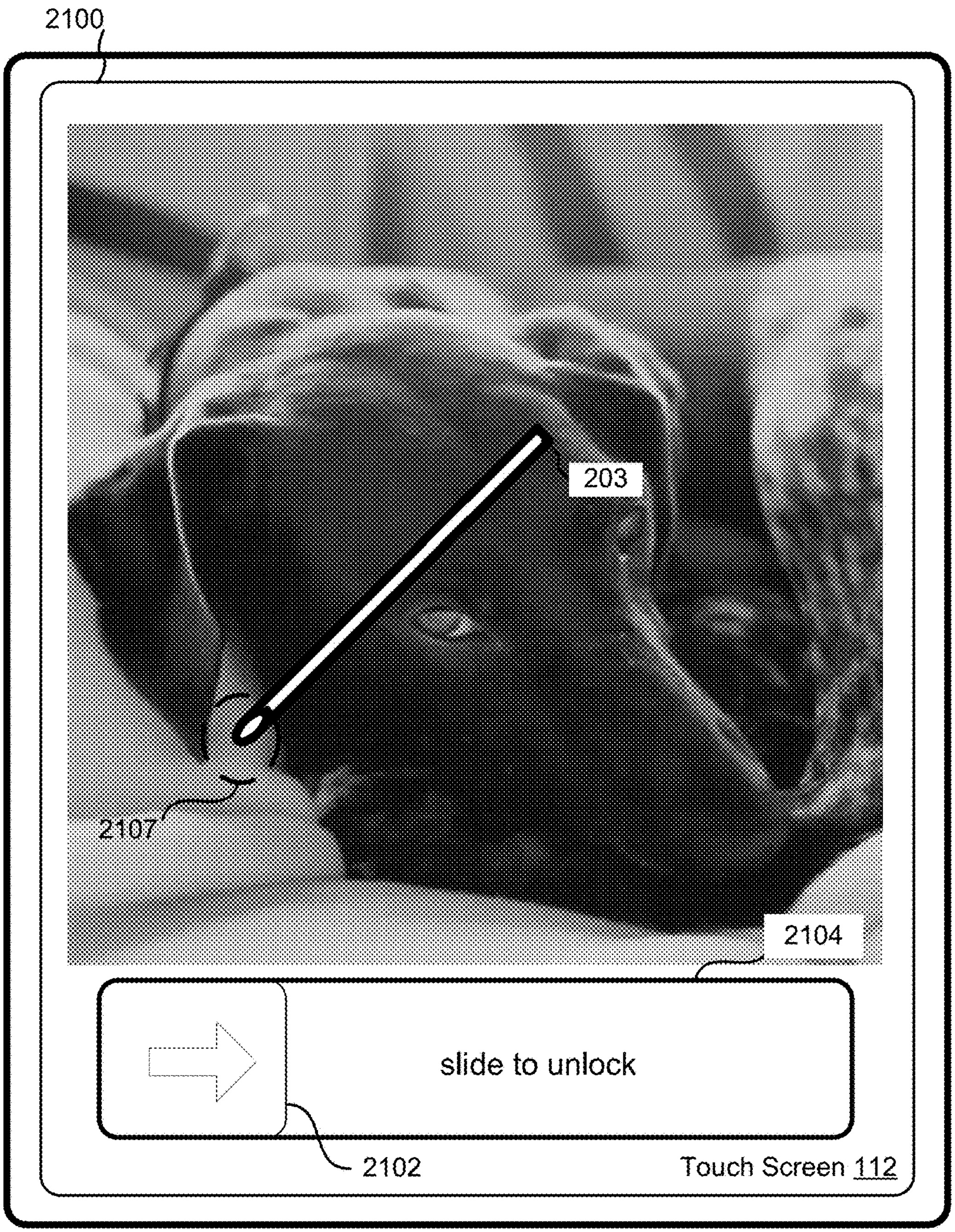
Figure 21G:
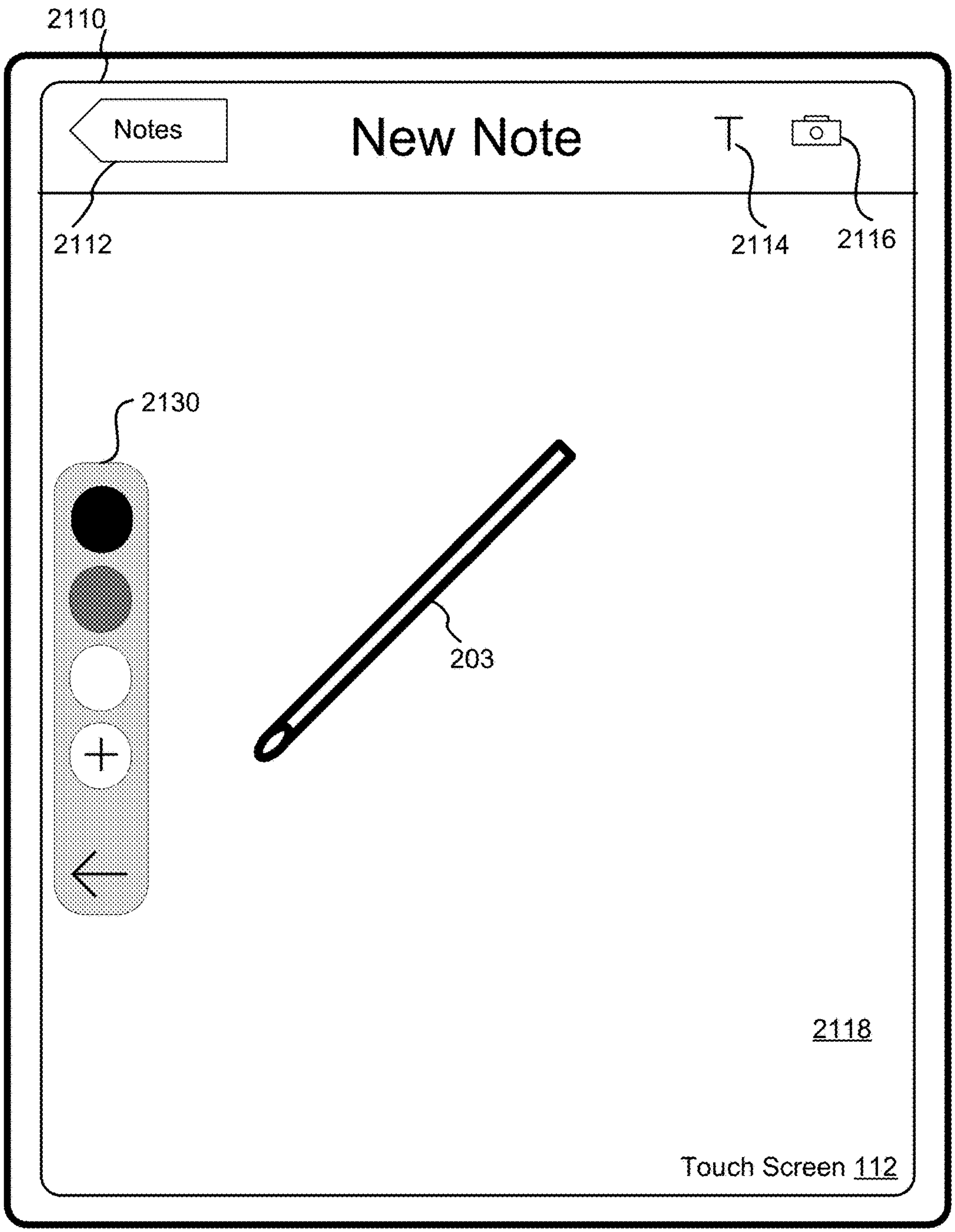
Figure 21H:
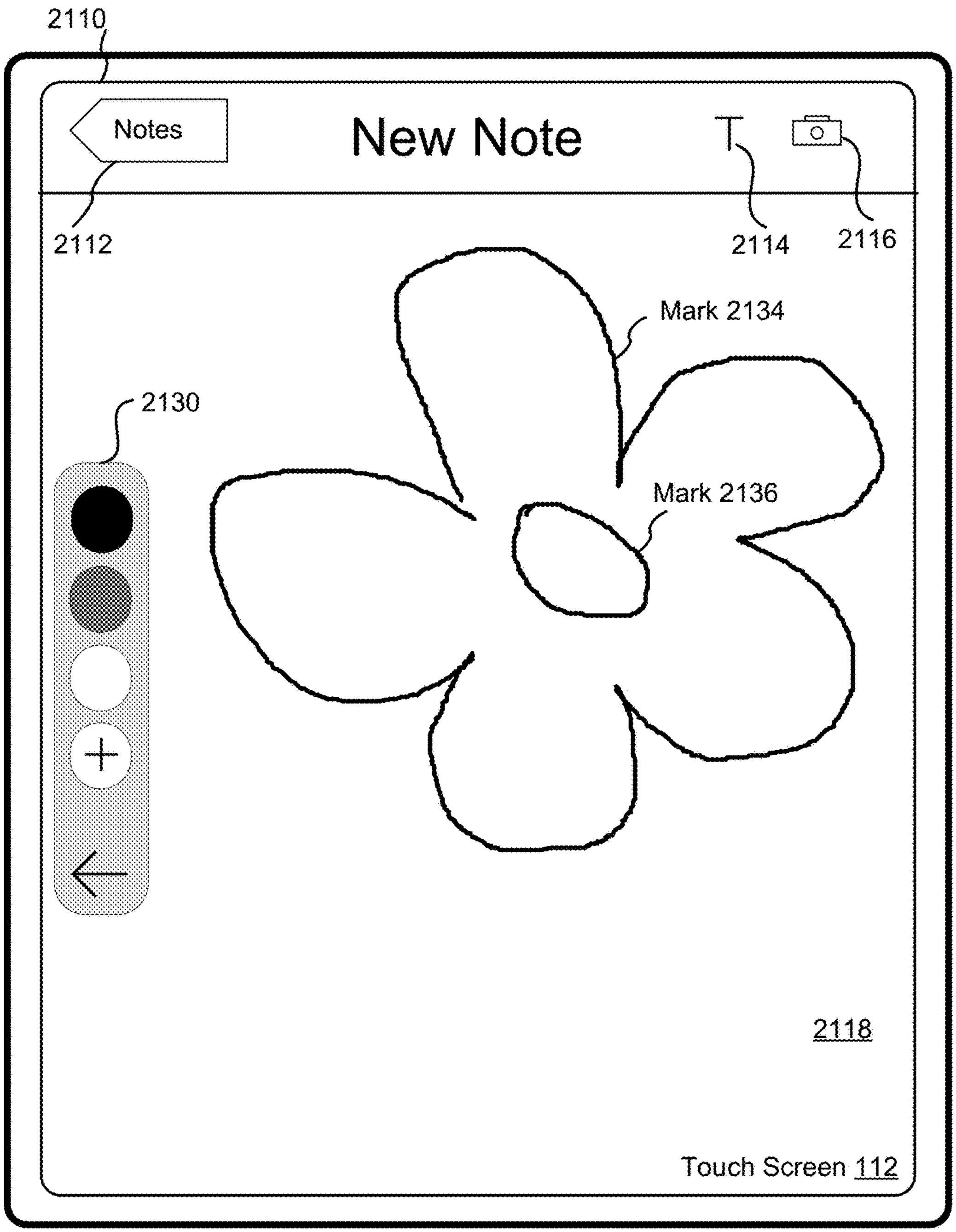
Figure 21I:
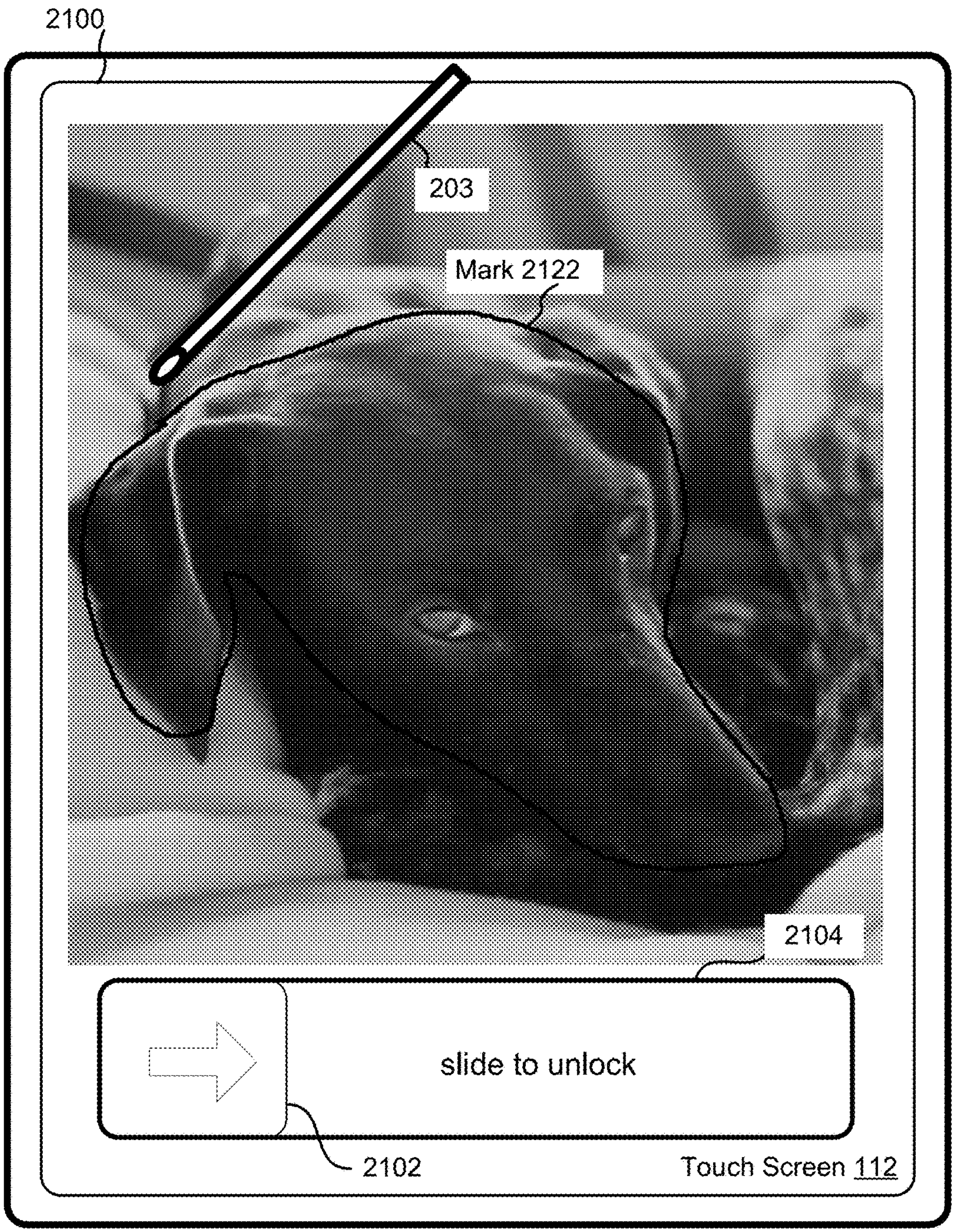
Figure 21J:
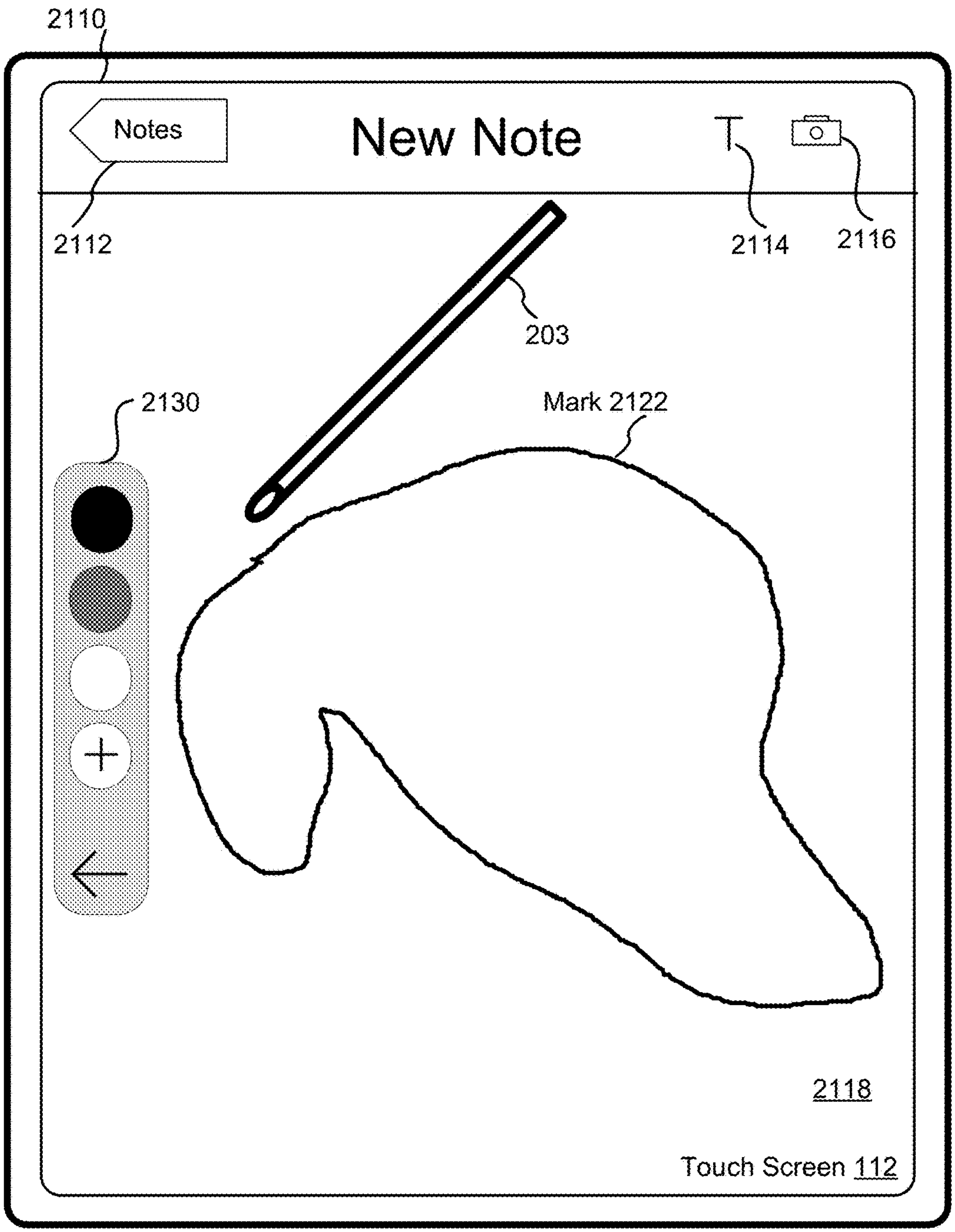
Figure 21K:
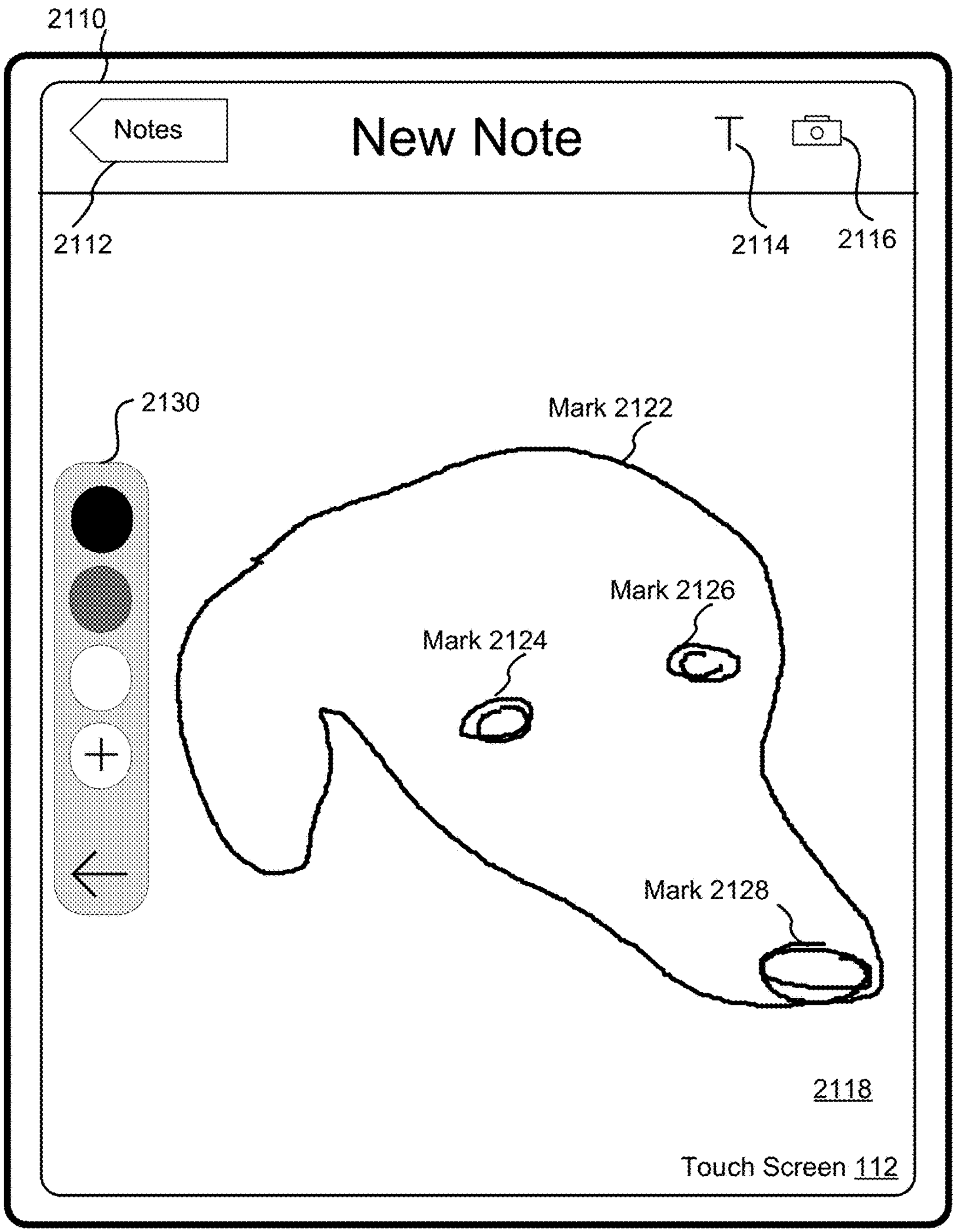
Figure 21L:
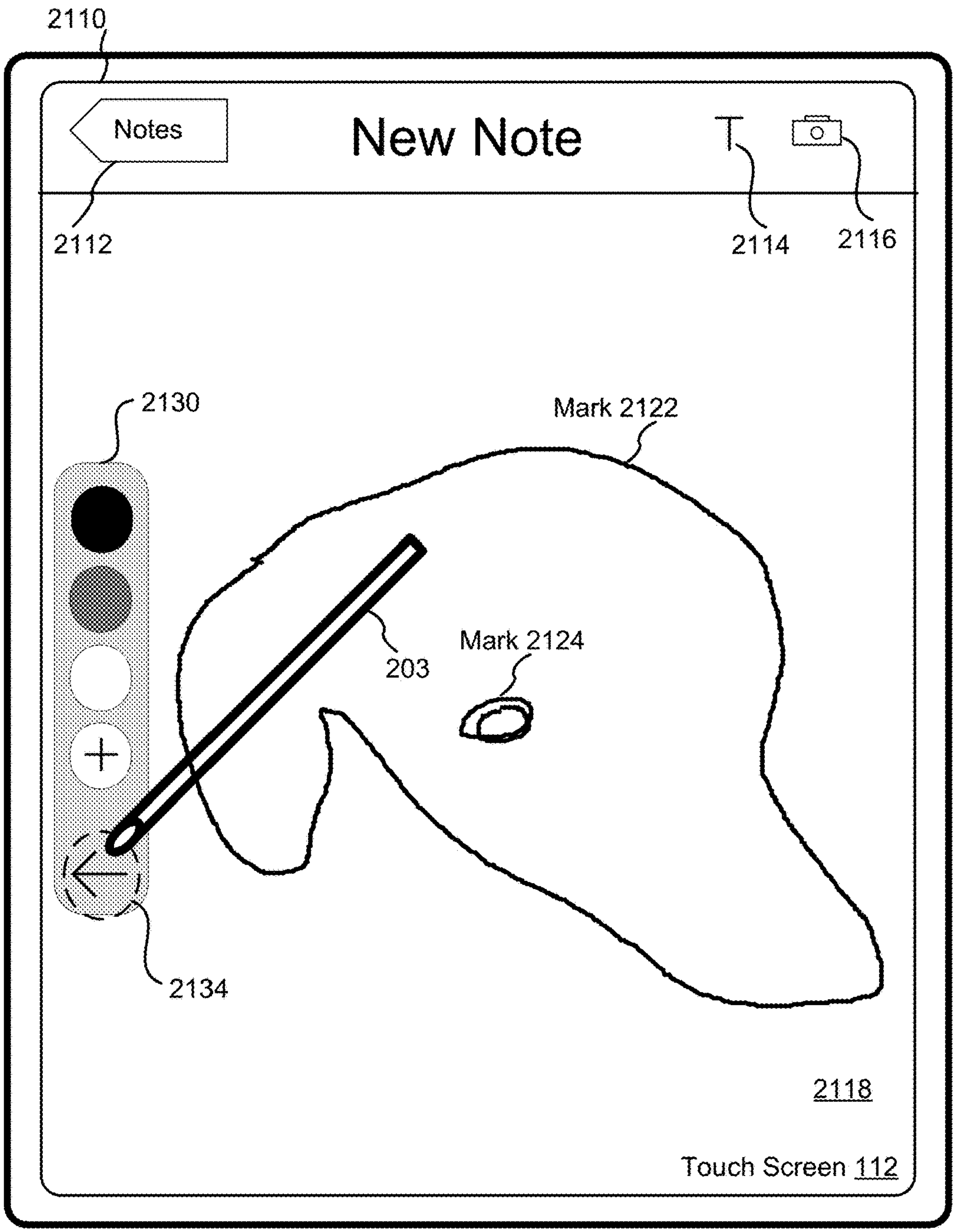
Figure 21M:
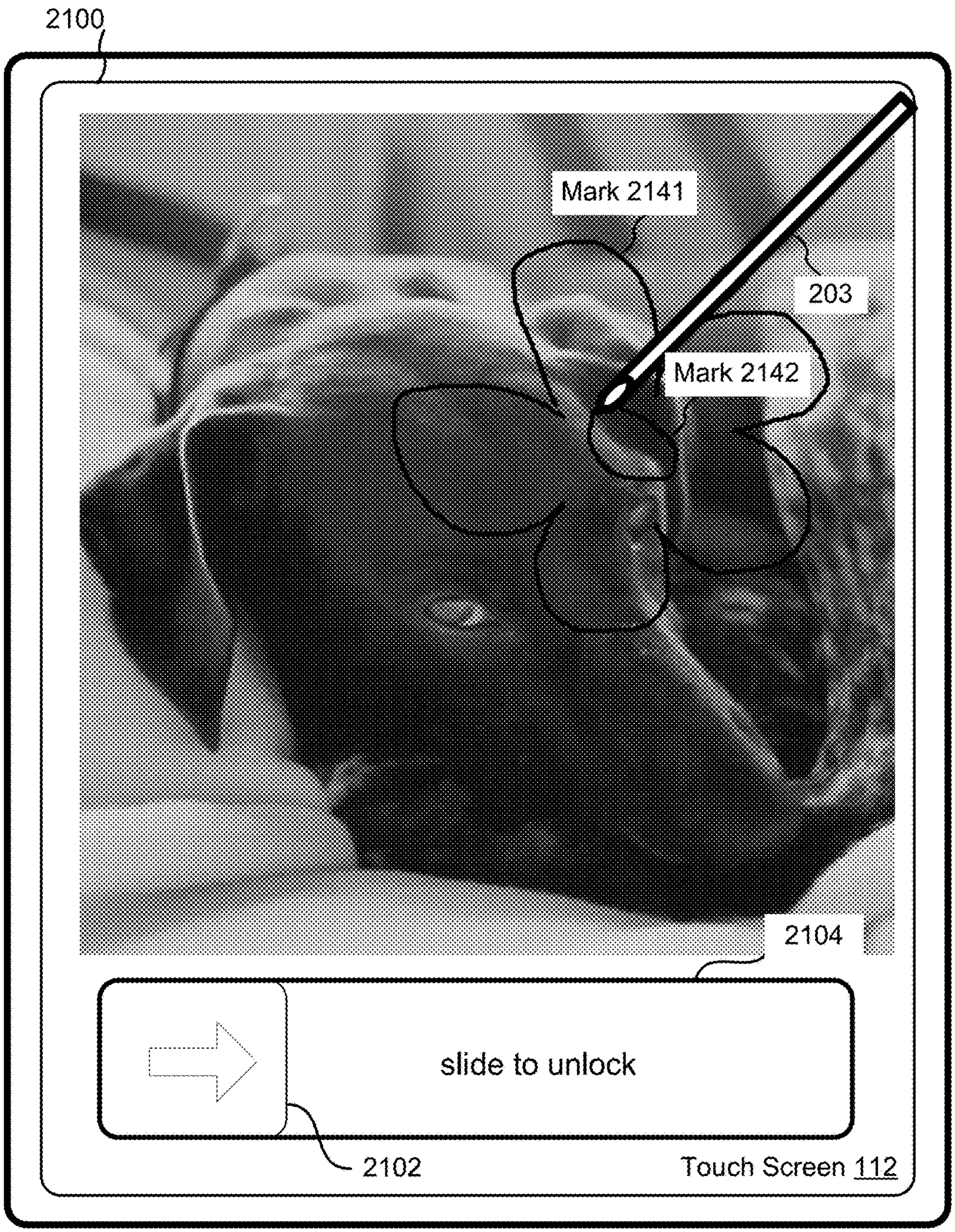
Figure 21N:
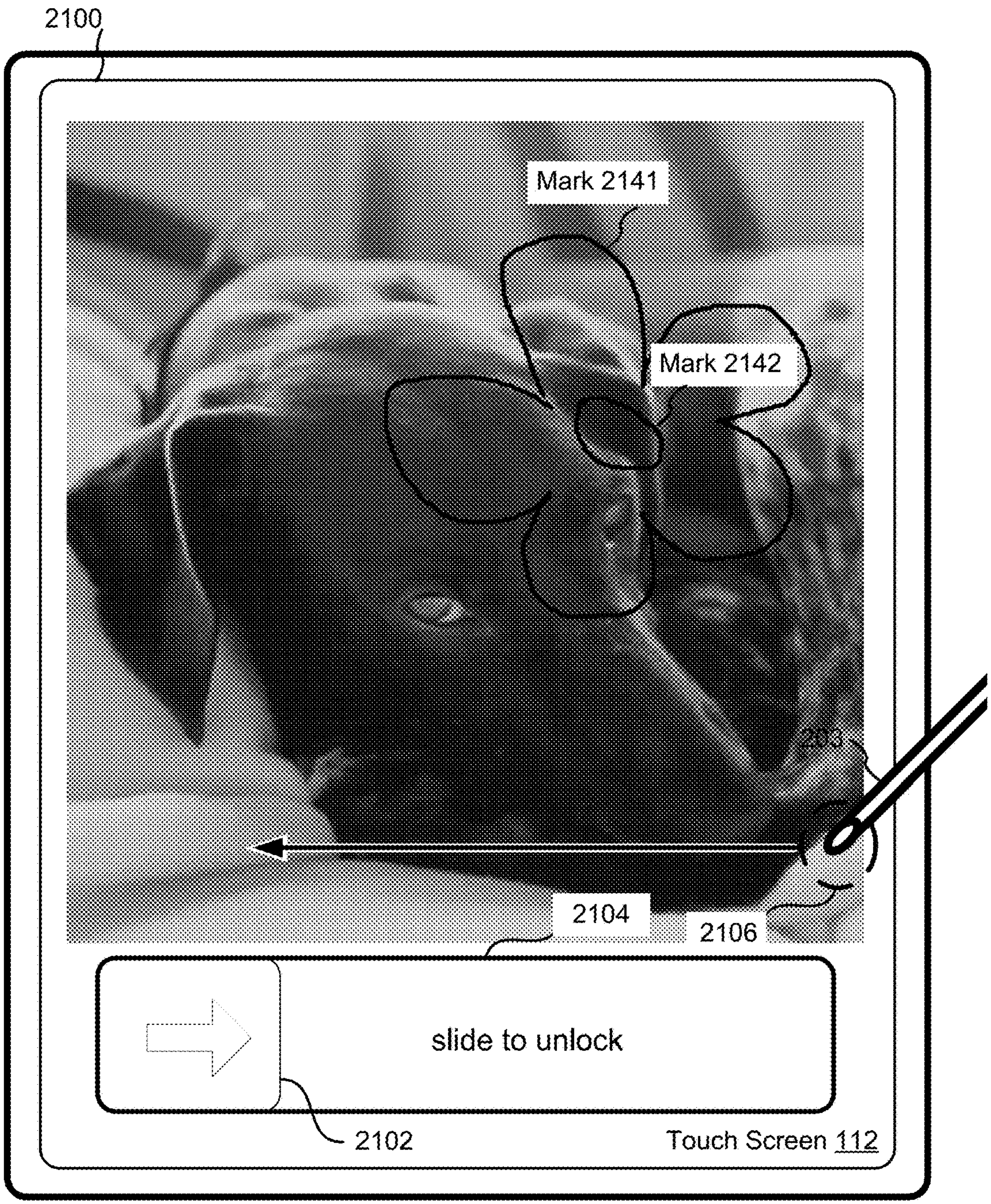
Figure 21O:
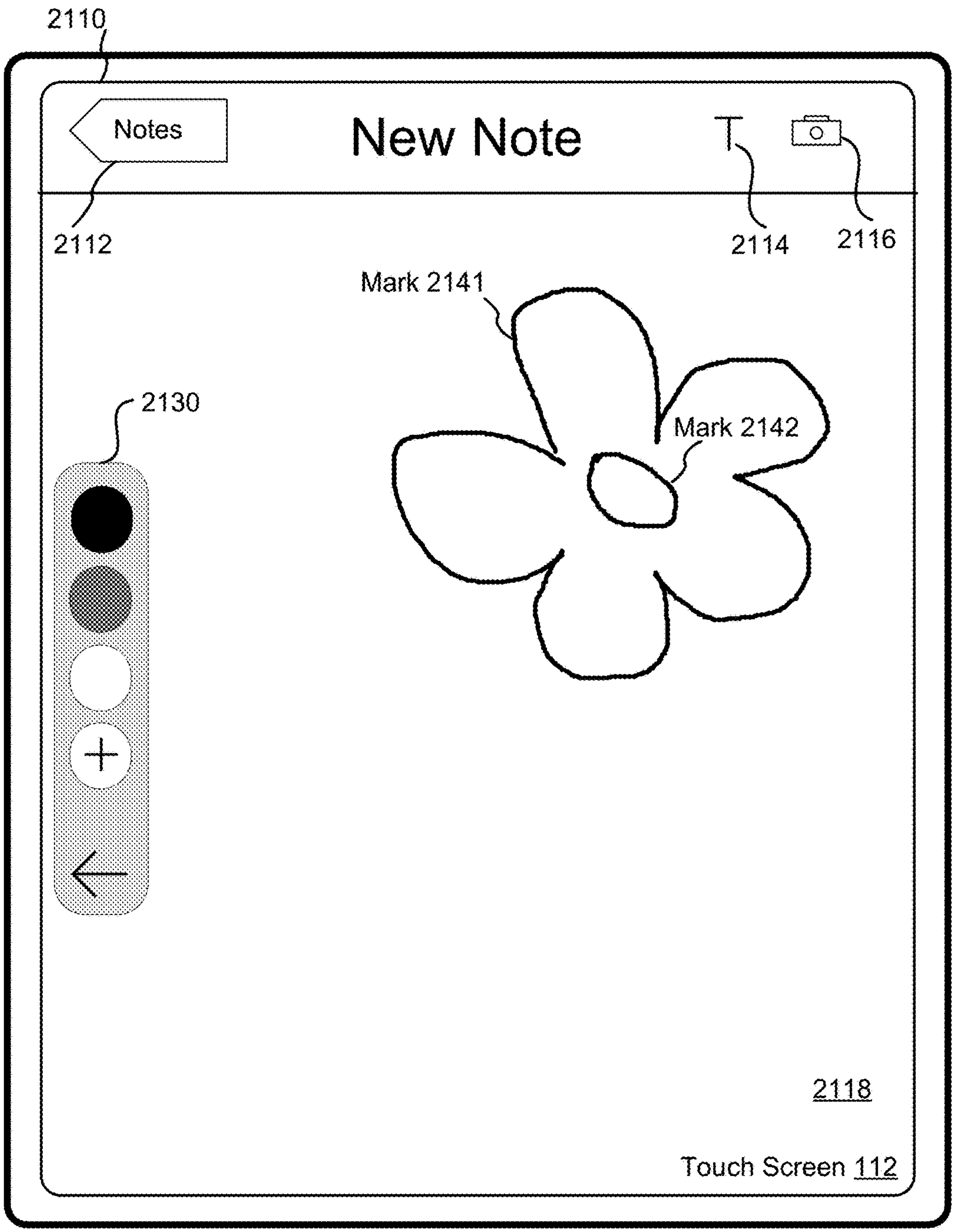
Figure 21P:
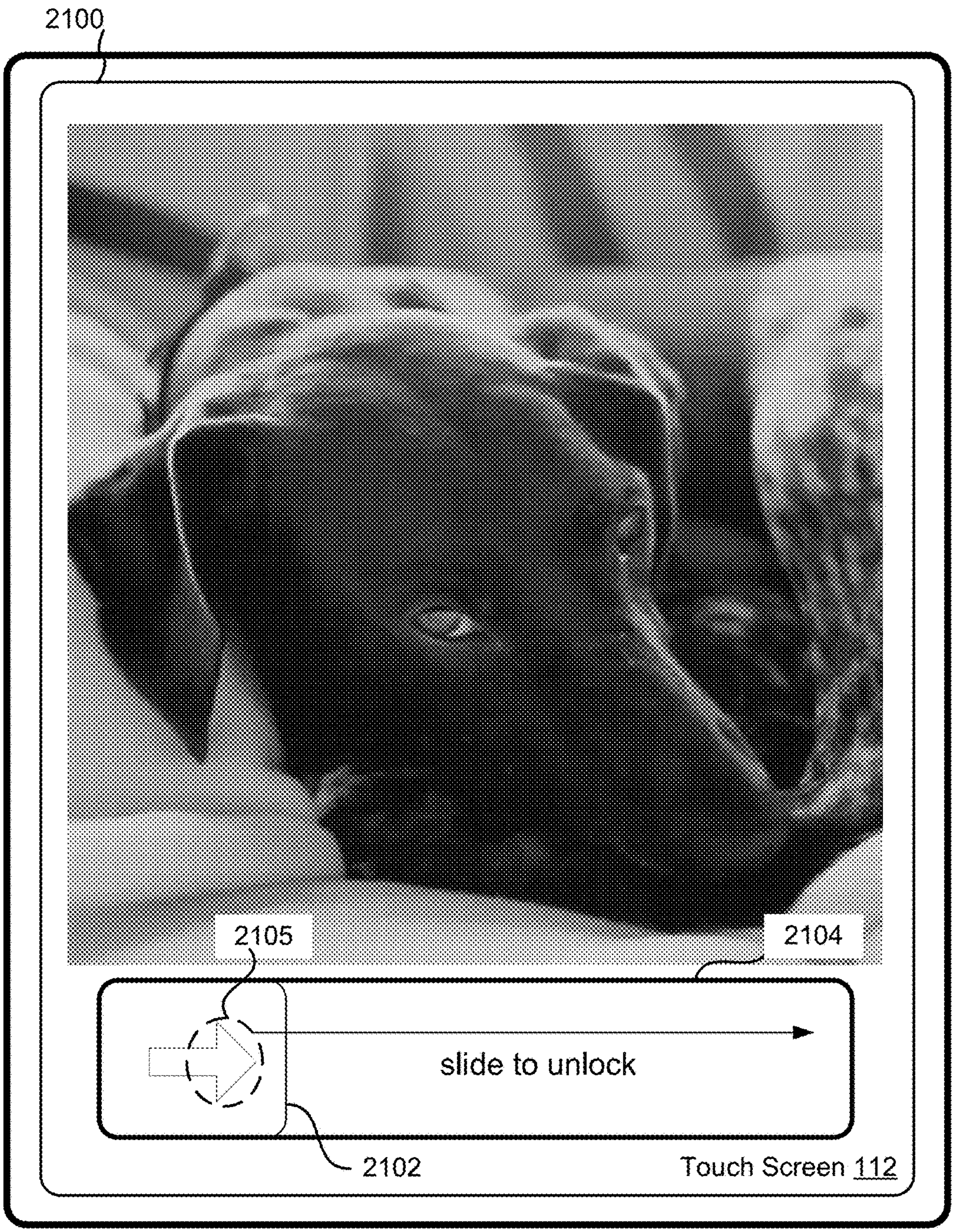
Figure 21Q:
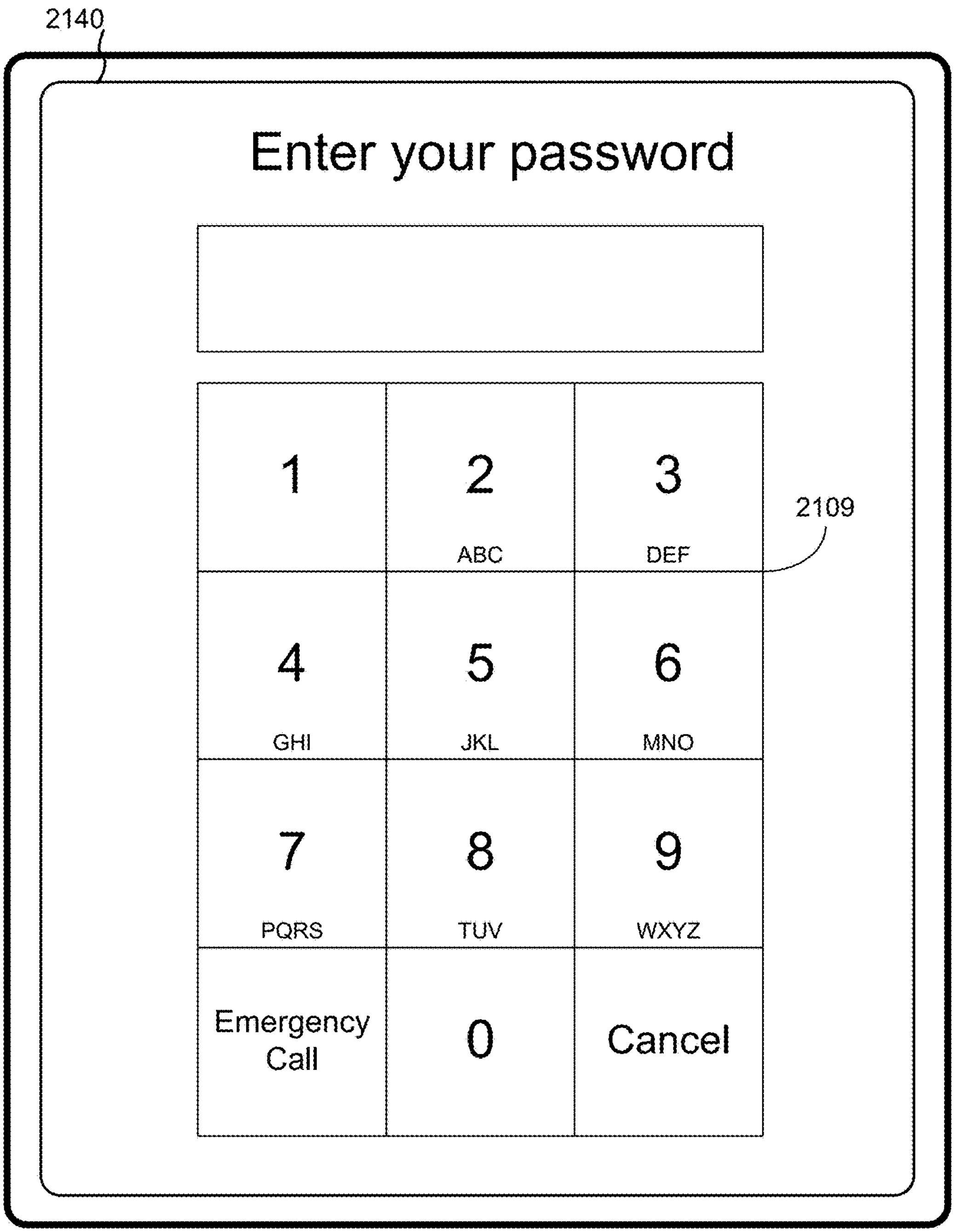

FIGS. 21A-21Q illustrate exemplary user interfaces for accessing a drawing application in a locked device. FIGS. 22A-22B, 23A-23B, and 24A-24B are flow diagrams illustrating methods of accessing a drawing application in a locked device. The user interfaces in FIGS. 21A-21Q are used to illustrate the processes in FIGS. 22A-22B, 23A-23B, and 24A-24B.

FIGS. 26A-26H illustrate exemplary user interfaces for selecting and using virtual drawing implements using a stylus. FIGS. 27A-27C are flow diagrams illustrating a method of selecting and using virtual drawing implements using a stylus. The user interfaces in FIGS. 26A-26H are used to illustrate the processes in FIGS. 27A-27C.

FIGS. 29A-29H illustrate exemplary user interfaces for calendar event creation. FIGS. 30A-30D are flow diagrams illustrating a method of calendar event creation. The user interfaces in FIGS. 29A-29H are used to illustrate the processes in FIGS. 30A-30D.

FIGS. 32A-32F illustrate exemplary user interfaces for selecting a portion of video. FIGS. 33A-33B are flow diagrams illustrating a method of selecting a portion of video. The user interfaces in FIGS. 32A-32F are used to illustrate the processes in FIGS. 33A-33B.

FIGS. 35A-35J illustrate exemplary user interfaces for displaying and using a menu with a stylus. FIGS. 36A-36C are flow diagrams illustrating a method of displaying and using a menu with a stylus. The user interfaces in FIGS. 35A-35J are used to illustrate the processes in FIGS. 36A-36C.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
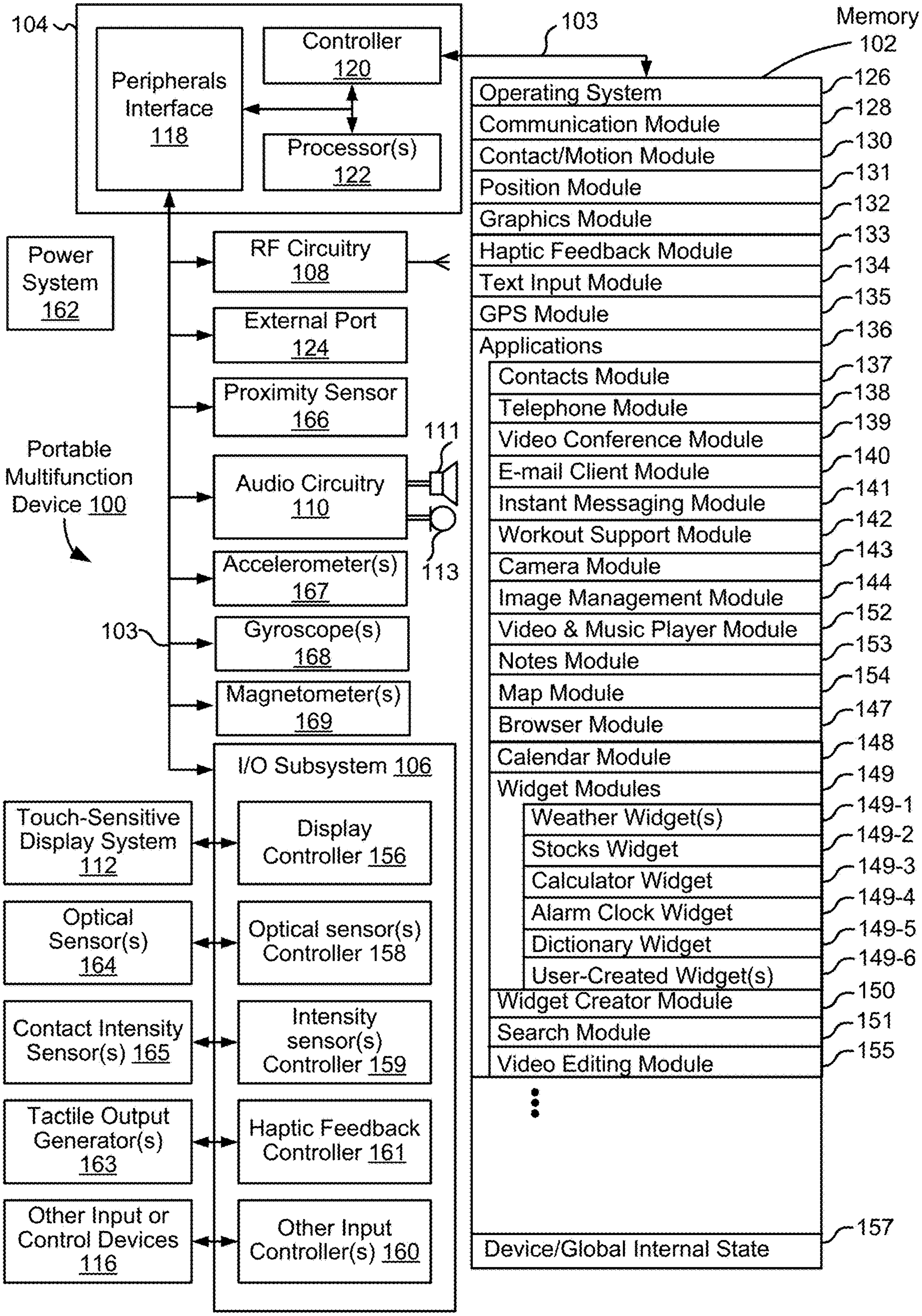
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 120, one or more processing units (CPUs) 122, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 122 and the peripherals interface 118, is, optionally, controlled by memory controller 120.

Peripherals interface 118 can be used to couple input and output peripherals of the device to CPU(s) 122 and memory 102. The one or more processors 122 run or execute various software programs and/or sets of instructions stored in memory 102 to perform various functions for device 100 and to process data.

In some embodiments, peripherals interface 118, CPU(s) 122, and memory controller 120 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2).

The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an exemplary embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an exemplary embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

Figure 3:
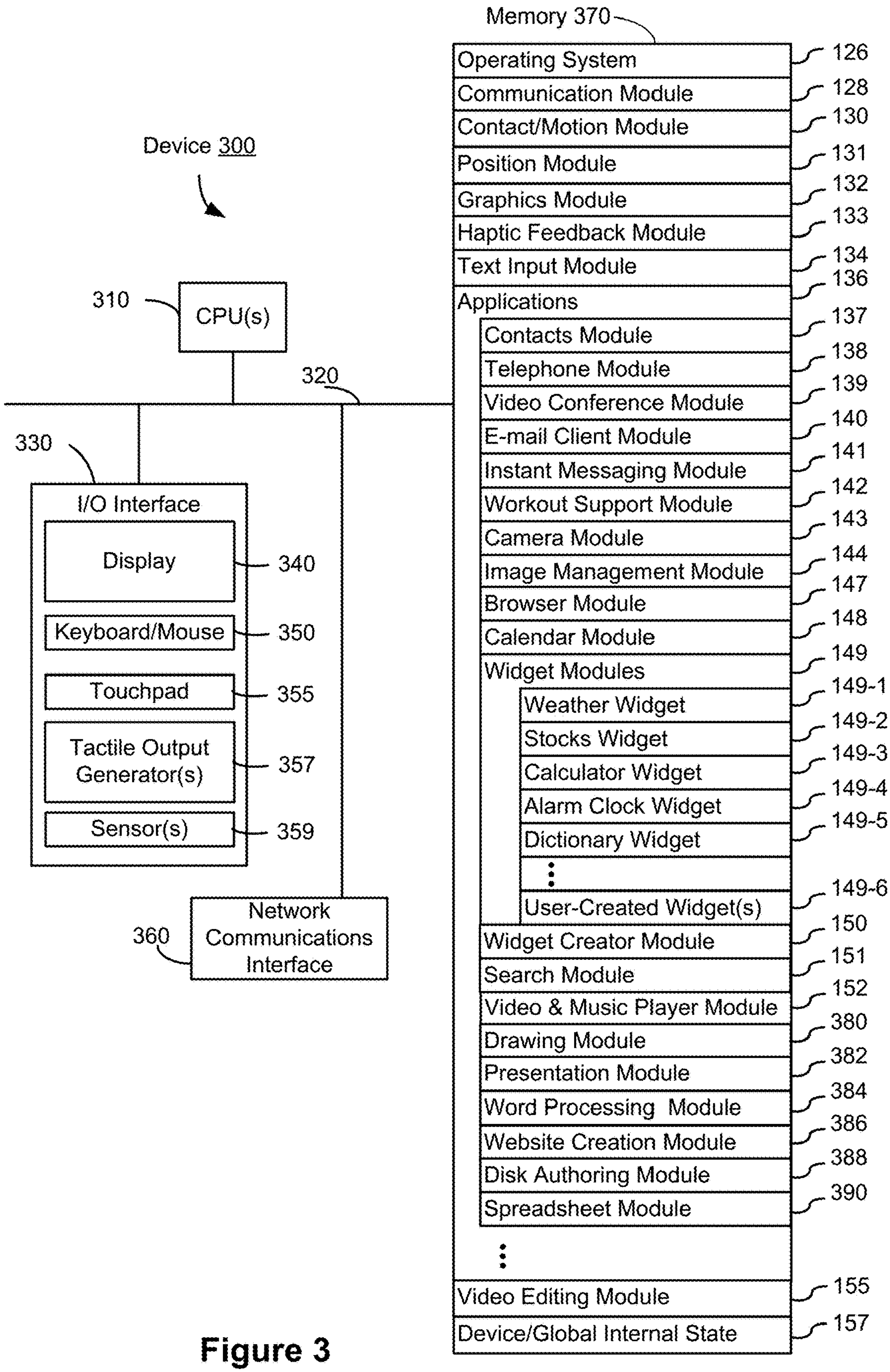
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, position module (or set of instructions) 131, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Position module 131, in conjunction with accelerometers 167, gyroscopes 168, and/or magnetometers 169, optionally detects positional information concerning the device, such as the device's attitude (roll, pitch, and/or yaw) in a particular frame of reference. Position module 130 includes software components for performing various operations related to detecting the position of the device and detecting changes to the position of the device. In some embodiments, position module 131 uses information received from a stylus being used with the device to detect positional information concerning the stylus, such as detecting the positional state of the stylus relative to the device and detecting changes to the positional state of the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- video editing module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod® (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, text input module 134, video editing module 155 includes executable instructions that allow the user to edit movies and other videos (e.g., iMovie® from Apple Inc. of Cupertino, Calif.).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
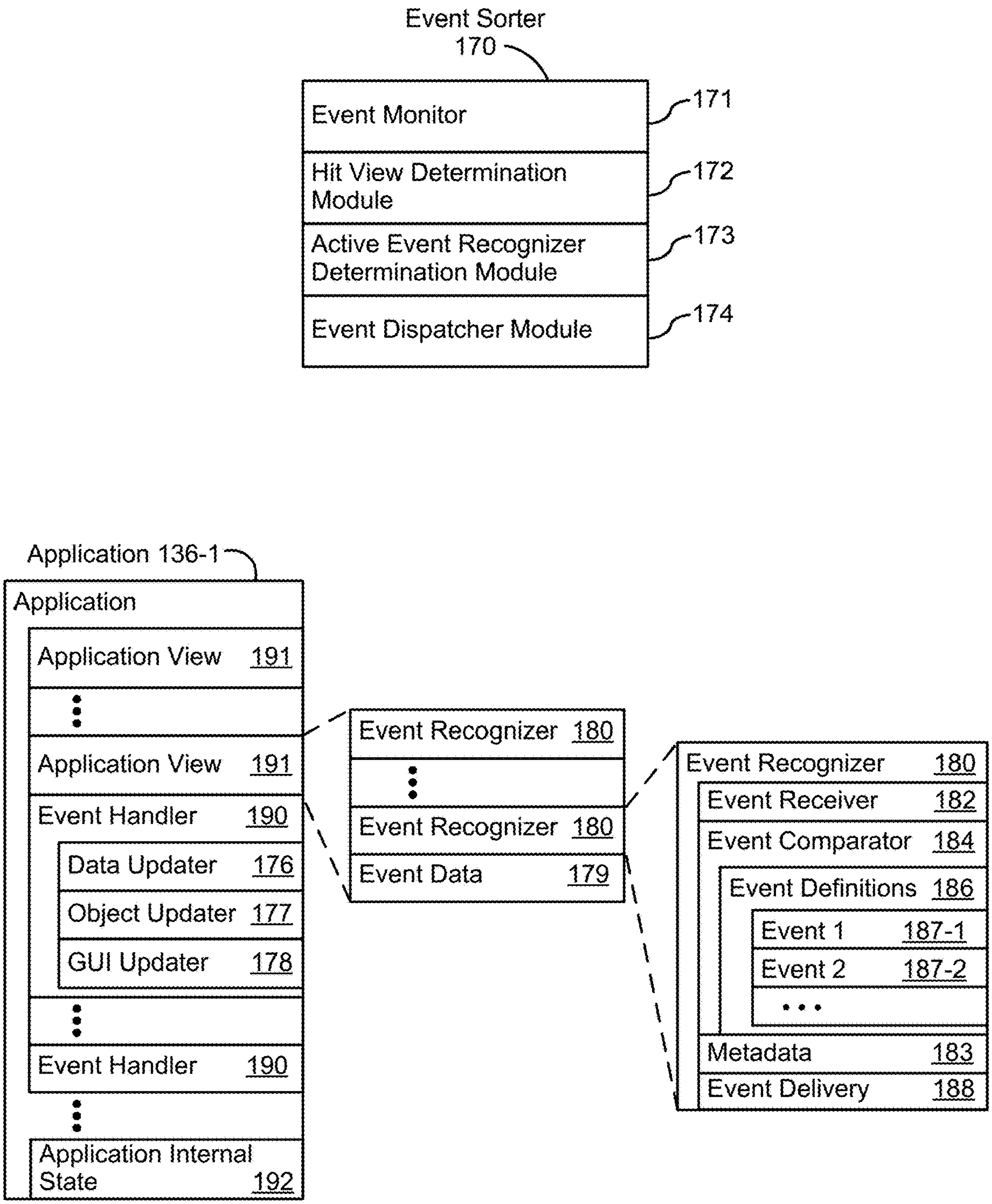
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
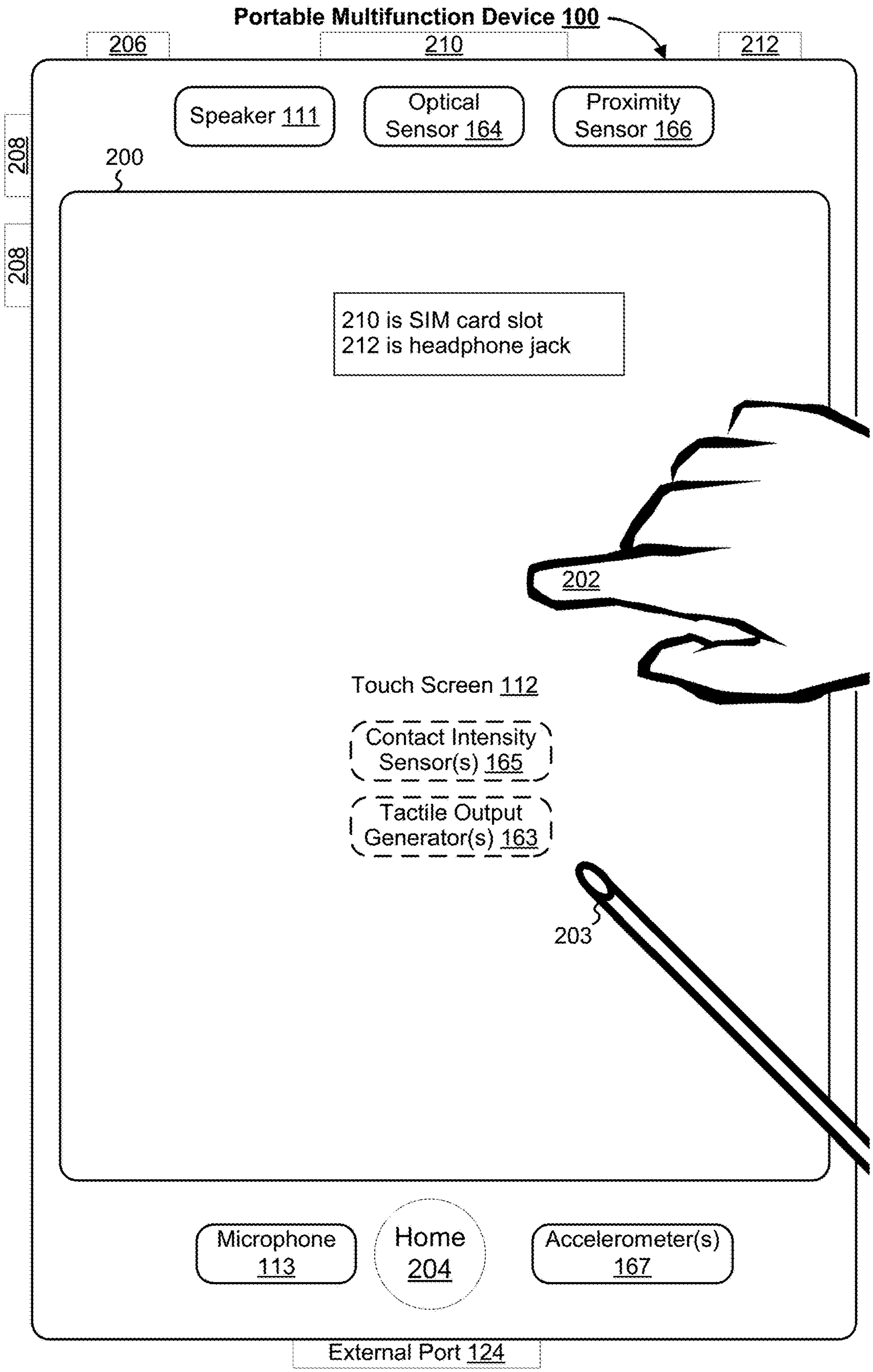
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to the touch-sensitive surface of a touch-sensitive display system 112 and sensors 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
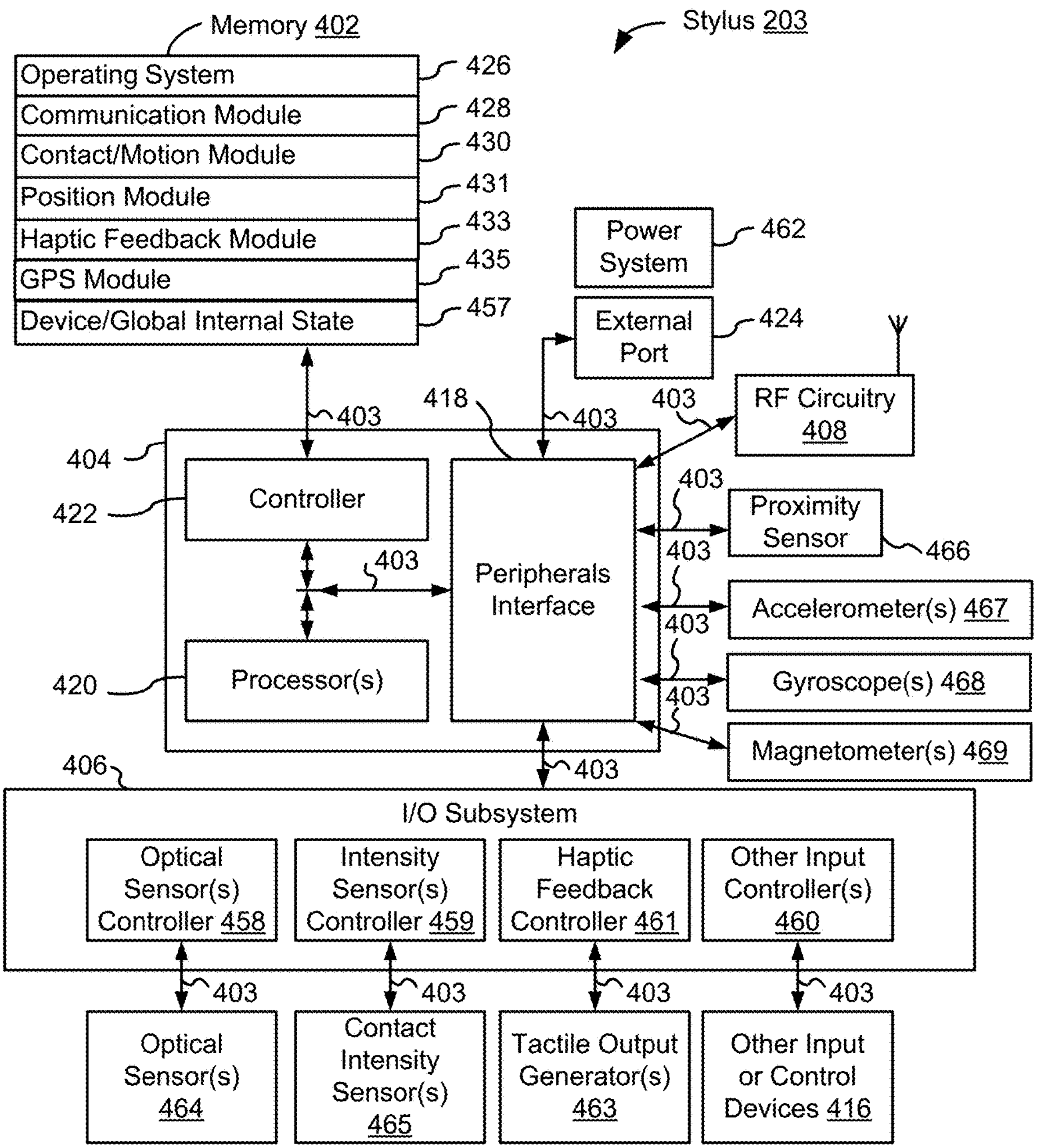
FIG. 4 is a block diagram of an exemplary electronic stylus in accordance with some embodiments.

FIG. 4 is a block diagram of an exemplary electronic stylus 203 in accordance with some embodiments. Electronic stylus 203 is sometimes simply called a stylus. Stylus 203 includes memory 402 (which optionally includes one or more computer readable storage mediums), memory controller 422, one or more processing units (CPUs) 420, peripherals interface 418, RF circuitry 408, input/output (I/O) subsystem 406, and other input or control devices 416. Stylus 203 optionally includes external port 424 and one or more optical sensors 464. Stylus 203 optionally includes one or more intensity sensors 465 for detecting intensity of contacts of stylus 203 on device 100 (e.g., when stylus 203 is used with a touch-sensitive surface such as touch-sensitive display system 112 of device 100) or on other surfaces (e.g., a desk surface). Stylus 203 optionally includes one or more tactile output generators 463 for generating tactile outputs on stylus 203. These components optionally communicate over one or more communication buses or signal lines 403.

In some embodiments, the term "tactile output," discussed above, refers to physical displacement of an accessory (e.g., stylus 203) of a device (e.g., device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of stylus 203) is, optionally, interpreted by the user as a "click" of a physical actuator button. In some cases, a user will feel a tactile sensation such as a "click" even when there is no movement of a physical actuator button associated with the stylus that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the device or a component thereof that will generate the described sensory perception for a typical (or average) user.

It should be appreciated that stylus 203 is only one example of an electronic stylus, and that stylus 203 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Memory 402 optionally includes high-speed random access memory and optionally also includes non-volatile memory, such as one or more flash memory devices, or other non-volatile solid-state memory devices. Access to memory 402 by other components of stylus 203, such as CPU(s) 420 and the peripherals interface 418, is, optionally, controlled by memory controller 422.

Peripherals interface 418 can be used to couple input and output peripherals of the stylus to CPU(s) 420 and memory 402. The one or more processors 420 run or execute various software programs and/or sets of instructions stored in memory 402 to perform various functions for stylus 203 and to process data.

In some embodiments, peripherals interface 418, CPU(s) 420, and memory controller 422 are, optionally, implemented on a single chip, such as chip 404. In some other embodiments, they are, optionally, implemented on separate chips.

RF (radio frequency) circuitry 408 receives and sends RF signals, also called electromagnetic signals. RF circuitry 408 converts electrical signals to/from electromagnetic signals and communicates with device 100 or 300, communications networks, and/or other communications devices via the electromagnetic signals. RF circuitry 408 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 408 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

I/O subsystem 406 couples input/output peripherals on stylus 203, such as other input or control devices 416, with peripherals interface 418. I/O subsystem 406 optionally includes optical sensor controller 458, intensity sensor controller 459, haptic feedback controller 461, and one or more input controllers 460 for other input or control devices. The one or more input controllers 460 receive/send electrical signals from/to other input or control devices 416. The other input or control devices 416 optionally include physical buttons (e.g., push buttons, rocker buttons, etc.), dials, slider switches, click wheels, and so forth. In some alternate embodiments, input controller(s) 460 are, optionally, coupled with any (or none) of the following: an infrared port and/or a USB port.

Stylus 203 also includes power system 462 for powering the various components. Power system 462 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

Stylus 203 optionally also includes one or more optical sensors 464. FIG. 4 shows an optical sensor coupled with optical sensor controller 458 in I/O subsystem 406. Optical sensor(s) 464 optionally include charge-coupled device (CCD) or complementary metal-oxide semiconductor (CMOS) phototransistors. Optical sensor(s) 464 receive light from the environment, projected through one or more lens, and converts the light to data representing an image.

Stylus 203 optionally also includes one or more contact intensity sensors 465. FIG. 4 shows a contact intensity sensor coupled with intensity sensor controller 459 in I/O subsystem 406. Contact intensity sensor(s) 465 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a surface). Contact intensity sensor(s) 465 receive contact intensity information (e.g., pressure information or a proxy for pressure information) from the environment. In some embodiments, at least one contact intensity sensor is collocated with, or proximate to, a tip of stylus 203.

Stylus 203 optionally also includes one or more proximity sensors 466. FIG. 4 shows proximity sensor 466 coupled with peripherals interface 418. Alternately, proximity sensor 466 is coupled with input controller 460 in I/O subsystem 406. In some embodiments, the proximity sensor determines proximity of stylus 203 to an electronic device (e.g., device 100).

Stylus 203 optionally also includes one or more tactile output generators 463. FIG. 4 shows a tactile output generator coupled with haptic feedback controller 461 in I/O subsystem 406. Tactile output generator(s) 463 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 463 receive tactile feedback generation instructions from haptic feedback module 433 and generates tactile outputs on stylus 203 that are capable of being sensed by a user of stylus 203. In some embodiments, at least one tactile output generator is collocated with, or proximate to, a length (e.g., a body or a housing) of stylus 203 and, optionally, generates a tactile output by moving stylus 203 vertically (e.g., in a direction parallel to the length of stylus 203) or laterally (e.g., in a direction normal to the length of stylus 203).

Stylus 203 optionally also includes one or more accelerometers 467, gyroscopes 468, and/or magnetometers 469 (e.g., as part of an inertial measurement unit (IMU)) for obtaining information concerning the location and positional state of stylus 203. FIG. 4 shows sensors 467, 468, and 469 coupled with peripherals interface 418. Alternately, sensors 467, 468, and 469 are, optionally, coupled with an input controller 460 in I/O subsystem 406. Stylus 203 optionally includes a GPS (or GLONASS or other global navigation system) receiver (not shown) for obtaining information concerning the location of stylus 203.

Figure 5A:
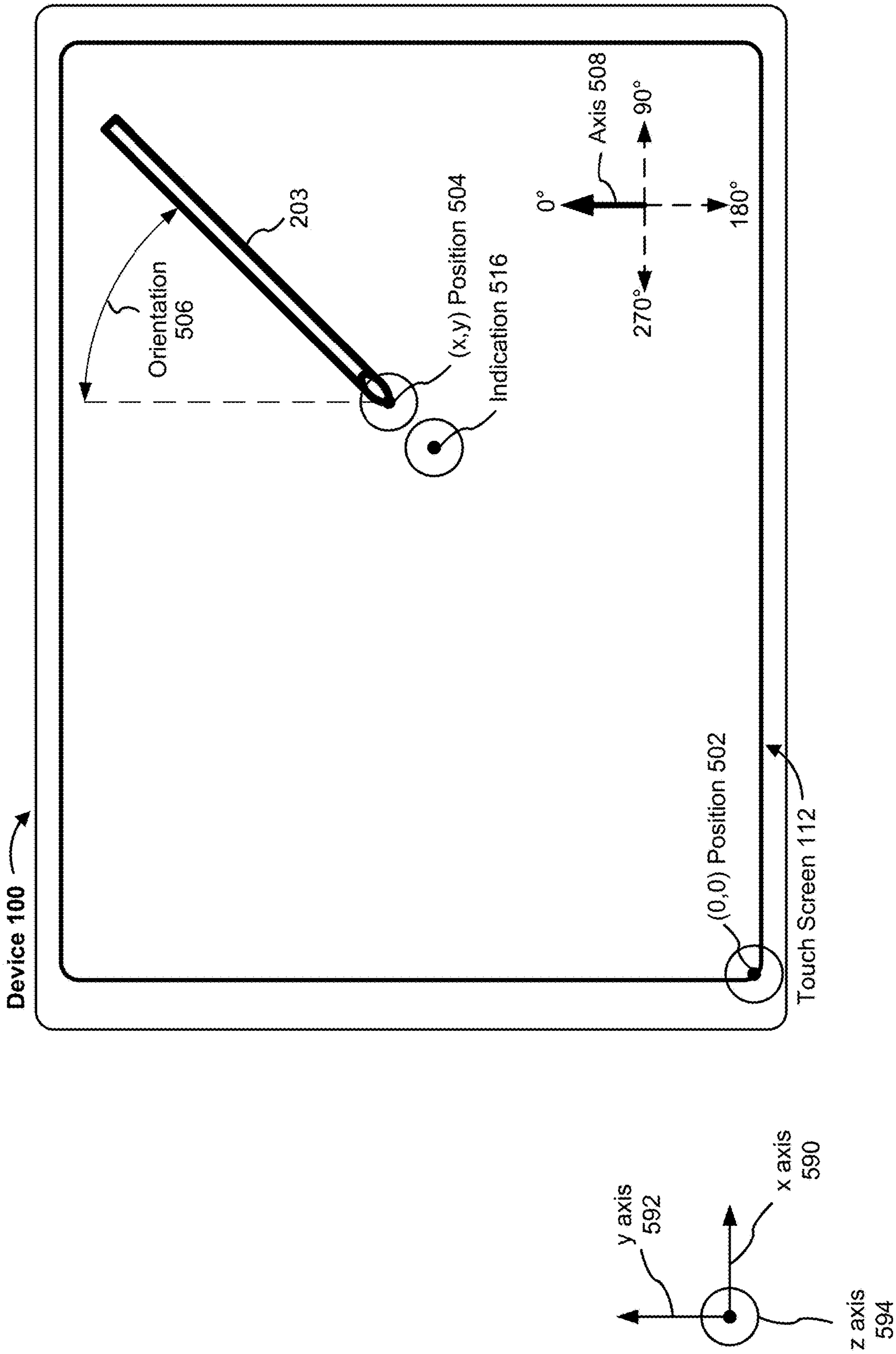
FIGS. 5A-5B illustrate a positional state of a stylus relative to a touch-sensitive surface in accordance with some embodiments
Figure 5B:
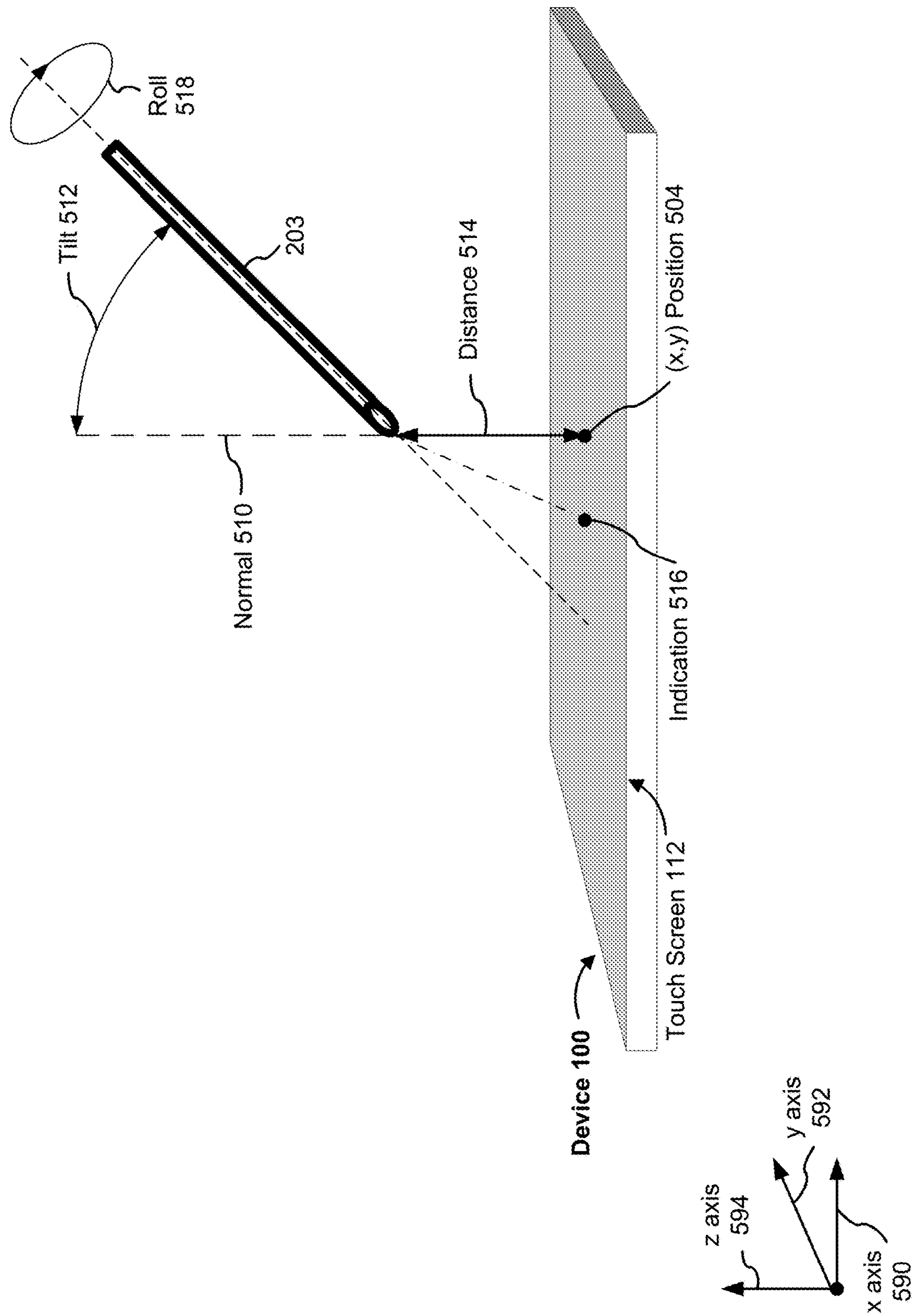

In some embodiments, the software components stored in memory 402 include operating system 426, communication module (or set of instructions) 428, contact/motion module (or set of instructions) 430, position module (or set of instructions) 431, and Global Positioning System (GPS) module (or set of instructions) 435. Furthermore, in some embodiments, memory 402 stores device/global internal state 457, as shown in FIG. 4. Device/global internal state 457 includes one or more of: sensor state, including information obtained from the stylus's various sensors and other input or control devices 416; positional state, including information regarding the stylus's position (e.g., position, orientation, tilt, roll and/or distance, as shown in FIGS. 5A and 5B) relative to a device (e.g., device 100); and location information concerning the stylus's location (e.g., determined by GPS module 435).

Operating system 426 (e.g., iOS, Darwin, RTXC, LINUX, UNIX, OS X, WINDOWS, or an embedded operating system such as VxWorks) includes various software components and/or drivers for controlling and managing general system tasks (e.g., memory management, power management, etc.) and facilitates communication between various hardware and software components.

Communication module 428 optionally facilitates communication with other devices over one or more external ports 424 and also includes various software components for handling data received by RF circuitry 408 and/or external port 424. External port 424 (e.g., Universal Serial Bus (USB), FIREWIRE, etc.) is adapted for coupling directly to other devices or indirectly over a network (e.g., the Internet, wireless LAN, etc.). In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 430 optionally detects contact with stylus 203 and other touch-sensitive devices of stylus 203 (e.g., buttons or other touch-sensitive components of stylus 203). Contact/motion module 430 includes software components for performing various operations related to detection of contact (e.g., detection of a tip of the stylus with a touch-sensitive display, such as touch screen 112 of device 100, or with another surface, such as a desk surface), such as determining if contact has occurred (e.g., detecting a touch-down event), determining an intensity of the contact (e.g., the force or pressure of the contact or a substitute for the force or pressure of the contact), determining if there is movement of the contact and tracking the movement (e.g., across touch screen 112 of device 100), and determining if the contact has ceased (e.g., detecting a lift-off event or a break in contact). In some embodiments, contact/motion module 430 receives contact data from I/O subsystem 406. Determining movement of the point of contact, which is represented by a series of contact data, optionally includes determining speed (magnitude), velocity (magnitude and direction), and/or an acceleration (a change in magnitude and/or direction) of the point of contact. As noted above, in some embodiments, one or more of these operations related to detection of contact are performed by the device using contact/motion module 130 (in addition to or in place of the stylus using contact/motion module 430).

Contact/motion module 430 optionally detects a gesture input by stylus 203. Different gestures with stylus 203 have different contact patterns (e.g., different motions, timings, and/or intensities of detected contacts). Thus, a gesture is, optionally, detected by detecting a particular contact pattern. For example, detecting a single tap gesture includes detecting a touch-down event followed by detecting a lift-off event at the same position (or substantially the same position) as the touch-down event (e.g., at the position of an icon). As another example, detecting a swipe gesture includes detecting a touch-down event followed by detecting one or more stylus-dragging events, and subsequently followed by detecting a lift-off event. As noted above, in some embodiments, gesture detection is performed by the device using contact/motion module 130 (in addition to or in place of the stylus using contact/motion module 430).

Position module 431, in conjunction with accelerometers 467, gyroscopes 468, and/or magnetometers 469, optionally detects positional information concerning the stylus, such as the stylus's attitude (roll, pitch, and/or yaw) in a particular frame of reference. Position module 431, in conjunction with accelerometers 467, gyroscopes 468, and/or magnetometers 469, optionally detects stylus movement gestures, such as flicks, taps, and rolls of the stylus. Position module 431 includes software components for performing various operations related to detecting the position of the stylus and detecting changes to the position of the stylus in a particular frame of reference. In some embodiments, position module 431 detects the positional state of the stylus relative to the device and detects changes to the positional state of the stylus relative to the device. As noted above, in some embodiments, device 100 or 300 determines the positional state of the stylus relative to the device and changes to the positional state of the stylus using position module 131 (in addition to or in place of the stylus using position module 431).

Haptic feedback module 433 includes various software components for generating instructions used by tactile output generator(s) 463 to produce tactile outputs at one or more locations on stylus 203 in response to user interactions with stylus 203.

GPS module 435 determines the location of the stylus and provides this information for use in various applications (e.g., to applications that provide location-based services such as an application to find missing devices and/or accessories).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 402 optionally stores a subset of the modules and data structures identified above. Furthermore, memory 402 optionally stores additional modules and data structures not described above.

FIGS. 5A-5B illustrate a positional state of stylus 203 relative to a touch-sensitive surface (e.g., touch screen 112 of device 100) in accordance with some embodiments. In some embodiments, the positional state of stylus 203 corresponds to (or indicates): a position of a projection of a tip (or other representative portion) of the stylus on the touch-sensitive surface (e.g., (x,y) position 504, FIG. 5A), an orientation of the stylus relative to the touch-sensitive surface (e.g., orientation 506, FIG. 5A), a tilt of the stylus relative to the touch-sensitive surface (e.g., tilt 512, FIG. 5B), and/or a distance of the stylus relative to the touch-sensitive surface (e.g., distance 514, FIG. 5B). In some embodiments, the positional state of stylus 203 corresponds to (or indicates) a pitch, yaw, and/or roll of the stylus (e.g., an attitude of the stylus relative to a particular frame of reference, such as a touch-sensitive surface (e.g., touch screen 112) or the ground). In some embodiments, the positional state includes a set of positional parameters (e.g., one or more positional parameters). In some embodiments, the positional state is detected in accordance with one or more measurements from stylus 203 that are sent to an electronic device (e.g., device 100). For example, the stylus measures the tilt (e.g., tilt 512, FIG. 5B) and/or the orientation (e.g., orientation 506, FIG. 5A) of the stylus and sends the measurement to device 100. In some embodiments, the positional state is detected in accordance with raw output, from one or more electrodes in the stylus, that is sensed by a touch-sensitive surface (e.g., touch screen 112 of device 100) instead of, or in combination with positional state detected in accordance with one or more measurements from stylus 203. For example, the touch-sensitive surface receives raw output from one or more electrodes in the stylus and calculates the tilt and/or the orientation of the stylus based on the raw output (optionally, in conjunction with positional state information provided by the stylus based on sensor measurements generated by the stylus).

FIG. 5A illustrates stylus 203 relative to a touch-sensitive surface (e.g., touch screen 112 of device 100) from a viewpoint directly above the touch-sensitive surface, in accordance with some embodiments. In FIG. 5A, z axis 594 points out of the page (i.e., in a direction normal to a plane of touch screen 112), x axis 590 is parallel to a first edge (e.g., a length) of touch screen 112, y axis 592 is parallel to a second edge (e.g., a width) of touch screen 112, and y axis 592 is perpendicular to x axis 590.

FIG. 5A illustrates the tip of stylus 203 at (x,y) position 504. In some embodiments, the tip of stylus 203 is a terminus of the stylus configured for determining proximity of the stylus to a touch-sensitive surface (e.g., touch screen 112). In some embodiments, the projection of the tip of the stylus on the touch-sensitive surface is an orthogonal projection. In other words, the projection of the tip of the stylus on the touch-sensitive surface is a point at the end of a line from the stylus tip to the touch-sensitive surface that is normal to a surface of the touch-sensitive surface (e.g., (x,y) position 504 at which the tip of the stylus would touch the touch-sensitive surface if the stylus were moved directly along a path normal to the touch-sensitive surface). In some embodiments, the (x,y) position at the lower left corner of touch screen 112 is position (0,0) (e.g., (0,0) position 502) and other (x,y) positions on touch screen 112 are relative to the lower left corner of touch screen 112. Alternatively, in some embodiments, the (0,0) position is located at another position of touch screen 112 (e.g., in the center of touch screen 112) and other (x,y) positions are relative to the (0,0) position of touch screen 112.

Further, FIG. 5A illustrates stylus 203 with orientation 506. In some embodiments, orientation 506 is an orientation of a projection of stylus 203 onto touch screen 112 (e.g., an orthogonal projection of a length of stylus 203 or a line corresponding to the line between the projection of two different points of stylus 203 onto touch screen 112). In some embodiments, orientation 506 is relative to at least one axis in a plane parallel to touch screen 112. In some embodiments, orientation 506 is relative to a single axis in a plane parallel to touch screen 112 (e.g., axis 508, with a clockwise rotation angle from axis 508 ranging from 0 degrees to 360 degrees, as shown in FIG. 5A). Alternatively, in some embodiments, orientation 506 is relative to a pair of axes in a plane parallel to touch screen 112 (e.g., x axis 590 and y axis 592, as shown in FIG. 5A, or a pair of axes associated with an application displayed on touch screen 112).

In some embodiments, an indication (e.g., indication 516) is displayed on a touch-sensitive display (e.g., touch screen 112 of device 100). In some embodiments, indication 516 shows where the stylus will touch (or mark) the touch-sensitive display before the stylus touches the touch-sensitive display. In some embodiments, indication 516 is a portion of a mark that is being drawn on the touch-sensitive display. In some embodiments, indication 516 is separate from a mark that is being drawn on the touch-sensitive display and corresponds to a virtual "pen tip" or other element that indicates where a mark will be drawn on the touch-sensitive display.

In some embodiments, indication 516 is displayed in accordance with the positional state of stylus 203. For example, in some circumstances, indication 516 is displaced from (x,y) position 504 (as shown in FIGS. 5A and 5B), and in other circumstances, indication 516 is not displaced from (x,y) position 504 (e.g., indication 516 is displayed at or near (x,y) position 504 when tilt 512 is zero degrees). In some embodiments, indication 516 is displayed, in accordance with the positional state of the stylus, with varying color, size (or radius or area), opacity, and/or other characteristics. In some embodiments, the displayed indication accounts for thickness of a glass layer on the touch-sensitive display, so as to carry through the indication "onto the pixels" of the touch-sensitive display, rather than displaying the indication "on the glass" that covers the pixels.

FIG. 5B illustrates stylus 203 relative to a touch-sensitive surface (e.g., touch screen 112 of device 100) from a side viewpoint of the touch-sensitive surface, in accordance with some embodiments. In FIG. 5B, z axis 594 points in a direction normal to the plane of touch screen 112, x axis 590 is parallel to a first edge (e.g., a length) of touch screen 112, y axis 592 is parallel to a second edge (e.g., a width) of touch screen 112, and y axis 592 is perpendicular to x axis 590.

FIG. 5B illustrates stylus 203 with tilt 512. In some embodiments, tilt 512 is an angle relative to a normal (e.g., normal 510) to a surface of the touch-sensitive surface (also called simply the normal to the touch-sensitive surface). As shown in FIG. 5B, tilt 512 is zero when the stylus is perpendicular/normal to the touch-sensitive surface (e.g., when stylus 203 is parallel to normal 510) and the tilt increases as the stylus is tilted closer to being parallel to the touch-sensitive surface.

Further, FIG. 5B illustrates distance 514 of stylus 203 relative to the touch-sensitive surface. In some embodiments, distance 514 is the distance from the tip of stylus 203 to the touch-sensitive surface, in a direction normal to the touch-sensitive surface. For example, in FIG. 5B, distance 514 is the distance from the tip of stylus 203 to (x,y) position 504.

Although the terms, "x axis," "y axis," and "z axis," are used herein to illustrate certain directions in particular figures, it will be understood that these terms do not refer to absolute directions. In other words, an "x axis" could be any respective axis, and a "y axis" could be a particular axis that is distinct from the x axis. Typically, the x axis is perpendicular to the y axis. Similarly, a "z axis" is distinct from the "x axis" and the "y axis," and is typically perpendicular to both the "x axis" and the "y axis."

Further, FIG. 5B illustrates roll 518, a rotation about the length (long axis) of stylus 203.

Attention is now directed towards embodiments of user interfaces ("UI") that are, optionally, implemented on portable multifunction device 100.

Figure 6A:
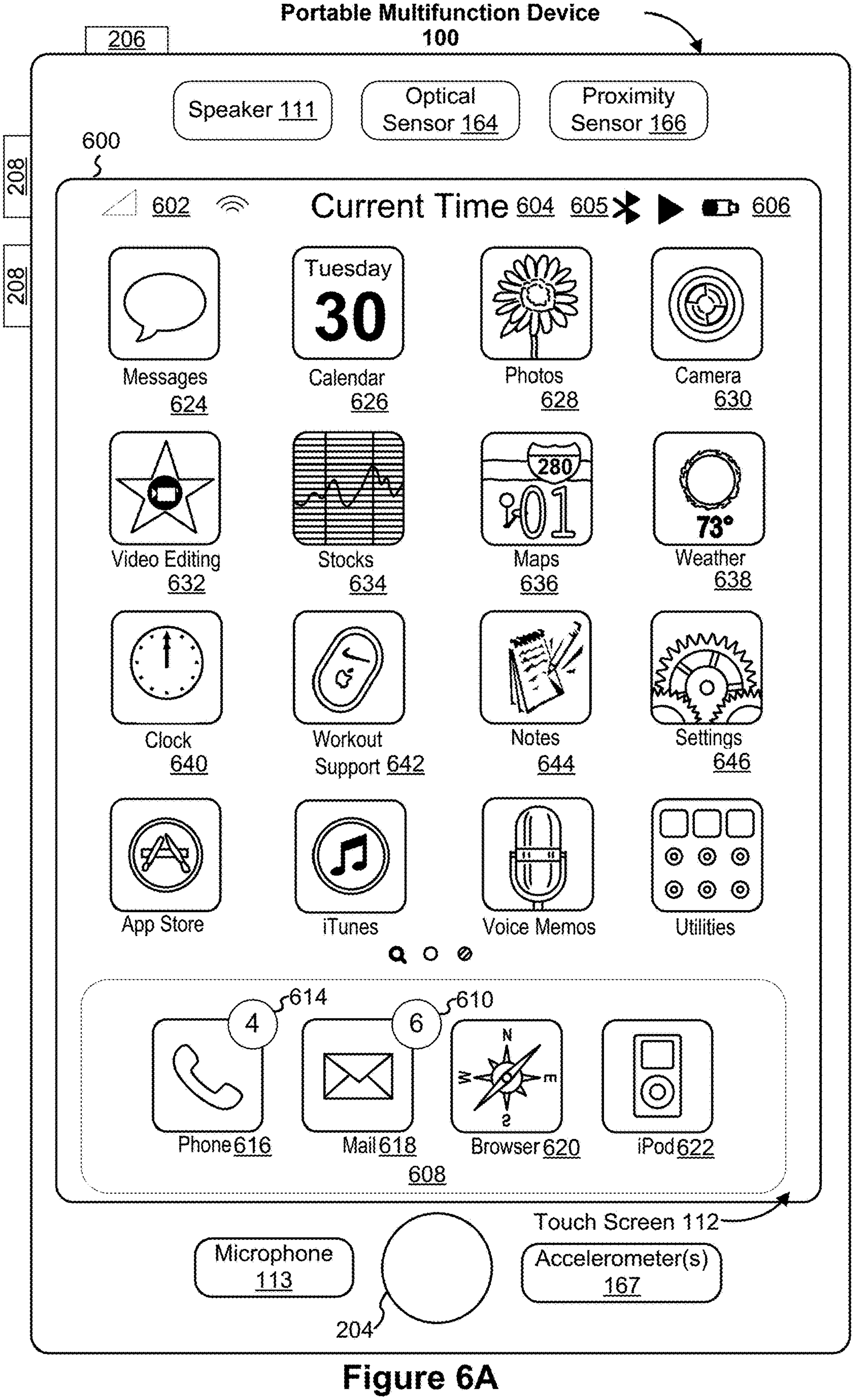
FIG. 6A illustrates an exemplary user interface for a menu of applications on a portable multifunction device in accordance with some embodiments.

FIG. 6A illustrates an exemplary user interface for a menu of applications on portable multifunction device 100 in accordance with some embodiments. Similar user interfaces are, optionally, implemented on device 300. In some embodiments, user interface 600 includes the following elements, or a subset or superset thereof:

- Signal strength indicator(s) 602 for wireless communication(s), such as cellular and Wi-Fi signals;
- Time 604;
- Bluetooth indicator 605;
- Battery status indicator 606;
- Tray 608 with icons for frequently used applications, such as:
  - Icon 616 for telephone module 138, labeled "Phone," which optionally includes an indicator 614 of the number of missed calls or voicemail messages;
  - Icon 618 for e-mail client module 140, labeled "Mail," which optionally includes an indicator 610 of the number of unread e-mails;
  - Icon 620 for browser module 147, labeled "Browser;" and
  - Icon 622 for video and music player module 152, also referred to as iPod® (trademark of Apple Inc.) module 152, labeled "iPod;" and
- Icons for other applications, such as:
  - Icon 624 for IM module 141, labeled "Messages;"
  - Icon 626 for calendar module 148, labeled "Calendar;"
  - Icon 628 for image management module 144, labeled "Photos;"
  - Icon 630 for camera module 143, labeled "Camera;"
  - Icon 632 for video editing module 155, labeled "Video Editing;"
  - Icon 634 for stocks widget 149-2, labeled "Stocks;"
  - Icon 636 for map module 154, labeled "Map;"
  - Icon 638 for weather widget 149-1, labeled "Weather;"
  - Icon 640 for alarm clock widget 149-4, labeled "Clock;"
  - Icon 642 for workout support module 142, labeled "Workout Support;"
  - Icon 644 for notes module 153, labeled "Notes;" and
  - Icon 646 for a settings application or module, which provides access to settings for device 100 and its various applications 136.

It should be noted that the icon labels illustrated in FIG. 6A are merely exemplary. For example, in some embodiments, icon 622 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 6B:
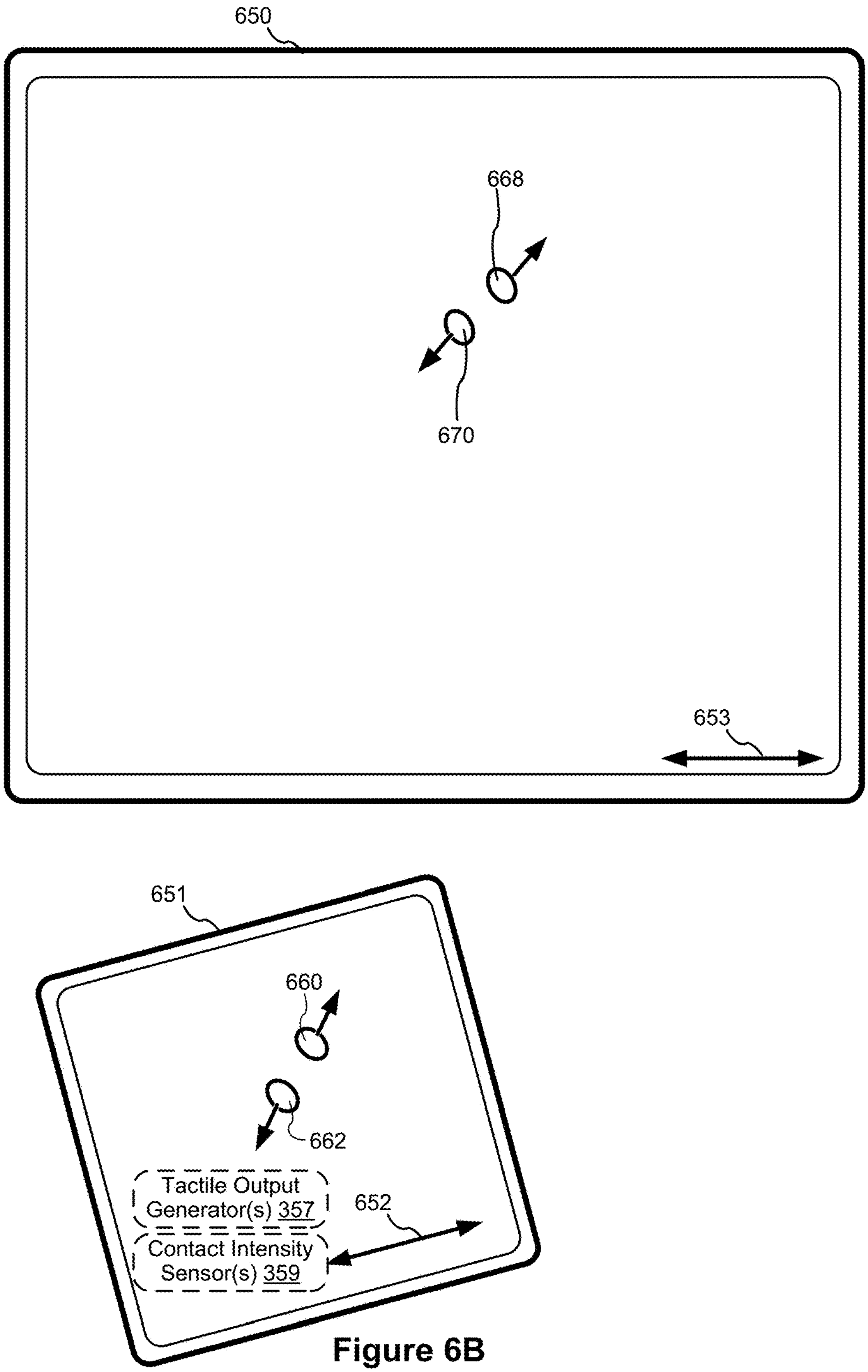
FIG. 6B illustrates an exemplary user interface for a multifunction device with a touch-sensitive surface that is separate from the display in accordance with some embodiments.

FIG. 6B illustrates an exemplary user interface on a device (e.g., device 300, FIG. 3) with a touch-sensitive surface 651 (e.g., a tablet or touchpad 355, FIG. 3) that is separate from the display 650. Device 300 also, optionally, includes one or more contact intensity sensors (e.g., one or more of sensors 359) for detecting intensity of contacts on touch-sensitive surface 651 and/or one or more tactile output generators 359 for generating tactile outputs for a user of device 300.

FIG. 6B illustrates an exemplary user interface on a device (e.g., device 300, FIG. 3) with a touch-sensitive surface 651 (e.g., a tablet or touchpad 355, FIG. 3) that is separate from the display 650. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 6B. In some embodiments, the touch-sensitive surface (e.g., 651 in FIG. 6B) has a primary axis (e.g., 652 in FIG. 6B) that corresponds to a primary axis (e.g., 653 in FIG. 6B) on the display (e.g., 650). In accordance with these embodiments, the device detects contacts (e.g., 660 and 662 in FIG. 6B) with the touch-sensitive surface 651 at locations that correspond to respective locations on the display (e.g., in FIG. 6B, 660 corresponds to 668 and 662 corresponds to 670). In this way, user inputs (e.g., contacts 660 and 662, and movements thereof) detected by the device on the touch-sensitive surface (e.g., 651 in FIG. 6B) are used by the device to manipulate the user interface on the display (e.g., 650 in FIG. 6B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 651 in FIG. 6B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 6A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 and/or 430 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some embodiments, a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiment, the triggering of these responses also depends on time-based criteria being met (e.g., a delay time has elapsed between a first intensity threshold being met and a second intensity threshold being met).

User Interfaces and Associated Processes

Displaying and Updating an Indication Corresponding to a Positional State of a Stylus Before the Stylus Touches a Touch-Sensitive Surface Some electronic devices use a stylus associated with the device to provide additional methods of input to a touch-sensitive surface of the device. For example, some cellular phones, laptops, and tablets have the capability to receive inputs from a stylus. However, due to various reasons (e.g., thickness of the stylus tip, thickness of the glass on the device, etc.), a user may find it difficult to precisely know, before the stylus touches the touch-sensitive surface, where the stylus interaction (e.g., making a mark) will take place. The embodiments below address this problem by displaying and updating an indication corresponding to a positional state of the stylus (e.g., a distance, a tilt, and/or an orientation of the stylus relative to a touch-sensitive display of the device), prior to the stylus touching the touch-sensitive display.

FIGS. 7A-7J illustrate exemplary user interfaces for displaying and updating an indication corresponding to a positional state of a stylus in accordance with some embodiments. The user interfaces in these figures are used to illustrate the processes described below, including the processes in FIGS. 8A-8D. Although some of the examples which follow will be given with reference to inputs on a touch-screen display (where the touch-sensitive surface and the display are combined, for example on touch screen 112), in some embodiments, the device detects inputs on a touch-sensitive surface 651 that is separate from the display 650, as shown in FIG. 6B.

In some embodiments, the device is an electronic device with a separate display (e.g., display 650) and a separate touch-sensitive surface (e.g., touch-sensitive surface 651). In some embodiments, the device is portable multifunction device 100, the display is touch-sensitive display system 112, and the touch-sensitive surface includes tactile output generators 163 on the display (FIG. 1A). For convenience of explanation, the embodiments described with reference to FIGS. 7A-7J and 8A-8D will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 650 and a separate touch-sensitive surface 651 in response to detecting the contacts described in FIGS. 7A-7J on (or near) the touch-sensitive surface 651 while displaying the user interfaces shown in FIGS. 7A-7J on the display 650.

Figure 7A:
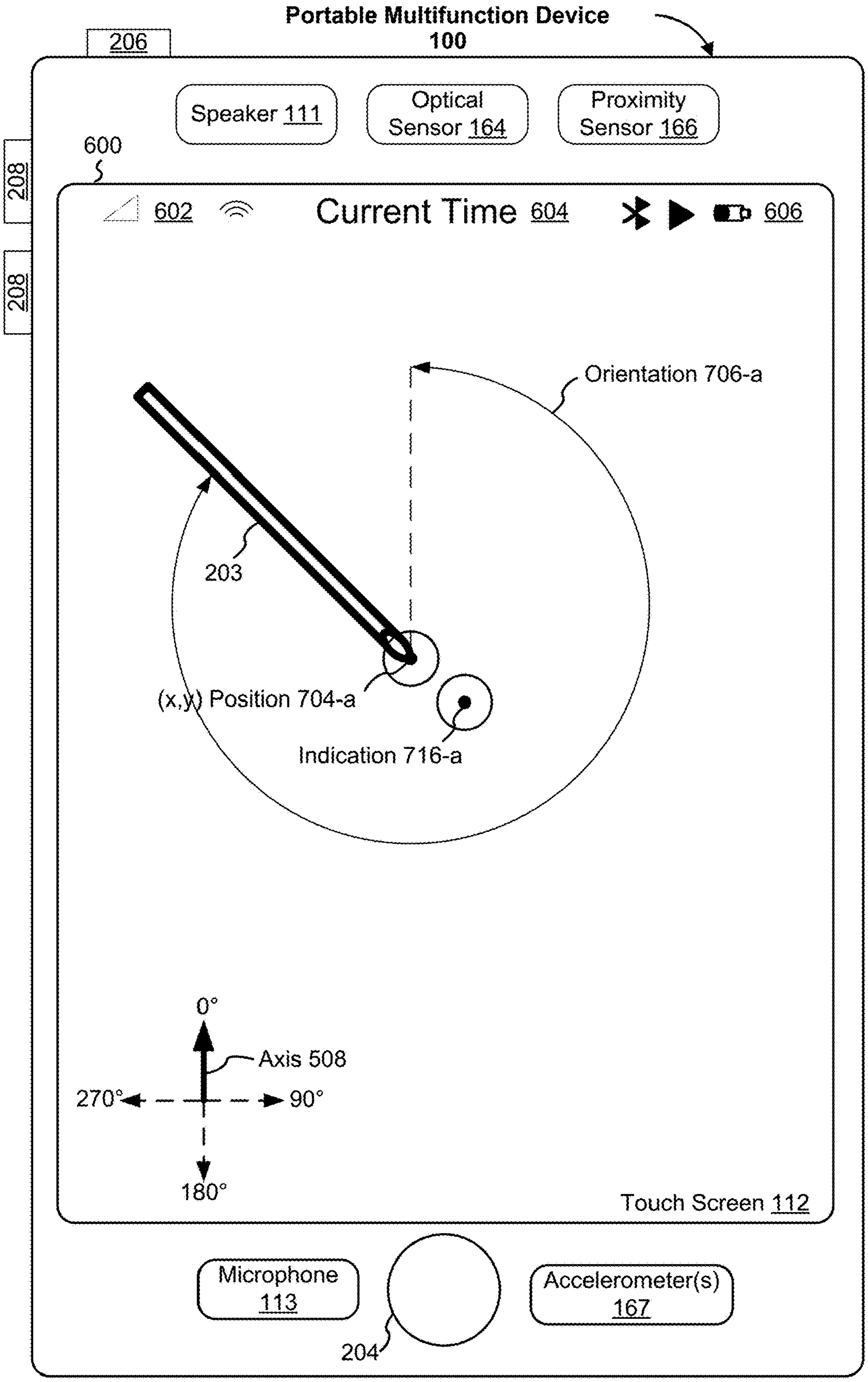

FIGS. 7A-7J illustrate exemplary user interfaces for displaying and updating an indication corresponding to a positional state of a stylus in accordance with some embodiments. While FIG. 7A shows touch screen 112 with additional details of device 100 (e.g., speaker 111, optical sensor 164, proximity sensor 166, etc.), for sake of clarity, FIGS. 7B-7J simply show touch screen 112 of device 100, without showing other details of device 100. Further, while FIG. 7A illustrates an example from a viewpoint directly above a touch-sensitive surface (e.g., touch screen 112 of device 100), FIGS. 7B-7J illustrate examples from two viewpoints: a viewpoint directly above a touch-sensitive surface (e.g., touch screen 112 of device 100) and a side viewpoint of the touch-sensitive surface.

FIG. 7A illustrates an example of displaying an indication (e.g., indication 716-*a*) corresponding to a positional state of a stylus (e.g., stylus 203). In this example, stylus 203 has a positional state with an orientation of stylus 203 relative to touch screen 112 (e.g., orientation 706-*a*) and a position of a projection of a tip of stylus 203 on touch screen 112 (e.g., (x,y) position 704-*a*). As shown in FIG. 7A, before stylus 203 touches touch screen 112, when stylus 203 is positioned with orientation 706-*a* (e.g., approximately 315 degrees in a clockwise rotation angle relative to axis 508) and tip projection at (x,y) position 704-*a*, an indication 716-*a* is displayed on touch screen 112 to show where stylus 203 will touch (or mark) touch screen 112. In some embodiments, the indication is displaced in a first direction on touch screen 112, relative to (x,y) position 704-*a*, when the stylus is positioned in a first orientation and the indication is displaced in a second direction on touch screen 112, relative to (x,y) position 704-*a*, when the stylus is positioned in a second orientation, distinct from the first orientation. For example, in FIG. 5A, indication 516 is displaced in a southwest direction, relative to (x,y) position 504, when stylus 203 is positioned with orientation 506 (e.g., approximately 45 degrees in a clockwise rotation angle relative to axis 508) and in FIG. 7A, indication 716-*a* is displaced in a southeast direction, relative to (x,y) position 704-*a*, when stylus 203 is positioned with orientation 706-*a* (e.g., approximately 315 degrees in a clockwise rotation angle relative to axis 508).

FIGS. 7B-7E illustrate an example of changing the distance (e.g., distance 714) of the stylus (e.g., stylus 203) relative to the touch-sensitive display (e.g., touch screen 112) and in response to the change in distance, updating the displayed indication (e.g., indication 716). In FIGS. 7B-7E, the orientation of the stylus (e.g., orientation 706-*b*), the (x,y) position of the tip of the stylus (e.g., (x,y) position 704-*b*), and the tilt of the stylus (e.g., tilt 712-*a*) remain constant, while the distance of the stylus relative to the touch-sensitive display changes (e.g., from distance 714-*a* to distance 714-*b* to distance 714-*c* to distance 714-*d*) as the stylus moves closer to the touch-sensitive display. Further, as stylus 203 moves closer to touch screen 112, the indication is updated on touch screen 112 (e.g., from indication 716-*b* to indication 716-*c* to indication 716-*d* to indication 716-*e*). As shown in this example, in some embodiments, the indication changes opacity (e.g., with increasing opacity), changes size (or radius or area) (e.g., with decreasing size), and/or changes color (e.g., with darkening color) as stylus 203 moves closer to touch screen 112.

Figure 7B:
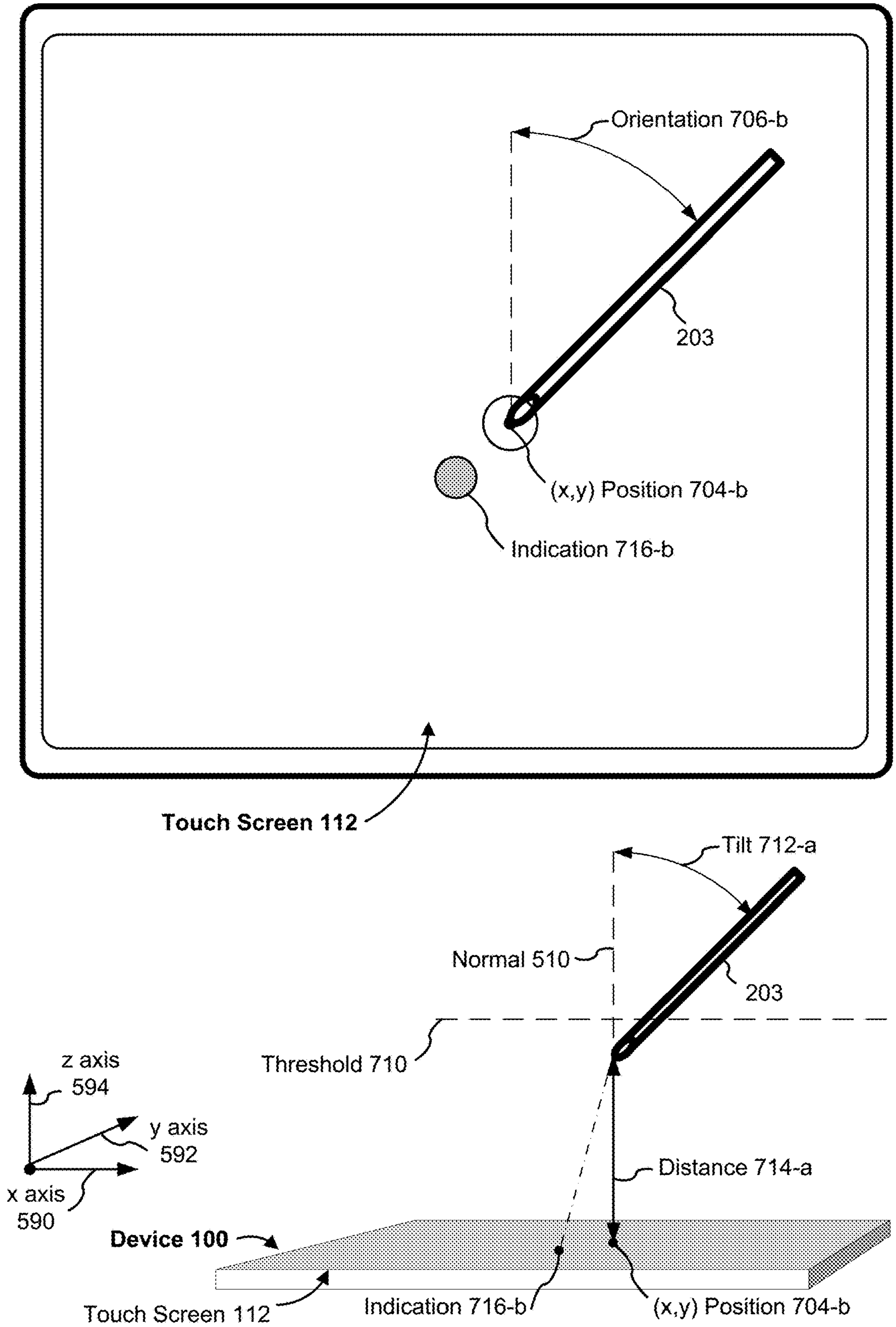
Figure 7C:
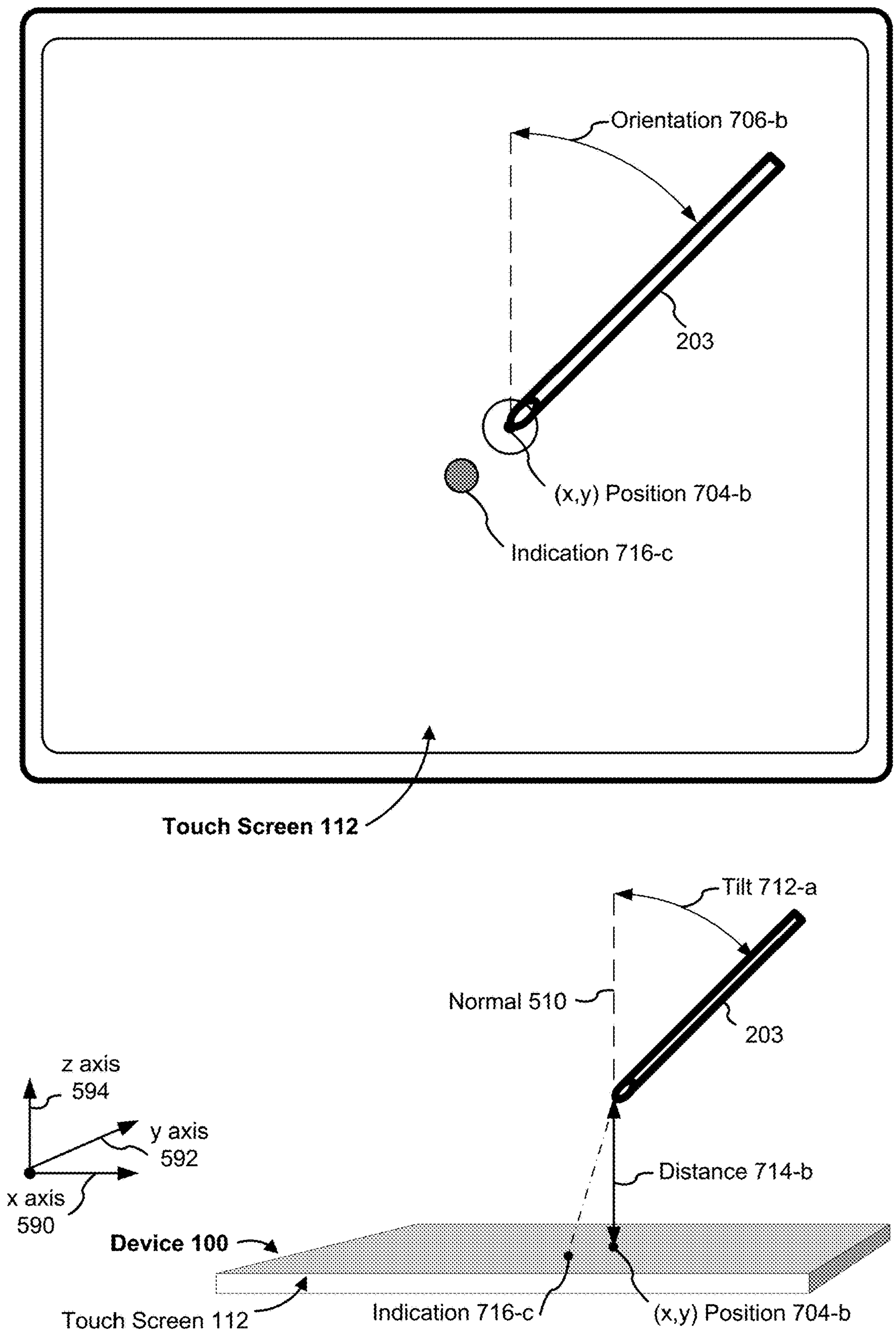
Figure 7D:
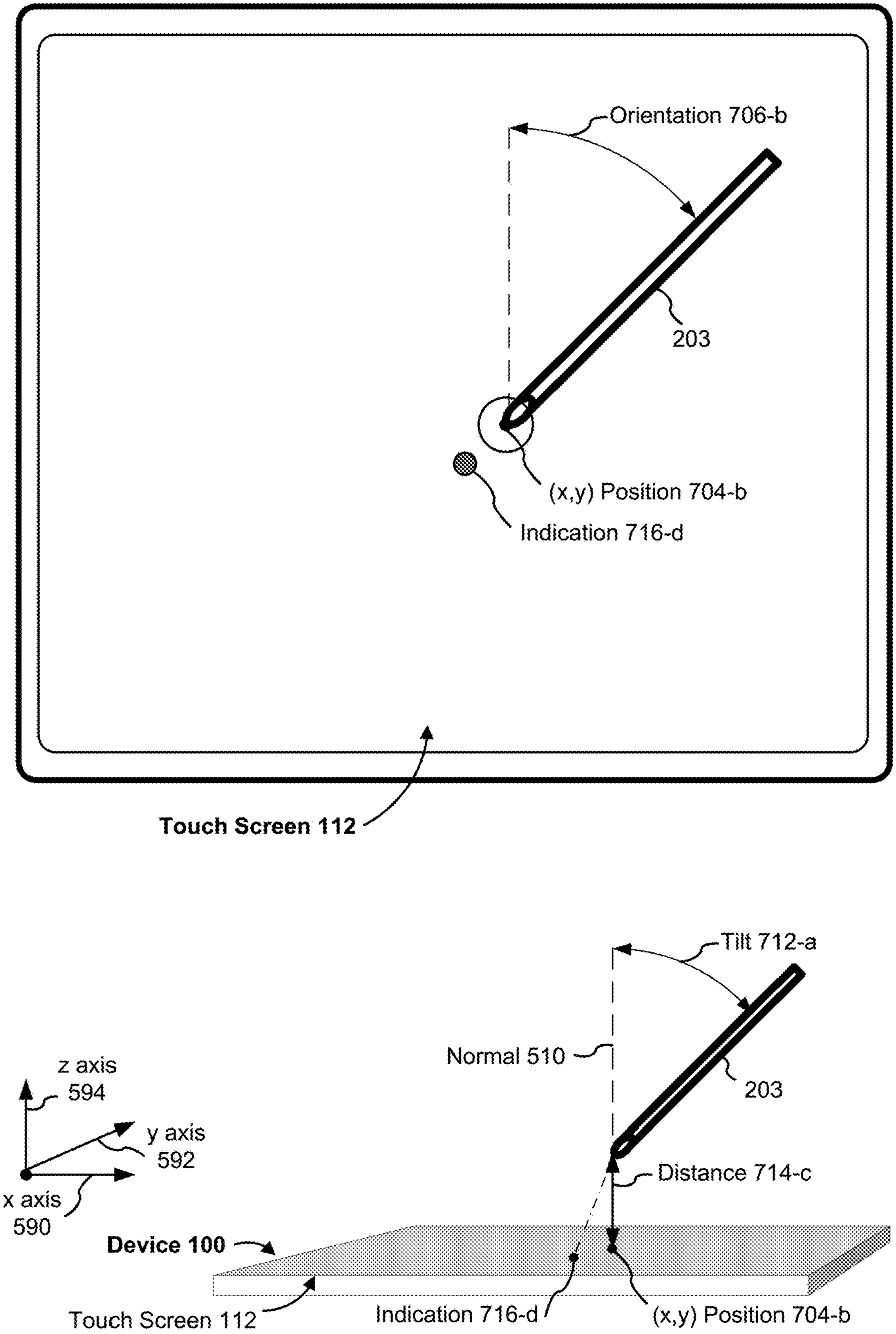
Figure 7E:
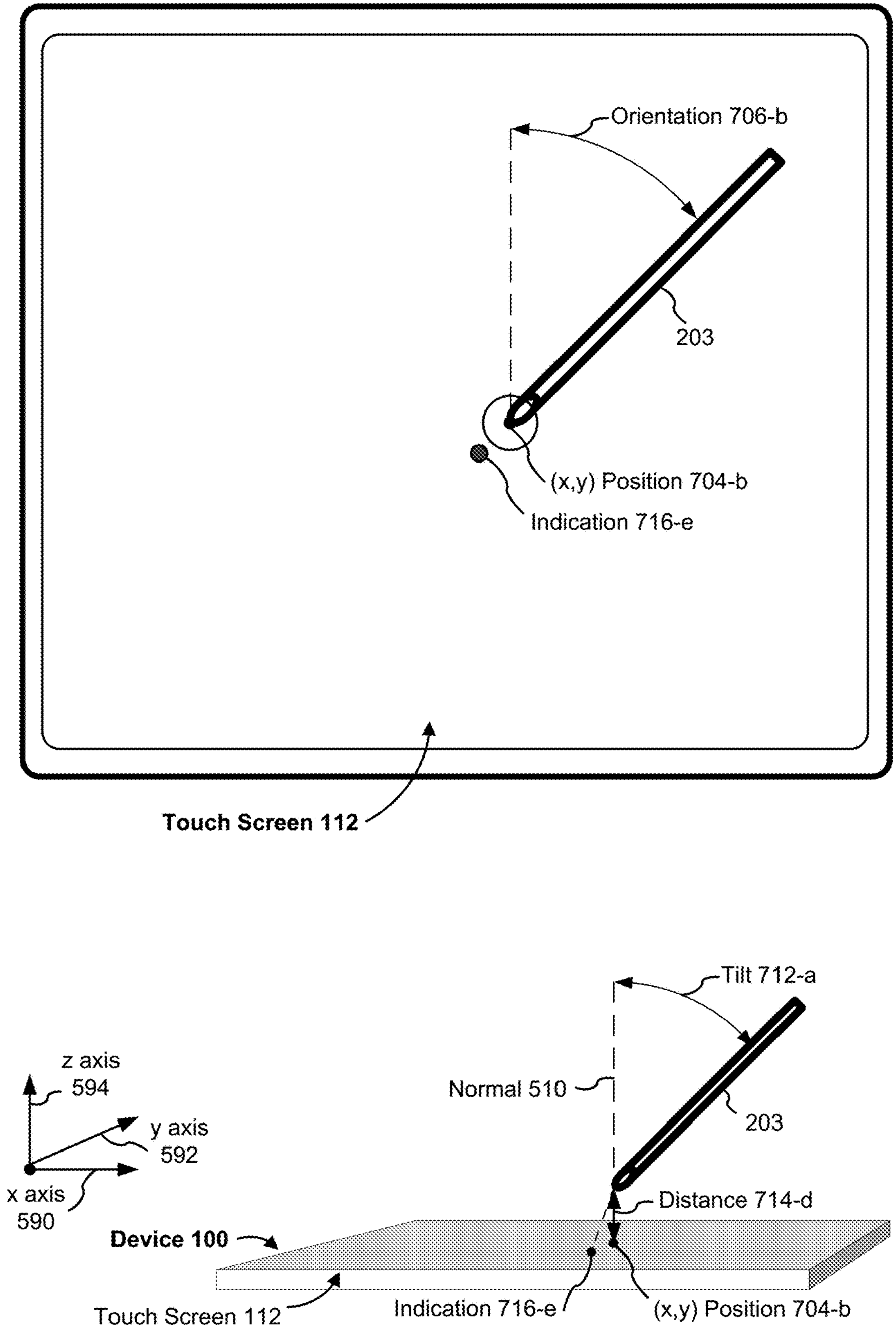
Figure 7G:
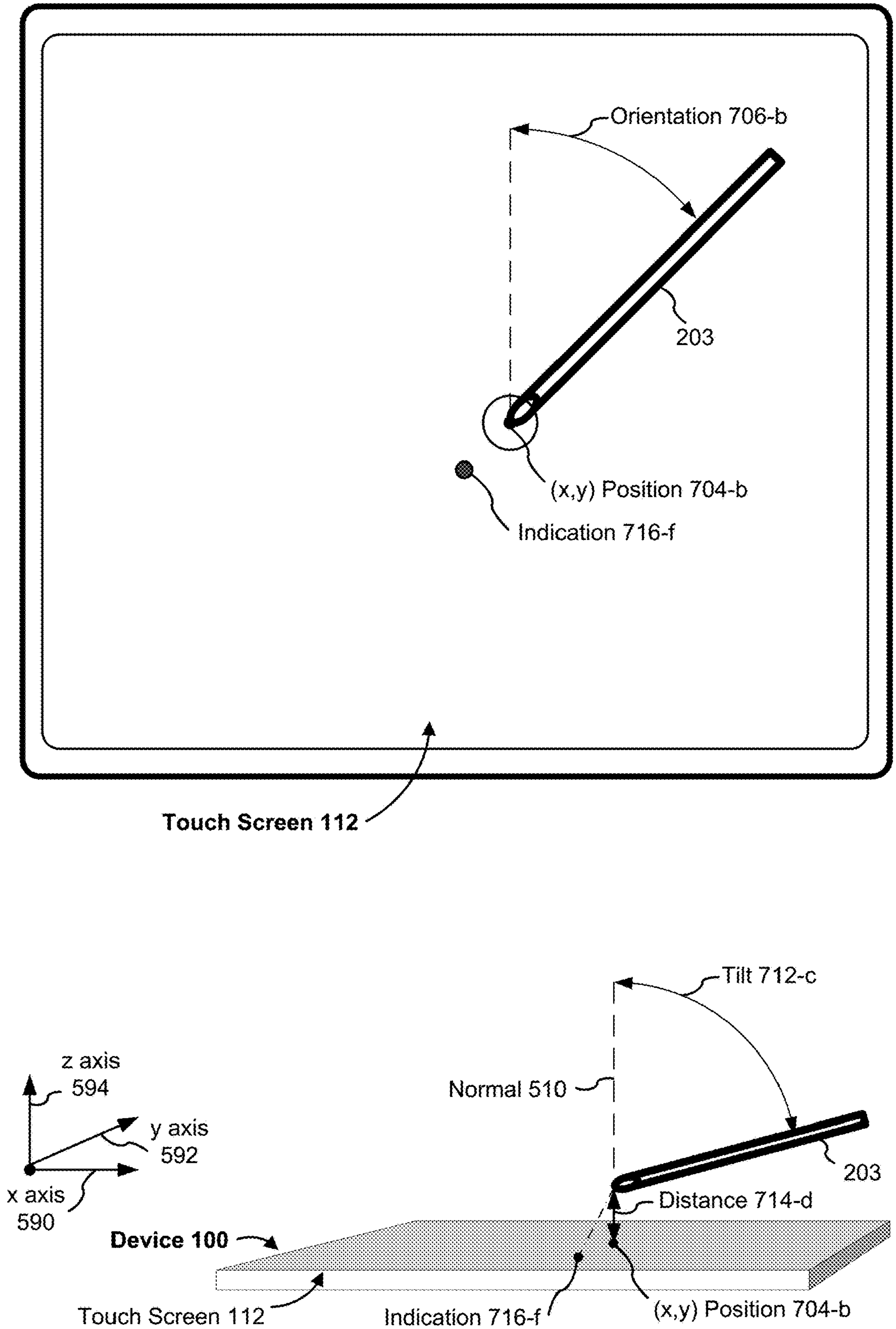

FIGS. 7E-7G illustrate an example of changing the tilt (e.g., tilt 712) of the stylus (e.g., stylus 203) relative to the touch-sensitive display (e.g., touch screen 112) and in response to the change in tilt, updating the displayed indication (e.g., indication 716). In FIGS. 7E-7G, the orientation of the stylus (e.g., orientation 706-*b*), the (x,y) position of the tip of the stylus (e.g., (x,y) position 704-*b*), and the distance of the stylus relative to the touch-sensitive display (e.g., distance 714-*d*) remain constant, while the tilt of the stylus changes (e.g., from tilt 712-*a* to tilt 712-*b* to tilt 712-*c*) as the stylus tilts closer to parallel with device 100. As shown in this example, as the tilt increases, the magnitude of distance between the (x,y) position of the tip of the stylus and the indication increases until reaching a predefined maximum distance. In this example, indication 716-*f* (in FIG. 7F) is at the predefined maximum distance, so although the tilt of stylus 203 changes from tilt 712-*b* (in FIG. 7F) to tilt 712-*c* (in FIG. 7G), indication 716-*f* remains at the same position.

Figure 7H:
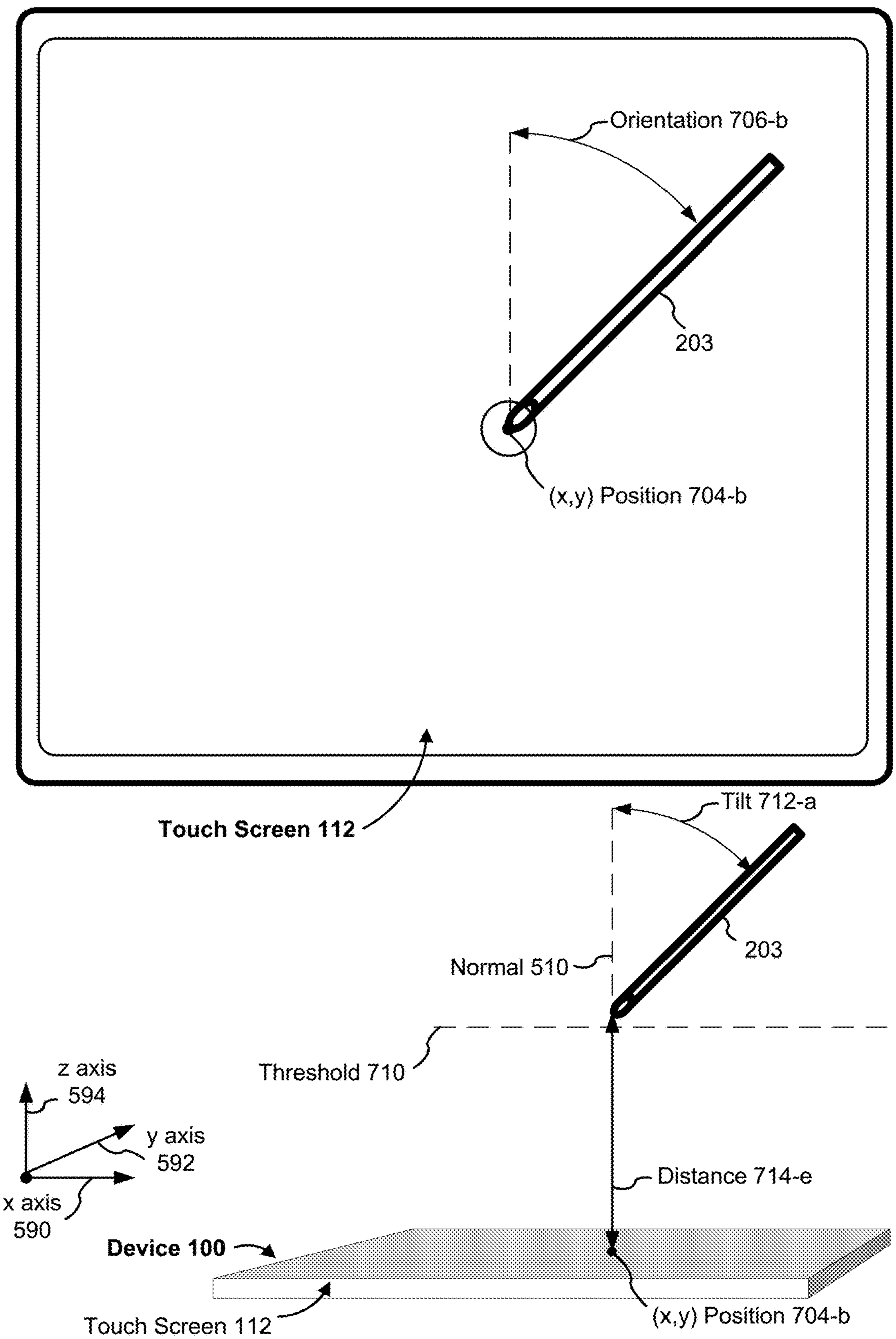

FIG. 7H illustrates an example of ceasing to display the indication on the touch-sensitive display (e.g., touch screen 112) when the stylus (e.g., stylus 203) is more than a predefined distance away from the surface of the touch-sensitive display. Compared to FIG. 7B, when an indication (e.g., indication 716-*b*) is displayed when the tip of stylus 203 is below threshold 710, the indication ceases to display on touch screen 112 when the tip of stylus 203 is above threshold 710 (e.g., at distance 714-*e*), as shown in FIG. 7H.

Figure 7I:
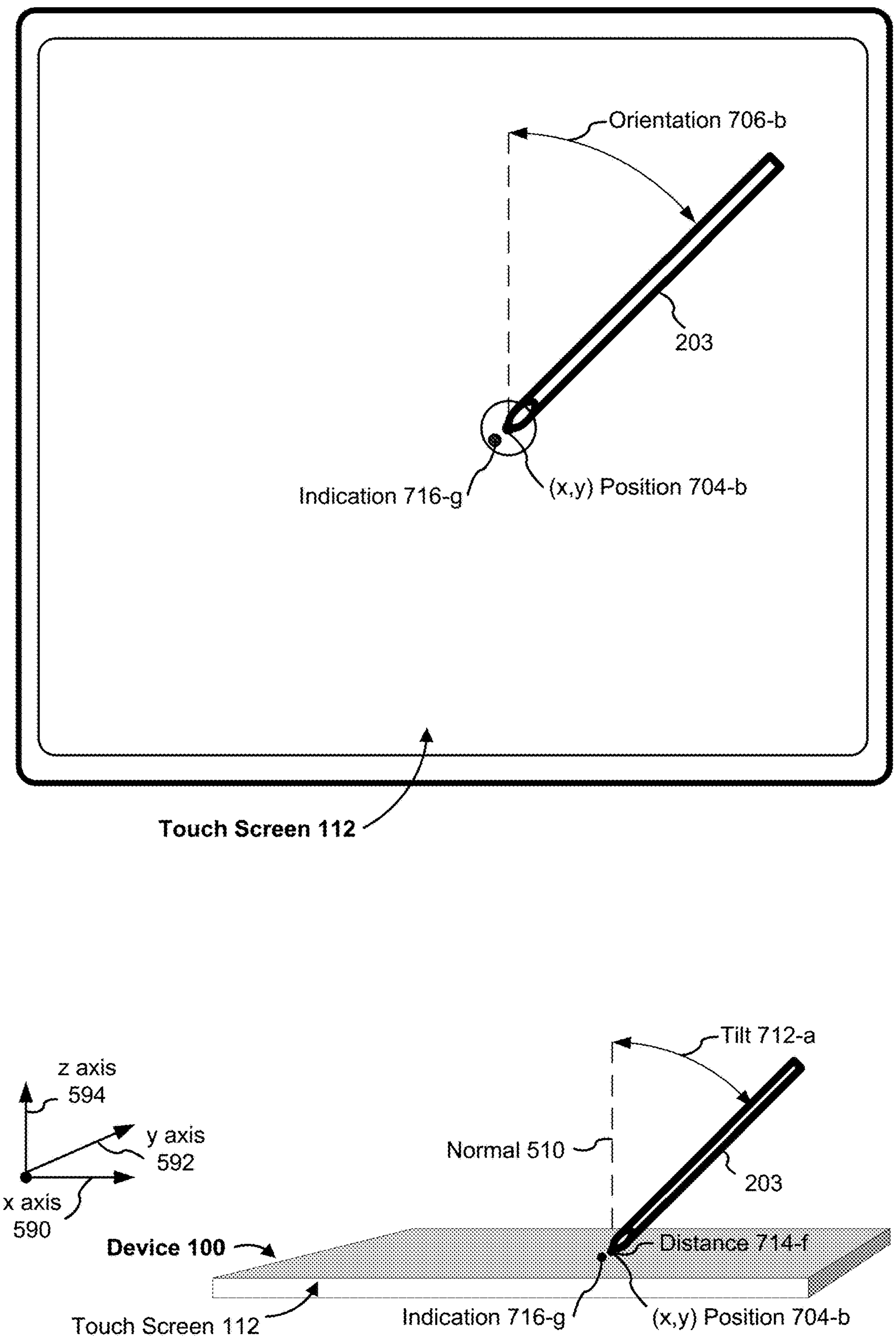

FIG. 7I illustrates an example of displaying an indication (e.g., indication 716-*g*) when the stylus (e.g., stylus 203) is in physical contact with the surface of the touch-sensitive display (e.g., touch screen 112). In some embodiments, when stylus 203 is in physical contact with touch screen 112, the distance of stylus 203 away from touch screen 112 (e.g., distance 714-*f*) is calculated to be greater than zero (e.g., to account for the thickness of a glass layer on touch screen 112). In some embodiments, even when the stylus is in physical contact with the surface of the touch-sensitive display, the indication is updated in response to a change in orientation (as described above with respect to FIG. 7A) and the indication is updated in response to a change in tilt (as described above with respect to FIGS. 7E-7G), and for sake of brevity, the details are not repeated here.

In some embodiments, when stylus 203 is in physical contact with touch screen 112, both an indication and a mark are displayed. In some embodiments, the indication corresponds to a virtual "pen tip" or other element that indicates where a mark will be drawn on the touch-sensitive display. In some embodiments, the mark is a point, line, brushstroke, or the like on the touch-sensitive display. In some embodiments, the indication corresponds to one end (a terminus) of the mark. For example, when the mark being drawn is a line, the indication corresponds to (or is adjacent to) the end of the line being drawn. In some embodiments, if the indication is displayed when the stylus is in physical contact with the surface of the touch-sensitive display, the shape (and optionally color) of the indication corresponds to the shape (and optionally color) of a tip of a virtual drawing implement being emulated by the stylus. For example, if the stylus is being used as a virtual yellow highlighter, the indication is a yellow rectangle (corresponding to the chisel tip of a highlighter), and as the stylus is moved across the surface of the touch-sensitive display, a mark is created (e.g., by propagating the size/shape/color of the indication along the path of the stylus). If the stylus is being used as a virtual yellow highlighter and the stylus touches down at a point on the touch-sensitive display and then lifts off, without moving across the touch-sensitive display, a yellow rectangle mark (corresponding to an indication that is the chisel tip of a highlighter) may be displayed at the point on the touch-sensitive display where the stylus touched down.

Figure 7J:
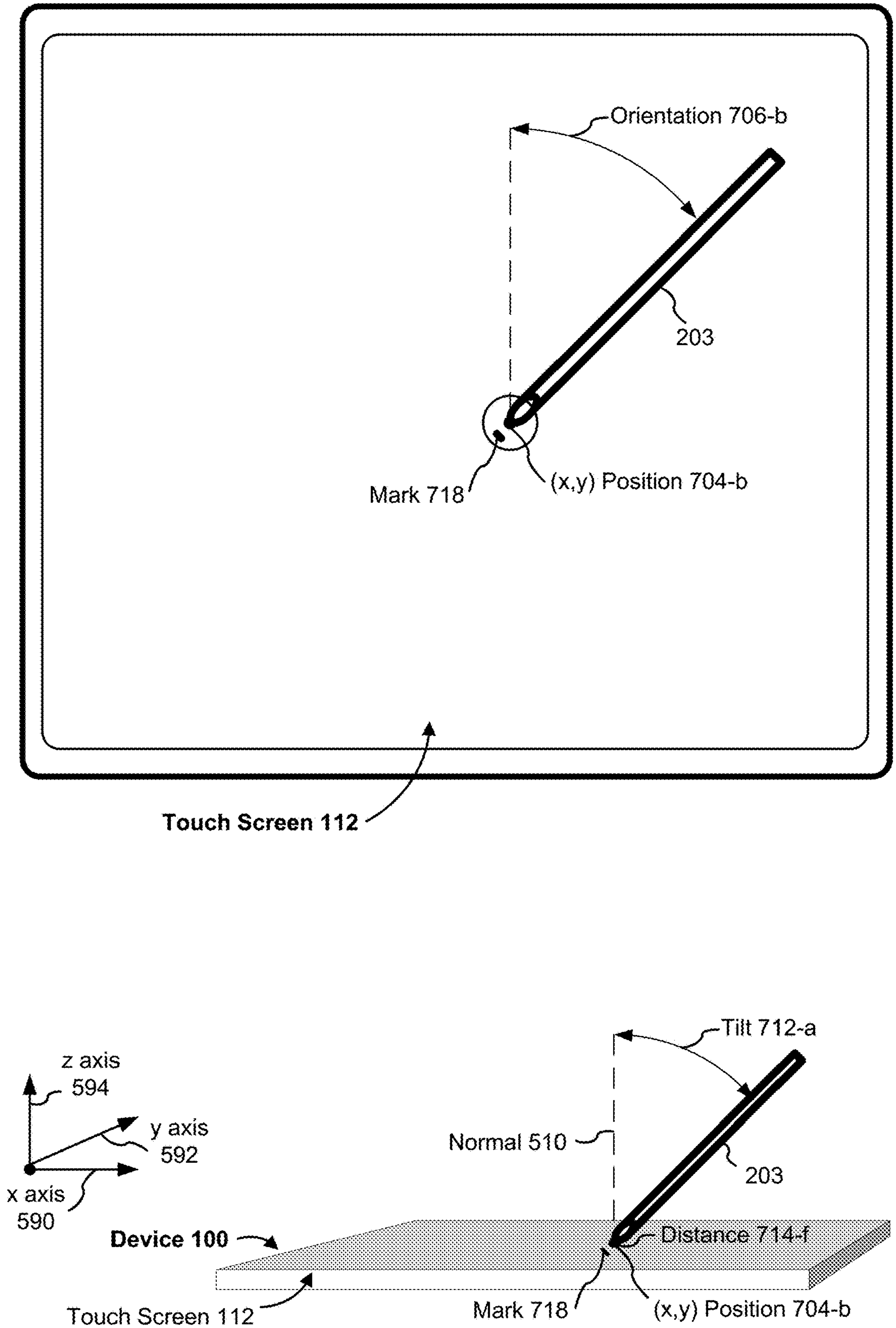
Figure 8C:
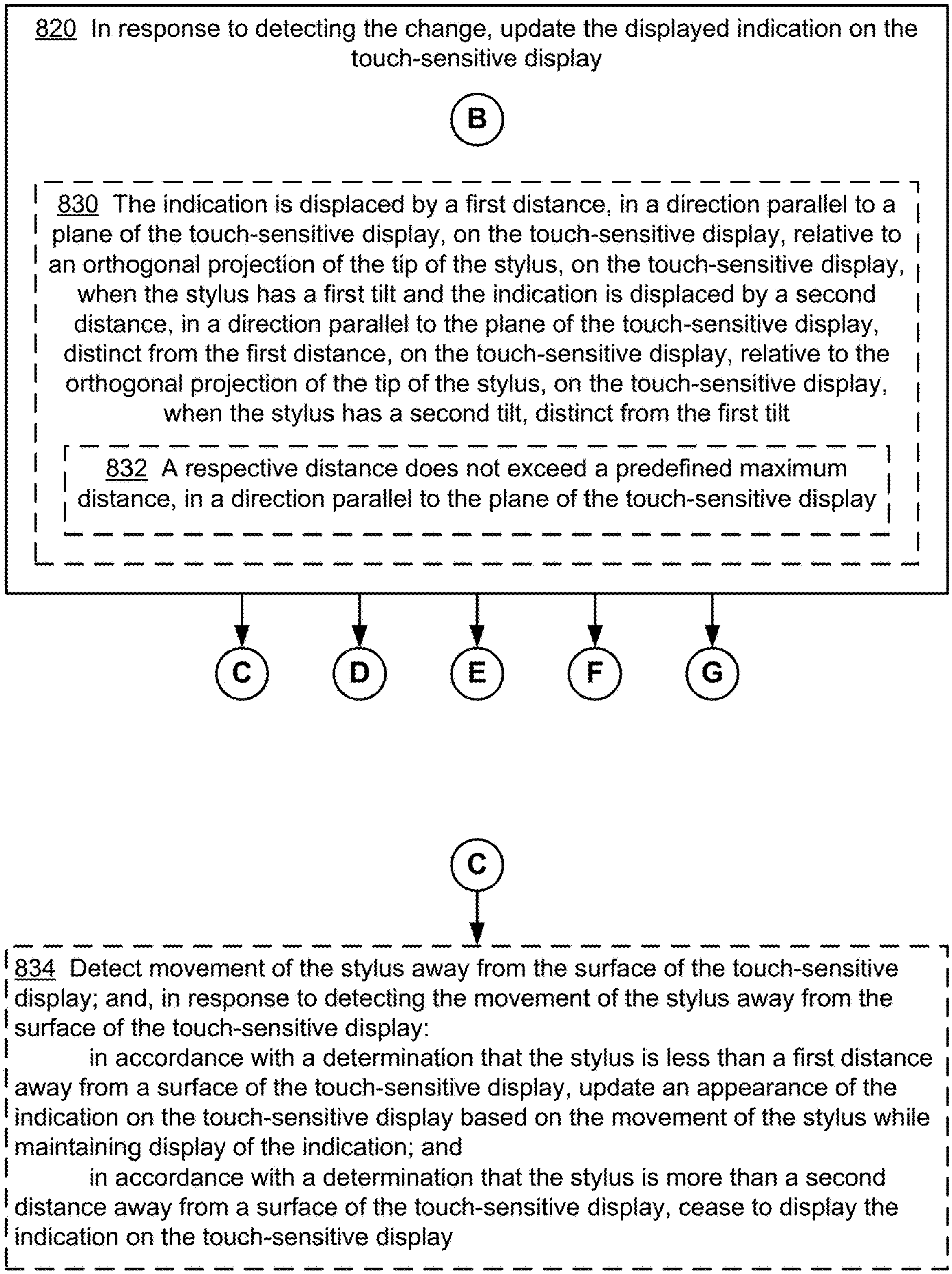
Figure 8D:
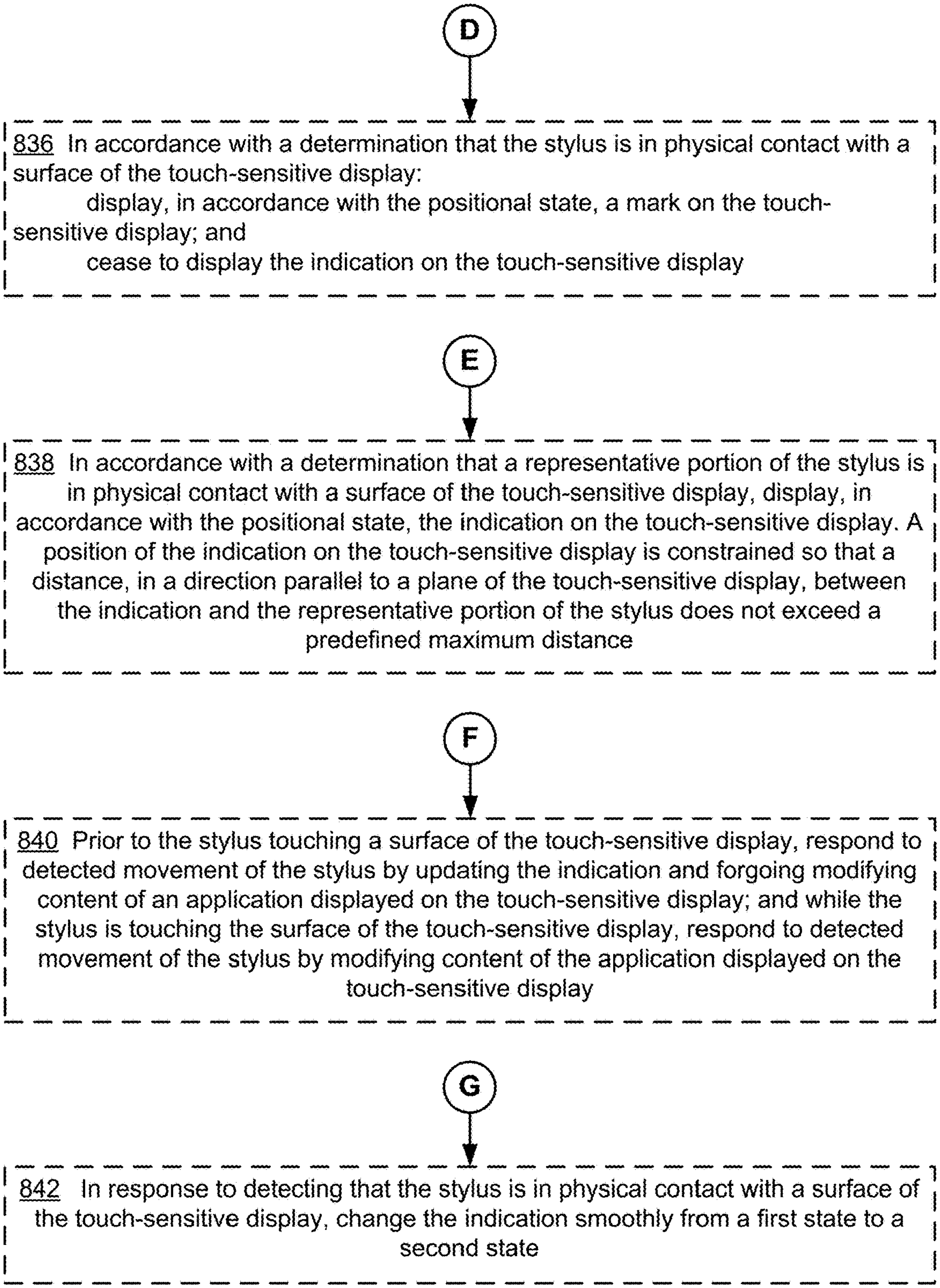

FIG. 7J illustrates an example of displaying a mark (e.g., mark 718) and ceasing to display an indication when the stylus (e.g., stylus 203) is in physical contact with the surface of the touch-sensitive display (e.g., touch screen 112).

FIGS. 8A-8D are flow diagrams illustrating a method 800 of displaying and updating an indication corresponding to a positional state of a stylus in accordance with some embodiments. The method 800 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display (also called simply a touch-sensitive display). In some embodiments, the display is separate from the touch-sensitive surface. In some embodiments, the device includes one or more sensors to detect signals from a stylus associated with the device, the stylus including a representative portion (e.g., a tip of the stylus). In some embodiments, a portion on the stylus other than the tip is used to estimate the location of the tip. Some operations in method 800 are, optionally, combined and/or the order of some operations is, optionally, changed.

As described below, the method 800 provides an intuitive way to display and update an indication corresponding to a positional state of a stylus. The method reduces the number, extent, and/or nature of the inputs from a user when using a stylus to interact with an electronic device, thereby creating a more efficient human-machine interface. For battery-operated electronic devices, enabling a user to enter stylus input faster and more efficiently conserves power and increases the time between battery charges.

The device detects (802) a positional state of the stylus, wherein the positional state of the stylus corresponds to (or indicates) a distance of the stylus relative to the touch-sensitive display, a tilt of the stylus relative to the touch-sensitive display, and/or an orientation of the stylus relative to the touch-sensitive display. FIG. 7B, for example, shows stylus 203 with a positional state corresponding to distance 714-*a*, tilt 712-*a*, and orientation 706-*b*. In some embodiments, the positional state includes a set of positional parameters (e.g., one or more positional parameters). In some embodiments, the positional state is detected in accordance with one or more measurements from the stylus that are sent to the electronic device. For example, the stylus measures the tilt and/or the orientation of the stylus and sends the measurement to the electronic device. Alternatively, in some embodiments, the positional state is detected in accordance with raw output, from one or more electrodes in the stylus, that is sensed by the touch-sensitive display. For example, the touch-sensitive display receives raw output from one or more electrodes in the stylus and calculates the tilt and/or the orientation of the stylus based on the raw output.

In some embodiments, the tilt of the stylus is (804) an angle relative to a normal to a surface of the touch-sensitive display (also called simply the normal to the touch-sensitive display) and the orientation of the stylus is an orientation of a projection of the stylus onto the touch-sensitive display (e.g., an orthogonal projection of a length of the stylus or a line corresponding to the line between the projection of two different points of the stylus onto the touch-sensitive display) relative to at least one axis in a plane parallel to the touch-sensitive display. For example, in FIG. 5B, tilt 512 of stylus 203 is an angle relative to normal 510 of touch screen 112, and in FIG. 5A, orientation 506 of stylus 203 is an orientation of a projection of stylus 203 onto touch screen 112 relative to axis 508. In some embodiments, the orientation of the projection of the stylus onto the touch-sensitive display is relative to a single axis (e.g., a single axis with a clockwise rotation angle from the axis ranging from 0 degrees to 360 degrees), such as axis 508 in FIG. 5A. Alternatively, in some embodiments, the orientation of the projection of the stylus onto the touch-sensitive display is relative to a pair of axes (e.g., an x axis and a y axis such as x axis 590 and y axis 592 in FIG. 5A, or a pair of axes associated with an application displayed on the touch-sensitive display).

In some embodiments, when the stylus is in physical contact with a surface of the touch-sensitive display, the distance of the stylus away from the touch-sensitive display is (806) calculated to be greater than zero (e.g., to account for the thickness of a glass layer on the touch-sensitive display (e.g., touch screen 112), so as to carry through the indication "onto the pixels" of the display rather than displaying the indication "on the glass" that covers the pixels). In some embodiments, when the stylus is in physical contact with a surface of the touch-sensitive display, the distance of the stylus away from the touch-sensitive display is defined to be greater than zero. For example, in FIG. 7I, when stylus 203 is in physical contact with a surface of touch screen 112, distance 714-*f* is calculated (or defined) to be greater than zero.

In some embodiments, the positional state includes (808) a position of a projection of a tip (or other representative portion) of the stylus on the touch-sensitive display. In some embodiments, the tip of the stylus is a terminus of the stylus configured for determining proximity of the stylus to the touch-sensitive display. In some embodiments, the projection of the tip of the stylus on the touch-sensitive display is an orthogonal projection. In other words, the projection of the tip of the stylus on the touch-sensitive display is a point at the end of a line from the stylus tip to the touch-sensitive display that is normal to a surface of the touch-sensitive display. For example, in FIG. 5B, (x,y) position 504 is the projection of the tip of stylus 203 on touch screen 112, as it is a point at which the tip of stylus 203 would contact touch screen 112 if stylus 203 were moved directly along a path normal to touch screen 112 (e.g., along the path of normal 510).

In some embodiments, a first electrode of the stylus, detectable by the electronic device (e.g., by a mechanism in the touch-sensitive display of the device), is (810) proximate to the tip of the stylus, and a second electrode of the stylus, detectable by the electronic device (e.g., by a mechanism in the touch-sensitive display of the device), is displaced from the first electrode by a predefined distance. In some embodiments, the first electrode of the stylus is at (or near) the tip of the stylus, and the second electrode of the stylus is a ring that is displaced from the first electrode by a predefined distance. In some embodiments, stylus 203, as shown in FIGS. 5A-5B, has a first electrode at (or near) the tip of stylus 203 and a second electrode that is a ring that is displaced from the first electrode by a predefined distance, where both electrodes are detectable by device 100 (e.g., by a mechanism in touch screen 112 of device 100).

The device determines (812) a location on the touch-sensitive display (e.g., touch screen 112) that corresponds to the detected positional state of the stylus (e.g., stylus 203). Using FIGS. 5A-5B as an example, the location on touch screen 112 that corresponds to the detected positional state of stylus 203 is determined by orientation 506, (x,y) position 504, tilt 512, and/or distance 514.

The device displays (814), in accordance with the positional state of the stylus (e.g., stylus 203), an indication on the touch-sensitive display (e.g., touch screen 112) of the determined location prior to the stylus touching the touch-sensitive display. In some embodiments, the displayed indication shows where the stylus will touch/mark the touch-sensitive display before the stylus touches the touch-sensitive display. For example, in FIG. 7B, indication 716-*b* is displayed on touch screen 112 prior to stylus 203 touching touch screen 112 (since stylus 203 is still distance 714-*a* away from touch screen 112). In some embodiments, the displayed indication accounts for thickness of the glass of the touch-sensitive display.

In some embodiments, displaying the indication on the touch-sensitive display includes (816) determining a color for the indication in accordance with a background color of the touch-sensitive display at the determined location. In some embodiments, determining a color for the indication in accordance with a background color of the touch-sensitive display at the determined location includes determining a color for the indication that contrasts with the background color of the touch-sensitive display at the determined location. For example, in some embodiments, if the background color of the touch-sensitive display is white, the determined color for the indication is gray or black or another color that contrasts with white. For example, in FIG. 7B, where the background color of touch screen 112 is white, the color for indication 716-*b* is gray. As another example, in some embodiments, if the background color of the touch-sensitive display is black, the determined color for the indication is white or yellow or another color that contrasts with black.

The device detects (818) a change in the distance, the tilt, and/or the orientation of the stylus (e.g., stylus 203), prior to the stylus touching the touch-sensitive display (e.g., touch screen 112). For example, FIGS. 7B-7E illustrate a change in the distance of stylus 203 from touch screen 112 (e.g., from distance 714-*a* to distance 714-*b* to distance 714-*c* to distance 714-*d*), prior to stylus 203 touching touch screen 112. As another example, FIGS. 7E-7G illustrate a change in the tilt of stylus 203 (e.g., from tilt 712-*a* to tilt 712-*b* to tilt 712-*c*), prior to stylus 203 touching touch screen 112. As yet another example, FIGS. 5A and 7A illustrate a change in the orientation of stylus 203 (e.g., from orientation 506 to orientation 706-*a*), prior to stylus 203 touching touch screen 112.

In response to detecting the change, the device updates (820) the displayed indication on the touch-sensitive display (e.g., touch screen 112). For example, FIGS. 7B-7E illustrate updating the displayed indication in response to detecting a change in the distance of stylus 203 from touch screen 112; the indication is updated on touch screen 112 from indication 716-*b* to indication 716-*c* to indication 716-*d* to indication 716-*e* as the distance changes from distance 714-*a* to distance 714-*b* to distance 714-*c* to distance 714-*d*, respectively. As another example, FIGS. 7E-7F illustrate updating the displayed indication in response to detecting a change in the tilt of stylus 203; the indication is updated on touch screen 112 from indication 716-*e* to indication 716-*f* as the tilt changes from tilt 712-*a* to tilt 712-*b*. As yet another example, FIGS. 5A and 7A illustrate updating the displayed indication in response to detecting a change in the orientation of stylus 203; the indication is updated on touch screen 112 from indication 516 to indication 716-*a* as the orientation changes from orientation 506 to orientation 706-*a*.

In some embodiments, the indication is (822) displayed with a first color when (the tip or other representative portion of) the stylus is a first distance away from the touch-sensitive display (in a direction normal to the display) and the indication is displayed with a second color, distinct from the first color, when the stylus is a second distance away from the touch-sensitive display (in a direction normal to the display), distinct from the first distance. In some embodiments, the color of the indication increases in darkness as the distance decreases. For example, in FIG. 7B, the indication (e.g., indication 716-*b*) is displayed with a light gray color when the tip of stylus 203 is distance 714-*a* away from touch screen 112, and in FIG. 7D, the indication (indication 716-*d*) is displayed with a darker gray color when the tip of stylus 203 is distance 714-*c* away from touch screen 112 (e.g., closer to touch screen 112).

In some embodiments, the indication is (824) a first size (e.g., radius or area) when (the tip or other representative portion of) the stylus is a first distance away from the touch-sensitive display (in a direction normal to the display) and the indication is a second size, distinct from the first size, when the stylus is a second distance away from the touch-sensitive display (in a direction normal to the display), distinct from the first distance. In some embodiments, the size of the indication decreases as the distance decreases. For example, in FIG. 7B, the indication (e.g., indication 716-*b*) is a large circle when the tip of stylus 203 is distance 714-*a* away from touch screen 112, and in FIG. 7D, the indication (indication 716-*d*) is a smaller circle when the tip of stylus 203 is distance 714-*c* away from touch screen 112 (e.g., closer to touch screen 112).

In some embodiments, the indication is (826) a first opacity when (the tip or other representative portion of) the stylus is a first distance away from the touch-sensitive display (in a direction normal to the display) and the indication is a second opacity, distinct from the first opacity, when the stylus is a second distance away from the touch-sensitive display (in a direction normal to the display), distinct from the first distance. In some embodiments, the opacity of the indication increases as the distance decreases. For example, in FIG. 7B, the indication (e.g., indication 716-*b*) is less opaque when the tip of stylus 203 is distance 714-*a* away from touch screen 112, and in FIG. 7D, the indication (indication 716-*d*) is more opaque when the tip of stylus 203 is distance 714-*c* away from touch screen 112 (e.g., closer to touch screen 112).

In some embodiments, the indication is (828) displaced in a first direction, on the touch-sensitive display, relative to a projection of the tip (or other representative portion) of the stylus, on the touch-sensitive display, when the stylus is positioned in a first orientation and the indication is displaced in a second direction, distinct from the first direction, on the touch-sensitive display, relative to the projection of the tip (or other representative portion of) of the stylus, on the touch-sensitive display, when the stylus is positioned in a second orientation, distinct from the first orientation. In some embodiments, the direction of the indication (e.g., indication 516, FIG. 5A), relative to the projection of the tip of the stylus (e.g., (x,y) position 504, FIG. 5A) changes as the orientation of the stylus (e.g., stylus 203) changes. For example, in FIG. 5A, indication 516 is displaced in a first direction relative to (x,y) position 504 (e.g., indication 516 is southwest of (x,y) position 504, or indication 516 is 225 degrees in a clockwise rotation angle from (x,y) position 504 relative to axis 508) when stylus 203 is positioned with orientation 506, and in FIG. 7A, indication 716-*a* is displaced in a second direction relative to (x,y) position 704-*a*

(e.g., indication 716 is southeast of (x,y) position 704-*a*, or indication 716-*a* is 135 degrees in a clockwise rotation angle from (x,y) position 704-*a* relative to axis 508) when stylus 203 is positioned with orientation 706-*a*.

In some embodiments, the indication is (830) displaced by a first distance, in a direction parallel to a plane of the touch-sensitive display, on the touch-sensitive display, relative to an orthogonal projection of the tip (or other representative portion) of the stylus, on the touch-sensitive display, when the stylus has a first tilt and the indication is displaced by a second distance, in a direction parallel to the plane of the touch-sensitive display, distinct from the first distance, on the touch-sensitive display, relative to the orthogonal projection of the tip of the stylus, on the touch-sensitive display, when the stylus has a second tilt, distinct from the first tilt. In some embodiments, the method includes displacing the indication from an orthogonal projection (e.g., (x,y) position 504 in FIG. 5B at which the tip of the stylus would touch the touch-sensitive display if the stylus were moved directly along a path normal (e.g., along normal 510) to the touch-sensitive display) of the tip of the stylus on the touch-sensitive display by a distance that corresponds to the tilt of the stylus. For example, in FIG. 7E, indication 716-*e* is a first distance away from (x,y) position 704-*b* when stylus 203 has a first tilt (e.g., tilt 712-*a*), and in FIG. 7F, indication 716-*f* is a second distance away from (x,y) position 704-*b* when stylus 203 has a second tilt (e.g., tilt 712-*b*). In some embodiments, the indication is displaced by a greater distance from the projection of the tip as the tilt of the stylus increases. For example, indication 716-*e* is displaced by a shorter distance relative to (x,y) position 704-*b* when stylus 203 is positioned with a tilt of 712-*a* (as shown in FIG. 7E) and indication 716-*f* is displaced by a greater distance relative to (x,y) position 704-*b* when stylus 203 is positioned with an increased tilt of 712-*b* (as shown in FIG. 7F). In some embodiments, a respective distance from an orthogonal projection of the tip of the stylus is greater than zero, but less than the distance between a point at which a line projected along the length of the stylus intersects the touch screen and the orthogonal projection position 504, as shown in FIG. 5B.

In some embodiments, a respective distance does not exceed (832) a predefined maximum distance, in a direction parallel to the plane of the touch-sensitive display (e.g., between the indication and the projection in a direction parallel to (the plane of) the touch-sensitive display). For example, the first distance and the second distance (as described above with respect to operation 830) do not exceed a predefined maximum distance, as shown in FIGS. 7E-7G. In some embodiments, if the indication is already at the predefined maximum distance, further increases in the tilt of the stylus do not increase the magnitude of the distance relative to the projection of the tip of the stylus. For example, as shown in FIGS. 7F-7G, although the tilt of stylus 203 increases from tilt 712-*b* to tilt 712-*c*, indication 716-*f* remains the same since it is already at the predefined maximum distance relative to (x,y) position 704-*b*.

In some embodiments, the details of operations 828, 830, and 832 apply even when the stylus (e.g., stylus 203) is in contact with a surface of the touch-sensitive display (e.g., touch screen 112) (e.g., as described below with respect to operation 838 and with respect to method 1100. For example, in some embodiments when stylus 203 is in contact with a surface of touch screen 112, the direction of the indication (e.g., indication 516, FIG. 5A), relative to the projection of the tip of the stylus (e.g., (x,y) position 504, FIG. 5A) changes as the orientation of the stylus (e.g., stylus 203) changes, as described above with respect to operation 828. As another example, in some embodiments when stylus 203 is in contact with a surface of touch screen 112, the magnitude of the distance between the indication (e.g., indication 516, FIG. 5A) and the projection of the tip of the stylus (e.g., (x,y) position 504, FIG. 5A) changes as the tilt of the stylus (e.g., stylus 203) changes, as described above with respect to operation 830. As yet another example, in some embodiments when stylus 203 is in contact with a surface of touch screen 112, the distance between the indication (e.g., indication 516, FIG. 5A) and the projection of the tip of the stylus (e.g., (x,y) position 504, FIG. 5A) does not exceed a predefined maximum distance, as described above with respect to operation 832.

In some embodiments, the device detects (834) movement of the stylus (e.g., a tip of the stylus) away from the surface of the touch-sensitive display, and, in response to detecting the movement of the stylus away from the surface of the touch-sensitive display: in accordance with a determination that the stylus is less than a first distance away from a surface of the touch-sensitive display, the device updates an appearance of the indication on the touch-sensitive display based on the movement of the stylus while maintaining display of the indication; and in accordance with a determination that the stylus is more than a second distance away from a surface of the touch-sensitive display, the device ceases to display the indication on the touch-sensitive display. For example, as shown in FIGS. 7B-7G, when the tip of stylus 203 is less than a first distance (e.g., threshold 710) away from the surface of touch screen 112, the device updates an appearance of the indication on touch screen 112 (e.g., the indication gets darker in color, more opaque, and/or smaller in size as stylus 203 moves closer to touch screen 112); further, as shown in FIG. 7H, when the tip of stylus 203 is more than a second distance (e.g., threshold 710) away from the surface of touch screen 112, the device ceases to display the indication on touch screen 112. In some embodiments, the first distance is the same as the second distance (e.g., the first distance and the second distance are both threshold 710, as shown in FIGS. 7B and 7H). In some embodiments, the first distance is less than the second distance.

In some embodiments, in accordance with a determination that the stylus is in physical contact with a surface of the touch-sensitive display (836): the device displays, in accordance with the positional state, a mark on the touch-sensitive display; and the devices ceases to display the indication on the touch-sensitive display. For example, as shown in FIG. 7J, when stylus 203 is in physical contact with a surface of touch screen 112, the device displays mark 718 and ceases to display an indication on touch screen 112.

In some embodiments, in accordance with a determination that a representative portion of the stylus (e.g., a tip of the stylus) is in physical contact with a surface of the touch-sensitive display (838): the device displays, in accordance with the positional state, the indication on the touch-sensitive display, wherein a position of the indication on the touch-sensitive display is constrained so that a distance, in a direction parallel to a plane of the touch-sensitive display, between the indication and the representative portion of the stylus does not exceed a predefined maximum distance. For example, when the stylus tip is in physical contact with the surface of the touch-sensitive display, the indication is displayed with truncation of the distance, in a direction parallel to a plane of the touch-sensitive display, between the indication and the tip, on the touch-sensitive display. As shown in FIG. 7I, for example, when stylus 203 is in physical contact with a surface of touch screen 112, the device displays indication 716-*g*, where the distance between indication 716-*g* and (x,y) position 704-*b* does not exceed a predefined maximum distance (e.g., regardless of increases in the tilt of stylus 203).

In some embodiments, prior to the stylus touching a surface of the touch-sensitive display (or coming within a predetermined distance of the touch-sensitive display), the device responds (840) to detected movement of the stylus by updating the indication and forgoing modifying content of an application displayed on the touch-sensitive display; and while the stylus is touching the surface of the touch-sensitive display (or is within the predetermined distance of the touch-sensitive display), the device responds to detected movement of the stylus by modifying content of the application displayed on the touch-sensitive display. In some embodiments, while the stylus is touching the surface of the touch-sensitive display, the device responds to detected movement of the stylus by updating the indication. In some embodiments, while the stylus is touching the surface of the touch-sensitive display, the device ceases to display the indication (e.g., as shown in FIG. 7J). In some embodiments, modifying content of the displayed application includes modifying any of the tools displayed by the application and/or modifying other content of the application.

In some embodiments, in response to detecting that the stylus is in physical contact with a surface of the touch-sensitive display, the device changes (842) the (displayed) indication smoothly from a first state to a second state. In some embodiments, the indication changes from the first state to the second state in response to detecting that the stylus is in physical contact with a surface of the touch-sensitive display to indicate whether the stylus is interacting with the displayed content. In some embodiments, the first state is a preview mode (e.g., a noninteractive mode in which the content is not modified by movement of the stylus) and the second state is an interactive mode (e.g., a mode in which the content is modified by movement of the stylus). Optionally, in some embodiments, the indication in the second state has a greater opacity and/or smaller radius than the indication in the first state.

It should be understood that the particular order in which the operations in FIGS. 8A-8D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the first paragraph of the Description of Embodiments above) are also applicable in an analogous manner to method 800 described above with respect to FIGS. 8A-8D. For example, the stylus positional state characteristics, movements, contacts, gestures, user interface objects, and outputs described above with reference to method 800 optionally have one or more of the characteristics of the stylus positional state characteristics, movements, contacts, gestures, user interface objects, and outputs described herein with reference to other methods described herein (e.g., those listed in the first paragraph of the Description of Embodiments above). For brevity, these details are not repeated here.

Figure 9:
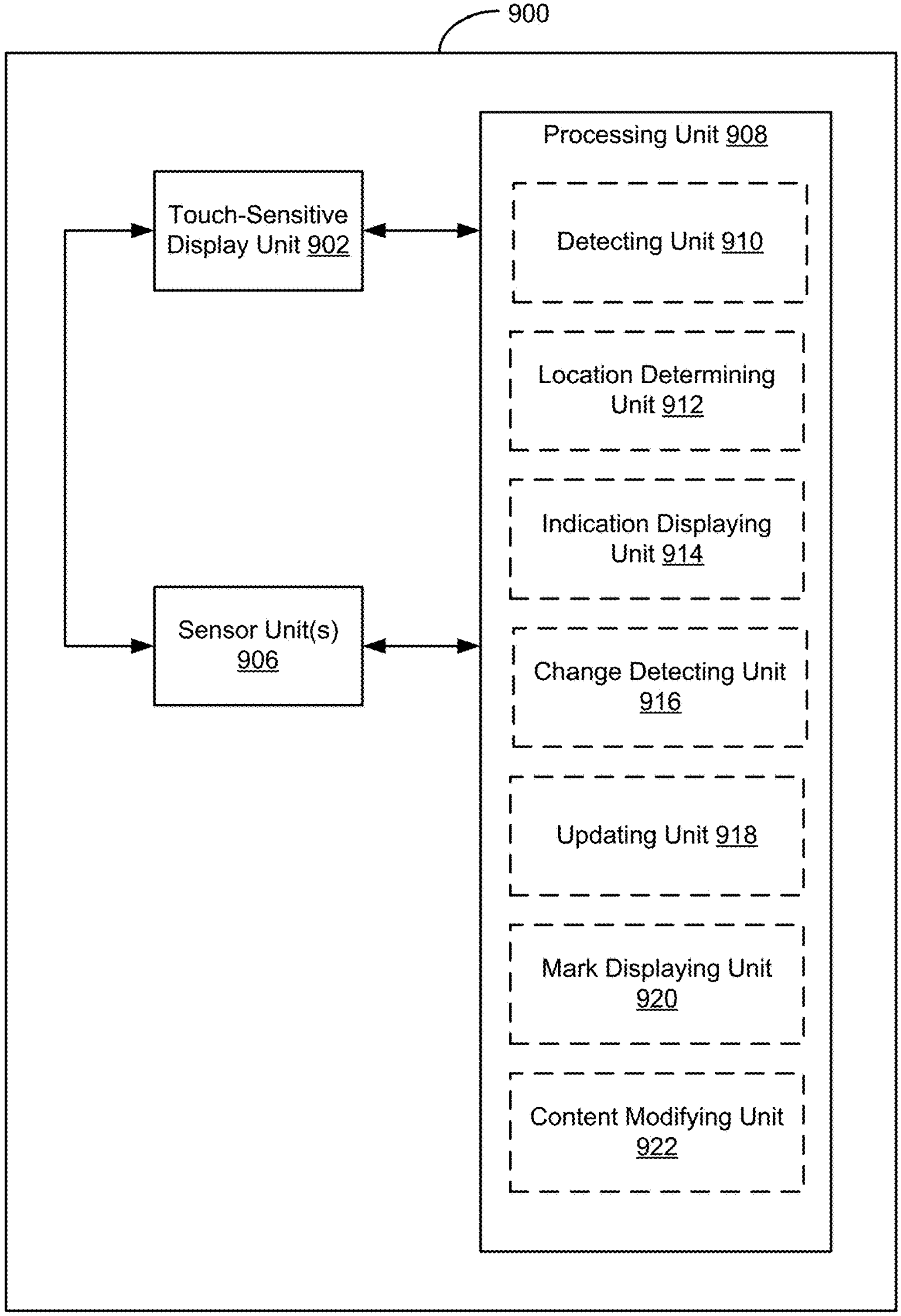
FIG. 9 is a functional block diagram of an electronic device in accordance with some embodiments.

In accordance with some embodiments, FIG. 9 shows a functional block diagram of an electronic device 900 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 9 are, optionally, combined or separated into sub-blocks to implement the principles of the various described embodiments. Therefore, the description herein optionally supports any possible combination or separation or further definition of the functional blocks described herein.

As shown in FIG. 9, an electronic device 900 includes a touch-sensitive display unit 902 configured to display a user interface and receive user contacts (including stylus contacts), one or more sensor units 906 configured to detect signals from a stylus associated with the device; and a processing unit 908 coupled with the touch-sensitive display unit 902 and the one or more sensor units 906. In some embodiments, the processing unit 908 includes a detecting unit 910, a location determining unit 912, an indication displaying unit 914, a change detecting unit 916, an updating unit 918, a mark displaying unit 920, and a content modifying unit 922.

The processing unit 908 is configured to: detect a positional state of the stylus (e.g., with the detecting unit 910), wherein the positional state of the stylus corresponds to a distance of the stylus relative to the touch-sensitive display unit 902, a tilt of the stylus relative to the touch-sensitive display unit 902, and/or an orientation of the stylus relative to the touch-sensitive display unit 902; determine a location on the touch-sensitive display unit 902 that corresponds to the detected positional state of the stylus (e.g., with the location determining unit 912); enable display of, in accordance with the positional state of the stylus, an indication on the touch-sensitive display unit 902 of the determined location prior to the stylus touching the touch-sensitive display unit 902 (e.g., with the indication displaying unit 914); detect a change in the distance, the tilt, and/or the orientation of the stylus, prior to the stylus touching the touch-sensitive display unit 902 (e.g., with the change detecting unit 916); and, in response to detecting the change, update the displayed indication on the touch-sensitive display unit 902 (e.g., with the updating unit 918).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8D are, optionally, implemented by components depicted in FIGS. 1A-1B or FIG. 9. For example, detection operation 802, location determination operation 812, display operation 814, change detection operation 818, and update operation 820 are, optionally, implemented by event sorter 170, event recognizer 180, and event handler 190. Event monitor 171 in event sorter 170 detects a contact (or near contact) on touch-sensitive display 112, and event dispatcher module 174 delivers the event information to application 136-1. A respective event recognizer 180 of application 136-1 compares the event information to respective event definitions 186, and determines whether a first contact (or near contact) at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Displaying and Updating an Indication that Corresponds to a Positional State of a Stylus while the Stylus Touches a Touch-Sensitive Surface Some electronic devices use a stylus associated with the device to provide additional methods of input to a touch-sensitive display of the device. For example, some cellular phones, laptops, and tablets have the capability to receive inputs from a stylus. However, due to various reasons (e.g., thickness of the stylus tip, thickness of the glass on the device, etc.), a user may find it difficult to precisely know where the stylus interaction (e.g., making a mark) will take place. The embodiments below address this problem by displaying and updating an indication that corresponds to a positional state of the stylus (e.g., a distance, a tilt, and/or an orientation of the stylus relative to a touch-sensitive display of the device). The indication shows where a mark will be made on a touch-sensitive display. The indication is offset from the tip of the stylus so that the stylus does not block viewing of the indication. The indication helps a user place and use the stylus with greater precision.

Below, FIGS. 10A-10K illustrate exemplary user interfaces for displaying and updating an indication that corresponds to a positional state of a stylus. FIGS. 11A-11D are flow diagrams illustrating a method of displaying and updating an indication that corresponds to a positional state of a stylus. The user interfaces in FIGS. 10A-10K are used to illustrate the processes in FIGS. 11A-11D.

FIGS. 10A-10K illustrate exemplary user interfaces for displaying and updating an indication that corresponds to a positional state of a stylus in accordance with some embodiments. The user interfaces in these figures are used to illustrate the processes described below, including the processes in FIGS. 11A-11D. Although some of the examples which follow will be given with reference to inputs on a touch-screen display (where the touch-sensitive surface and the display are combined, for example on touch screen 112), in some embodiments, the device detects inputs on a touch-sensitive surface 651 that is separate from the display 650, as shown in FIG. 6B.

In some embodiments, the device is an electronic device with a separate display (e.g., display 650) and a separate touch-sensitive surface (e.g., touch-sensitive surface 651). In some embodiments, the device is portable multifunction device 100, the display is touch-sensitive display system 112, and the touch-sensitive surface includes tactile output generators 163 on the display (FIG. 1A). For convenience of explanation, the embodiments described with reference to FIGS. 10A-10K and 11A-11D will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 650 and a separate touch-sensitive surface 651 in response to detecting the contacts described in FIGS. 10A-10K on (or near) the touch-sensitive surface 651 while displaying the user interfaces shown in FIGS. 10A-10K on the display 650.

Figure 10A:
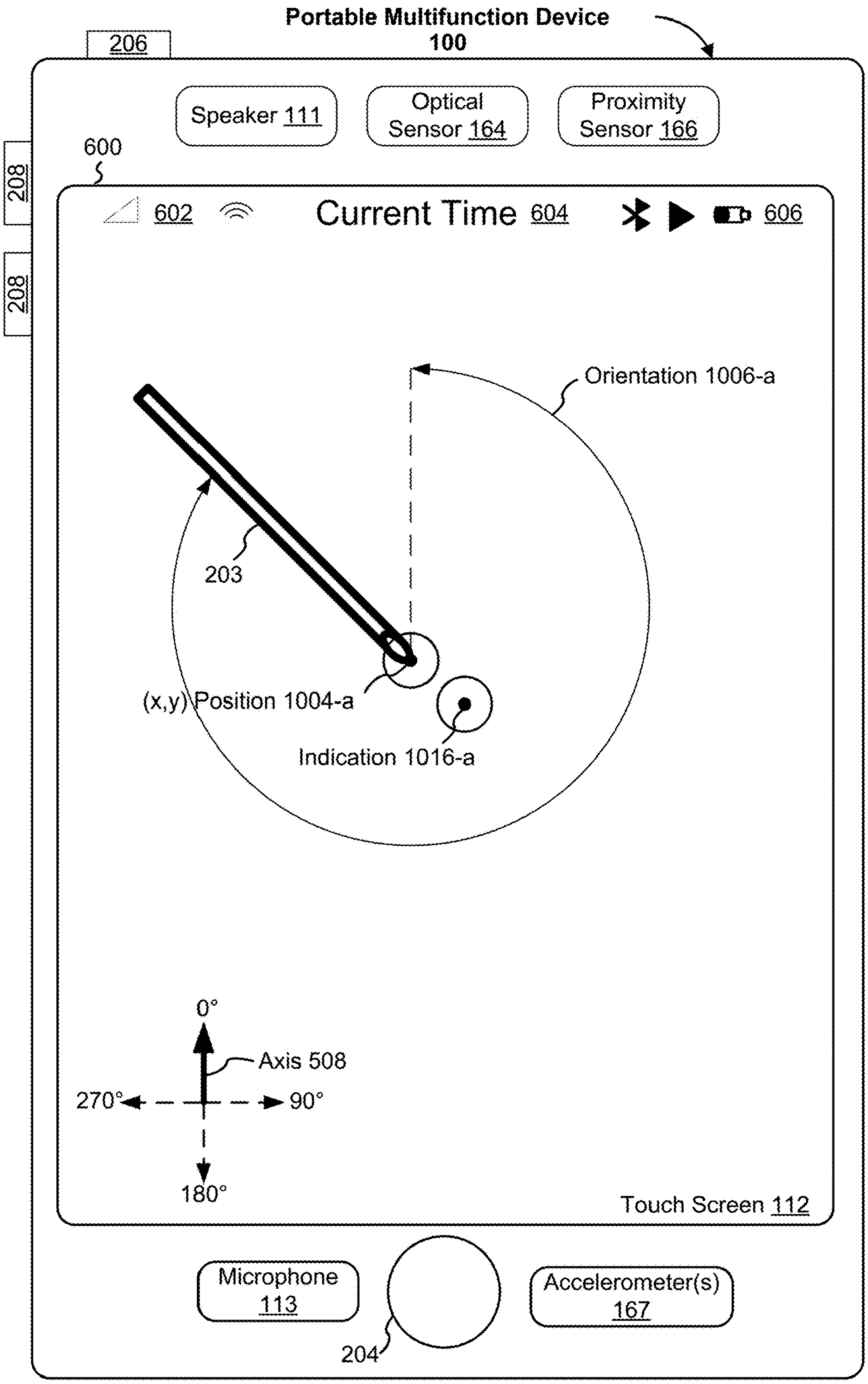

FIGS. 10A-10K illustrate exemplary user interfaces for displaying and updating an indication that corresponds to a positional state of a stylus in accordance with some embodiments. While FIG. 10A shows touch screen 112 with additional details of device 100 (e.g., speaker 111, optical sensor 164, proximity sensor 166, etc.), for sake of clarity, FIGS. 10B-10K simply show touch screen 112 of device 100, without showing other details of device 100. Further, while FIG. 10A illustrates an example from a viewpoint directly above a touch-sensitive surface (e.g., touch screen 112 of device 100), FIGS. 10B-10K illustrate examples from two viewpoints: a viewpoint directly above a touch-sensitive surface (e.g., touch screen 112 of device 100) and a side viewpoint of the touch-sensitive surface.

FIG. 10A illustrates an example of displaying an indication (e.g., indication 1016-*a*) that corresponds to a positional state of a stylus (e.g., stylus 203). In this example, stylus 203 has a positional state with an orientation of stylus 203 relative to touch screen 112 (e.g., orientation 1006-*a*) and a position of a projection of a tip of stylus 203 on touch screen 112 (e.g., (x,y) position 1004-*a*). As shown in FIG. 10A, when stylus 203 is positioned with orientation 1006-*a* (e.g., approximately 315 degrees in a clockwise rotation angle relative to axis 508) and tip projection at (x,y) position 1004-*a*, an indication 1016-*a* is displayed on touch screen 112 to show where stylus 203 will touch (or mark) touch screen 112. In some embodiments, the indication is displaced in a first direction on touch screen 112, relative to (x,y) position 1004-*a*, when the stylus is positioned in a first orientation and the indication is displaced in a second direction on touch screen 112, relative to (x,y) position 1004-*a*, when the stylus is positioned in a second orientation, distinct from the first orientation.

FIGS. 10B-10C illustrate an example of changing the orientation (e.g., orientation 1006) of the stylus (e.g., stylus 203) relative to the touch-sensitive display (e.g., touch screen 112) and in response to the change in orientation, updating the displayed indication (e.g., from displaying indication 1016-*b* at a first location to displaying indication 1016-*c* at a second location). In FIGS. 10B-10C, the (x,y) position of the tip of the stylus (e.g., (x,y) position 1004-*b*), the tilt of the stylus (e.g., tilt 1012-*a*), and the distance of the stylus relative to the touch-sensitive display (e.g., distance 1014-*a*, when the stylus tip is in contact with the touch-sensitive display) remain constant, while the orientation of the stylus relative to the touch-sensitive display changes (e.g., from orientation 1006-*a* to orientation 1006-*b*). As the orientation of stylus 203 changes from orientation 1006-*a* (e.g., approximately 315 degrees in a clockwise rotation angle relative to axis 508) to orientation 1006-*b* (e.g., approximately 45 degrees in a clockwise rotation angle relative to axis 508), the displayed indication is updated on touch screen 112 (e.g., from indication 1016-*b* to indication 1016-*c*).

Figure 10E:
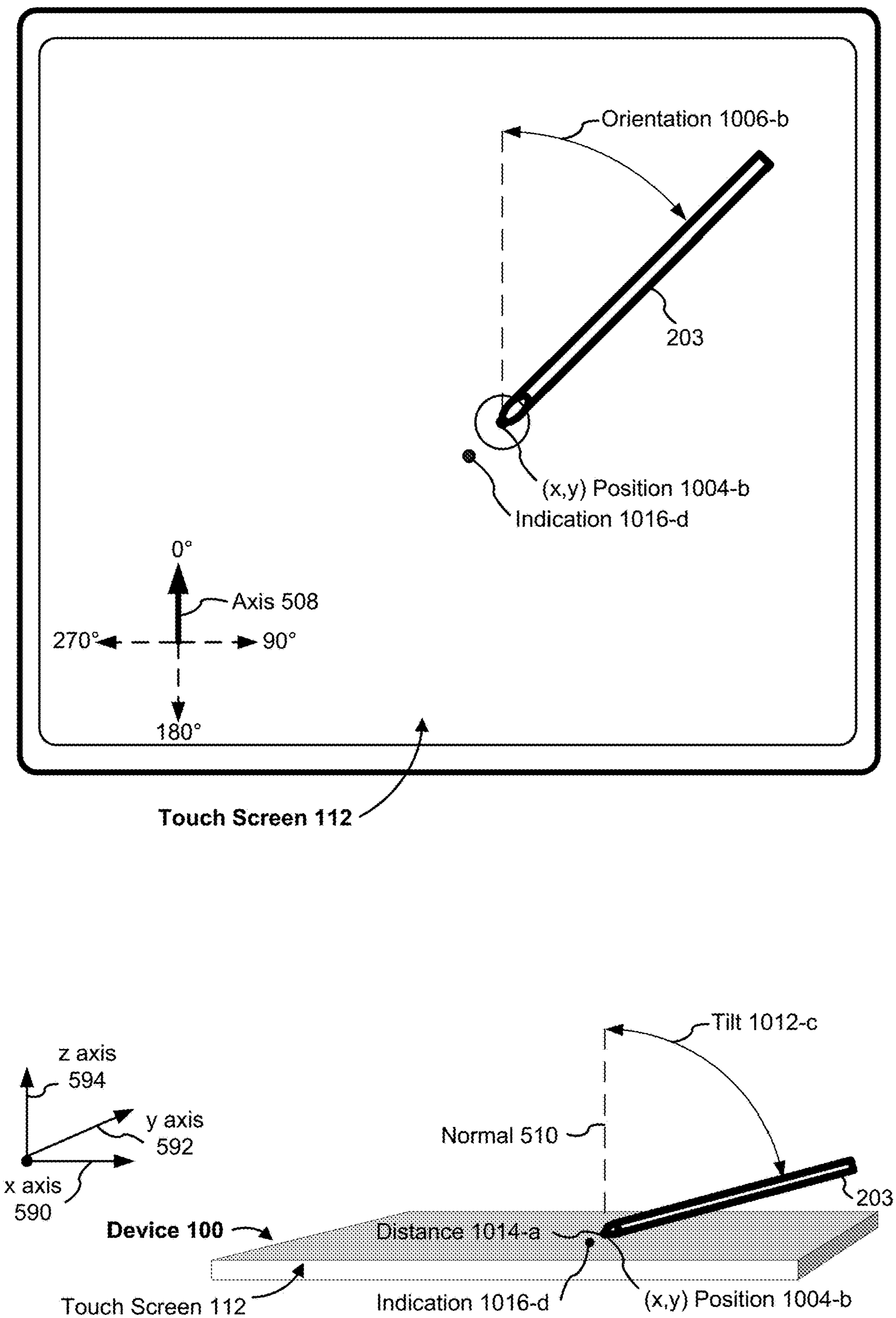
Figure 10F:
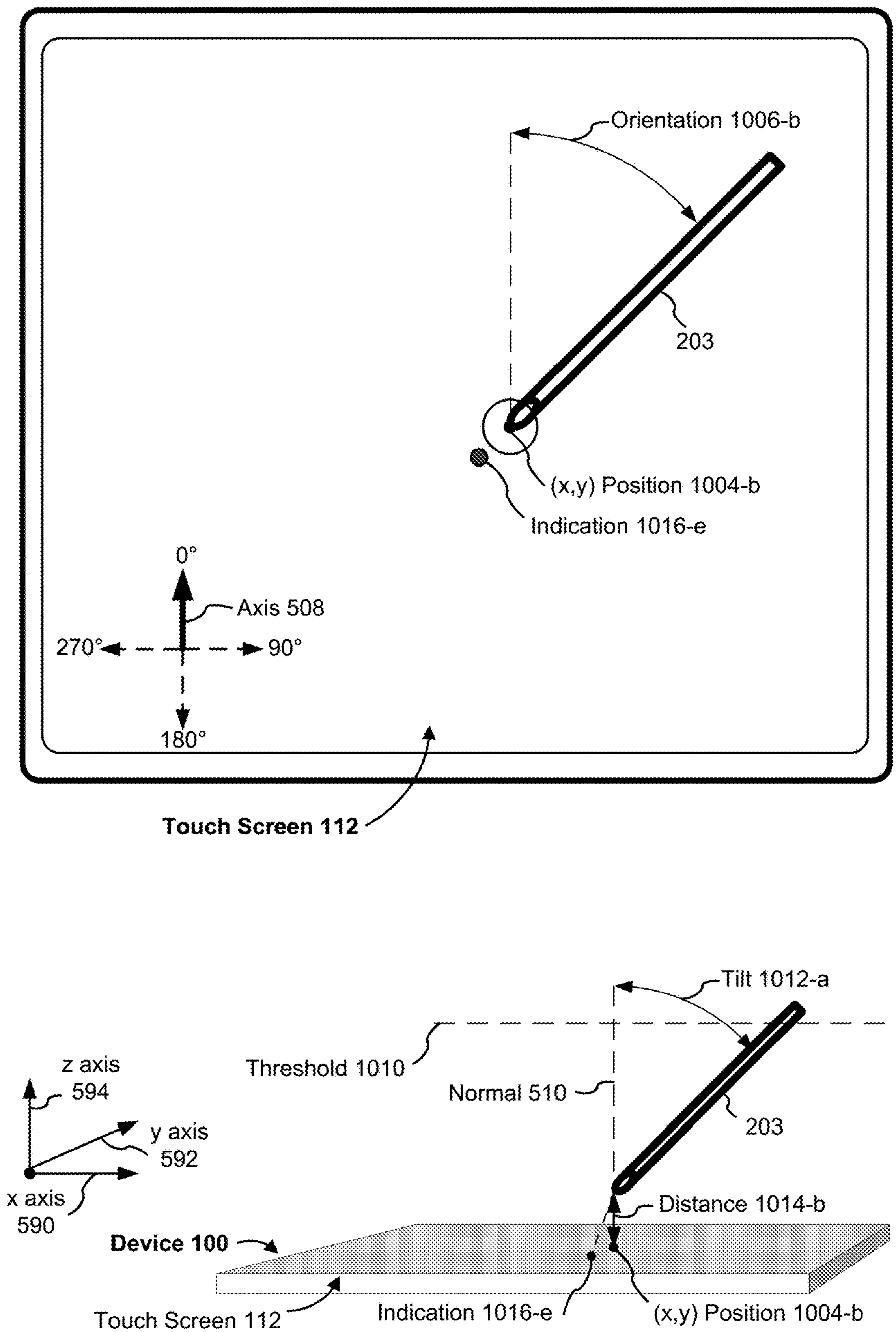
Figure 10G:
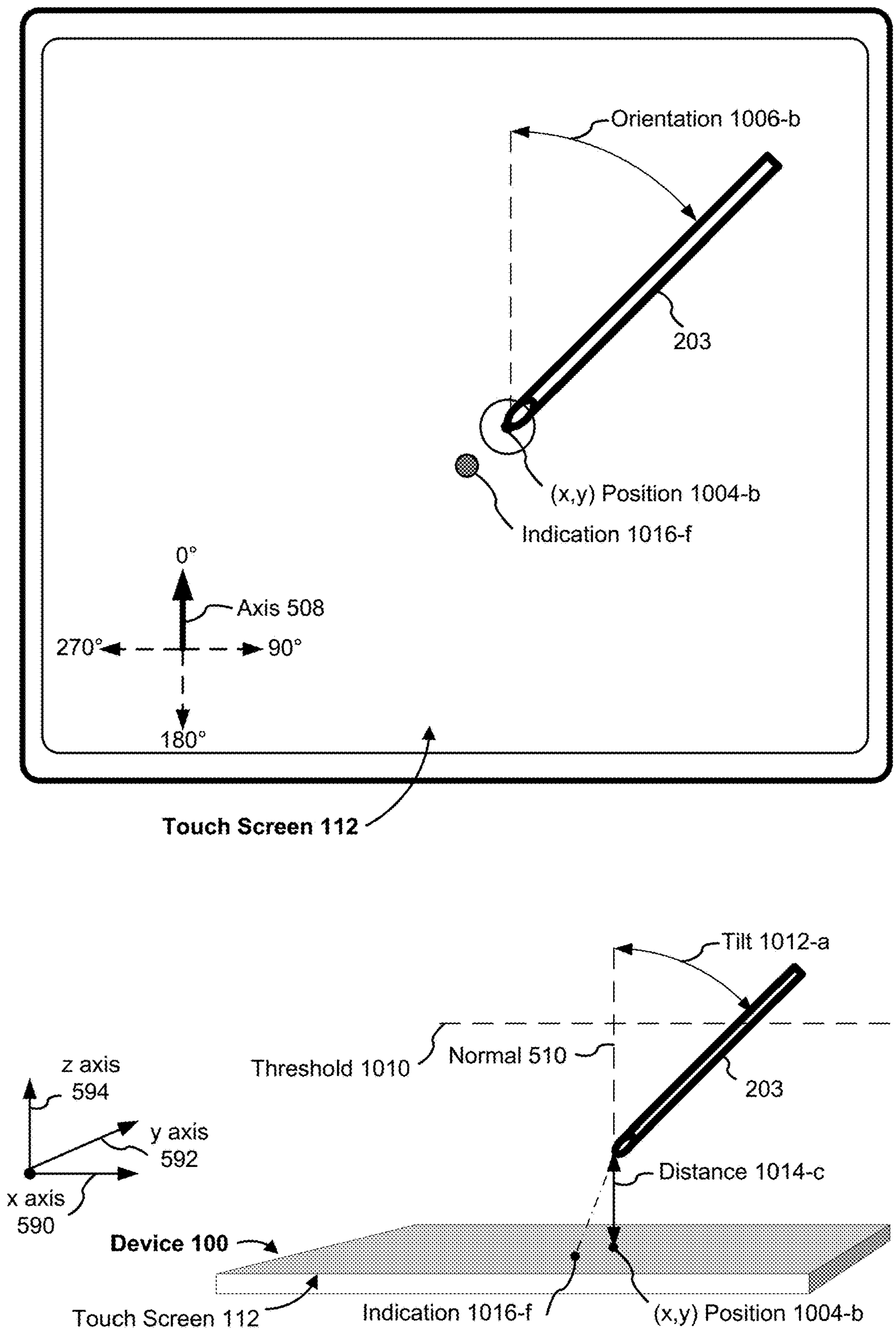
Figure 10H:
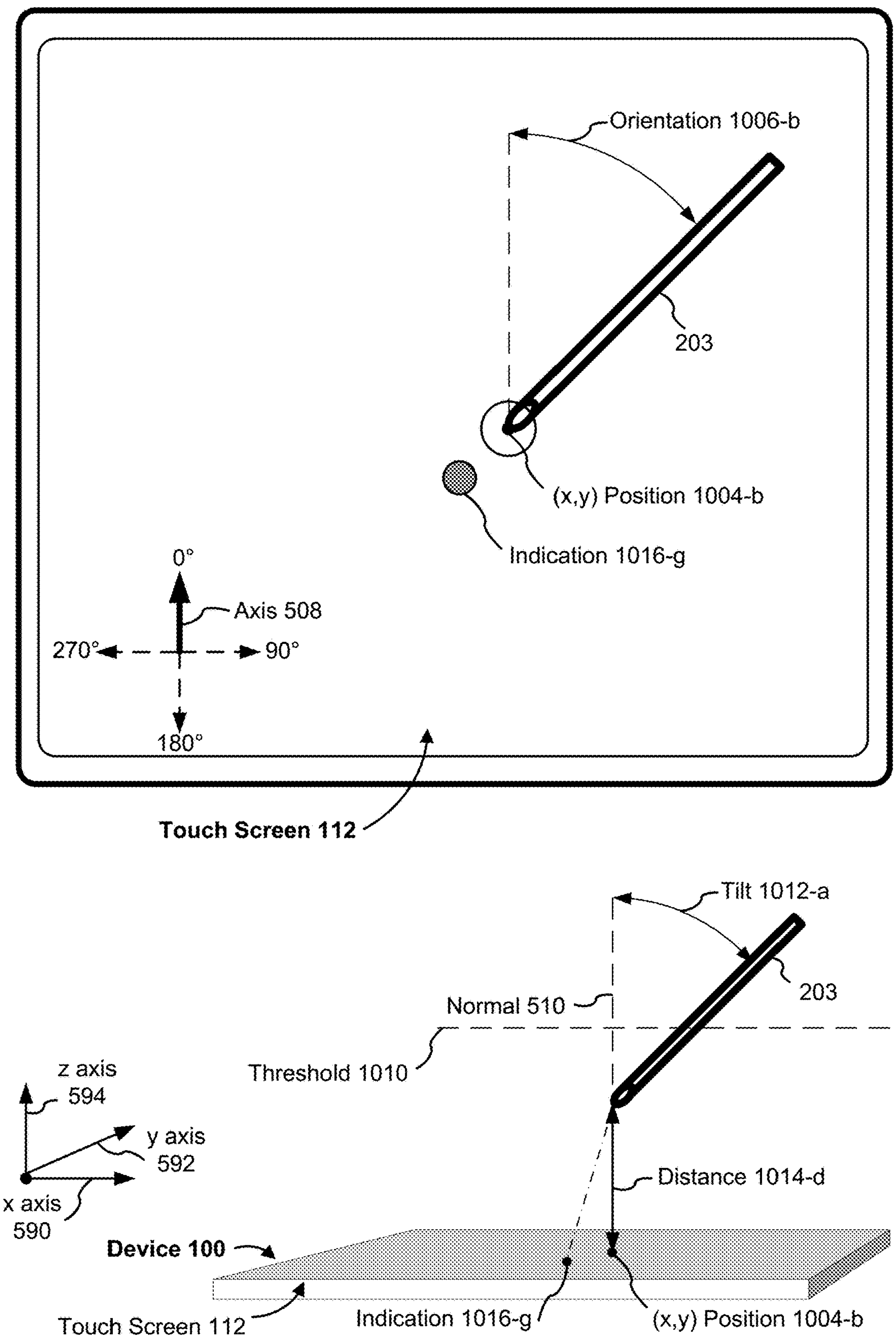
Figure 10I:
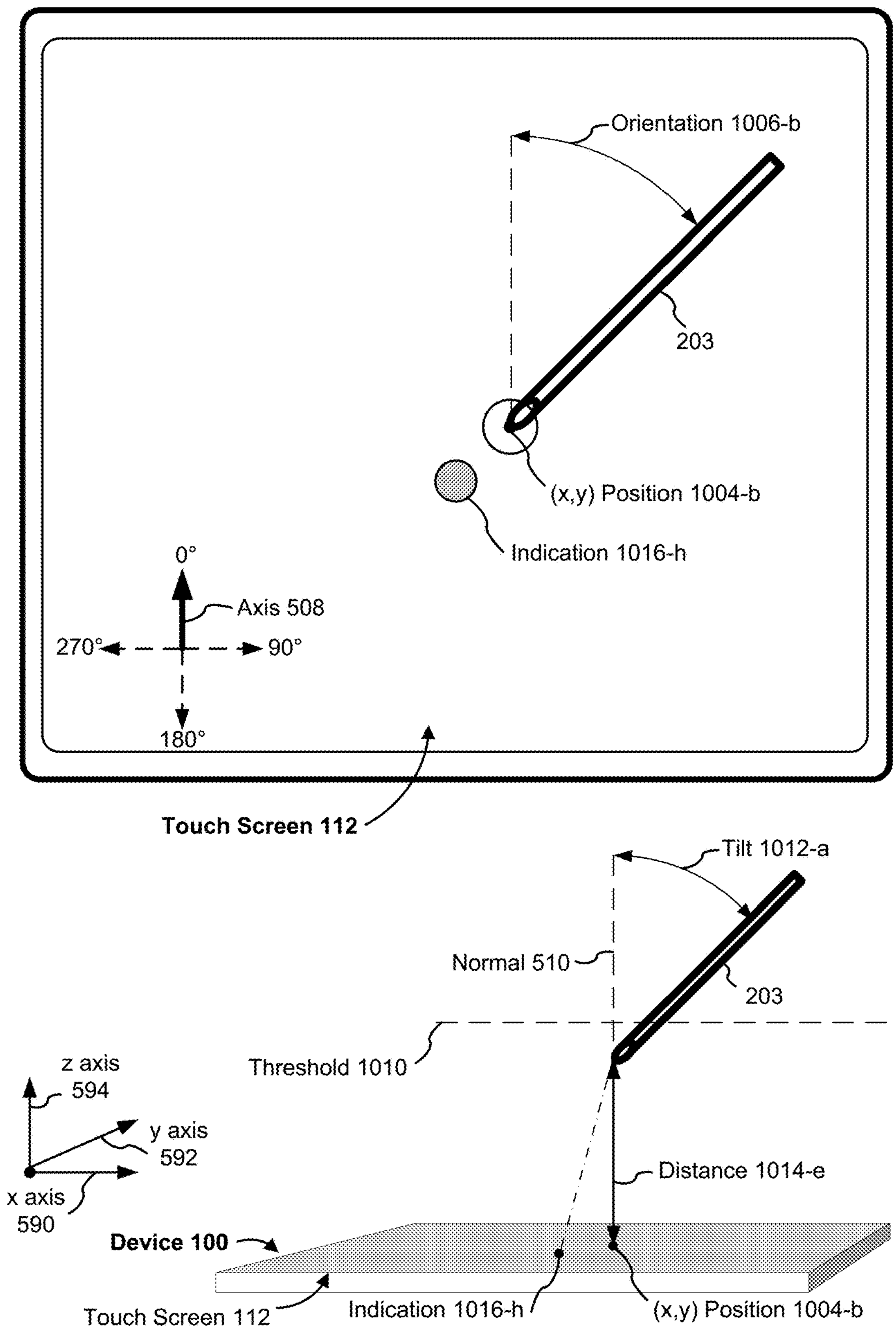

FIGS. 10C-10E illustrate an example of changing the tilt (e.g., tilt 1012) of the stylus (e.g., stylus 203) relative to the touch-sensitive display (e.g., touch screen 112) and in response to the change in tilt, updating the displayed indication (e.g., indication 1016). In FIGS. 10C-10E, the orientation of the stylus (e.g., orientation 1006-*b*), the (x,y) position of the tip of the stylus (e.g., (x,y) position 1004-*b*), and the distance of the stylus relative to the touch-sensitive display (e.g., distance 1014-*a*, when the stylus tip is in contact with the touch-sensitive display) remain constant, while the tilt of the stylus changes (e.g., from tilt 1012-*a* to tilt 1012-*b* to tilt 1012-*c*) as the stylus tilts closer to parallel with device 100. As shown in this example, as the tilt increases, the magnitude of distance between the (x,y) position of the tip of the stylus and the indication increases until reaching a predefined maximum distance. In this example, indication 1016-*d* (in FIG. 10D) is at the predefined maximum distance, so although the tilt of stylus 203 changes from tilt 1012-*b* (in FIG. 10D) to tilt 1012-*c* (in FIG. 10E), indication 1016-*d* remains at the same position.

FIGS. 10F-10I illustrate an example of changing the distance (e.g., distance 1014) of the stylus (e.g., stylus 203) relative to the touch-sensitive display (e.g., touch screen 112) and in response to the change in distance, updating the displayed indication (e.g., indication 1016). In some embodiments, the positional state includes a position of a projection of a tip (or other representative portion) of the stylus on the touch-sensitive display. In some embodiments, the tip of the stylus is a terminus of the stylus configured for determining proximity of the stylus to the touch-sensitive display. In some embodiments, the projection of the tip of the stylus on the touch-sensitive display is an orthogonal projection. In other words, the projection of the tip of the stylus on the touch-sensitive display is a point at the end of a line from the stylus tip to the touch-sensitive display that is normal to a surface of the touch-sensitive display. For example, in FIGS. 10F-10I, (x,y) position 1004-*b* is the projection of the tip of stylus 203 on touch screen 112, as it is a point at which the tip of stylus 203 would contact touch screen 112 if stylus 203 were moved directly along a path normal to touch screen 112 (e.g., along the path of normal 510).

In FIGS. 10F-10I, the orientation of the stylus (e.g., orientation 1006-*b*), the (x,y) position of the projection of the tip of the stylus (e.g., (x,y) position 1004-*b*), and the tilt of the stylus (e.g., tilt 1012-*a*) remain constant, while the distance of the stylus relative to the touch-sensitive display changes (e.g., from distance 1014-*b* to distance 1014-*c* to distance 1014-*d* to distance 1014-*e*) as the stylus moves away from the touch-sensitive display. Further, as stylus 203 moves away from touch screen 112, the displayed indication is updated on touch screen 112 (e.g., from indication 1016-*e* to indication 1016-*f* to indication 1016-*g* to indication 1016-*h*). As shown in this example, in some embodiments, the indication changes opacity (e.g., with decreasing opacity), changes size (or radius or area) (e.g., with increasing size), and/or changes color (e.g., with lightening color) as stylus 203 moves away from touch screen 112.

Figure 10J:
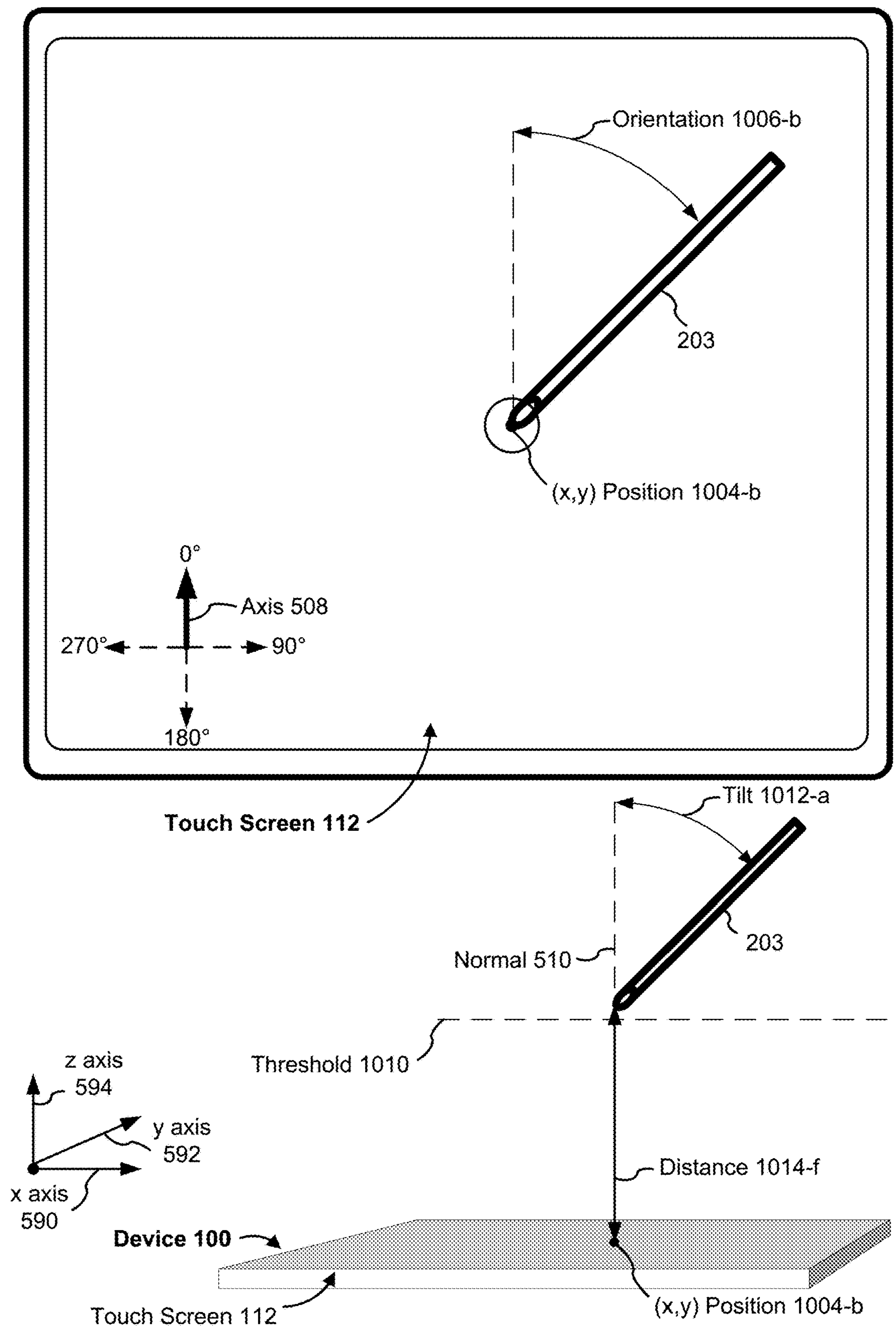

FIG. 10J illustrates an example of ceasing to display the indication on the touch-sensitive display (e.g., touch screen 112) when the stylus (e.g., stylus 203) is more than a predefined distance away from the surface of the touch-sensitive display. Compared to FIGS. 10F-10I, where an indication (e.g., indication 1016-*e*, indication 1016-*f*, indication 1016-*g*, indication 1016-*h*, respectively) is displayed when the tip of stylus 203 is below threshold 1010, the indication ceases to display on touch screen 112 when the tip of stylus 203 is above threshold 1010, as shown in FIG. 10J.

FIGS. 10B-10E illustrate an example of displaying an indication (e.g., indication 1016-*b*, indication 1016-*c*, and indication 1016-*d*) when the stylus (e.g., stylus 203) is in physical contact with the surface of the touch-sensitive display (e.g., touch screen 112). In some embodiments, when stylus 203 is in physical contact with touch screen 112, the distance of stylus 203 away from touch screen 112 (e.g., distance 1014-*a*) is calculated to be greater than zero (e.g., to account for the thickness of a glass layer on touch screen 112). In some embodiments, when the stylus is in physical contact with the surface of the touch-sensitive display, the indication is updated in response to a change in orientation (as described above with respect to FIG. 10A) and the indication is updated in response to a change in tilt (as described above with respect to FIGS. 10C-10E), and for sake of brevity, the details are not repeated here.

In some embodiments, when stylus 203 is in physical contact with touch screen 112, both an indication and a mark are displayed. In some embodiments, the indication corresponds to a virtual "pen tip" or other element that indicates where a mark will be drawn on the touch-sensitive display. In some embodiments, the mark is a point, line, brushstroke, or the like on the touch-sensitive display. In some embodiments, the indication corresponds to one end (a terminus) of the mark. For example, when the mark being drawn is a line, the indication corresponds to (or is adjacent to) the end of the line being drawn. In some embodiments, if the indication is displayed when the stylus is in physical contact with the surface of the touch-sensitive display, the shape (and optionally color) of the indication corresponds to the shape (and optionally color) of a tip of a virtual drawing implement being emulated by the stylus. For example, if the stylus is being used as a virtual yellow highlighter, the indication is a yellow rectangle (corresponding to the chisel tip of a highlighter), and as the stylus is moved across the surface of the touch-sensitive display, a mark is created (e.g., by propagating the size/shape/color of the indication along the path of the stylus). If the stylus is being used as a virtual yellow highlighter and the stylus touches down at a point on the touch-sensitive display and then lifts off, without moving across the touch-sensitive display, a yellow rectangle mark (corresponding to an indication that is the chisel tip of a highlighter) may be displayed at the point on the touch-sensitive display where the stylus touched down.

Figure 10K:
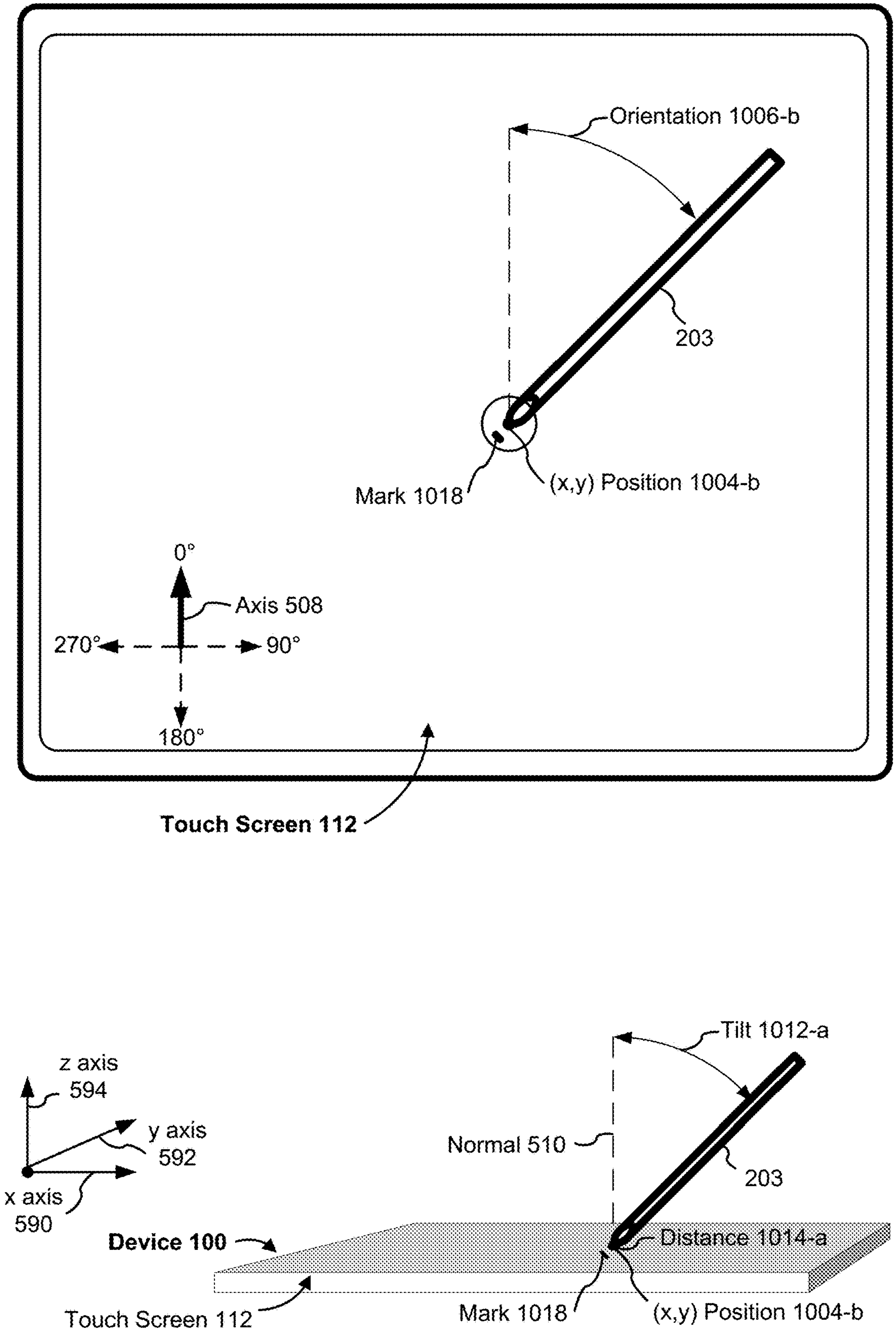
Figure 11A:
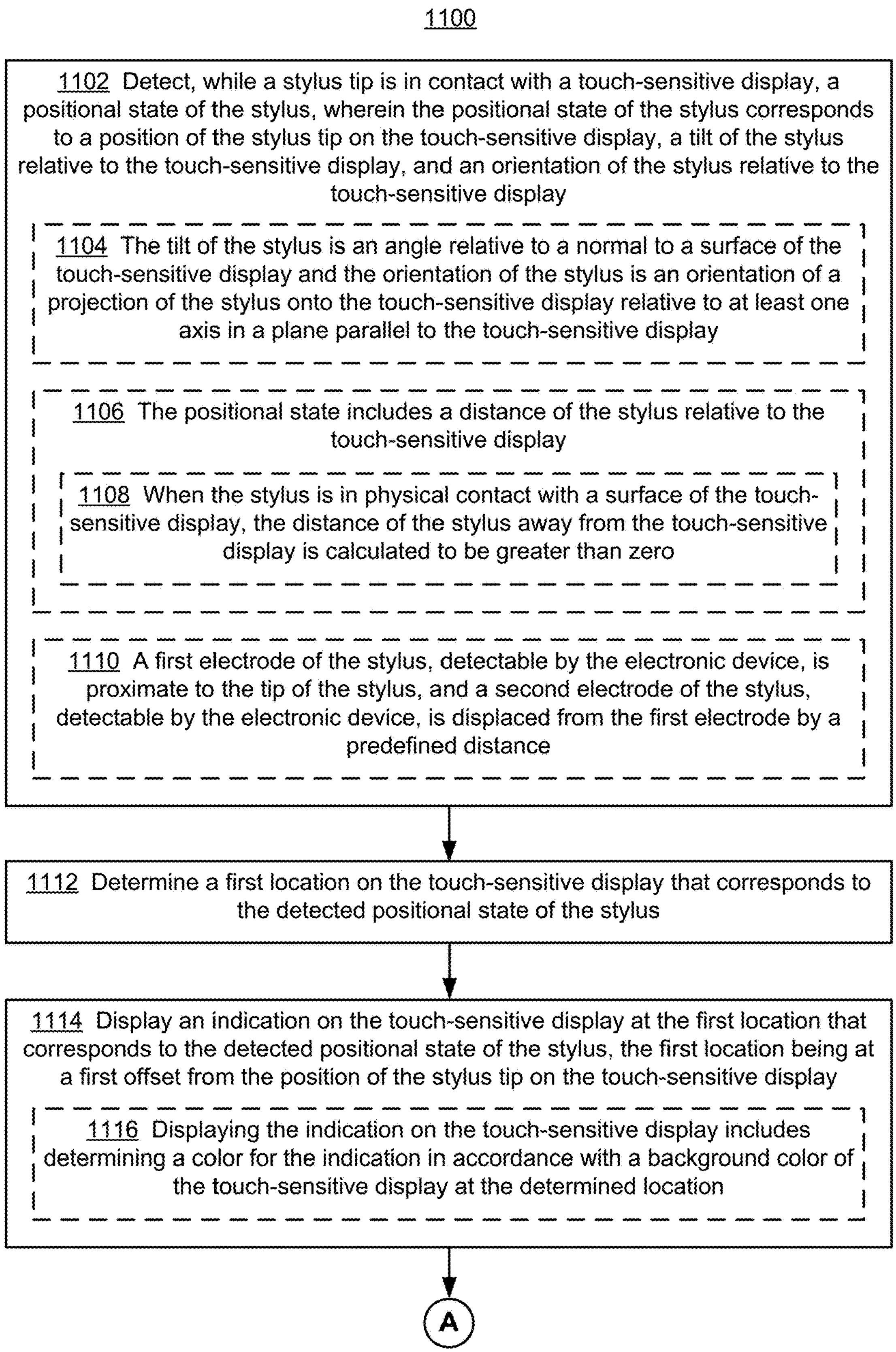
Figure 11B:
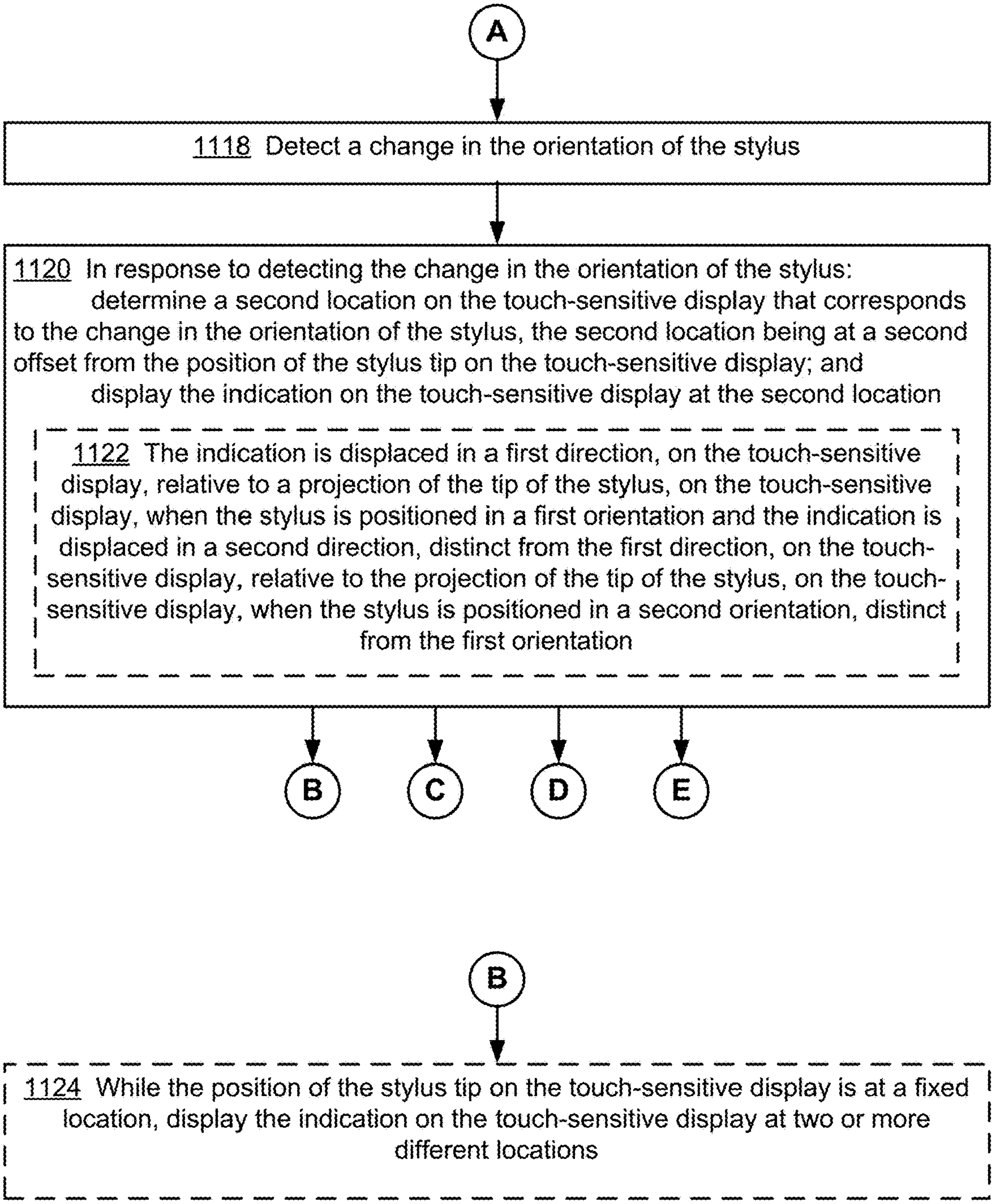

FIG. 10K illustrates an example of displaying a mark (e.g., mark 1018) and ceasing to display an indication when the stylus (e.g., stylus 203) is in physical contact with the surface of the touch-sensitive display (e.g., touch screen 112).

FIGS. 11A-11D are flow diagrams illustrating a method 1100 of displaying and updating an indication that corresponds to a positional state of a stylus in accordance with some embodiments. The method 1100 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display (also called simply a touch-sensitive display). In some embodiments, the display is separate from the touch-sensitive surface. In some embodiments, the device includes one or more sensors to detect signals from a stylus associated with the device, the stylus including a tip (or other representative portion). In some embodiments, a portion on the stylus other than the tip is used to estimate the location of the tip. Some operations in method 1100 are, optionally, combined and/or the order of some operations is, optionally, changed.

As described below, the method 1100 provides an intuitive way to display and update an indication that corresponds to a positional state of a stylus. The indication helps a user place and use the stylus with greater precision. The method reduces the number, extent, and/or nature of the inputs from a user when using a stylus to interact with an electronic device, thereby creating a more efficient human-machine interface. For battery-operated electronic devices, enabling a user to enter stylus input faster and more efficiently conserves power and increases the time between battery charges.

The device detects (1102), while the stylus tip (or other representative portion) is in contact with the touch-sensitive display, a positional state of the stylus, wherein the positional state of the stylus corresponds to (or indicates) a position of the stylus tip on the touch-sensitive display, a tilt of the stylus relative to the touch-sensitive display, and an orientation of the stylus relative to the touch-sensitive display. FIG. 10C, for example, shows stylus 203 with a positional state corresponding to (x,y) position 1004-*b*, tilt 1012-*a*, and orientation 1006-*b*. In some embodiments, the positional state includes a set of positional parameters (e.g., one or more positional parameters). In some embodiments, the positional state is relative to the touch-sensitive display (e.g., touch screen 112). In some embodiments, the positional state is detected in accordance with one or more measurements from the stylus that are sent to the electronic device. For example, the stylus measures the tilt and/or the orientation of the stylus and sends the measurement to the electronic device. Alternatively, in some embodiments, the positional state is detected in accordance with raw output, from one or more electrodes in the stylus, that is sensed by the touch-sensitive display. For example, the touch-sensitive display receives raw output from one or more electrodes in the stylus and calculates the tilt and/or the orientation of the stylus based on the raw output.

In some embodiments, the tilt of the stylus is (1104) an angle relative to a normal to a surface of the touch-sensitive display (also called simply the normal to the touch-sensitive display) and the orientation of the stylus is an orientation of a projection of the stylus onto the touch-sensitive display (e.g., an orthogonal projection of a length of the stylus or a line corresponding to the line between the projection of two different points of the stylus onto the touch-sensitive display) relative to at least one axis in a plane parallel to the touch-sensitive display. For example, in FIG. 5B, tilt 512 of stylus 203 is an angle relative to normal 510 of touch screen 112, and in FIG. 5A, orientation 506 of stylus 203 is an orientation of a projection of stylus 203 onto touch screen 112 relative to axis 508. In some embodiments, the orientation of the projection of the stylus onto the touch-sensitive display is relative to a single axis (e.g., a single axis with a clockwise rotation angle from the axis ranging from 0 degrees to 360 degrees), such as axis 508 in FIG. 5A. Alternatively, in some embodiments, the orientation of the projection of the stylus onto the touch-sensitive display is relative to a pair of axes (e.g., an x axis and a y axis such as x axis 590 and y axis 592 in FIG. 5A, or a pair of axes associated with an application displayed on the touch-sensitive display).

In some embodiments, the positional state includes (1106) a distance of the stylus relative to the touch-sensitive display. For example, in FIGS. 10B-10E, the distance of stylus 203 relative to touch screen 112 is distance 1014-*a* (e.g., when the stylus tip is in contact with touch screen 112). As another example, in FIGS. 10F-10J, the distance of stylus 203 relative to touch screen 112 changes (e.g., from distance 1014-*b* to distance 1014-*c* to distance 1014-*d* to distance 1014-*e* to distance 1014-*f*) as the stylus moves away from touch screen 112.

In some embodiments, when the stylus is in physical contact with a surface of the touch-sensitive display, the distance of the stylus away from the touch-sensitive display is (1108) calculated to be greater than zero (e.g., to account for the thickness of a glass layer on the touch-sensitive display (e.g., touch screen 112), so as to carry through the indication "onto the pixels" of the display rather than displaying the indication "on the glass" that covers the pixels). In some embodiments, when the stylus is in physical contact with a surface of the touch-sensitive display, the distance of the stylus away from the touch-sensitive display is defined to be greater than zero. For example, in FIGS. 10B-10E, when stylus 203 is in physical contact with a surface of touch screen 112, distance 1014-*a* is calculated (or defined) to be greater than zero.

In some embodiments, a first electrode of the stylus, detectable by the electronic device (e.g., by a mechanism in the touch-sensitive display of the device), is (1110) proximate to the tip of the stylus, and a second electrode of the stylus, detectable by the electronic device (e.g., by a mechanism in the touch-sensitive display of the device), is displaced from the first electrode by a predefined distance. In some embodiments, the first electrode of the stylus is at (or near) the tip of the stylus, and the second electrode of the stylus is a ring that is displaced from the first electrode by a predefined distance. In some embodiments, stylus 203, as shown in FIGS. 5A-5B, has a first electrode at (or near) the tip of stylus 203 and a second electrode that is a ring that is displaced from the first electrode by a predefined distance, where both electrodes are detectable by device 100 (e.g., by a mechanism in touch screen 112 of device 100).

The device determines (1112) a first location on the touch-sensitive display (e.g., touch screen 112) that corresponds to the detected positional state of the stylus (e.g., stylus 203). Using FIG. 10B as an example, the location on touch screen 112 that corresponds to the detected positional state of stylus 203 is determined by (x,y) position 1004-*b*, tilt 1012-*a*, and/or orientation 1006-*a*.

The device displays (1114) an indication on the touch-sensitive display (e.g., touch screen 112) at the first location (determined in operation 1112) that corresponds to the detected positional state of the stylus, the first location being at a first offset from the position of the stylus tip on the touch-sensitive display. For example, in FIG. 10B, indication 1016-*b* is displayed at a first location that corresponds to the detected positional state of stylus 203, where indication 1016-*b* is at a first offset from (x,y) position 1004-*b*. In some embodiments, a mark that is being drawn on the touch sensitive display serves as the indication. In some embodiments, the indication is separate from a mark that is being drawn on the touch sensitive display. In some embodiments, the indication corresponds to a virtual "pen tip" or other element that indicates where a mark will be drawn on the touch sensitive display, as described above. In some embodiments, the mark is a point, line, brushstroke, or the like on the touch-sensitive display. In some embodiments, a respective offset includes a distance from the stylus tip to the respective indication and an orientation of a line (not shown) between the respective indication and the stylus tip in a direction parallel to the plane of the touch-sensitive display, as shown in FIG. 10B. In some embodiments, the displayed indication accounts for thickness of the glass of the touch-sensitive display.

In some embodiments, displaying the indication on the touch-sensitive display includes (1116) determining a color for the indication in accordance with a background color of the touch-sensitive display at the determined location. In some embodiments, determining a color for the indication in accordance with a background color of the touch-sensitive display at the determined location includes determining a color for the indication that contrasts with the background color of the touch-sensitive display at the determined location. For example, in some embodiments, if the background color of the touch-sensitive display is white, the determined color for the indication is gray or black or another color that contrasts with white. For example, in FIG. 10B, where the background color of touch screen 112 is white, the color for indication 1016-*b* is black. As another example, in some embodiments, if the background color of the touch-sensitive display is black, the determined color for the indication is white or yellow or another color that contrasts with black.

The device detects (1118) a change in the orientation of the stylus (e.g., stylus 203). For example, FIGS. 10B-10C illustrate a change in the orientation of stylus 203 (e.g., from orientation 1006-*a* to orientation 1006-*b*).

In response to detecting the change in the orientation of the stylus (e.g., stylus 203), the device determines (1120) a second location on the touch-sensitive display (e.g., touch screen 112) that corresponds to the change in the orientation of the stylus, the second location being at a second offset from the position of the stylus tip on the touch-sensitive display. For example, in FIG. 10C, indication 1016-*c* is displayed at a second location that corresponds to the detected positional state of stylus 203, where indication 1016-*c* is at a second offset from (x,y) position 1004-*b*.

In some embodiments, the indication is (1122) displaced in a first direction, on the touch-sensitive display, relative to a projection of the tip (or other representative portion) of the stylus, on the touch-sensitive display, when the stylus is positioned in a first orientation and the indication is displaced in a second direction, distinct from the first direction, on the touch-sensitive display, relative to the projection of the tip (or other representative portion of) of the stylus, on the touch-sensitive display, when the stylus is positioned in a second orientation, distinct from the first orientation. In some embodiments, the direction of the indication (e.g., indication 1016-*b*, FIG. 7B), relative to the projection of the tip of the stylus (e.g., (x,y) position 1004-*b*, FIG. 7B) changes as the orientation of the stylus (e.g., stylus 203) changes. For example, in FIG. 10B, indication 1016-*b* is displaced in a first direction relative to (x,y) position 1004-*b* (e.g., indication 1016-*b* is southeast of (x,y) position 1004-*b*, or indication 1016-*b* is 135 degrees in a clockwise rotation angle from (x,y) position 1004-*b* relative to axis 508) when stylus 203 is positioned with orientation 1006-*a*, and in FIG. 10C, indication 1016-*c* is displaced in a second direction relative to (x,y) position 1004-*b* (e.g., indication 1016-*c* is southwest of (x,y) position 1004-*b*, or indication 1016-*c* is 225 degrees in a clockwise rotation angle from (x,y) position 1004-*b* relative to axis 508) when stylus 203 is positioned with orientation 1006-*b*.

In some embodiments, while the position of the stylus tip on the touch-sensitive display is at a fixed location (e.g., in FIGS. 10B-10D, (x,y) position 1004-*b* is at a fixed location), the device displays (1124) the indication on the touch-sensitive display at two or more different locations. For example, the method includes changing location of the indication (e.g., from the first location to the second location) while the position of the stylus tip on the touch-sensitive display remains the same. In FIGS. 10B and 10C, for example, while the position of the tip of stylus 203 on touch screen 112 is at a fixed location (e.g., fixed at (x,y) position 1004-*b*), the device displays the indication on touch screen 112 at two different locations (e.g., the location of indication 1016-*b* and the location of indication 1016-*c*). Further, in FIG. 10D, while the position of the tip of stylus 203 on touch screen 112 is at the same fixed location (e.g., fixed at (x,y) position 1004-*b*), the device displays the indication on touch screen 112 at a third location (e.g., the location of indication 1016-*d*), as described below with respect to operation 1126.

In some embodiments, the device detects (1126) a change in the tilt of the stylus, and, in response to detecting the change in the tilt of the stylus: the device determines a third location on the touch-sensitive display that corresponds to the change in the tilt of the stylus, the third location being at a third offset from the position of the stylus tip on the touch-sensitive display; and the device displays the indication on the touch-sensitive display at the third location. For example, FIGS. 10C-10D illustrate a change in the tilt of stylus 203 (e.g., from tilt 1012-*a* to tilt 1012-*b*), and indication 1016-*d* is displayed at a third location that corresponds to the positional state of stylus 203, where indication 1016-*d* is at a third offset from (x,y) position 1004-*b*. In some embodiments, the method includes (1) detecting a change in both the orientation of the stylus and the tilt of the stylus, and (2) in response to detecting the change in both the orientation of the stylus and the tilt of the stylus, (a) determining a fourth location on the touch-sensitive display that corresponds to the change in the orientation and the tilt, the fourth location being at a fourth offset from the position of the stylus tip on the touch-sensitive display, and (b) displaying the indication on the touch-sensitive display at the fourth location. In some embodiments, the method includes detecting a change in position of the stylus tip on the touch-sensitive display and in response to detecting the change in the position of the stylus tip on the touch-sensitive display, displaying the indication at a different location.

In some embodiments, the indication is (1128) displaced by a first distance, in a direction parallel to a plane of the touch-sensitive display, on the touch-sensitive display, relative to an orthogonal projection of the tip (or other representative portion) of the stylus, on the touch-sensitive display, when the stylus has a first tilt and the indication is displaced by a second distance, in a direction parallel to the plane of the touch-sensitive display, distinct from the first distance, on the touch-sensitive display, relative to the orthogonal projection of the tip of the stylus, on the touch-sensitive display, when the stylus has a second tilt, distinct from the first tilt. In some embodiments, the method includes displacing the indication from a location of the tip of the stylus on the touch-sensitive display (e.g., (x,y) position 1004-*b*, FIG. 10C) by a distance that is based on the tilt of the stylus. For example, in FIG. 10C, indication 1016-*c* is a first distance away from (x,y) position 1004-*b* when stylus 203 has a first tilt (e.g., tilt 1012-*a*), and in FIG. 10D, indication 1016-*d* is a second distance away from (x,y) position 1004-*b* when stylus 203 has a second tilt (e.g., tilt 1012-*b*). In some embodiments, the indication is displaced by a greater distance from the projection of the tip (or the location of the tip on the touch-sensitive display) as the tilt of the stylus increases. For example, indication 1016-*c* is displaced by a shorter distance relative to (x,y) position 1004-*b* when stylus 203 is positioned with a tilt of 1012-*a* (as shown in FIG. 10C) and indication 1016-*d* is displaced by a greater distance relative to (x,y) position 1004-*b* when stylus 203 is positioned with an increased tilt of 1012-*b* (as shown in FIG. 10D).

In some embodiments, a respective distance does not exceed (1130) a predefined maximum distance, in a direction parallel to the plane of the touch-sensitive display (e.g., between the indication and the (x,y) position of the stylus tip in a direction parallel to (the plane of) the touch-sensitive display). For example, the first distance and the second distance (as described above with respect to operation 1128) do not exceed a predefined maximum distance, as shown in FIGS. 10D-10E. In some embodiments, if the indication is already at the predefined maximum distance, further increases in the tilt of the stylus do not increase the magnitude of the distance relative to the (x,y) position of the tip of the stylus. For example, as shown in FIGS. 10D-10E, although the tilt of stylus 203 increases from tilt 1012-*b* to tilt 1012-*c*, indication 1016-*d* remains the same since it is already at the predefined maximum distance relative to (x,y) position 1004-*b*.

In some embodiments, the device detects (1132) movement of the stylus (e.g., a tip of the stylus) away from the surface of the touch-sensitive display, and, in response to detecting the movement of the stylus away from the surface of the touch-sensitive display: in accordance with a determination that the stylus is less than a first distance away from a surface of the touch-sensitive display, the device updates an appearance of the indication on the touch-sensitive display based on the movement of the stylus while maintaining display of the indication; and in accordance with a determination that the stylus is more than a second distance away from a surface of the touch-sensitive display, the device ceases to display the indication on the touch-sensitive display. For example, as shown in FIGS. 10F-10I, when the tip of stylus 203 is less than a first distance (e.g., threshold 1010) away from the surface of touch screen 112, the device updates an appearance of the indication on touch screen 112 (e.g., the indication gets lighter in color, less opaque, and/or larger in size as stylus 203 moves away from touch screen 112); further, as shown in FIG. 10J, when the tip of stylus 203 is more than a second distance (e.g., threshold 1010) away from the surface of touch screen 112, the device ceases to display the indication on touch screen 112. In some embodiments, the first distance is the same as the second distance (e.g., the first distance and the second distance are both threshold 1010, as shown in FIGS. 10F-10J). In some embodiments, the first distance is less than the second distance.

In some embodiments, in accordance with a determination that a representative portion of the stylus (e.g., a tip of the stylus) is in physical contact with a surface of the touch-sensitive display (1134): the device displays, in accordance with the positional state, the indication on the touch-sensitive display, wherein a position of the indication on the touch-sensitive display is constrained so that a distance, in a direction parallel to a plane of the touch-sensitive display, between the indication and the representative portion of the stylus does not exceed a predefined maximum distance. For example, when the stylus tip is in physical contact with the surface of the touch-sensitive display, the indication is displayed with truncation of the distance, in a direction parallel to a plane of the touch-sensitive display, between the indication and the tip, on the touch-sensitive display. As shown in FIGS. 10D-10E, for example, when stylus 203 is in physical contact with a surface of touch screen 112, the device displays indication 1016-*d*, where the distance between indication 1016-*g* and (x,y) position 1004-*b* does not exceed a predefined maximum distance (e.g., regardless of increases in the tilt of stylus 203).

It should be understood that the particular order in which the operations in FIGS. 11A-11D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the first paragraph of the Description of Embodiments above) are also applicable in an analogous manner to method 1100 described above with respect to FIGS. 11A-11D. For example, the stylus positional state characteristics, movements, contacts, gestures, user interface objects, and outputs described above with reference to method 1100 optionally have one or more of the characteristics of the stylus positional state characteristics, movements, contacts, gestures, user interface objects, and outputs described herein with reference to other methods described herein (e.g., those listed in the first paragraph of the Description of Embodiments above). For brevity, these details are not repeated here.

Figure 12:
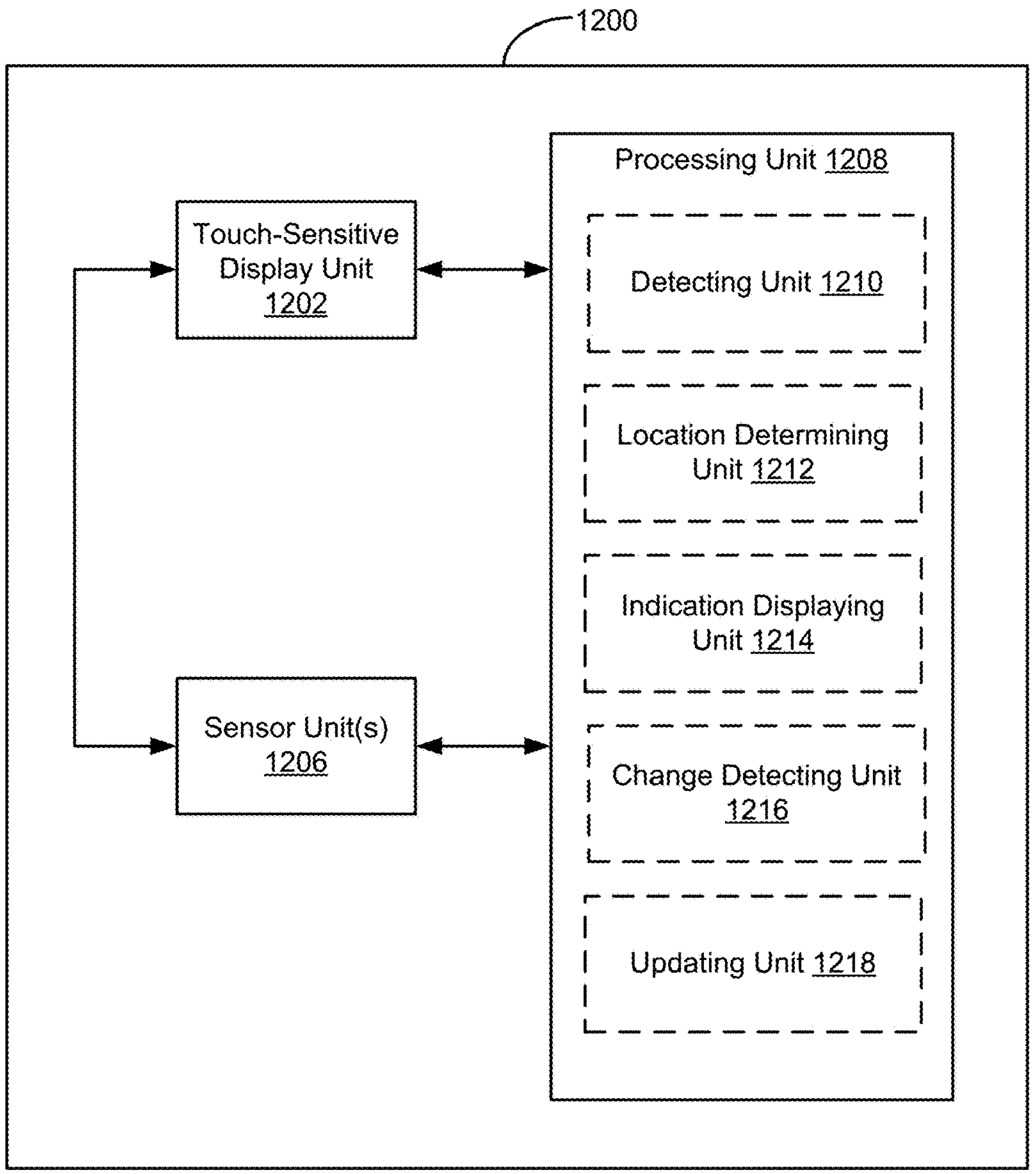
FIG. 12 is a functional block diagram of an electronic device in accordance with some embodiments.

In accordance with some embodiments, FIG. 12 shows a functional block diagram of an electronic device 1200 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, an electronic device 1200 includes a touch-sensitive display unit 1202 configured to display a user interface and receive user contacts (including stylus contacts), one or more sensor units 1206 configured to detect signals from a stylus associated with the device, the stylus including a tip; and a processing unit 1208 coupled with the touch-sensitive display unit 1202 and the one or more sensor units 1206. In some embodiments, the processing unit 1208 includes a detecting unit 1210, a location determining unit 1212, an indication displaying unit 1214, a change detecting unit 1216, and an updating unit 1218.

The processing unit 1208 is configured to: detect, while the stylus tip is in contact with the touch-sensitive display unit 1202, a positional state of the stylus (e.g., with the detecting unit 1210), wherein the positional state of the stylus corresponds to a position of the stylus tip on the touch-sensitive display unit 1202, a tilt of the stylus relative to the touch-sensitive display unit 1202, and an orientation of the stylus relative to the touch-sensitive display unit 1202; determine a first location on the touch-sensitive display unit 1202 that corresponds to the detected positional state of the stylus (e.g., with the location determining unit 1212); enable display of an indication on the touch-sensitive display unit 1202 at the first location that corresponds to the detected positional state of the stylus (e.g., with the indication displaying unit 1214), the first location being at a first offset from the position of the stylus tip on the touch-sensitive display unit 1202; detect a change in the orientation of the stylus (e.g., with the change detecting unit 1216); and, in response to detecting the change in the orientation of the stylus: determine a second location on the touch-sensitive display unit 1202 that corresponds to the change in the orientation of the stylus (e.g., with the location determining unit 1212), the second location being at a second offset from the position of the stylus tip on the touch-sensitive display unit 1202; and enable display of the indication on the touch-sensitive display unit 1202 at the second location (e.g., with the indication displaying unit 1214).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 11A-11D are, optionally, implemented by components depicted in FIGS. 1A-1B or FIG. 12. For example, detection operation 1102, location determination operation 1112, display operation 1114, change detection operation 1118, and determination/display operation 1120 are, optionally, implemented by event sorter 170, event recognizer 180, and event handler 190. Event monitor 171 in event sorter 170 detects a contact (or near contact) on touch-sensitive display 112, and event dispatcher module 174 delivers the event information to application 136-1. A respective event recognizer 180 of application 136-1 compares the event information to respective event definitions 186, and determines whether a first contact (or near contact) at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Adjusting One or More Characteristics of a Mark in Accordance with Characteristics of an Input from a Stylus Some electronic devices use a stylus associated with the device to provide additional methods of input to a touch-sensitive surface of the device. For example, some cellular phones, laptops, and tablets have the capability to receive inputs from a stylus. However, a user may want the stylus to emulate one or more virtual drawing implements (e.g., pencil, brush, calligraphy pen, etc.), where using the stylus with the device provides a user experience similar to using the drawing implement on paper. In addition, a user may want the stylus and the device to provide drawing capabilities that go beyond what is possible with the drawing implement on paper (e.g., changing from making a red pen mark when the stylus is moving rightwards to making a blue pen mark when the stylus is moving leftwards, or changing from making a red pen mark when the stylus contact intensity is low to making a blue pen mark when the stylus contact intensity is high). The embodiments below address these problems by adjusting one or more characteristics of a mark from a stylus in accordance with a virtual drawing implement being emulated by the stylus and characteristics of the input from the stylus.

Below, FIGS. 13A-13O illustrate exemplary user interfaces for adjusting one or more characteristics of a mark in accordance with characteristics of an input from a stylus in accordance with some embodiments. FIGS. 14A-14E are flow diagrams illustrating a method of adjusting one or more characteristics of a mark in accordance with characteristics of an input from a stylus in accordance with some embodiments. The user interfaces in FIGS. 13A-13O are used to illustrate the processes in FIGS. 14A-14E.

FIGS. 13A-13O illustrate exemplary user interfaces for adjusting one or more characteristics of a mark in accordance with characteristics of an input from a stylus in accordance with some embodiments. The user interfaces in these figures are used to illustrate the processes described below, including the processes in FIGS. 14A-14E. Although some of the examples which follow will be given with reference to inputs on a touch-screen display (where the touch-sensitive surface and the display are combined, for example on touch screen 112), in some embodiments, the device detects inputs on a touch-sensitive surface 651 that is separate from the display 650, as shown in FIG. 6B.

In some embodiments, the device is an electronic device with a separate display (e.g., display 650) and a separate touch-sensitive surface (e.g., touch-sensitive surface 651). In some embodiments, the device is portable multifunction device 100, the display is touch-sensitive display system 112, and the touch-sensitive surface includes tactile output generators 163 on the display (FIG. 1A). For convenience of explanation, the embodiments described with reference to FIGS. 13A-13O will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 650 and a separate touch-sensitive surface 651 in response to detecting the contacts described in FIGS. 13A-13O on (or near) the touch-sensitive surface 651 while displaying the user interfaces shown in FIGS. 13A-13O on the display 650.

FIGS. 13A-13O illustrate exemplary user interfaces for adjusting one or more characteristics of a mark in accordance with characteristics of an input from a stylus in accordance with some embodiments. While FIG. 13A shows touch screen 112 with additional details of device 100 (e.g., speaker 111, optical sensor 164, proximity sensor 166, etc.), for clarity, FIGS. 13B-13O simply show touch screen 112 of device 100, without showing other details of device 100. Further, while FIG. 13A illustrates an example from a viewpoint directly above a touch-sensitive surface (e.g., touch screen 112 of device 100), FIGS. 13B-13O illustrate examples from two viewpoints: a viewpoint directly above a touch-sensitive surface (e.g., touch screen 112 of device 100) and a side viewpoint of the touch-sensitive surface.

FIG. 13A illustrates an example of displaying an indication (e.g., indication 1316-*a*) that corresponds to a positional state of a stylus (e.g., stylus 203). In this example, stylus 203 has a positional state with an orientation of stylus 203 relative to touch screen 112 (e.g., orientation 1306-*a*) and a position of a projection of a tip of stylus 203 on touch screen 112 (e.g., (x,y) position 1304-*a*). As shown in FIG. 13A, when stylus 203 is positioned with orientation 1306-*a* (e.g., approximately 315 degrees in a clockwise rotation angle relative to axis 508) and tip projection at (x,y) position 1304-*a*, an indication 1316-*a* is displayed on touch screen 112 to show where stylus 203 will touch (or mark) touch screen 112. In some embodiments, the indication is displaced in a first direction on touch screen 112, relative to (x,y) position 1304-*a*, when the stylus is positioned in a first orientation and the indication is displaced in a second direction on touch screen 112, relative to (x,y) position 1304-*a*, when the stylus is positioned in a second orientation, distinct from the first orientation.

In some embodiments, the positional state of the stylus during an input from the stylus is not a single, static positional state; rather, the positional state of the stylus typically changes during the input from the stylus (and is sometimes referred to as a plurality of characteristics of the input from the stylus). For example, a plurality of characteristics of an input from stylus 203 include an orientation of stylus 203 relative to touch screen 112 (e.g., orientation 1306-*a*), a direction of movement of stylus 203 across touch screen 112 during the input ("directionality"), tilt of stylus 203 relative to touch screen 112, contact intensity of stylus 203 on touch screen 112, and/or velocity of movement of stylus 203 on or near touch screen 112.

FIGS. 13B-13C and 13H-13L illustrate an example of displaying an indication (e.g., indication 1316-*b*, indication 1316-*c*, indication 1316-*h*, indication 1316-*i*, indication 1316-*j*, indication 1316-*k*, and indication 1316-1) when the stylus (e.g., stylus 203) is in physical contact with the surface of the touch-sensitive surface (e.g., touch screen 112). In some embodiments, when stylus 203 is in physical contact with touch screen 112, the distance of stylus 203 away from touch screen 112 (e.g., distance 1314-*a*) is calculated to be greater than zero (e.g., to account for the thickness of a glass layer on touch screen 112). In some embodiments, when the stylus is in physical contact with the surface of the touch-sensitive surface, the indication is updated in response to a change in orientation (as described below with respect to FIGS. 13B-13C) and the indication is updated in response to a change in tilt (as described above), and for brevity, the details are not repeated here.

In some embodiments, when stylus 203 is in physical contact with touch screen 112, both an indication and a mark are displayed (e.g., in FIGS. 13H-13L). In some embodiments, the indication corresponds to a virtual "pen tip" or other element that indicates where a mark will be drawn on the touch-sensitive display (e.g., touch screen 112). In some embodiments, the mark is a point, line, brushstroke, or the like on the touch-sensitive display. In some embodiments, the indication corresponds to one end (a terminus) of the mark (e.g., in FIGS. 13D-13G and 13M-13O). For example, when the mark being drawn is a line, the indication corresponds to (or is adjacent to) the end of the line being drawn. In some embodiments, if the indication is displayed when the stylus is in physical contact with the surface of the touch-sensitive display, the shape (and optionally color) of the indication corresponds to the shape (and optionally color) of a tip of a virtual drawing implement being emulated by the stylus. For example, if the stylus is being used as a virtual yellow highlighter, the indication is a yellow rectangle (corresponding to the chisel tip of a highlighter), and as the stylus is moved across the surface of the touch-sensitive display, a mark is created (e.g., by propagating the size/shape/color of the indication along the path of the stylus). If the stylus is being used as a virtual yellow highlighter and the stylus touches down at a point on the touch-sensitive display and then lifts off, without moving across the touch-sensitive display, a yellow rectangle mark (corresponding to an indication that is the chisel tip of a highlighter) may be displayed at the point on the touch-sensitive display where the stylus touched down.

Figure 13C:
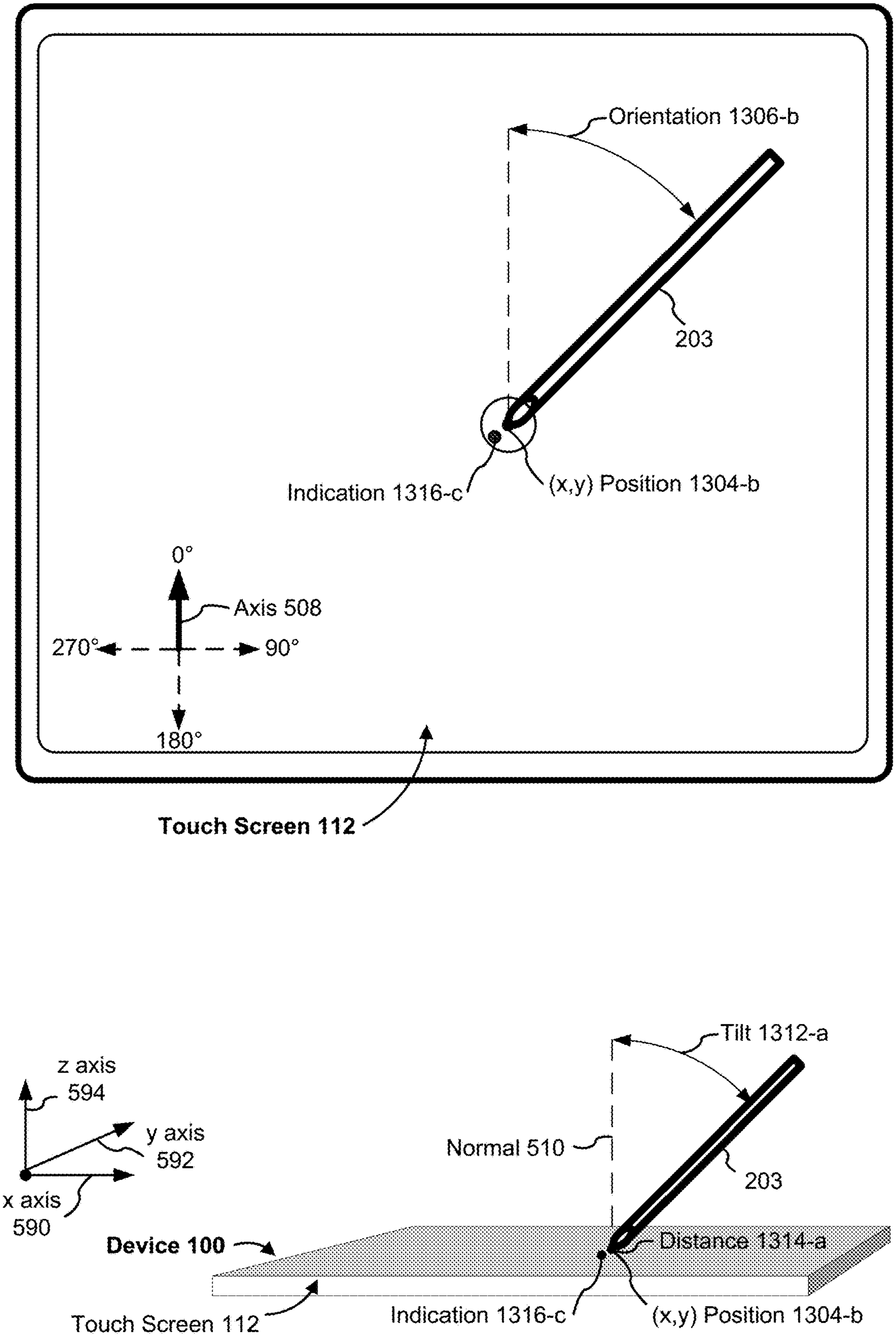

FIGS. 13B-13C illustrate an example of changing the orientation (e.g., orientation 1306) of the stylus (e.g., stylus 203) relative to the touch-sensitive display (e.g., touch screen 112) and in response to the change in orientation, updating the displayed indication (e.g., from displaying indication 1316-*b* at a first location to displaying indication 1316-*c* at a second location). In FIGS. 13B-13C, the (x,y) position of the tip of the stylus (e.g., (x,y) position 1304-*b*), the tilt of the stylus (e.g., tilt 1312-*a*), and the distance of the stylus relative to the touch-sensitive display (e.g., distance 1314-*a*, when the stylus tip is in contact with the touch-sensitive display) remain constant, while the orientation of the stylus relative to the touch-sensitive display changes (e.g., from orientation 1306-*a* to orientation 1306-*b*). As the orientation of stylus 203 changes from orientation 1306-*a* (e.g., approximately 315 degrees in a clockwise rotation angle relative to axis 508) to orientation 1306-*b* (e.g., approximately 45 degrees in a clockwise rotation angle relative to axis 508), the displayed indication is updated on touch screen 112 (e.g., from indication 1316-*b* to indication 1316-*c*).

Figure 13D:
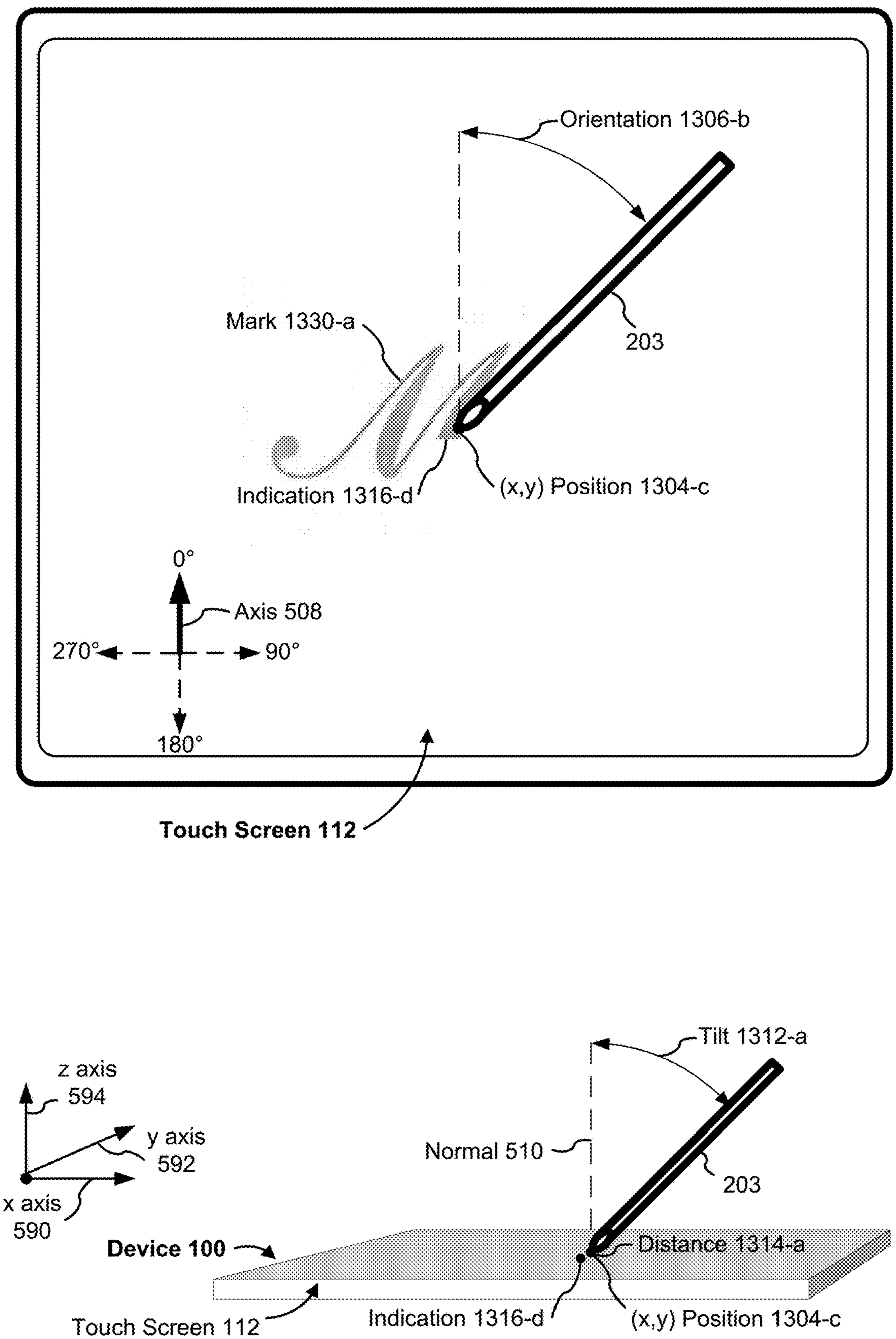

FIGS. 13D-13E illustrate an example of changing the directionality during the input from the stylus (e.g., stylus 203) and in response to the change in directionality, adjusting the mark (e.g., mark 1330) by changing the width of the mark as the directionality changes. In FIGS. 13D-13E, the orientation of the stylus (e.g., orientation 1306-*b*), the tilt of the stylus (e.g., tilt 1312-*a*), and the distance of the stylus relative to the touch-sensitive display (e.g., distance 1314-*a*, when the stylus tip is in contact with the touch-sensitive display) remain constant, while the directionality of the stylus changes (e.g., moving downwards at (x,y) position 1304-*c* to moving upwards at (x,y) position 1304-*d*). In some embodiments, stylus 203 in FIGS. 13D-13E is emulating a pen for calligraphy writing. In FIG. 13D, as stylus 203 moves in one direction (e.g., downwards), the width of the mark (e.g., mark 1330-*a* at indication 1316-*d*)) is increased and in FIG. 13E, as stylus 203 moves in another direction (e.g., upwards), the width of the mark is decreased (e.g., mark 1330-*b* at indication 1316-*e*). In some embodiments, there is a gradual transition from a first (e.g., thin) width while the stylus is moving in a first direction (e.g., upwards) to a second (e.g., thick) width while the stylus is moving in a second direction that is opposite to the first direction (e.g., downwards), as shown in FIGS. 13D-13E.

In some embodiments, in response to the change in directionality of stylus 203, the color of the mark changes as the directionality changes. In some embodiments, a mark has subtle color variations with directionality changes. For example, as stylus 203 moves in a first direction, the color of the mark (e.g., mark 1330) is a light color, and as stylus 203 moves in a second direction, the color of the mark (e.g., mark 1330) is a darker version of the same color. Using FIGS. 13D-13E as an example, in some embodiments, as stylus 203 moves downwards (and the width of the mark is increased), the color of the mark is light blue, and as stylus 203 moves upwards (and the width of the mark is decreased), the color of the mark is a darker blue.

Figure 13F:
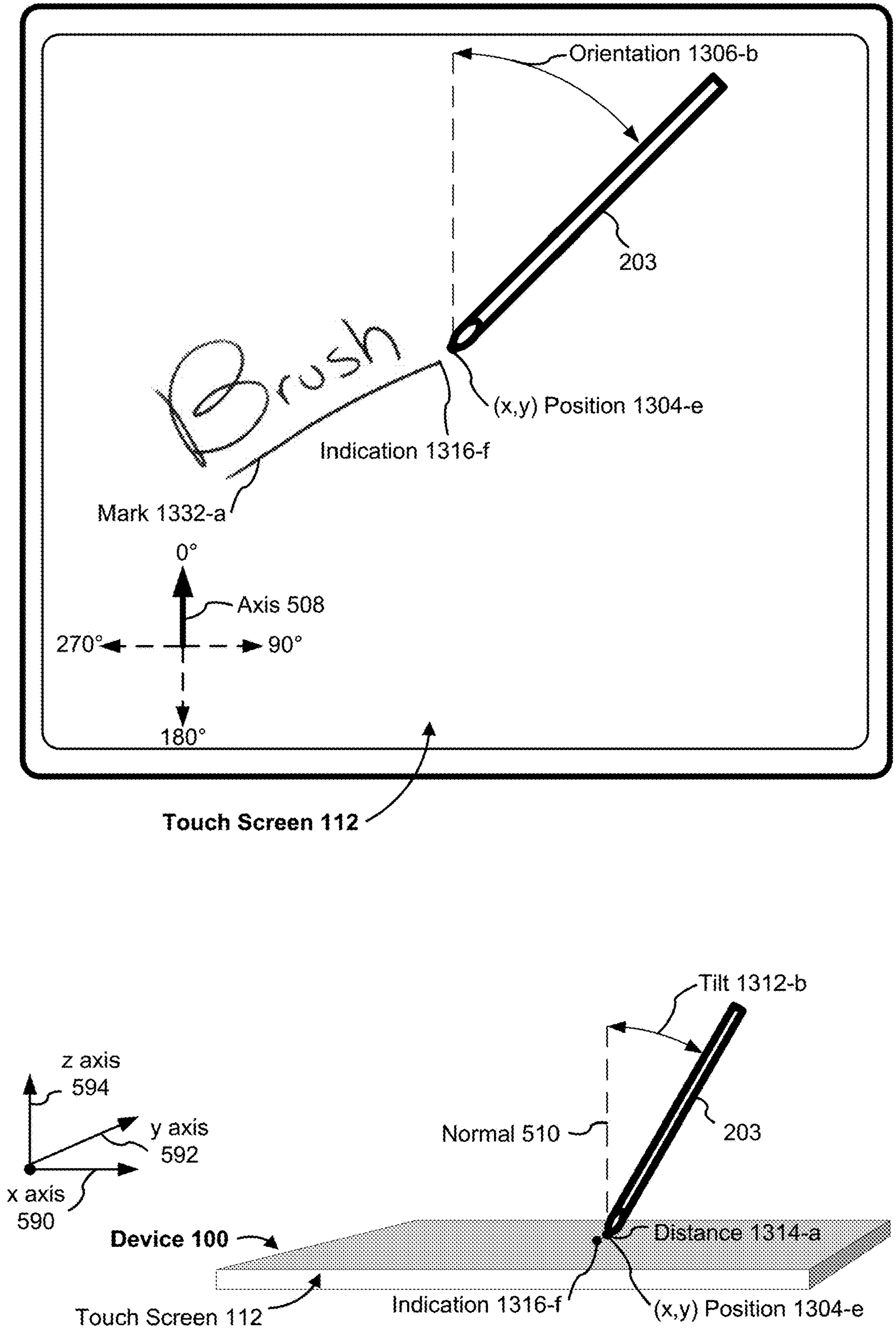
Figure 13G:
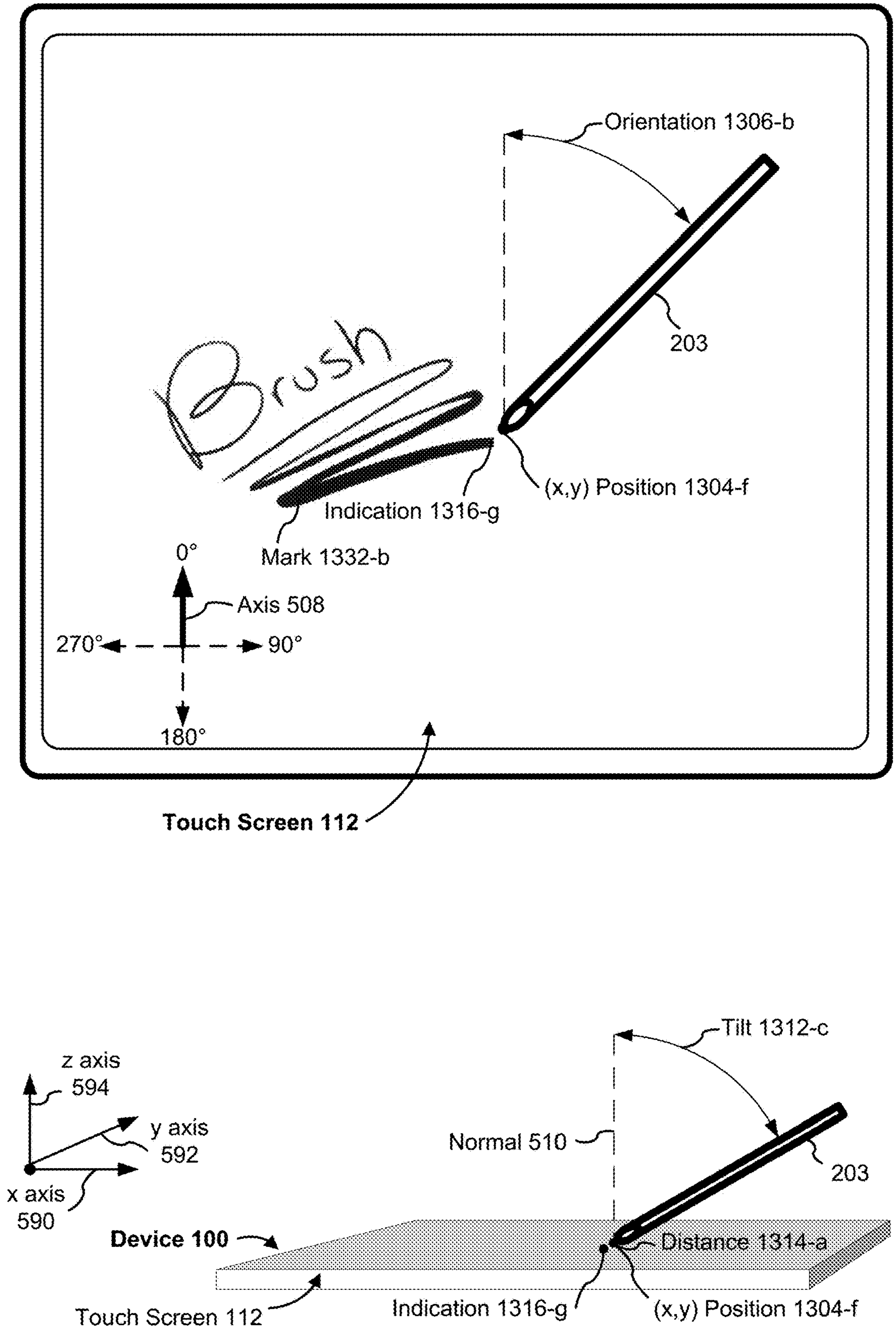

FIGS. 13F-13G illustrate an example of changing the tilt (e.g., tilt 1312) of the stylus (e.g., stylus 203) relative to the touch-sensitive display (e.g., touch screen 112) and in response to the change in tilt, adjusting the mark (e.g., mark 1332) by increasing the width of the mark as the tilt increases. In FIGS. 13F-13G, the orientation of the stylus (e.g., orientation 1306-*b*) and the distance of the stylus relative to the touch-sensitive display (e.g., distance 1314-*a*, when the stylus tip is in contact with the touch-sensitive display) remain constant, while the tilt of the stylus changes (e.g., from tilt 1312-*b* to tilt 1312-*c*) as the stylus tilts closer to parallel with touch screen 112 during the input from stylus 203. In some embodiments, stylus 203 in FIGS. 13F-13G is emulating a brush. As shown in this example, as the tilt increases, the width of the mark (e.g., mark 1332) increases. In FIG. 13F, when the tilt is relatively small (e.g., tilt 1312-*b*), the width of the mark is thin (e.g., at indication 1316-*f*), and in FIG. 13G, when the tilt is relatively large (e.g., tilt 1312-*c*), the width of the mark is thick (e.g., at indication 1316-*g*).

Figure 13I:
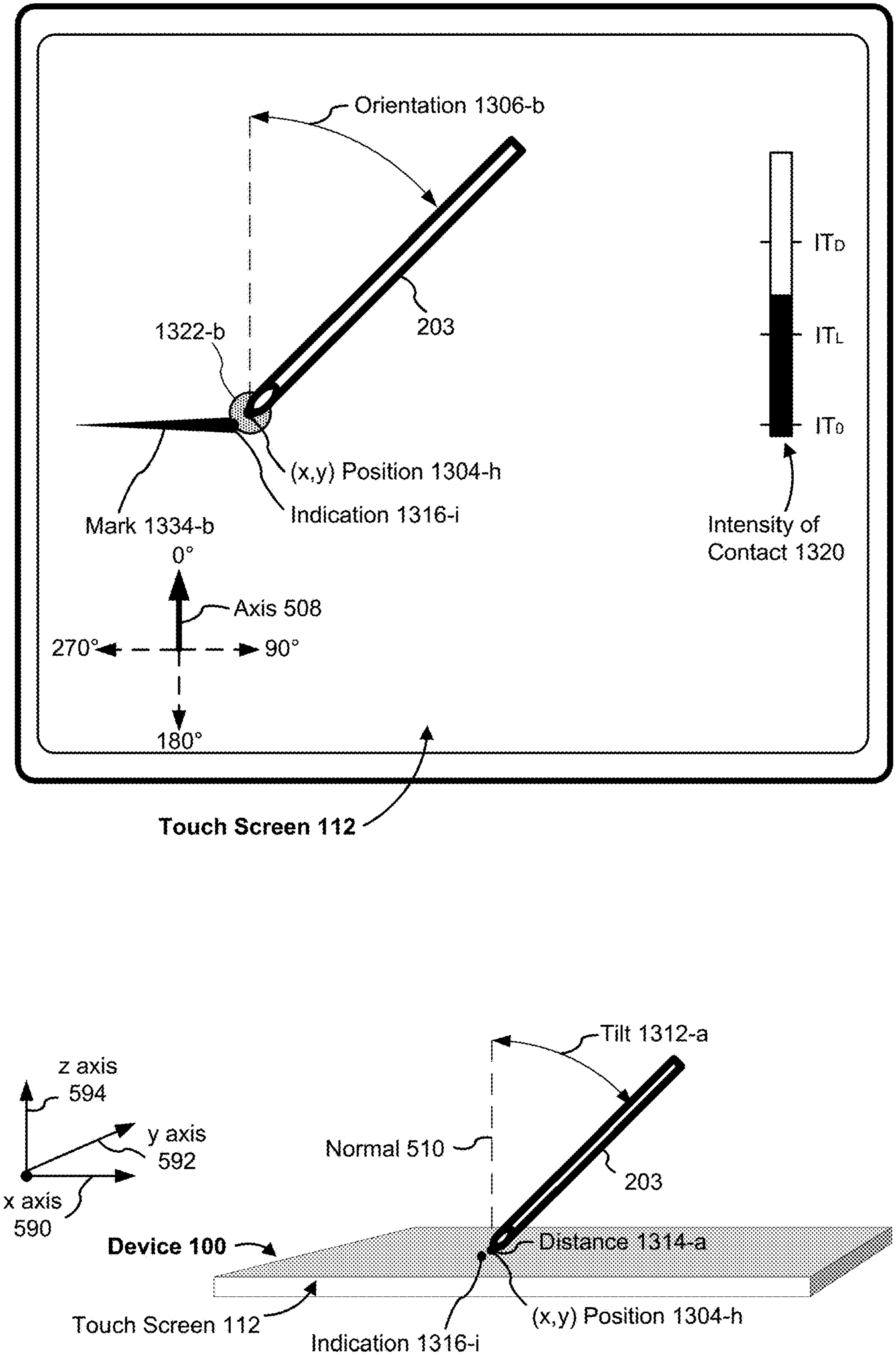

FIGS. 13H-13J illustrate an example of changing the contact intensity (e.g., a parameter that corresponds to intensity of contact of the stylus (e.g., stylus 203) on the touch-sensitive surface (e.g., touch screen 112)) of the stylus during the input, and in response to the change in contact intensity, adjusting the mark (e.g., mark 1334) by increasing the width of the mark as the contact intensity increases. In FIGS. 13H-13J, the orientation of the stylus (e.g., orientation 1306-*b*), the tilt of the stylus (e.g., tilt 1312-*a*), and the distance of the stylus relative to the touch-sensitive display (e.g., distance 1314-*a*, when the stylus tip is in contact with the touch-sensitive display) remain constant, while the contact intensity of the stylus changes (e.g., from contact intensity 1322-*a* in FIG. 13H to contact intensity 1322-*b* in FIG. 13I to contact intensity 1322-*c* in FIG. 13J) as the contact intensity increases during the input from stylus 203. In some embodiments, stylus 203 in FIGS. 13H-13J is emulating a pencil or a pen or a brush. As shown in FIGS. 13H-13J, as the contact intensity increases (e.g., as illustrated by the darkening of contact intensity 1322, corresponding to the intensity of contact 1320), the width of the mark (e.g., mark 1334) increases. In FIG. 13H, when the contact intensity is relatively low (e.g., with contact intensity 1322-*a*), the width of the mark is thin (e.g., at indication 1316-*h*); in FIG. 13I, when the contact intensity is medium (e.g., with contact intensity 1322-*b*), the width of the mark is medium (e.g., at indication 1316-*i*); in FIG. 13J, when the contact intensity is relatively high (e.g., with contact intensity 1322-*c*), the width of the mark is thick (e.g., at indication 1316-*j*).

In addition, although not shown in FIGS. 13H-13J, in some embodiments, in response to the change in contact intensity of stylus 203, the color of the mark changes as the contact intensity changes. In some embodiments, as the contact intensity increases, the color of the mark gradually transitions from a first color to a second color. In some embodiments, as the contact intensity of stylus 203 increases, the color of the mark (e.g., mark 1334) changes from a first color (e.g., red) to a second color (e.g., blue), where the color of the mark during the gradual transition includes a blend of the first color and the second color (e.g., purple). Using FIGS. 13H-13J as an example for explanation, as the contact intensity of stylus 203 increases, the color of the mark (e.g., mark 1334) gradually transitions from red to blue (e.g., red to purple to blue). In FIG. 13H, when the contact intensity is relatively low (e.g., with contact intensity 1322-*a*), the color of the mark is red (e.g., at indication 1316-*h*); in FIG. 13I, when the contact intensity is medium (e.g., with contact intensity 1322-*b*), the color of the mark is purple (e.g., a blend of red and blue, at indication 1316-*i*); in FIG. 13J, when the contact intensity is relatively high (e.g., with contact intensity 1322-*c*), the color of the mark is blue (e.g., at indication 1316-*j*). Similarly, in some embodiments, as the contact intensity decreases, the color of the mark gradually transitions from a second color to a first color.

Figure 13K:
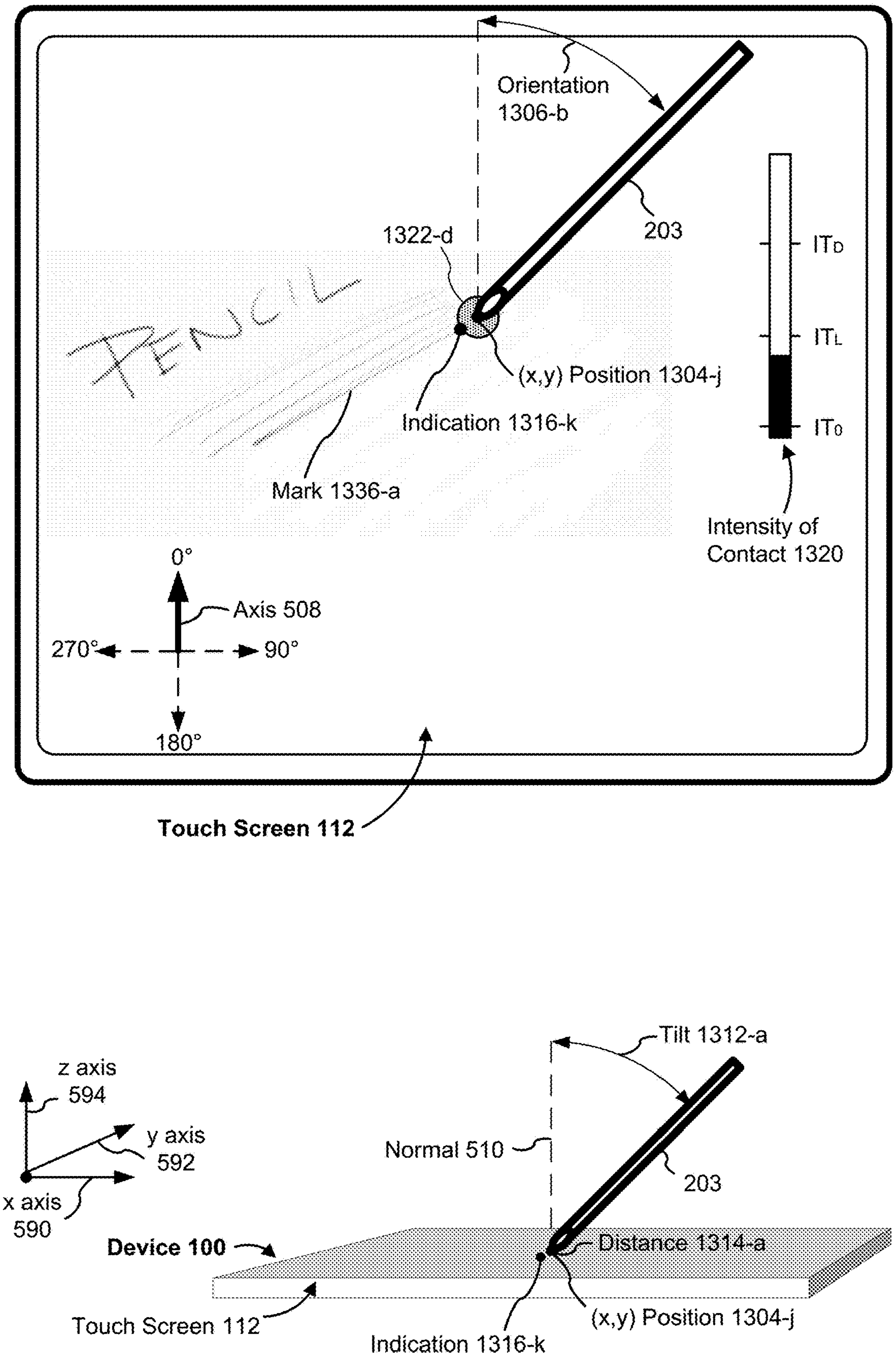
Figure 13L:
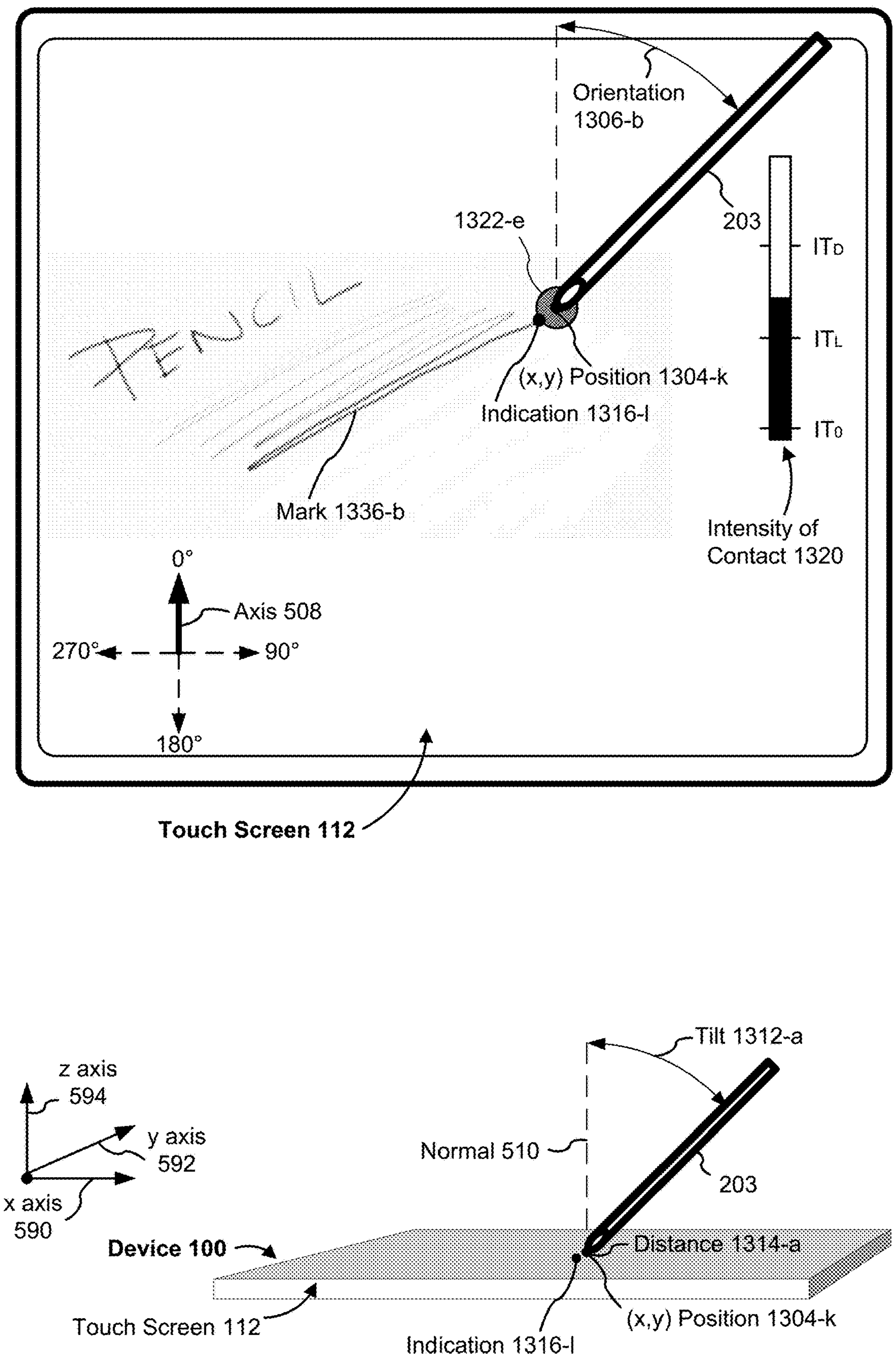

FIGS. 13K-13L illustrate an example of changing the contact intensity of the stylus (e.g., stylus 203) during the input, and in response to the change in contact intensity, adjusting the mark (e.g., mark 1336) by increasing the opacity of the mark as the contact intensity increases. In FIGS. 13K-13L, the orientation of the stylus (e.g., orientation 1306-*b*), the tilt of the stylus (e.g., tilt 1312-*a*), and the distance of the stylus relative to the touch-sensitive display (e.g., distance 1314-*a*, when the stylus tip is in contact with the touch-sensitive display) remain constant, while the contact intensity of the stylus changes (e.g., from contact intensity 1322-*d* in FIG. 13K to contact intensity 1322-*e* in FIG. 13L) as the contact intensity increases during the input from stylus 203. In some embodiments, stylus 203 in FIGS. 13K-13L is emulating a pencil or a ballpoint pen or a brush. As shown in FIGS. 13K-13L, as the contact intensity increases (e.g., as illustrated by the darkening of contact intensity 1322, corresponding to the intensity of contact 1320), the opacity of the mark (e.g., mark 1336) increases. In FIG. 13K, when the contact intensity is relatively low (e.g., with contact intensity 1322-*d*), the opacity of the mark is light (e.g., at indication 1316-*k*); in FIG. 13L, when the contact intensity is higher (e.g., with contact intensity 1322-*e*), the opacity of the mark is darker (e.g., at indication 1316-1).

Figure 13M:
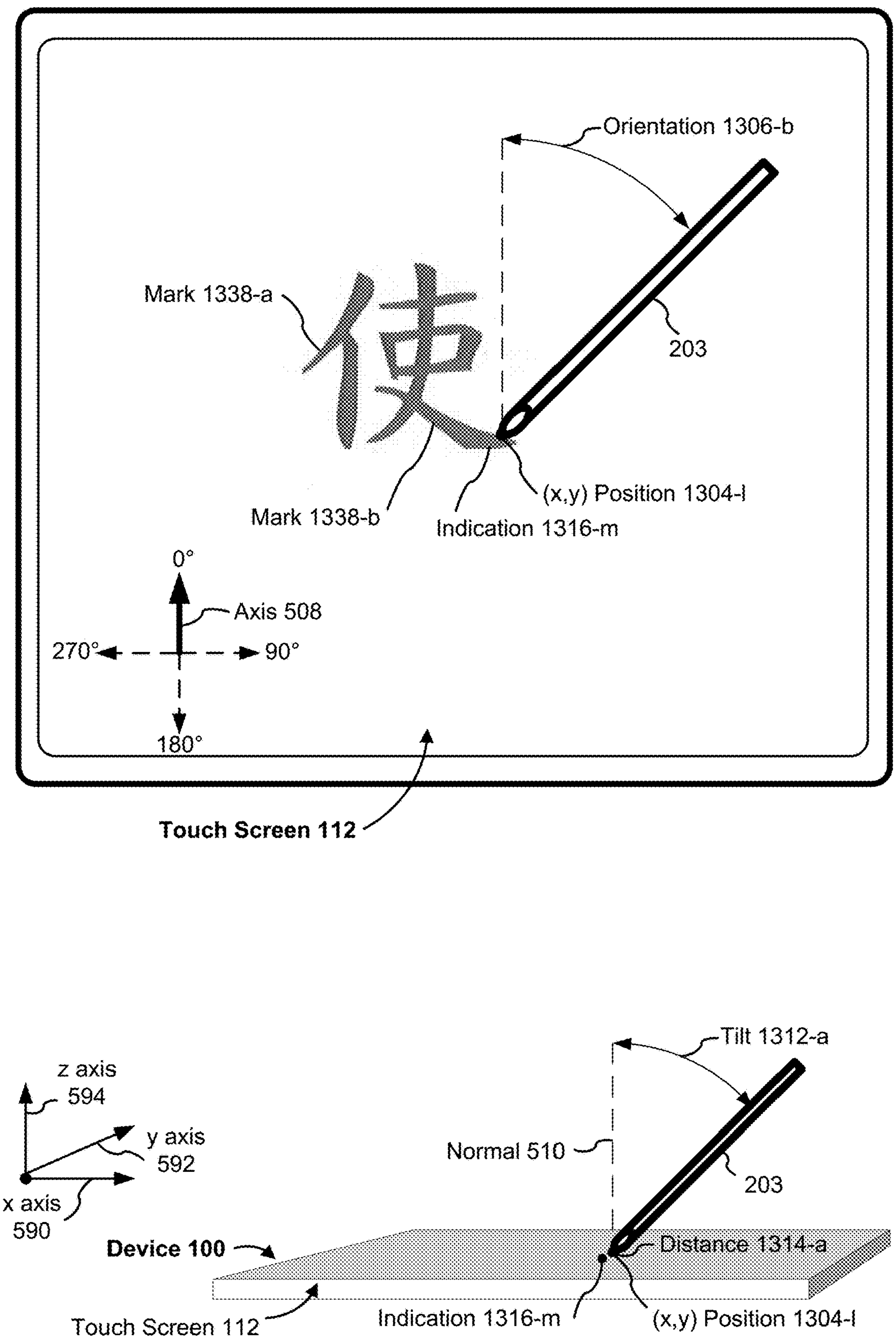
Figure 14A:
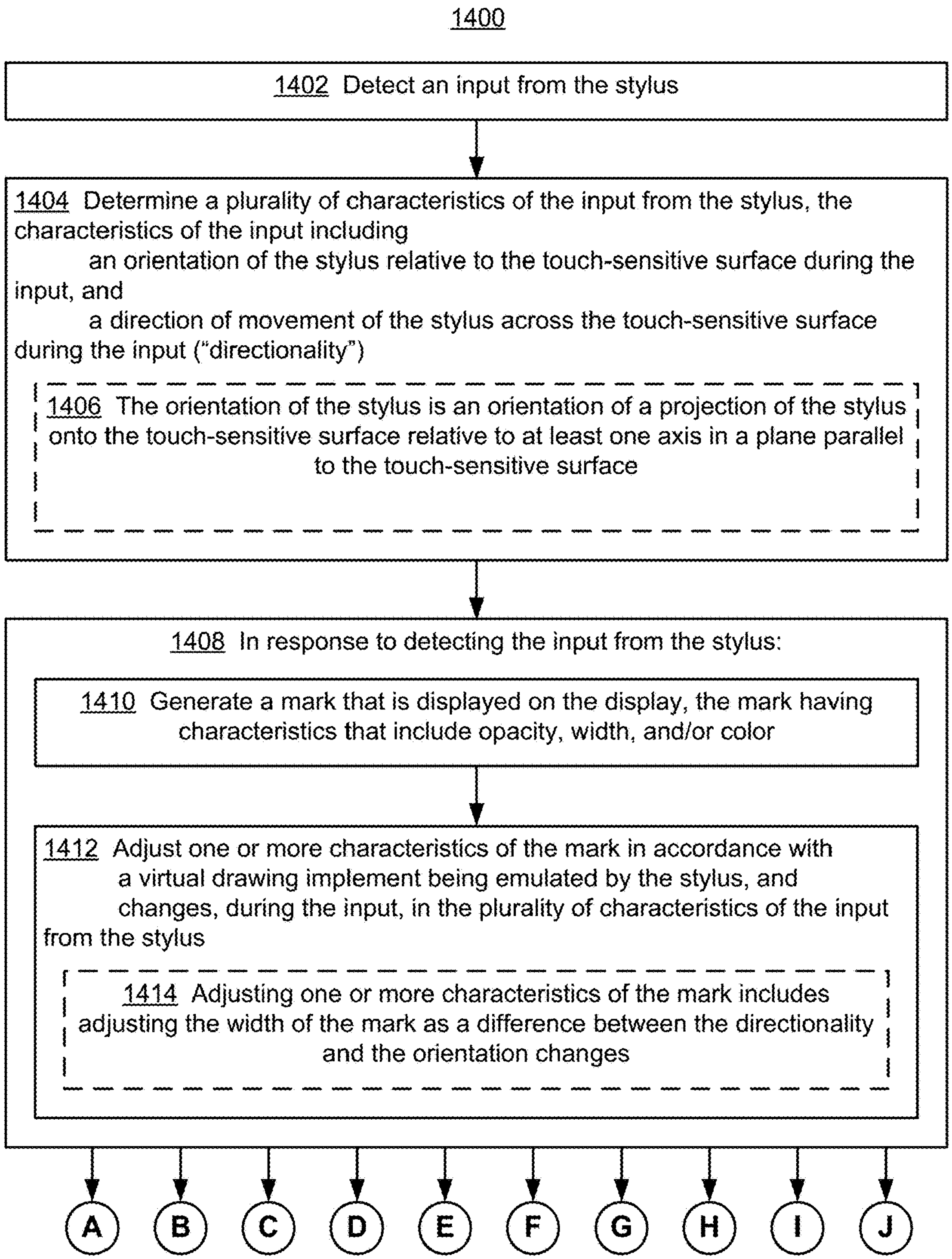
Figure 14B:
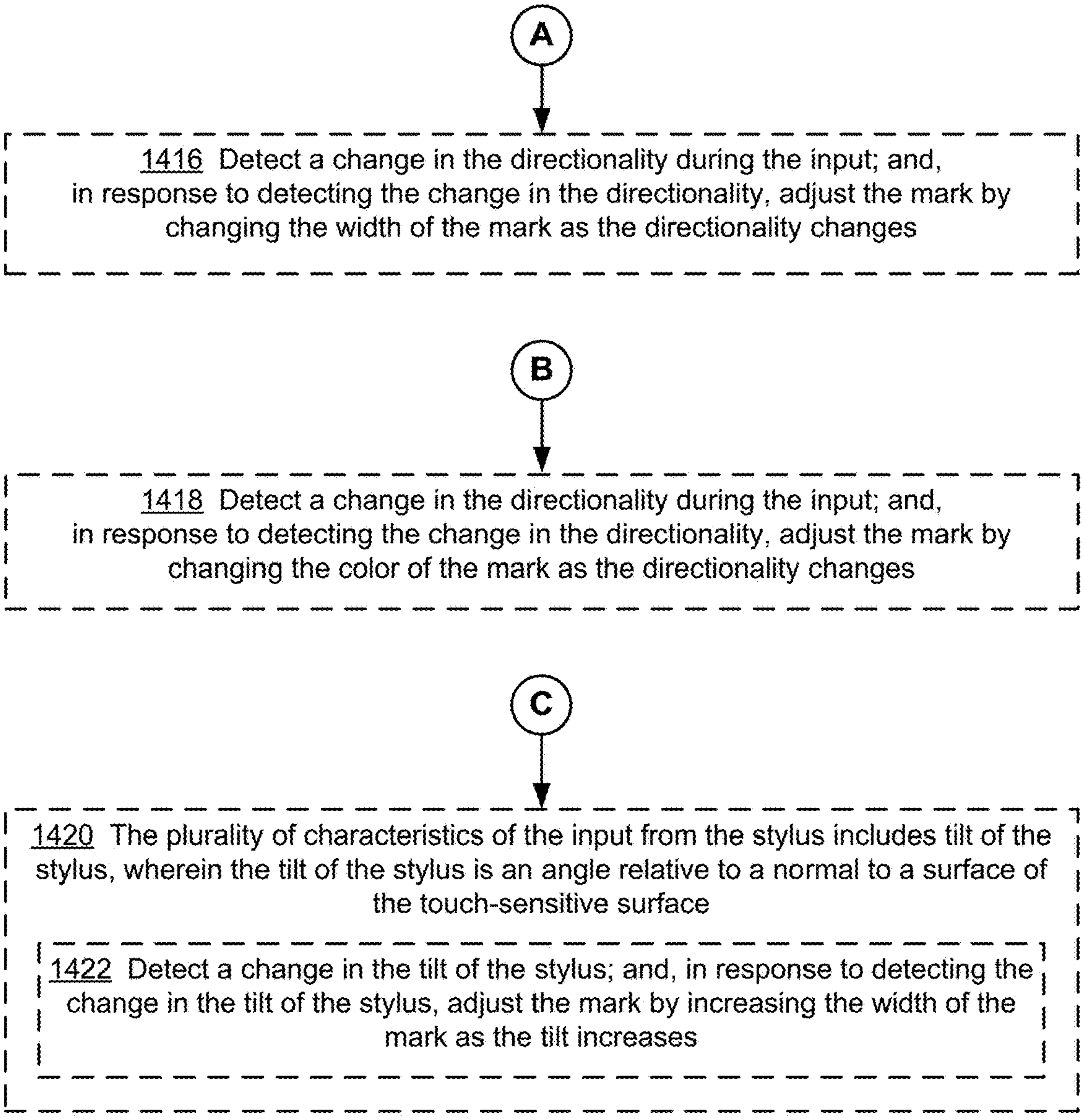

FIG. 13M illustrates an example of changing the velocity of movement of the stylus (e.g., stylus 203) during the input, and in response to the change in velocity, adjusting the mark (e.g., mark 1338) by decreasing the width of the mark as the velocity increases. For example, the width of mark 1338-*a* is decreased as the velocity of movement of stylus 203 increases to complete the stroke of mark 1338-*a*. In some embodiments, in response to the change in velocity, the mark is adjusted by increasing the width of the mark as the velocity decreases. For example, the width of mark 1338-*b* is increased as the velocity of movement of stylus 203 decreases at the end of mark 1338-*b*. In some embodiments, stylus 203 in FIG. 13M is emulating a calligraphy brush for Chinese calligraphy (or other lettering). Alternatively, in some embodiments, in response to the change in velocity, the mark is adjusted by increasing the width of the mark as the velocity increases or decreasing the width of the mark as the velocity decreases.

FIGS. 13N-13O illustrate an example of changing a difference (in angle) between the directionality and the orientation of the stylus (e.g., stylus 203) during the input from the stylus, and adjusting the width of the mark as the difference between the directionality and the orientation changes. In FIGS. 13N-13O, the orientation of the stylus (e.g., orientation 1306-*b*), the tilt of the stylus (e.g., tilt 1312-*a*), and the distance of the stylus relative to the touch-sensitive display (e.g., distance 1314-*a*, when the stylus tip is in contact with the touch-sensitive display) remain constant, while the directionality of the stylus changes (e.g., from moving downwards at (x,y) position 1304-*m* to moving to the right at (x,y) position 1304-*n*). In some embodiments, stylus 203 in FIGS. 13N-13O is emulating a chisel tip drawing implement (e.g., a highlighter, a dry erase marker, etc.). In FIG. 13N, as stylus 203 moves in one direction (e.g., approximately 180 degrees in a clockwise rotation angle relative to axis 508) while in a first orientation (e.g., approximately 45 degrees in a clockwise rotation angle relative to axis 508), the difference (in angle) between the directionality and the orientation is a first difference (e.g., approximately 135 degrees) and the mark (e.g., mark 1340) has a first width (e.g., a thin width). In FIG. 13O, as stylus 203 moves in a second direction (e.g., approximately 90 degrees in a clockwise rotation angle relative to axis 508) while in the first orientation (e.g., approximately 45 degrees in a clockwise rotation angle relative to axis 508), the difference (in angle) between the directionality and the orientation is a second difference (e.g., approximately 45 degrees) and the mark (e.g., mark 1340) has a second width (e.g., a thick width).

FIGS. 14A-14E are flow diagrams illustrating a method 1400 of adjusting one or more characteristics of a mark in accordance with characteristics of an input from a stylus in accordance with some embodiments. The method 1400 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display (also called simply a touch-sensitive display). In some embodiments, the display is separate from the touch-sensitive surface. In some embodiments, the device includes one or more sensors to detect signals from a stylus associated with the device. In some embodiments, the stylus includes a tip (or other representative portion). In some embodiments, a portion on the stylus other than the tip is used to estimate the location of the tip. Some operations in method 1400 are, optionally, combined and/or the order of some operations is, optionally, changed.

As described below, the method 1400 provides an efficient way to adjust one or more characteristics of a mark (e.g., opacity, width, and/or color) in accordance with characteristics of an input from a stylus (e.g., orientation, direction of movement, tilt, contact intensity, and/or velocity of movement). The method provides user experiences with the stylus and electronic device that are similar to user experiences using a physical drawing implement on paper. In addition, the method provides drawing capabilities with the stylus and electronic device that go beyond what is possible using a physical drawing implement on paper. The method reduces the number, extent, and/or nature of the inputs from a user when using a stylus to interact with an electronic device, thereby creating a more efficient human-machine interface. For battery-operated electronic devices, enabling a user to enter stylus input faster and more efficiently conserves power and increases the time between battery charges.

The device detects (1402) an input from the stylus. In some embodiments, the input from the stylus includes input from touch down of the stylus until lift-off of the stylus. For example, in FIGS. 13D-13E, the input from the stylus (e.g., stylus 203) includes input from the touch-down of stylus 203 on touch screen 112 to begin making the mark (e.g., mark 1330) until lift-off of stylus 203 after completing the mark.

The device determines (1404) a plurality of characteristics of the input from the stylus, the characteristics of the input including an orientation of the stylus relative to the touch-sensitive surface during the input, and a direction of movement of the stylus across the touch-sensitive surface during the input ("directionality"). For example, FIG. 13D shows stylus 203 with orientation 1306-*b* and a downward directionality while FIG. 13E shows stylus 203 with orientation 1306-*b* and an upward directionality. Although the orientation is unchanged in FIGS. 13D-13E, typically the orientation of the stylus during the input is not a single orientation; rather, the orientation typically changes during the input. Further, typically the directionality of the stylus during the input is not a single directionality; rather, the directionality typically changes during the input, as shown in FIGS. 13D-13E. In some embodiments, the plurality of characteristics of the input is relative to the touch-sensitive surface (e.g., touch screen 112).

In some embodiments, the plurality of characteristics of the input from the stylus (e.g., corresponding to an orientation of the stylus relative to the touch-sensitive surface, a tilt of the stylus relative to the touch-sensitive surface, etc.) is detected in accordance with one or more measurements from the stylus that are sent to the electronic device. For example, the stylus measures the tilt and/or the orientation of the stylus and sends the measurement to the electronic device. Alternatively, in some embodiments, the plurality of characteristics of the input is detected in accordance with raw output, from one or more electrodes in the stylus, that is sensed by the touch-sensitive surface. For example, the touch-sensitive surface receives raw output from one or more electrodes in the stylus and calculates the tilt and/or the orientation of the stylus based on the raw output.

In some embodiments, the orientation of the stylus is (1406) an orientation of a projection of the stylus onto the touch-sensitive surface (e.g., an orthogonal projection of a length of the stylus or a line corresponding to the line between the projection of two different points of the stylus onto the touch-sensitive surface) relative to at least one axis in a plane parallel to the touch-sensitive surface. For example, in FIG. 5A, orientation 506 of stylus 203 is an orientation of a projection of stylus 203 onto touch screen 112 relative to axis 508. In some embodiments, the orientation of the projection of the stylus onto the touch-sensitive surface is relative to a single axis (e.g., a single axis with a clockwise rotation angle from the axis ranging from 0 degrees to 360 degrees), such as axis 508 in FIG. 5A. Alternatively, in some embodiments, the orientation of the projection of the stylus onto the touch-sensitive surface is relative to a pair of axes (e.g., an x axis and a y axis such as x axis 590 and y axis 592 in FIG. 5A, or a pair of axes associated with an application displayed on the display).

In response to detecting the input from the stylus (e.g., stylus 203) (1408), the device generates (1410) a mark that is displayed on the display, the mark having characteristics that include opacity, width, and/or color. For example, in FIG. 13D, in response to detecting the input from stylus 203, the device generates mark 1330-*a*, where mark 1330-*a* has characteristics that include opacity, width, and/or color.

Further, in response to detecting the input from the stylus (1408), the device adjusts (1412) one or more characteristics of the mark in accordance with a virtual drawing implement being emulated by the stylus, and changes, during the input, in the plurality of characteristics of the input from the stylus. In some embodiments, the virtual drawing implement being emulated is determined by a user selecting the implement via a displayed menu (e.g., a palette with a virtual pencil, pen, brush, highlighter, calligraphy pen, etc.). In some embodiments, the virtual drawing implement being emulated is determined by a user gesture with the stylus (e.g., a rotation of the barrel of the stylus, a single tap or a double tap on the stylus, etc.). Any one of the characteristics of the mark, such as its width, may be adjusted based on a subset, or even a single one, of the plurality of characteristics of the input from the stylus. For example, in FIGS. 13D-13E, one or more characteristics of mark 1330 (e.g., width and/or color) are adjusted in accordance with stylus 203 emulating a calligraphy pen and changes, during the input, in the directionality of stylus 203. As another example, in FIGS. 13F-13G, one or more characteristics of mark 1332 (e.g., width) are adjusted in accordance with stylus 203 emulating a brush and changes, during the input, in the tilt of stylus 203. As yet another example, in FIGS. 13H-13J, one or more characteristics of mark 1334 (e.g., width) are adjusted in accordance with stylus 203 emulating a brush (or pencil or pen) and changes, during the input, in the contact intensity of stylus 203. As yet another example, in FIGS. 13K-13L, one or more characteristics of mark 1336 (e.g., opacity) are adjusted in accordance with stylus 203 emulating a pencil (or brush or pen) and changes, during the input, in the contact intensity of stylus 203.

In some embodiments, adjusting one or more characteristics of the mark includes (1414) adjusting the width of the mark as a difference (in an angle) between the directionality and the orientation changes. For example, in FIGS. 13N-

13O, the width of mark 1340 changes (e.g., increases in width) as a difference in an angle between the directionality and the orientation of stylus 203 changes (e.g., from a difference in angle of approximately 135 degrees in FIG. 13N to a difference in angle of approximately 45 degrees in FIG. 13O). As another example, if stylus 203 from FIGS. 13N-13O were used to draw a circle while changing the orientation to maintain the same difference in angle between the directionality and orientation, the circle would have the same width throughout; in contrast, if stylus 203 from FIGS. 13N-13O were used to draw a circle while keeping a fixed orientation of stylus 203, the top and bottom of the circle would have a first width (e.g., thick) and the left and right of the circle would have a second width (e.g., thin).

In some embodiments, the device detects (1416) a change in the directionality during the input; and, in response to detecting the change in the directionality, adjusts the mark by changing the width of the mark as the directionality changes. In some embodiments, when the virtual drawing implement is a pen (e.g., a pen for calligraphy), adjusting the characteristics of the mark in accordance with changes, during the input, in the plurality of characteristics of the input from the stylus includes changing the width of the mark as the directionality changes. In some embodiments, the width of the mark is decreased if the input from the stylus is moving up and the width of the mark is increased if the input from the stylus is moving down, as shown in FIGS. 13D-13E. In some embodiments, there is a gradual transition from a first (e.g., thin) width while the stylus is moving in a first direction (e.g., upwards) to a second (e.g., thick) width while the stylus is moving in a second direction that is opposite to the first direction (e.g., downwards), as shown in FIGS. 13D-13E.

In some embodiments, the device detects (1418) a change in the directionality during the input; and, in response to detecting the change in the directionality, adjusts the mark by changing the color of the mark as the directionality changes. In some embodiments, adjusting the characteristics of the mark in accordance with the changes, during the input, in the plurality of characteristics of the input from the stylus includes changing the color of the mark as the directionality changes. In some embodiments, the mark has subtle color variations with directionality changes, such as being light blue while moving rightward and being a darker blue while moving leftward, or being light blue while moving downward and being a darker blue while moving upward, as explained above with respect to FIGS. 13D-13E. In some embodiments, the mark has major color variations with directionality changes, such as being blue while moving rightward and being a red while moving leftward (which may not occur in the corresponding physical drawing implement).

In some embodiments, the plurality of characteristics of the input from the stylus includes (1420) tilt of the stylus, wherein the tilt of the stylus is an angle relative to a normal to a surface of the touch-sensitive surface (also called simply the normal to the touch-sensitive surface). In some embodiments, the tilt is zero when the stylus is perpendicular/normal to the touch-sensitive surface and the tilt increases as the stylus is tilted closer to being parallel to the touch-sensitive surface. For example, in FIGS. 13F-13G, the tilt of stylus 203 would be zero when stylus 203 is aligned with normal 510, and from FIG. 13F to FIG. 13G, the tilt of stylus 203 increases from tilt 1312-*b* to tilt 1312-*c*. In some embodiments, the tilt acts as an adjustment factor for one or more characteristics of the mark.

In some embodiments, the device detects (1422) a change in the tilt of the stylus; and, in response to detecting the change in the tilt of the stylus, adjusts the mark by increasing the width of the mark as the tilt increases. In some embodiments, adjusting the characteristics of the mark in accordance with the changes, during the input, in the plurality of characteristics of the input from the stylus includes changing the width of the mark as the tilt changes. For example, when the virtual drawing implement is a brush, adjusting one or more characteristics of the mark includes increasing the width of the mark as the tilt increases, as shown in FIGS. 13F-13G.

In some embodiments, the plurality of characteristics of the input from the stylus includes (1424) contact intensity, wherein the contact intensity is a parameter that corresponds to intensity of contact of the stylus on the touch-sensitive surface. For example, in FIGS. 13H-13J, the contact intensity of stylus 203 increases from contact intensity 1322-*a* in FIG. 13H to contact intensity 1322-*b* in FIG. 13I to contact intensity 1322-*c* in FIG. 13J. In some embodiments, contact intensity acts as an adjustment factor for one or more characteristics of the mark.

In some embodiments, the device detects (1426) a change in the contact intensity of the stylus during the input; and, in response to detecting the change in the contact intensity, adjusts the mark by increasing the opacity of the mark as the contact intensity increases. In some embodiments, adjusting the characteristics of the mark in accordance with the changes, during the input, in the plurality of characteristics of the input from the stylus includes changing the opacity of the mark as the contact intensity changes. In some embodiments, when the virtual drawing implement is a pencil, ballpoint pen or brush, adjusting one or more characteristics of the mark includes increasing the opacity of the mark as the contact intensity increases, as shown in FIGS. 13K-13L.

In some embodiments, the device detects (1428) a change in the contact intensity of the stylus; and, in response to detecting the change in the contact intensity, adjusts the mark by increasing the width of the mark as the contact intensity increases. In some embodiments, adjusting the characteristics of the mark in accordance with the changes, during the input, in the plurality of characteristics of the input from the stylus includes changing the width of the mark as the contact intensity changes. In some embodiments, when the virtual drawing implement is a pencil, pen or brush, adjusting one or more characteristics of the mark includes increasing the width of the mark as the contact intensity increases, as shown in FIGS. 13H-13J.

In some embodiments, the device detects (1430) a change in the contact intensity of the stylus; and, in response to detecting the change in the contact intensity, adjusts the mark by changing the color of the mark as the contact intensity changes. In some embodiments, adjusting the characteristics of the mark in accordance with the changes, during the input, in the plurality of characteristics of the input from the stylus includes changing the color of the mark as the contact intensity changes. In some embodiments, as the contact intensity increases, the color of the mark gradually transitions from a first color to a second color, where the color of the mark during the gradual transition includes a blend of the first color and the second color. For example, as the contact intensity increases, the color of the mark gradually transitions from red to blue (e.g., red to purple to blue), as explained above with respect to FIGS. 13H-13J.

In some embodiments, the device detects (1432) a change in one or more characteristics of the plurality of characteristics of the input from the stylus; and, in response to detecting the change in the one or more characteristics, changes the virtual drawing implement emulated by the stylus from a first virtual drawing instrument to a second virtual drawing instrument. In some embodiments, the virtual drawing implement emulated by the stylus is determined based on tilt. For example, if the tilt of the stylus is less than a predefined threshold angle (such as 10, 15, 20, or 25 degrees), the stylus emulates a virtual pen or pencil, and if the tilt of the stylus is greater than a predefined threshold angle (such as 10, 15, 20, or 25 degrees), the stylus emulates a virtual highlighter. The details of changing the virtual drawing implement emulated by the stylus from a first virtual drawing instrument to a second virtual drawing instrument are described below with respect to method 2700, and for brevity, the details are not repeated here. In some embodiments, the virtual drawing implement emulated by the stylus is determined by a gesture by the stylus (e.g., a barrel rotation gesture). In some embodiments, the virtual drawing implement emulated by the stylus is determined by an explicit selection from a displayed menu of virtual drawing instruments.

In some embodiments, while the virtual drawing implement being emulated by the stylus is a first virtual drawing implement (e.g., a pen implement), and the stylus is not actively engaged in making marks on the display (e.g., the stylus is not in contact with the touch-sensitive surface), the device detects (1434) a first change in the plurality of characteristics of the input from the stylus; in response to detecting the first change in the plurality of characteristics of the input from the stylus, the device switches from the first virtual drawing implement to a second virtual drawing implement (e.g., a highlighter implement) that is different from the first drawing implement; and while the virtual drawing implement being emulated by the stylus is the second virtual drawing implement, the device detects a second change in the plurality of characteristics of the input from the stylus (e.g., a reversal of the first change in the plurality of characteristics of the input from the stylus); and in response to detecting the second change in the plurality of characteristics of the input from the stylus: in accordance with a determination that the stylus is not actively engaged in making marks on the display (e.g., the stylus is not in contact with the touch-sensitive surface), the device switches from the second virtual drawing implement to a third virtual drawing implement (e.g., the same as the first virtual drawing implement); and in accordance with a determination that the stylus is actively engaged in making marks on the display (e.g., the stylus is in contact with the touch-sensitive surface and has moved on the touch-sensitive surface so as to cause the device to display marks from the second virtual drawing implement on the display), the device maintains selection of the second virtual drawing implement. In some embodiments, the third virtual drawing implement is the same as the first virtual drawing implement. In some embodiments, while selection of the second virtual drawing implement is maintained, one or more characteristics of the marks made by the second virtual drawing implement are adjusted in accordance with the second change in the plurality of characteristics of the input from the stylus. For example, the width of the mark made by the second virtual drawing implement changes as the directionality, tilt, and/or contact intensity of the stylus changes. Further details of switching and/or maintaining selection of a virtual drawing implement are described below with respect to method 2700, and for sake of brevity, the details are not repeated here.

In some embodiments, the device detects (1436) a change in velocity of movement of the stylus on or near the touch-sensitive surface; and, in response to detecting the change in velocity, adjusts the mark by decreasing the width of the mark as the velocity increases. In some embodiments, adjusting the characteristics of the mark in accordance with the changes, during the input, in the plurality of characteristics of the input from the stylus includes changing the width of the mark as the velocity of movement of the stylus on or near the touch-sensitive surface changes. In some embodiments, when the virtual drawing implement is a calligraphy brush, adjusting one or more characteristics of the mark includes decreasing the width of the mark as the velocity increases, as shown in FIG. 13M (e.g., by mark 1338-*a*). In some embodiments, when the virtual drawing implement is a calligraphy brush, adjusting one or more characteristics of the mark includes increasing the width of the mark as the velocity decreases, as shown in FIG. 13M (e.g., by mark 1338-*b*). Alternatively, in some embodiments, in response to the change in velocity, the mark is adjusted by increasing the width of the mark as the velocity increases or decreasing the width of the mark as the velocity decreases.

In some embodiments, the virtual drawing implement being emulated by the stylus is one of a group of virtual drawing implements, and, for each of four virtual drawing implements in the group of drawing implements, the device adjusts (1438) the width of the mark in accordance with a different characteristic of the input from the stylus. For example, for a virtual pencil, the width of the mark is adjusted in accordance with contact intensity (e.g., as shown in FIGS. 13H-13J, where the width increases as contact intensity increases); for a virtual ballpoint pen, the width of the mark is adjusted in accordance with velocity (e.g., similar to mark 1338-*a* in FIG. 13M, where the width decreases as velocity increases); for a virtual brush, the width of the mark is adjusted in accordance with tilt (e.g., as shown in FIGS. 13F-13G, where the width increases as tilt increases); and for a virtual calligraphy pen, the width of the mark is adjusted in accordance with directionality (e.g., as shown in FIGS. 13D-13E, where the width increases with a first directionality and the width decreases with a second directionality).

In some embodiments, the virtual drawing implement being emulated by the stylus is one of a group of virtual drawing implements, and, for each of two virtual drawing implements in the group of drawing implements, the device adjusts (1440) the opacity of the mark in accordance with a different characteristic of the input from the stylus. For example, for a virtual pencil, the opacity of the mark is adjusted in accordance with contact intensity (e.g., as shown in FIGS. 13K-13L, where the opacity increases as contact intensity increases); and for a virtual fine tip pen, the opacity of the mark is adjusted in accordance with velocity (e.g., where the opacity decreases as the velocity increases).

In some embodiments, the virtual drawing implement being emulated by the stylus is one of a group of virtual drawing implements, and, for each of two virtual drawing implements in the group of drawing implements, the device adjusts (1442) distinct characteristics of the mark (e.g., width, opacity, color, etc.) in response to changes in a same characteristic of the input (e.g., orientation, directionality, tilt, contact intensity, or velocity). For example, as shown in Table 1 below, for a virtual pencil, the width of the mark is adjusted in accordance with contact intensity and for either a virtual ballpoint pen or a virtual brush, the opacity of the mark is adjusted in accordance with contact intensity. As another example, for a virtual fine tip pen, the opacity of the mark is adjusted in accordance with velocity and for either a virtual ballpoint pen or a virtual calligraphy brush, the width of the mark is adjusted in accordance with velocity. Note that the relationships between input characteristics and mark characteristics for different virtual drawing implements in Table 1 are merely exemplary of possible relationships.

TABLE 1

Exemplary changes in mark characteristics (e.g., width, opacity, color) based in response to changes in input characteristics (e.g., orientation, directionality, tilt, contact intensity, or velocity) for different virtual drawing implements.

| Virtual Drawing Implement | Changes in orientation change: | Changes in directionality change: | Changes in tilt change: | Changes in contact intensity change: | Changes in velocity change: |
|---|---|---|---|---|---|
| Pencil | | | width opacity | width; | |
| Ballpoint Pen | | | | opacity | width |
| Fine Tip Pen | | | | | opacity |
| Brush | | | width | opacity | |
| Chisel Tip (eg., highlighter) | width | | | | |
| Calligraphy Pen | | width; color | | | |
| Calligraphy Brush | | | | | width |

It should be understood that the particular order in which the operations in FIGS. 14A-14E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the first paragraph of the Description of Embodiments above) are also applicable in an analogous manner to method 1400 described above with respect to FIGS. 14A-14E. For example, the stylus input characteristics (sometimes called positional state characteristics), movements, contacts, gestures, user interface objects, and outputs described above with reference to method 1400 optionally have one or more of the characteristics of the stylus input characteristics, movements, contacts, gestures, user interface objects, and outputs described herein with reference to other methods described herein (e.g., those listed in the first paragraph of the Description of Embodiments above). For brevity, these details are not repeated here.

Figure 15:
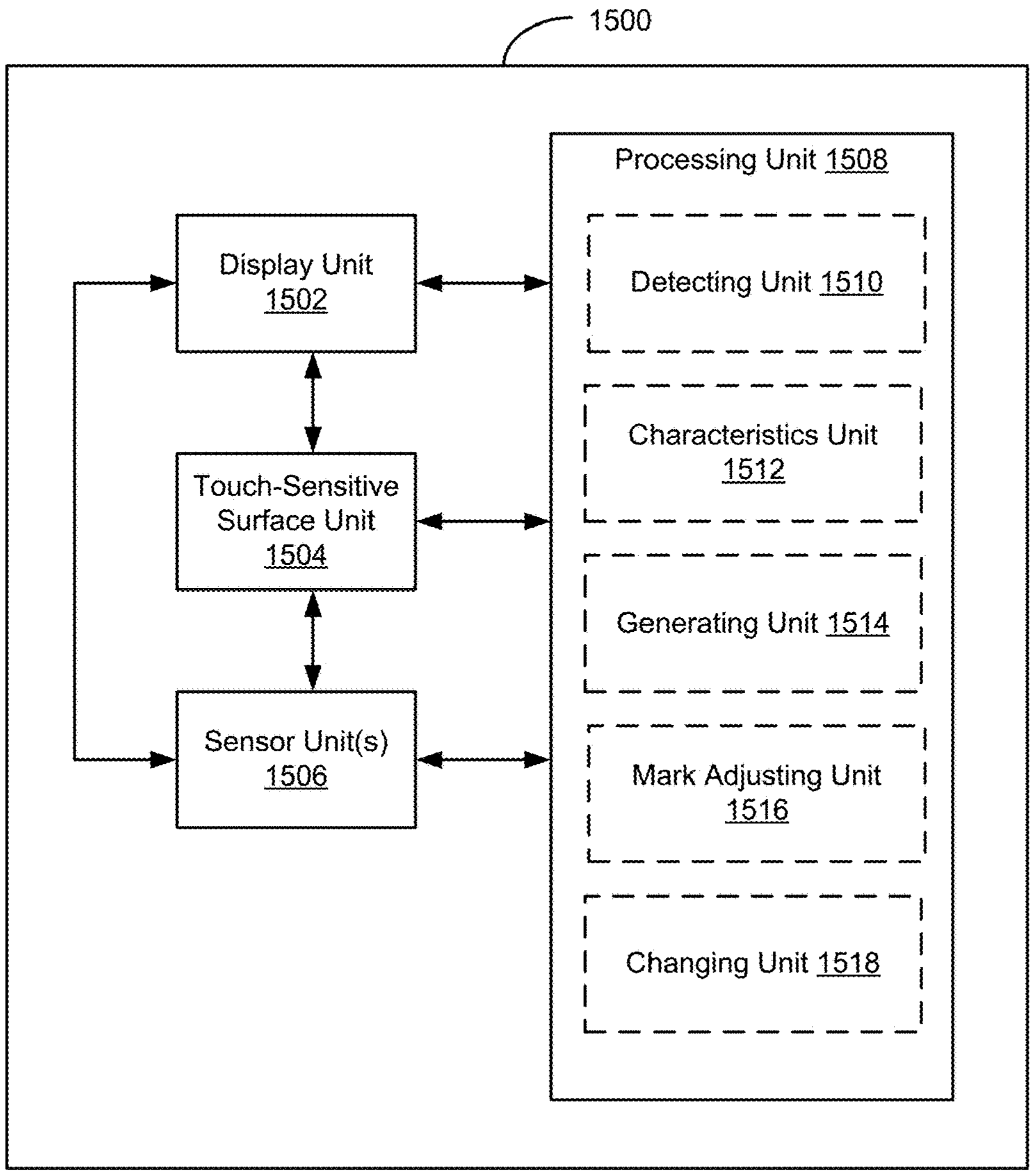
FIG. 15 is a functional block diagram of an electronic device in accordance with some embodiments.

In accordance with some embodiments, FIG. 15 shows a functional block diagram of an electronic device 1500 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 15 are, optionally, combined or separated into sub-blocks to implement the principles of the various described embodiments. Therefore, the description herein optionally supports any possible combination or separation or further definition of the functional blocks described herein.

As shown in FIG. 15, an electronic device 1500 includes a display unit 1502 configured to display a user interface; a touch-sensitive surface unit 1504 configured to receive user contacts; one or more sensor units 1506 configured to detect signals from a stylus associated with the device; and a processing unit 1508 coupled to the display unit 1502, the touch-sensitive surface unit 1504 and the one or more sensor units 1506. In some embodiments, the processing unit 1508 includes a detecting unit 1510, a characteristics unit 1512, a generating unit 1514, a mark adjusting unit 1516, and a changing unit 1518.

The processing unit 1508 is configured to: detect an input from the stylus (e.g., with the detecting unit 1510); determine a plurality of characteristics of the input from the stylus (e.g., with the characteristics unit 1512), the characteristics of the input including an orientation of the stylus relative to the touch-sensitive surface unit 1504 during the input, and a direction of movement of the stylus across the touch-sensitive surface unit 1504 during the input ("directionality"); and, in response to detecting the input from the stylus: generate a mark (e.g., with the generating unit 1514) that is displayed on the display unit 1502, the mark having characteristics that include opacity, width, and/or color; and adjust one or more characteristics of the mark (e.g., with the mark adjusting unit 1516) in accordance with a virtual drawing implement being emulated by the stylus, and changes, during the input, in the plurality of characteristics of the input from the stylus.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 14A-14E are, optionally, implemented by components depicted in FIGS. 1A-1B or FIG. 15. For example, detection operation 1402, determination operation 1404, generation operation 1410, and adjusting operation 1412 are, optionally, implemented by event sorter 170, event recognizer 180, and event handler 190. Event monitor 171 in event sorter 170 detects a contact (or near contact) on touch-sensitive display 112, and event dispatcher module 174 delivers the event information to application 136-1. A respective event recognizer 180 of application 136-1 compares the event information to respective event definitions 186, and determines whether a first contact (or near contact) at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Preparing Messages with Stylus and Finger Inputs

Disclosed herein are electronic devices with improved methods for preparing messages with stylus and finger inputs, including:

- To prepare communications more efficiently, some devices respond to an input that corresponds to a request to prepare a communication (e.g., an instant message or email) by displaying a virtual keyboard for typing a text message if the input is made with a finger, whereas the device displays a drawing canvas if the input is made with a stylus.
- To facilitate drawing on a digital image in a communication (e.g., a digital photo being drawn on and sent as an instant message), some devices respond to the selection of a particular digital image by displaying the digital image in an input area of a communication application and also displaying a color palette that contains colors for drawing on the digital image, and the colors displayed in the color palette are based on colors contained in the digital image.
- To indicate to a first user in an instant message conversation whether a second user is typing a response or drawing a response, some devices display a typed-message-preparation indicator if the second user is typing a response and display a drawn-message-preparation indicator if the second user is drawing a response.

Such methods optionally complement or replace conventional methods for preparing messages with stylus and finger inputs. Such methods reduce the number, extent, and/or nature of the inputs from a user and produce a more efficient human-machine interface. For battery-operated devices, such methods conserve power and increase the time between battery charges.

Below, FIGS. 16A-16N illustrate exemplary user interfaces for preparing messages with stylus and finger inputs in accordance with some embodiments. FIGS. 17A-17C, 18A-18B, and 19 are flow diagrams illustrating methods of preparing messages with stylus and finger inputs in accordance with some embodiments. The user interfaces in FIGS. 16A-16N are used to illustrate the processes in FIGS. 17A-17C, 18A-18B, and 19.

Although some of the examples which follow will be given with reference to inputs on a touch-screen display (where the touch-sensitive surface and the display are combined), in some embodiments, the device is an electronic device with a separate display (e.g., display 650) and a separate touch-sensitive surface (e.g., touch-sensitive surface 651). In some embodiments, the device is portable multifunction device 100, the display is touch-sensitive display system 112, and the touch-sensitive surface includes tactile output generators 163 on the display (FIG. 1A). For convenience of explanation, the embodiments described with reference to FIGS. 16A-16N and 17A-17C, 18A-18B, and 19 will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 650 and a separate touch-sensitive surface 651 in response to detecting the contacts described in FIGS. 16A-16N on the touch-sensitive surface 651 while displaying the user interfaces shown in FIGS. 16A-16N on the display 650, along with a focus selector.

FIG. 16A illustrates an exemplary user interface 1600 in a communications application (e.g., an instant messaging application) on a device associated with a first user. The user interface includes a session window 1602 that displays an instant messaging conversation 1604 between the first user and a second user. In some embodiments, instant messages 1605 from the first user are displayed in content balloons along one side of the session window in content balloons and instant messages 1606 from the second user are displayed in content balloons along an opposite side of the session window.

FIG. 16A also illustrates an exemplary typed-message-preparation indicator " . . . " 1608 that indicates to the first user that the second user is preparing a typed response (e.g., with a virtual keyboard on a device associated with the second user).

Figure 16B:
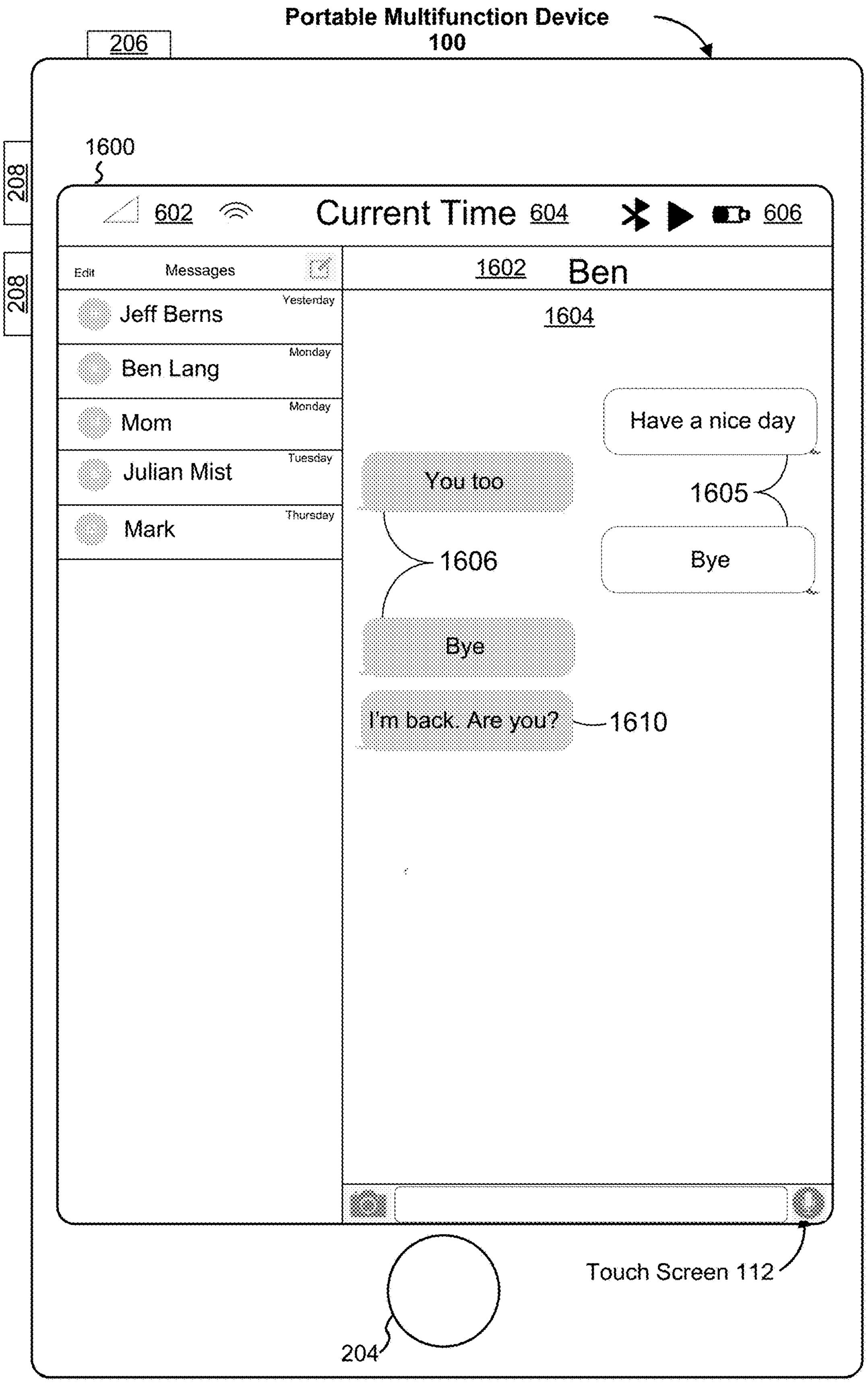

In FIG. 16B, the typed-message-preparation indicator " . . . " 1608 is replaced by a content balloon that contains the instant message 1610 (e.g., "I'm back. Are you?") prepared by the second user.

Figure 16C:
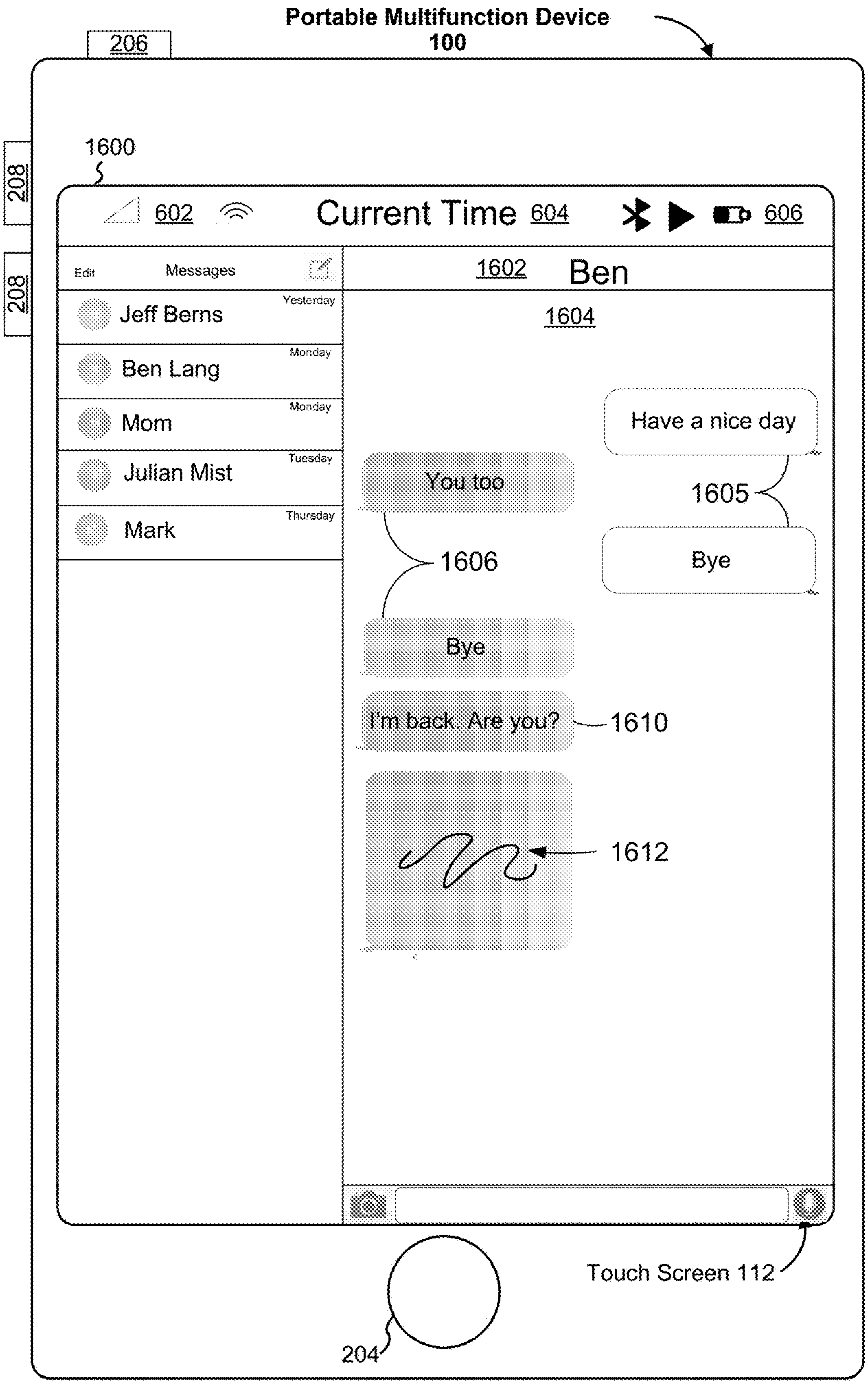

FIG. 16C illustrates an exemplary drawn-message-preparation indicator 1612 (e.g., a wavy line or other graphic) that indicates to the first user that the second user is preparing a drawn response (e.g., with a finger or stylus on a drawing canvas), rather than a typed response. In some embodiments, drawn-message-preparation indicator 1612 is animated (e.g., a looping animation).

Figure 16D:
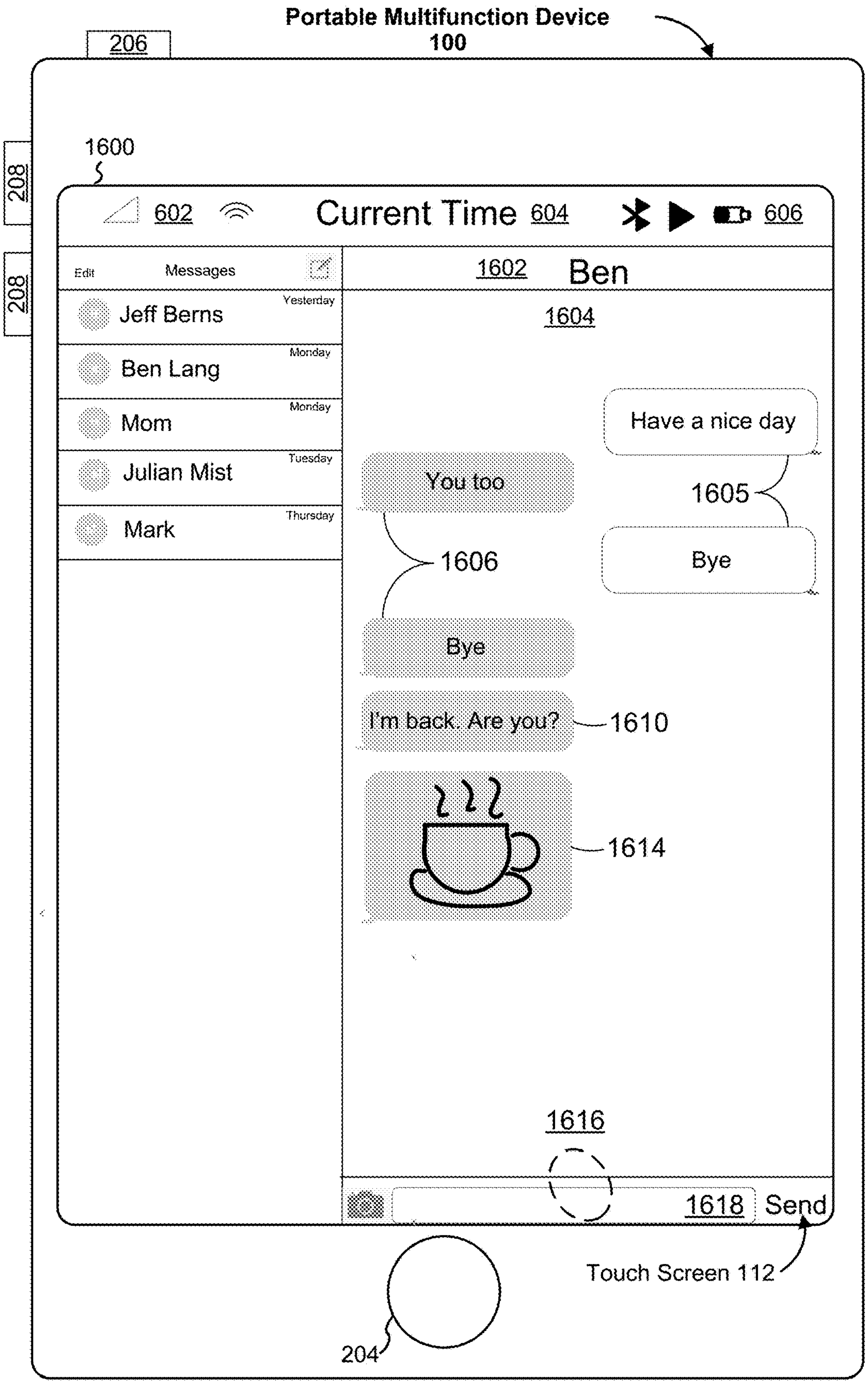

In FIG. 16D, the drawn-message-preparation indicator 1612 is replaced by a content balloon that contains the drawing 1614 (e.g., a cup of coffee) prepared by the second user.

FIG. 16D also illustrates an exemplary finger input that corresponds to a request (by the first user) to prepare a communication (e.g., a new instant message). In this example, the finger input is a gesture, such as a tap gesture, made by finger contact 1616 on typing input area 1618.

Figure 16E:
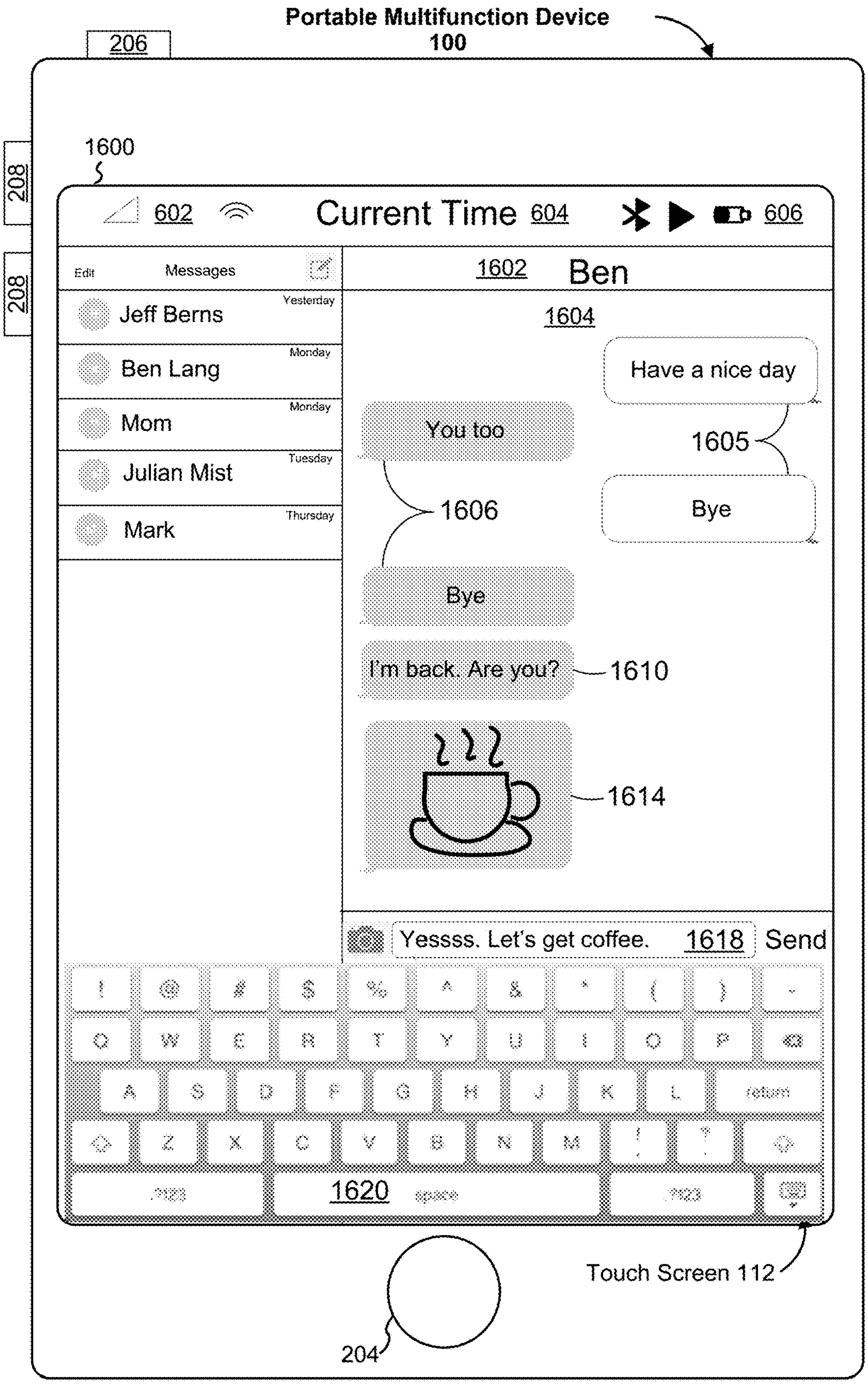

FIG. 16E illustrates that a keyboard 1620 is displayed in response to the finger input by finger contact 1616. FIG. 16E also illustrates that the first user can enter text (e.g., "Yessss. Let's get coffee.") in typing input area 1618 (e.g., with tap gestures or other finger inputs on keyboard 1620).

Figure 16F:
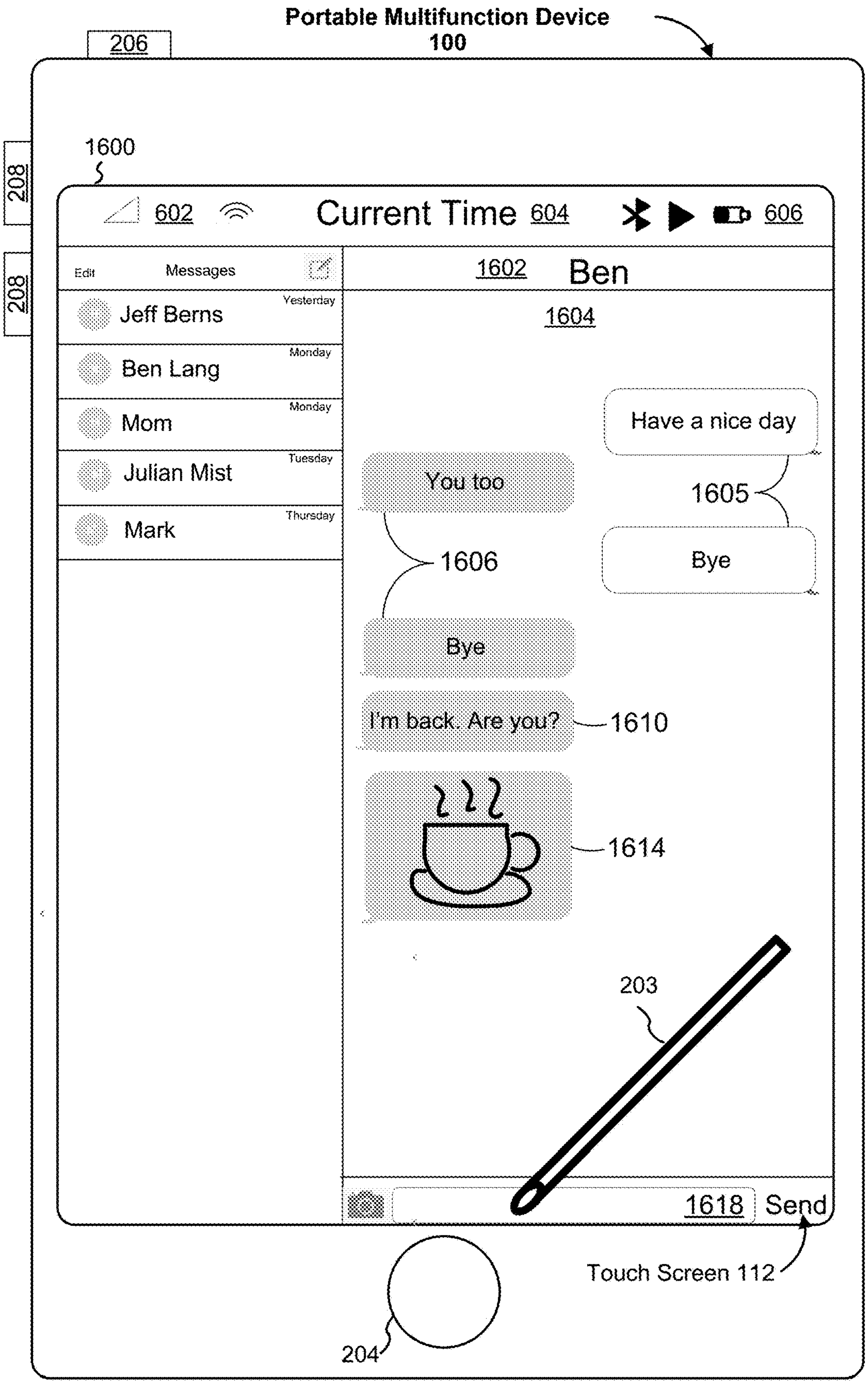

As an alternative to the finger input in FIG. 16D, FIG. 16F illustrates an exemplary stylus 203 input that corresponds to a request (by the first user) to prepare a communication (e.g., a new instant message). In this example, the stylus input is a gesture, such as a tap gesture, made by stylus 203 on typing input area 1618.

Figure 16G:
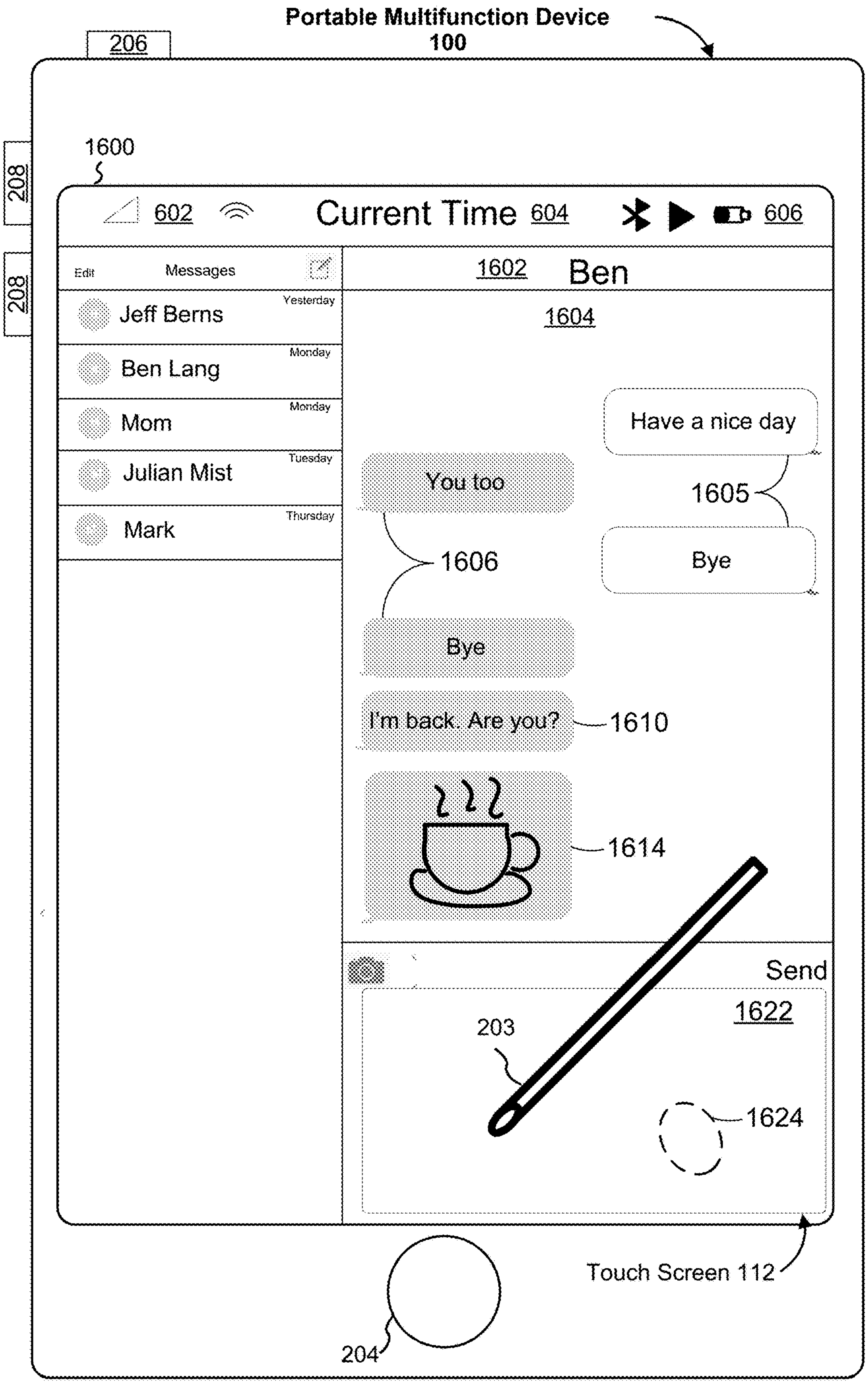

FIG. 16G illustrates that a drawing canvas 1622 is displayed in response to the stylus input (e.g., a tap gesture made by stylus 203 on typing input area 1618). The drawing canvas 1622 is larger than the typing input area 1618, to provide more area to draw with a stylus and/or finger. In some embodiments, while displaying the drawing canvas 1622, the device detects a request for typing input, such as a tap gesture, made by finger contact 1624 on drawing canvas 1622. In response to detecting the request for typing input, the device replaces display of the drawing canvas 1622 (FIG. 16G) with display of the content input region for typing input (e.g., typing input area 1618 (FIG. 16E).

Figure 16H:
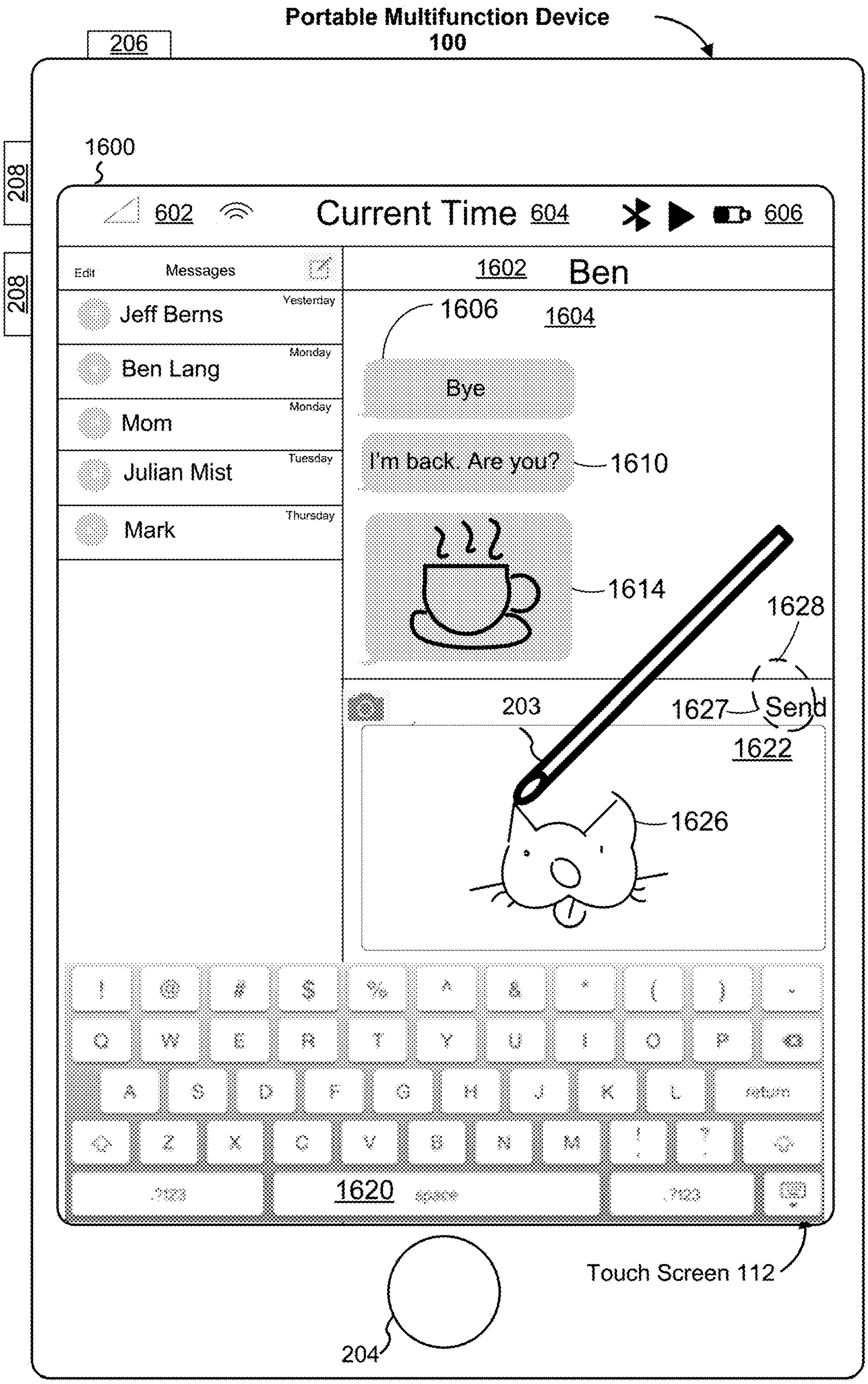

As an alternative to FIG. 16G, FIG. 16H illustrates that a drawing canvas 1622 and a keyboard 1620 are displayed in response to the stylus input that corresponds to a request (by the first user) to prepare a communication (e.g., a tap gesture made by stylus 203 on typing input area 1618, FIG. 16F).

FIG. 16H also illustrates making a drawing 1626 with marks made by the stylus 203 and detecting an input (e.g., a gesture, such as a tap gesture, made by a stylus or finger contact 1628 on send button 1627) that corresponds to a request to send the drawing 1626 as an instant message.

Figure 16I:
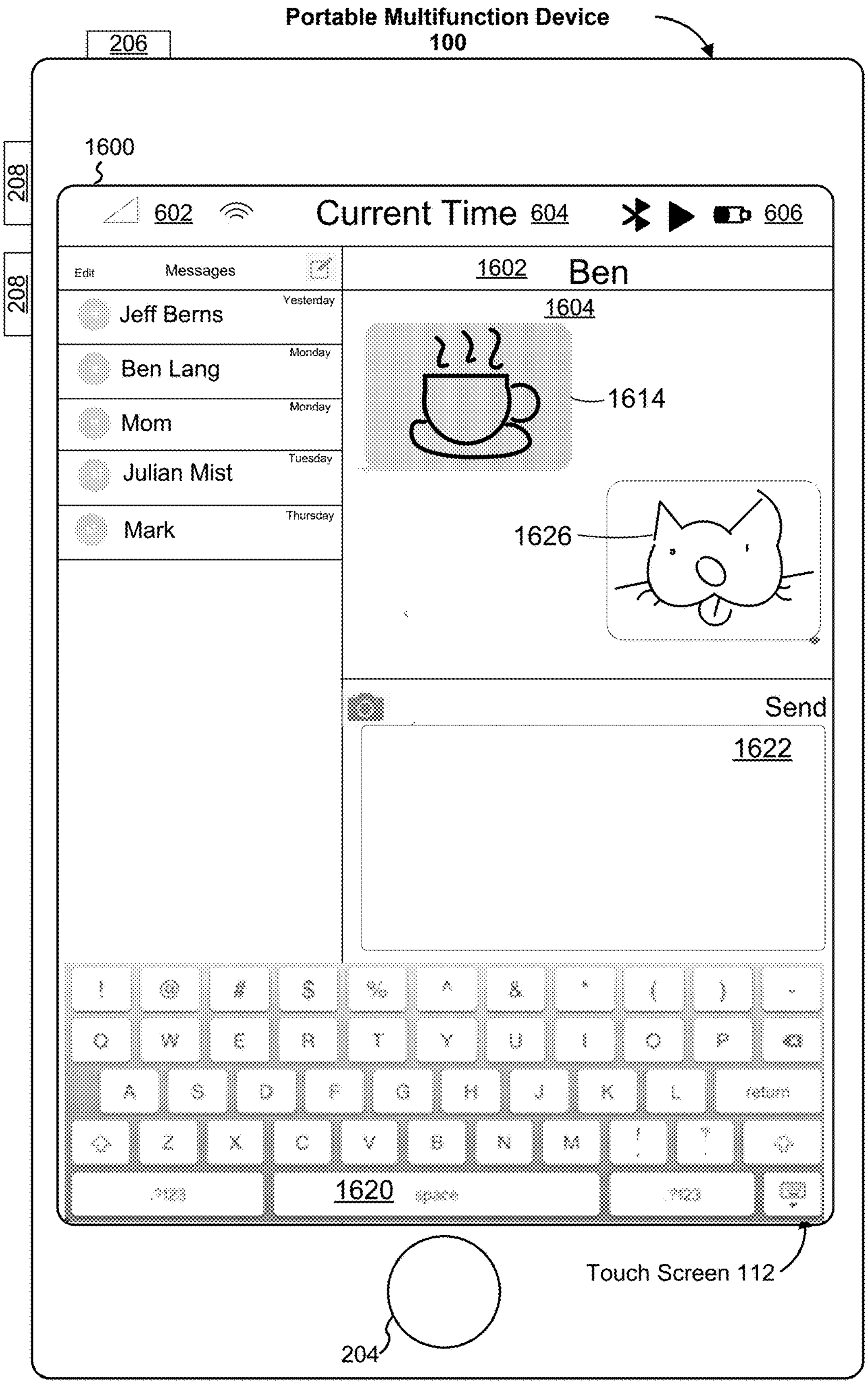

FIG. 16I illustrates sending the drawing 1626 and maintaining display of the drawing canvas 1622 in response to detecting the input that corresponds to a request to send the drawing.

Figure 16J:
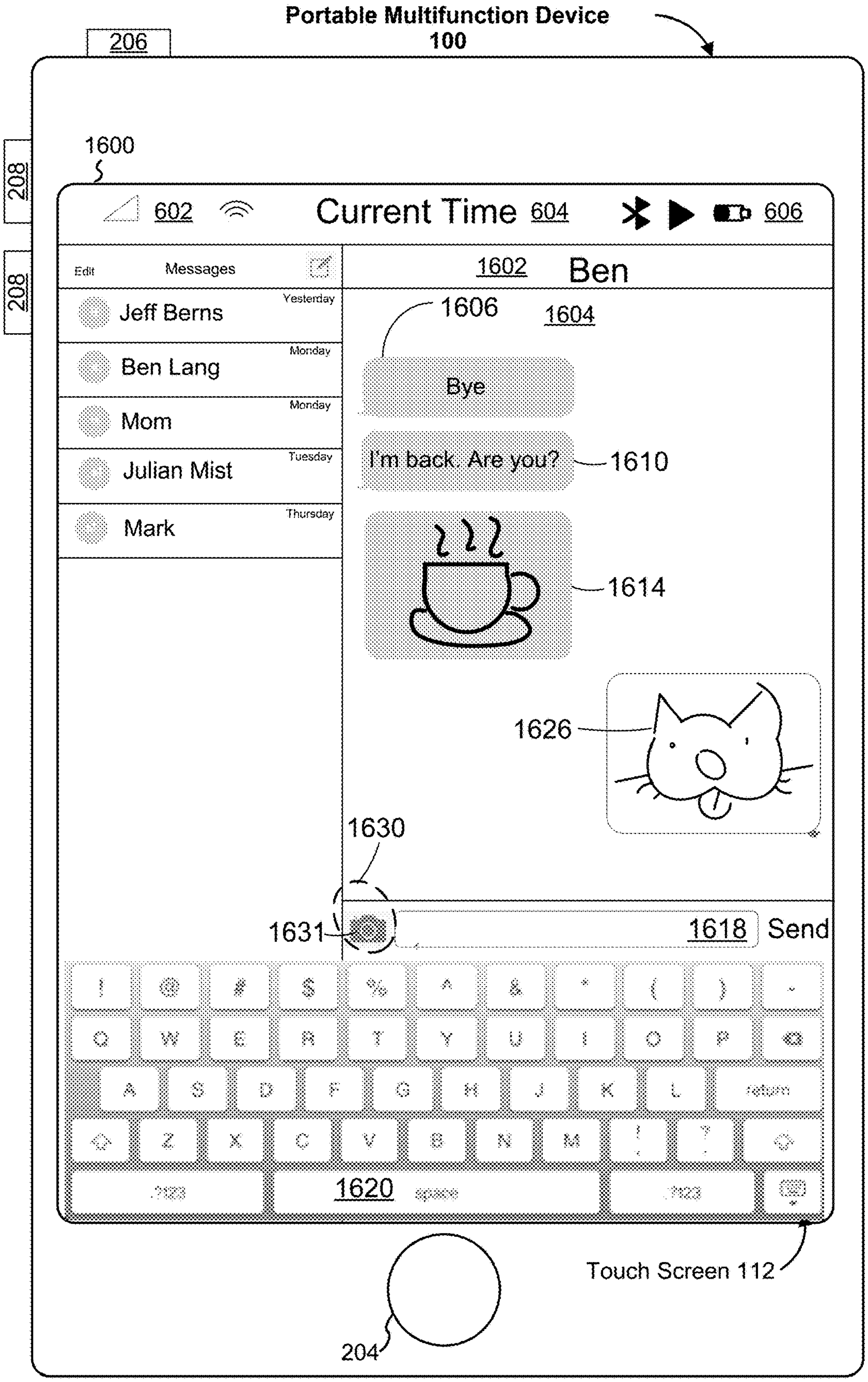

As an alternative to FIG. 16I, FIG. 16J illustrates sending the drawing 1626 and ceasing to display the drawing canvas in response to detecting the input that corresponds to a request to send the drawing. In FIG. 16J, the drawing canvas 1622 is replaced by the typing input area 1618.

Figure 16K:
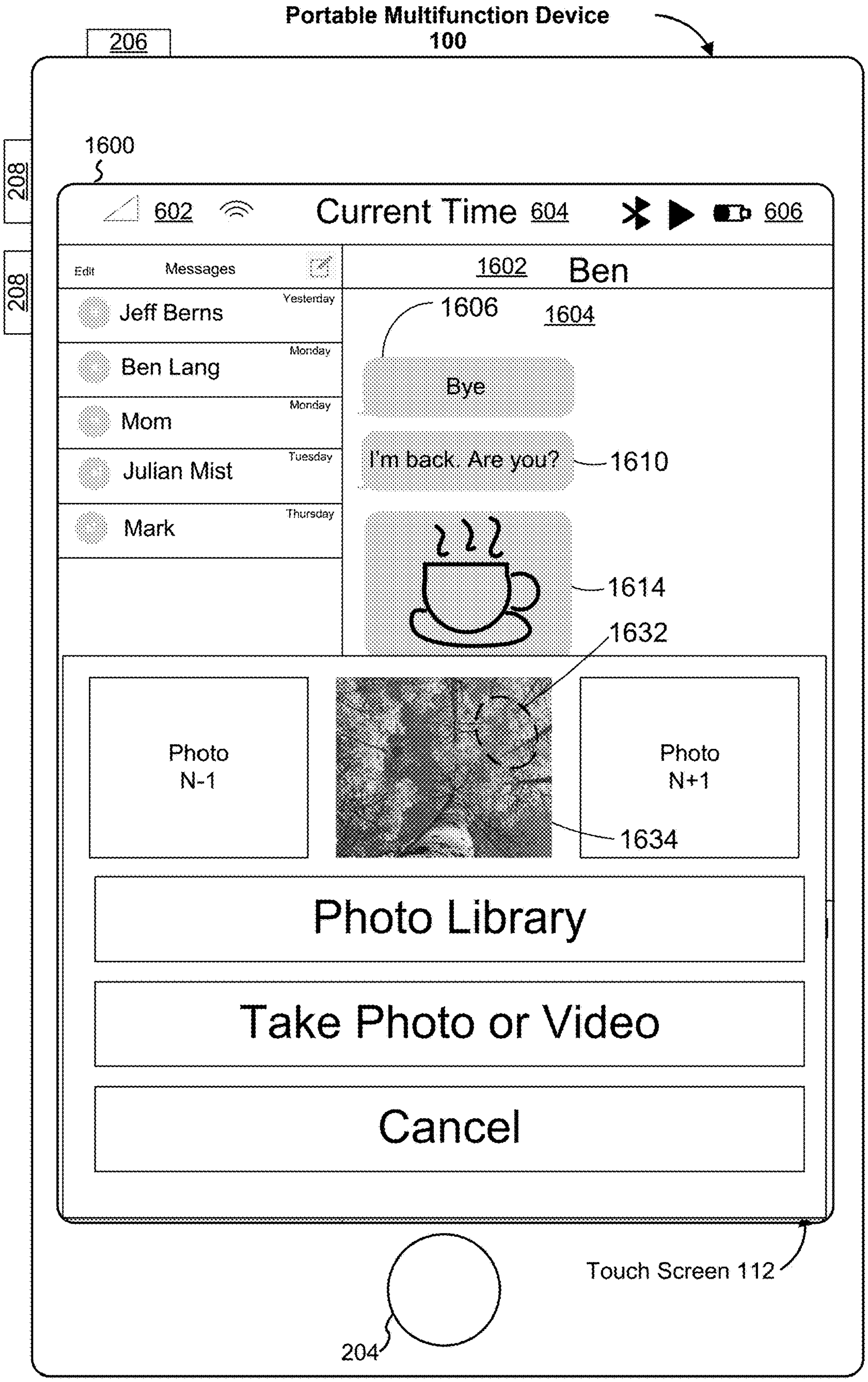

FIGS. 16J-16K illustrate an exemplary way to select a digital image for use in an instant message. FIG. 16J illustrates detecting an input (e.g., a gesture, such as a tap gesture, made by a stylus or finger contact 1630 on photo icon 1631) that corresponds to a request to enter an image selection mode. FIG. 16K illustrates display of an exemplary user interface for selecting a digital image. In some embodiments, there are additional user interfaces (not shown) for selecting a digital image in the image selection mode. FIG. 16K also illustrates detecting selection of a digital image (e.g., detecting a gesture, such as a tap gesture, made by a stylus or finger contact 1632 on photo 1634). The digital image 1634 is a color image that includes a plurality of colors (which are represented by different shades of gray in image 1634).

Figure 16L:
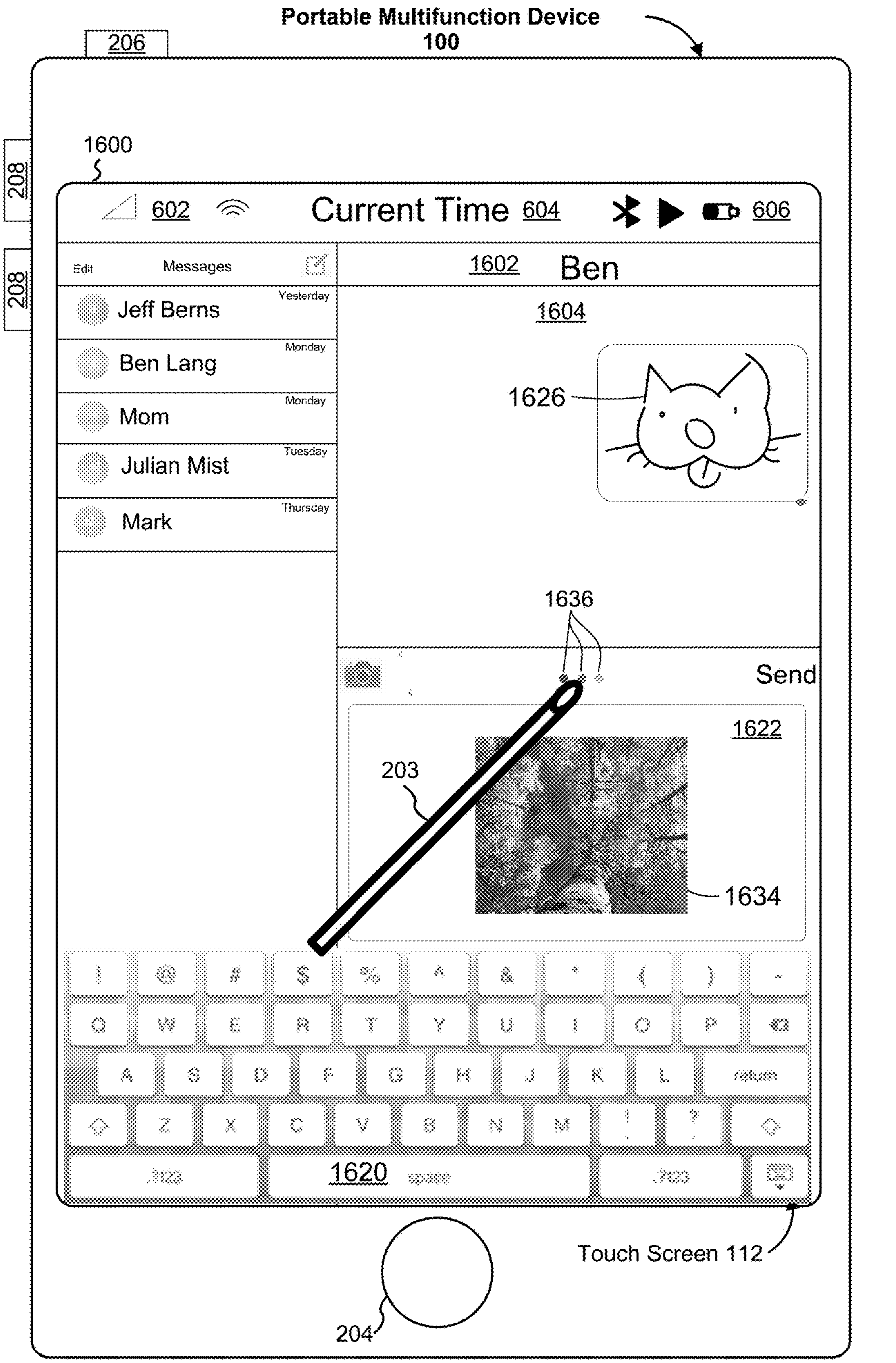

FIG. 16L illustrates responding to the selection of a digital image 1634 by displaying the digital image in an input area (e.g., drawing canvas 1622) of a communication application and also displaying a color palette 1636 that contains colors for drawing on the digital image 1634. The colors displayed in the color palette 1636 are based on colors contained in the digital image 1634. FIG. 16L also illustrates an input that selects one of the colors in palette 1636 (e.g., a tap gesture by stylus 203 on one of the colors in palette 1636).

Figure 16M:
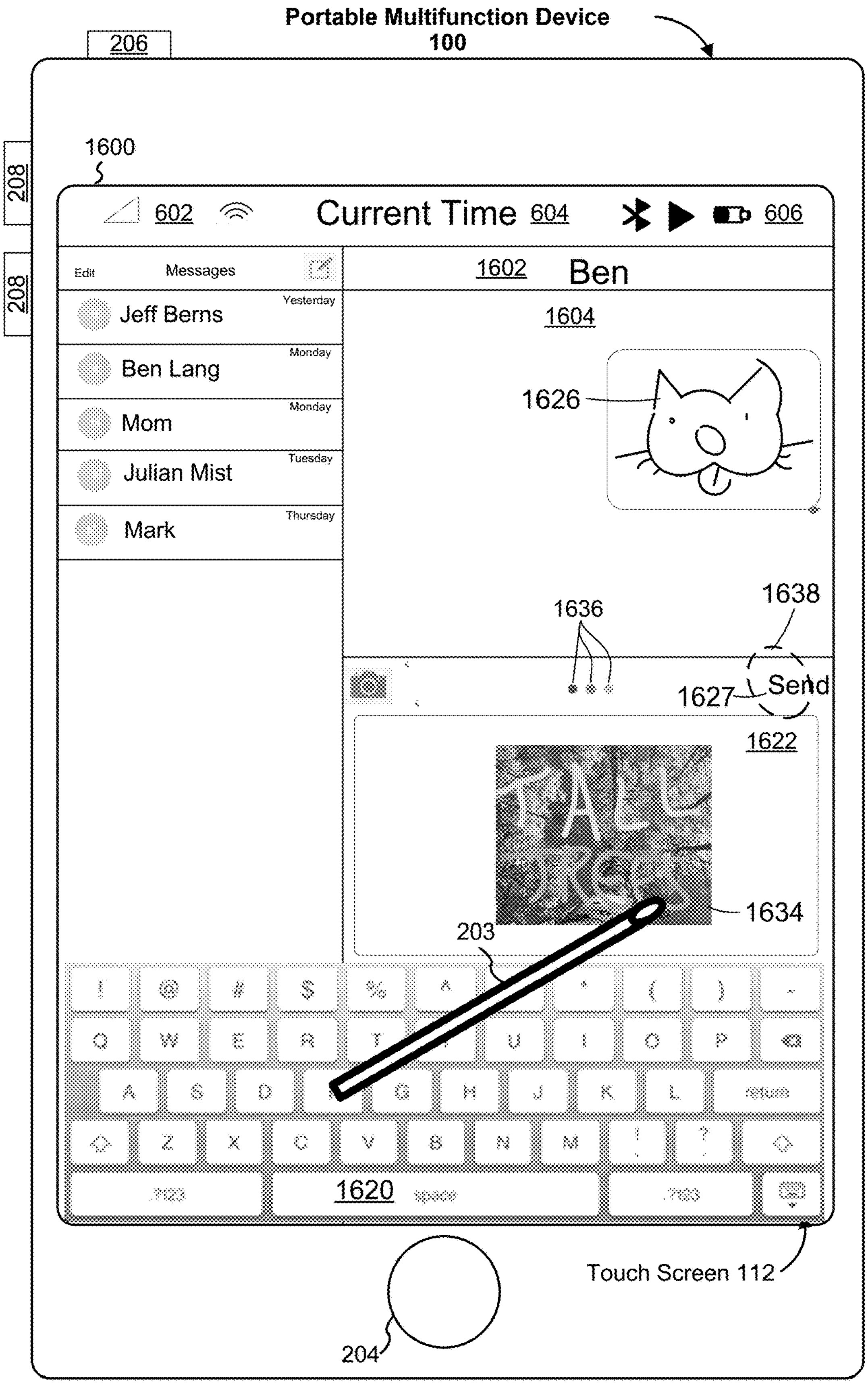
Figure 16N:
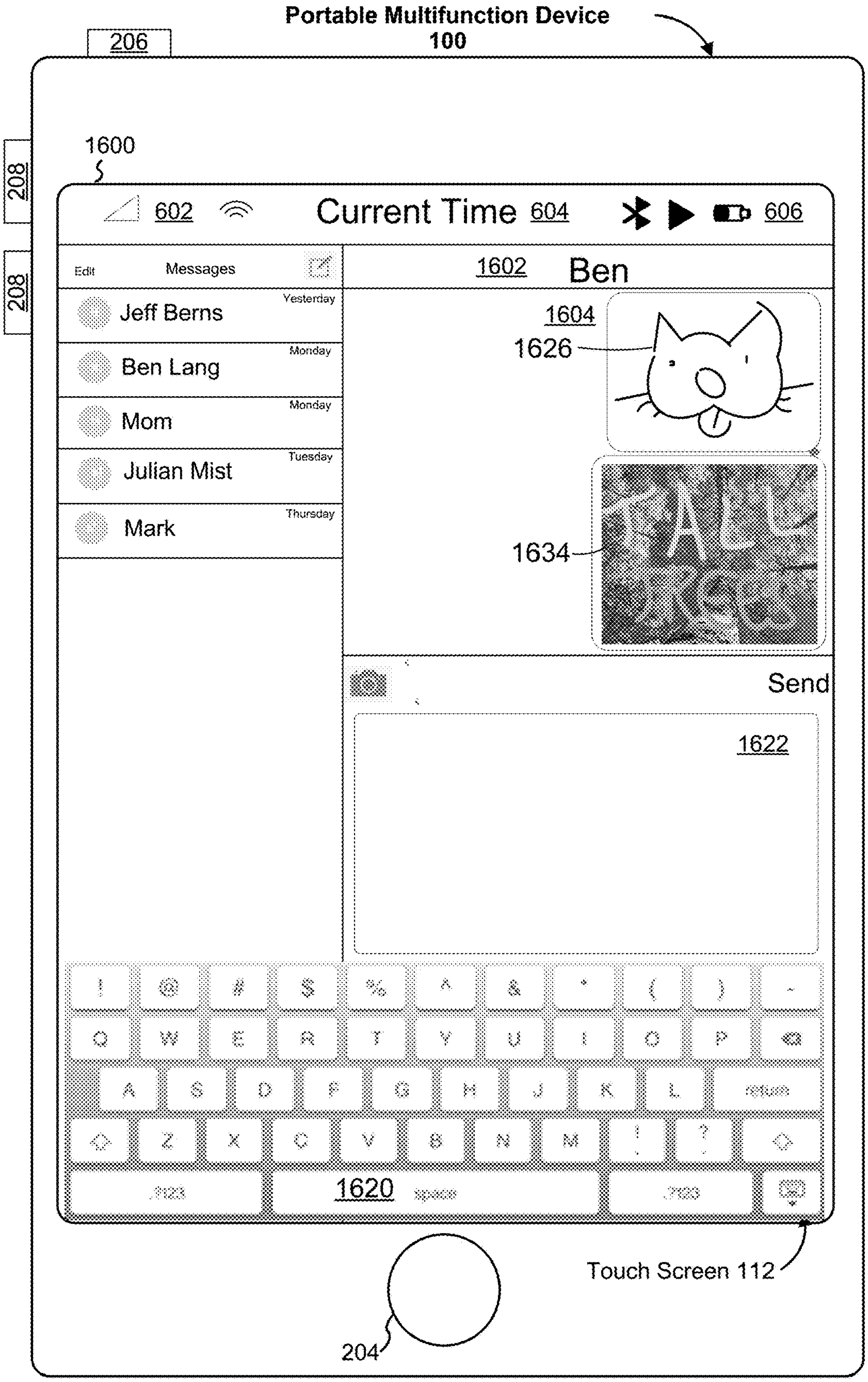

FIG. 16M illustrates drawing inputs on image 1634 that draw with colors from the palette 1636. For example, stylus inputs are used to draw "Tall" with one color from palette 1636 and "Trees" with another color from palette 1636. FIG. 16M also illustrates detecting an input (e.g., a gesture, such as a tap gesture, made by a stylus or finger contact 1638 on send button 1627) that corresponds to a request to send the image as drawn upon 1634 as an instant message.

FIG. 16N illustrates sending the image as drawn upon 1634, displaying the image as drawn upon 1634 as an instant message in the instant message conversation 1604, and ceasing to display the color palette 1636 in response to detecting the input that corresponds to a request to send the image.

Figure 17A:
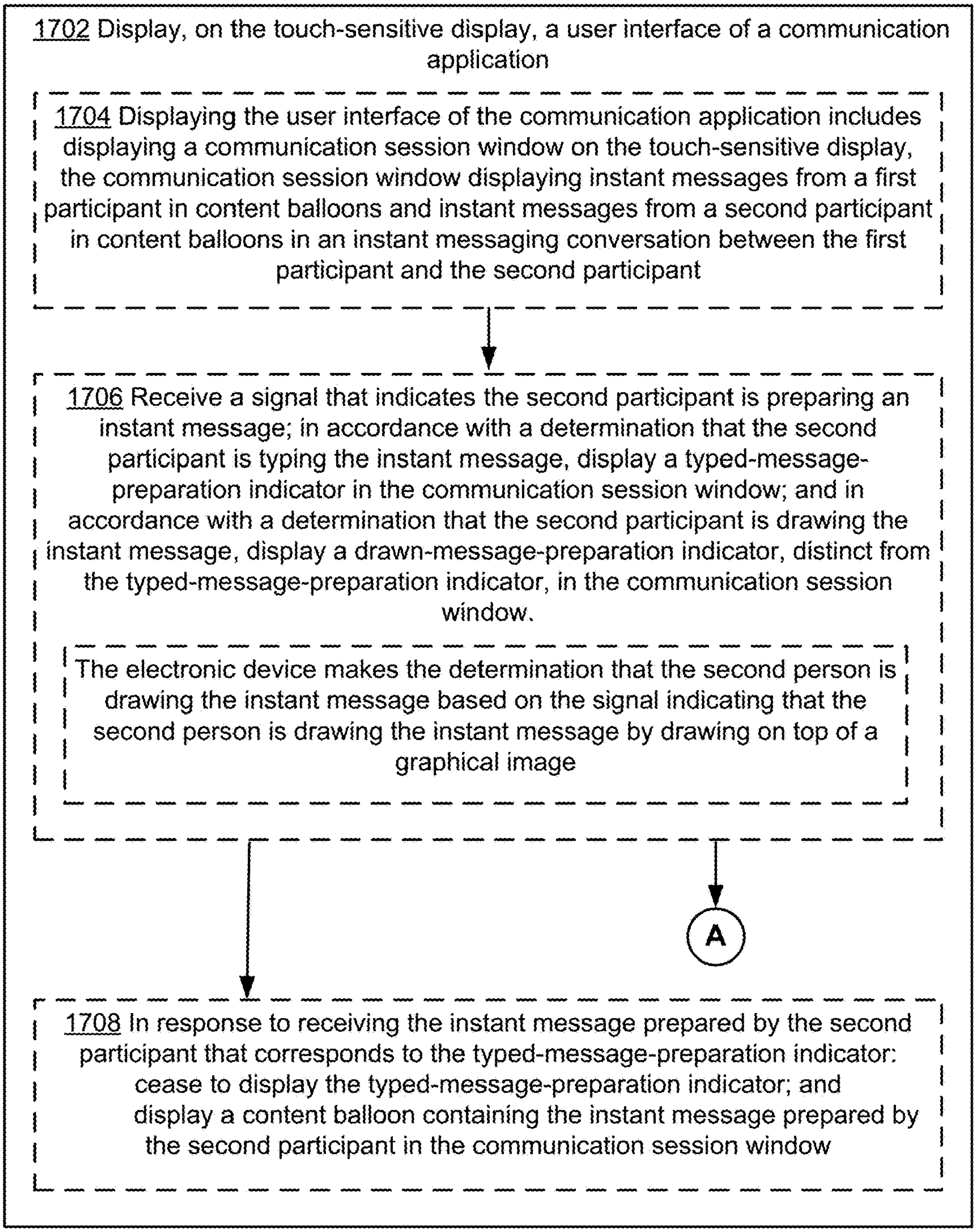
Figure 17B:
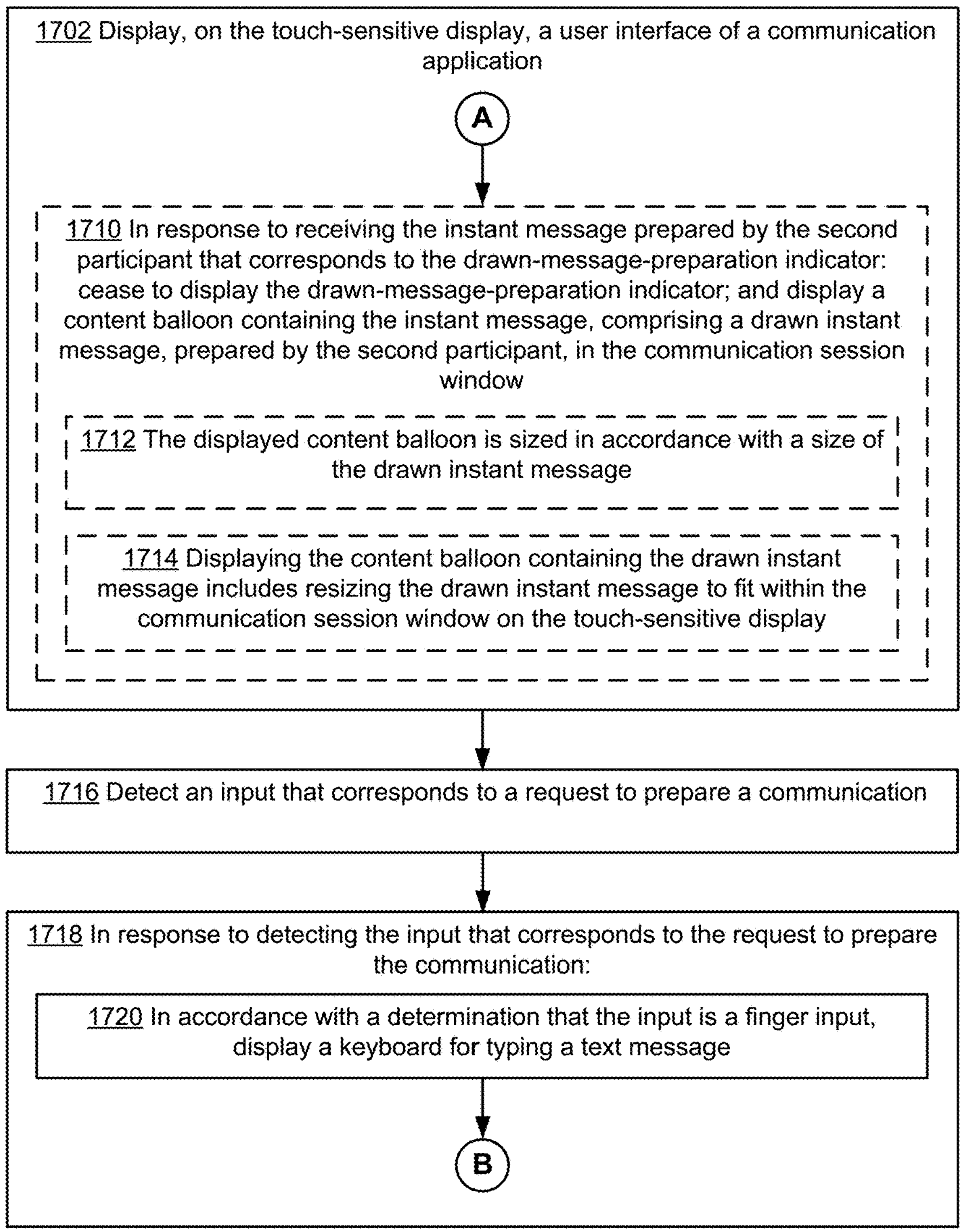

The FIGS. 17A-17C, are flow diagrams illustrating a method 1700 for preparing messages with stylus and finger inputs in accordance with some embodiments. The method 1700 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is separate from the touch-sensitive surface. The device includes one or more sensors to detect signals from a stylus associated with the device. Some operations in method 1700 are, optionally, combined and/or the order of some operations is, optionally, changed.

As described below, the method 1700 prepares communications more efficiently, by having the device respond to an input that corresponds to a request to prepare a communication (e.g., an instant message or email) by displaying a virtual keyboard for typing a text message if the input is made with a finger, whereas the device displays a drawing canvas if the input is made with a stylus. The device displays the appropriate input tools for preparing the communication based on whether the request is made with a finger input or a stylus input. The method reduces the number, extent, and/or nature of the inputs from a user when preparing messages with stylus and finger inputs, thereby creating a more efficient human-machine interface. For battery-operated electronic devices, enabling a user to enter messages with stylus and finger inputs faster and more efficiently conserves power and increases the time between battery charges.

The device displays (1702), on the touch-sensitive display, a user interface of a communication application. In some embodiments, the communication application is an instant message application (e.g., FIG. 16A). In some embodiments, the communication application is an email application.

In some embodiments, displaying the user interface of the communication application includes displaying (1704) a communication session window (e.g., window 1602) on the touch-sensitive display, the communication session window displaying instant messages from a first participant (e.g., messages 1605) in content balloons and instant messages from a second participant (e.g., messages 1606) in content balloons in an instant messaging conversation (e.g., conversation 1604) between the first participant and the second participant. In some embodiments, instant messages in the instant messaging session are displayed vertically in the communication session window based on a time order in which the instant messages are received. In some embodiments, instant messages from the first participant are displayed in a first side (e.g., right side) of the communication session window and instant messages from the second participant are displayed in a second side (e.g., left side) of the communication session window.

In some embodiments, the device receives (1706) a signal that indicates the second participant is preparing an instant message; in accordance with a determination that the second participant is typing the instant message (e.g., using a keyboard), the device displays a typed-message-preparation indicator in the communication session window (e.g., typed-message-preparation indicator 1608, FIG. 16A). In some embodiments, the typed message preparation indicator is displayed in the second side (e.g., left side) region of the communication session window. In some embodiments, a vertical position of the typed message preparation indicator in the second side region is based on a time that the typed message preparation indicator was created. In accordance with a determination that the second participant is drawing the instant message (e.g., using the stylus), the device displays a drawn-message-preparation indicator, distinct from the typed-message-preparation indicator, in the communication session window (e.g., drawn-message-preparation indicator 1612, FIG. 16C). In some embodiments, the drawn message preparation indicator is displayed in the second side (e.g., left side) region of the communication session window. In some embodiments, a vertical position of the drawn message preparation indicator in the second side region is based on a time that the drawn message preparation indicator was created.

In some embodiments, in response to receiving the instant message prepared by the second participant that corresponds to the typed-message-preparation indicator: the device ceases (1708) to display the typed-message-preparation indicator; and displays a content balloon containing the instant message prepared by the second participant in the communication session window. For example, in response to receiving the instant message prepared by the second participant that corresponds to the typed-message-preparation indicator, the device ceases to display the typed-message-preparation indicator 1608 (FIG. 16A), and displays a content balloon containing the instant message 1610 (FIG. 16B) prepared by the second participant in the communication session window.

In some embodiments, in response to receiving the instant message prepared by the second participant that corresponds to the drawn-message-preparation indicator: the device ceases (1710) to display the drawn-message-preparation indicator; and displays a content balloon containing the instant message, comprising a drawn instant message, prepared by the second participant, in the communication session window. For example, in response to receiving the instant message prepared by the second participant that corresponds to the drawn-message-preparation indicator, the device ceases to display the drawn-message-preparation indicator 1612 (FIG. 16C), and displays a content balloon containing the instant message 1614 (FIG. 16D), comprising a drawn instant message, prepared by the second participant, in the communication session window.

In some embodiments, the displayed content balloon is sized (1712) in accordance with a size of the drawn instant message (e.g., when the drawn instant message is sent, the drawing canvas in the displayed content balloon is cropped to fit the drawn content). In some embodiments, the drawn instant message is resized to fit the content balloon/region in which it will be displayed on the sender side.

In some embodiments, displaying the content balloon containing the drawn instant message includes resizing (1714) the drawn instant message to fit within the communication session window on the touch-sensitive display.

The device detects (1716) an input that corresponds to a request to prepare a communication. In some embodiments, a content input region (e.g., a typing input area) is already displayed prior to detecting the input. In some embodiments, the input that corresponds to the request to initiate the communication causes a content input region to be displayed.

In response to detecting the input that corresponds to the request to prepare the communication (1718): in accordance with a determination that the input is a finger input (e.g., finger input 1616, FIG. 16D), the device displays (1720) a keyboard (e.g., keyboard 1620, FIG. 16E) for typing a text message (e.g., an instant message with text); and, in accordance with a determination that the input is a stylus input (e.g., a tap input by stylus 203 in FIG. 16F), the device displays (1722) a drawing canvas (e.g., canvas 1622, FIG. 16G) for creating a drawn message (e.g., an instant message with a drawing). In some embodiments, the drawing canvas is configured to accept free form input from the stylus. In some embodiments, the drawing canvas is displayed without displaying a keyboard in response to detecting the input that corresponds to the request to prepare the communication (FIG. 16G). In some embodiments, one or more drawing tools, such as a color palette 1636, are displayed with the drawing canvas.

In some embodiments, the input that corresponds to the request to prepare the communication occurs in (is located in) a displayed typing input area with a first size in the user interface of the communication application (e.g., typing input area 1618, FIGS. 16D and 16F); the drawing canvas has a second size that is larger than the typing input area with the first size; and, in accordance with the determination that the input is a stylus input, the drawing canvas with the second size replaces (1724) the typing input area with the first size (e.g., as shown in FIGS. 16F-16H). In some embodiments, in accordance with the determination that the input is a stylus input, an animation is displayed that transitions the typing input area with the first size to the drawing canvas with the second size (e.g., from typing input area 1618, FIG. 16F, to drawing canvas 1622 in FIG. 16G).

In some embodiments, in accordance with the determination that the input is a finger input, display of the typing input area with the first size is maintained (1726). For example, the display of typing input area 1618 is maintained from FIG. 16D to FIG. 16E in response to finger input 1616.

In some embodiments, the drawing canvas is larger (1728) than an initial size of a content input region for typing input. For example, drawing canvas 1622 (FIG. 16G) is larger than typing input area 1618 (FIG. 16F). In some embodiments, the device displays a smooth animated transition from typing content input region 1618 (FIG. 16F) to drawing canvas 1622 (FIG. 16G). In some embodiments, the device displays a smooth transition from drawing canvas 1622 (FIG. 16G) to typing content input region 1618 (FIG. 16E) in response to detecting a finger gesture in drawing canvas 1622 (e.g., a tap gesture with finger contact 1624, FIG. 16G) or other user input.

In some embodiments, while displaying the drawing canvas for creating the drawn message (e.g., as shown in FIG. 16G), the device detects (1730) a request for typing input (e.g., a tap gesture with finger contact 1624, FIG. 16G); and, in response to detecting the request for typing input, the device replaces display of the drawing canvas with display of the content input region for typing input, and optionally, also displays the keyboard for composing the typed message (e.g., as shown in FIG. 16E).

In some embodiments, while displaying the drawing canvas, the device displays (1732) a drawing with one or more marks made in accordance with one or more stylus inputs (e.g., drawing 1626, FIG. 16H); and, in response to detecting an input that corresponds to a request to send the drawing (e.g., finger input 1628 on send button 1627), the device sends the drawing and ceases to display the drawing canvas (e.g., as shown in FIG. 16J). In some embodiments, display of the drawing canvas is replaced by display of a typing input area that is smaller than the drawing canvas (e.g., drawing canvas 1622, FIG. 16H, is replaced by typing input area 1618, FIG. 16J). In some embodiments, display of the drawing canvas is maintained when the drawing is sent (e.g., as shown in FIG. 16I).

In some embodiments, the device inserts (1734) a digital image in the drawing canvas, and displays a custom palette of colors, the custom palette of colors based on colors of the digital image, for drawing on the digital image (e.g., as shown in FIGS. 16K-16L). In some embodiments, touch down of stylus after inserting the digital image triggers the display of the custom palette of colors. In some embodiments, the custom color palette is displayed in response to selecting the digital image with a stylus input (e.g., using a stylus tap gesture instead of finger input 1632 in FIG. 16K), whereas the custom color palette is not displayed in response to selecting the digital image with a finger input.

It should be understood that the particular order in which the operations in FIGS. 17A-17C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the first paragraph of the Description of Embodiments above) are also applicable in an analogous manner to method 1700 described above with respect to FIGS. 17A-17C. For example, contacts, gestures, and animations described above with reference to method 1700 optionally have one or more of the characteristics of contacts, gestures, and animations described herein with reference to other methods described herein (e.g., those listed in the first paragraph of the Description of Embodiments above). For brevity, these details are not repeated here.

Figure 18A:
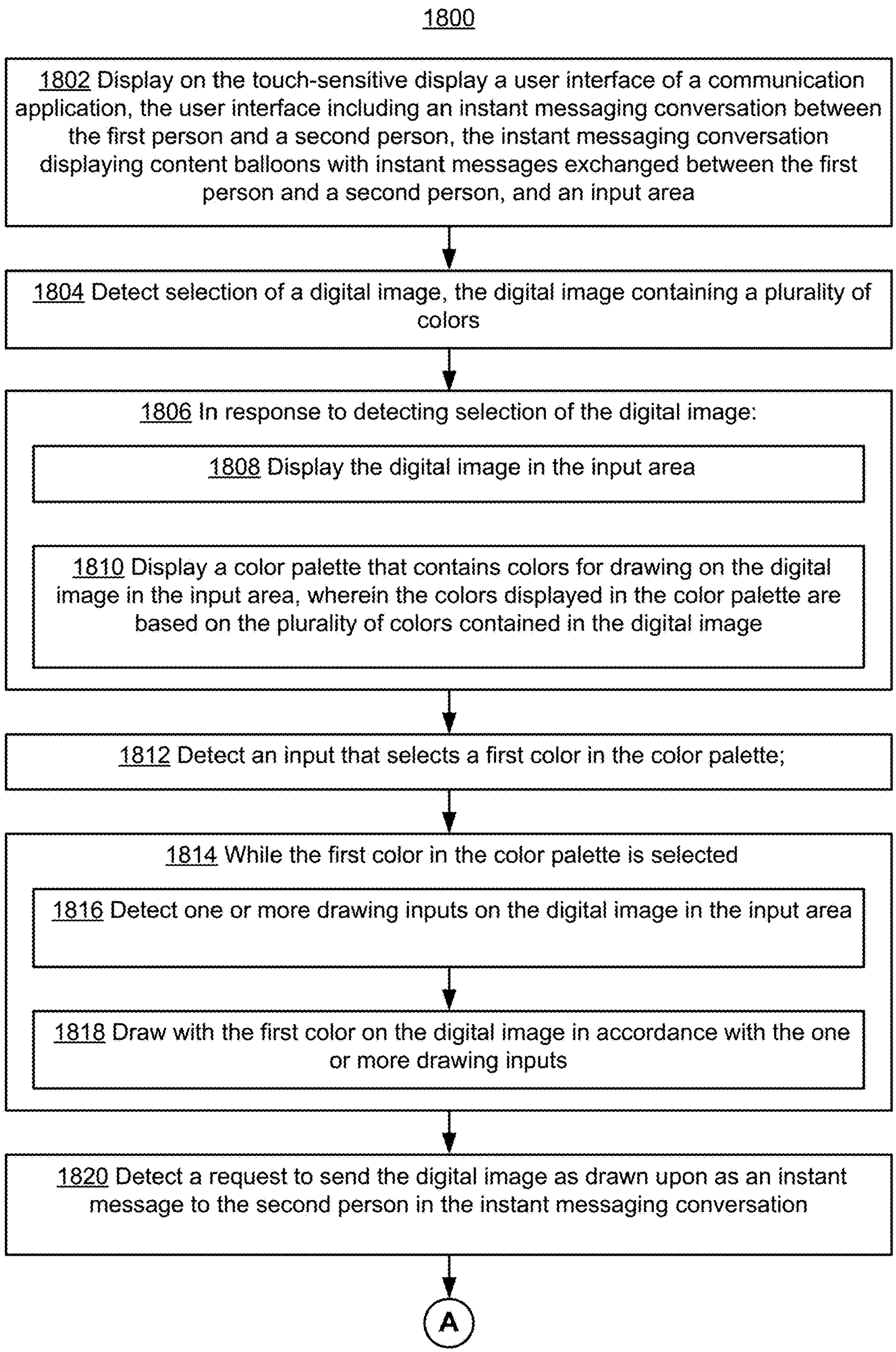

FIGS. 18A-18B are flow diagrams illustrating a method 1800 for preparing messages with stylus and finger inputs in accordance with some embodiments. The method 1800 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is separate from the touch-sensitive surface. In some embodiments, the device includes one or more sensors to detect signals from a stylus associated with the device. Some operations in method 1800 are, optionally, combined and/or the order of some operations is, optionally, changed.

As described below, the method 1800 provides a way to facilitate drawing on a digital image in a communication (e.g., a digital photo being drawn on and sent as an instant message). A device responds to the selection of a particular digital image by displaying the digital image in an input area of a communication application and also displaying a color palette that contains colors for drawing on the digital image. The colors displayed in the color palette are based on colors contained in the digital image. Thus a user can immediately start drawing on a selected digital image using colors that are tailored to the digital image. The method reduces the number, extent, and/or nature of the inputs from a user when preparing messages with stylus and finger inputs, thereby creating a more efficient human-machine interface. For battery-operated electronic devices, enabling a user to enter drawn messages with stylus and finger inputs faster and more efficiently conserves power and increases the time between battery charges.

The device, which is associated with a first person, displays (1802) on the touch-sensitive display a user interface of a communication application. The user interface includes an instant messaging conversation between the first person and a second person, the instant messaging conversation displaying content balloons with instant messages exchanged between the first person and a second person, and an input area (e.g., as shown in FIG. 16A and FIG. 16J).

The device detects (1804) selection of a digital image. The digital image containing a plurality of colors. For example, FIG. 16K illustrates selection of image 1634 with finger input 1632.

In response to detecting selection of the digital image (1806), the device displays (1808) the digital image in the input area and displays (1810) a color palette that contains colors for drawing on the digital image in the input area. For example, in response to detecting selection of the digital image 1634 (FIG. 16K), the device displays the digital image 1634 in drawing canvas 1622 and displays color palette 1636 that contains colors for drawing on the digital image in the input area, as shown in FIG. 16L. The colors displayed in the color palette are based on the plurality of colors contained in the digital image (e.g., the colors in the palette are selected and/or derived from a subset of the colors in the image, such as the N-most frequently appearing colors in the digital image (where N is an integer).

The device detects (1812) an input that selects a first color in the color palette (e.g., detecting a tap by a stylus or a finger on the first color in the color palette, as shown in FIG. 16L).

While the first color in the color palette is selected (1814), the device detects (1816) one or more drawing inputs on the digital image in the input area (e.g., detecting gestures made by a stylus or a finger on the digital image in the input area), and draws (1818) with the first color on the digital image in accordance with the one or more drawing inputs (e.g., as shown in FIG. 16M).

The device detects (1820) a request to send the digital image as drawn upon as an instant message to the second person in the instant messaging conversation (e.g., detecting a tap by a stylus or a finger 1638 on the send button 1627 in FIG. 16M).

In response to detecting the request to send the digital image as drawn upon as an instant message (1822): the device sends (1824) the digital image as drawn upon as an instant message to the second person in the instant messaging conversation, and displays (1826), on the touch-sensitive display, the digital image as drawn upon as an instant message in the instant messaging conversation (e.g., as shown in FIG. 16N).

In some embodiments, in response to detecting the request to send the digital image as drawn upon as an instant message, the device ceases (1828) to display the color palette that contains colors for drawing on the digital image in the input area that are based on the plurality of colors contained in the digital image. For example, in FIG. 16N, the color palette with colors based on the contained in the digital image is no longer displayed after the digital image is sent.

It should be understood that the particular order in which the operations in FIGS. 18A-18B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the first paragraph of the Description of Embodiments above) are also applicable in an analogous manner to method 1800 described above with respect to FIGS. 18A-18B. For example, movements, contacts, gestures, and animations described above with reference to method 1800 optionally have one or more of the characteristics of movements, contacts, gestures, and animations described herein with reference to other methods described herein (e.g., those listed in the first paragraph of the Description of Embodiments above). For brevity, these details are not repeated here.

Figure 19:
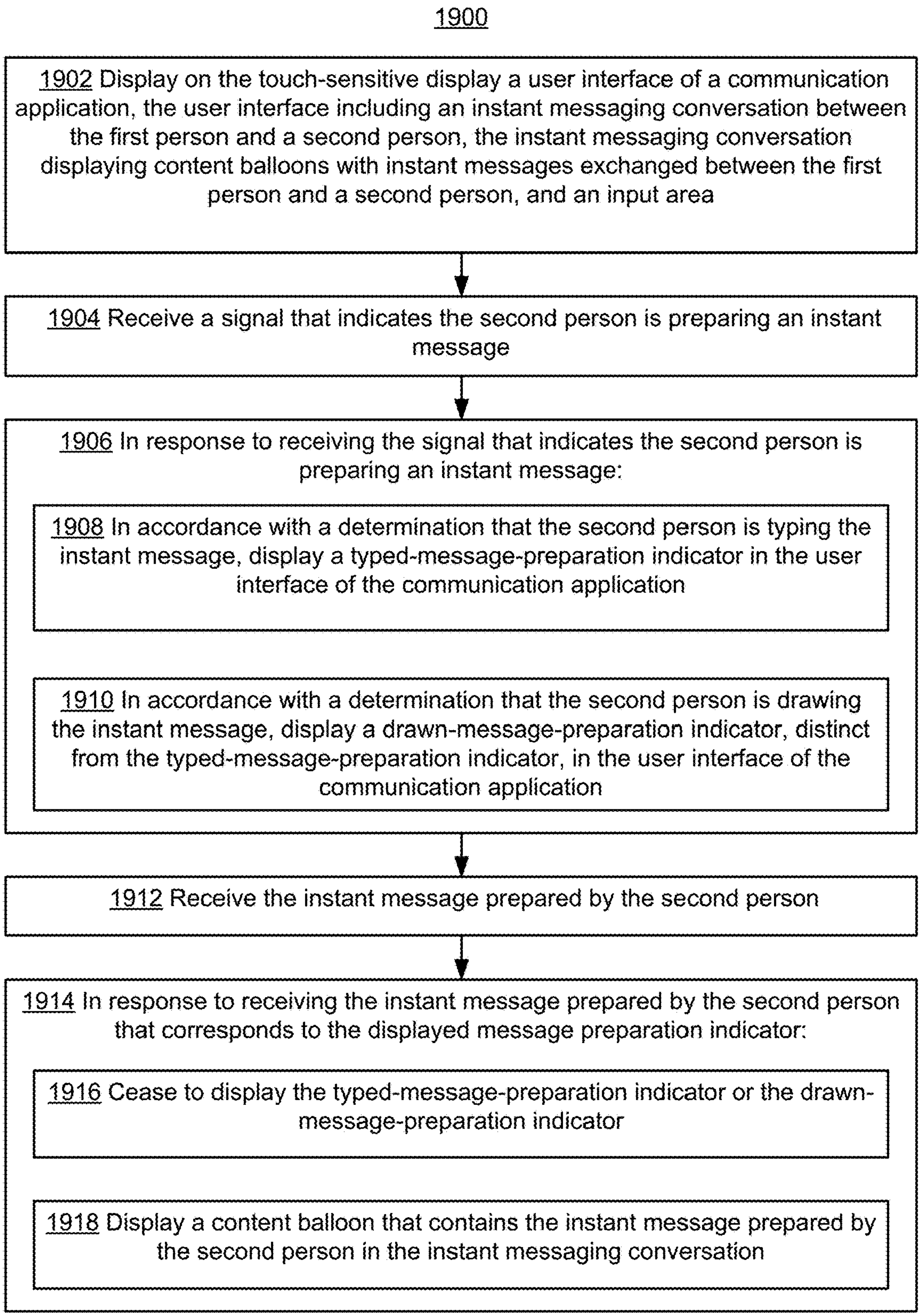

FIG. 19 is a flow diagram illustrating a method 1900 for preparing messages with stylus and finger inputs in accordance with some embodiments. The method 1900 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is separate from the touch-sensitive surface. In some embodiments, the device includes one or more sensors to detect signals from a stylus associated with the device. Some operations in method 1900 are, optionally, combined and/or the order of some operations is, optionally, changed.

As described below, the method 1900 provides a way to indicate to a first user in an instant message conversation whether a second user is typing a response or drawing a response. The device displays a typed-message-preparation indicator if the second user is typing a response, whereas the device displays a drawn-message-preparation indicator if the second user is drawing a response. Having more than one type of message preparation indicator informs a user more precisely about what is coming next during an instant messaging conversation (where the other party is typically not visible to the first user during the conversation). This information helps a user to manage their time while using an instant messaging application on the device, particularly if the user is multitasking with other applications on the device. The method reduces the number, extent, and/or nature of the inputs from a user when conducting an instant messaging conversation with stylus and finger inputs, thereby creating a more efficient human-machine interface. For battery-operated electronic devices, enabling a user to conduct an instant messaging conversation faster and more efficiently conserves power and increases the time between battery charges.

The device, which is associated with a first person, displays (1902) on the touch-sensitive display a user interface of a communication application. The user interface includes an instant messaging conversation (e.g., conversation 1604, FIG. 1) between the first person and a second person. The instant messaging conversation displays content balloons with instant messages exchanged between the first person and a second person (e.g., messages 1605 and 1606, FIG. 1), and an input area (e.g., input area 1618).

The device receives (1904) a signal that indicates the second person is preparing an instant message.

In response to receiving the signal that indicates the second person is preparing an instant message (1906): in accordance with a determination that the second person is typing the instant message (e.g., using a keyboard), the device displays (1908) a typed-message-preparation indicator in the user interface of the communication application (e.g., typed-message-preparation indicator 1608, FIG. 16A). In some embodiments, the typed-message-preparation indicator is displayed in the second side (e.g., left side) region of a communication session window. In some embodiments, a vertical position of the typed-message-preparation indicator in the second side region is based on a time that the typed-message-preparation indicator was created.

In response to receiving the signal that indicates the second person is preparing an instant message (1906): in accordance with a determination that the second person is drawing the instant message (e.g., using the stylus), the device displays (1910) a drawn-message-preparation indicator, distinct from the typed-message-preparation indicator, in the user interface of the communication application (e.g., drawn-message-preparation indicator 1612, FIG. 16C). In some embodiments, the drawn-message-preparation indicator is displayed in the second side (e.g., left side) region of a communication session window. In some embodiments, a vertical position of the drawn-message-preparation indicator in the second side region is based on a time that the drawn-message-preparation indicator was created.

The device receives (1912) the instant message prepared by the second person.

In response to receiving (1914) the instant message prepared by the second person that corresponds to the typed message preparation indicator: the device ceases (1916) to display the typed-message-preparation indicator or the drawn-message-preparation indicator, and displays (1918) a content balloon that contains the instant message prepared by the second person in the instant messaging conversation. For example, the typed-message-preparation indicator 1608 in FIG. 16A is replaced by the corresponding typed instant message 1610 in FIG. 16B. For example, the drawn-message-preparation indicator 1612 in FIG. 16C is replaced by the corresponding drawn instant message 1614 in FIG. 16D.

It should be understood that the particular order in which the operations in FIG. 19 has been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the first paragraph of the Description of Embodiments above) are also applicable in an analogous manner to method 1900 described above with respect to FIG. 19. For example, inputs and animations described above with reference to method 1900 optionally have one or more of the characteristics of inputs and animations described herein with reference to other methods described herein (e.g., those listed in the first paragraph of the Description of Embodiments above). For brevity, these details are not repeated here.

Figure 20A:
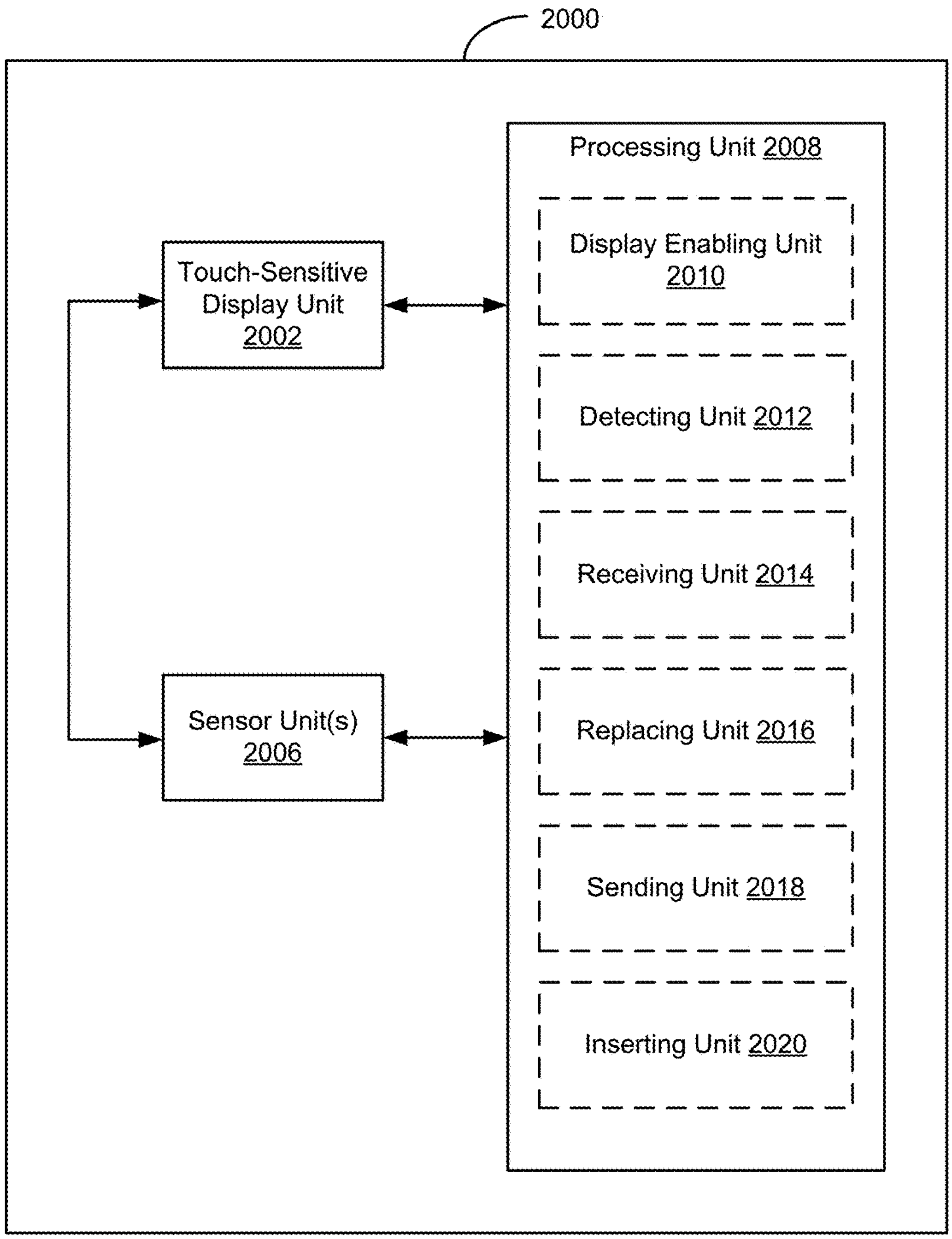
FIG. 20A is a functional block diagram of an electronic device in accordance with some embodiments.

In accordance with some embodiments, FIG. 20A shows a functional block diagram of an electronic device 2000 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 20A are, optionally, combined or separated into sub-blocks to implement the principles of the various described embodiments. Therefore, the description herein optionally supports any possible combination or separation or further definition of the functional blocks described herein.

As shown in FIG. 20A, an electronic device 2000 includes a touch-sensitive display unit 2002 configured to display a user interface and receive user contacts (including stylus contacts), one or more sensor units 2006 configured to detect signals from a stylus associated with the device; and a processing unit 2008 coupled with the touch-sensitive display unit 2002 and the one or more sensor units 2006. In some embodiments, the processing unit 2008 includes a display enabling unit 2010, a detecting unit 2012, a receiving unit 2014, a replacing unit 2016, a sending unit 2018, and an inserting unit 2020.

The processing unit 2008 is configured to: enable display of, on the touch-sensitive display unit 2002, a user interface of a communication application (e.g., with the display enabling unit 2010); detect an input that corresponds to a request to prepare a communication (e.g., with the detecting unit 2012); and in response to detecting the input that corresponds to the request to prepare the communication: in accordance with a determination that the input is a finger input, enable display of a keyboard for typing a text message (e.g., with the display enabling unit 2010); and in accordance with a determination that the input is a stylus input, enable display of a drawing canvas for creating a drawn message (e.g., with the display enabling unit 2010).

Figure 20B:
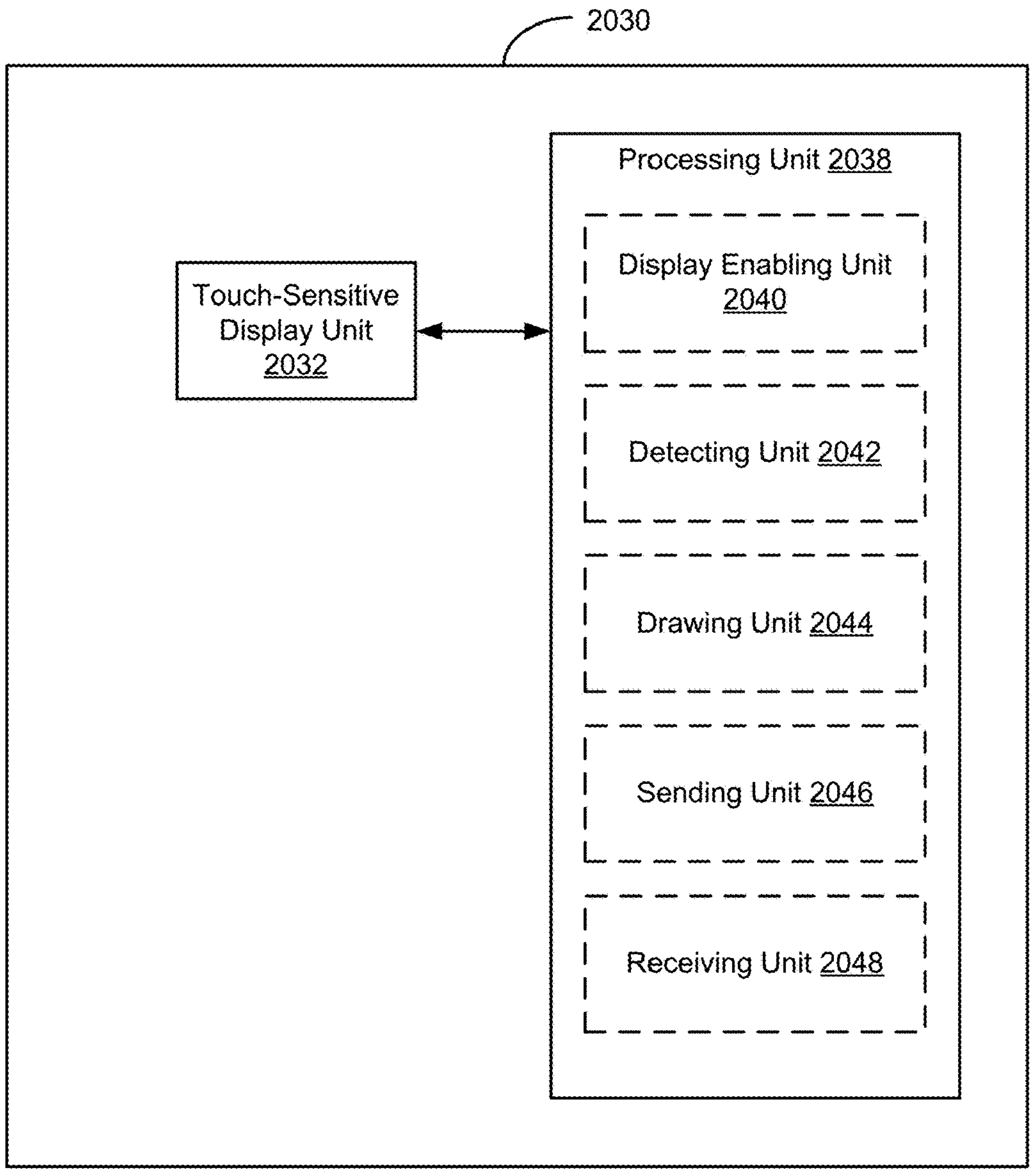
FIG. 20B is a functional block diagram of an electronic device in accordance with some embodiments.

In accordance with some embodiments, FIG. 20B shows a functional block diagram of an electronic device 2030 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 20B are, optionally, combined or separated into sub-blocks to implement the principles of the various described embodiments. Therefore, the description herein optionally supports any possible combination or separation or further definition of the functional blocks described herein.

As shown in FIG. 20B, an electronic device 2030 associated with a first person includes a touch-sensitive display unit 2032 configured to display a user interface and receive user contacts (including stylus contacts) and a processing unit 2038 coupled with the touch-sensitive display unit 2032. In some embodiments, the processing unit 2038 includes a display enabling unit 2040, a detecting unit 2042, a drawing unit 2044, a sending unit 2046, and a receiving unit 2048.

The processing unit 2038 is configured to: enable display of, on the touch-sensitive display unit 2032, a user interface of a communication application (e.g., with the display enabling unit 2040), the user interface including an instant messaging conversation between the first person and a second person, the instant messaging conversation displaying content balloons with instant messages exchanged between the first person and a second person, and an input area; detect selection of a digital image (e.g., with the detecting unit 2042), the digital image containing a plurality of colors; in response to detecting selection of the digital image: enable display of the digital image in the input area (e.g., with the display enabling unit 2040); and enable display of a color palette that contains colors for drawing on the digital image in the input area (e.g., with the display enabling unit 2040), wherein the colors displayed in the color palette are based on the plurality of colors contained in the digital image; detect an input that selects a first color in the color palette (e.g., with the detecting unit 2042); while the first color in the color palette is selected: detect one or more drawing inputs on the digital image in the input area (e.g., with the detecting unit 2042); and draw with the first color on the digital image in accordance with the one or more drawing inputs (e.g., with the drawing unit 2044); detect a request to send the digital image as drawn upon as an instant message to the second person in the instant messaging conversation (e.g., with the detecting unit 2042); and in response to detecting the request to send the digital image as drawn upon as an instant message: send the digital image as drawn upon as an instant message to the second person in the instant messaging conversation (e.g., with the sending unit 2046); and enable display of, on the touch-sensitive display unit 2032, the digital image as drawn upon as an instant message in the instant messaging conversation (e.g., with the display enabling unit 2040).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 17A-17C, 18A-18B, and 19 are, optionally, implemented by components depicted in FIGS. 1A-1B or FIGS. 20A-20B. For example, display operation 1702, detection operation 1716, display operation 1720, and display operation 1722 are, optionally, implemented by event sorter 170, event recognizer 180, and event handler 190. Event monitor 171 in event sorter 170 detects a contact (or near contact) on touch-sensitive display 112, and event dispatcher module 174 delivers the event information to application 136-1. A respective event recognizer 180 of application 136-1 compares the event information to respective event definitions 186, and determines whether a first contact (or near contact) at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Accessing a Drawing Application in a Locked Device

Some electronic devices use a stylus associated with the device to provide additional methods of input to a touch-sensitive display of the device. For example, some cellular phones, laptops, and tablets have the capability to receive inputs from a stylus. Such electronic devices have an increased the number of content generation opportunities for users, including writing down notes and reminders, or creating drawings with the stylus, just to name a few examples. Often, in such content generation opportunities, time is critical, as a user may want to take advantage of a fresh memory or a fleeting event. However, existing methods for accessing drawing applications are slow and a hindrance to immediate content generation, particularly when the device is in a locked, passcode-protected state. Accessing drawing applications on a device while the device is locked typically requires multiple steps, which prevent immediate use of the drawing application when rapid use is beneficial or desired. The embodiments below address this problem by enabling a user to start drawing, over a lock screen user interface, one or more marks of a drawing using input from a stylus, and then replace the lock screen user interface with a drawing application in a restricted session and display, in the drawing application, the one or more marks that were drawn over the lock screen user interface.

Below, FIGS. 21A-21Q illustrate exemplary user interfaces for accessing a drawing application in a locked device. FIGS. 22A-22B, 23A-23B, and 24A-24B are flow diagrams illustrating a method of accessing a drawing application in a locked device. The user interfaces in FIGS. 21A-21Q are used to illustrate the processes in FIGS. 22A-22B, 23A-23B, and 24A-24B.

FIGS. 21A-21Q illustrate exemplary user interfaces for accessing a drawing application in a locked device in accordance with some embodiments. The user interfaces in these figures are used to illustrate the processes described below, including the processes in FIGS. 22A-22B, 23A-23B, and 24A-24B. Although some of the examples which follow will be given with reference to inputs on a touch-screen display (where the touch-sensitive surface and the display are combined, for example on touch screen 112), in some embodiments, the device detects inputs on a touch-sensitive surface 651 that is separate from the display 650, as shown in FIG. 6B.

In some embodiments, the device is an electronic device with a separate display (e.g., display 650) and a separate touch-sensitive surface (e.g., touch-sensitive surface 651). In some embodiments, the device is portable multifunction device 100, the display is touch-sensitive display system 112, and the touch-sensitive surface includes tactile output generators 163 on the display (FIG. 1A). For convenience of explanation, the embodiments described with reference to FIGS. 21A-21Q, 22A-22B, 23A-23B, and 24A-24B will be discussed with reference to operations performed on a device with a touch-sensitive display system 112 (also called simply touch screen 112). In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 650 and a separate touch-sensitive surface 651 in response to detecting the contacts described in FIGS. 21A-21Q on (or near) the touch-sensitive surface 651 while displaying the user interfaces shown in FIGS. 21A-21Q on the display 650.

FIGS. 21A-21Q illustrate exemplary user interfaces for accessing an application (e.g., a drawing application) in a locked device in accordance with some embodiments. While FIG. 21A shows touch screen 112 with additional details of device 100 (e.g., speaker 111, optical sensor 164, proximity sensor 166, etc.), for sake of clarity, FIGS. 21B-21Q simply show touch screen 112 of device 100, without showing other details of device 100. Further, FIGS. 21A-21Q illustrate examples from a viewpoint directly above a touch-sensitive surface (e.g., touch screen 112 of device 100).

FIG. 21A illustrates an example of displaying a lock screen user interface (e.g., lock screen user interface 2100) on touch screen 112 of device 100. In some embodiments, lock screen user interface 2100 is displayed when a physical button (e.g., push button 206 or "home" or menu button 204) on device 100 is activated by a user while device 100 is in a locked state. In some embodiments, lock screen user interface 2100 includes a lock screen image, the current time 604, battery status indicator 606 and/or other information. In some embodiments, lock screen user interface 2100 includes user interface objects for unlocking the device, such as unlock image object 2102 in virtual channel 2104. For example, device 100 is unlocked by dragging unlock image object 2102 across channel 2104, from one end to the other, using a gesture (e.g., a dragging gesture 2105, FIG. 21P). If device 100 is password-protected (sometimes called passcode-protected), when object 2102 is dragged across channel 2104, unlock user interface 2140 is displayed, as shown in FIG. 21Q. In some embodiments, the user enters a password using keypad 2109. If the correct password is entered, device 100 is unlocked. Alternatively, in some embodiments, device 100 includes a fingerprint sensor for authenticating users and device 100 is unlocked with a user fingerprint.

FIGS. 21B-21E illustrate an example of displaying a drawing application in response to liftoff from touch screen 112 (e.g., stylus 203). FIGS. 21B-21C illustrate an example of displaying, over lock screen user interface 2100, one or more marks (e.g., mark 2120-*a* in FIG. 21B and mark 2120-*b* in FIG. 21C) that corresponds to a first input from a stylus (e.g., stylus 203) associated with device 100. In some embodiments, device 100 is configured to detect signals from an electronic stylus (e.g., stylus 203) associated with the device. In some embodiments, detecting signals from the electronic stylus operatively connects (or couples) the stylus with the device. In FIG. 21C, mark 2120-*b* is complete, and stylus 203 has just lifted off touch screen 112.

FIG. 21D illustrates an example of displaying, in response to a second input from the stylus, a drawing application in a restricted mode (and bypassing unlock user interface 2140, FIG. 21Q). In the example of FIGS. 21C-21D, after liftoff of stylus 203 in FIG. 21C, a drawing application with new note entry user interface 2110 is displayed in FIG. 21D with mark 2120-*b* (that was drawn on the lock screen user interface 2100 of FIG. 21C). As shown in FIG. 21D, new note entry user interface 2110 includes drawing entry area 2118, icons (e.g., navigation icon 2112, text icon 2114, and camera icon 2116), and toolbar 2130. In some embodiments, toolbar 2130 includes options to change colors of the input, add a new note, and/or undo a mark.

FIG. 21E illustrates an example of drawing one or more additional marks in the user interface for the drawing application in the restricted session. For example, in FIG. 21E, additional marks are added to mark 2120-*b* to write the reminder to "Buy coffee!" In some embodiments, a swipe gesture (e.g., swipe gesture 2132) with the stylus brings the user back to the lock screen user interface (e.g., lock screen user interface 2100).

FIGS. 21B-21E illustrate an example of user inputs with a stylus. In some embodiments, user inputs are made by a finger contact, rather than a stylus. In other embodiments, in contrast to stylus-based inputs, finger inputs do not draw (e.g., create marks) on the lock screen user interface and/or do not result in display of a drawing application.

FIGS. 21F-21H illustrate an example of displaying a drawing application in response to tapping on touch screen 112 with a stylus (e.g., stylus 203). FIGS. 21F-21G illustrate an example of a tap gesture (e.g., tap gesture 2107) with a stylus (e.g., stylus 203), and in response to the tap gesture, displaying a drawing application in a restricted mode (and bypassing unlock user interface 2140, FIG. 21Q). FIG. 21H illustrates an example of displaying one or more marks made by a stylus (e.g., mark 2134 and mark 2136) in the user interface (e.g., user interface 2110) for the drawing application in the restricted session. In some embodiments, if the tap gesture was performed with a finger, the drawing application is not displayed.

FIGS. 21I-21L illustrate an example of displaying a drawing application in response to liftoff from touch screen 112 with a stylus (e.g., stylus 203). FIG. 21I illustrates an example of displaying, over lock screen user interface 2100, a mark (e.g., mark 2122, created by tracing the dog on the lock screen image) that corresponds to an input from a stylus (e.g., stylus 203) associated with device 100. In response to liftoff of stylus 203, device 100 displays a drawing application in a restricted mode and displays mark 2122 that was made on lock screen user interface 2100, as shown in FIG. 21J. A user can then continue the drawing (e.g., with mark 2124, mark 2126, and mark 2128) in the restricted session of the drawing application, as shown in FIG. 21K. In response to selection of the undo button (e.g., with gesture 2134, FIG. 21L), marks made in the current restricted session of the drawing application are undone, one by one. Using FIG. 21K as an example, say a user drew mark 2122, then mark 2124, then mark 2126, and then mark 2128. Then, after selecting the undo button once, mark 2128 is deleted. After selecting the undo button again, mark 2126 is deleted, resulting in FIG. 21L. In some embodiments, while in the restricted session of the drawing application, a user is allowed to access and edit content created during a current restricted session of the drawing application, but is not allowed access to content created during unrestricted sessions of the drawing application and content created during prior restricted sessions of the drawing application. In some embodiments, while in the restricted session of the drawing application, the drawing application has limited functionality (e.g., selecting icons such as navigation icon 2112, text icon 2114, and/or camera icon 2116 has no effect).

FIGS. 21M-210 illustrate an example of displaying a drawing application in response to swiping from an edge of touch screen 112 with a stylus (e.g., stylus 203). FIG. 21M illustrates an example of displaying, over lock screen user interface 2100, one or more marks (e.g., mark 2141 and mark 2142) that correspond to inputs from the stylus associated with device 100. In this example, liftoff of stylus 203 (e.g., liftoff of stylus 203 between making mark 2141 and making mark 2142) does not cause display of the drawing application. Instead, in response to swiping from an edge of touch screen 112 (e.g., with swipe gesture 2106, FIG. 21N) with stylus 203, device 100 executes a drawing application in a restricted mode and displays the one or more marks (e.g., mark 2141 and mark 2142) that were displayed on the lock screen user interface, as shown in FIG. 21O.

Figure 22A:
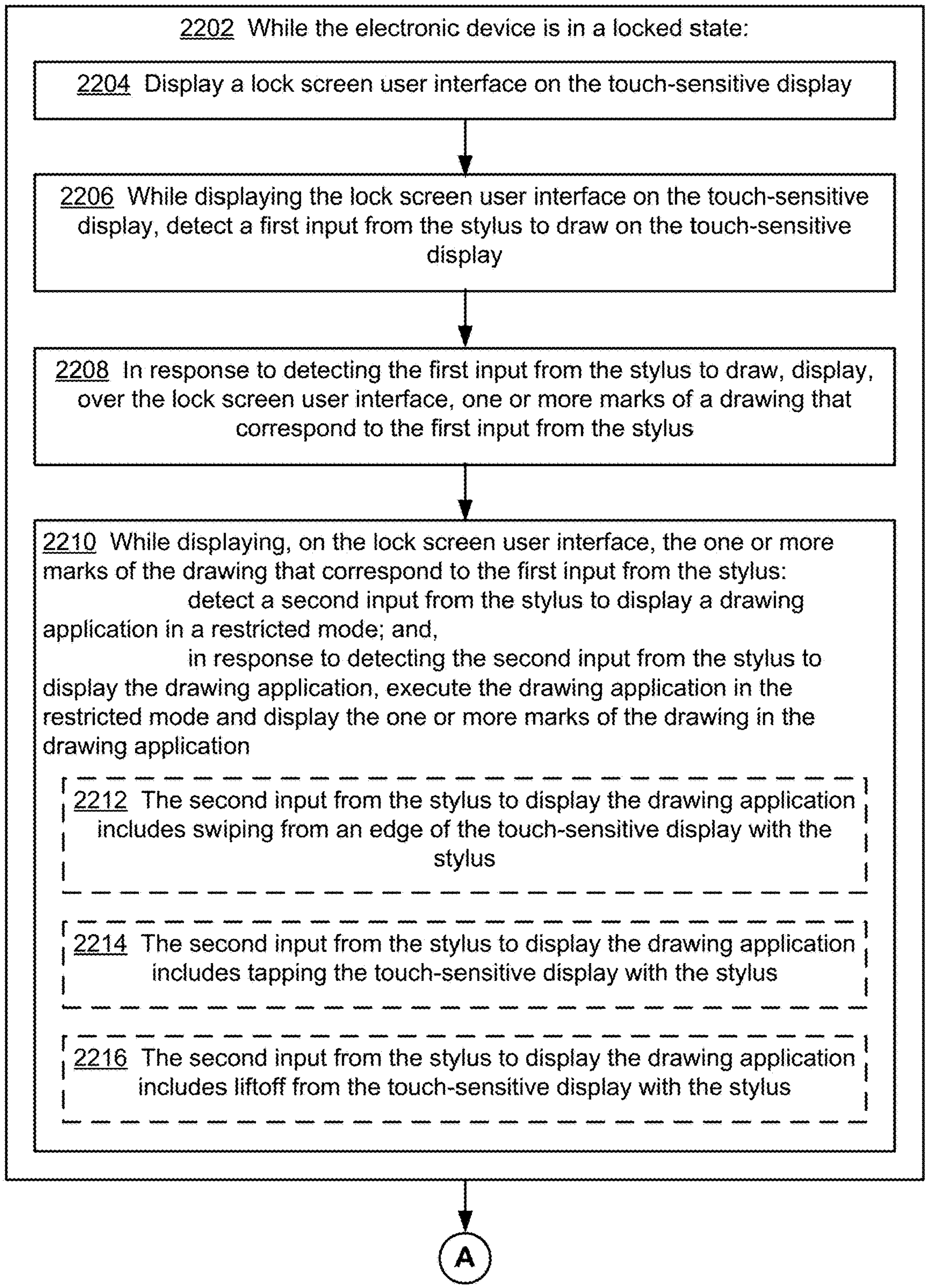
FIGS. 22A-22B are flow diagrams illustrating a method of accessing a drawing application in a locked device in accordance with some embodiments.
Figure 22B:
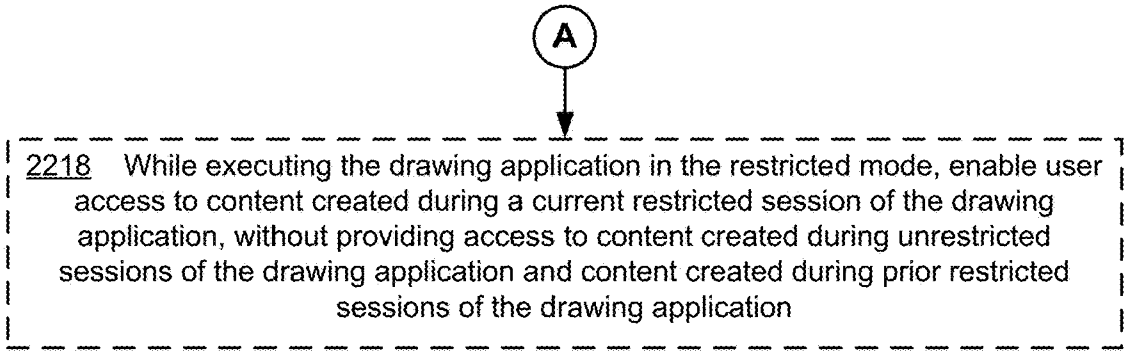

FIGS. 22A-22B are flow diagrams illustrating a method 2200 of accessing an application (e.g., a drawing application) in a locked device in accordance with some embodiments. The method 2200 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display (also called simply a touch-sensitive display). In some embodiments, the display is separate from the touch-sensitive surface. In some embodiments, the device includes one or more sensors to detect signals from a stylus associated with the device. For example, the device is configured to detect signals from an electronic stylus. In some embodiments, detecting signals from the electronic stylus operatively connects (or couples) the stylus with the device. Some operations in method 2200 are, optionally, combined and/or the order of some operations is, optionally, changed.

As described below, the method 2200 enables a user to start immediately start a drawing over a lock screen user interface, and then provides a seamless way to continue making the drawing in a drawing application in a restricted session, thereby creating a more efficient human-machine interface. For battery-operated electronic devices, enabling a user to enter stylus input faster and more efficiently conserves power and increases the time between battery charges.

While the electronic device is in a locked state (2202), the device displays (2204) a lock screen user interface on the touch-sensitive display. For example, device 100 displays lock screen user interface 2100 in FIG. 21A while device 100 is in a locked state. In some embodiments, the lock screen user interface includes user interface objects for unlocking the device, such as unlock image object 2102 in virtual channel 2104, as shown in FIG. 21A. In some embodiments, the device includes a fingerprint sensor for authenticating users and the device is unlocked with a user fingerprint.

While displaying the lock screen user interface on the touch-sensitive display, the device detects (2206) a first input from the stylus to draw on the touch-sensitive display. For example, in FIG. 21B, device 100 detects a first input from stylus 203 to draw on touch screen 112. In some embodiments, the first input is made by a finger contact, rather than a stylus. In other embodiments, in contrast to stylus-based inputs, finger inputs do not draw on the touch-sensitive display and/or do not result in display of a drawing application in a restricted mode (as described below with respect to operation 2210).

In response to detecting the first input from the stylus to draw, the device displays (2208), over the lock screen user interface, one or more marks of a drawing that correspond to the first input from the stylus. In FIG. 21B, for example, device 100 displays, over lock screen user interface 2100, mark 2120-*a* that corresponds to a first input from stylus 203. As another example, in FIG. 21I, device 100 displays, over lock screen user interface 2100, mark 2122 that corresponds to a first input from stylus 203.

While displaying, on the lock screen user interface, the one or more marks of the drawing that correspond to the first input from the stylus, the device detects (2210) a second input from the stylus to display a drawing application in a restricted mode, and in response to detecting the second input from the stylus to display the drawing application, the device executes the drawing application in the restricted mode and displays the one or more marks of the drawing in the drawing application. For example, while displaying mark 2122 (in FIG. 21I) on lock screen user interface 2100, device 100 detects a second input from stylus 203 (e.g., liftoff from touch screen 112 with stylus 203, as shown in FIG. 21I) to display a drawing application in a restricted mode, and in response to detecting the second input (e.g., liftoff), the device executes the drawing application in the restricted mode and displays mark 2122 in the drawing application, as shown in FIG. 21J. The one or more marks displayed in the drawing application include the one or more marks that were displayed on the lock screen user interface. In some embodiments, the second input includes a swipe gesture with the stylus from an edge of the touch-sensitive display (e.g., swipe gesture 2106 on touch screen 112 in FIG. 21N), a tap gesture with the stylus on the touch-sensitive display (e.g., tap gesture 2107 on touch screen 112 in FIG. 21F), and/or liftoff of the stylus from the touch-sensitive display (e.g., at the end of a drag gesture that draws a mark over the lock screen user interface, as in FIG. 21C, or at the end of a tap gesture, as in FIG. 21F).

In some embodiments, the second input from the stylus to display the drawing application includes (2212) swiping from an edge of the touch-sensitive display with the stylus. FIG. 21N, for example, shows swipe gesture 2106 on touch screen 112 as the second input from stylus 203 to display the drawing application.

In some embodiments, the second input from the stylus to display the drawing application includes (2214) tapping the touch-sensitive display with the stylus. FIG. 21F, for example, shows tap gesture 2107 on touch screen 112 as the second input from stylus 203 to display the drawing application. Although not shown in FIG. 21F, in some embodiments, prior to tap gesture 2107, one or more marks are displayed, over the lock screen user interface, that correspond to a first input from the stylus.

In some embodiments, the second input from the stylus to display the drawing application includes (2216) liftoff from the touch-sensitive display with the stylus. FIG. 21C, for example, shows liftoff of stylus 203 (at the end of a drag gesture that draws mark 2120-*b* over lock screen user interface 2100) from touch screen 112 as the second input from stylus 203 to display the drawing application. Alternatively, FIG. 21F shows liftoff of stylus 203 (at the end of tap gesture 2107) from touch screen 112 as the second input from stylus 203 to display the drawing application.

In some embodiments, while executing the drawing application in the restricted mode, the device enables (2218) user access to content created during a current restricted session of the drawing application, without providing access to content created during unrestricted sessions of the drawing application and content created during prior restricted sessions of the drawing application. For example, if FIGS. 21B-21E occur prior in time to FIGS. 21I-21L, while executing the drawing application in the restricted mode in FIGS. 21J-21L, the device 100 enables user access to content created during the current restricted session (e.g., during the restricted session of FIGS. 21J-21L), without providing access to content created during unrestricted sessions of the drawing application (e.g., while device 100 was in an unlocked state) and content created during prior restricted sessions of the drawing application (e.g., during the restricted session of FIGS. 21D-21E).

It should be understood that the particular order in which the operations in FIGS. 22A-22B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the first paragraph of the Description of Embodiments above) are also applicable in an analogous manner to method 2200 described above with respect to FIGS. 22A-22B. For example, the stylus positional state characteristics, movements, contacts, gestures, user interface objects, and outputs described above with reference to method 2200 optionally have one or more of the characteristics of the stylus positional state characteristics, movements, contacts, gestures, user interface objects, and outputs described herein with reference to other methods described herein (e.g., those listed in the first paragraph of the Description of Embodiments above). For brevity, these details are not repeated here.

Figure 23A:
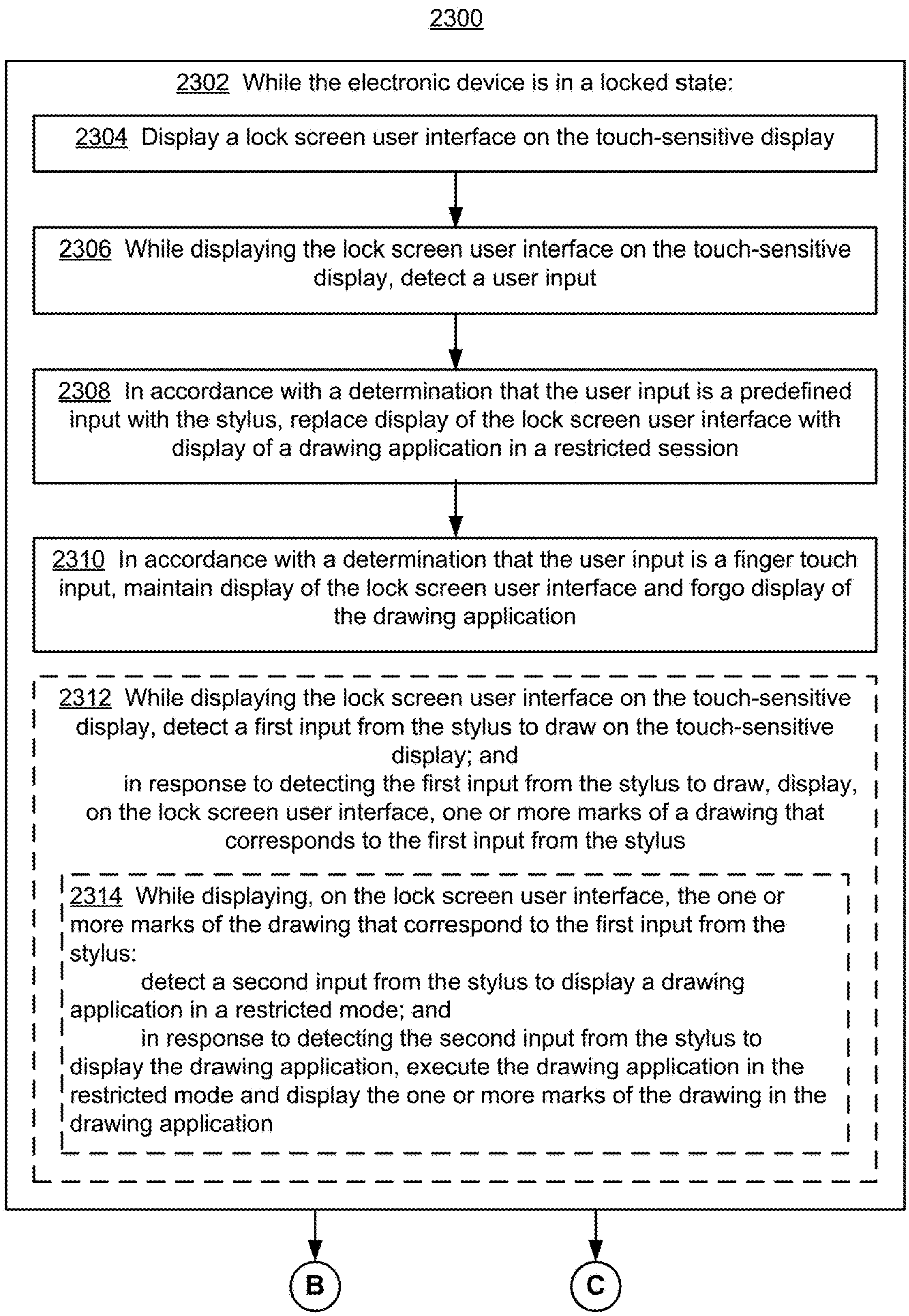

FIGS. 23A-23B are flow diagrams illustrating a method 2300 of accessing an application (e.g., a drawing application) in a locked device in accordance with some embodiments. The method 2300 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display (also called simply a touch-sensitive display). In some embodiments, the display is separate from the touch-sensitive surface. In some embodiments, the device includes one or more sensors to detect signals from a stylus associated with the device. For example, the device is configured to detect signals from an electronic stylus. In some embodiments, detecting signals from the electronic stylus operatively connects (or couples) the stylus with the device. Some operations in method 2300 are, optionally, combined and/or the order of some operations is, optionally, changed.

As described below, the method 2300 provides an intuitive and quick way to access an application (e.g., a drawing application) in a locked device. The method reduces the number, extent, and/or nature of the inputs from a user when using a stylus to interact with an electronic device, thereby creating a more efficient human-machine interface. For battery-operated electronic devices, enabling a user to enter stylus input faster and more efficiently conserves power and increases the time between battery charges.

While the electronic device is in a locked state (2302), the device displays (2304) a lock screen user interface on the touch-sensitive display. For example, device 100 displays lock screen user interface 2100 in FIG. 21A while device 100 is in a locked state. In some embodiments, the lock screen user interface includes user interface objects for unlocking the device, such as unlock image object 2102 in virtual channel 2104, as shown in FIG. 21A. In some embodiments, the device includes a fingerprint sensor for authenticating users and the device is unlocked with a user fingerprint.

While displaying the lock screen user interface on the touch-sensitive display, the device detects (2306) a user input. FIG. 21F, for example, shows a user input (e.g., tap gesture 2107) performed with stylus 203 while lock screen user interface 2100 is displayed on touch screen 112.

In accordance with a determination that the user input is a predefined input with the stylus, the device replaces (2308) display of the lock screen user interface with display of a drawing application in a restricted session. For example, FIGS. 21F-21G shows replacing display of lock screen user interface 2100 with display of a drawing application in a restricted session (with user interface 2110) in accordance with a determination that the user input is a predefined input with the stylus (e.g., a tap gesture with the stylus).

In accordance with a determination that the user input is a finger touch input (or other non-stylus touch input), the device maintains (2310) display of the lock screen user interface and forgoes display of the drawing application. For example, if tap gesture 2107 in FIG. 21F was performed with a finger touch input (or other non-stylus touch input), the device would maintain display of lock screen user interface 2100 and forgo display of the drawing application.

In some embodiments, while displaying the lock screen user interface on the touch-sensitive display, the device detects (2312) a first input from the stylus to draw on the touch-sensitive display, and in response to detecting the first input from the stylus to draw, the device displays, on the lock screen user interface, one or more marks of a drawing that corresponds to the first input from the stylus. For example, in FIG. 21M, device 100 detects a first input from stylus 203 to draw on touch screen 112, and in response to detecting the first input, device 100 displays, on lock screen user interface 2100, mark 2141 and mark 2142 that correspond to the first input from stylus 203.

In some embodiments, while displaying, on the lock screen user interface, the one or more marks of the drawing that correspond to the first input from the stylus: the device detects (2314) a second input from the stylus to display a drawing application in a restricted mode, and in response to detecting the second input from the stylus to display the drawing application, the device executes the drawing application in the restricted mode and displays the one or more marks of the drawing in the drawing application. For example, in FIG. 21N, while displaying mark 2141 and mark 2142 on lock screen user interface 2100, device 100 detects a second input from stylus 203 (e.g., swipe gesture 2106) to display a drawing application in a restricted mode, and in response to detecting the second input (e.g., swipe gesture 2106), the device executes the drawing application in the restricted mode and displays mark 2141 and 2142 in the drawing application, as shown in FIG. 21O. The one or more marks displayed in the drawing application include the one or more marks that were displayed on the lock screen user interface.

In some embodiments, the user input is a tap gesture, and: in accordance with a determination that the tap gesture was performed with a stylus, the device displays (2316) the drawing application; and in accordance with a determination that the tap gesture was performed with a finger, the device forgoes displaying the drawing application. For example, FIG. 21F shows tap gesture 2107 as the user input, and since the tap gesture was performed with a stylus (e.g., stylus 203), the device displays the drawing application, as shown in FIG. 21G. However, if tap gesture 2107 in FIG. 21F was performed with a finger, the device forgoes displaying the drawing application (and maintains display of lock screen user interface 2100).

In some embodiments, the user input is a swipe gesture, and: in accordance with a determination that the swipe gesture was performed with a stylus and meets drawing application display criteria, the device displays (2318) the drawing application; and in accordance with a determination that the swipe gesture was performed with a finger and meets unlock initiating criteria, the device displays an unlock user interface. For example, FIG. 21N shows swipe gesture 2106 as the user input, and since the swipe gesture was performed with a stylus (e.g., stylus 203) and meets drawing application display criteria, the device displays the drawing application, as shown in FIG. 21O. On the other hand, FIG. 21P shows swipe gesture 2105 as the user input, and if the swipe gesture was performed with a finger and meets unlock initiating criteria, the device displays an unlock user interface (e.g., unlock user interface 2140), as shown in FIG. 21Q. Alternatively, in some embodiments, the device displays other restricted applications, such as a camera application, in accordance with a determination that the swipe gesture was performed with a finger (and meets certain criteria). In some embodiments, in accordance with a determination that the swipe gesture was performed with a finger, the device provides access to other functionality and/or content from the lock screen user interface (e.g., notification center and/or control center).

It should be understood that the particular order in which the operations in FIGS. 23A-23B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the first paragraph of the Description of Embodiments above) are also applicable in an analogous manner to method 2300 described above with respect to FIGS. 23A-23B. For example, the stylus positional state characteristics, movements, contacts, gestures, user interface objects, and outputs described above with reference to method 2300 optionally have one or more of the characteristics of the stylus positional state characteristics, movements, contacts, gestures, user interface objects, and outputs described herein with reference to other methods described herein (e.g., those listed in the first paragraph of the Description of Embodiments above). For brevity, these details are not repeated here.

Figure 24B:
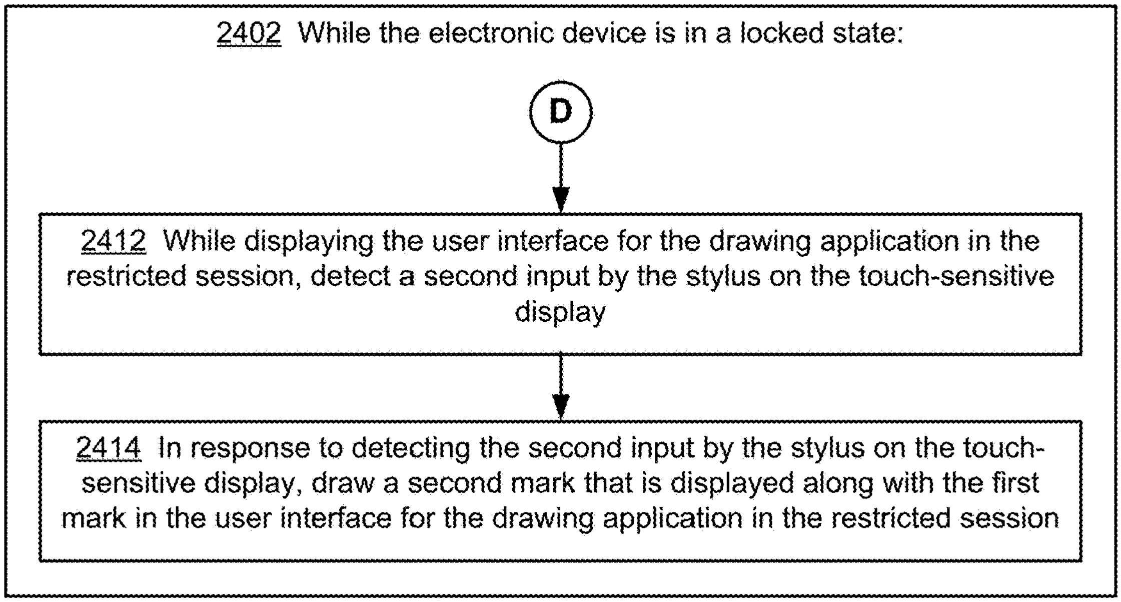

FIGS. 24A-24B are flow diagrams illustrating a method 2400 of accessing an application (e.g., a drawing application) in a locked device in accordance with some embodiments. The method 2400 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display (also called simply a touch-sensitive display). In some embodiments, the display is separate from the touch-sensitive surface. In some embodiments, the device includes one or more sensors to detect signals from a stylus associated with the device. For example, the device is configured to detect signals from an electronic stylus. In some embodiments, detecting signals from the electronic stylus operatively connects (or couples) the stylus with the device. Some operations in method 2400 are, optionally, combined and/or the order of some operations is, optionally, changed.

As described below, the method 2400 enables a user to start immediately start a drawing over a lock screen user interface, and then provides a seamless way to continue making the drawing in a drawing application in a restricted session, thereby creating a more efficient human-machine interface. For battery-operated electronic devices, enabling a user to enter stylus input faster and more efficiently conserves power and increases the time between battery charges.

While the electronic device is in a locked state (2402), the device displays (2404) a lock screen user interface on the touch-sensitive display, the lock screen user interface including a lock screen image. For example, while device 100 is in a locked state, device 100 displays lock screen user interface 2100 in FIG. 21A, lock screen user interface 2100 including a lock screen image of a dog. In some embodiments, the lock screen user interface includes user interface objects for unlocking the device, such as unlock image object 2102 in virtual channel 2104, as shown in FIG. 21A. In some embodiments, the device includes a fingerprint sensor for authenticating users and the device is unlocked with a user fingerprint.

While displaying the lock screen user interface on the touch-sensitive display, the device detects (2406) a first input by the stylus on the touch-sensitive display, wherein detecting the first input includes: detecting an initial contact by the stylus on the touch-sensitive display at a beginning of the first input; detecting a movement of the stylus across the touch-sensitive display during the first input; and detecting a liftoff of the stylus from the touch-sensitive display at an end of the first input. For example, in FIG. 21I, while displaying lock screen user interface 2100 on touch screen 112, the device detects a first input by stylus 203 including an initial contact by stylus 203 on touch screen 112, movement of stylus 203 across touch screen 112 during the first input (e.g., tracing around the dog's head), and liftoff of stylus 203 from touch screen 112 at the end of the first input.

In response to detecting the movement of the stylus across the touch-sensitive display, the device draws (2408) a first mark that is displayed on top of the lock screen image in accordance with the movement of the stylus across the touch-sensitive display. FIG. 21I, for example, shows a first mark (e.g., mark 2122) that is displayed on top of the lock screen image (e.g., on top of the lock screen image of a dog) in accordance with the movement of stylus 203 across touch screen 112. In FIG. 21I, mark 2122 is drawn starting at the location of the initial contact by stylus 203 on touch screen 112 at the beginning of the first input. In some embodiments, the first mark is drawn independent of the location of the initial contact by the stylus on the touch-sensitive display.

In response to detecting the liftoff of the stylus from the touch-sensitive display: the device ceases (2410) to display the lock screen user interface, including ceasing to display the lock screen image, the device displays a user interface for a drawing application in a restricted session, and the device displays the first mark, which was drawn in accordance with the movement of the stylus across the touch-sensitive display during the first input, in the user interface for the drawing application in the restricted session. FIG. 21J, for example, shows, in response to detecting the liftoff of stylus 203 from touch screen 112 in FIG. 21I, ceasing to display lock screen user interface 2100 (including ceasing to display the lock screen image of the dog), displaying user interface 2110 for a drawing application in a restricted session, and displaying mark 2122, which was drawn in accordance with the movement of stylus 203 across touch screen 112 during the first input (as described in operation 2408), in user interface 2110 for the drawing application in the restricted session.

While displaying the user interface for the drawing application in the restricted session, the device detects (2412) a second input by the stylus on the touch-sensitive display. For example, in FIG. 21J, while displaying user interface 2110 for the drawing application in the restricted session, device 100 detects a second input by stylus 203 (e.g., to draw mark 2124).

In response to detecting the second input by the stylus on the touch-sensitive display, the device draws (2414) a second mark that is displayed along with the first mark in the user interface for the drawing application in the restricted session. FIG. 21K, for example, shows displaying a second mark (e.g., mark 2124) that is displayed along with the first mark (e.g., mark 2122) in user interface 2110 for the drawing application in the restricted session.

It should be understood that the particular order in which the operations in FIGS. 24A-24B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the first paragraph of the Description of Embodiments above) are also applicable in an analogous manner to method 2400 described above with respect to FIGS. 24A-24B. For example, the stylus positional state characteristics, movements, contacts, gestures, user interface objects, and outputs described above with reference to method 2400 optionally have one or more of the characteristics of the stylus positional state characteristics, movements, contacts, gestures, user interface objects, and outputs described herein with reference to other methods described herein (e.g., those listed in the first paragraph of the Description of Embodiments above). For brevity, these details are not repeated here.

Figure 25:
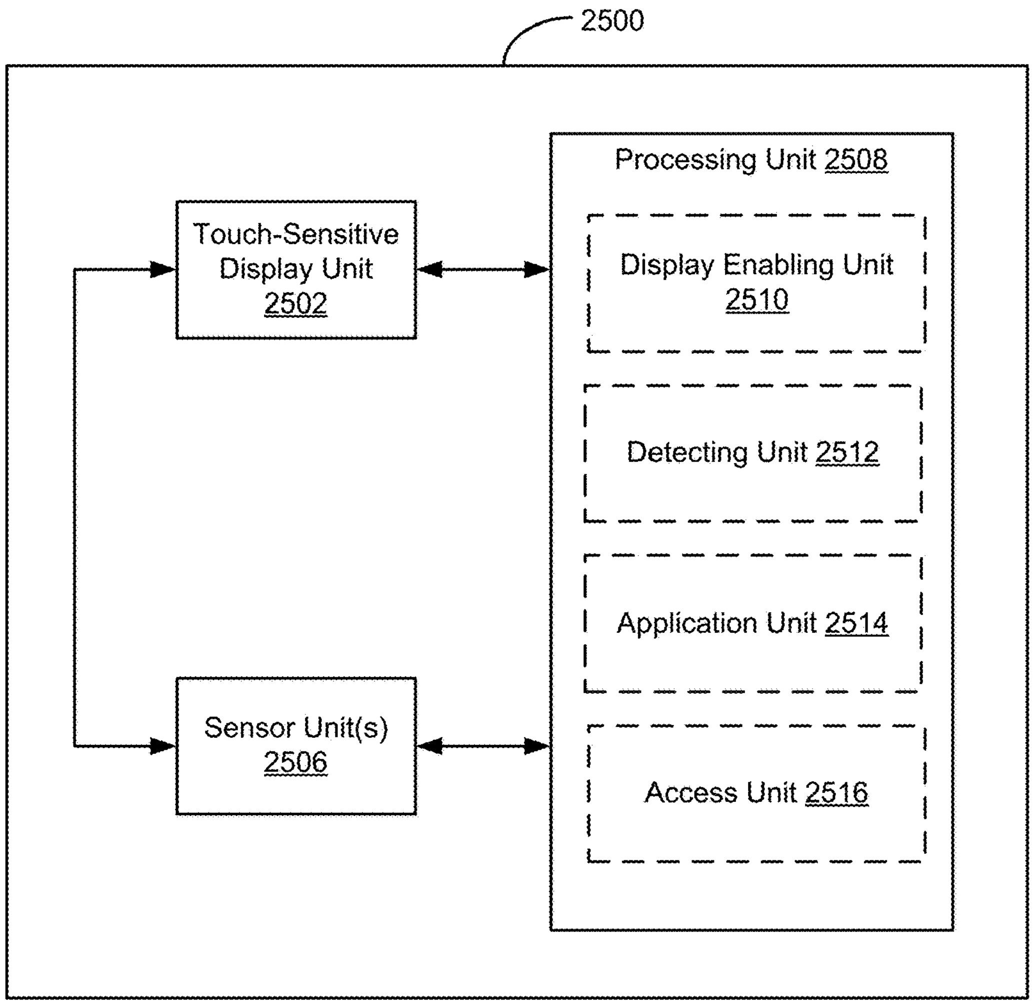
FIG. 25 is a functional block diagram of an electronic device in accordance with some embodiments.

In accordance with some embodiments, FIG. 25 shows a functional block diagram of an electronic device 2500 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 25 are, optionally, combined or separated into sub-blocks to implement the principles of the various described embodiments. Therefore, the description herein optionally supports any possible combination or separation or further definition of the functional blocks described herein.

As shown in FIG. 25, an electronic device 2500 includes a touch-sensitive display unit 2502 configured to display a user interface and receive user contacts (including stylus contacts), one or more sensor units 2506 configured to detect signals from a stylus associated with the device; and a processing unit 2508 coupled with the touch-sensitive display unit 2502 and the one or more sensor units 2506. In some embodiments, the processing unit 2508 includes a display enabling unit 2510, a detecting unit 2512, an application unit 2514, and an access unit 2516.

The processing unit 2508 is configured to: while the electronic device is in a locked state: enable display of a lock screen user interface on the touch-sensitive display unit 2502 (e.g., with the display enabling unit 2510); while enabling display of the lock screen user interface on the touch-sensitive display unit 2502, detect a first input from the stylus to draw on the touch-sensitive display unit 2502 (e.g., with the detecting unit 2512); in response to detecting the first input from the stylus to draw, enable display of, over the lock screen user interface, one or more marks of a drawing that correspond to the first input from the stylus (e.g., with the display enabling unit 2510); while enabling display of, on the lock screen user interface, the one or more marks of the drawing that correspond to the first input from the stylus: detect a second input from the stylus to display a drawing application in a restricted mode (e.g., with the detecting unit 2512); and, in response to detecting the second input from the stylus to display the drawing application, execute the drawing application in the restricted mode (e.g., with the application unit 2514) and enable display of the one or more marks of the drawing in the drawing application (e.g., with the display enabling unit 2510).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 22A-22B, 23A-23B, and 24A-24B are, optionally, implemented by components depicted in FIGS. 1A-1B or FIG. 25. For example, display operation 2204, detection operation 2206, display operation 2208, and detection/execution operation 2210 are, optionally, implemented by event sorter 170, event recognizer 180, and event handler 190. Event monitor 171 in event sorter 170 detects a contact (or near contact) on touch-sensitive display 112, and event dispatcher module 174 delivers the event information to application 136-1. A respective event recognizer 180 of application 136-1 compares the event information to respective event definitions 186, and determines whether a first contact (or near contact) at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Selecting and Using Virtual Drawing Implements Using a Stylus

Electronic devices can use styluses to emulate a variety of virtual drawing implements. Existing methods for selecting a particular virtual drawing implement are tedious and inefficient. Here, the devices choose a virtual drawing implement based on the tilt of a stylus meeting particular selection criteria. This provides electronic devices with a fast, simple method to switch between two different virtual drawing implements, such as a pen and a highlighter.

FIGS. 26A-26H illustrate exemplary user interfaces for selecting and using virtual drawing implements using a stylus in accordance with some embodiments. The user interfaces in these figures are used to illustrate the processes described below, including the processes in FIGS. 27A-27C and 28A. Although some of the examples which follow will be given with reference to inputs on a touch-screen display (where the touch-sensitive surface and the display are combined), in some embodiments, the device detects inputs on a touch-sensitive surface 651 that is separate from the display 650, as shown in FIG. 6B.

In some embodiments, the device is an electronic device with a separate display (e.g., display 650) and a separate touch-sensitive surface (e.g., touch-sensitive surface 651). In some embodiments, the device is portable multifunction device 100, the display is touch-sensitive display system 112, and the touch-sensitive surface includes tactile output generators 163 on the display (FIG. 1A). For convenience of explanation, the embodiments described with reference to FIGS. 26A-26H and 27A-27C, and 28A will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 650 and a separate touch-sensitive surface 651 in response to detecting the contacts described in FIGS. 26A-26H on the touch-sensitive surface 651 while displaying the user interfaces shown in FIGS. 26A-26H on the display 650, along with a focus selector. FIGS. 26A-26H illustrate examples from two viewpoints: a viewpoint directly above a touch-sensitive surface (e.g., touch screen 112 of device 100) with axis 508 and a side viewpoint of the touch-sensitive surface with axes 590, 592, 594 (x axis, y axis, z axis respectively) including a stylus (e.g., 203) with a position (e.g., 504) and a corresponding indication (516).

Figure 26A:
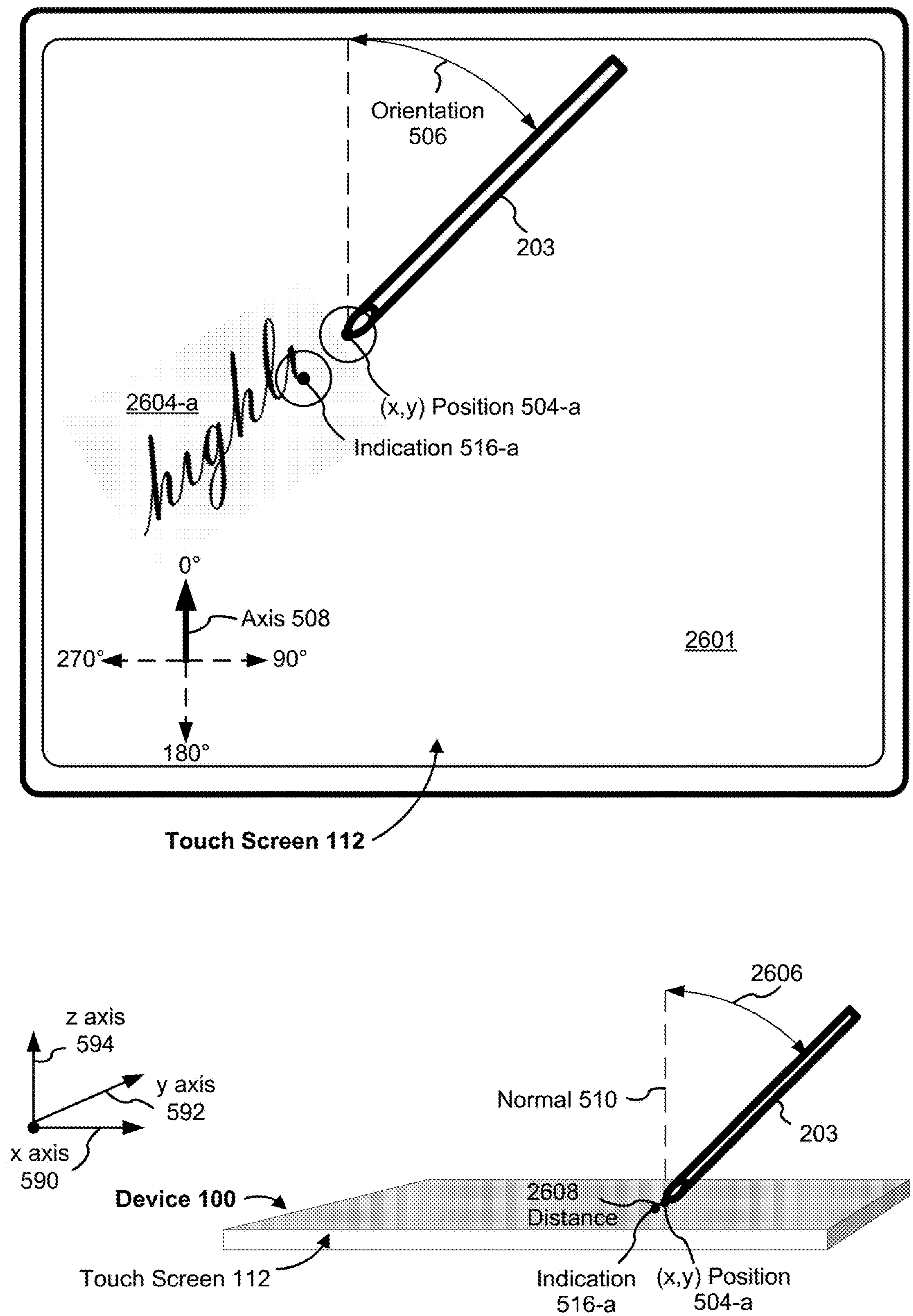
Figure 27A:
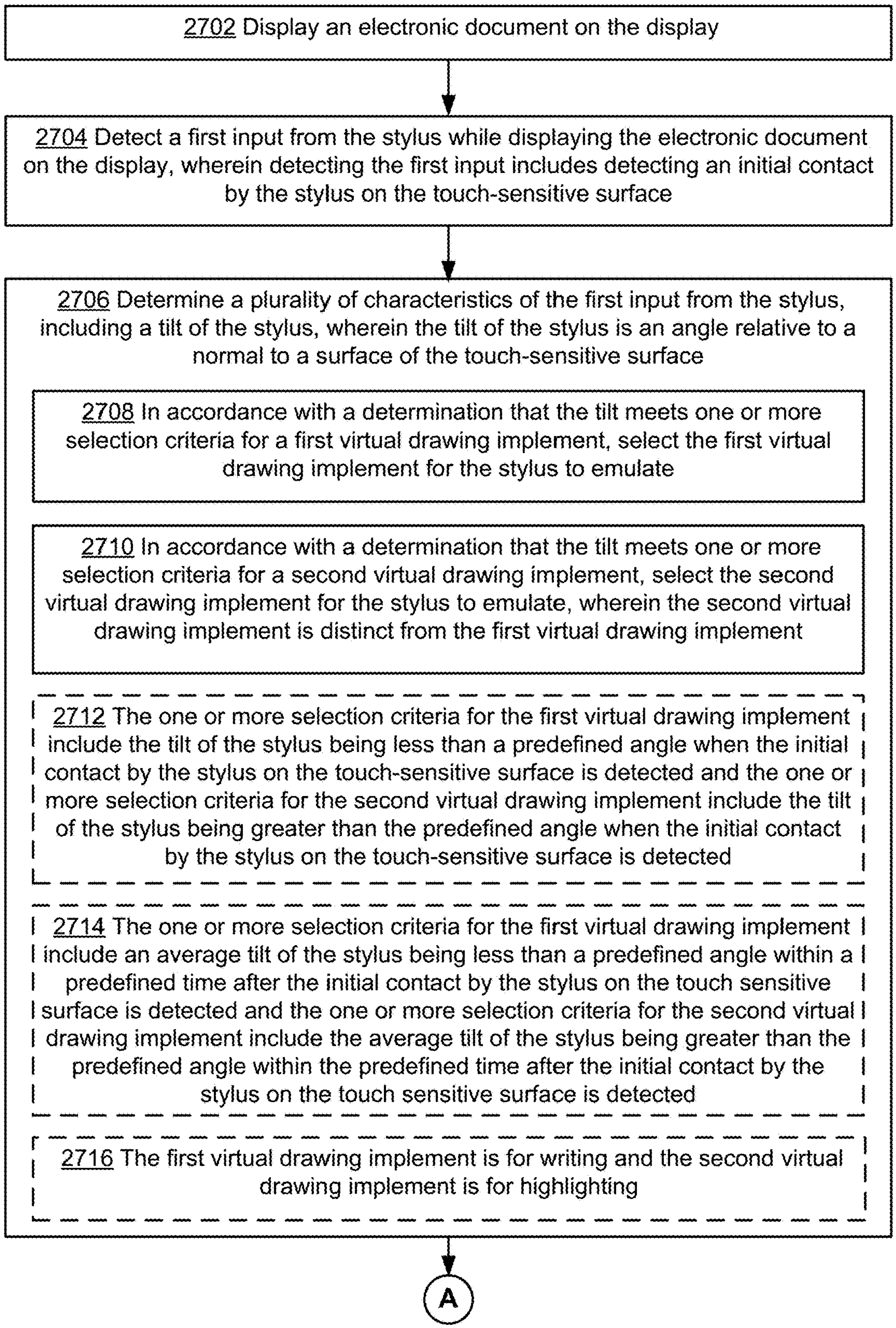
Figure 27B:
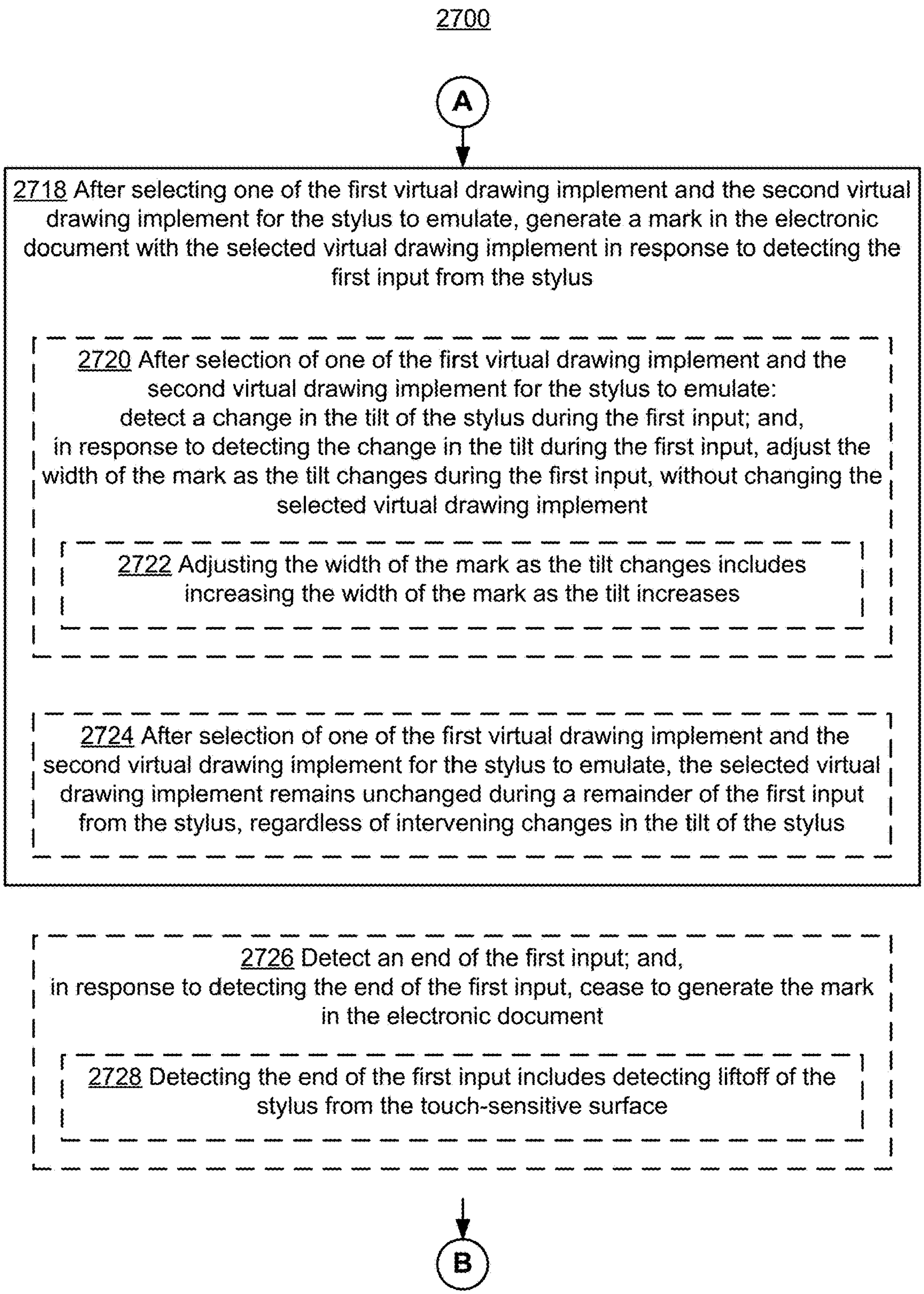

FIG. 26A illustrates an example of a mark 2604-*a* generated by a stylus made on an electronic document, namely an electronic canvas 2601. The positional state of the stylus is shown in a viewpoint directly above a touch-sensitive surface displaying orientation 506 and position 504-*a* with indication 516-*a* at the end of the current mark 2604 being generated. The position and indication are offset from each other in FIG. 26A. The side viewpoint illustrates the stylus tilt 2606 relative to a normal (parallel to z axis) 510. The tilt is zero when the stylus is perpendicular/normal to the touch-sensitive surface and the tilt increases towards 90 degrees as the stylus is tilted closer to being parallel to the touch-sensitive surface. In some embodiments, the tilt of the stylus is a characteristic that determines the virtual drawing implement used to generate the mark, according to selection criteria. For example, if the tilt is less than a predefined threshold angle (such as 10, 15, 20, or 25 degrees), the device selects a first virtual drawing implement, such as a virtual pen or pencil. The side viewpoint illustrates the distance 2608 of the stylus to the touch-sensitive surface (measured along the z axis) such that there is contact between the stylus and the touch-sensitive surface. In some embodiments, contact between the stylus and the touch-sensitive surface is required for the generation of a mark.

Figure 26B:
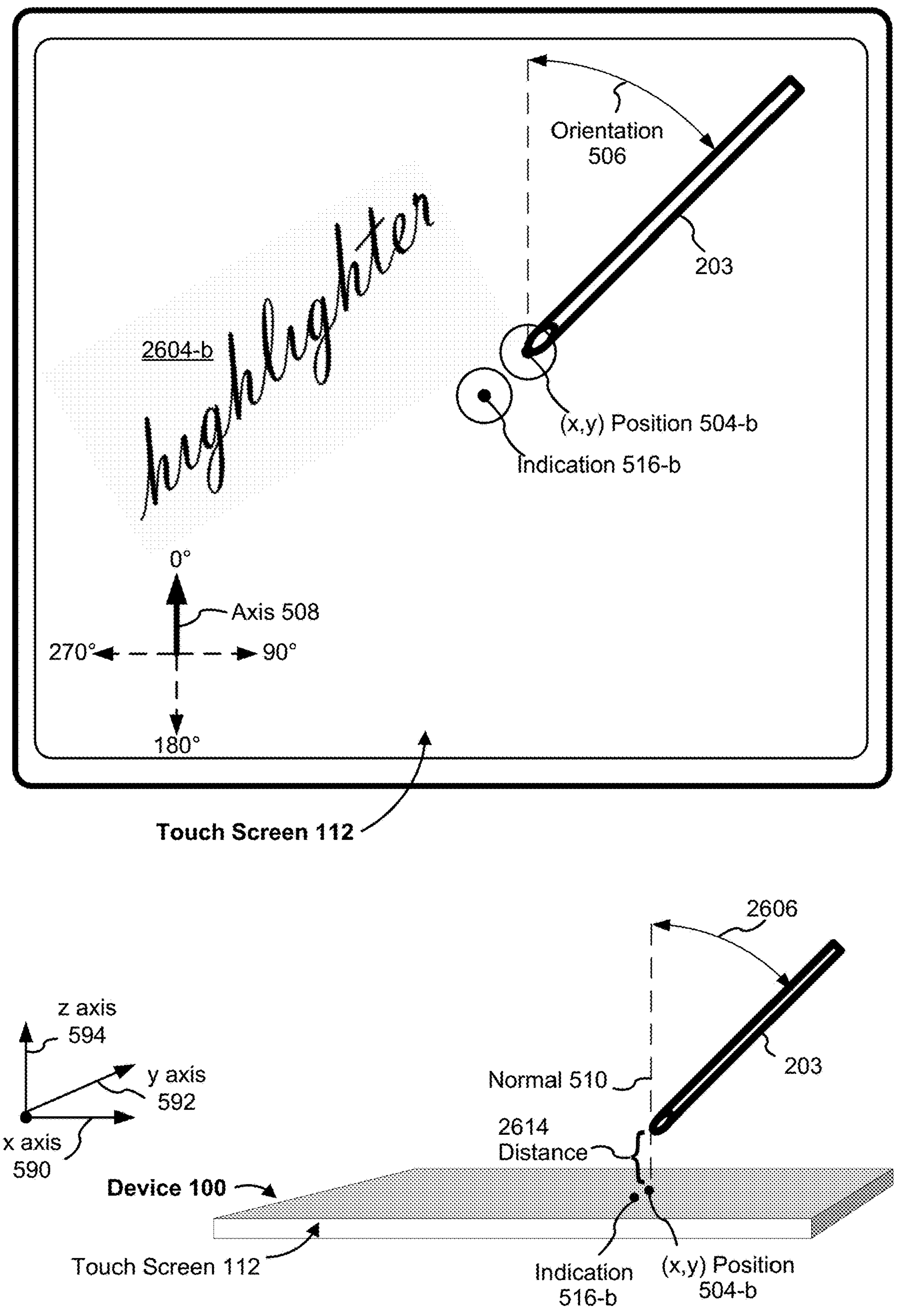

FIG. 26B, which continues from FIG. 26A, illustrates a completed mark 2604-*b* generated by the device working in conjunction with a stylus 203. The position 504-*b* and indication 516-*b* of the stylus are positioned away from the completed mark. The side viewpoint illustrates the stylus tilt 2606 relative to a normal (parallel to z axis) 510. The distance 2614 of the stylus to the touch-sensitive surface (measured along the z axis) is such that there is no contact between the stylus and the touch-sensitive surface. In this example, no mark is generated by the device when the stylus is not contacting the touch-sensitive surface.

Figure 26C:
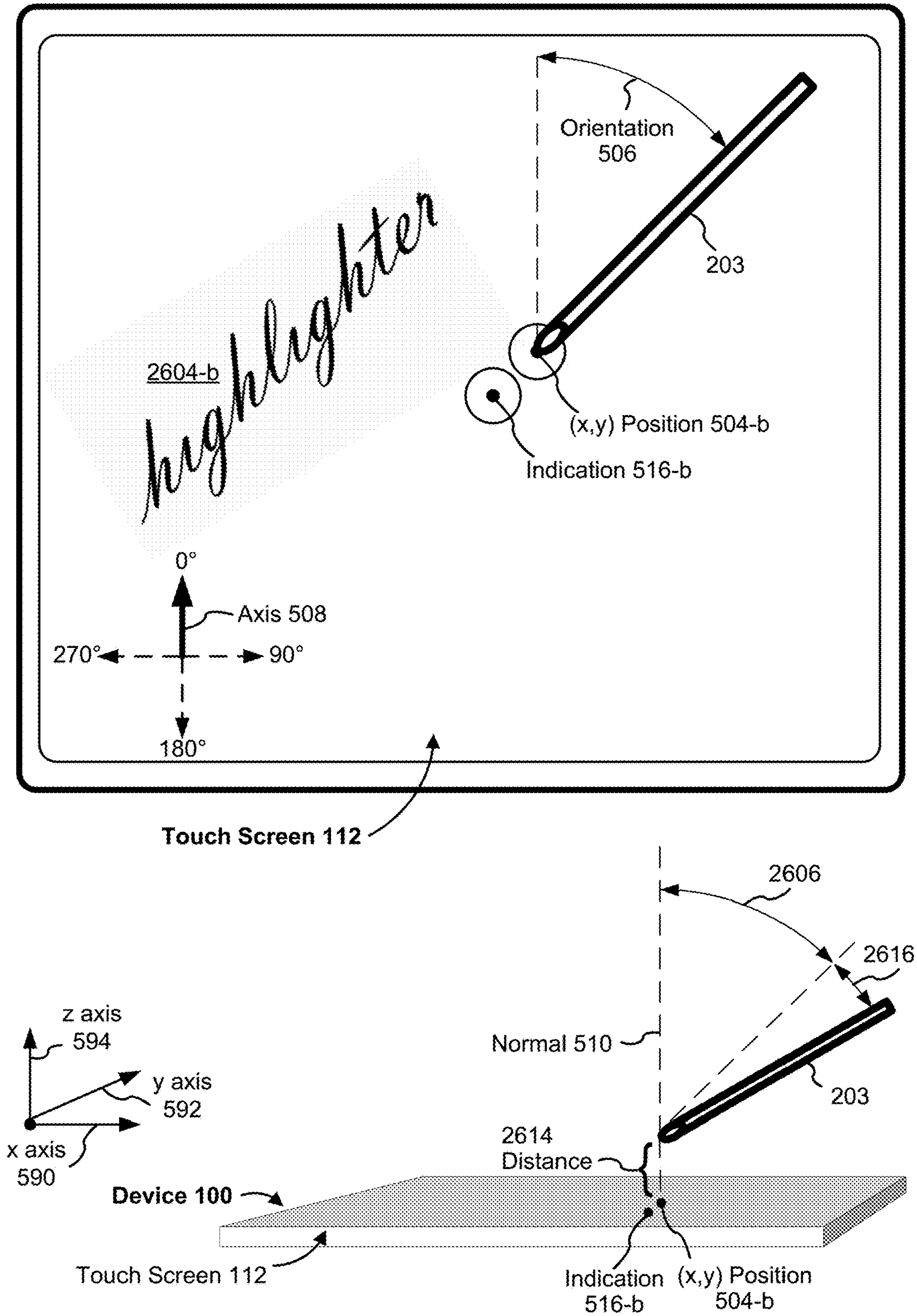

FIG. 26C, which continues from FIGS. 26A-26B, illustrates a stylus altering its tilt from tilt angle 2606 to a new tilt angle that includes additional tilt angle 2616 relative to the initial tilt angle. Upon contact with touch screen 112, the new tilt angle of the stylus will result in a different virtual drawing implement being selected and used by the device to generate a mark. For example, if the tilt is greater than a predefined threshold angle from the normal (such as 10, 15, 20, or 25 degrees), the device selects a second virtual drawing implement, such as a virtual highlighter or marker. The side viewpoint illustrates the distance 2614 of the stylus to the touch-sensitive surface (measured along the z axis) is such that there is no contact between the stylus and the touch-sensitive surface.

Figure 26D:
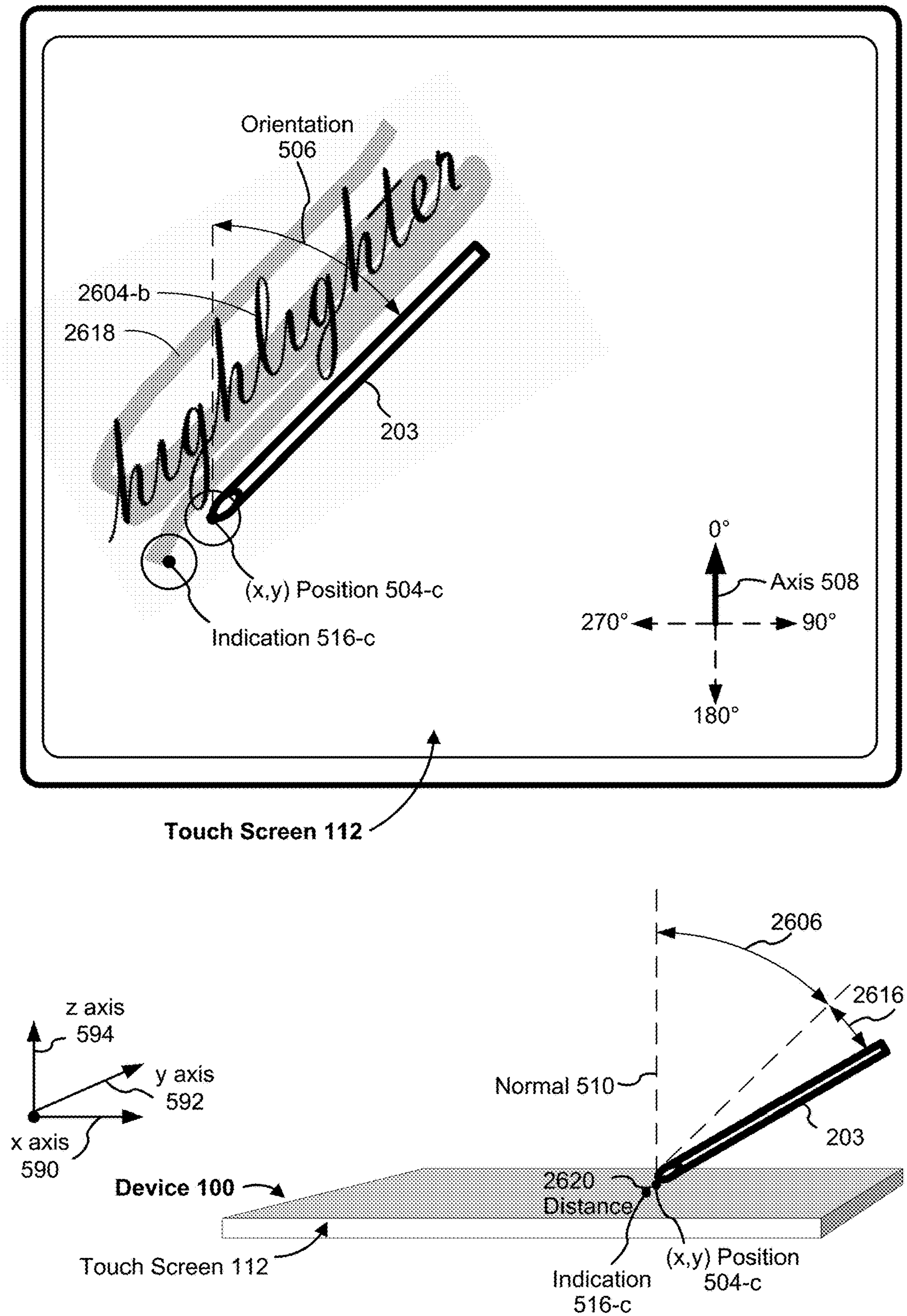

FIG. 26D, which continues from FIGS. 26A-26C, illustrates the device, in conjunction with the stylus, generating a mark 2618 using a different virtual drawing implement, namely a highlighter, based on the tilt of the stylus meeting selection criteria for the virtual highlighter (FIG. 26D) instead of meeting selection criteria for the virtual pen (FIG. 26A). The highlighter mark 2618, shown in light grayscale, is displayed over the previous pen mark 2604, namely the word "highlighter" shown in black pen writing. In this example, the tilt of the stylus remains greater than the predefined threshold angle from the normal for the duration of the stylus input that causes the device to generate the mark 2604. In the side viewpoint, the distance 2620 indicates there is contact between the stylus and the touch-sensitive surface.

FIGS. 26E-26H illustrate selecting and using a second virtual drawin implement (e.g., a virtual highlighter) based on the tilt of the stylus meeting selection criteria for the virtual highlighter. FIGS. 26E-26H also illustrate the width of the highlighting decreasing as the tilt decreases during the input, without switching from the virtual highlighter to the virtual pen during the input.

Figure 26E:
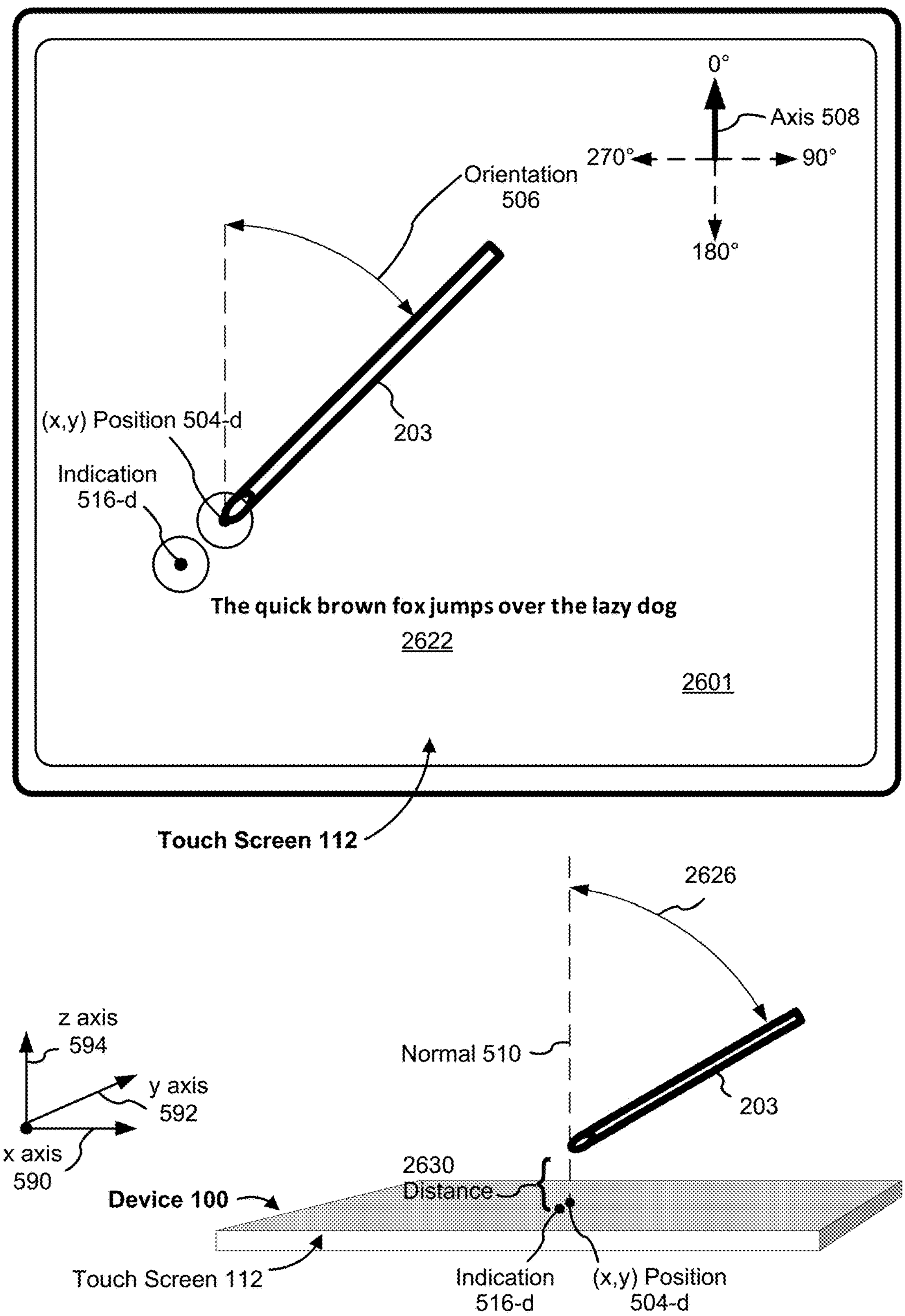

FIG. 26E illustrates the stylus prior to making contact with a large tilt angle 2626. Distance 2630 is greater than zero and there is no contact. Position 504-*d* and indication 516-*d* are away from the text 2622 "The quick brown fox jumps over the lazy dog."

Figure 26F:
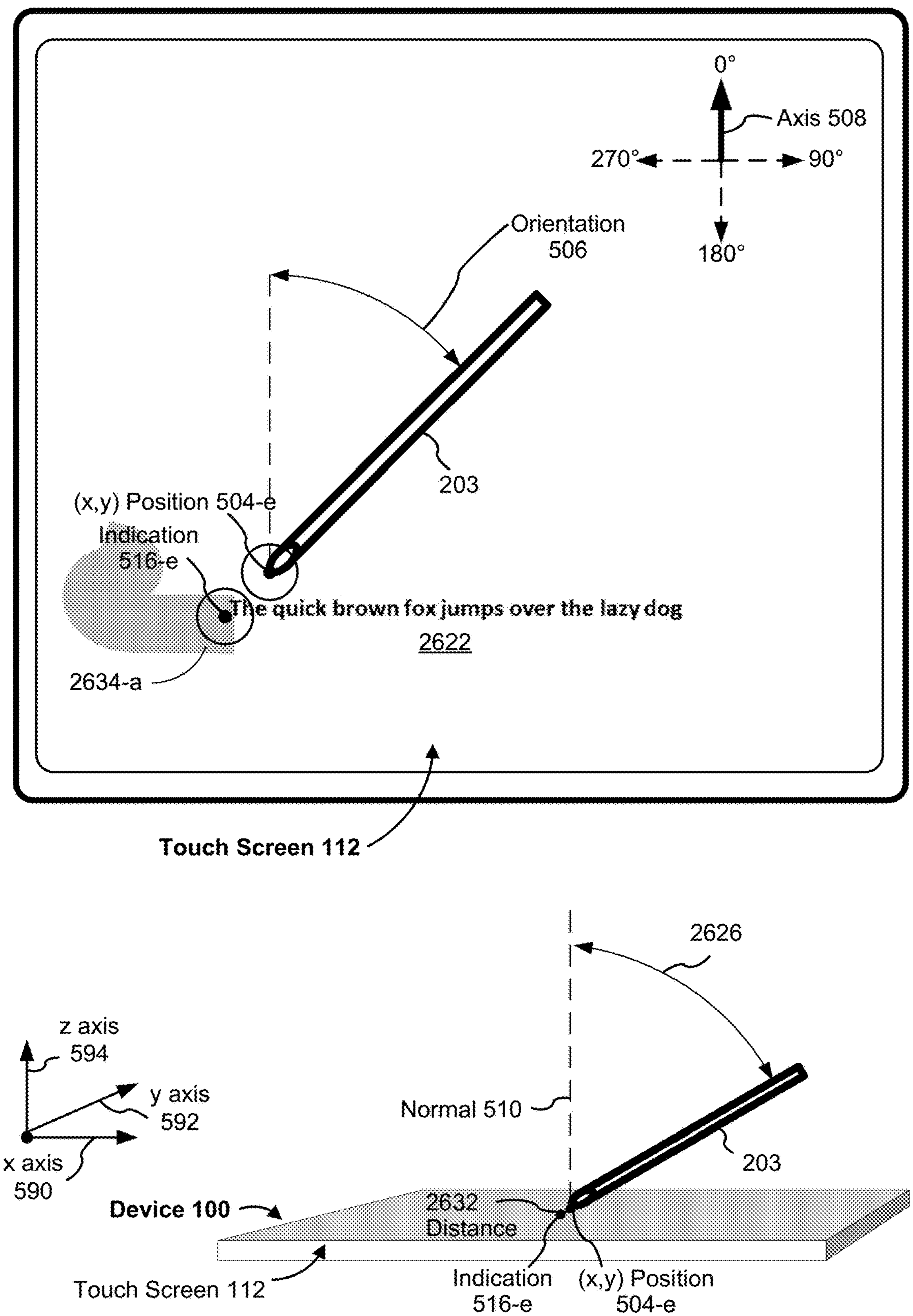

FIG. 26F illustrates the stylus after making contact with large tilt angle 2626 and moving position 504-*e* and indication 516-*e* across the touch screen on or near text 2622. Distance 2632 corresponds to contact between the stylus and the touch screen. The device selects and uses the virtual highlighter, instead of selecting the virtual pen, because the tilt meets selection criteria for the virtual highlighter. For example, the tilt 2626 of the stylus is greater than a predefined angle when the initial contact by the stylus on the touch-sensitive surface is detected. A wide highlighter mark 2634-*a* is made because of the large tilt angle 2626.

Figure 26H:
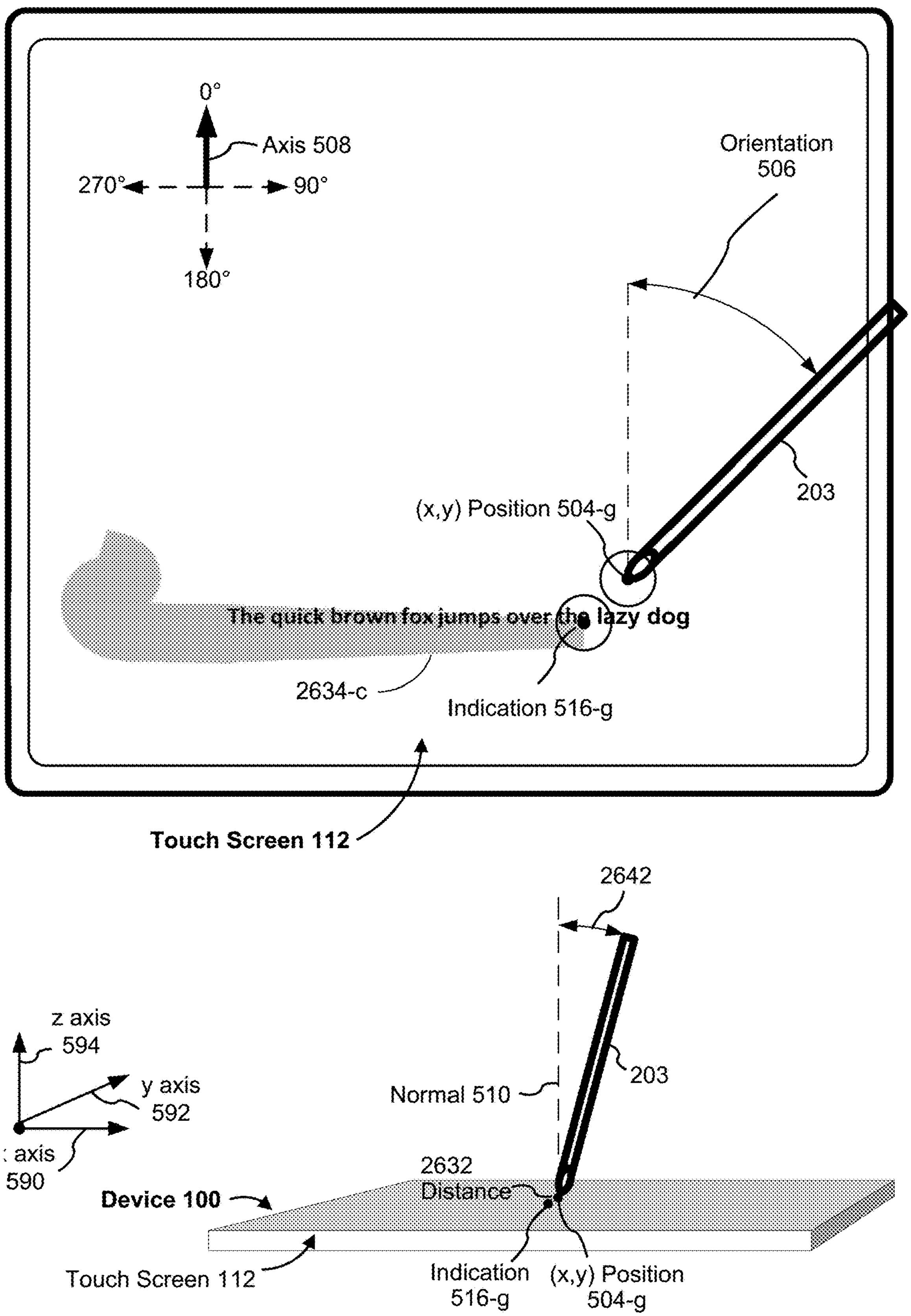

FIGS. 26F-26H illustrate extending the highlighter mark from 2634-*a* to 2634-*b* to 2634-*c* as the stylus position moves from 504-*e* to 504-*f* to 504-*g* and the indication moves from 516-*e* to 516-*f* to 516-*g*. In addition, the stylus tilt decreases from 2626 to 2628 to 2642, which causes the width of the highlighter mark to also decrease. In some embodiments, tilt 2628 (and/or tilt 2642) meets the tilt angle criteria that are part of the selection criteria for selecting the virtual pen. Nevertheless, the device continues to make the mark using the virtual highlighter for the remainder of the input, as shown in FIG. 26H, because timing criteria that are part of the selection criteria for the virtual pen are not met.

FIGS. 27A-27C, are flow diagrams illustrating a method 2700 for emulating virtual drawing implements using a stylus in accordance with some embodiments. The method 2700 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is separate from the touch-sensitive surface. Some operations in method 2700 are, optionally, combined and/or the order of some operations is, optionally, changed.

As described below, the method 2700 provides a way to select virtual drawing implements based on the tilt of a stylus. The method reduces the number, extent, and/or nature of the inputs from a user when generating marks of different virtual implements with a stylus, thereby creating a more efficient human-machine interface. For battery-operated electronic devices, enabling a user to switch between different virtual drawing implements faster and more efficiently conserves power and increases the time between battery charges.

The device is configured to display, on the touch-sensitive display, an electronic document (2702). FIG. 26A, for example, shows an exemplary embodiment of an electronic document, namely an electronic canvas 2601. In some embodiments, the electronic document is a paper, image, word processing page, book, presentation slide, spreadsheet, or the like.

The device detects a first input from the stylus (2704) while displaying the electronic document on the display, wherein detecting the first input includes detecting an initial contact by the stylus on the touch-sensitive surface (as shown in FIG. 26A, with stylus 203 making contact with the touch-sensitive surface at position 504-*a*).

The device determines a plurality of characteristics of the first input from the stylus, including a tilt of the stylus (2706), wherein the tilt of the stylus is an angle relative to a normal to a surface of the touch-sensitive surface. Tilt is shown in FIG. 26A in the side viewpoint where the stylus tilt 2606 is relative to a normal (parallel to z axis) 510 of the touch-sensitive surface. The tilt is zero when the stylus is perpendicular/normal to the touch-sensitive surface and the tilt increases towards 90 degrees as the stylus is tilted closer to being parallel to the touch-sensitive surface. In some embodiments, the characteristics of the first input include, but are not limited to, position, speed, direction, orientation, tilt, and/or intensity.

The device, in accordance with a determination that the tilt meets one or more selection criteria for a first virtual drawing implement (2708), selects the first virtual drawing implement for the stylus to emulate. For example, if the tilt is less than a predefined threshold angle (such as 10, 15, 20, or 25 degrees), the device selects a virtual pen or pencil (e.g., FIG. 26A).

The device, in accordance with a determination that the tilt meets one or more selection criteria for a second virtual drawing implement, selects the second virtual drawing implement for the stylus to emulate, wherein the second virtual drawing implement is distinct from the first virtual drawing implement (2710). For example, if the tilt is greater than a predefined threshold angle (such as 10, 15, 20, or 25 degrees), the device selects a virtual highlighter (e.g., FIGS. 26D and 26F).

In some embodiments, the one or more selection criteria for the first virtual drawing implement includes the tilt of the stylus being less than a predefined angle when the initial contact by the stylus on the touch-sensitive surface is detected and the one or more selection criteria for the second virtual drawing implement include the tilt of the stylus being greater than the predefined angle when the initial contact by the stylus on the touch-sensitive surface is detected (2712). In some embodiments, for a given input, the tilt detected when the stylus makes initial contact with the touch-sensitive surface determines whether the first virtual drawing implement or the second virtual drawing implement is selected and used for the given input.

In some embodiments, the one or more selection criteria for the first virtual drawing implement includes an average tilt of the stylus being less than a predefined angle within a predefined time after the initial contact by the stylus on the touch sensitive surface is detected and the one or more selection criteria for the second virtual drawing implement include the average tilt of the stylus being greater than the predefined angle within the predefined time after the initial contact by the stylus on the touch sensitive surface is detected (2714). In some embodiments, for a given input, the average tilt detected when the stylus makes initial contact with the touch-sensitive surface and/or for a brief predefined time thereafter (e.g., 0.05, 0.1, or 0.2 s) determines whether the first virtual drawing implement or the second virtual drawing implement is selected and used for the given input.

In some embodiments, the first virtual drawing implement is for writing (2716) and the second virtual drawing implement is for highlighting (e.g., as shown in FIGS. 26A-26D).

The device, after selecting one of the first virtual drawing implement and the second virtual drawing implement for the stylus to emulate, generates (2718) a mark in the electronic document with the selected virtual drawing implement in response to detecting the first input from the stylus (e.g., as shown in FIGS. 26A-26D).

In some embodiments, after selection of one of the first virtual drawing implement and the second virtual drawing implement for the stylus to emulate (2720), the device detects a change in the tilt of the stylus during the first input, and in response to detecting the change in the tilt during the first input, adjusts the width of the mark as the tilt changes during the first input (as shown in FIGS. 26F-26H, where the mark 2634 narrows as the tilt decreases), without changing the selected virtual drawing implement.

In some embodiments, adjusting the width of the mark as the tilt changes includes increasing the width of the mark (2722) as the tilt increases during the input. In some embodiments, adjusting the width of the mark as the tilt changes includes decreasing the width of the mark as the tilt decreases during the input (e.g., as shown in FIGS. 26F-26H).

In some embodiments, after selection of one of the first virtual drawing implement and the second virtual drawing implement for the stylus to emulate, the selected virtual drawing implement remains unchanged during a remainder of the first input from the stylus, regardless of intervening changes in the tilt of the stylus (2724). For example, once a highlighter is selected, the virtual drawing implement remains a highlighter until liftoff (e.g., FIGS. 26F-26G).

In some embodiments, the device detects (2726) an end of the first input and, in response to detecting the end of the first input, ceases to generate the mark in the electronic document. In some embodiments, detecting the end of the first input includes detecting (2728) liftoff of the stylus from the touch-sensitive surface (e.g., FIG. 26C).

In some embodiments, the plurality of characteristics of the first input meet the one or more selection criteria for the first virtual drawing implement; and generating the mark in the electronic document with the selected virtual drawing implement in response to detecting the first input from the stylus includes generating a mark based on the first virtual drawing implement. In such embodiments, while continuously detecting the first input from the stylus on the touch-sensitive surface: after generating the mark based on the first virtual drawing implement, the device detects a change in the tilt of the stylus so that the tilt meets one or more tilt angle criteria in the one or more selection criteria for the second virtual drawing implement; after detecting the change in the tilt of the stylus, the device detects movement of the stylus along the touch-sensitive surface; and, in response to detecting the movement of the stylus, the device continues to generate the mark based on the first virtual drawing implement (2730). In some embodiments, the one or more selection criteria for a respective virtual drawing element include one or more tilt angle criteria and one or more timing criteria. For example, the tilt angle criteria is that the tilt is greater than a predefined threshold angle and the timing criteria is that, for a given input, only the tilt measured when the stylus makes initial contact with the touch-sensitive surface and/or for a brief predefined time thereafter (e.g., 0.05, 0.1, or 0.2 s) determines whether the respective virtual drawing implement is selected and used for the given input. In this example, if first virtual drawing implement is initially selected and the tilt angle criteria for the second virtual drawing implement are met at some later time, namely a time that does not also satisfy the timing criteria, then the first virtual implement remains selected and used during the remainder of the given input, despite the tilt angle criteria for the second virtual implement being met at the later time during the given input.

In some embodiments, after continuing to generate the mark based on the first drawing implement: the device detects liftoff of the stylus from the touch-sensitive surface; and, after detecting liftoff of the stylus from the touch-sensitive surface: the device detects a second input from the stylus that meets the one or more selection criteria for the second virtual drawing implement; while continuing to detect the second input from the stylus on the touch-sensitive surface, the device detects movement of the stylus along the touch-sensitive surface; and, in response to detecting the movement of the stylus along the touch-sensitive surface, the device generates a mark based on the second virtual drawing implement (2732).

It should be understood that the particular order in which the operations in FIGS. 27A-27C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the first paragraph of the Description of Embodiments above) are also applicable in an analogous manner to method 2700 described above with respect to FIGS. 27A-27C. For example, stylus inputs described above with reference to method 2700 optionally have one or more of the characteristics of stylus inputs described herein with reference to other methods described herein (e.g., those listed in the first paragraph of the Description of Embodiments above). For brevity, these details are not repeated here.

Figure 28:
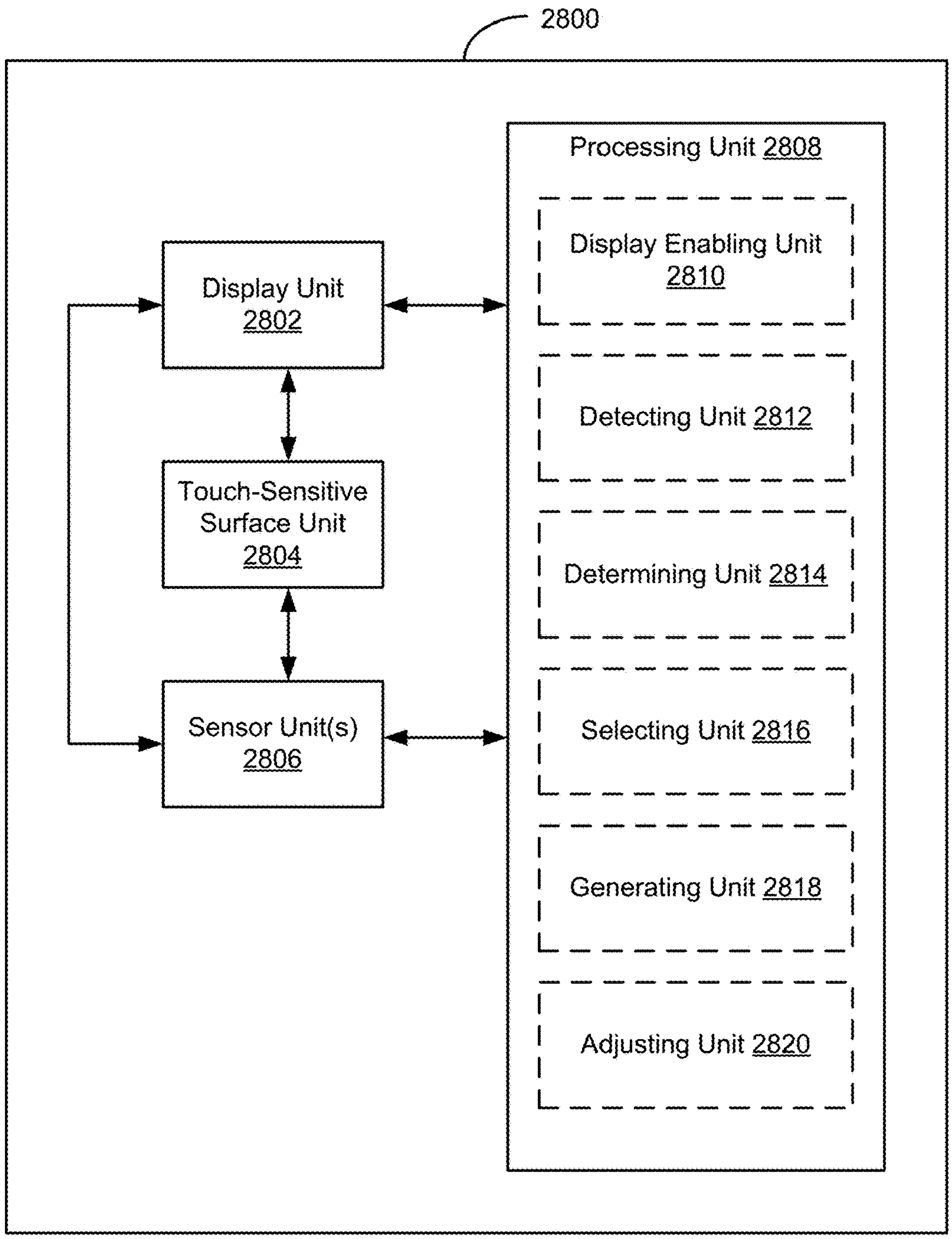
FIG. 28 is a functional block diagram of an electronic device in accordance with some embodiments.

In accordance with some embodiments, FIG. 28 shows a functional block diagram of an electronic device 2800 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 28 are, optionally, combined or separated into sub-blocks to implement the principles of the various described embodiments. Therefore, the description herein optionally supports any possible combination or separation or further definition of the functional blocks described herein.

As shown in FIG. 28, an electronic device 2800 includes a display unit 2802 configured to display a user interface; a touch-sensitive surface unit 2804 configured to receive user contacts (including stylus contacts); one or more sensor units 2806 configured to detect signals from a stylus associated with the device; and a processing unit 2808 coupled to the display unit 2802, the touch-sensitive surface unit 2804 and the one or more sensor units 2806. In some embodiments, the processing unit 2808 includes a display enabling unit 2810, a detecting unit 2812, a determining unit 2814, a selecting unit 2816, a generating unit 2818, and an adjusting unit 2820.

The processing unit 2808 is configured to: enable display of an electronic document on the display unit 2802 (e.g., with the display enabling unit 2810); while enabling display of the electronic document on the display unit 2802, detect a first input from the stylus (e.g., with the detecting unit 2812), wherein detecting the first input includes detecting an initial contact by the stylus on the touch-sensitive surface unit 2804; determine a plurality of characteristics of the first input from the stylus (e.g., with the determining unit 2814), including a tilt of the stylus, wherein the tilt of the stylus is an angle relative to a normal to a surface of the touch-sensitive surface unit 2804; in accordance with a determination that the tilt meets one or more selection criteria for a first virtual drawing implement, select the first virtual drawing implement for the stylus to emulate (e.g., with the selecting unit 2816); in accordance with a determination that the tilt meets one or more selection criteria for a second virtual drawing implement, select the second virtual drawing implement for the stylus to emulate (e.g., with the selecting unit 2816), wherein the second virtual drawing implement is distinct from the first virtual drawing implement; and, after selecting one of the first virtual drawing implement and the second virtual drawing implement for the stylus to emulate, generate a mark in the electronic document with the selected virtual drawing implement (e.g., with the generating unit 2818) in response to detecting the first input from the stylus (e.g., with the detecting unit 2812).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 27A-27C are, optionally, implemented by components depicted in FIGS. 1A-1B or FIG. 28. For example, display operation 2702, detection operation 2704, determining operation 2706, selecting operation 2708, selecting operation 2710, and generating operation 2718 are, optionally, implemented by event sorter 170, event recognizer 180, and event handler 190. Event monitor 171 in event sorter 170 detects a contact (or near contact) on touch-sensitive display 112, and event dispatcher module 174 delivers the event information to application 136-1. A respective event recognizer 180 of application 136-1 compares the event information to respective event definitions 186, and determines whether a first contact (or near contact) at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Calendar Event Creation

Many electronic devices have electronic calendars. An electronic calendar may display events and associated information, such as event start time, event end time, event date, event title, event location, notes, etc. There is a need to provide efficient and convenient ways for users create events to be displayed in an electronic calendar. The embodiments described here enable users to provide imprecise hand-drawn input (e.g., by a finger or a stylus) on a touch-sensitive display to create an event in an electronic calendar with a precise start time and end time.

Below, FIGS. 29A-29H illustrate exemplary user interfaces for calendar event creation in accordance with some embodiments. FIGS. 30A-30D are flow diagrams illustrating a method of calendar event creation with hand-drawn input. The user interfaces in FIGS. 29A-29H are used to illustrate the processes in FIGS. 30A-30D.

FIGS. 29A-29H illustrate exemplary user interfaces for creating calendar events in accordance with some embodiments. The user interfaces in these figures are used to illustrate the processes described below, including the processes in FIGS. 30A-30D. Although some of the examples which follow will be given with reference to inputs on a touch-screen display (where the touch-sensitive surface and the display are combined), in some embodiments, the device detects inputs on a touch-sensitive surface 651 that is separate from the display 650, as shown in FIG. 6B.

In some embodiments, the device is an electronic device with a separate display (e.g., display 650) and a separate touch-sensitive surface (e.g., touch-sensitive surface 651). In some embodiments, the device is portable multifunction device 100, the display is touch-sensitive display system 112, and the touch-sensitive surface includes tactile output generators 163 on the display (FIG. 1A). For convenience of explanation, the embodiments described with reference to FIGS. 29A-29H and 30A-30D will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 650 and a separate touch-sensitive surface 651 in response to detecting the contacts described in FIGS. 29A-29H on the touch-sensitive surface 651 while displaying the user interfaces shown in FIGS. 29A-29H on the display 650, along with a focus selector.

Figure 29A:
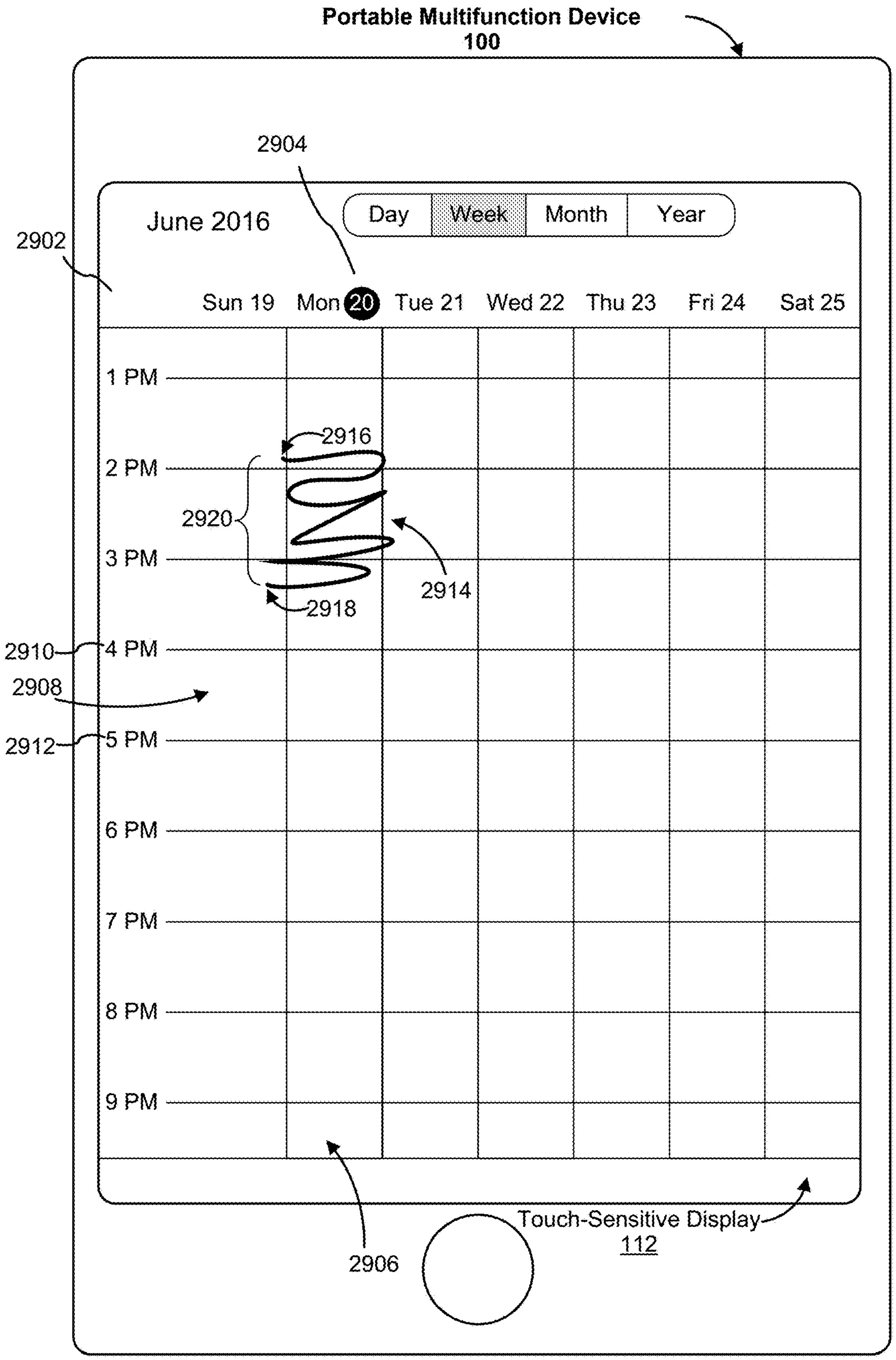
FIGS. 29A-29H illustrate exemplary user interfaces for calendar event creation in accordance with some embodiments.

FIG. 29A illustrates an example of a hand-drawn input for creating a calendar event. In this example, device 100 displays, at touch-sensitive display 112, an electronic calendar 2902. Calendar 2902 displays each day 2904 as a column 2906. In the illustrative example of FIG. 29A, Monday, June 20 is the day 2904 indicated at column 2906. Each column 2906 includes sub-areas 2908 that correspond to, e.g., hours of the day. In the illustrative example of FIG. 29A, the hour bounded by upper line 2910 (4 PM) and lower line 2912 (5 PM) is the hour indicated by sub-area 2908. Graphic 2914 corresponds to a hand-drawn input provided by a contact (such as a finger 202 or stylus 203). The hand drawn-input makes initial contact with touch-sensitive display 112 at point 2916, then moves across touch-sensitive display 112 along a line indicated by graphic 2914 until point 2918, where lift off of the contact from touch-sensitive display 112 occurs. Graphic 2914 is shown extending over a vertical portion 2920 of column 2906 (i.e., day 2904). The vertical extents of vertical portion 2920 are the same as or approximately equal to the vertical extents of the hand-drawn input. For example, the vertical extents of vertical portion 2920 may extend from point 2916 of initial contact of a contact with touch-sensitive display 112 to point 2918 of lift off of the contact from touch-sensitive display 112. In the illustrative example of FIG. 29A, an event created in accordance with vertical portion 2920 of day 2904 may have a start time of 2 PM and an end time of 3:30 PM. As discussed further below with regard to FIG. 30A, depending on time increments used to determine the start time and end time of an event, a different start time and/or end time may be determined from hand-drawn input indicated by graphic 2914.

Figure 29B:
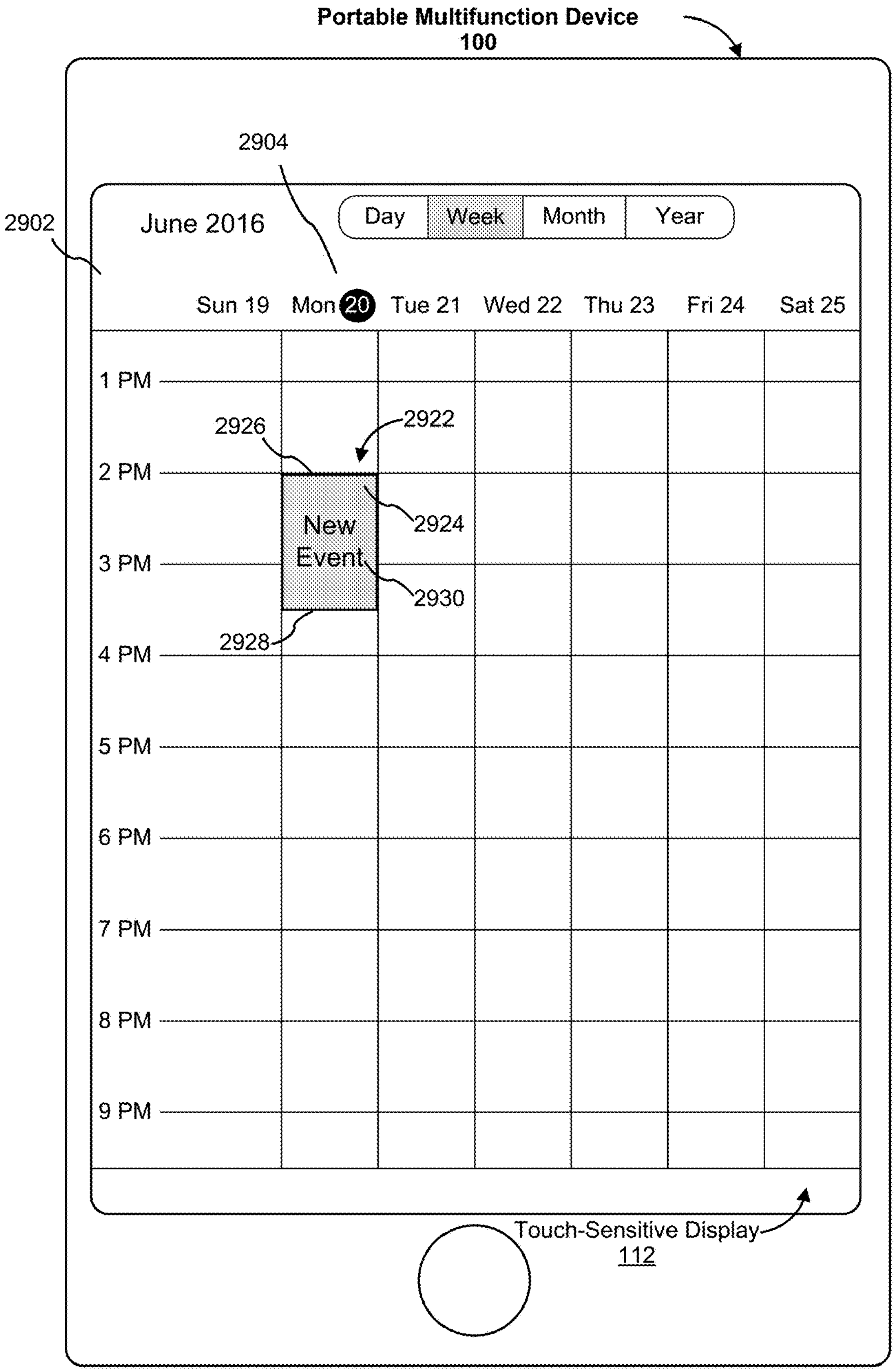

FIG. 29B illustrates an example of replacement graphics for an event. In this example, graphic 2914 that corresponds to hand-drawn input is replaced by predetermined graphics 2922. In some embodiments, replacement occurs in response to a received input that corresponds to a request to create an event in calendar 2902. For example, after providing hand-drawn input as indicated by graphic 2914, a user may tap on graphic 2914 to request to create an event. The event may be indicated in calendar 2902 with predetermined graphics 2922. In some embodiments, predetermined graphics 2922 that replace graphic 2914 include a box 2924 with upper side 2926 indicating an event start time and lower side 2928 indicating an end time. The vertical extents of predetermined graphics 2922 (e.g., from upper side 2926 to lower side 2928) are the same as or approximately equal to the vertical extents of vertical portion 2920. In some embodiments, predetermined graphics 2922 can include text 2930, such as default text (e.g., "New Event"), recognized characters corresponding to hand-written characters, etc.

Figure 29C:
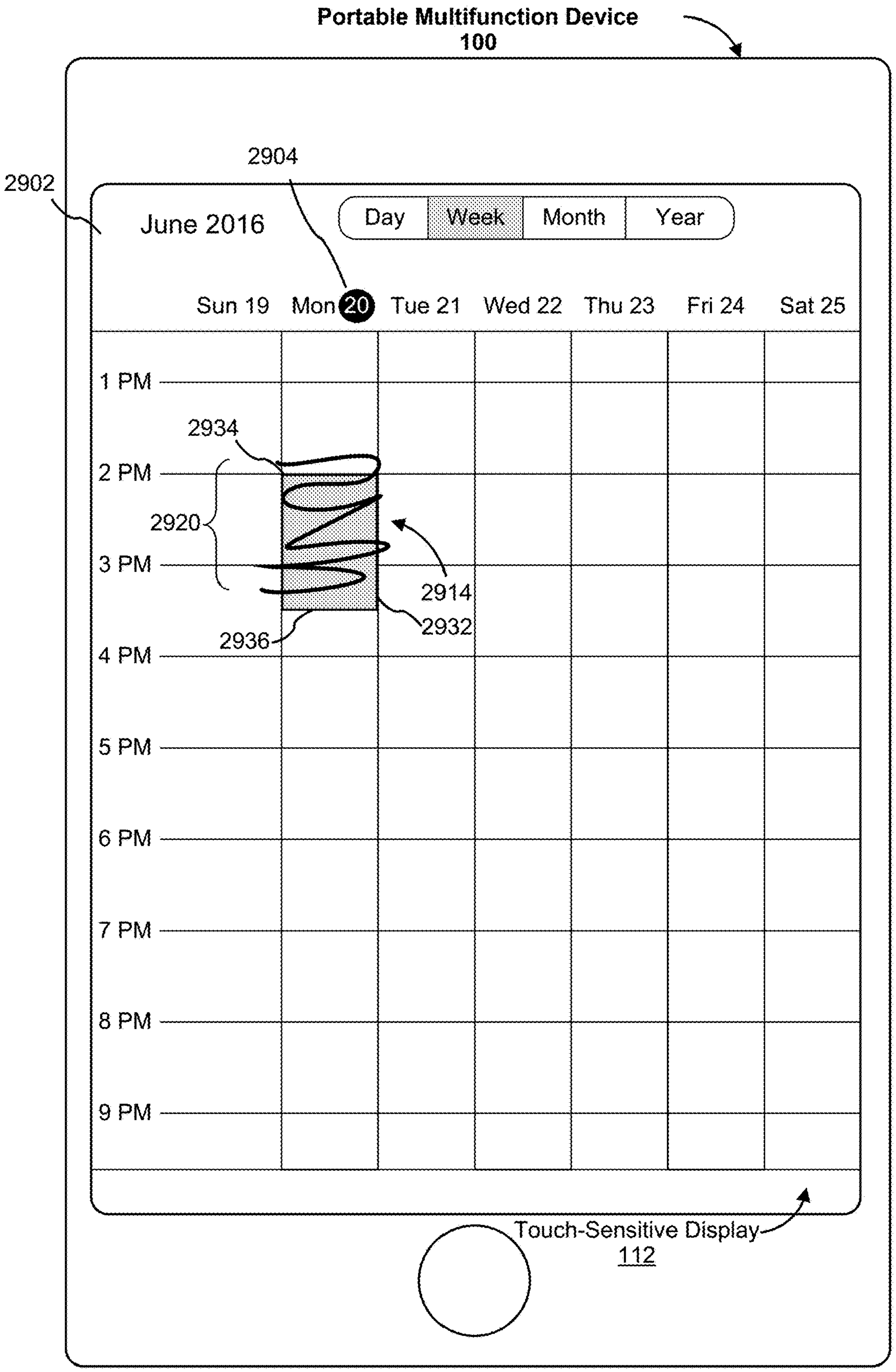

FIG. 29C illustrates an example of maintaining display of graphic 2914 that corresponds to the hand-drawn input and adding a graphic 2932 to indicate the start time and end time of an event. In some embodiments, maintaining display of graphic 2914 and adding a graphic 2932 occurs in response to a received input that corresponds to a request to create an event in calendar 2902. For example, after providing hand-drawn input as indicated by graphic 2914, a user may tap on graphic 2914 to request to create an event. The event may be indicated in calendar 2902 with graphic 2914 and additional graphic 2932. In some embodiments, additional graphic 2932 is a box with upper side 2934, indicating an event start time, and lower side 2936, indicating an end time. The vertical extents of additional graphic 2932 (e.g., from upper side 2934 to lower side 2936) may be the same as or approximately equal to the vertical extents of vertical portion 2920 of day 2904.

Figure 29D:
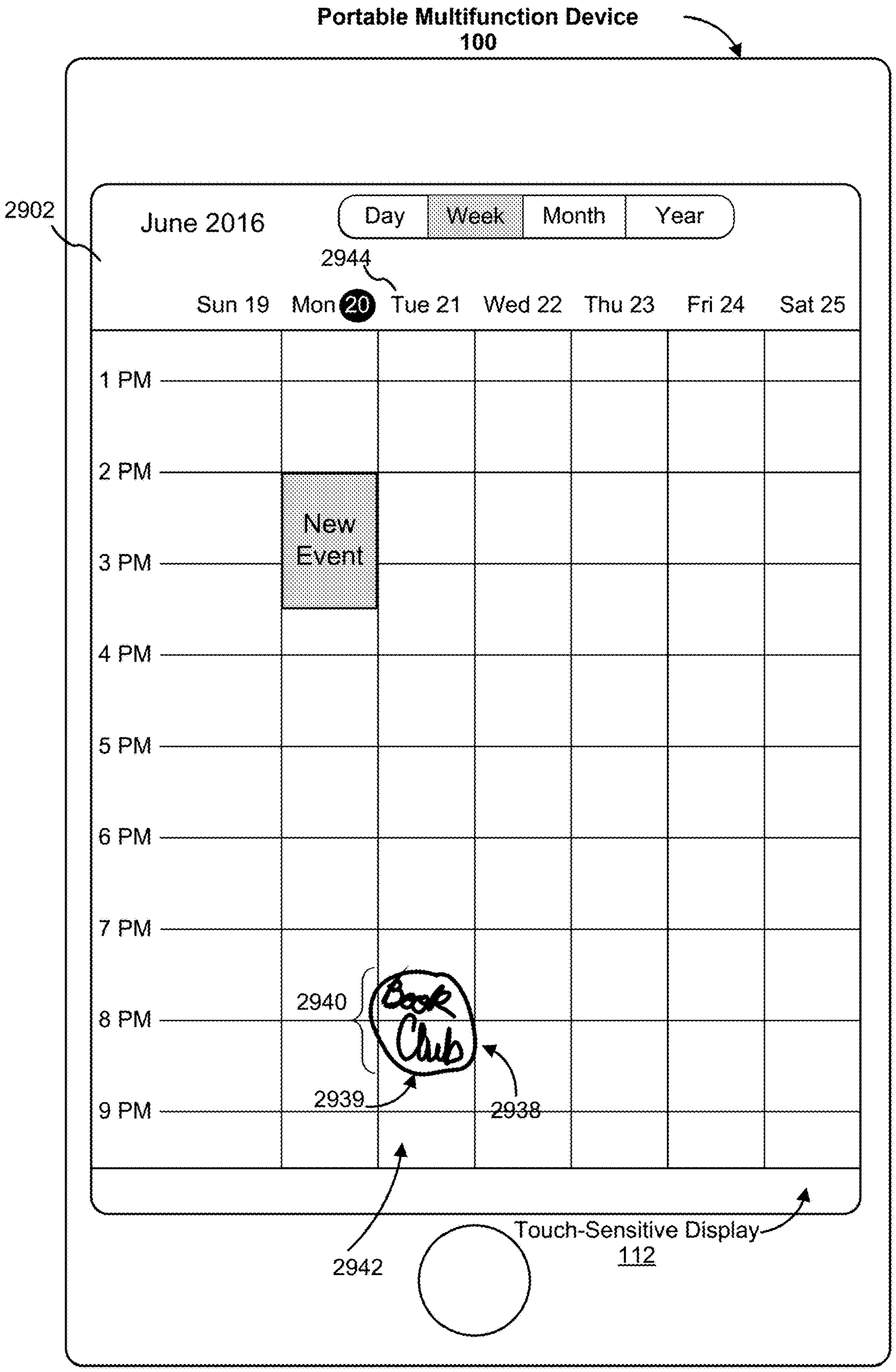

FIG. 29D illustrates an example of graphic 2938 corresponding to hand-drawn input including hand-written characters. In this example, device 100 displays, at touch-sensitive display 112, graphic 2938 corresponding to hand-drawn input provided by a contact (such as a finger 202 or stylus 203) including the words "Book Club" and a circle 2939 around the words. Graphic 2938 is shown extending over a vertical portion 2940 of column 2942 (i.e., day 2944). The vertical extents of vertical portion 2940 are the same as or approximately equal to the vertical extents of the hand-drawn input. In some embodiments, a calendar event including graphic 2938 is displayed in calendar 2902. In the illustrative example of FIG. 29D, an event created in accordance with vertical portion 2940 of day 2944 may have a start time of 7:30 PM and an end time of 8:30 PM. As discussed further below with regard to FIG. 30A, depending on time increments used to determine the start time and end time of an event, a different start time and/or end time may be determined from hand-drawn input indicated by graphic 2938.

Figure 29E:
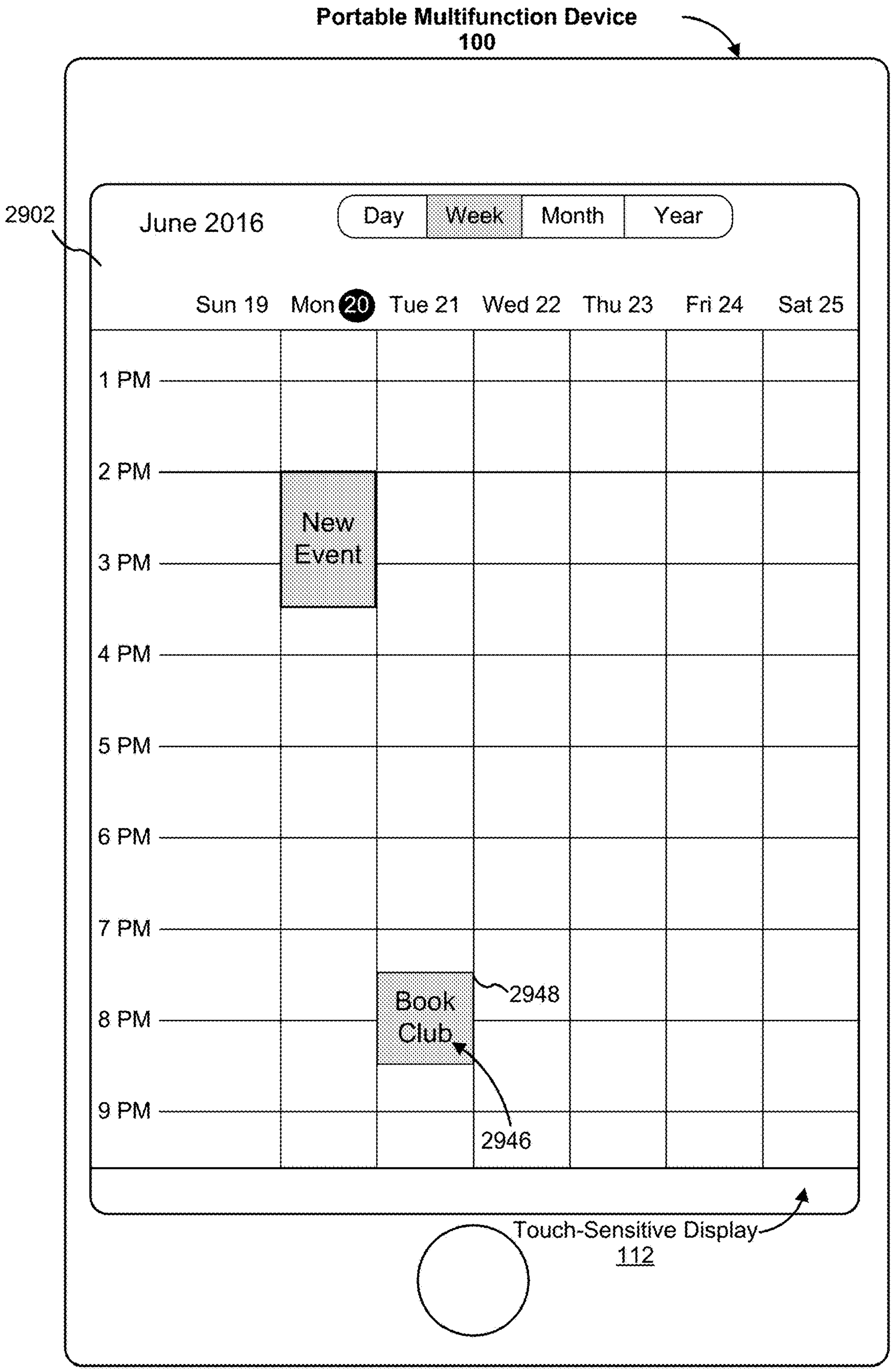

FIG. 29E illustrates an example of digital text that replaces recognized characters of hand-written characters. In some embodiments, when hand-drawn input (e.g., as indicated by graphic 2938) includes hand-written characters, the hand-written characters in the hand-drawn input are recognized. For example, the characters forming the words "Book Club" in hand-drawn input (e.g., indicated by graphic 2938 of FIG. 29D) are recognized. In FIG. 29E, device 100 displays, at touch-sensitive display 112, an event 2948 with digital text 2946 including the recognized characters "Book Club."

Figure 29F:
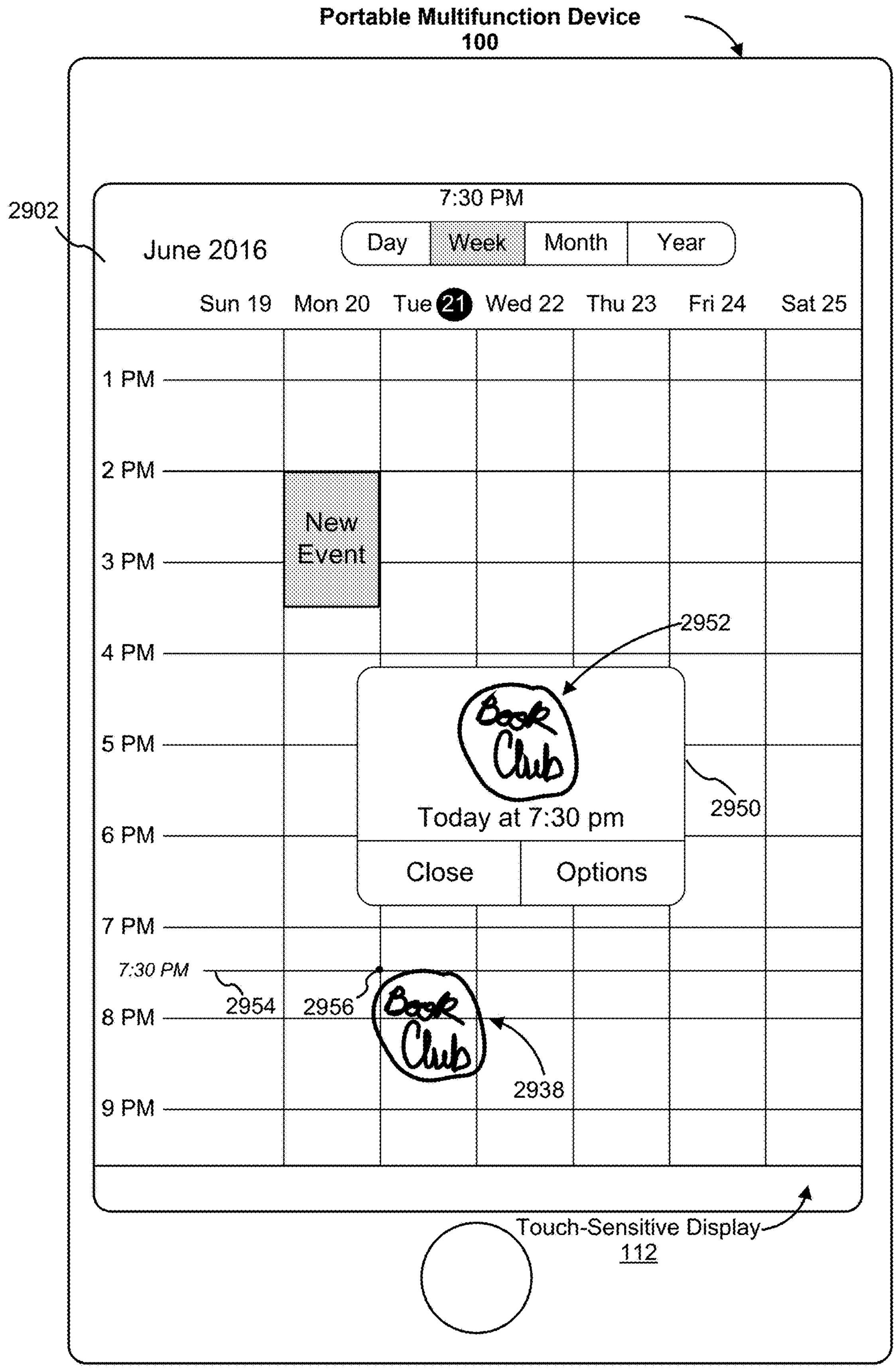

FIG. 29F illustrates an example of an event reminder including a graphic. In this example, event reminder 2950 including graphic 2952 is displayed on touch-sensitive display 112. In some embodiments, device 100 detects that a current time is the start time of an event (e.g., start time 7:30 of an event indicated by graphic 2938). The current time may be visually indicated in calendar 2902 by current time indicator 2954 and/or current day indicator 2956. In response to detecting that the current time is the start time of the event indicated by graphic 2938, device 100 displays an event reminder 2950. Event reminder 2950 includes graphic 2952 that corresponds to graphic 2938 for the event that is the subject of the reminder. In some embodiments, the event reminder is displayed at one or more predetermined times before the calendar event (e.g., 5, 10, 15, 30, and/or 60 minutes before the event).

Figure 29G:
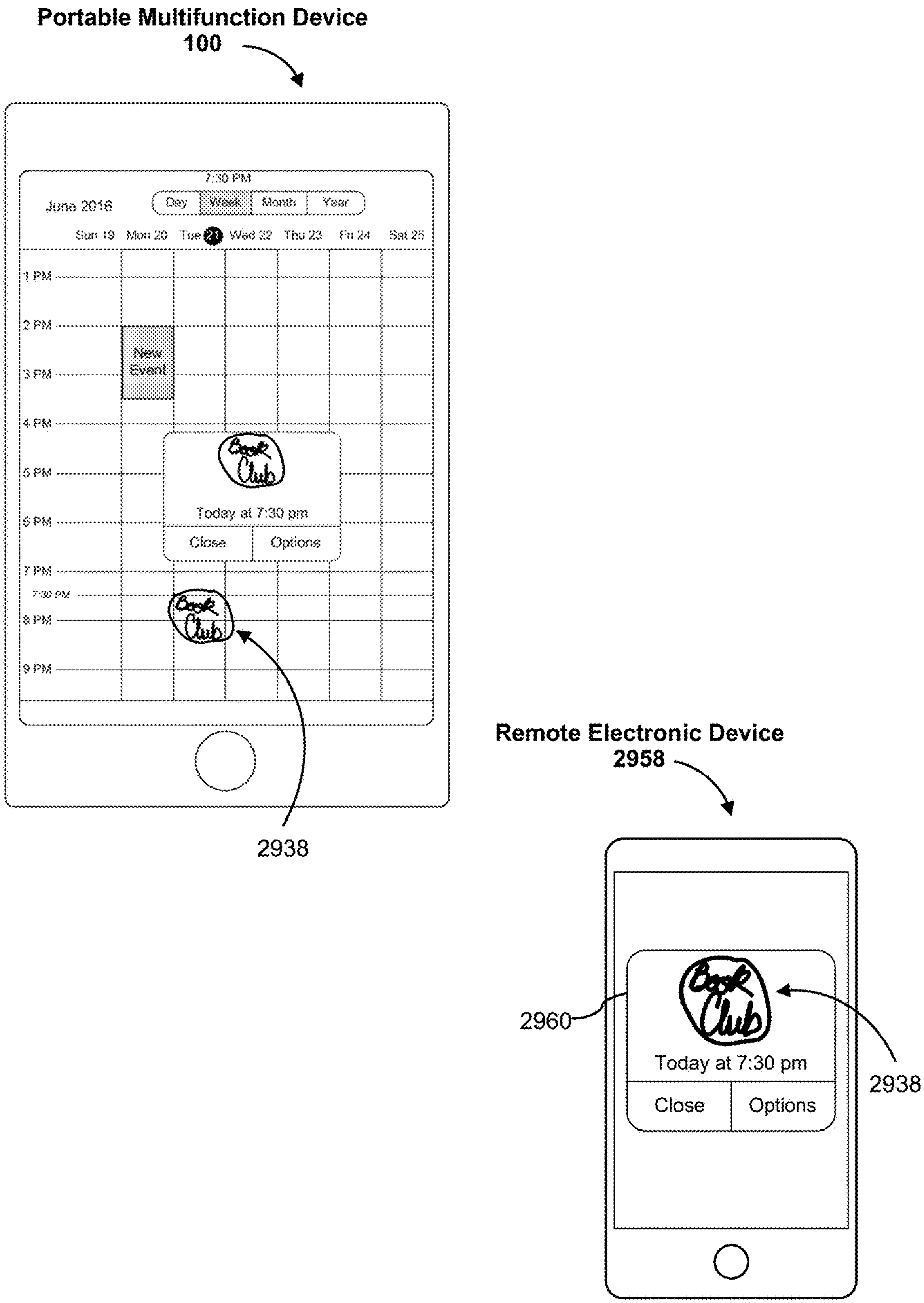

FIG. 29G illustrates an example of a remote electronic device 2958 displaying a representation of an event received from device 100. In this example, an event indicated by graphic 2938 is sent from device 100 to remote device 2958. Remote electronic device 2958 displays a representation 2960 of the received event. The representation 2960 of the event includes graphic 2938 corresponding to the received event. In some embodiments, remote electronic device 2958 displays a representation 2960 including digital text (e.g., digital text 2946 including recognized characters).

Figure 29H:
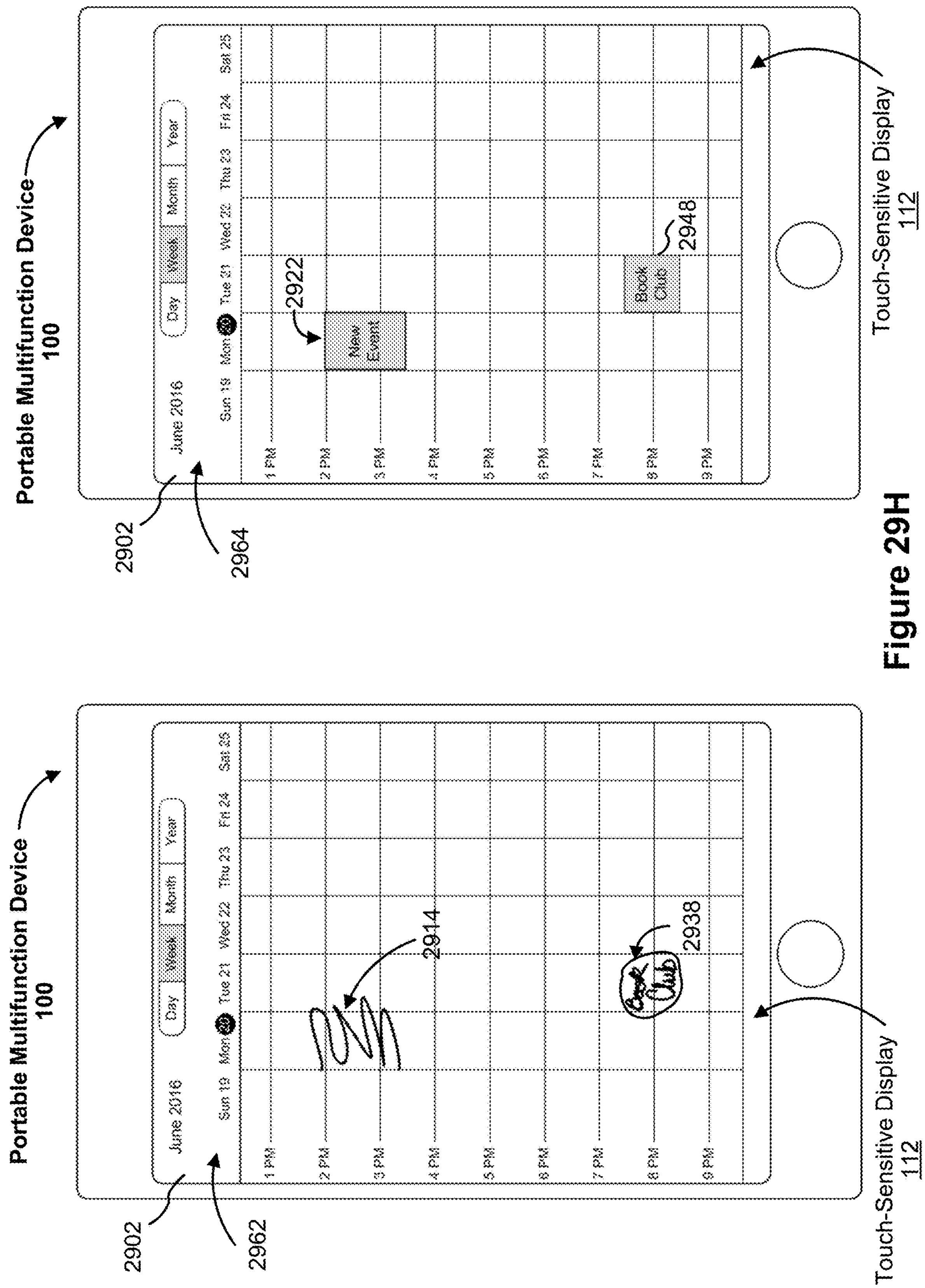
Figure 30A:
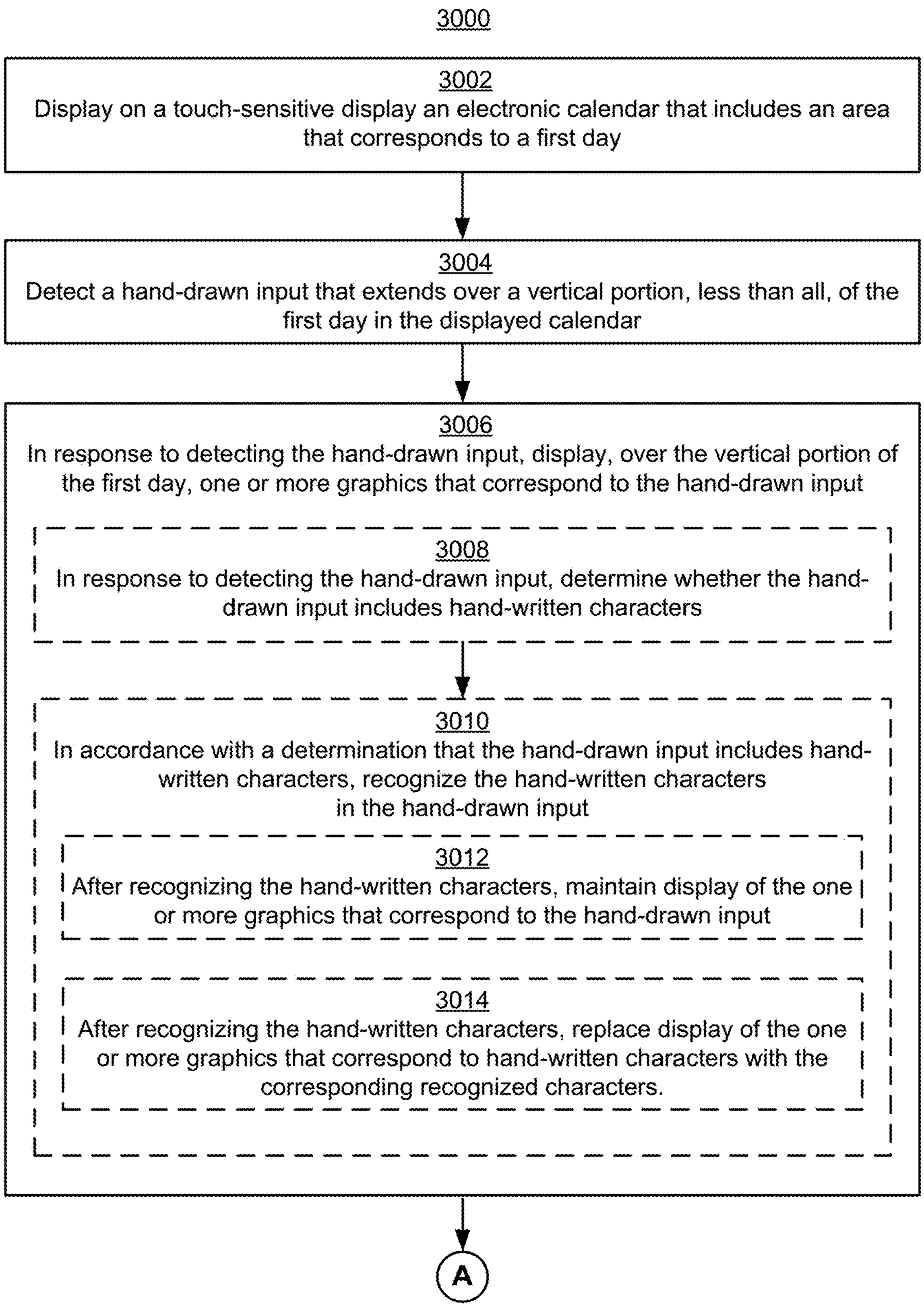
Figure 30D:
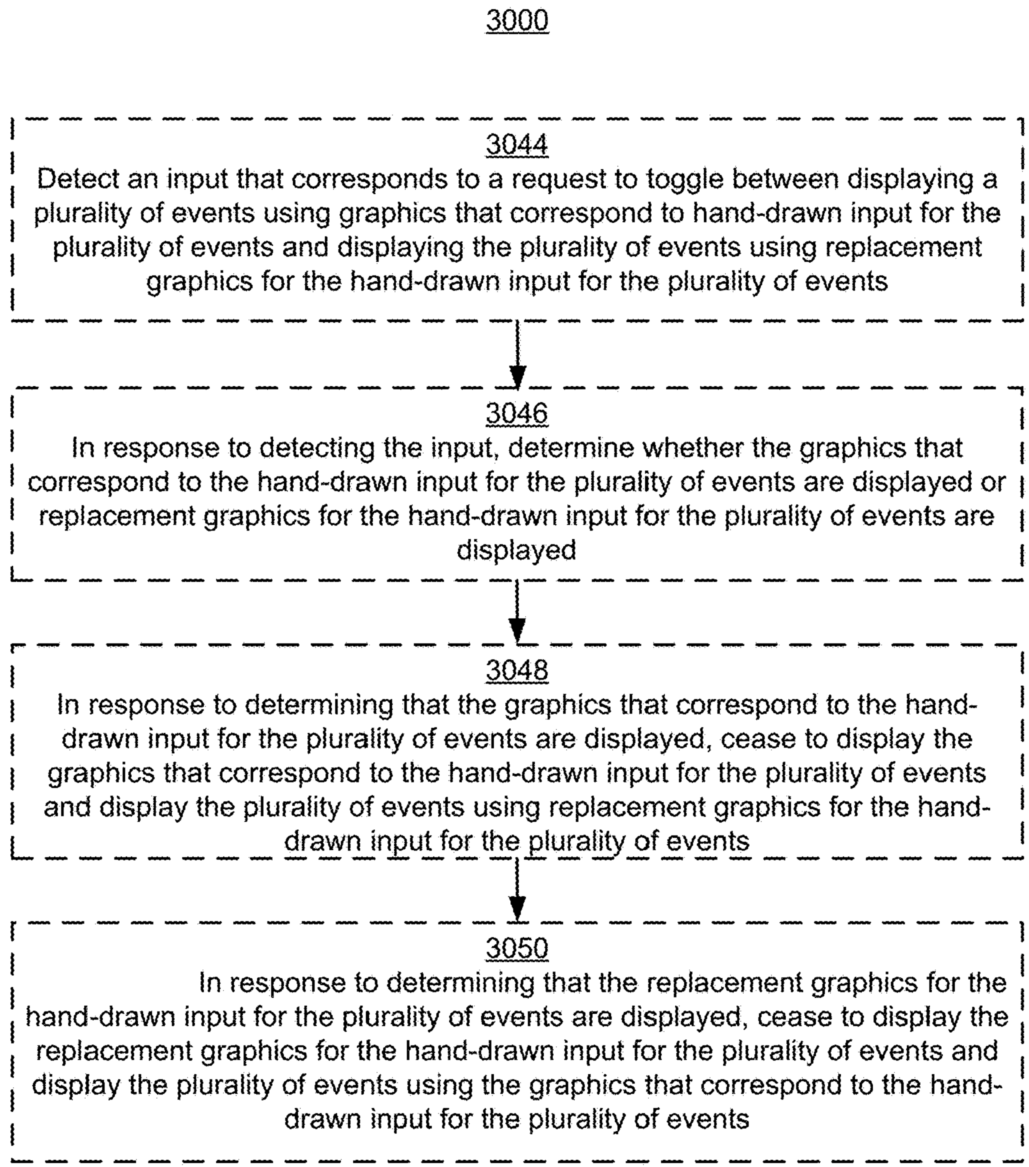

FIG. 29H illustrates examples toggling between viewing graphics corresponding to hand-drawn input and viewing replacement graphics for the hand-drawn input. In a first state 2962, device 100 displays graphics 2914, 2938 corresponding to hand-drawn input for events. In a second state 2964, device 100 displays replacement graphics 2922, 2948 that replace the graphics 2914, 2938, respectively, corresponding to hand-drawn input for the events.

Input detected at touch-sensitive display 112 may be used to request toggling for a single event between display of a graphic corresponding to hand-drawn input and replacement graphics for the hand drawn input. For example, when input is received on touch-sensitive display 112 at graphic 2914 corresponding to hand-drawn input, device 100 ceases to display graphic 2914 and displays replacement graphic 2922 on touch-sensitive display 112. When input is received on touch-sensitive display 112 at replacement graphic 2922, device 100 ceases to display 2922 and displays 2914 on touch-sensitive display 112. When input is received on touch-sensitive display 112 at graphic 2938 corresponding to hand-drawn input, device 100 ceases to display graphic 2938 and displays replacement graphic 2948 on touch-sensitive display 112. When input is received on touch-sensitive display 112 at graphic 2948, device 100 ceases to display graphic 2948 and displays graphic 2938 on touch-sensitive display 112.

Input detected at touch-sensitive display 112 may be used to request toggling for multiple events between display of graphics corresponding to hand-drawn input and replacement graphics for the hand drawn input. For example, when input is received on touch-sensitive display 112 to request toggling for multiple events, if device 100 is displaying graphics 2914, 2938 corresponding to hand-drawn input, device 100 ceases to display graphics 2914, 2938 and displays replacement graphics 2922, 2948 on touch-sensitive display 112. When input is received on touch-sensitive display 112 to request toggling for multiple events, if device 100 is displaying graphics 2922, 2948 corresponding to hand-drawn input, device 100 ceases to display graphics 2922, 2948 and displays replacement graphics 2914, 2938 on touch-sensitive display 112.

FIGS. 30A-30D are flow diagrams illustrating a method 3000 of calendar event creation from hand-drawn input in accordance with some embodiments. The method 3000 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is separate from the touch-sensitive surface. Some operations in method 3000 are, optionally, combined and/or the order of some operations is, optionally, changed.

As described below, the method 3000 provides an intuitive way to create a calendar event with precise start and end times from imprecise hand-drawn input. The method reduces the number, extent, and/or nature of the inputs from a user when creating calendar events, thereby creating a more efficient human-machine interface. For battery-operated electronic devices, enabling a user to create calendar events faster and more efficiently conserves power and increases the time between battery charges.

The device displays (3002) an electronic calendar including an area that corresponds to a first day. In some embodiments, an area that corresponds to a first day is a column that includes sub-areas that correspond to hours in the first day. For example, FIG. 29A shows electronic calendar 2902 displayed on touch-sensitive display 112 of device 100. Calendar 2902 includes area 2906 that corresponds to a day 2904. Area 2906 is a column including sub-areas 2908 that correspond to hours in the day 2904.

In some embodiments, device 100 includes one or more sensors to detect signals from a stylus associated with the device.

The device detects (3004) a hand-drawn input (e.g., an input drawn with a finger or a stylus) on the touch-sensitive display. The hand-drawn input extends over (spans) a vertical portion, less than all, of the first day in the displayed calendar. For example, in FIG. 29A, hand-drawn input (indicated by graphic 2914) is detected by device 100. The hand-drawn input in FIG. 29A extends over vertical portion 2920 of day 2904 in displayed calendar 2902. In another example, in FIG. 29C, hand-drawn input (indicated by graphic 2938) is detected by device 100. The hand-drawn input in FIG. 29C extends over vertical portion 2940 of day 2944 in displayed calendar 2902.

In response to detecting the hand-drawn input, the device displays (3006), over the vertical portion of the first day, a graphic that corresponds to the hand-drawn input. For example, the device displays one or more electronic marks, such as lines and/or dots, that correspond to the movements made with a finger or stylus in the hand-drawn input. In the illustrative example of FIG. 29A, device 100 displays, over vertical portion 2920 of day 2904, graphic 2914 that corresponds to hand-drawn input received at touch-sensitive display 112. In the illustrative example of FIG. 29C, device 100 displays, over vertical portion 2940 of day 2944, graphic 2938 that corresponds to hand-drawn input received at touch-sensitive display 112.

In some embodiments, in response to detecting the hand-drawn input, the device determines (3008) whether the hand-drawn input includes hand-written characters (e.g., text or other characters written with a finger or a stylus). For example, when hand-drawn input (e.g., as indicated by graphic 2914) is received as shown in FIG. 29A, device 100 determines that the hand-drawn input does not include hand-written characters. When hand-drawn input (e.g., as indicated by graphic 2938) is received as shown in FIG. 29D, device 100 determines that the hand-drawn input includes hand-written characters (e.g., the characters of the words "Book Club"). In accordance with a determination that the hand-drawn input includes hand-written characters, the device recognizes (3010) the hand-written characters in the hand-drawn input. For example, the device performs optical character recognition (OCR) on hand-drawn input (e.g., on graphic 2938 corresponding to the hand-drawn input) to recognize the hand-written characters. Such recognized text is then electronically searchable by the device. In some embodiments, recognizing the hand-written characters is performed automatically in response to detecting the hand-drawn input, without an express user input requesting that handwriting recognition be performed. In some embodiments, the handwritten text is maintained in an event, but the recognized characters are indexed for search, so that a text search that includes the recognized characters will return the event as a result.

In some embodiments, after recognizing the hand-written characters, the device maintains (3012) display of the graphic that corresponds to the hand-drawn input. For example, as shown in FIG. 29D, after device 100 recognizes the hand-written characters in the hand-drawn input indicated by graphic 2938, device 100 displays graphic 2938 at touch-sensitive display 112.

In some embodiments, after recognizing the hand-written characters, the device replaces (3014) display of the graphics that correspond to hand-written characters with the corresponding recognized characters (e.g., hand-written text is replaced with the corresponding digital text on the display). For example, in FIG. 29D, graphics 2938 are shown that correspond to hand-written characters, and in FIG. 29E, graphics 2938 are replaced by digital text 2946 indicating "Book Club." In some embodiments, when hand-written input is replaced with the corresponding digital text, display of graphics that do not correspond to hand-written characters is maintained. For example, in FIG. 29D, handwritten input as indicated by graphics 2938 includes circle 2939 around the handwritten characters indicating "Book Club." In some embodiments, when handwritten-input as indicated by graphics 2938 is replaced with digital text indicating "Book Club," the replacement graphics 2948 include circle 2939, e.g., around digital text 2946.

While displaying, over the vertical portion of the first day, the graphic that corresponds to the hand-drawn input, the device detects (3016) an input that corresponds to a request to create an event in the electronic calendar.

In some embodiments, the input that corresponds to a request to create an event in the electronic calendar includes ceasing (3018) to detect the hand-drawn input (e.g., the event is created in response to detecting lift-off of the finger or stylus that is making the hand-drawn input, or after a predetermined time has elapsed since detecting lift-off of the finger or stylus that is making the hand-drawn input). For example, in FIG. 29A, an input that corresponds to a request to create an event in calendar 2902 may include lift-off of a contact from touch-sensitive display 112, e.g., a lift-off occurring at point 2918.

In some embodiments, the input that corresponds to a request to create an event in the electronic calendar is detected (3020) on the graphic that corresponds to the hand-drawn input (e.g., a tap gesture on the graphics over the vertical portion of the first day). For example, in FIG. 29A, an input that corresponds to a request to create an event in calendar 2902 may be detected when contact with touch-sensitive display 112 occurs at the location of touch-sensitive display 112 where graphic 2914 is displayed. In FIG. 29D, an input that corresponds to a request to create an event in electronic calendar 2902 may be detected when contact with touch-sensitive display 112 occurs at the location of touch-sensitive display 112 where graphic 2938 is displayed. In some embodiments, a finger gesture (e.g., a tap gesture) on the graphics creates an event, while a stylus gesture on the graphics does not create an event.

In response to detecting the input that corresponds to a request to create an event in the electronic calendar, the device creates (3022), in the first day in the electronic calendar, an event with a start time and an end time, wherein the start time and the end time of the event are in accordance with the vertical portion of the first day. In some embodiments, the start time corresponds to the top of the displayed graphics and the end time corresponds to the bottom of the displayed graphics. In some embodiments, the start time corresponds to a time increment that is closest to the top of the displayed graphics and the end time corresponds to a time increment that is closest to the bottom of the displayed graphics. In some embodiments, the time increments are 15-minute increments so that the start and end times end with :00, :15, :30, or :45.

For example, in response to detecting an input that corresponds to a request to create an event (e.g., input received at graphic 2914 of FIG. 29A), device 100 creates an event with a start time (e.g., 1:52 PM) and an end time (e.g., 3:25 PM) in accordance with vertical portion of the first day (e.g., vertical portion 2920 of first day 2904). When the start time corresponds to a time increment that is closest to the top of graphic 2914 and the end time corresponds to a time increment that is closest to the bottom of graphic 2914, and the time increments are 15-minute increments, the event start time is 2 PM and the end time is 3:30 PM. In some embodiments, the time increments are 5, 10, or 30-minute increments. In some embodiments, the vertical extent of the hand-drawn input can correspond to any time span drawn over by the user, from less than an hour to multiple hours. The time and length of the event is in accordance with the position and length of the vertical portion of the hand-drawn input in the first day, which a user is free to draw.

In some embodiments, in response to detecting the input that corresponds to a request to create an event in the electronic calendar, the device maintains (3024) display, over the vertical portion of the first day, of the graphic that corresponds to the hand-drawn input. For example, in response to input that corresponds to a request to create an event (e.g., input received at graphic 2914 of FIG. 29A), device 100 maintains display of graphic 2914 (e.g., as shown in FIG. 29C).

In some embodiments, in response to detecting the input that corresponds to a request to create an event in the electronic calendar, the device maintains (3026) display, over the vertical portion of the first day, of the graphic that corresponds to the hand-drawn input and adds one or more graphics to indicate the start time and the end time of the event. In some embodiments, the device adds a box at the time slot for the event, e.g., behind the graphics that correspond to the hand-drawn input, where the top of the box is the start time and the bottom of the box is the end time. For example, in response to input that corresponds to a request to create an event (e.g., input received at graphic 2914 of FIG. 29A), device 100 maintains display of graphic 2914 (e.g., as shown in FIG. 29C) and adds a box 2932 behind graphic 2914. Box 2932 has upper side 2934 indicating the start time (e.g., 2 PM) of the event and lower side 2936 indicating the end time (e.g., 3:30 PM) of the event. In some embodiments, the device adds (e.g., to graphic 2914) a line for the start time and a line for the end time In some embodiments, in response to detecting the input that corresponds to a request to create an event in the electronic calendar, the device replaces (3028) display of the graphic that corresponds to the hand-drawn input with display of predetermined graphics for the event. For example, device 100 replaces graphic 2914 corresponding to hand-drawn input, as shown in FIG. 29A, with predetermined graphics 2922, as shown in FIG. 29B.

In some embodiments, the device detects (3030) that a current time is the start time of the event. In response to detecting that the current time is the start time of the event, the device displays (3032) an event reminder on the touch-sensitive display, wherein the displayed event reminder includes the graphic that corresponds to the hand-drawn input. Displaying the original graphics eliminates the need to correctly interpret/recognize the graphics. For example, in FIG. 29F, at the start time for an event corresponding to hand drawn input indicated by graphic 2938, device 100 displays event reminder 2950 including graphic 2952 that corresponds to the hand-drawn input.

In some embodiments, the device sends (3034) the event to a second electronic device, remote from the electronic device with the touch-sensitive display. A representation of the event is configured to be displayed on the second electronic device with the graphic that corresponds to the hand-drawn input. For example, in FIG. 29G, device 100 sends (e.g., using communication module 128) an event corresponding to graphic 2938 to remote electronic device 2958. Remote electronic device 2958 displays representation 2960 of the event corresponding to graphic 2938. The representation 2960 of the event displayed by remote electronic device 2958 includes graphic 2938. In some embodiments, after the event has been created in the electronic calendar, the event can be sent to others (e.g., via email or instant message) and otherwise used like calendar events created in electronic calendars by conventional methods. Conversely, before the event has been created in the electronic calendar, the event cannot be sent to others or otherwise used like calendar events created in electronic calendars by conventional methods.

In some embodiments, the device detects (3036) an input that corresponds to a request to toggle between displaying the event using the graphic that corresponds to the hand-drawn input and displaying the event using replacement graphics for the hand-drawn input. In response to detecting the input, the device determines (3038) whether the graphic that corresponds to the hand-drawn input for the event is displayed or the replacement graphics for the hand-drawn input for the event are displayed. In response to determining that the graphic that corresponds to the hand-drawn input is displayed, the device ceases (3040) to display the graphic that corresponds to the hand-drawn input and the device displays the event using the replacement graphics for the hand-drawn input for the event. In response to determining that the replacement graphics for the hand-drawn input are displayed, the device ceases (3042) to display the replacement graphics for the hand-drawn input and the device displays the event using the graphic that corresponds to the hand-drawn input.

For example, when device 100 detects an input that corresponds to a request to toggle between displaying the event using the graphic that corresponds to the hand-drawn input and displaying the event using replacement graphics for the hand drawn input, device 100 determines whether a graphic that corresponds to hand-drawn input, (e.g., graphic 2914 shown in FIG. 29A) is displayed, or replacement graphics (e.g., predetermined graphics 2922 shown in FIG. 29B) are displayed. In response to determining that a graphic that corresponds to hand-drawn input (e.g., graphic 2914 shown in FIG. 29A) is displayed, device 100 ceases to display graphic 2914 and device 100 displays replacement graphics (e.g., predetermined graphics 2922 as indicated at FIG. 29B). In response to determining that replacement graphics (e.g. predetermined graphics 2922) are displayed, device 100 ceases to display replacement graphics 2922 and device 100 displays graphic 2914 corresponding to hand-drawn input.

In some embodiments, the device detects (3044) an input that corresponds to a request to toggle between displaying a plurality of events using graphics that correspond to hand-drawn input for the plurality of events and displaying the plurality of events using replacement graphics for the hand-drawn input for the plurality of events. In response to detecting the input, the device determines (3046) whether the graphics that correspond to the hand-drawn input for the plurality of events are displayed or replacement graphics for the hand-drawn input for the plurality of events are displayed. In response to determining that the graphics that correspond to the hand-drawn input for the plurality of events are displayed, the device ceases (3048) to display the graphics that correspond to the hand-drawn input for the plurality of events and the device displays the plurality of events using replacement graphics for the hand-drawn input for the plurality of events. In response to determining that replacement graphics for the hand-drawn input for the plurality of events are displayed, the device ceases (3050) to display the replacement graphics for the hand-drawn input for the plurality of events and the device displays the plurality of events using the graphics that correspond to the hand-drawn input for the plurality of events.

For example, in FIG. 29H, in a first state indicated at 2962, device 100 displays a plurality of events using graphics 2914 and 2938 corresponding to hand-drawn input. When device 100 detects an input that corresponds to a request to toggle between displaying a plurality of events using graphics that correspond to hand-drawn input for the plurality of events and displaying the plurality of events using replacement graphics for the hand-drawn input for the plurality of events, device 100 ceases to display graphics 2914 and 2938 and device 100 displays replacement graphics 2922 and 2948, as indicated in a second state 2964 of device 100. When device 100 is in a second state indicated at 2964, if device 100 detects an input that corresponds to a request to toggle between displaying a plurality of events using graphics that correspond to hand-drawn input for the plurality of events and displaying the plurality of events using replacement graphics for the hand-drawn input for the plurality of events, device 100 ceases to display replacement graphics 2922 and 2948 and device 100 displays graphics 2914 and 2938 corresponding to hand-drawn input, as indicated in first state 2962 of device 100.

It should be understood that the particular order in which the operations in FIGS. 30A-30D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the first paragraph of the Description of Embodiments above) are also applicable in an analogous manner to method 3000 described above with respect to FIGS. 30A-30D. For example, the contact, gestures, and user interface objects (e.g., graphics) described above with reference to method 3000 optionally have one or more of the characteristics of the contact, gestures, and user interface objects (e.g., graphics) described herein with reference to other methods described herein (e.g., those listed in the first paragraph of the Description of Embodiments above). For brevity, these details are not repeated here.

Figure 31:
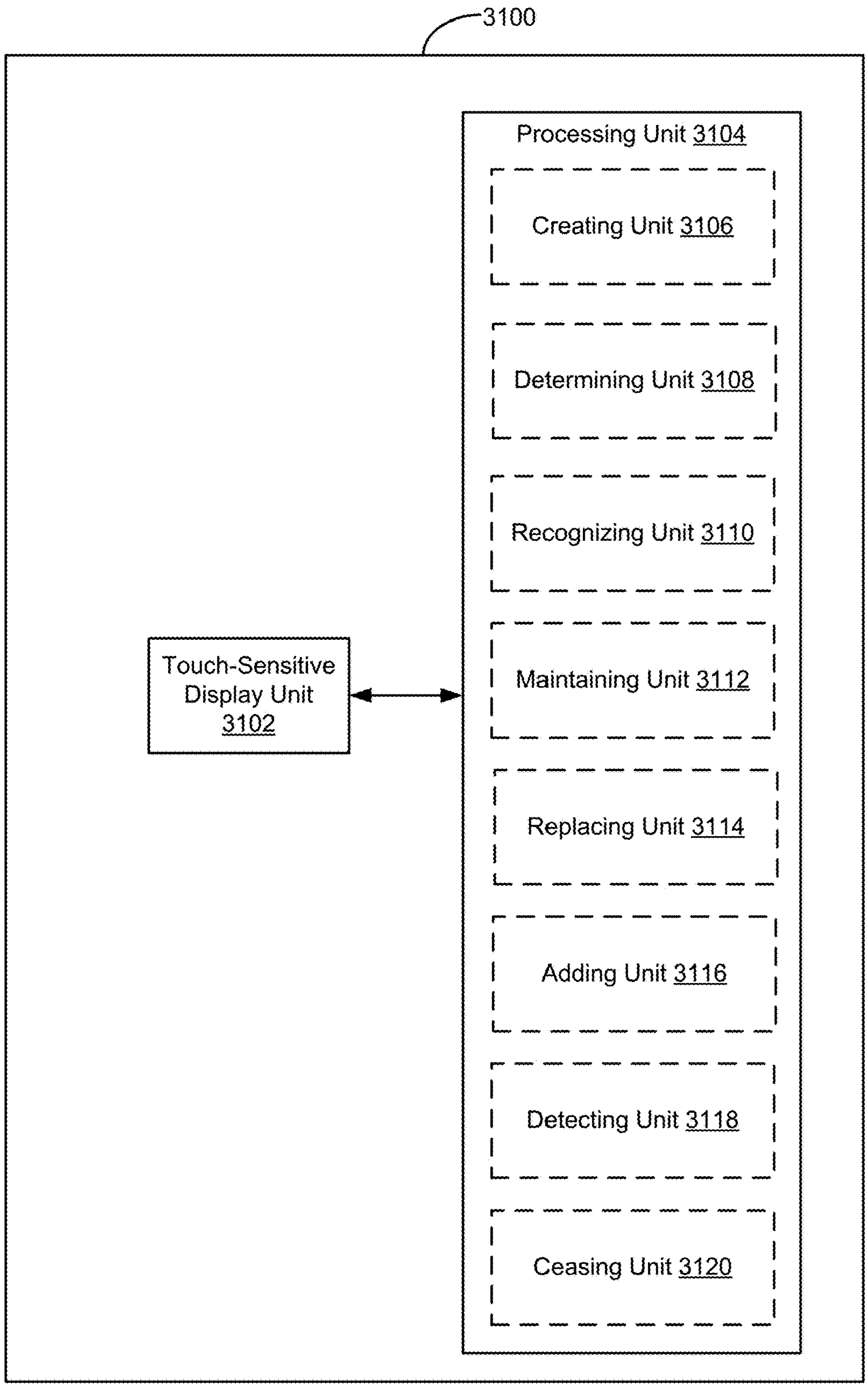
FIG. 31 is a functional block diagram of an electronic device in accordance with some embodiments.

In accordance with some embodiments, FIG. 31 shows a functional block diagram of an electronic device 3100 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 31 are, optionally, combined or separated into sub-blocks to implement the principles of the various described embodiments. Therefore, the description herein optionally supports any possible combination or separation or further definition of the functional blocks described herein.

As shown in FIG. 31, an electronic device 3100 includes a touch-sensitive display unit 3102 and a processing unit 3104 coupled with the touch-sensitive display unit 3102. In some embodiments, the processing unit 3104 includes a creating unit 3106, a determining unit 3108, a recognizing unit 3110, a maintaining unit 3112, a replacing unit 3114, an adding unit 3116, a detecting unit 3118, and a ceasing unit 3120.

The touch-sensitive display unit 3102 is configured to display an electronic calendar on the touch-sensitive display unit 3102, the displayed calendar including an area that corresponds to a first day. The touch-sensitive display unit 3102 is further configured to detect a hand-drawn input on the touch-sensitive display unit 3102, wherein the hand-drawn input extends over a vertical portion, less than all, of the first day in the displayed calendar. The touch-sensitive display unit 3102 is further configured to, in response to detecting the hand-drawn input, display, over the vertical portion of the first day, graphics that correspond to the hand-drawn input; and, while displaying, over the vertical portion of the first day, the graphics that correspond to the hand-drawn input, detect an input that corresponds to a request to create an event in the electronic calendar.

The processing unit 3104 is configured to, in response to detecting the input that corresponds to a request to create an event in the electronic calendar, create (e.g., with the creating unit 3106), in the first day in the electronic calendar, an event with a start time and an end time, wherein the start time and the end time of the event are in accordance with the vertical portion of the day.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 30A-30D are, optionally, implemented by components depicted in FIGS. 1A-1B or FIG. 31. For example, detection operations 3004, 3016 and creating operation 3022 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Selecting a Portion of Video

Many electronic devices have graphical user interfaces for video editing. There is often a need to select a portion of video during a video editing session. For example, a user may wish to select a portion of video to preview the selected portion of video, perform an operation on the selected portion of video, etc. The embodiments below improve on the existing methods by allowing a user to provide imprecise input at a touch-sensitive display using a contact such as a stylus, finger, etc. that nevertheless precisely selects a portion of video.

Below, FIGS. 32A-32F illustrate exemplary user interfaces for selecting a portion of video. FIGS. 33A-33B are flow diagrams illustrating a method of selecting a portion of video. The user interfaces in FIGS. 32A-32F are used to illustrate the processes in FIGS. 33A-33B.

FIGS. 32A-32F illustrate exemplary user interfaces for selecting a portion of video in accordance with some embodiments. The user interfaces in these figures are used to illustrate the processes described below, including the processes in FIGS. 33A-33B. Although some of the examples which follow will be given with reference to inputs on a touch-screen display (where the touch-sensitive surface and the display are combined), in some embodiments, the device detects inputs on a touch-sensitive surface 651 that is separate from the display 650, as shown in FIG. 6B.

In some embodiments, the device is an electronic device with a separate display (e.g., display 650) and a separate touch-sensitive surface (e.g., touch-sensitive surface 651). In some embodiments, the device is portable multifunction device 100, the display is touch-sensitive display system 112, and the touch-sensitive surface includes tactile output generators 163 on the display (FIG. 1A). For convenience of explanation, the embodiments described with reference to FIGS. 32A-33F and 33A-33B will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 650 and a separate touch-sensitive surface 651 in response to detecting the contacts described in FIGS. 32A-32F on the touch-sensitive surface 651 while displaying the user interfaces shown in FIGS. 32A-32F on the display 650, along with a focus selector.

Figure 32A:
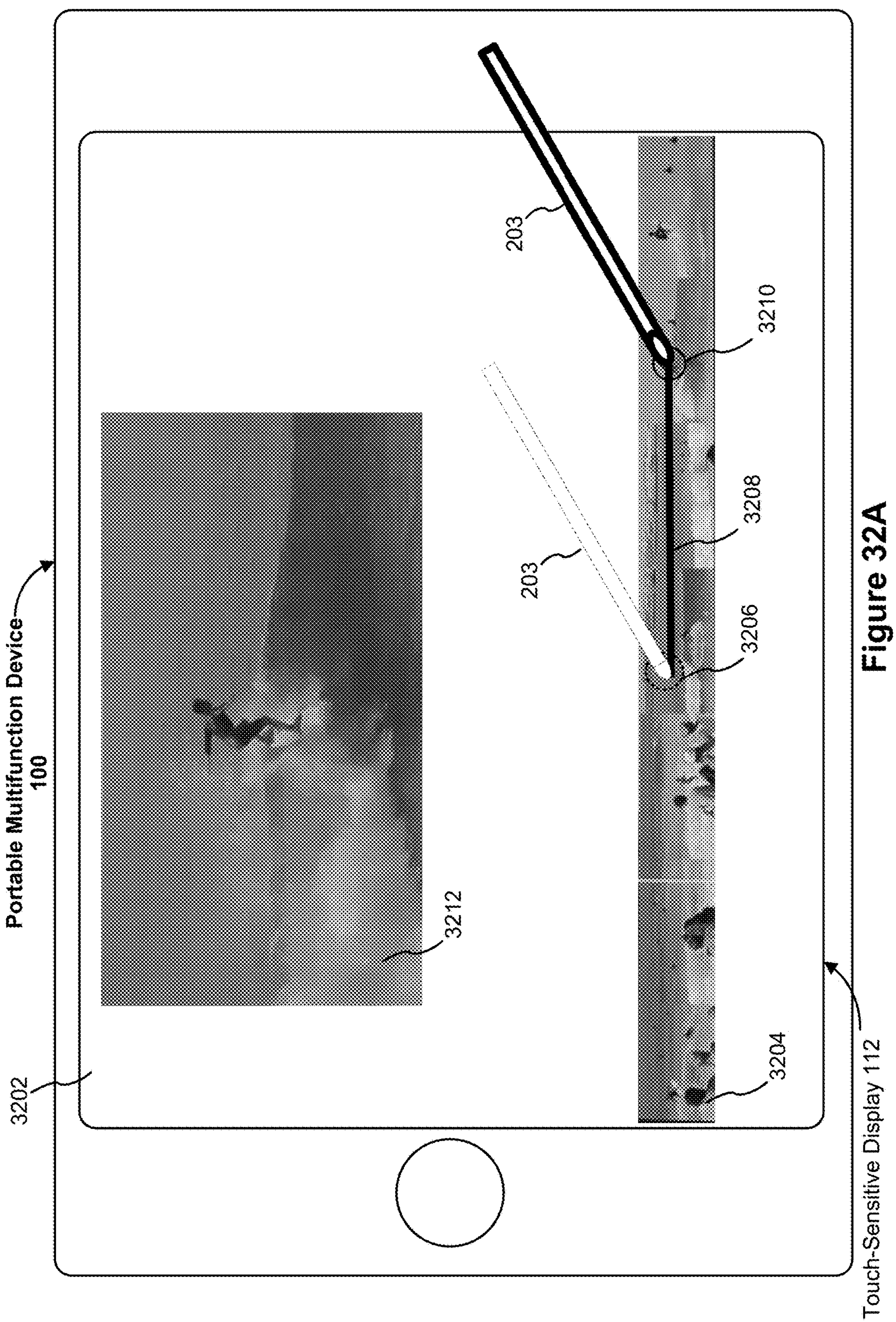
FIGS. 32A-32F illustrate exemplary user interfaces for selecting a portion of video in accordance with some embodiments.

FIG. 32A illustrates an example of a gesture for selecting a portion of video. In this example, device 100 displays, at touch-sensitive display 112, a video editing application 3202 including timeline area 3204 for video being edited. Touch-sensitive display 112 detects a gesture provided using a contact with touch-sensitive display 112, e.g., contact of stylus 203 with touch-sensitive display 112. The gesture includes initial contact of stylus 203 with touch-sensitive display 112 at a first time position 3206 of timeline area 3204, movement of stylus 203 across touch-sensitive display 112 (e.g., along a line indicated by mark 3208) after the initial contact, and lift off of stylus 203 from touch-sensitive display 112 at a second time position 3210 of timeline area 3204. In some embodiments, as stylus 203 moves across touch-sensitive display 112, device 100 draws a mark 3208 that shows the movement from the initial contact at first time position 3206 to the lift off at second time position 3210. In response to detecting the gesture described above, device 100 selects a portion of video that starts at first time position 3206 and ends at second time position 3210.

In some embodiments, the video editing application displayed by device 100 includes viewer area 3212. After stylus 203 makes initial contact with timeline area 3204, video is scrubbed in viewer area 3212 in accordance with the movement of the contact between stylus 203 and touch-sensitive display 112. For example, in FIG. 32A, a first frame of video is shown at viewer area 3212 in accordance with the contact of stylus 203 with touch-sensitive display 112 at position 3210. In FIG. 32C, a different frame of video is shown at viewer area 3212 in accordance with the contact of stylus 203 with touch-sensitive display 112 at position 3226.

Figure 32B:
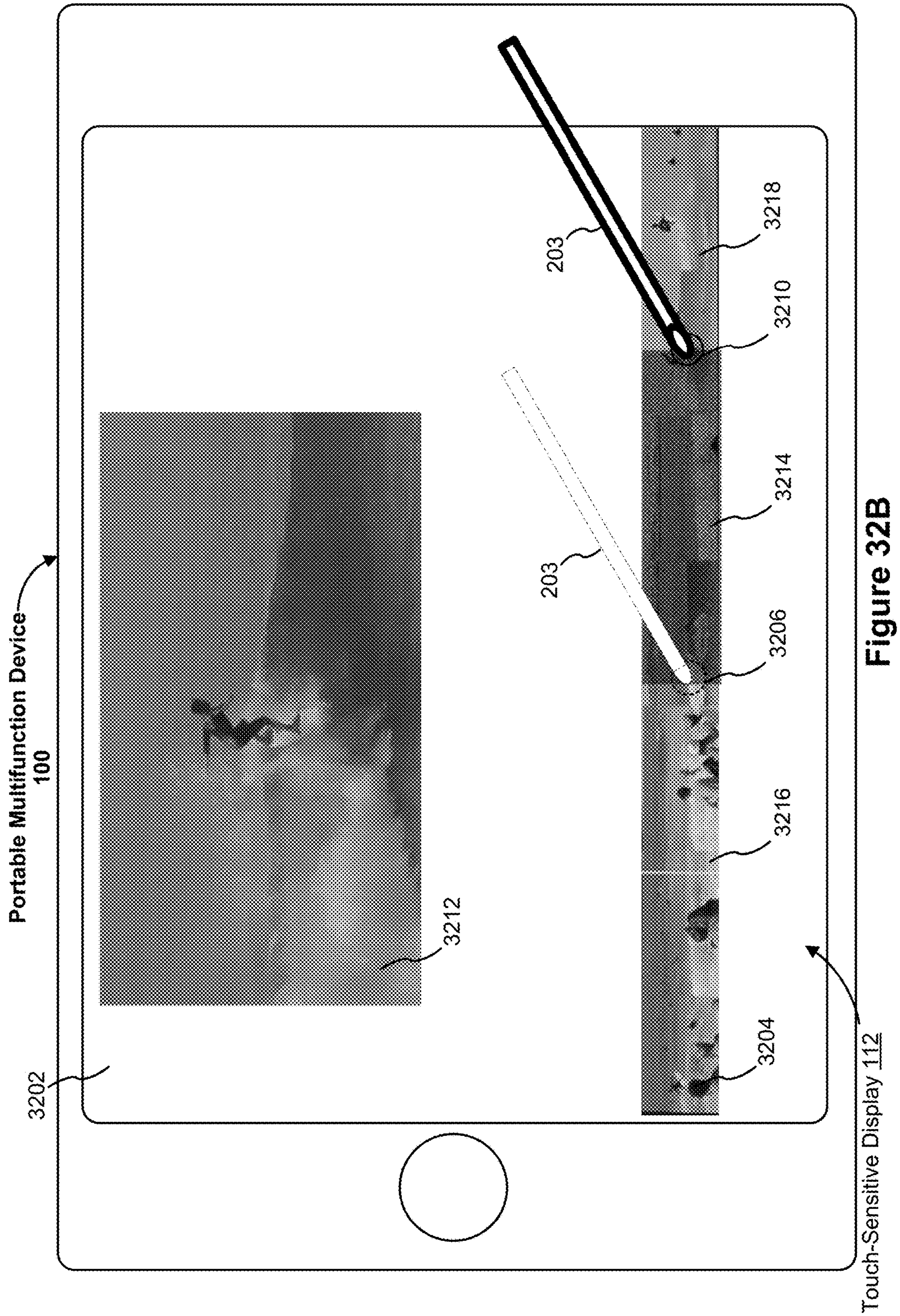
Figure 32C:
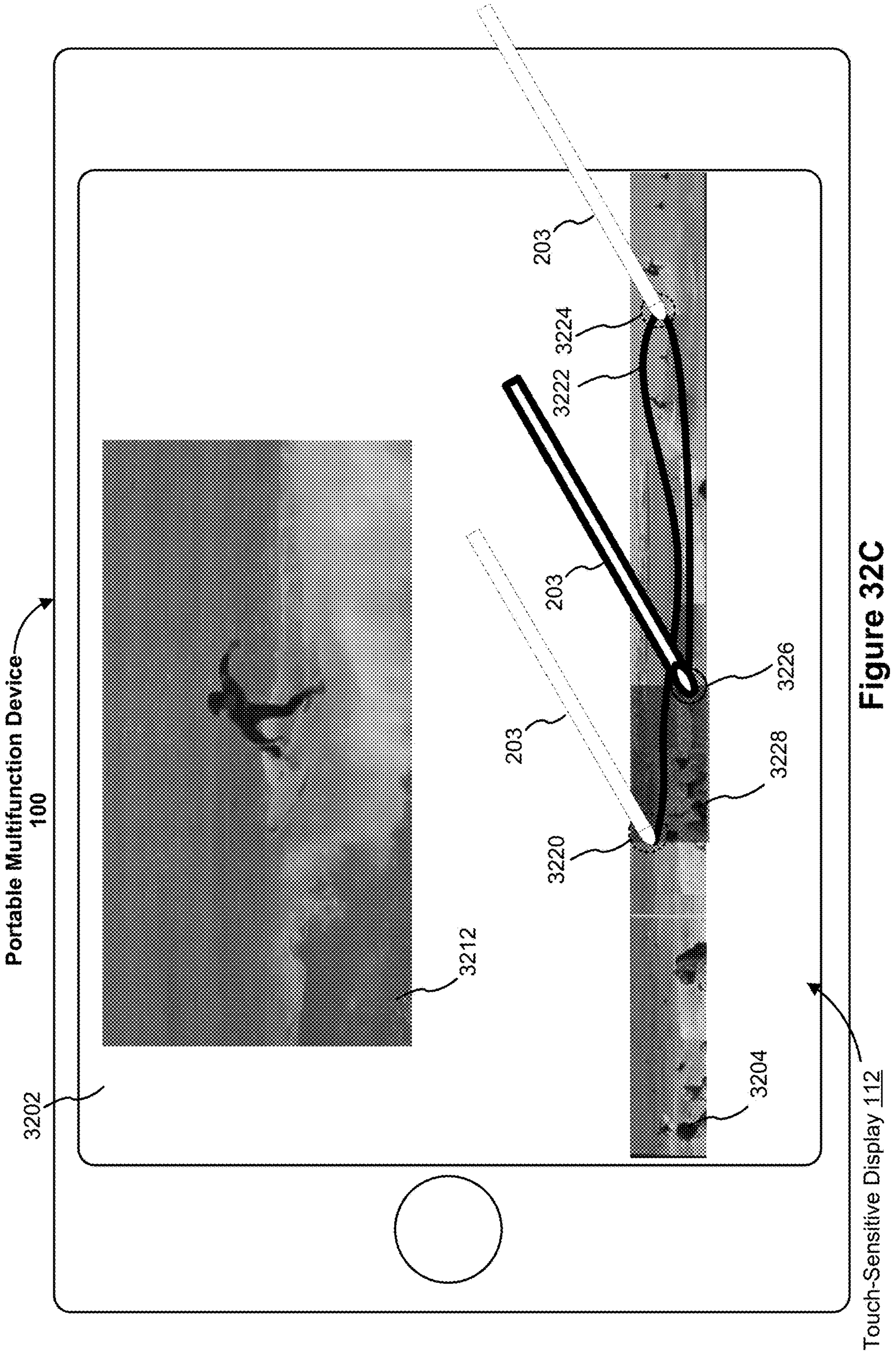
Figure 32D:
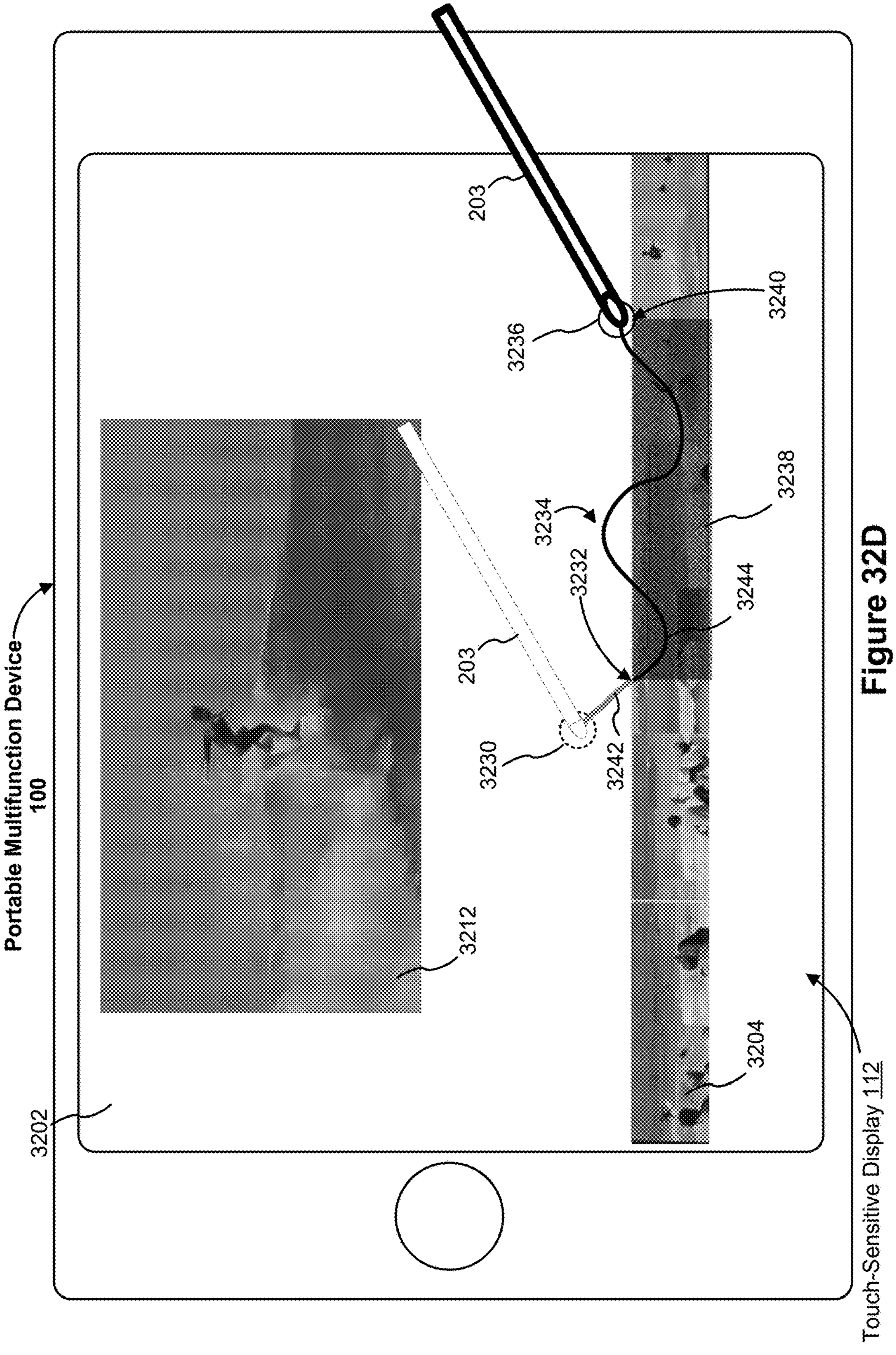

FIG. 32B illustrates an example of visually distinguishing a region of the timeline area that will be selected from regions of the timeline area that will not be selected. In this example, as stylus 203 moves across touch-sensitive display 112 from an initial contact at first time position 3206 to a second position 3210, the width of highlighted region 3214 gradually increases to extend from first time position 3206 to second time position 3210. In FIG. 32B, highlighted region 3214 is shown at a time after stylus 203 has moved across touch-sensitive display 112 from initial contact at first time position 3206 and just before the occurrence of lift off at second time position 3210. Highlighted region 3214 is region of timeline area 3204 that will be selected. Regions 3216 and 3218 are regions of timeline area 3204 that will not be selected. FIGS. 32C-32D provide additional examples (region 3228, region 3238) of a highlighted region.

FIG. 32C illustrates an example of selecting a portion of video using a gesture that includes backtracking. In this example, a gesture includes contact of stylus 203 with touch-sensitive display 112 at position 3220, movement of stylus 203 across touch-sensitive display 112 along path 3222 to position 3224 and subsequently to position 3226, where lift off of stylus 203 from touch-sensitive display 112 occurs. The portion of timeline area 3204 that will be selected in this example is indicated by highlighted region 3228. As stylus 203 moves across touch-sensitive display 112 from contact with timeline area 3204 at position 3220 to position 3224, the width of highlighted region 3228 gradually increases to extend from position 3220 to position 3224. As stylus 203 moves across touch-sensitive display 112 from position 3224 to position 3226, the width of highlighted region 3228 gradually decreases such that the position of stylus 230 continuously defines an edge of highlighted region 3228.

FIG. 32D illustrates an example of selecting a portion of video using a gesture that includes contact outside the timeline area. In this example, a gesture provided, e.g., using stylus 203, includes a contact of stylus 203 with touch-sensitive display 112 at a position 3230 of video editing application 3202 that is outside of timeline area 3204. Stylus 203 moves continuously across touch-sensitive display 112 from position 3230, making contact with timeline area 3204 at position 3232. Stylus 203 continues to move across touch-sensitive display 112 along a path indicated by mark 3234 and lifts off from touch-sensitive display 112 at position 3236. The portion of video that will be selected in this example is indicated by highlighted region 3238 of timeline area 3204. As stylus 203 moves across touch-sensitive display 112 from contact with timeline area 3204 at position 3232 to lift off at position 3236, the width of highlighted region 3238 gradually increases to extend from position 3232 to position 3240. The horizontal position on touch-sensitive display 112 of position 3236 outside the timeline area is the same as the horizontal position on touch-sensitive display 112 of position 3240 in timeline area 3204.

As indicated in FIG. 32D, mark 3234 may include a portion 3242 that is visually distinguished from another portion of mark 3234. In the example of FIG. 32D, portion 3242 of mark 3234 occurs between position 3230, where stylus 203 comes into contact with touch-sensitive display 112, and position 3232, where stylus 203 comes into contact with timeline area 3204. In the example shown in FIG. 32D, portion 3242 of mark 3234 is drawn in a different color from the color of the remainder 3244 of mark 3234. In this way, a user may be provided with feedback indicating that the selected portion of video will begin at point 3232 when stylus 203 comes into contact with timeline area 3204 and will end at point 3240 when stylus 203 lifts off from touch-sensitive display 112.

Figure 32E:
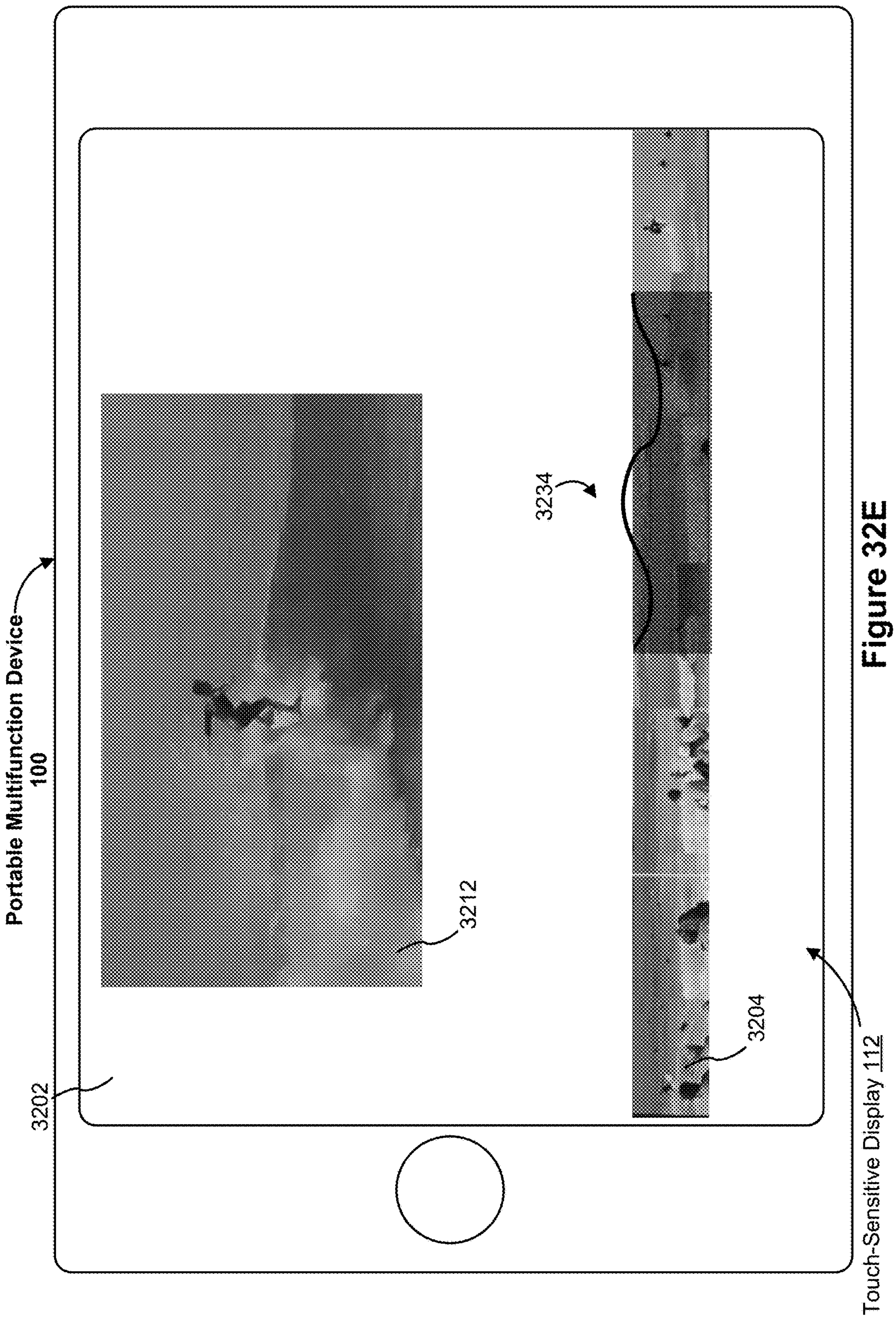
Figure 32F:
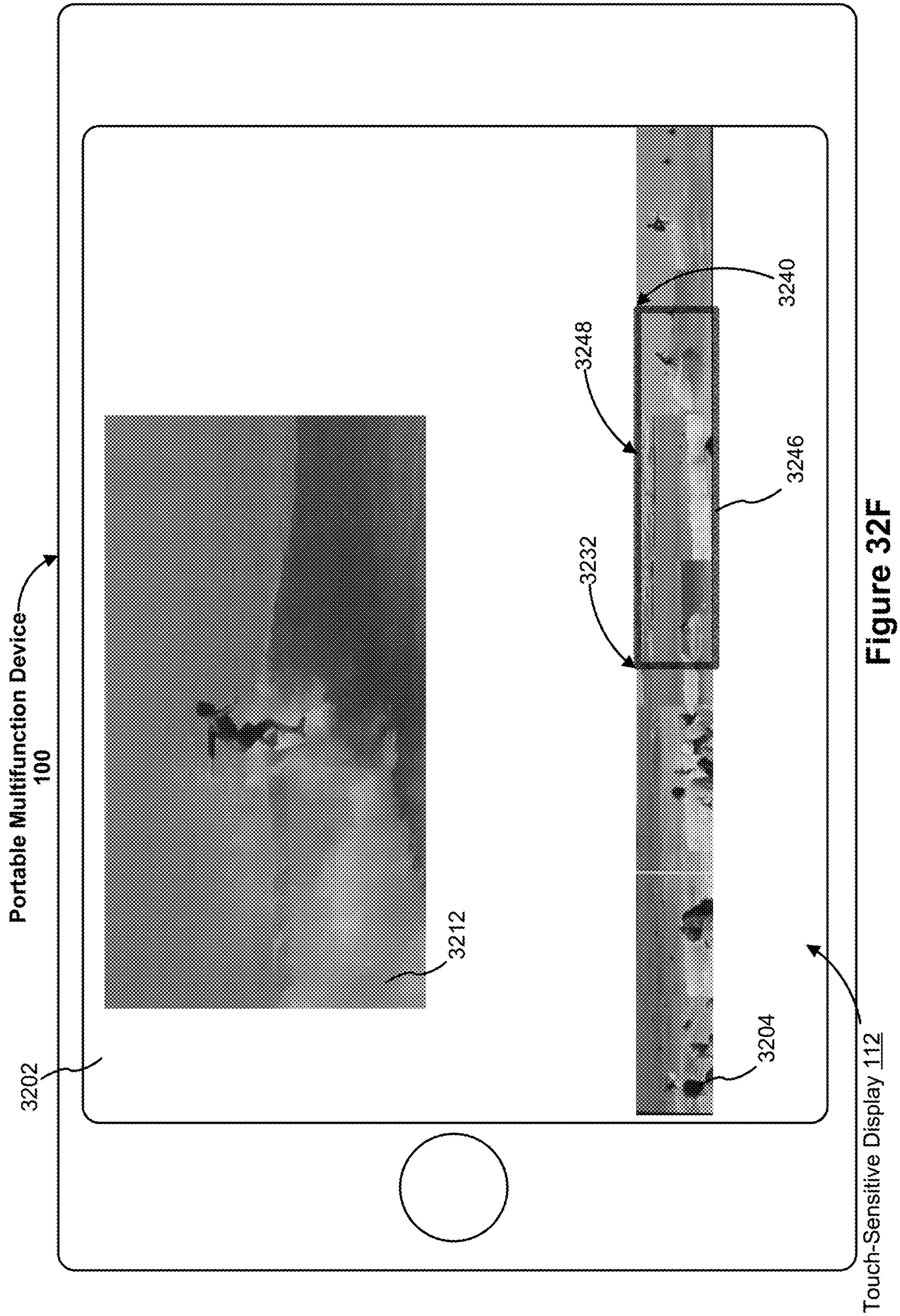

FIG. 32E illustrates an example of an intermediate stage of video editing application 3202 between the state shown in FIG. 32D and the state shown in FIG. 32F. In some embodiments, touch-sensitive display 112 displays an animation of a mark (e.g., mark 3234) becoming the top side 3248 of selection box 3246 (shown in FIG. 32F). In the example of FIG. 32E, mark 3234 is flattened as it morphs from mark 3234 as shown in FIG. 32D to the straight line that is the top side 3248 of selection box 3246 as shown in FIG. 32F.

FIG. 32F illustrates an example of a visual indication of a selected portion of video. In this example, in response to detecting a gesture (e.g., any of the gestures described above with regard to FIGS. 32A-32D), a portion of the video being edited is selected. In some embodiments, when lift off of stylus 203 from touch-sensitive display 112 is detected by device 100, device 100 displays a selection box 3246. Selection box 3246 indicates a selected portion of video. For example, when a detected gesture includes initial contact with timeline 3204 at first time position 3232, movement of the contact across touch-sensitive display 112 after the initial contact along a line as indicated by mark 3234, and lift off of the contact at a location 3236 (with a horizontal position within touch-sensitive display 112 corresponding to horizontal position 3240 within timeline area 3204), as indicated in FIG. 32D, selection box 3246 may include an area of timeline area 3204 from position 3232 to position 3240. In some embodiments, when lift off of stylus 203 from touch-sensitive display 112 is detected by device 100, device 100 ceases to display a mark (e.g., mark 3234) and displays selection box 3246. In some embodiments, an animation is displayed in which the mark 3234 becomes one side of the selection box 3246, such as the top edge 3248.

FIGS. 33A-33B are flow diagrams illustrating a method 3300 of selecting a portion of video in accordance with some embodiments. The method 3300 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display. In some embodiments, the display is separate from the touch-sensitive surface. Some operations in method 3300 are, optionally, combined and/or the order of some operations is, optionally, changed.

As described below, the method 3300 provides an intuitive way to select a portion of video. The method allows sloppy or otherwise imprecise inputs to precisely select a portion of video, thereby creating a more efficient human-machine interface. For battery-operated electronic devices, enabling a user to select a portion of video faster and more efficiently conserves power and increases the time between battery charges.

The device displays (3302) a video editing application 3202 on touch-sensitive display 112. In some embodiments, the device includes one or more sensors to detect signals from a stylus 203 associated with the device. The displayed video editing application includes a timeline area 3204 for a video being edited. In some embodiments, the video being edited includes a plurality of video clips arranged in a timeline for the video.

The device detects (3304) a gesture by a contact on the touch-sensitive display. The gesture includes an initial contact with timeline area 3204 by the contact. The gesture is, e.g., a gesture made with a finger contact or a stylus contact. The initial contact occurs at a first time position (e.g., 3206 as shown in FIG. 32A) in timeline area 3204. The gesture additionally includes movement of the contact across touch-sensitive display 112 after the initial contact with timeline area 3204 and lift off of the contact at a location on the touch-sensitive display that corresponds to a second time position (e.g., 3210 as shown in FIG. 32A) in timeline area 3204.

In some embodiments, the contact in the gesture makes contact (3308) with the displayed video editing application 3202 outside timeline area 3204 prior to making the initial contact with timeline area 3204. For example, as shown in FIG. 32D, the contact touches down on displayed video editing application 3202 at a point 3230 outside of timeline area 3204 and then moves continuously across touch-sensitive display 112 until the contact intersects timeline area 3204 at 3232. Point 3232 at which the contact intersects the timeline area corresponds to a first time position in timeline area 3232. In some embodiments, the contact touches down on displayed video editing application 3202 at a point within timeline area 3204 (e.g., as shown at 3206 of FIG. 32A and 3220 of FIG. 32C).

In some embodiments, the device displays (3310) a mark (e.g., 3208 of FIG. 32A, 3222 of FIG. 32C, 3234 of FIG. 32D), such as a line, that shows the movement of the contact across touch-sensitive display 112 after the initial contact with timeline area 3204. In some embodiments, a line is drawn that shows movement of the contact from touch down of the contact on touch-sensitive display 112 to lift off of the contact from touch-sensitive display 112, with the mark that shows the movement of the contact across touch-sensitive display 112 after the initial contact with timeline area 3204 being at least part of the line. For example, in FIG. 32D, mark 3234 includes a part 3242 of a line indicating movement of the contact before initial contact 3232 with timeline area 3204 and part 3244 of mark 3234 indicating movement of the contact after initial contact 3232 with timeline area 3204.

In some embodiments, after the initial contact with timeline area 3204 by the contact, as the contact moves across touch-sensitive display 112, the device visually distinguishes (3312) a region of timeline area 3204 that will be selected from one or more regions of timeline area 3204 that will not be selected. A region of timeline area 3204 that will be selected is visually distinguished by, e.g., shading, coloring, and/or highlighting. Highlighted regions 3214 of FIG. 32B, 3228 of FIG. 32C, and 3238 of FIG. 32D are examples of visually distinguished regions of timeline area 3204.

In some embodiments, the device displays (3314) a mark (e.g., line 3234 of FIG. 32D) that shows the movement of the contact across touch-sensitive display 112 from touch down of the contact on touch-sensitive display 112 to lift off of the contact from touch-sensitive display 112. The mark includes a first portion 3242 of the mark 3234 prior to the initial contact 3232 with the timeline area 3204. The mark includes a second portion 3244 of the mark after initial contact 3232 with timeline area 3204. The second portion 3244 of the mark is visually distinguished from the first portion 3242 of the mark. In some embodiments, a line is drawn that shows movement of the contact from touch down of the contact on touch-sensitive display 112 to lift off of the contact from touch-sensitive display 112, and the line changes color, width, and/or other visual attributes after the initial contact (e.g., 3232) of the contact with timeline area 3204.

In some embodiments (3316), the location of the contact at lift off (e.g., position 3236) is outside timeline area 3204, the location of the contact at lift off has a horizontal position on touch-sensitive display 112, and the second time position (e.g., 3240) in timeline area 3204 has the same horizontal position on the display as the location of the contact at lift off. In some embodiments, the second time position 3240 is determined by the horizontal position of the contact at lift off, independent of whether the contact is within or outside timeline area 3204 at lift off. For example, as shown in FIG. 32D, lift off of the contact occurs at position 3236, which is outside timeline area 3204. The horizontal position of second time position 3240 on timeline area 3204 has the same horizontal position on touch-sensitive display 112 as position 3236 where lift off of the contact occurs. In this way, when lift off occurs outside of timeline area 3204, selection of a portion of video will include video up to position 3240 on timeline area 3204 corresponding to the horizontal position of position 3236 outside of timeline area 3204.

In some embodiments, movement of the contact across touch-sensitive display 112 after the initial contact (e.g., 3220 of FIG. 32C) with timeline area 3204 includes (3318) continuous movement of the contact to a location (inside or outside the timeline area) on touch-sensitive display 112 that corresponds to a third time position (e.g., 3224) in timeline area 3204, the third time position being after the second time position (e.g., 3226) in timeline area 3204, and then continuous movement of the contact to the location on the touch-sensitive display that corresponds to the second time position (e.g. 3226) in timeline area 3204, where the contact lifts off. For example, in FIG. 32C, stylus 203 makes initial contact with timeline area 3204 at position 3220, moves across touch-sensitive display 112 to third time position 3224, and then backtracks to second time position 3226 where lift off of stylus 203 from touch-sensitive device 112 occurs. As indicated by highlighted region 3228, the portion of timeline area 3204 that will be selected is the area between initial contact position 3220 and second time position 3226.

In response to detecting the gesture by the contact on touch-sensitive display 112, the device selects (3306) a portion of the video being edited. For example, the device may select a portion of the video for cutting, copying, trimming, or other video editing operation. The selected portion of the video starts at the first time position and ends at the second time position. For example, a selected portion of video corresponding to the gesture illustrated in FIG. 32A will start at first time position 3206 and end at second time position 3210. In another example, a selected portion of video corresponding to the gesture illustrated in FIG. 32C will start at first time position 3220 and end at second time position 3226. In a further example, a selected portion of video corresponding to the gesture illustrated in FIG. 32D will start at first time position 3232 and end at second time position 3240.

In some embodiments, the device displays (3320) a viewer area (e.g., viewer window 3212) for the video being edited. After the contact makes initial contact with timeline area 3204, the device scrubs the video in viewer area 3212 in accordance with the movement of the contact across touch-sensitive display 112. In some embodiments, after the contact makes initial contact with timeline area 3204, the video is scrubbed in accordance with a current horizontal position of the contact on the touch-sensitive display as the contact moves, independent of whether the contact is inside or outside the timeline area. For example, in the example of FIG. 32D, as the contact moves from position 3232 to position 3236 along the path indicated by mark 3244, video may be scrubbed in accordance with a current horizontal position of the contact.

In some embodiments, the device displays a mark (e.g., line 3208, 3222, 3244) that shows the movement of the contact across touch-sensitive display 112 after the initial contact (e.g., 3206, 3220, 3232) with timeline area 3204. The device detects lift off of the contact at the location (e.g., 3210, 3226, 3236) on touch-sensitive display 112 that corresponds to the second time position (e.g., 3210, 3226, 3240) in timeline area 3204. In response to detecting lift off of the contact at the location on touch-sensitive display 112 that corresponds to the second time position (e.g., 3210, 3226, 3240) in timeline area 3204, the device ceases (3322) to display the mark (3208, 3222, 3244) and the device displays a selection box (e.g., 3246) around the selected portion of the video. In some embodiments, a line is drawn that shows movement of the contact from touch down of the contact on touch-sensitive display 112 to lift off of the contact from touch-sensitive display 112, with the mark that shows the movement of the contact across touch-sensitive display 112 after the initial contact with the timeline area 3204 (e.g., mark 3244 of FIG. 32D that shows the movement of stylus 203 across touch-sensitive display 112 after initial contact 3232 with timeline area 3204) being at least part of the line.

In some embodiments the device displays a mark (e.g., line 3208, 3222, 3244) that shows the movement of the contact across touch-sensitive display 112 after the initial contact (e.g., 3206, 3220, 3232) with timeline area 3204. The device detects lift off of the contact at the location (e.g., 3210, 3226, 3236) on touch-sensitive display 112 that corresponds to second time position (e.g., 3210, 3226, 3240) in timeline area 3204. In response to detecting lift off of the contact at the location on the touch-sensitive display that corresponds to the second time position in timeline area 3204, the device displays (3324) an animation of the mark (e.g., 3234) becoming one side (e.g., top side 3248) of a selection box 3246 around the selected portion of the video. In some embodiments, in response to detecting liftoff, an animation is displayed in which the mark that was drawn after the initial contact with the timeline area transitions (or morphs) to become one side of a selection box around the selected portion of the video. For example, line 3234 of FIG. 32D has a wavy appearance that indicates the motion of stylus 203 from initial contact with timeline area 3204 at position 3230 to lift off at position 3236. In response to detecting lift off, the device may display animation of line 3234, e.g., a gradual flattening of the wavy line, indicating a transition from line 3234 to top side 3248 of selection box 3246. The animation may include a transition of mark 3234 as shown in FIG. 32D to a flattened version of mark 3234 as shown in FIG. 32E to the straight line that is the top side 3248 of selection box 3246 in FIG. 32F.

It should be understood that the particular order in which the operations in FIGS. 33A-33B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the first paragraph of the Description of Embodiments above) are also applicable in an analogous manner to method 3300 described above with respect to FIGS. 33A-33B. For example, the contacts, gestures, and animations described above with reference to method 3300 optionally have one or more of the characteristics of the contacts, gestures, and animations described herein with reference to other methods described herein (e.g., those listed in the first paragraph of the Description of Embodiments above). For brevity, these details are not repeated here.

Figure 34:
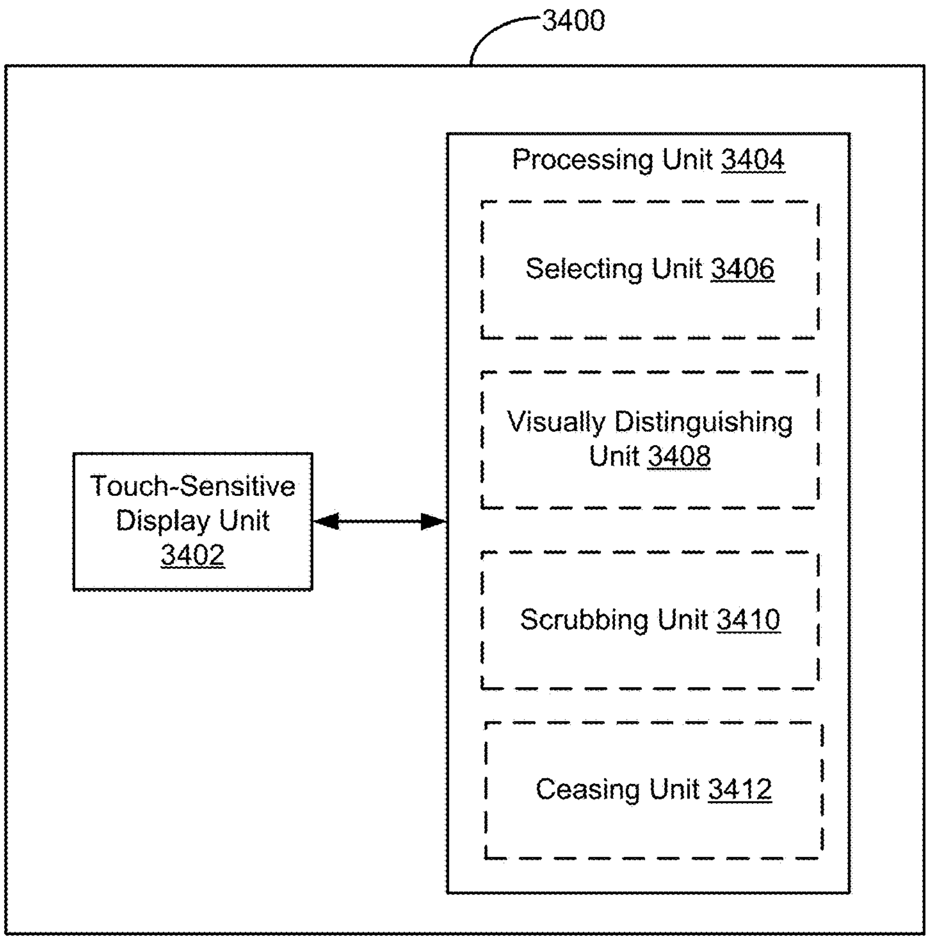
FIG. 34 is a functional block diagram of an electronic device in accordance with some embodiments.

In accordance with some embodiments, FIG. 34 shows a functional block diagram of an electronic device 3400 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 34 are, optionally, combined or separated into sub-blocks to implement the principles of the various described embodiments. Therefore, the description herein optionally supports any possible combination or separation or further definition of the functional blocks described herein.

As shown in FIG. 34, an electronic device 3400 includes a touch-sensitive display unit 3402 and a processing unit 3404 coupled with the touch-sensitive display unit 3402. The touch-sensitive display unit 3402 is configured to display a video editing application, the displayed video editing application including a timeline area for a video being edited. The processing unit 3404 is configured to detect a gesture by a contact on the touch-sensitive display unit 3402. The gesture includes: an initial contact with the timeline area by the contact, the initial contact occurring at a first time position in the timeline area; movement of the contact across the touch-sensitive display unit 3402 after the initial contact with the timeline area; and lift off of the contact at a location on the touch-sensitive display unit 3402 that corresponds to a second time position in the timeline area. In some embodiments, the processing unit 3404 includes a selecting unit 3406, a visually distinguishing unit 3408, a scrubbing unit 3410, and a ceasing unit 3412. The processing unit 3404 is configured to, in response to detecting the gesture by the contact on the touch-sensitive display unit 3402, select (e.g., with the selecting unit 3406) a portion of the video being edited, wherein the selected portion of the video starts at the first time position and ends at the second time position.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 33A-33B are, optionally, implemented by components depicted in FIGS. 1A-1B or FIG. 34. For example, display operation 3302, detection operation 3304, and selection operation 3306, are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a contact, from a first location on the touch-sensitive surface to a second location where lift off occurs, corresponds to a predefined event or sub-event, such as selection of a portion of video. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Displaying and Using a Menu with a Stylus

Some electronic devices use a stylus associated with the device to provide additional methods of input to a touch-sensitive display of the device. For example, some cellular phones, laptops, and tablets have the capability to receive inputs from a stylus. The stylus may emulate one or more virtual drawing implements (e.g., pencil, brush, calligraphy pen, etc.) with one or more options (e.g., color). However, with conventional methods, a user may find it cumbersome to display and use a menu with a stylus (e.g., a menu to select options for the virtual drawing implement). The embodiments below address this problem by displaying a menu (e.g., a color palette) in response to a stylus gesture, thereby providing a faster and easier way to select menu options with a stylus (e.g., to select a color from a color palette for a virtual drawing implement).

Below, FIGS. 35A-35J illustrate exemplary user interfaces for displaying and using a menu with a stylus. FIGS. 36A-36C are flow diagrams illustrating a method of displaying and using a menu with a stylus. The user interfaces in FIGS. 35A-35J are used to illustrate the processes in FIGS. 36A-36C.

FIGS. 35A-35J illustrate exemplary user interfaces for displaying and using a menu with a stylus in accordance with some embodiments. The user interfaces in these figures are used to illustrate the processes described below, including the processes in FIGS. 36A-36C. Although some of the examples which follow will be given with reference to inputs on a touch-screen display (where the touch-sensitive surface and the display are combined, for example on touch screen 112), in some embodiments, the device detects inputs on a touch-sensitive surface 651 that is separate from the display 650, as shown in FIG. 6B.

In some embodiments, the device is an electronic device with a separate display (e.g., display 650) and a separate touch-sensitive surface (e.g., touch-sensitive surface 651). In some embodiments, the device is portable multifunction device 100, the display is touch-sensitive display system 112, and the touch-sensitive surface includes tactile output generators 163 on the display (FIG. 1A). For convenience of explanation, the embodiments described with reference to FIGS. 35A-35J and 36A-36C will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 650 and a separate touch-sensitive surface 651 in response to detecting the contacts described in FIGS. 35A-35J on (or near) the touch-sensitive surface 651 while displaying the user interfaces shown in FIGS. 35A-35J on the display 650.

Figure 35A:
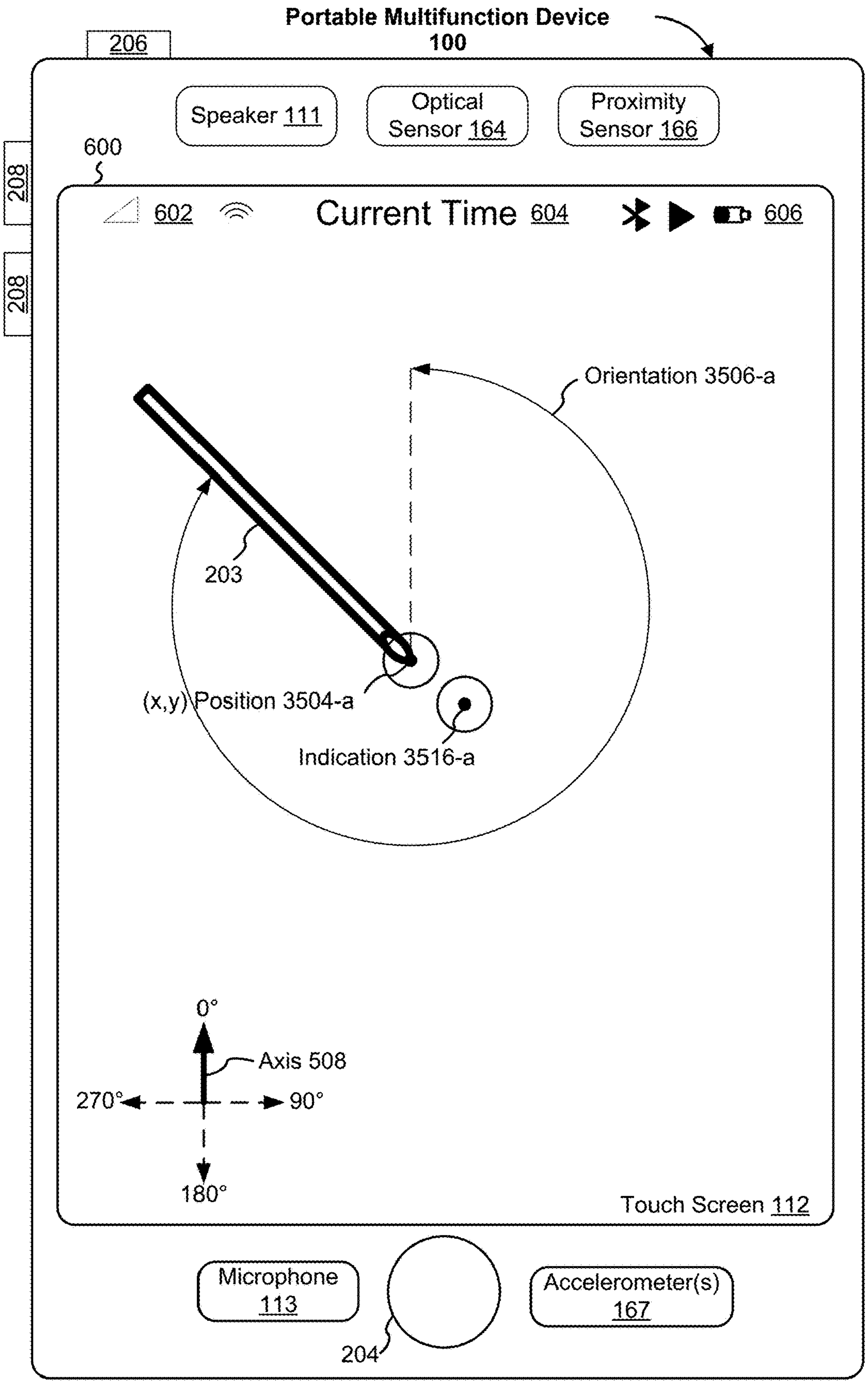
FIGS. 35A-35J illustrate exemplary user interfaces for displaying and using a menu with a stylus in accordance with some embodiments.

FIGS. 35A-35J illustrate exemplary user interfaces for displaying and using a menu with a stylus in accordance with some embodiments. While FIG. 35A shows touch screen 112 with additional details of device 100 (e.g., speaker 111, optical sensor 164, proximity sensor 166, etc.), for sake of clarity, FIGS. 35B-35J simply show touch screen 112 of device 100, without showing other details of device 100. Further, while FIG. 35A illustrates an example from a viewpoint directly above a touch-sensitive surface (e.g., touch screen 112 of device 100), FIGS. 35B-35J illustrate examples from two viewpoints: a viewpoint directly above a touch-sensitive surface (e.g., touch screen 112 of device 100) and a side viewpoint of the touch-sensitive surface.

FIG. 35A illustrates an example of displaying an indication (e.g., indication 3516-*a*) that corresponds to a positional state of a stylus (e.g., stylus 203). In this example, stylus 203 has a positional state with an orientation of stylus 203 relative to touch screen 112 (e.g., orientation 3506-*a*) and a position of a projection of a tip of stylus 203 on touch screen 112 (e.g., (x,y) position 3504-*a*). As shown in FIG. 35A, before stylus 203 touches touch screen 112, when stylus 203 is positioned with orientation 3506-*a* (e.g., approximately 315 degrees in a clockwise rotation angle relative to axis 508) and tip projection at (x,y) position 3504-*a*, an indication 3516-*a* is displayed on touch screen 112 to show where stylus 203 will touch (or mark) touch screen 112. In some embodiments, the indication is displaced in a first direction on touch screen 112, relative to (x,y) position 3504-*a*, when the stylus is positioned in a first orientation and the indication is displaced in a second direction on touch screen 112, relative to (x,y) position 3504-*a*, when the stylus is positioned in a second orientation, distinct from the first orientation. For example, in FIG. 5A, indication 516 is displaced in a southwest direction, relative to (x,y) position 504, when stylus 203 is positioned with orientation 506 (e.g., approximately 45 degrees in a clockwise rotation angle relative to axis 508) and in FIG. 35A, indication 3516-*a* is displaced in a southeast direction, relative to (x,y) position 3504-*a*, when stylus 203 is positioned with orientation 3506-*a* (e.g., approximately 315 degrees in a clockwise rotation angle relative to axis 508).

FIGS. 35B-35J illustrate an example of displaying a user interface 3520 (e.g., a user interface for an application, such as a drawing application) on the touch-sensitive display (e.g., touch screen 112). In some embodiments, user interface 3520 includes an indicator 3522. In some embodiments, indicator 3522 indicates the selected color and type of virtual drawing implement (e.g., a blue pen), where a ring of color in indicator 3522 indicates the color of the virtual drawing implement. For example, a blue pen is shown in indicator 3522 by a representation of a pen encircled by a ring of blue.

FIGS. 35B-35E illustrate an example of the stylus (e.g., stylus 203) moving towards the touch-sensitive display (e.g., touch screen 112), without the stylus making contact with the touch-sensitive display. In some embodiments, the stylus gesture moving towards the touch-sensitive display without the stylus making contact with the touch-sensitive display is called a "splash gesture." In some embodiments, in FIGS. 35B-35E, stylus 203 moves towards touch screen 112 with a velocity above a predetermined non-zero value during at least part of the movement. In some embodiments, in FIGS. 35B-35E, stylus 203 has a deceleration above a predetermined deceleration value during at least part of the movement as the stylus moves towards touch screen 112. In some embodiments, stylus 203 accelerates as the stylus moves towards touch screen 112 and then decelerates as the stylus moves towards touch screen 112 during the movement of stylus 203 in FIGS. 35B-35E.

In some embodiments, in response to changing the distance (e.g., distance 3514) of the stylus relative to the touch-sensitive display, the displayed indication (e.g., indication 3516) is updated. In FIGS. 35B-35E, the orientation of the stylus (e.g., orientation 3506-*b*), the (x,y) position of the tip of the stylus (e.g., (x,y) position 3504-*b*), and the tilt of the stylus (e.g., tilt 3512-*a*) remain constant, while the distance of the stylus relative to the touch-sensitive display changes (e.g., from distance 3514-*a* to distance 3514-*b* to distance 3514-*c* to distance 3514-*d*) as the stylus moves closer to the touch-sensitive display, without making contact with the touch-sensitive display. Further, as stylus 203 moves closer to touch screen 112, the indication is updated on touch screen 112 (e.g., from indication 3516-*b* to indication 3516-*c* to indication 3516-*d* to indication 3516-*e*). As shown in this example, in some embodiments, the indication changes opacity (e.g., with increasing opacity), changes size (or radius or area) (e.g., with decreasing size), and/or changes color (e.g., with darkening color) as stylus 203 moves closer to touch screen 112.). In some embodiments, the indication is updated in response to a change in orientation (as described above with respect to FIG. 35A) and the indication is updated in response to a change in tilt (as described above), and for brevity, the details are not repeated here. In some embodiments, the indication 3516 is not shown during the splash gesture (e.g., because the stylus is too far away from the touch screen 112 during the splash gesture).

Figure 35B:
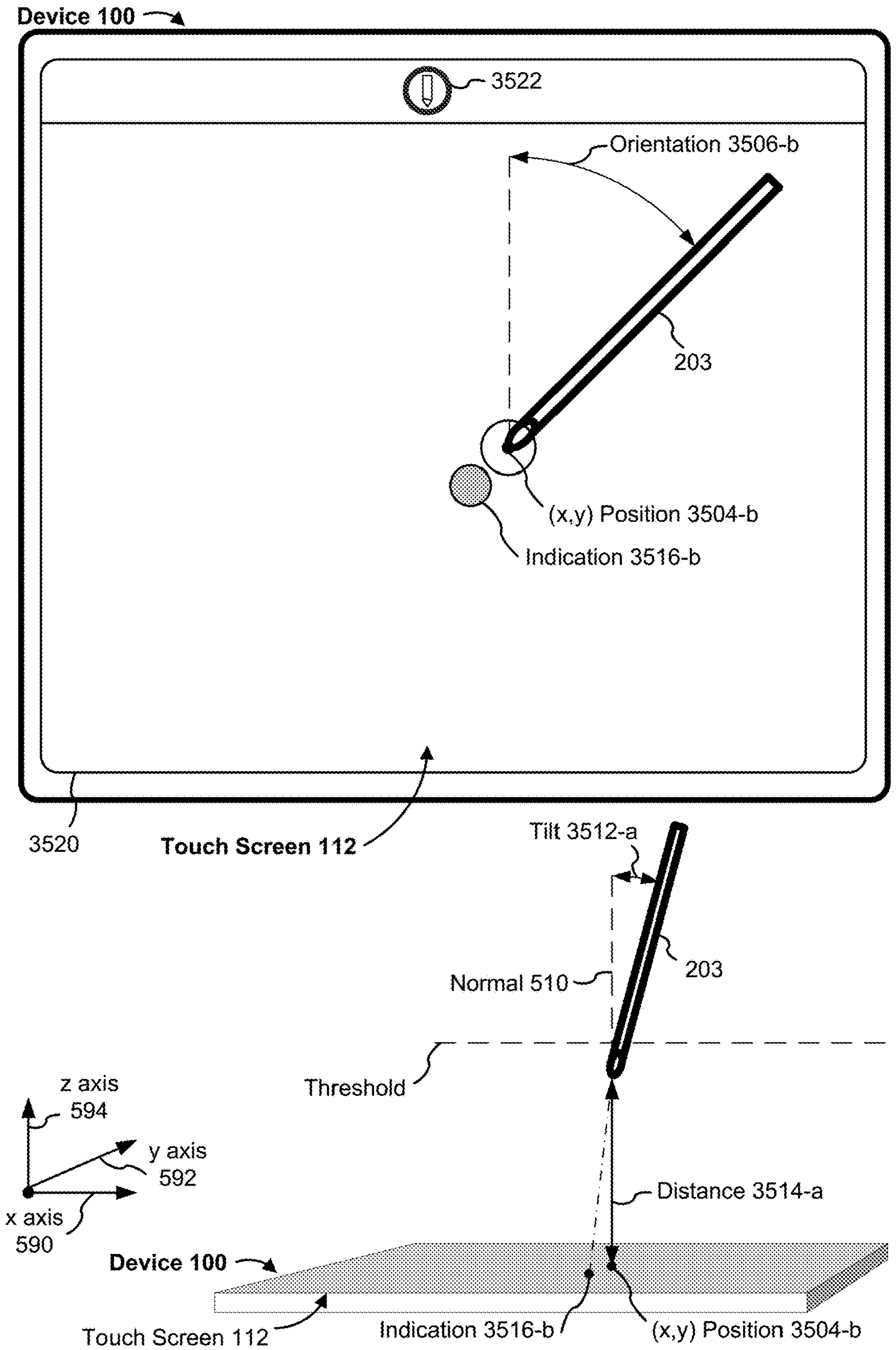
Figure 35C:
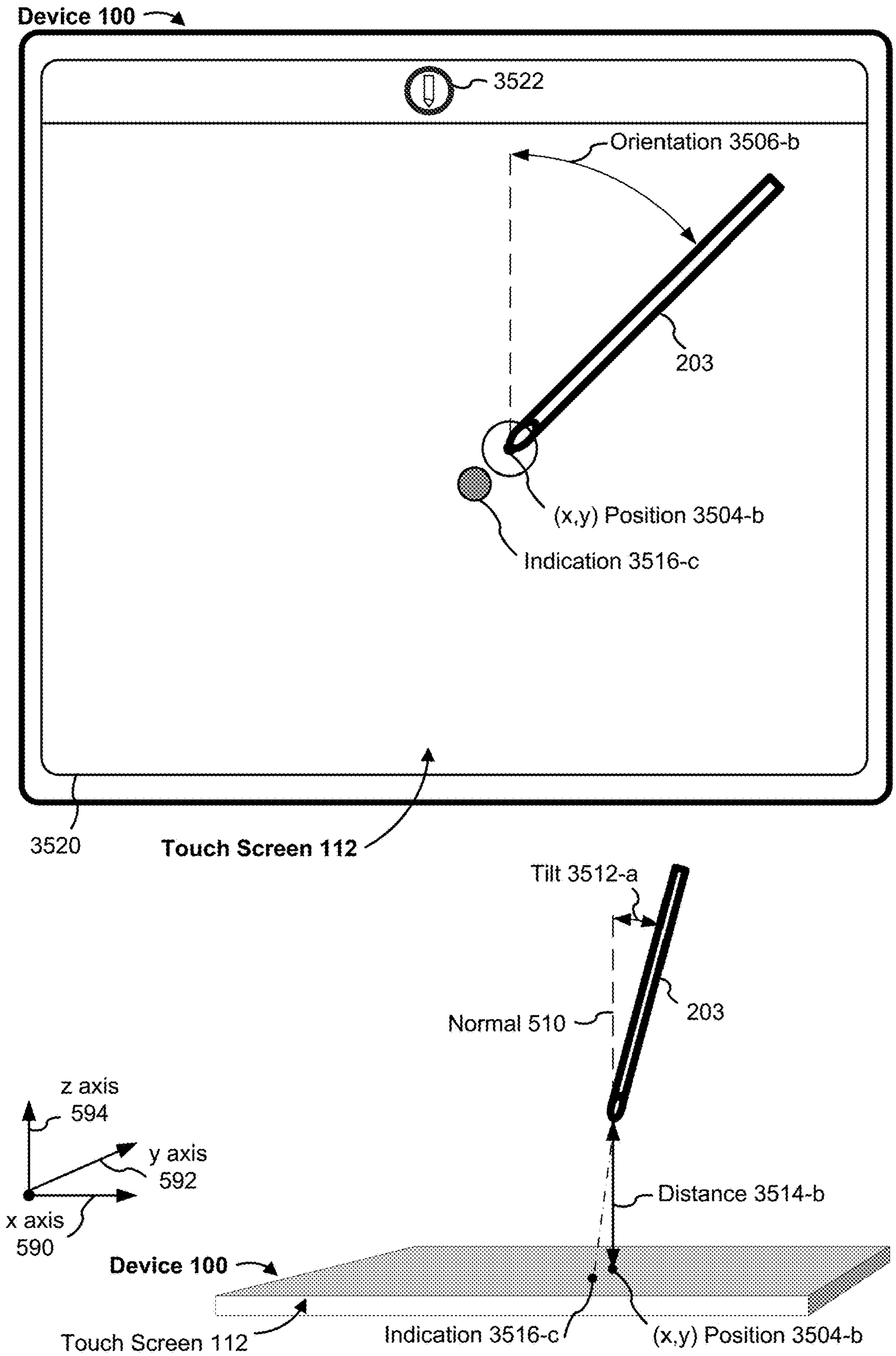
Figure 35D:
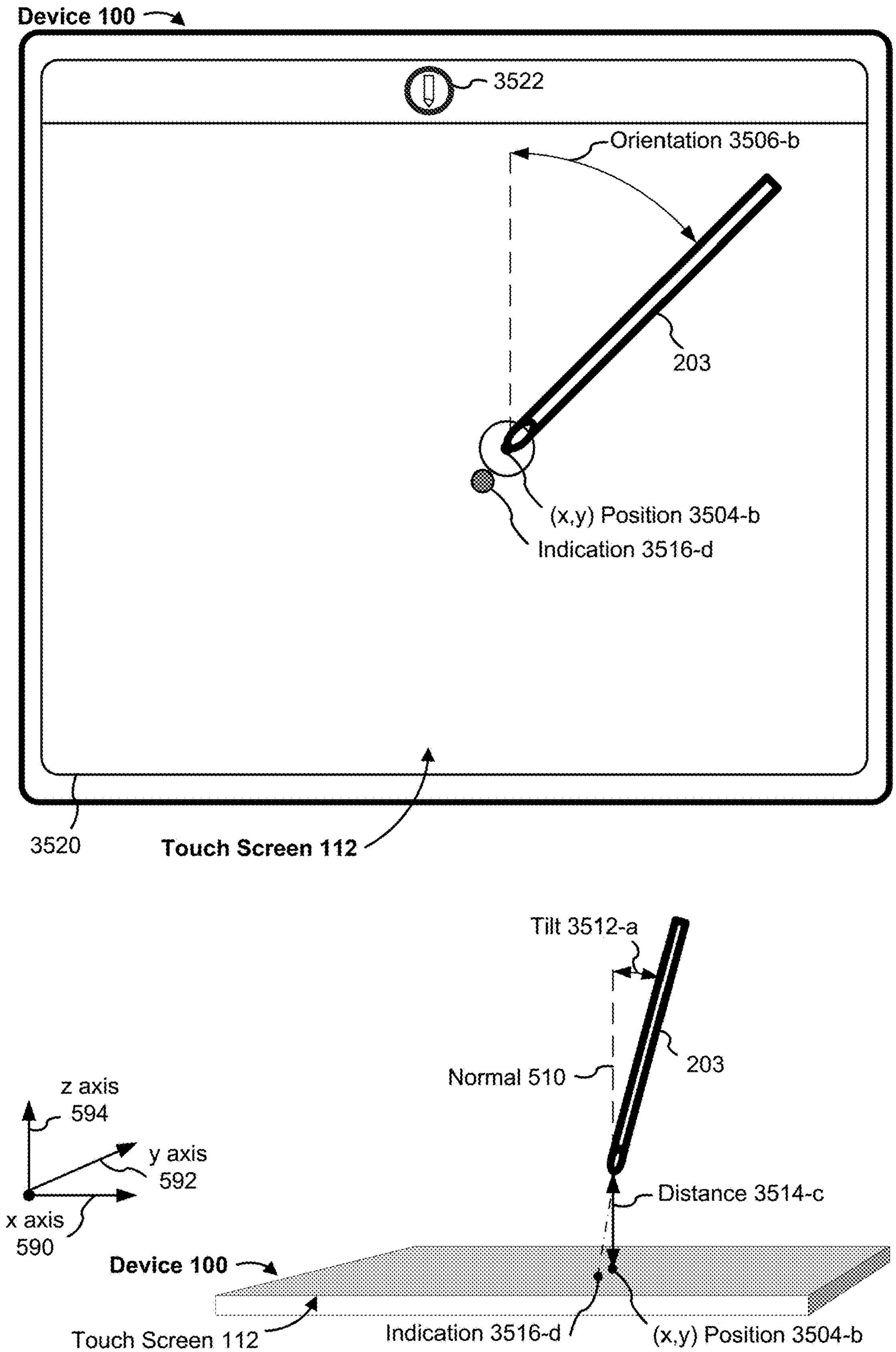
Figure 35E:
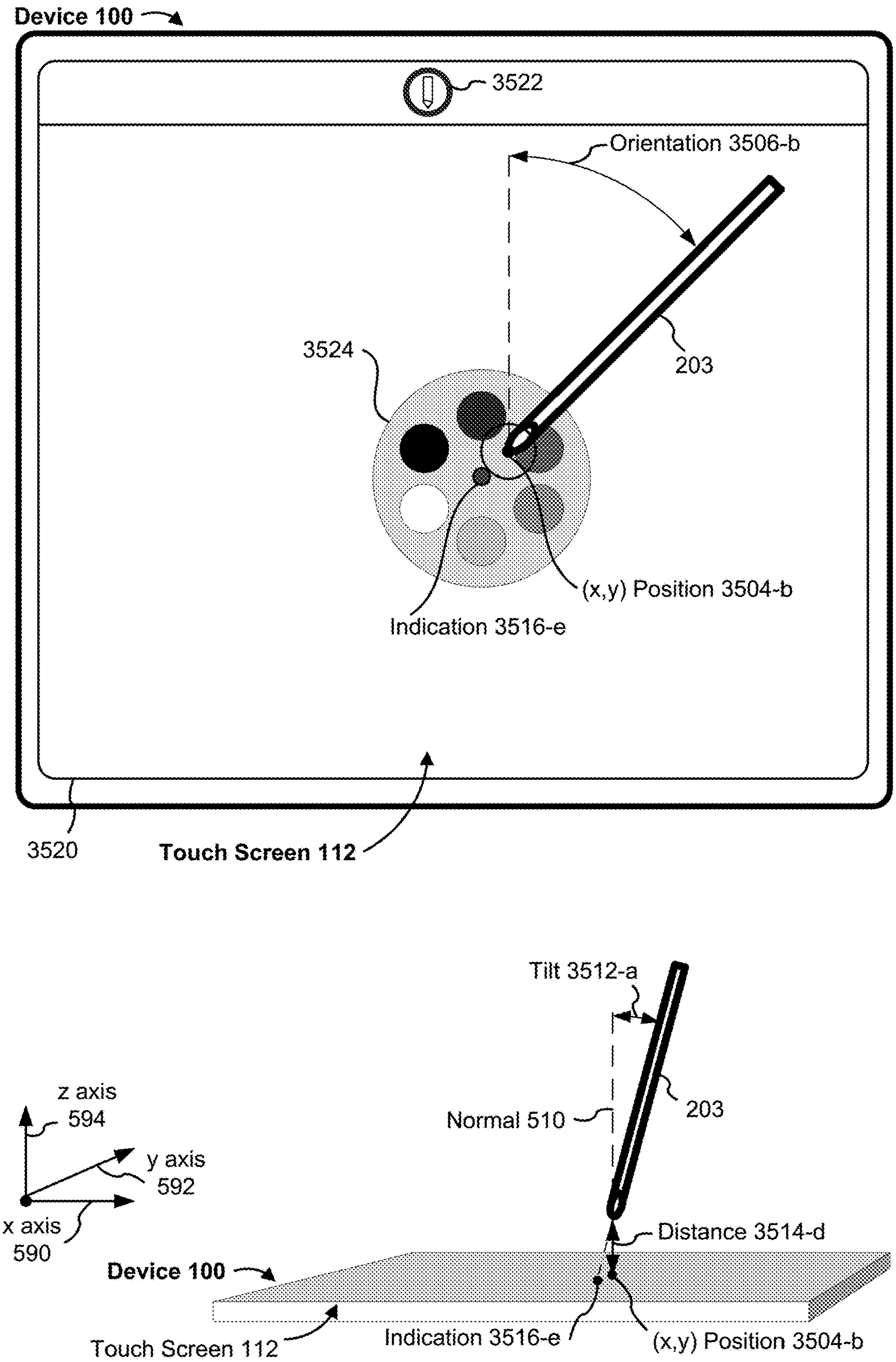

FIG. 35E illustrates an example of displaying a menu (e.g., menu 3524) overlaid on the user interface (e.g., user interface 3520) in accordance with a determination that the stylus movement (e.g., the stylus movement towards the touch-sensitive display, as shown in FIGS. 35B-35E) satisfies one or more stylus movement criteria. In some embodiments, menu 3524 includes a plurality of selectable menu options, as described with respect to FIG. 35F below. In some embodiments, the location of the menu is based on a projection of the stylus tip on to the touch-sensitive display (e.g., as described with reference to method 800). For example, in FIG. 35E, menu 3524 is displayed at the location of indication 3516-*e* (or centered around indication 3516-*e*). In some embodiments, the one or more stylus movement criteria include detecting that the stylus velocity is above a predetermined (non-zero) value during at least part of the detected stylus movement towards the touch-sensitive display. In some embodiments, the one or more stylus movement criteria include detecting that deceleration of the stylus as the stylus moves towards the touch-sensitive display is above a predetermined deceleration value during at least part of the detected stylus movement. In some embodiments, the one or more stylus movement criteria include detecting that the stylus accelerates as the stylus moves towards the touch-sensitive display and then decelerates as the stylus moves towards the touch-sensitive display during the detected stylus movement towards the touch-sensitive display.

Figure 35F:
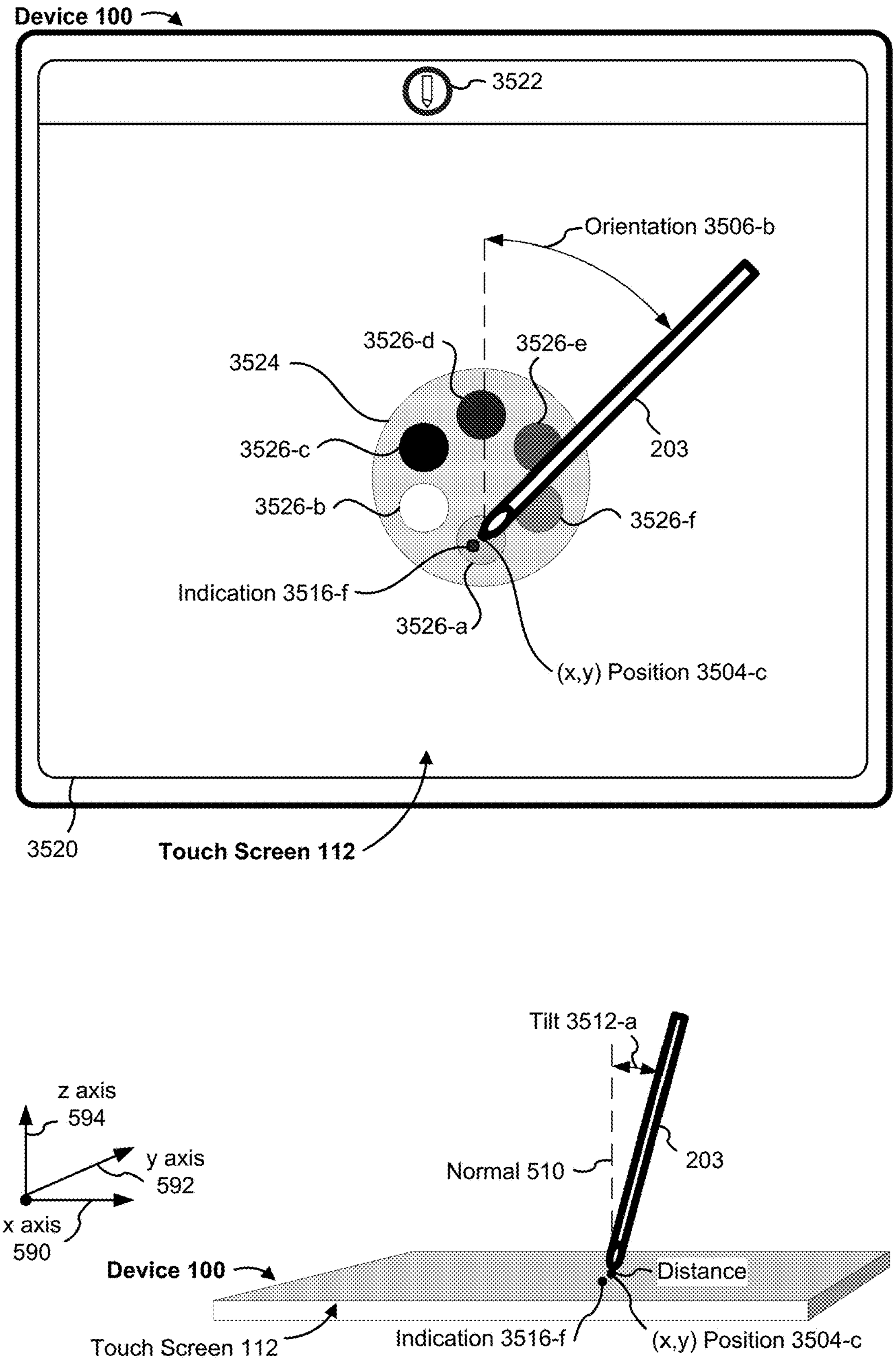
Figure 36A:
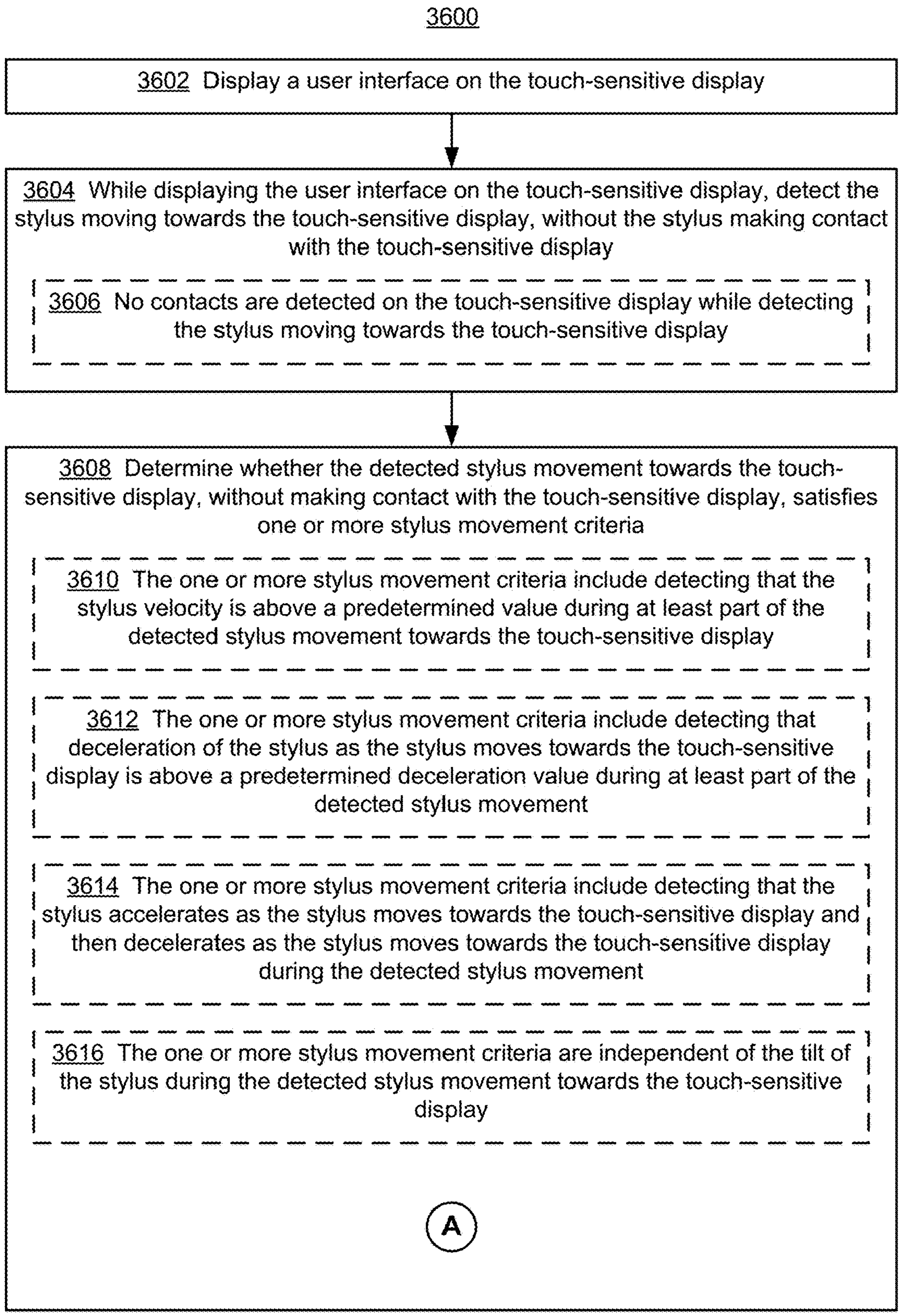

FIG. 35F illustrates an example of the stylus (e.g., stylus 203) selecting a first menu option (e.g., menu option 3526-*a*) from a plurality of selectable menu options (e.g., menu options 3526-*a* through 3526-*f*) of the menu (e.g., menu 3524). In some embodiments, selection of the first menu option includes tapping on the menu option with the stylus.

For sake of clarity, FIG. 35F shows menu 3524 with a light background color, but in some embodiments, the background of menu 3524 is transparent and only the selectable menu options of menu 3524 are visible. In some embodiments, menu 3524 is a color palette and the plurality of selectable menu options are colors in the color palette. Although FIG. 35F shows menu 3524 with a range of colors from white to shades of gray to black, in some embodiments, menu 3524 is a color palette with other colors (e.g., red, orange, yellow, green, blue, indigo, violet, etc.).

Figure 35G:
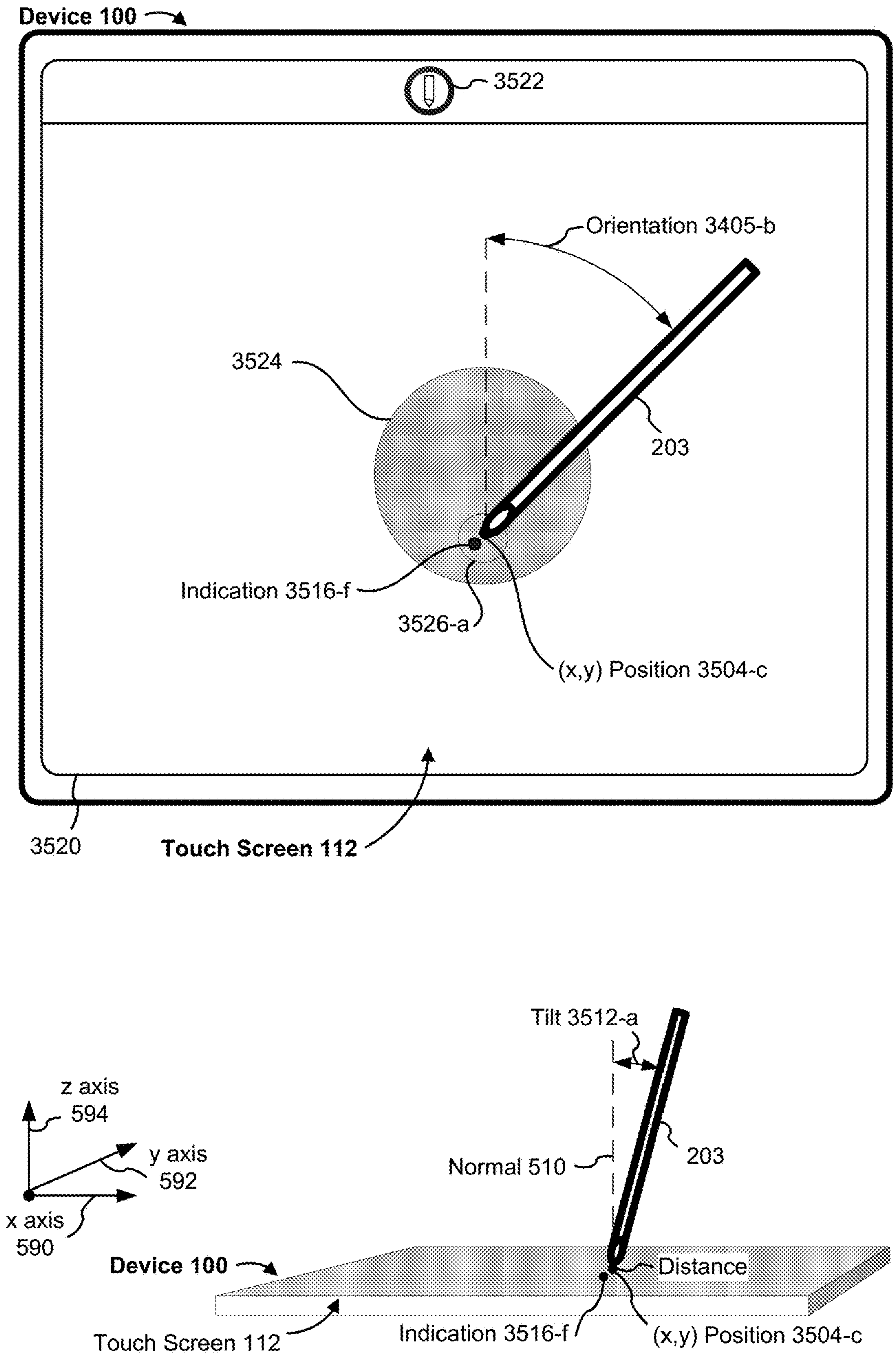
Figure 35H:
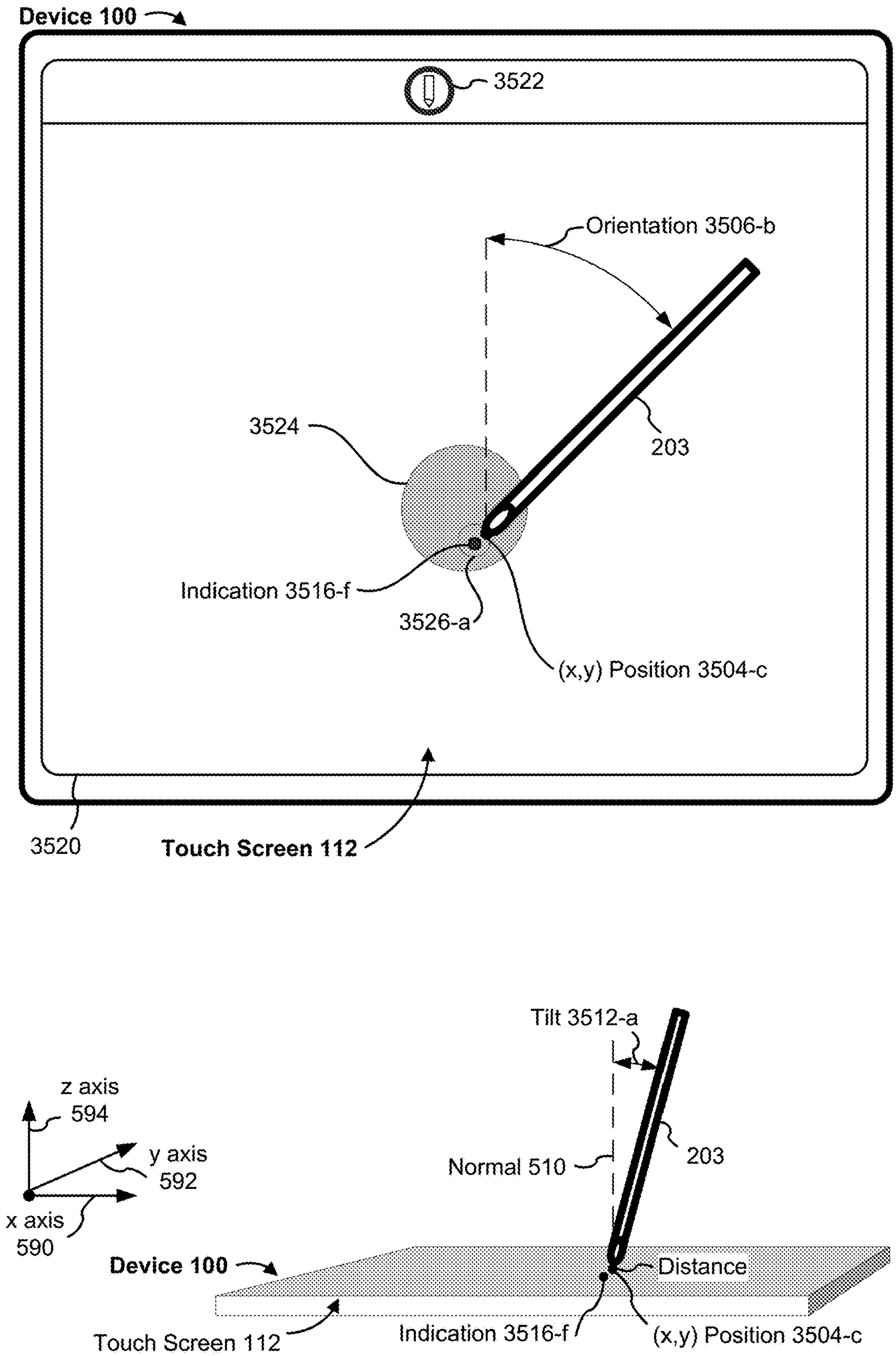
Figure 35I:
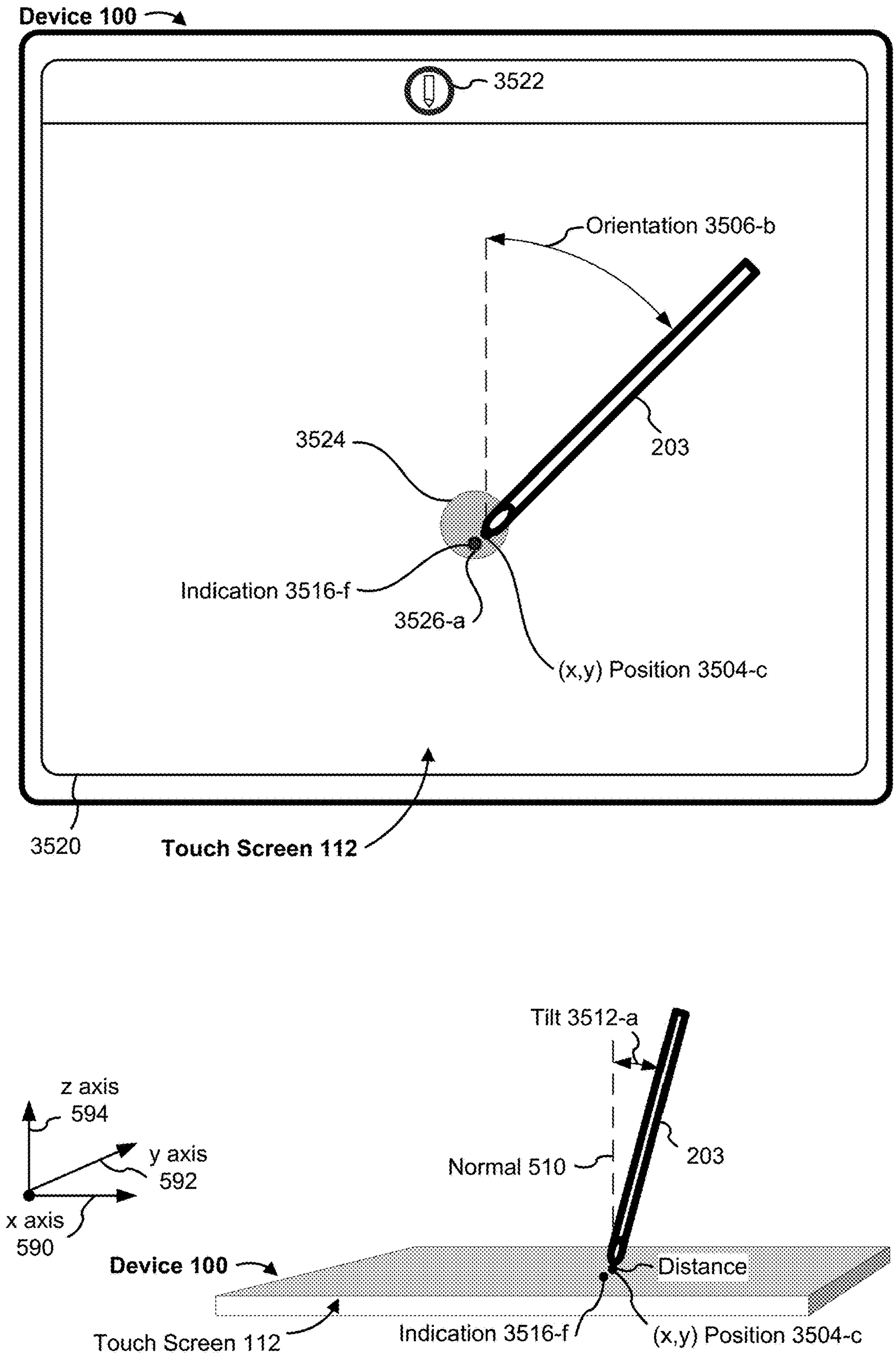
Figure 35J:
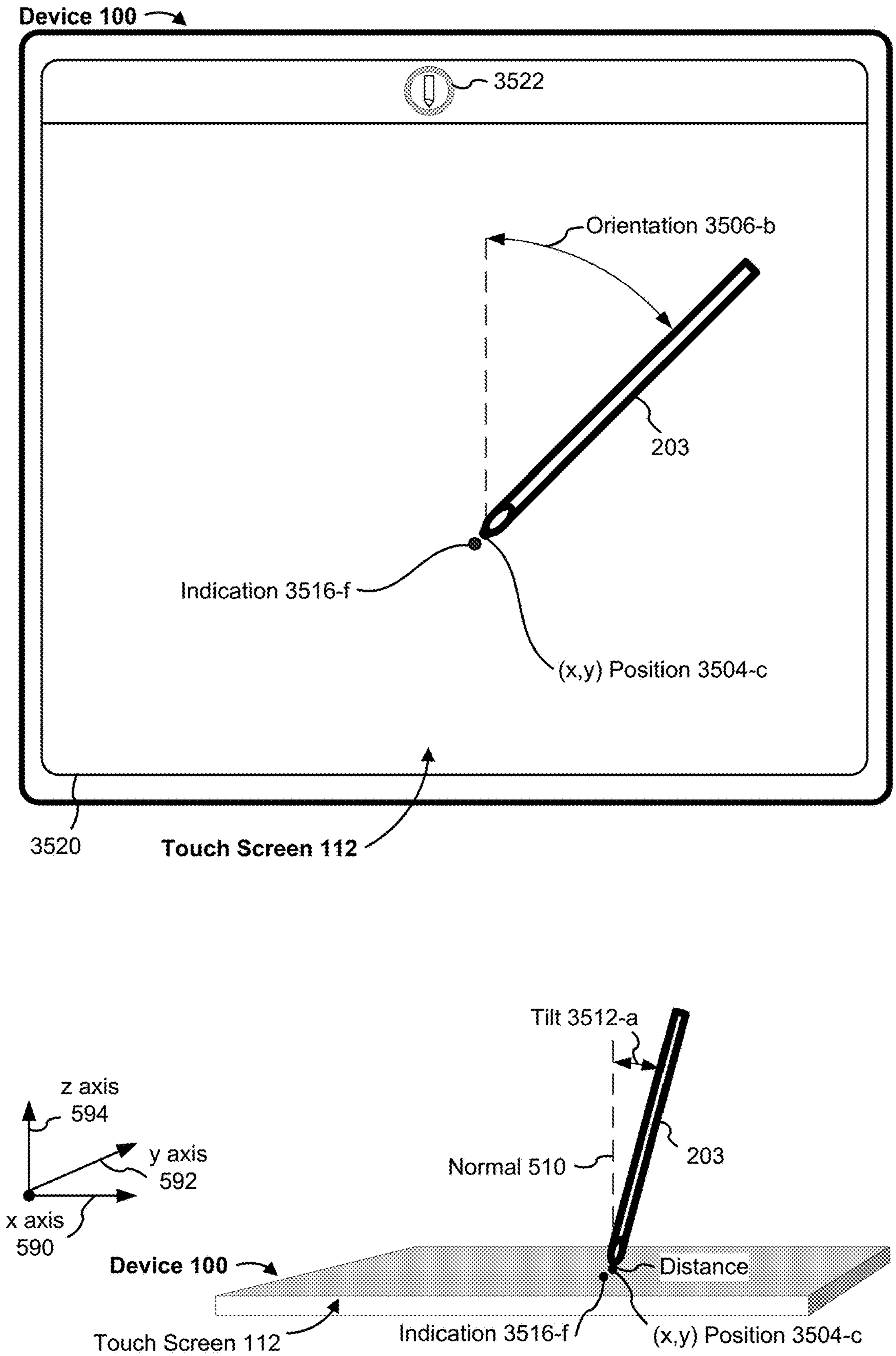

FIGS. 35G-35J illustrate an example of, in response to detecting selection of the first menu option (e.g., menu option 3526-*a*) in the plurality of selectable menu options (as shown in FIG. 35F), performing an operation that corresponds to the first menu option and ceasing to display the menu. For example, after stylus 203 selects menu option 3526-*a* in FIG. 35F, the other menu options (e.g., menu options 3526-*b* through 3526-*f*) disappear and menu 3524 changes to the color of menu option 3526-*a*. Then, menu option 3526-*a* and menu 3524 appear to be absorbed (like ink) by the stylus and the ring of color in indicator 3522 shows the newly selected menu option 3526-*a*, as shown in FIG. 35J. Although FIGS. 35G-34I show menu 3524 changing to the color of menu option 3526-*a* in response to the stylus selecting menu option 3526-*a*, in some embodiments, menu 3524 disappears along with the other menu options (e.g., menu options 3526-*b* through 3526-*f*) and only menu option 3526-*a* appears to be absorbed by the stylus. In other embodiments, a different animation sequence is used to show selection of the first menu option.

FIGS. 35A-35C are flow diagrams illustrating a method 3600 of displaying and using a menu with a stylus in accordance with some embodiments. The method 3600 is performed at an electronic device (e.g., device 300, FIG. 3, or portable multifunction device 100, FIG. 1A) with a display and a touch-sensitive surface. In some embodiments, the display is a touch screen display and the touch-sensitive surface is on or integrated with the display (also called simply a touch-sensitive display). In some embodiments, the display is separate from the touch-sensitive surface. In some embodiments, the device includes one or more sensors to detect signals from a stylus associated with the device, the stylus including a representative portion (e.g., a tip of the stylus). In some embodiments, a portion on the stylus other than the tip is used to estimate the location of the tip. Some operations in method 3600 are, optionally, combined and/or the order of some operations is, optionally, changed.

As described below, the method 3600 provides an intuitive way to display and use a menu (e.g., a color palette) with a stylus, providing a faster and easier way to select menu options (e.g., to select a color from a color palette for a virtual drawing implement). The method reduces the number, extent, and/or nature of the inputs from a user when using a stylus to interact with an electronic device, thereby creating a more efficient human-machine interface. For battery-operated electronic devices, enabling a user to enter stylus input faster and more efficiently conserves power and increases the time between battery charges.

The device displays (3602) a user interface (e.g., user interface 3520) on the touch-sensitive display (e.g., touch screen 112). For example, FIGS. 35B-35J show device 100 displaying user interface 3520 (e.g., a user interface for an application, such as a drawing application).

The device, while displaying the user interface on the touch-sensitive display, detects (3604) the stylus moving towards the touch-sensitive display, without the stylus making contact with the touch-sensitive display. FIGS. 35B-35E, for example, show stylus 203 moving towards touch screen 112, without stylus 203 making contact with touch-screen 112.

In some embodiments, no contacts are (3606) detected on the touch-sensitive display while detecting the stylus moving towards the touch-sensitive display. For example, in FIGS. 35B-35E, the stylus is moving from distance 3514-*a* to distance 3514-*d* towards touch screen 112 and no contacts are detected on touch screen 112.

The device determines (3608) whether the detected stylus movement towards the touch-sensitive display, without making contact with the touch-sensitive display, satisfies one or more stylus movement criteria. For example, device 100 determines whether the detected stylus movement towards touch screen 112 in FIGS. 35B-35E satisfies one or more stylus movement criteria.

In some embodiments, the one or more stylus movement criteria include (3610) detecting that the stylus velocity is above a predetermined (non-zero) value during at least part of the detected stylus movement towards the touch-sensitive display. For example, the velocity of stylus 203 is above a predetermined non-zero value during at least part of the movement of stylus 203 from distance 3514-*a* (in FIG. 35B) to distance 3514-*b* (in FIG. 35C) to distance 3514-*c* (in FIG. 35D) to distance 3514-*d* (in FIG. 35E).

In some embodiments, the one or more stylus movement criteria include (3612) detecting that deceleration of the stylus as the stylus moves towards the touch-sensitive display is above a predetermined deceleration value during at least part of the detected stylus movement (towards the touch-sensitive display). For example, in FIGS. 35D-35E, the deceleration of stylus 203 as stylus 203 moves from distance 3514-*c* to distance 3514-*d* is above a predetermined deceleration value.

In some embodiments, the one or more stylus movement criteria include (3614) detecting that the stylus accelerates as the stylus moves towards the touch-sensitive display and then decelerates as the stylus moves towards the touch-sensitive display during the detected stylus movement (towards the touch-sensitive display). As shown in FIGS. 35B-35E, for example, stylus 203 accelerates as the stylus moves from distance 3514-*a* to distance 3514-*b* towards touch screen 112 and then stylus 203 decelerates as the stylus moves from distance 3514-*c* to distance 3514-*d* towards touch screen 112 during the detected stylus movement towards touch screen 112 from distance 3514-*a* (FIG. 35B) to distance 3514-*d* (FIG. 35E).

In some embodiments, the one or more stylus movement criteria are (3616) independent of (e.g., do not include or depend on) the tilt of the stylus during the detected stylus movement towards the touch-sensitive display. For example, the one or more stylus movement criteria are independent of the tilt of stylus 203 during the detected stylus movement towards touch screen 112 as shown in FIGS. 35B-35E. Although FIGS. 35B-35E show the tilt of stylus 203 as constant with tilt 3512-*a*, in some embodiments, the one or more stylus movement criteria are independent of the tilt of stylus 203 and the tilt of stylus 203 could vary during the detected stylus movement towards the touch-sensitive display.

In some embodiments, the one or more stylus movement criteria are (3618) independent of (e.g., do not include or depend on) the orientation of the stylus during the detected stylus movement towards the touch-sensitive display. For example, the one or more stylus movement criteria are independent of the orientation of stylus 203 during the detected stylus movement towards touch screen 112 as shown in FIGS. 35B-35E. Although FIGS. 35B-35E show the orientation of stylus 203 as constant with orientation 3506-*b*, in some embodiments, the one or more stylus movement criteria are independent of the orientation of stylus 203 and the orientation of stylus 203 could vary during the detected stylus movement towards the touch-sensitive display.

In some embodiments, the one or more stylus movement criteria include (3620) a criterion that is met when the stylus is perpendicular (or approximately perpendicular, e.g., within 5, 10, 15, or 20 degrees of being perpendicular) to the touch-sensitive display. For example, in FIGS. 35B-35E, stylus 203 is approximately perpendicular to touch screen 112.

The device, in accordance with a determination that the detected stylus movement satisfies the one or more stylus movement criteria, displays (3622) a menu overlaid on the user interface, the menu including a plurality of selectable menu options. FIG. 35E, for example, illustrates displaying a menu (e.g., menu 3524) overlaid on the user interface (e.g., user interface 3520), in accordance with a determination that the detected stylus movement (in FIGS. 35B-35E) satisfies the one or more stylus movement criteria. As shown in FIG. 35F, the menu includes a plurality of selectable menu options (e.g., menu options 3526-*a* through 3526-*f*).

In some embodiments, the menu is (3624) a color palette and the plurality of selectable menu options are colors in the color palette. For example, as shown in FIG. 35F, menu 3524 is a color palette and the plurality of selectable menu options (e.g., menu options 3526-*a* through 3526-*f*) are colors in the color palette.

The device detects (3626) selection of a first menu option in the plurality of selectable menu options. In some embodiments, detecting selection of the first menu option includes detecting a gesture on the first menu option, such as a tap gesture or a press gesture with the stylus. For example, FIG. 35F shows stylus 203 selecting menu option 3526-*a* with a tap gesture.

The device, in response to detecting selection of the first menu option in the plurality of selectable menu options: performs (3628) an operation that corresponds to the first menu option, and ceases to display the menu. In some embodiments, where the menu is a color palette and the plurality of selectable menu options are colors in the color palette, performing an operation that corresponds to the first menu option includes changing the color of the virtual drawing implement being emulated by the stylus to the color of the first menu option. As shown in FIG. 35J, in response to detecting selection of the first menu option (e.g., menu option 3526-*a*, as shown in FIG. 35F), the color of the virtual drawing implement is changed to the newly selected color, as shown by the updated ring of color in indicator 3522, and menu 3524 is no longer displayed.

In some embodiments, ceasing to display the menu includes (3630) displaying an animation of the first menu option appearing to be absorbed by the stylus. FIGS. 35G-35I, for example, show an example of an animation of the first menu option (e.g., menu option 3526-*a*) appearing to be absorbed (like ink) by stylus 203. FIGS. 35G-35I show one example of displaying an animation of the first menu option appearing to be absorbed by the stylus; in other embodiments, a different animation sequence is used to show the first menu option appearing to be absorbed by the stylus.

In some embodiments, the device, in accordance with a determination that the one or more stylus movement criteria are not satisfied, the device forgoes (3632) displaying the menu overlaid on the user interface. For example, if the stylus movement shown in FIGS. 35B-35E does not satisfy the one or more stylus movement criteria, then the menu (e.g., menu 3524) would not be displayed on user interface 3520 in FIG. 35E.

In some embodiments, detecting the stylus moving towards the touch-sensitive display includes (3634) detecting the stylus moving towards a first location in the user interface on the touch-sensitive display; and displaying the menu overlaid on the user interface includes displaying the menu overlaid on the user interface at the first location (or adjacent to the first location or centered around the first location). For example, in FIGS. 35B-35E, stylus 203 moves toward a first location (e.g., location of indication 3516) in user interface 3520 on touch screen 112, and in FIG. 35E, the menu (e.g., menu 3524) overlaid on user interface 3520 is displayed at the first location (e.g., centered around the location of indication 3516-*e*).

In some embodiments, detecting the stylus moving towards the touch-sensitive display includes (3636) detecting the stylus moving while a first object in the user interface has focus; and displaying the menu overlaid on the user interface includes displaying the menu overlaid on the user interface at or adjacent to the first object. For example, if a first object in user interface 3520 has focus (not shown in FIG. 35B) while the stylus movement (in FIGS. 35B-35E) satisfies one or more stylus movement criteria, then the menu (e.g., menu 3524) overlaid on user interface 3520 is displayed at or adjacent to the first object in FIG. 35E.

It should be understood that the particular order in which the operations in FIGS. 36A-36C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the first paragraph of the Description of Embodiments above) are also applicable in an analogous manner to method 3600 described above with respect to FIGS. 36A-36C. For example, the stylus positional state characteristics, movements, contacts, gestures, user interface objects, and outputs described above with reference to method 3600 optionally have one or more of the characteristics of the stylus positional state characteristics, movements, contacts, gestures, user interface objects, and outputs described herein with reference to other methods described herein (e.g., those listed in the first paragraph of the Description of Embodiments above). For brevity, these details are not repeated here.

Figure 37:
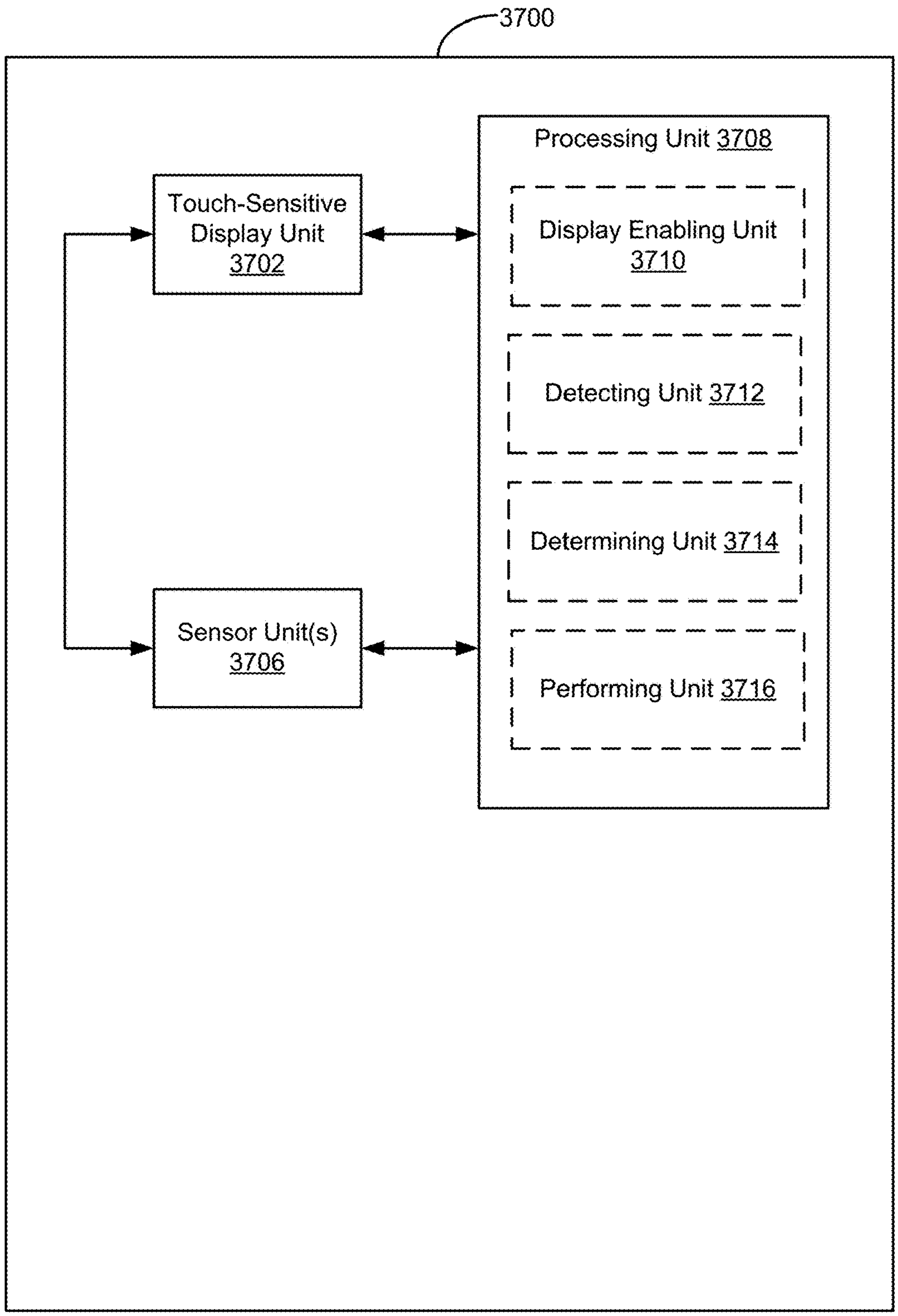
FIG. 37 is a functional block diagram of an electronic device in accordance with some embodiments.

In accordance with some embodiments, FIG. 37 shows a functional block diagram of an electronic device 3700 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 37 are, optionally, combined or separated into sub-blocks to implement the principles of the various described embodiments. Therefore, the description herein optionally supports any possible combination or separation or further definition of the functional blocks described herein.

As shown in FIG. 37, an electronic device 3700 includes a touch-sensitive display unit 3702 configured to display a user interface and receive user contacts (including stylus contacts), one or more sensor units 3706 configured to detect signals from a stylus associated with the device; and a processing unit 3708 coupled with the touch-sensitive display unit 3702 and the one or more sensor units 3706. In some embodiments, the processing unit 3708 includes a display enabling unit 3710, a detecting unit 3712, a determining unit 3714, and a performing unit 3716.

The processing unit 3708 is configured to: enable display of a user interface on the touch-sensitive display unit 3702 (e.g., with the display enabling unit 3710); while enabling display of the user interface on the touch-sensitive display unit 3702, detect the stylus moving towards the touch-sensitive display unit 3702, without the stylus making contact with the touch-sensitive display unit 3702 (e.g., with the detecting unit 3712); determine whether the detected stylus movement towards the touch-sensitive display unit 3702, without making contact with the touch-sensitive display unit 3702, satisfies one or more stylus movement criteria (e.g., with the determining unit 3714); in accordance with a determination that the detected stylus movement satisfies the one or more stylus movement criteria, enable display of a menu overlaid on the user interface, the menu including a plurality of selectable menu options (e.g., with the display enabling unit 3710); detect selection of a first menu option in the plurality of selectable menu options (e.g., with the detecting unit 3712); and, in response to detecting selection of the first menu option in the plurality of selectable menu options: perform an operation that corresponds to the first menu option (e.g., with the performing unit 3716), and cease to display the menu (e.g., with the display enabling unit 3710).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 36A-36C are, optionally, implemented by components depicted in FIGS. 1A-1B or FIG. 37. For example, displaying operation 3602, detecting operation 3604, determining operation 3608, displaying operation 3622, detecting operation 3626, and performing operation 3628 are, optionally, implemented by event sorter 170, event recognizer 180, and event handler 190. Event monitor 171 in event sorter 170 detects a contact (or near contact) on touch-sensitive display 112, and event dispatcher module 174 delivers the event information to application 136-1. A respective event recognizer 180 of application 136-1 compares the event information to respective event definitions 186, and determines whether a first contact (or near contact) at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

at an electronic device with a touch-sensitive display:

displaying an electronic calendar on the touch-sensitive display, the displayed calendar including an area that corresponds to a specific day of a week;

detecting a hand-drawn input on the touch-sensitive display in an area that corresponds to the specific day of the week, wherein the hand-drawn input extends over a vertical portion, that is less than all, of the specific day in the displayed calendar;

in response to detecting the hand-drawn input, displaying, over the vertical portion of the specific day, one or more graphics that correspond to the hand-drawn input;

while displaying, over the vertical portion of the specific day, the one or more graphics that correspond to the hand-drawn input, detecting an input that corresponds to a request to create an event in the electronic calendar; and in response to detecting the input that corresponds to a request to create an event in the electronic calendar, creating, in the specific day in the electronic calendar, an event with a start time and an end time, wherein the start time and the end time of the event are in accordance with the vertical portion of the specific day that the hand-drawn input extends over;

in response to detecting the hand-drawn input, determining whether the hand-drawn input includes hand-written characters;

in accordance with a determination that the hand-drawn input includes hand-written characters, recognizing the hand-written characters in the hand-drawn input;

entering the recognized hand-written characters into the event in the electronic calendar; and in accordance with a determination that the hand-drawn input does not include hand-written characters, supplying default calendar information for the event, wherein the default calendar information includes a default calendar title name.

2. The method of claim 1, including:

after recognizing the hand-written characters, maintaining display of the graphics that correspond to the hand-drawn input.

3. The method of claim 1, including:

after recognizing the hand-written characters, replacing display of the one or more graphics that correspond to hand-written characters with the corresponding recognized characters.

4. The method of claim 1, wherein the input that corresponds to the request to create the event in the electronic calendar includes ceasing to detect the hand-drawn input.

5. The method of claim 1, wherein the input that corresponds to the request to create the event in the electronic calendar is detected on the one or more graphics that correspond to the hand-drawn input.

6. The method of claim 1, including:

in response to detecting the input that corresponds to the request to create the event in the electronic calendar:

maintaining display, over the vertical portion of the specific day, of the one or more graphics that correspond to the hand-drawn input.

7. The method of claim 1, including:

in response to detecting the input that corresponds to the request to create the event in the electronic calendar:

maintaining display, over the vertical portion of the specific day, of the one or more graphics that correspond to the hand-drawn input; and adding one or more graphics to indicate the start time and the end time of the event.

8. The method of claim 1, including:

in response to detecting the input that corresponds to the request to create the event in the electronic calendar:

replacing display of the one or more graphics that correspond to the hand-drawn input with display of predetermined graphics for the event.

9. The method of claim 1, including:

detecting that a current time is the start time of the event or a predetermined time before the start time of the event; and in response to detecting that the current time is the start time of the event or the predetermined time before the start time of the event, displaying an event reminder on the touch-sensitive display, wherein the displayed event reminder includes the one or more graphics that correspond to the hand-drawn input.

10. The method of claim 1, including:

sending the event to a second electronic device, remote from the electronic device with the touch-sensitive display, wherein a representation of the event is configured to be displayed on the second electronic device with the one or more graphics that correspond to the hand-drawn input.

11. The method of claim 1, including:

detecting an input that corresponds to a request to toggle between displaying the event using the one or more graphics that correspond to the hand-drawn input and displaying the event using replacement graphics for the hand-drawn input; and in response to detecting the input, determining whether the one or more graphics that corresponds to the hand-drawn input for the event is displayed or the replacement graphics for the hand-drawn input for the event are displayed; and in response to determining that the one or more graphics that correspond to the hand-drawn input are displayed, ceasing to display the one or more graphics that correspond to the hand-drawn input and displaying the event using replacement graphics for the hand-drawn input for the event; and in response to determining that the replacement graphics for the hand-drawn input are displayed, ceasing to display the replacement graphics for the hand-drawn input and displaying the event using the one or more graphics that correspond to the hand-drawn input.

12. The method of claim 1, including:

detecting an input that corresponds to a request to toggle between displaying a plurality of events using graphics that correspond to hand-drawn input for the plurality of events and displaying the plurality of events using replacement graphics for the hand-drawn input for the plurality of events;

in response to detecting the input, determining whether the graphics that correspond to the hand-drawn input for the plurality of events are displayed or replacement graphics for the hand-drawn input for the plurality of events are displayed; and in response to determining that the graphics that correspond to the hand-drawn input for the plurality of events are displayed, ceasing to display the graphics that correspond to the hand-drawn input for the plurality of events and displaying the plurality of events using replacement graphics for the hand-drawn input for the plurality of events; and in response to determining that the replacement graphics for the hand-drawn input for the plurality of events are displayed, ceasing to display the replacement graphics for the hand-drawn input for the plurality of events and displaying the plurality of events using the graphics that correspond to the hand-drawn input for the plurality of events.

13. An electronic device, comprising:

a touch-sensitive display;

one or more processors;

memory; and one or more programs, wherein the one or more programs are stored in the memory and configured to be executed by the one or more processors, the one or more programs including instructions for:

displaying an electronic calendar on the touch-sensitive display, the displayed calendar including an area that corresponds to a specific day of a week;

detecting a hand-drawn input on the touch-sensitive display in an area that corresponds to the specific day of the week, wherein the hand-drawn input extends over a vertical portion, that is less than all, of the specific day in the displayed calendar;

in response to detecting the hand-drawn input, displaying, over the vertical portion of the specific day, one or more graphics that correspond to the hand-drawn input;

while displaying, over the vertical portion of the specific day, the one or more graphics that correspond to the hand-drawn input, detecting an input that corresponds to a request to create an event in the electronic calendar; and in response to detecting the input that corresponds to a request to create an event in the electronic calendar, creating, in the specific day in the electronic calendar, an event with a start time and an end time, wherein the start time and the end time of the event are in accordance with the vertical portion of the specific day that the hand-drawn input extends over;

in response to detecting the hand-drawn input, determining whether the hand-drawn input includes hand-written characters;

in accordance with a determination that the hand-drawn input includes hand-written characters, recognizing the hand-written characters in the hand-drawn input;

entering the recognized hand-written characters into to the event in the electronic calendar; and in accordance with a determination that the hand-drawn input does not include hand-written characters, supplying default calendar information for the event, wherein the default calendar information includes a default calendar title name.

14. The electronic device of claim 13, wherein the one or more programs include instructions for:

after recognizing the hand-written characters, maintaining display of the graphics that correspond to the hand-drawn input.

15. The electronic device of claim 13, wherein the one or more programs include instructions for:

after recognizing the hand-written characters, replacing display of the one or more graphics that correspond to hand-written characters with the corresponding recognized characters.

16. The electronic device of claim 13, wherein the input that corresponds to the request to create the event in the electronic calendar includes ceasing to detect the hand-drawn input.

17. The electronic device of claim 13, wherein the input that corresponds to the request to create the event in the electronic calendar is detected on the one or more graphics that correspond to the hand-drawn input.

18. The electronic device of claim 13, wherein the one or more programs include instructions for:

in response to detecting the input that corresponds to the request to create the event in the electronic calendar:

maintaining display, over the vertical portion of the specific day, of the one or more graphics that correspond to the hand-drawn input.

19. The electronic device of claim 13, wherein the one or more programs include instructions for:

in response to detecting the input that corresponds to the request to create the event in the electronic calendar:

maintaining display, over the vertical portion of the specific day, of the one or more graphics that correspond to the hand-drawn input; and adding one or more graphics to indicate the start time and the end time of the event.

20. The electronic device of claim 13, wherein the one or more programs include instructions for:

in response to detecting the input that corresponds to the request to create the event in the electronic calendar:

replacing display of the one or more graphics that correspond to the hand-drawn input with display of predetermined graphics for the event.

21. The electronic device of claim 13, wherein the one or more programs include instructions for:

detecting that a current time is the start time of the event or a predetermined time before the start time of the event; and in response to detecting that the current time is the start time of the event or the predetermined time before the start time of the event, displaying an event reminder on the touch-sensitive display, wherein the displayed event reminder includes the one or more graphics that correspond to the hand-drawn input.

22. The electronic device of claim 13, wherein the one or more programs include instructions for:

sending the event to a second electronic device, remote from the electronic device with the touch-sensitive display, wherein a representation of the event is configured to be displayed on the second electronic device with the one or more graphics that correspond to the hand-drawn input.

23. The electronic device of claim 13, wherein the one or more programs include instructions for:

detecting an input that corresponds to a request to toggle between displaying the event using the one or more graphics that correspond to the hand-drawn input and displaying the event using replacement graphics for the hand-drawn input; and in response to detecting the input, determining whether the one or more graphics that corresponds to the hand-drawn input for the event is displayed or the replacement graphics for the hand-drawn input for the event are displayed; and in response to determining that the one or more graphics that correspond to the hand-drawn input are displayed, ceasing to display the one or more graphics that correspond to the hand-drawn input and displaying the event using replacement graphics for the hand-drawn input for the event; and in response to determining that the replacement graphics for the hand-drawn input are displayed, ceasing to display the replacement graphics for the hand-drawn input and displaying the event using the one or more graphics that correspond to the hand-drawn input.

24. The electronic device of claim 13, wherein the one or more programs include instructions for:

detecting an input that corresponds to a request to toggle between displaying a plurality of events using graphics that correspond to hand-drawn input for the plurality of events and displaying the plurality of events using replacement graphics for the hand-drawn input for the plurality of events;

in response to detecting the input, determining whether the graphics that correspond to the hand-drawn input for the plurality of events are displayed or replacement graphics for the hand-drawn input for the plurality of events are displayed; and in response to determining that the graphics that correspond to the hand-drawn input for the plurality of events are displayed, ceasing to display the graphics that correspond to the hand-drawn input for the plurality of events and displaying the plurality of events using replacement graphics for the hand-drawn input for the plurality of events; and in response to determining that the replacement graphics for the hand-drawn input for the plurality of events are displayed, ceasing to display the replacement graphics for the hand-drawn input for the plurality of events and displaying the plurality of events using the graphics that correspond to the hand-drawn input for the plurality of events.

25. A non-transitory computer-readable storage medium storing one or more programs, the one or more programs comprising instructions, which when executed by an electronic device with a touch-sensitive display, cause the device to:

display an electronic calendar on the touch-sensitive display, the displayed calendar including an area that corresponds to a specific day of a week;

detect a hand-drawn input on the touch-sensitive display in an area that corresponds to the specific day of the week, wherein the hand-drawn input extends over a vertical portion, that is less than all, of the specific day in the displayed calendar;

in response to detecting the hand-drawn input, display, over the vertical portion of the specific day, one or more graphics that correspond to the hand-drawn input;

while displaying, over the vertical portion of the specific day, the one or more graphics that correspond to the hand-drawn input, detect an input that corresponds to a request to create an event in the electronic calendar; and in response to detecting the input that corresponds to a request to create an event in the electronic calendar, create, in the specific day in the electronic calendar, an event with a start time and an end time, wherein the start time and the end time of the event are in accordance with the vertical portion of the specific day that the hand-drawn input extends over:

in response to detecting the hand-drawn input, determine whether the hand-drawn input includes hand-written characters;

in accordance with a determination that the hand-drawn input includes hand-written characters, recognize the hand-written characters in the hand-drawn input;

enter the recognized hand-written characters into to the event in the electronic calendar; and in accordance with a determination that the hand-drawn input does not include hand-written characters, supply default calendar information for the event, wherein the default calendar information includes a default calendar title name.

26. The non-transitory computer-readable storage medium of claim 25, wherein the one or more programs comprising instructions further cause the device to:

after recognizing the hand-written characters, maintain display of the graphics that correspond to the hand-drawn input.

27. The non-transitory computer-readable storage medium of claim 25, wherein the one or more programs comprising instructions further cause the device to:

after recognizing the hand-written characters, replace display of the one or more graphics that correspond to hand-written characters with the corresponding recognized characters.

28. The non-transitory computer-readable storage medium of claim 25, wherein the input that corresponds to the request to create the event in the electronic calendar includes ceasing to detect the hand-drawn input.

29. The non-transitory computer-readable storage medium of claim 25, wherein the input that corresponds to the request to create the event in the electronic calendar is detected on the one or more graphics that correspond to the hand-drawn input.

30. The non-transitory computer-readable storage medium of claim 25, wherein the one or more programs comprising instructions further cause the device to:

in response to detecting the input that corresponds to the request to create the event in the electronic calendar:

maintain display, over the vertical portion of the specific day, of the one or more graphics that correspond to the hand-drawn input.

31. The non-transitory computer-readable storage medium of claim 25, wherein the one or more programs comprising instructions further cause the device to:

in response to detecting the input that corresponds to the request to create the event in the electronic calendar:

maintain display, over the vertical portion of the specific day, of the one or more graphics that correspond to the hand-drawn input; and add one or more graphics to indicate the start time and the end time of the event.

32. The non-transitory computer-readable storage medium of claim 25, wherein the one or more programs comprising instructions further cause the device to:

in response to detecting the input that corresponds to the request to create the event in the electronic calendar:

replace display of the one or more graphics that correspond to the hand-drawn input with display of predetermined graphics for the event.

33. The non-transitory computer-readable storage medium of claim 25, wherein the one or more programs comprising instructions further cause the device to:

detect that a current time is the start time of the event or a predetermined time before the start time of the event; and in response to detecting that the current time is the start time of the event or the predetermined time before the start time of the event, display an event reminder on the touch-sensitive display, wherein the displayed event reminder includes the one or more graphics that correspond to the hand-drawn input.

34. The non-transitory computer-readable storage medium of claim 25, wherein the one or more programs comprising instructions further cause the device to:

send the event to a second electronic device, remote from the electronic device with the touch-sensitive display, wherein a representation of the event is configured to be displayed on the second electronic device with the one or more graphics that correspond to the hand-drawn input.

35. The non-transitory computer-readable storage medium of claim 25, wherein the one or more programs comprising instructions further cause the device to:

detect an input that corresponds to a request to toggle between displaying the event using the one or more graphics that correspond to the hand-drawn input and displaying the event using replacement graphics for the hand-drawn input; and in response to detecting the input, determine whether the one or more graphics that corresponds to the hand-drawn input for the event is displayed or the replacement graphics for the hand-drawn input for the event are displayed; and in response to determining that the one or more graphics that correspond to the hand-drawn input are displayed, cease to display the one or more graphics that correspond to the hand-drawn input and display the event using replacement graphics for the hand-drawn input for the event; and in response to determining that the replacement graphics for the hand-drawn input are displayed, cease to display the replacement graphics for the hand-drawn input and display the event using the one or more graphics that correspond to the hand-drawn input.

36. The non-transitory computer-readable storage medium of claim 25, wherein the one or more programs comprising instructions further cause the device to:

detect an input that corresponds to a request to toggle between displaying a plurality of events using graphics that correspond to hand-drawn input for the plurality of events and displaying the plurality of events using replacement graphics for the hand- drawn input for the plurality of events;

in response to detecting the input, determine whether the graphics that correspond to the hand-drawn input for the plurality of events are displayed or replacement graphics for the hand-drawn input for the plurality of events are displayed; and in response to determining that the graphics that correspond to the hand-drawn input for the plurality of events are displayed, cease to display the graphics that correspond to the hand-drawn input for the plurality of events and display the plurality of events using replacement graphics for the hand-drawn input for the plurality of events; and in response to determining that the replacement graphics for the hand-drawn input for the plurality of events are displayed, cease to display the replacement graphics for the hand-drawn input for the plurality of events and display the plurality of events using the graphics that correspond to the hand-drawn input for the plurality of events.

* * * * *